US012733643B2

(12) United States Patent
Burns et al.

(10) Patent No.: US 12,733,643 B2
(45) Date of Patent: Sep. 15, 2026

(54) FUNGICIDAL COMPOSITIONS COMPRISING MIXTURES OF DIFFERENT FUNGICIDAL COMPOUNDS

(71) Applicant: SYNGENTA CROP PROTECTION AG, Basel (CH)

(72) Inventors: David Burns, Bracknell (GB); Mattia Riccardo Monaco, Stein (CH); Stefano Rendine, Stein (CH); Clemens Lamberth, Stein (CH); Mathias Blum, Stein (CH); Andrew Edmunds, Stein (CH)

(73) Assignee: SYNGENTA CROP PROTECTION LLC, Basel (CH)

( * ) Notice: Subject to any disclaimer, the term of this patent is extended or adjusted under 35 U.S.C. 154(b) by 783 days.

(21) Appl. No.: 18/000,014

(22) PCT Filed: May 27, 2021

(86) PCT No.: PCT/EP2021/064261
§ 371 (c)(1),
(2) Date: Nov. 28, 2022

(87) PCT Pub. No.: WO2021/244951
PCT Pub. Date: Dec. 9, 2021

(65) Prior Publication Data

US 2023/0270114 A1 Aug. 31, 2023

(30) Foreign Application Priority Data

Jun. 3, 2020 (EP) .................................... 20178040

(51) Int. Cl.

| | |
|---|---|
| *A01N 47/06* | (2006.01) |
| *A01N 43/78* | (2006.01) |
| *A01N 47/18* | (2006.01) |
| *A01P 3/00* | (2006.01) |

(52) U.S. Cl.
CPC ............. *A01N 47/06* (2013.01); *A01N 43/78* (2013.01); *A01N 47/18* (2013.01); *A01P 3/00* (2021.08)

(58) Field of Classification Search
CPC ..................................................... A01N 47/06
See application file for complete search history.

(56) References Cited

U.S. PATENT DOCUMENTS 10,662,182 B2 * 5/2020 Jeanmart .............. C07D 417/12

FOREIGN PATENT DOCUMENTS

| | | | | |
|---|---|---|---|---|
| WO | 2010012793 A1 | 2/2010 | | |
| WO | WO-2017207362 A1 * | 12/2017 | ........... | C07D 277/56 |
| WO | 2019105933 A1 | 6/2019 | | |
| WO | WO-2020109511 A1 * | 6/2020 | ........... | C07D 417/14 |
| WO | 2021/244952 A1 | 12/2021 | | |
| WO | 2021244950 A1 | 12/2021 | | |

OTHER PUBLICATIONS

U.S. Appl. No. 17/296,620, filed May 27, 2021, Burns et al.*
WIPO; App. No. PCT/EP2021/064261; International Search Report and Written Opinion dated Aug. 5, 2021; pp. 1-12.

* cited by examiner

*Primary Examiner* — Svetlana M Ivanova
(74) *Attorney, Agent, or Firm* — BakerHostetler; Toni-Junell Herbert

(57) ABSTRACT

A fungicidal composition comprising a mixture of components (A) and (B), wherein components (A) and (B) are as defined in claim 1, and use of the compositions in agriculture or horticulture for controlling or preventing infestation of plants by phytopathogenic microorganisms, preferably fungi.

18 Claims, No Drawings

FUNGICIDAL COMPOSITIONS COMPRISING MIXTURES OF DIFFERENT FUNGICIDAL COMPOUNDS

CROSS-REFERENCE TO RELATED APPLICATIONS

This application is a 371 National Stage Application of International Application No. PCT/EP2021/064261, filed May 27, 2021, which claims priority to EP 20178040.0, filed Jun. 3, 2020, the entire contents of which are incorporated by reference herein.

The present invention relates to novel fungicidal compositions, to their use in agriculture or horticulture for controlling diseases caused by phytopathogens, especially phytopathogenic fungi, and to methods of controlling diseases on useful plants.

WO 2010/012793, WO 2017/207362, and WO 2019/105933 describe thiazole derivatives as pesticidal agents.

Whilst many fungicidal compounds and compositions, belonging to various different chemical classes, have been/are being developed for use as fungicides in crops of useful plants, crop tolerance and activity against particular phytopathogenic fungi do not always satisfy the needs of agricultural practice in many respects. Therefore, there is a continuing need to find new compounds and compositions having superior biological properties for use in controlling or preventing infestation of plants by phytopathogenic fungi. For example, compounds possessing a greater biological activity, an advantageous spectrum of activity, an increased safety profile, improved physico-chemical properties, increased biodegradability. Or else, compositions possessing a broader spectrum of activity, improved crop tolerance, synergistic interactions or potentiating properties, or compositions which display a more rapid onset of action or which have longer lasting residual activity or which enable a reduction in the number of applications and/or a reduction in the application rate of the compounds and compositions required for effective control of a phytopathogen, thereby enabling beneficial resistance-management practices, reduced environmental impact and reduced operator exposure.

The use of compositions comprising mixtures of different fungicidal compounds possessing different modes of action can address some of these needs (e.g., by combining fungicides with differing spectrums of activity).

According to the present invention, there is provided a fungicidal composition comprising a mixture of components (A) and (B) as active ingredients, wherein component (A) is a compound of formula (I):

(I)

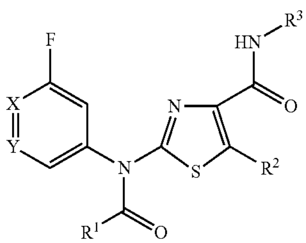

wherein

X is N;

Y is C—F or C—H;

$R^1$ is hydrogen, $C_1$-$C_3$alkyl, $C_1$-$C_3$alkoxy, $C_1$-$C_3$haloalkyl, $C_1$-$C_3$hydroxyalkyl, $C_1$-$C_3$alkoxy$C_1$-$C_4$alkyl, $C_3$-$C_4$cycloalkyl, $C_1$-$C_2$alkoxy$C_1$-$C_2$alkoxy, $C_1$-$C_3$alkoxycarbonyl$C_1$-Csalkyl, $C_1$-$C_2$alkoxycarbonyloxyC1-$C_2$alkyl, $C_1$-$C_2$alkycarbonyloxyC1-$C_2$alkyl, $C_3$-$C_4$alkynyloxy, $C_1$-$C_3$alkylsulfanyl, diethylamino, phenyl, benzyl, phenoxy, benzyloxy$C_1$-$C_2$alkyl, thienyl, or furanyl;

$R^2$ is $C_1$-$C_4$alkyl, $C_1$-$C_4$alkoxy, $C_1$-$C_4$haloalkyl or HC(O)NH—;

$R^3$ is $C_3$-$C_6$cycloalkyl, wherein the cycloalkyl groups are optionally substituted with 1 or 2 groups represented by $R^4$, or $R^3$ is a 6- to 10-membered non-aromatic spirocyclic carbobi-cyclyl ring system;

$R^4$ is $C_1$-$C_3$alkyl;

or a salt or an N-oxide thereof; and component (B) is a compound selected from the group consisting of:

azoxystrobin, trifloxystrobin, pyraclostrobin, picoxystrobin, coumoxystrobin, metyltetraprole, cyproconazole, tebuconazole, difenoconazole, hexaconazole, propiconazole, fenhexamid, prothioconazole, mefentrifluconazole, prochloraz, fenpropidin, fenpropimorph, fluxapyroxad, fluopyram, isopyrazam, sedaxane, benzovindiflupyr, pydiflumetofen, isoflucypram, bixafen, penthiopyrad, inpyrfluxam, isofetamid, pyrapropoyne, fluindapyr, fenpicoxamid, florylpicoxamid, acibenzolar-S-methyl, trinexepac-ethyl, fosetyl-aluminium, chlorothalonil, mancozeb, mandipropamid, oxathiapiprolin, fluazinam, fludioxonil, cyprodinil, metalaxyl-M, aminopyrifen, folpet, ipflufenoquin, quinofumelin, tebufloquin, tolprocarb, tricyclazole, pyroquilon, cyflufenamid, metrafenone, N'-[2-chloro-4-(2-fluorophenoxy)-5-methyl-phenyl]-N-ethyl-N-methyl-formamidine, (this compound may be prepared from the methods described in WO 2016/202742); N'-[4-(2-bromophenoxy)-5-chloro-2-methyl-phenyl]-N-ethyl-N-methyl-formamidine, (this compound may be prepared from the methods described in WO 2016/202688); N-(1-benzyl-1,3-dimethyl-butyl)-8-fluoro-quinoline-3-carboxamide, N-(1-benzyl-3,3,3-trifluoro-1-methyl-propyl)-8-fluoro-quinoline-3-carboxamide, N-(1-benzyl-3-chloro-1-methyl-but-3-enyl)-8-fluoro-quinoline-3-carboxamide, (these compounds may be prepared from the methods described in WO 2017/153380); 1-(6,7-dimethylpyrazolo[1,5-a]pyridin-3-yl)-4,4,5-trifluoro-3,3-dimethyl-isoquinoline, 4,4-difluoro-3,3-dimethyl-1-(7-methylpyrazolo[1,5-a]pyridin-3-yl)isoquinoline, 1-(6,7-dimethylpyrazolo[1,5-a]pyridin-3-yl)-4,4,6-trifluoro-3,3-dimethyl-isoquinoline, (these compounds may be prepared from the methods described in WO 2017/025510); 1-(4,5-dimethylbenzimidazol-1-yl)-4,4,5-trifluoro-3,3-dimethyl-isoquinoline, 1-(4,5-dimethylbenzimidazol-1-yl)-4,4-difluoro-3,3-dimethyl-isoquinoline, 6-chloro-4,4-difluoro-3,3-dimethyl-1-(4-methylbenzimidazol-1-yl)isoquinoline, (these compounds may be prepared from the methods described in WO 2016/156085); N'-[5-bromo-2-methyl-6-(1-methyl-2-propoxy-ethoxy)-3-pyridyl]-N-ethyl-N-methyl-formamidine, N'-[5-chloro-2-methyl-6-(1-methyl-2-propoxy-ethoxy)-3-pyridyl]-N-ethyl-N-methyl-formamidine, N'-[5-bromo-2-methyl-6-(1-methyl-2-propoxy-ethoxy)-3-pyridyl]-N-isopropyl-N-methyl-formamidine, (these compounds may be prepared from the methods described in WO 2015/155075); N-isopropyl-N'-[5-methoxy-2-methyl-4-(2,2,2-trifluoro-1-hydroxy-1-phenyl-ethyl)phenyl]-N-methyl-formamidine, (this compound may be prepared from the methods described in WO 2018/228896); N-methoxy-N-[[4-[5-(trifluoromethyl)-1,2,4-oxadiazol-3-yl]phenyl]methyl]cyclopropanecarboxamide, N,2- dimethoxy-N-[[4-[5-(trifluoromethyl)-1,2,4-oxadiazol-3-yl]phenyl]methyl]propanamide, N-ethyl-2-methyl-N-[[4-[5-(trifluoromethyl)-1,2,4-oxadiazol-3-yl]phenyl]methyl]propanamide, 1-methoxy-3-methyl-1-[[4-[5-(trifluoromethyl)-1,2,4-oxadiazol-3-yl]phenyl]methyl]urea, 1,3-dimethoxy-1-[[4-[5-(trifluoromethyl)-1,2,4-oxadiazol-3-yl]phenyl]methyl]urea, 3-ethyl-1-methoxy-1-[[4-[5-(trifluoromethyl)-1,2,4-oxadiazol-3-yl]phenyl]methyl]urea, ethyl 1-[[4-[5-(trifluoromethyl)-1,2,4-oxadiazol-3-yl]phenyl]methyl]pyrazole-4-carboxylate, N,N-dimethyl-1-[[4-[5-(trifluoromethyl)-1,2,4-oxadiazol-3-yl]phenyl]methyl]-1,2,4-triazol-3-amine, (these compounds may be prepared from the methods described in WO 2017/055473, WO 2017/055469, WO 2017/093348 and WO 2017/118689); methyl (Z)-3-methoxy-2-[2-methyl-5-[3-(trifluoromethyl)pyrazol-1-yl]phenoxy]prop-2-enoate, methyl (Z)-3-methoxy-2-[2-methyl-5-(3-propylpyrazol-1-yl)phenoxy]prop-2-enoate, methyl (Z)-2-[5-(3-isopropylpyrazol-1-yl)-2-methyl-phenoxy]-3-methoxy-prop-2-enoate, methyl (Z)-3-methoxy-2-[2-methyl-5-(4-propyltriazol-2-yl)phenoxy]prop-2-enoate, methyl (Z)-3-methoxy-2-[2-methyl-5-[4-(trifluoromethyl)triazol-2-yl]phenoxy]prop-2-enoate, (these compounds may be prepared from the methods described in WO 2020/079111); methyl (Z)-2-(5-cyclohexyl-2-methyl-phenoxy)-3-methoxy-prop-2-enoate, methyl (Z)-2-(5-cyclopentyl-2-methyl-phenoxy)-3-methoxy-prop-2-enoate, methyl (Z)-2-[5-(4-cyclohexylthiazol-2-yl)-2-methyl-phenoxy]-3-methoxy-prop-2-enoate, methyl (Z)-2-[5-[4-(ethoxymethyl)thiazol-2-yl]-2-methyl-phenoxy]-3-methoxy-prop-2-enoate, methyl (Z)-2-[5-(4-bromothiazol-2-yl)-2-methyl-phenoxy]-3-methoxy-prop-2-enoate, methyl (Z)-3-methoxy-2-[2-methyl-5-[5-(trifluoromethyl)thiazol-2-yl]phenoxy]prop-2-enoate, TAEGRO® (i.e, *Bacillus amyloliquefaciens* strain FZB24), Timorex Gold™ (plant extract comprising tea tree oil), and metarylpicoxamid.

In general, the weight ratio of component (A) to component (B) may preferably be from 100:1 to 1:100, from 50:1 to 1:50, from 20:1 to 1:40, from 15:1 to 1:30, from 12:1 to 1:25, from 10:1 to 1:20, from 5:1 and 1:15, from 3:1 to 1:10 or from 2:1 to 1:5.

Further according to the invention, there is provided a method of controlling or preventing phytopathogenic diseases, especially phytopathogenic fungi, on useful plants or on propagation material thereof, which comprises applying to the useful plants, the locus thereof or propagation material thereof a fungicidal composition according to the invention.

The benefits provided by certain fungicidal mixture compositions according to the invention may also include, inter alia, advantageous levels of biological activity for protecting plants against diseases that are caused by fungi or superior properties for use as agrochemical active ingredients (for example, greater biological activity, an advantageous spectrum of activity, an increased safety profile, improved physico-chemical properties, or increased biodegradability).

The presence of one or more possible asymmetric carbon atoms in a compound of formula (I) means that the compounds may occur in optically isomeric forms, i.e., enantiomeric or diastereomeric forms. Also atropisomers may occur as a result of restricted rotation about a single bond. The present invention includes all those possible isomeric forms (e.g. geometric isomers) and mixtures thereof for a compound of formula (I). The present invention includes all possible tautomeric forms for a compound of formula (I), and also a racemic compound, i.e., a mixture of at least two enantiomers in a ratio of substantially 50:50.

In each case, the compounds of formula (I) according to the invention are in free form, in oxidized form as a N-oxide or in salt form, e.g. an agronomically usable salt form.

N-oxides are oxidized forms of tertiary amines or oxidized forms of nitrogen containing heteroaromatic compounds. They are described for instance in the book "Heterocyclic N-oxides" by A. Albini and S. Pietra, CRC Press, Boca Raton 1991.

Preferred groups and values for the substituents in the compounds of formula (I) are, in any combination thereof, as set out below.

Y is C—F or C—H. In one set of embodiments, Y is C—F. In another set of embodiments, Y is C—H.

X is N.

$R^1$ is hydrogen, $C_1$-$C_3$alkyl, $C_1$-$C_3$alkoxy, $C_1$-$C_3$haloalkyl, $C_1$-$C_3$hydroxyalkyl, $C_1$-$C_3$alkoxy$C_1$-$C_4$alkyl, $C_3$-$C_4$cycloalkyl, $C_1$-$C_2$alkoxy$C_1$-$C_2$alkoxy, $C_1$-$C_3$alkoxycarbonyl$C_1$-$C_3$alkyl, $C_1$-$C_2$alkoxycarbonyloxyC1-$C_2$alkyl, $C_1$-$C_2$alkycarbonyloxyC1-$C_2$alkyl, $C_3$-$C_4$alkynyloxy, $C_1$-$C_3$alkylsulfanyl, diethylamino, phenyl, benzyl, phenoxy, benzyloxy$C_1$-$C_2$alkyl, thienyl, or furanyl.

Preferably, $R^1$ is hydrogen, methyl, ethyl, isopropyl, methoxy, ethoxy, fluoromethyl, chloromethyl, bromomethyl, 2,2,2-trifuoroethyl, 1-hydroxyethyl, methoxymethyl, 1-methoxyethyl, 1-ethoxymethyl, 1-methoxy-1-methyl-ethyl, cyclopropyl, methoxyethoxy, ethoxycarbonyl, 2-methoxy-2-oxo-ethyl, 2-methoxy-oxo-ethyl, 2-methoxy-oxo-propyl, propargyloxy, 1-methoxycarbonyloxy-ethyl, 1-ethoxycarbonyloxy-ethyl, 1-methylcarbonyloxy-ethyl, methylcarbonyloxymethyl, methylsulfanyl, ethylsulfanyl, isopropylsulfanyl, diethylamino, phenyl, benzyl, phenoxy, benzyloxymethyl, 1-benzyloxyethyl, 2-furanyl, or 2-thiophenyl.

More preferably, $R^1$ is hydrogen, methyl, ethyl, isopropyl, methoxy, ethoxy, fluoromethyl, 2,2,2-trifuoroethyl, 1-hydroxyethyl, 1-ethoxymethyl, cyclopropyl, methoxyethoxy, 2-methoxy-2-oxo-ethyl, 2-methoxy-oxo-ethyl, 2-methoxy-oxo-propyl, propargyloxy, 1-methoxycarbonyloxy-ethyl, 1-ethoxycarbonyloxy-ethyl, 1-methylcarbonyloxy-ethyl, methylcarbonyloxymethyl, isopropylsulfanyl, diethylamino, phenyl, benzyl, phenoxy, benzyloxymethyl, 1-benzyloxy-ethyl, 2-furanyl, or 2-thiophenyl.

$R^2$ is $C_1$-$C_4$alkyl, $C_1$-$C_4$alkoxy, $C_1$-$C_4$haloalkyl or HC(O)NH—. Preferably, $R^1$ is $C_1$-$C_3$alkyl or $C_1$-$C_3$alkoxy. More preferably, $R^1$ is methyl or methoxy.

$R^3$ is $C_3$-$C_6$cycloalkyl, wherein the cycloalkyl groups are optionally substituted with 1 or 2 groups represented by $R^4$, or $R^3$ is a 6- to 10-membered non-aromatic spirocyclic carbobi-cyclyl ring system.

Preferably, $R^3$ is $C_3$-$C_4$cycloalkyl, wherein the cycloalkyl groups are optionally substituted with 1 or 2 groups represented by $R^4$, or $R^3$ is a 6- to 8-membered non-aromatic spirocyclic carbobi-cyclyl ring system.

More preferably, $R^3$ is cyclobutyl, 2,2-dimethylcyclobutyl or spiro[3.4]octanyl, and most preferably, cyclobutyl, 2,2-dimethylcyclobutyl, or spiro[3.4]octan-3-yl.

$R^4$ is $C_1$-$C_3$alkyl. Preferably, $R^4$ is methyl, ethyl or isopropyl. More preferably, $R^4$ is methyl.

Preferably, component (A) is a compound selected from:

[2-[(2,6-difluoro-4-pyridyl)-[5-methyl-4-(spiro[3.4]octan-3-ylcarbamoyl)thiazol-2-yl]amino]-1-methyl-2-oxo-ethyl]acetate (compound X.01);

[2-[[4-(cyclobutylcarbamoyl)-5-methyl-thiazol-2-yl]-(2,6-difluoro-4-pyridyl)amino]-1-methyl-2-oxo-ethyl]ethyl carbonate (compound X.02);

[2-[(2,6-difluoro-4-pyridyl)-[5-methyl-4-(spiro[3.4]octan-3-ylcarbamoyl)thiazol-2-yl]amino]-1-methyl-2-oxo-ethyl]methyl carbonate (compound X.03);

[2-[(2,6-difluoro-4-pyridyl)-[5-methyl-4-(spiro[3.4]octan-3-ylcarbamoyl)thiazol-2-yl]amino]-1-methyl-2-oxo-ethyl]ethyl carbonate (compound X.04);

2-[(2,6-difluoro-4-pyridyl)-(2-hydroxypropanoyl)amino]-5-methyl-N-spiro[3.4]octan-3-yl-thiazole-4-carboxamide (compound X.05);

2-[2-benzyloxypropanoyl-(2,6-difluoro-4-pyridyl)amino]-N-cyclobutyl-5-methyl-thiazole-4-carboxamide (compound X.06);

N-cyclobutyl-2-[(2,6-difluoro-4-pyridyl)-(2-methoxypropanoyl)amino]-5-methyl-thiazole-4-carboxamide (compound X.07);

[2-[(2,6-difluoro-4-pyridyl)-[4-[(2,2-dimethylcyclobutyl)carbamoyl]-5-methyl-thiazol-2-yl]amino]-2-oxo-ethyl] acetate (compound X.08);

2-[(2,6-difluoro-4-pyridyl)-(2-phenylacetyl)amino]-N-(2,2-dimethylcyclobutyl)-5-methyl-thiazole-4-carboxamide (compound X.09);

2-[acetyl-(2,6-difluoro-4-pyridyl)amino]-5-methoxy-N-spiro[3.4]octan-3-yl-thiazole-4-carboxamide (compound X.10);

2-[(2,6-difluoro-4-pyridyl)-(2-methoxyacetyl)amino]-5-methyl-N-spiro[3.4]octan-3-yl-thiazole-4-carboxamide (compound X.11);

N-cyclobutyl-2-[(2,6-difluoro-4-pyridyl)-(2-methoxyacetyl)amino]-5-methyl-thiazole-4-carboxamide (compound X.12);

2-[acetyl-(2,6-difluoro-4-pyridyl)amino]-N-cyclobutyl-5-methyl-thiazole-4-carboxamide (compound X.13);

2-[(2-benzyloxyacetyl)-(2,6-difluoro-4-pyridyl)amino]-N-(2,2-dimethylcyclobutyl)-5-methyl-thiazole-4-carboxamide (compound X.14);

2-[(2,6-difluoro-4-pyridyl)-(2-ethoxyacetyl)amino]-N-(2,2-dimethylcyclobutyl)-5-methyl-thiazole-4-carboxamide (compound X.15);

2-[diethylcarbamoyl-(2,6-difluoro-4-pyridyl)amino]-N-(2,2-dimethylcyclobutyl)-5-methyl-thiazole-4-carboxamide (compound X.16);

2-[(2-chloroacetyl)-(2,6-difluoro-4-pyridyl)amino]-N-(2,2-dimethylcyclobutyl)-5-methyl-thiazole-4-carboxamide (compound X.17);

methyl 3-[(2,6-difluoro-4-pyridyl)-[4-[(2,2-dimethyl cyclobutyl)carbamoyl]-5-methyl-thiazol-2-yl]amino]-3-oxo-propanoate (compound X.18);

2-[(2,6-difluoro-4-pyridyl)-(furan-2-carbonyl)amino]-N-(2,2-dimethyl cyclobutyl)-5-methyl-thiazole-4-carboxamide (compound X.19);

methyl 5-[(2,6-difluoro-4-pyridyl)-[4-[(2,2-dimethyl cyclobutyl)carbamoyl]-5-methyl-thiazol-2-yl]amino]-5-oxo-pentanoate (compound X.20);

2-[(2,6-difluoro-4-pyridyl)-(3,3,3-trifluoropropanoyl)amino]-N-(2,2-dimethyl cyclobutyl)-5-methyl-thiazole-4-carboxamide (compound X.21);

S-isopropyl N-(2,6-difluoro-4-pyridyl)-N-[4-[(2,2-dimethyl cyclobutyl)carbamoyl]-5-methyl-thiazol-2-yl]carbamothioate (compound X.22);

methyl 4-[(2,6-difluoro-4-pyridyl)-[4-[(2,2-dimethyl cyclobutyl)carbamoyl]-5-methyl-thiazol-2-yl]amino]-4-oxo-butanoate (compound X.23);

2-[cyclopropane carbonyl-(2,6-difluoro-4-pyridyl)amino]-N-(2,2-dimethyl cyclobutyl)-5-methyl-thiazole-4-carboxamide (compound X.24);

2-[cyclopropane carbonyl-(2,6-difluoro-4-pyridyl)amino]-N-(2,2-dimethyl cyclobutyl)-5-methyl-thiazole-4-carboxamide (compound X.25);

phenyl N-(2,6-difluoro-4-pyridyl)-N-[4-[(2,2-dimethylcyclobutyl)carbamoyl]-5-methyl-thiazol-2-yl]carbamate (compound X.26);

2-[(2,6-difluoro-4-pyridyl)-(2-fluoroacetyl)amino]-N-(2,2-dimethyl cyclobutyl)-5-methyl-thiazole-4-carboxamide (compound X.27);

2-methoxyethyl N-(2,6-difluoro-4-pyridyl)-N-[4-[(2,2-dimethylcyclobutyl)carbamoyl]-5-methyl-thiazol-2-yl]carbamate (compound X.28);

2-[(2,6-difluoro-4-pyridyl)-(2-methoxyacetyl)amino]-N-(2,2-dimethyl cyclobutyl)-5-methyl-thiazole-4-carboxamide (compound X.29);

ethyl N-(2,6-difluoro-4-pyridyl)-N-[4-[(2,2-dimethylcyclobutyl)carbamoyl]-5-methyl-thiazol-2-yl]carbamate (compound X.30);

2-[(2,6-difluoro-4-pyridyl)-(thiophene-2-carbonyl)amino]-N-(2,2-dimethyl cyclobutyl)-5-methyl-thiazole-4-carboxamide (compound X.31);

methyl N-(2,6-difluoro-4-pyridyl)-N-[4-[(2,2-dimethylcyclobutyl)carbamoyl]-5-methyl-thiazol-2-yl]carbamate (compound X.32);

2-[(2,6-difluoro-4-pyridyl)-formyl-amino]-N-(2,2-dimethyl cyclobutyl)-5-methyl-thiazole-4-carboxamide (compound X.33);

ethyl 2-[(2,6-difluoro-4-pyridyl)-[4-[(2,2-dimethylcyclobutyl)carbamoyl]-5-methyl-thiazol-2-yl]amino]-2-oxo-acetate (compound X.34);

2-[benzoyl-(2,6-difluoro-4-pyridyl)amino]-N-(2,2-dimethylcyclobutyl)-5-methyl-thiazole-4-carboxamide (compound X.35);

2-[acetyl-(2,6-difluoro-4-pyridyl)amino]-N-(2,2-dimethyl cyclobutyl)-5-methyl-thiazole-4-carboxamide (compound X.36);

2-[acetyl-(2,6-difluoro-4-pyridyl)amino]-5-methyl-N-spiro [3.4]octan-3-yl-thiazole-4-carboxamide (compound X.37); and 2-[(2,6-difluoro-4-pyridyl)-(2-methylpropanoyl)amino]-N-(2,2-dimethylcyclobutyl)-5-methyl-thiazole-4-carboxamide (X.38).

More preferably, component (A) is a compound selected from:

[2-[(2,6-difluoro-4-pyridyl)-[5-methyl-4-(spiro[3.4]octan-3-ylcarbamoyl)thiazol-2-yl]amino]-1-methyl-2-oxo-ethyl]acetate (compound X.01);

[2-[(2,6-difluoro-4-pyridyl)-[5-methyl-4-(spiro[3.4]octan-3-ylcarbamoyl)thiazol-2-yl]amino]-1-methyl-2-oxo-ethyl]ethyl carbonate (compound X.04);

N-cyclobutyl-2-[(2,6-difluoro-4-pyridyl)-(2-methoxypropanoyl)amino]-5-methyl-thiazole-4-carboxamide (compound X.07);

2-[(2,6-difluoro-4-pyridyl)-(2-methoxyacetyl)amino]-5-methyl-N-spiro[3.4]octan-3-yl-thiazole-4-carboxamide (compound X.11);

N-cyclobutyl-2-[(2,6-difluoro-4-pyridyl)-(2-methoxyacetyl)amino]-5-methyl-thiazole-4-carboxamide (compound X.12);

2-[acetyl-(2,6-difluoro-4-pyridyl)amino]-N-cyclobutyl-5-methyl-thiazole-4-carboxamide (compound X.13);

2-[(2-benzyloxyacetyl)-(2,6-difluoro-4-pyridyl)amino]-N-(2,2-dimethylcyclobutyl)-5-methyl-thiazole-4-carboxamide (compound X.14);

2-[(2-chloroacetyl)-(2,6-difluoro-4-pyridyl)amino]-N-(2,2-dimethylcyclobutyl)-5-methyl-thiazole-4-carboxamide (compound X.17);

methyl 3-[(2,6-difluoro-4-pyridyl)-[4-[(2,2-dimethyl cyclobutyl)carbamoyl]-5-methyl-thiazol-2-yl]amino]-3-oxo-propanoate (compound X.18);

2-[(2,6-difluoro-4-pyridyl)-(furan-2-carbonyl)amino]-N-(2,2-dimethyl cyclobutyl)-5-methyl-thiazole-4-carboxamide (compound X.19);

S-isopropyl N-(2,6-difluoro-4-pyridyl)-N-[4-[(2,2-dimethyl cyclobutyl)carbamoyl]-5-methyl-thiazol-2-yl]carbamothioate (compound X.22);

2-[cyclopropane carbonyl-(2,6-difluoro-4-pyridyl)amino]-N-(2,2-dimethyl cyclobutyl)-5-methyl-thiazole-4-carboxamide (compound X.24);

phenyl N-(2,6-difluoro-4-pyridyl)-N-[4-[(2,2-dimethylcyclobutyl)carbamoyl]-5-methyl-thiazol-2-yl]carbamate (compound X.26);

2-[(2,6-difluoro-4-pyridyl)-(2-methoxyacetyl)amino]-N-(2,2-dimethyl cyclobutyl)-5-methyl-thiazole-4-carboxamide (compound X.29);

2-[(2,6-difluoro-4-pyridyl)-(thiophene-2-carbonyl)amino]-N-(2,2-dimethyl cyclobutyl)-5-methyl-thiazole-4-carboxamide (compound X.31);

2-[(2,6-difluoro-4-pyridyl)-formyl-amino]-N-(2,2-dimethyl cyclobutyl)-5-methyl-thiazole-4-carboxamide (compound X.33);

ethyl 2-[(2,6-difluoro-4-pyridyl)-[4-[(2,2-dimethylcyclobutyl)carbamoyl]-5-methyl-thiazol-2-yl]amino]-2-oxo-acetate (compound X.34);

2-[benzoyl-(2,6-difluoro-4-pyridyl)amino]-N-(2,2-dimethylcyclobutyl)-5-methyl-thiazole-4-carboxamide (compound X.35);

2-[acetyl-(2,6-difluoro-4-pyridyl)amino]-N-(2,2-dimethyl cyclobutyl)-5-methyl-thiazole-4-carboxamide (compound X.36);

2-[acetyl-(2,6-difluoro-4-pyridyl)amino]-5-methyl-N-spiro[3.4]octan-3-yl-thiazole-4-carboxamide (compound X.37); and 2-[(2,6-difluoro-4-pyridyl)-(2-methylpropanoyl)amino]-N-(2,2-dimethylcyclobutyl)-5-methyl-thiazole-4-carboxamide (X.38).

Even more preferably, component (A) is a compound selected from:

[2-[(2,6-difluoro-4-pyridyl)-[5-methyl-4-(spiro[3.4]octan-3-ylcarbamoyl)thiazol-2-yl]amino]-1-methyl-2-oxo-ethyl]acetate (compound X.01);

[2-[(2,6-difluoro-4-pyridyl)-[5-methyl-4-(spiro[3.4]octan-3-ylcarbamoyl)thiazol-2-yl]amino]-1-methyl-2-oxo-ethyl]ethyl carbonate (compound X.04);

2-[(2,6-difluoro-4-pyridyl)-(2-methoxyacetyl)amino]-5-methyl-N-spiro[3.4]octan-3-yl-thiazole-4-carboxamide (compound X.11);

N-cyclobutyl-2-[(2,6-difluoro-4-pyridyl)-(2-methoxyacetyl)amino]-5-methyl-thiazole-4-carboxamide (compound X.12);

2-[acetyl-(2,6-difluoro-4-pyridyl)amino]-N-cyclobutyl-5-methyl-thiazole-4-carboxamide (compound X.13);

2-[(2-chloroacetyl)-(2,6-difluoro-4-pyridyl)amino]-N-(2,2-dimethylcyclobutyl)-5-methyl-thiazole-4-carboxamide (compound X.17);

methyl 3-[(2,6-difluoro-4-pyridyl)-[4-[(2,2-dimethyl cyclobutyl)carbamoyl]-5-methyl-thiazol-2-yl]amino]-3-oxo-propanoate (compound X.18);

2-[(2,6-difluoro-4-pyridyl)-(furan-2-carbonyl)amino]-N-(2,2-dimethyl cyclobutyl)-5-methyl-thiazole-4-carboxamide (compound X.19);

2-[cyclopropane carbonyl-(2,6-difluoro-4-pyridyl)amino]-N-(2,2-dimethyl cyclobutyl)-5-methyl-thiazole-4-carboxamide (compound X.24);

2-[(2,6-difluoro-4-pyridyl)-(2-methoxyacetyl)amino]-N-(2,2-dimethyl cyclobutyl)-5-methyl-thiazole-4-carboxamide (compound X.29);

2-[(2,6-difluoro-4-pyridyl)-formyl-amino]-N-(2,2-dimethyl cyclobutyl)-5-methyl-thiazole-4-carboxamide (compound X.33);

ethyl 2-[(2,6-difluoro-4-pyridyl)-[4-[(2,2-dimethylcyclobutyl)carbamoyl]-5-methyl-thiazol-2-yl]amino]-2-oxo-acetate (compound X.34);

2-[benzoyl-(2,6-difluoro-4-pyridyl)amino]-N-(2,2-dimethylcyclobutyl)-5-methyl-thiazole-4-carboxamide (compound X.35);

2-[acetyl-(2,6-difluoro-4-pyridyl)amino]-N-(2,2-dimethyl cyclobutyl)-5-methyl-thiazole-4-carboxamide (compound X.36);

2-[acetyl-(2,6-difluoro-4-pyridyl)amino]-5-methyl-N-spiro[3.4]octan-3-yl-thiazole-4-carboxamide (compound X.37); and 2-[(2,6-difluoro-4-pyridyl)-(2-methylpropanoyl)amino]-N-(2,2-dimethylcyclobutyl)-5-methyl-thiazole-4-carboxamide (X.38).

More preferably still, component (A) is a compound selected from:

[2-[(2,6-difluoro-4-pyridyl)-[5-methyl-4-(spiro[3.4]octan-3-ylcarbamoyl)thiazol-2-yl]amino]-1-methyl-2-oxo-ethyl]acetate (compound X.01);

2-[(2,6-difluoro-4-pyridyl)-(2-methoxyacetyl)amino]-5-methyl-N-spiro[3.4]octan-3-yl-thiazole-4-carboxamide (compound X.11);

N-cyclobutyl-2-[(2,6-difluoro-4-pyridyl)-(2-methoxyacetyl)amino]-5-methyl-thiazole-4-carboxamide (compound X.12);

2-[acetyl-(2,6-difluoro-4-pyridyl)amino]-N-cyclobutyl-5-methyl-thiazole-4-carboxamide (compound X.13);

2-[(2,6-difluoro-4-pyridyl)-(furan-2-carbonyl)amino]-N-(2,2-dimethyl cyclobutyl)-5-methyl-thiazole-4-carboxamide (compound X.19);

2-[(2,6-difluoro-4-pyridyl)-(2-methoxyacetyl)amino]-N-(2,2-dimethyl cyclobutyl)-5-methyl-thiazole-4-carboxamide (compound X.29);

2-[(2,6-difluoro-4-pyridyl)-formyl-amino]-N-(2,2-dimethyl cyclobutyl)-5-methyl-thiazole-4-carboxamide (compound X.33);

2-[benzoyl-(2,6-difluoro-4-pyridyl)amino]-N-(2,2-dimethylcyclobutyl)-5-methyl-thiazole-4-carboxamide (compound X.35);

2-[acetyl-(2,6-difluoro-4-pyridyl)amino]-N-(2,2-dimethyl cyclobutyl)-5-methyl-thiazole-4-carboxamide (compound X.36);

2-[acetyl-(2,6-difluoro-4-pyridyl)amino]-5-methyl-N-spiro[3.4]octan-3-yl-thiazole-4-carboxamide (compound X.37); and 2-[(2,6-difluoro-4-pyridyl)-(2-methylpropanoyl)amino]-N-(2,2-dimethylcyclobutyl)-5-methyl-thiazole-4-carboxamide (X.38).

TABLE X
| Compound number | Compound structure | IUPAC name |
|---|---|---|
| X.01 | 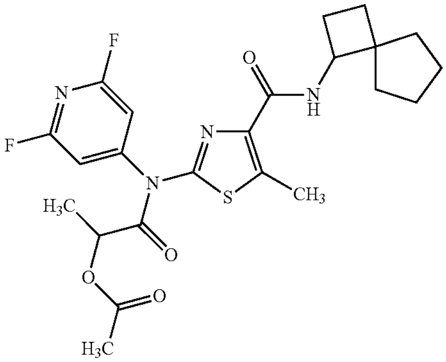 [SMILES: CC(=O)OC(C)C(=O)N(c1cc(F)nc(F)c1)c1nc(C(=O)NC2CCC23CCCC3)c(C)s1] | [2-[(2,6-difluoro-4-pyridyl)-[5-methyl-4-(spiro[3.4]octan-3-ylcarbamoyl)thiazol-2-yl]amino]-1-methyl-2-oxo-ethyl] acetate |
| X.02 | 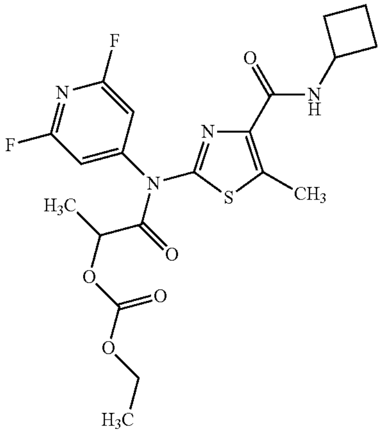 [SMILES: CCOC(=O)OC(C)C(=O)N(c1cc(F)nc(F)c1)c1nc(C(=O)NC2CCC2)c(C)s1] | [2-[4-(cyclobutylcarbamoyl)-5-methyl-thiazol-2-yl]-(2,6-difluoro-4-pyridyl)amino]-1-methyl-2-oxo-ethyl]ethyl carbonate |
| X.03 | 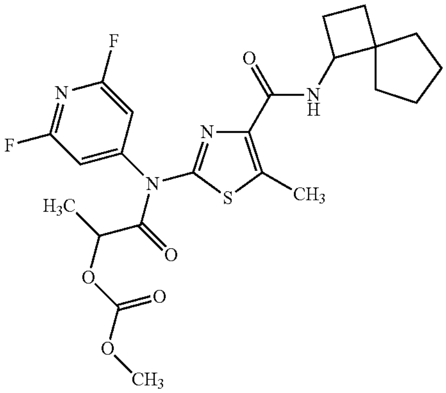 [SMILES: COC(=O)OC(C)C(=O)N(c1cc(F)nc(F)c1)c1nc(C(=O)NC2CCC23CCCC3)c(C)s1] | [2-[(2,6-difluoro-4-pyridyl)-[5-methyl-4-(spiro[3.4]octan-3-ylcarbamoyl)thiazol-2-yl]amino]-1-methyl-2-oxo-ethyl]methyl carbonate |

TABLE X-continued

| Compound number | Compound structure | IUPAC name |
|---|---|---|
| X.04 | 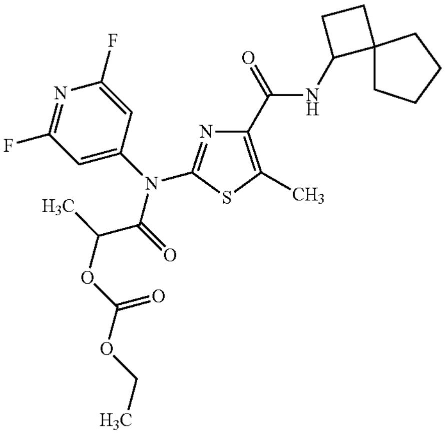 [SMILES: CCOC(=O)OC(C)C(=O)N(c1cc(F)nc(F)c1)c1nc(C(=O)NC2CCC23CCCC3)c(C)s1] | [2-[(2,6-difluoro-4-pyridyl)-[5-methyl-4-(spiro[3.4]octan-3-ylcarbamoyl)thiazol-2-yl]amino]-1-methyl-2-oxo-ethyl]ethyl carbonate |
| X.05 | 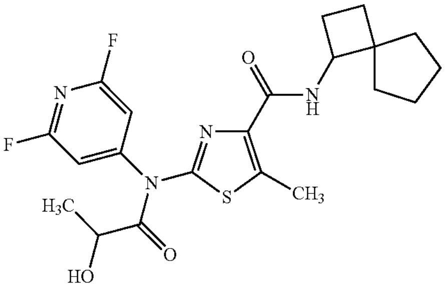 [SMILES: Cc1sc(N(C(=O)C(C)O)c2cc(F)nc(F)c2)nc1C(=O)NC1CCC12CCCC2] | 2-[(2,6-difluoro-4-pyridyl)-(2-hydroxypropanoyl)amino]-5-methyl-N-spiro[3.4]octan-3-yl-thiazole-4-carboxamide |
| X.06 | 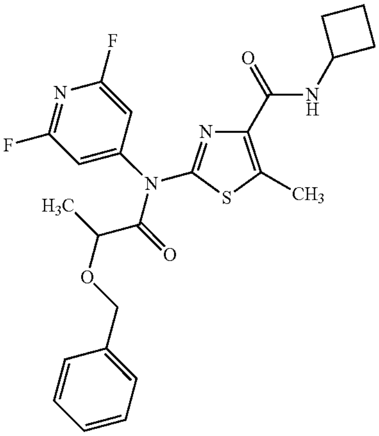 [SMILES: Cc1sc(N(C(=O)C(C)OCc2ccccc2)c2cc(F)nc(F)c2)nc1C(=O)NC1CCC1] | 2-[2-benzyloxypropanoyl-(2,6-difluoro-4-pyridyl)amino]-N-cyclobutyl-5-methyl-thiazole-4-carboxamide |
| X.07 | 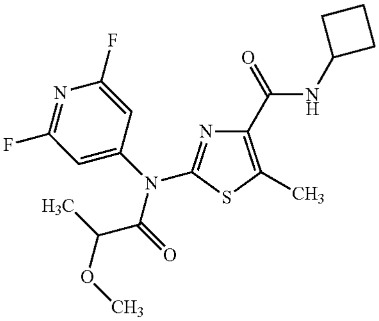 [SMILES: COC(C)C(=O)N(c1cc(F)nc(F)c1)c1nc(C(=O)NC2CCC2)c(C)s1] | N-cyclobutyl-2-[(2,6-difluoro-4-pyridyl)-(2-methoxypropanoyl)amino]-5-methyl-thiazole-4-carboxamide |

TABLE X-continued

| Compound number | Compound structure | IUPAC name |
|---|---|---|
| X.08 | 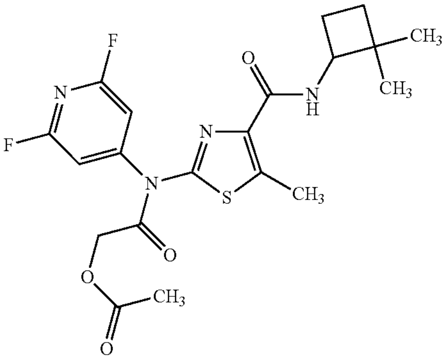 [SMILES: CC(=O)OCC(=O)N(c1cc(F)nc(F)c1)c1nc(C(=O)NC2CCC2(C)C)c(C)s1] | [2-[(2,6-difluoro-4-pyridyl)-[4-[(2,2-dimethylcyclobutyl)carbamoyl]-5-methyl-thiazol-2-yl]amino]-2-oxo-ethyl]acetate |
| X.09 | 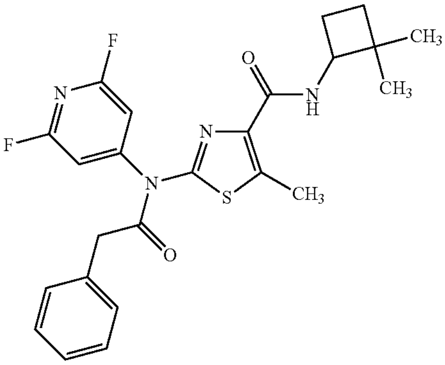 [SMILES: Cc1sc(N(C(=O)Cc2ccccc2)c2cc(F)nc(F)c2)nc1C(=O)NC1CCC1(C)C] | 2-[(2,6-difluoro-4-pyridyl)-(2-phenylacetyl)amino]-N-(2,2-dimethylcyclobutyl)-5-methyl-thiazole-4-carboxamide |
| X.10 | 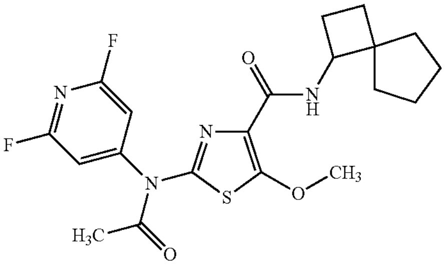 [SMILES: COc1sc(N(C(C)=O)c2cc(F)nc(F)c2)nc1C(=O)NC1CCC12CCCC2] | 2-[acetyl-(2,6-difluoro-4-pyridyl)amino]-5-methoxy-N-spiro[3.4]octan-3-yl-thiazole-4-carboxamide |
| X.11 | 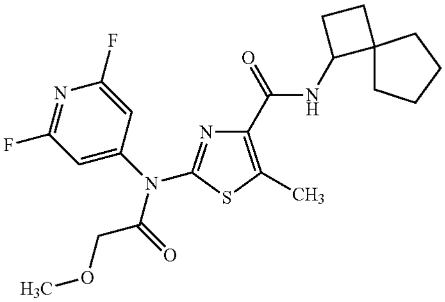 [SMILES: COCC(=O)N(c1cc(F)nc(F)c1)c1nc(C(=O)NC2CCC23CCCC3)c(C)s1] | 2-[(2,6-difluoro-4-pyridyl)-(2-methoxyacetyl)amino]-5-methyl-N-spiro[3.4]octan-3-yl-thiazole-4-carboxamide |

TABLE X-continued

| Compound number | Compound structure | IUPAC name |
|---|---|---|
| X.12 | 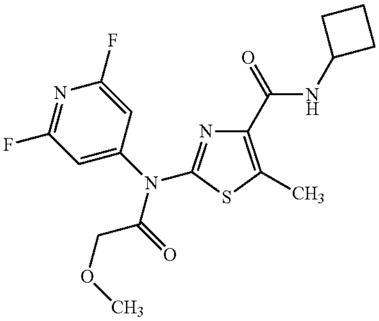 [SMILES: COCC(=O)N(c1cc(F)nc(F)c1)c1nc(C(=O)NC2CCC2)c(C)s1] | N-cyclobutyl-2-[(2,6-difluoro-4-pyridyl)-(2-methoxyacetyl)amino]-5-methyl-thiazole-4-carboxamide |
| X.13 | 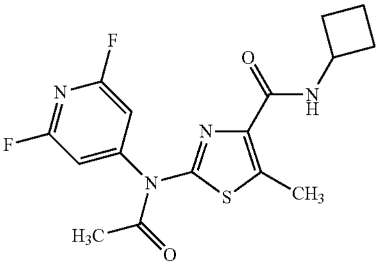 [SMILES: CC(=O)N(c1cc(F)nc(F)c1)c1nc(C(=O)NC2CCC2)c(C)s1] | 2-[acetyl-(2,6-difluoro-4-pyridyl)amino]-N-cyclobutyl-5-methyl-thiazole-4-carboxamide |
| X.14 | 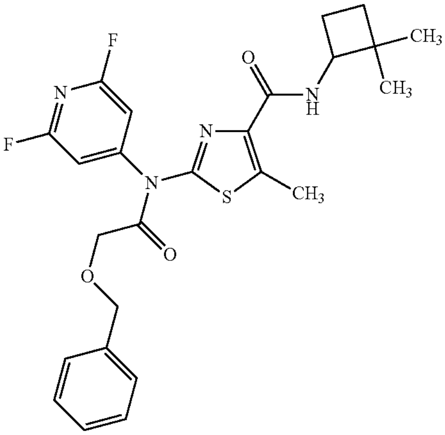 [SMILES: Cc1sc(N(C(=O)COCc2ccccc2)c2cc(F)nc(F)c2)nc1C(=O)NC1CCC1(C)C] | 2-[(2-benzyloxyacetyl)-(2,6-difluoro-4-pyridyl)amino]-N-(2,2-dimethylcyclobutyl)-5-methyl-thiazole-4-carboxamide |
| X.15 | 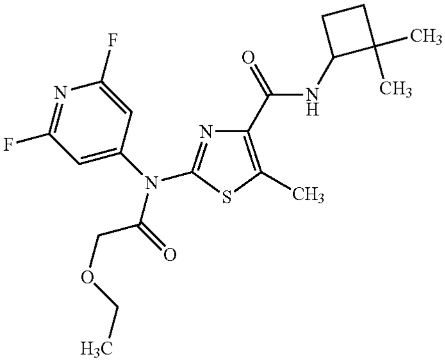 [SMILES: CCOCC(=O)N(c1cc(F)nc(F)c1)c1nc(C(=O)NC2CCC2(C)C)c(C)s1] | 2-[(2,6-difluoro-4-pyridyl)-(2-ethoxyacetyl)amino]-N-(2,2-dimethylcyclobutyl)-5-methyl-thiazole-4-carboxamide |

TABLE X-continued

| Compound number | Compound structure | IUPAC name |
| --- | --- | --- |
| X.16 | 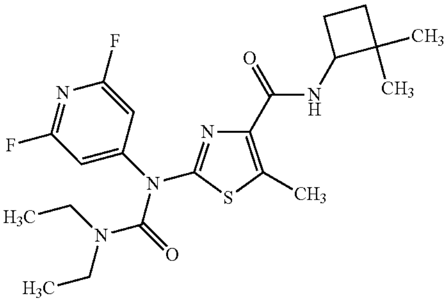 [SMILES: CCN(CC)C(=O)N(c1cc(F)nc(F)c1)c1nc(C(=O)NC2CCC2(C)C)c(C)s1] | 2-[diethylcarbamoyl-(2,6-difluoro-4-pyridyl)amino]-N-(2,2-dimethylcyclobutyl)-5-methyl-thiazole-4-carboxamide |
| X.17 | 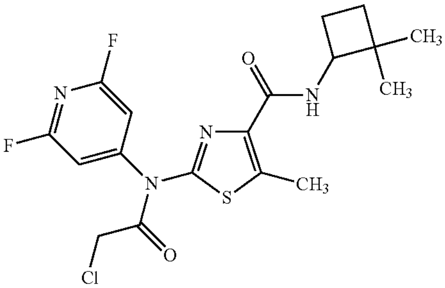 [SMILES: Cc1sc(N(C(=O)CCl)c2cc(F)nc(F)c2)nc1C(=O)NC1CCC1(C)C] | 2-[(2-chloroacetyl)-(2,6-difluoro-4-pyridyl)amino]-N-(2,2-dimethylcyclobutyl)-5-methyl-thiazole-4-carboxamide |
| X.18 | 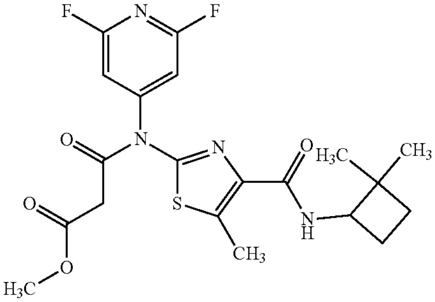 [SMILES: COC(=O)CC(=O)N(c1cc(F)nc(F)c1)c1nc(C(=O)NC2CCC2(C)C)c(C)s1] | methyl 3-[(2,6-difluoro-4-pyridyl)-[4-[(2,2-dimethyl cyclobutyl)carbamoyl]-5-methyl-thiazol-2-yl]amino]-3-oxo-propanoate |
| X.19 | 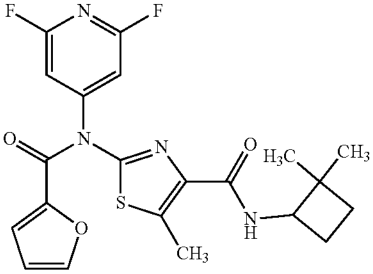 [SMILES: Cc1sc(N(C(=O)c2ccco2)c2cc(F)nc(F)c2)nc1C(=O)NC1CCC1(C)C] | 2-[(2,6-difluoro-4-pyridyl)-(furan-2-carbonyl)amino]-N-(2,2-dimethyl cyclobutyl)-5-methyl-thiazole-4-carboxamide |
| X.20 | 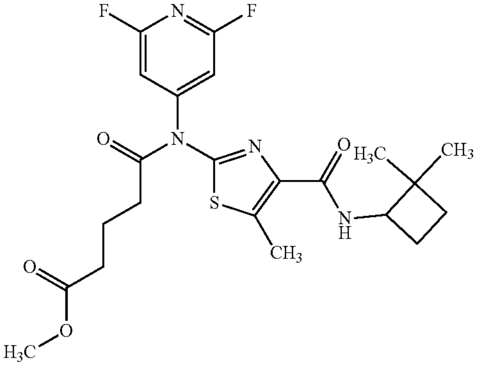 [SMILES: COC(=O)CCCC(=O)N(c1cc(F)nc(F)c1)c1nc(C(=O)NC2CCC2(C)C)c(C)s1] | methyl 5-[(2,6-difluoro-4-pyridyl)-[4-[(2,2-dimethyl cyclobutyl)carbamoyl]-5-methyl-thiazol-2-yl]amino]-5-oxo-pentanoate |

TABLE X-continued

| Compound number | Compound structure | IUPAC name |
| --- | --- | --- |
| X.21 | 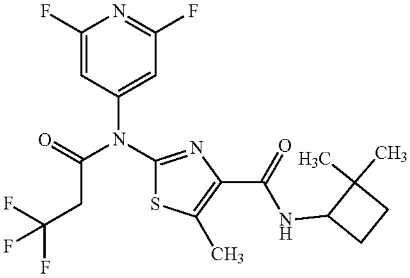 [SMILES: Cc1sc(N(C(=O)CC(F)(F)F)c2cc(F)nc(F)c2)nc1C(=O)NC1CCC1(C)C] | 2-[(2,6-difluoro-4-pyridyl)-(3,3,3-trifluoropropanoyl)amino]-N-(2,2-dimethyl cyclobutyl)-5-methyl-thiazole-4-carboxamide |
| X.22 | 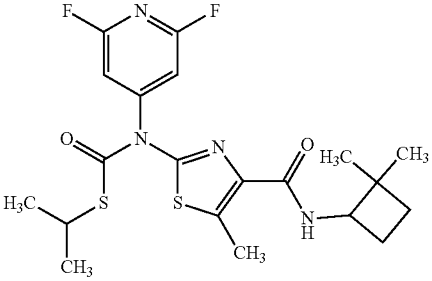 [SMILES: Cc1sc(N(C(=O)SC(C)C)c2cc(F)nc(F)c2)nc1C(=O)NC1CCC1(C)C] | S-isopropyl N-(2,6-difluoro-4-pyridyl)-N-[4-[(2,2-dimethyl cyclobutyl)carbamoyl]-5-methyl-thiazol-2-yl]carbamothioate |
| X.23 | 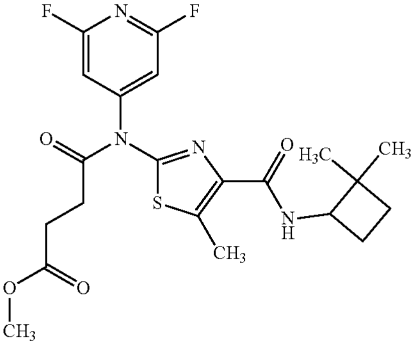 [SMILES: COC(=O)CCC(=O)N(c1cc(F)nc(F)c1)c1nc(C(=O)NC2CCC2(C)C)c(C)s1] | methyl 4-[(2,6-difluoro-4-pyridyl)-[4-[(2,2-dimethyl cyclobutyl)carbamoyl]-5-methyl-thiazol-2-yl]amino]-4-oxo-butanoate |
| X.24 | 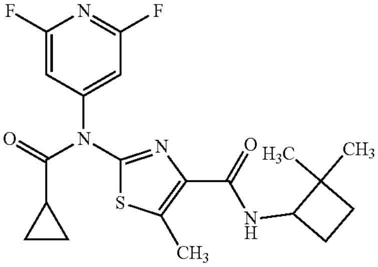 [SMILES: Cc1sc(N(C(=O)C2CC2)c2cc(F)nc(F)c2)nc1C(=O)NC1CCC1(C)C] | 2-[cyclopropane carbonyl-(2,6-difluoro-4-pyridyl)amino]-N-(2,2-dimethyl cyclobutyl)-5-methyl-thiazole-4-carboxamide |
| X.25 | 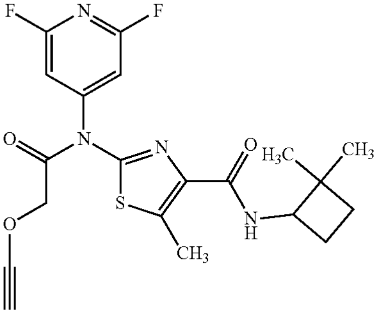 [SMILES: C#COCC(=O)N(c1cc(F)nc(F)c1)c1nc(C(=O)NC2CCC2(C)C)c(C)s1] | prop-2-ynyl N-(2,6-difluoro-4-pyridyl)-N-[4-[(2,2-dimethyl cyclobutyl)carbamoyl]-5-methyl-thiazol-2-yl]carbamate |

TABLE X-continued

| Compound number | Compound structure | IUPAC name |
|---|---|---|
| X.26 | 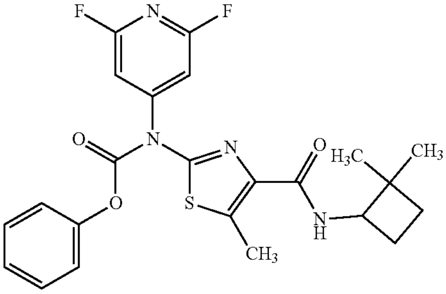 [SMILES: Cc1sc(N(C(=O)Oc2ccccc2)c2cc(F)nc(F)c2)nc1C(=O)NC1CCC1(C)C] | phenyl N-(2,6-difluoro-4-pyridyl)-N-[4-[(2,2-dimethylcyclobutyl)carbamoyl]-5-methyl-thiazol-2-yl]carbamate |
| X.27 | 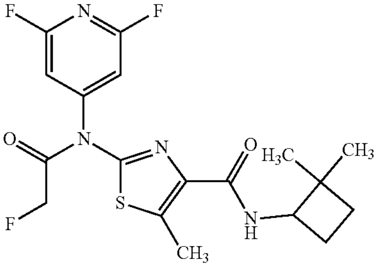 [SMILES: Cc1sc(N(C(=O)CF)c2cc(F)nc(F)c2)nc1C(=O)NC1CCC1(C)C] | 2-[(2,6-difluoro-4-pyridyl)-(2-fluoroacetyl)amino]-N-(2,2-dimethyl cyclobutyl)-5-methyl-thiazole-4-carboxamide |
| X.28 | 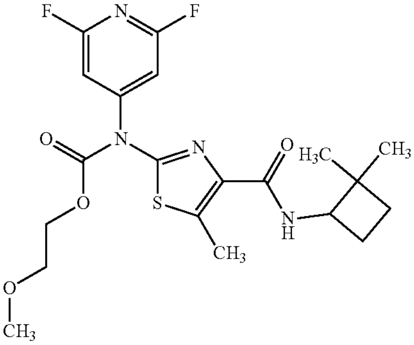 [SMILES: COCCOC(=O)N(c1cc(F)nc(F)c1)c1nc(C(=O)NC2CCC2(C)C)c(C)s1] | 2-methoxyethyl N-(2,6-difluoro-4-pyridyl)-N-[4-[(2,2-dimethylcyclobutyl)carbamoyl]-5-methyl-thiazol-2-yl]carbamate |
| X.29 | 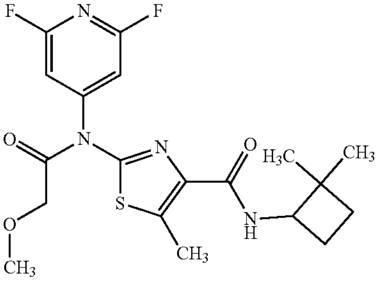 [SMILES: COCC(=O)N(c1cc(F)nc(F)c1)c1nc(C(=O)NC2CCC2(C)C)c(C)s1] | 2-[(2,6-difluoro-4-pyridyl)-(2-methoxyacetyl)amino]-N-(2,2-dimethyl cyclobutyl)-5-methyl-thiazole-4-carboxamide |
| X.30 | 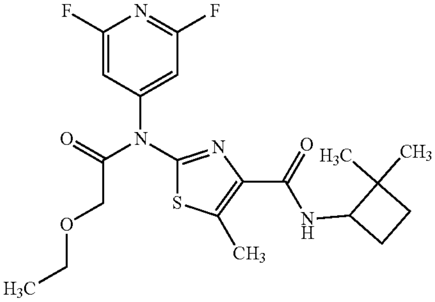 [SMILES: CCOCC(=O)N(c1cc(F)nc(F)c1)c1nc(C(=O)NC2CCC2(C)C)c(C)s1] | ethyl N-(2,6-difluoro-4-pyridyl)-N-[4-[(2,2-dimethylcyclobutyl)carbamoyl]-5-methyl-thiazol-2-yl]carbamate |

TABLE X-continued

| Compound number | Compound structure | IUPAC name |
| --- | --- | --- |
| X.31 | 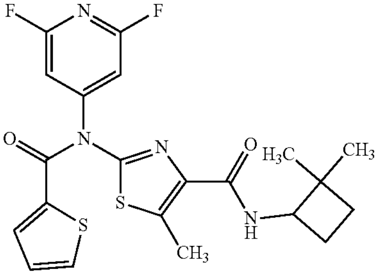 [SMILES: Cc1sc(N(C(=O)c2cccs2)c2cc(F)nc(F)c2)nc1C(=O)NC1CCC1(C)C] | 2-[(2,6-difluoro-4-pyridyl)-(thiophene-2-carbonyl)amino]-N-(2,2-dimethyl cyclobutyl)-5-methyl-thiazole-4-carboxamide |
| X.32 | 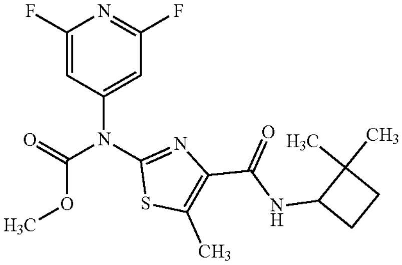 [SMILES: COC(=O)N(c1cc(F)nc(F)c1)c1nc(C(=O)NC2CCC2(C)C)c(C)s1] | methyl N-(2,6-difluoro-4-pyridyl)-N-[4-[(2,2-dimethylcyclobutyl)carbamoyl]-5-methyl-thiazol-2-yl]carbamate |
| X.33 | 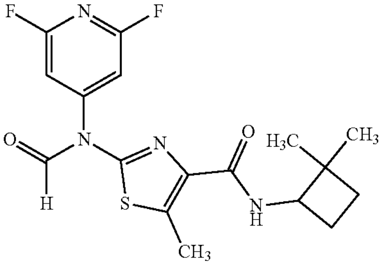 [SMILES: Cc1sc(N(C=O)c2cc(F)nc(F)c2)nc1C(=O)NC1CCC1(C)C] | 2-[(2,6-difluoro-4-pyridyl)-formyl-amino]-N-(2,2-dimethyl cyclobutyl)-5-methyl-thiazole-4-carboxamide |
| X.34 | 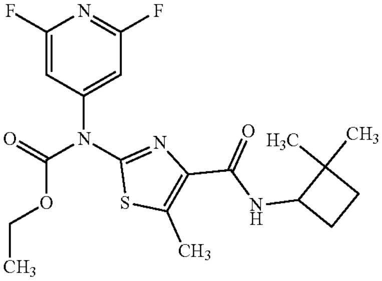 [SMILES: CCOC(=O)N(c1cc(F)nc(F)c1)c1nc(C(=O)NC2CCC2(C)C)c(C)s1] | ethyl 2-[(2,6-difluoro-4-pyridyl)-[4-[(2,2-dimethylcyclobutyl)carbamoyl]-5-methyl-thiazol-2-yl]amino]-2-oxo-acetate |
| X.35 | 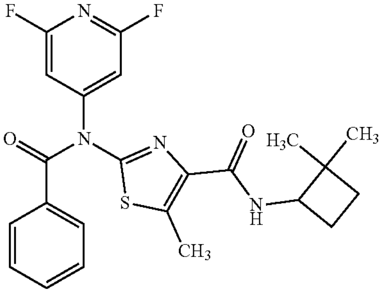 [SMILES: Cc1sc(N(C(=O)c2ccccc2)c2cc(F)nc(F)c2)nc1C(=O)NC1CCC1(C)C] | 2-[benzoyl-(2,6-difluoro-4-pyridyl)amino]-N-(2,2-dimethylcyclobutyl)-5-methyl-thiazole-4-carboxamide |

TABLE X-continued

| Compound number | Compound structure | IUPAC name |
|---|---|---|
| X.36 | 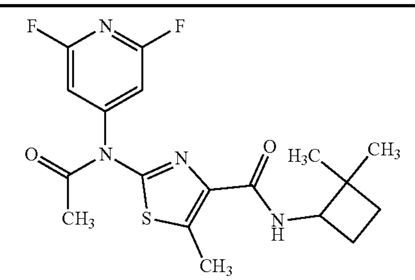 | 2-[acetyl-(2,6-difluoro-4-pyridyl)amino]-N-(2,2-dimethyl cyclobutyl)-5-methyl-thiazole-4-carboxamide |
| X.37 | 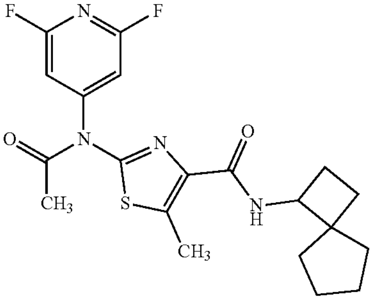 [SMILES: CC(=O)N(c1cc(F)nc(F)c1)c1nc(C(=O)NC2CCC23CCCC3)c(C)s1] | 2-[acetyl-(2,6-difluoro-4-pyridyl)amino]-5-methyl-N-spiro[3.4]octan-3-yl-thiazole-4-carboxamide |
| X.38 | 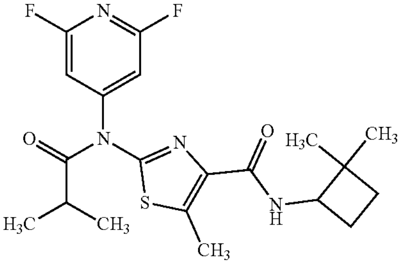 [SMILES: Cc1sc(N(C(=O)C(C)C)c2cc(F)nc(F)c2)nc1C(=O)NC1CCC1(C)C] | 2-[(2,6-difluoro-4-pyridyl)-(2-methylpropanoyl)amino]-N-(2,2-dimethylcyclobutyl)-5-methyl-thiazole-4-carboxamide |

Preferably, component (B) is a compound selected from the group consisting of:
azoxystrobin, trifloxystrobin, pyraclostrobin, picoxystrobin, coumoxystrobin, metyltetraprole, cyproconazole, tebuconazole, difenoconazole, hexaconazole, propiconazole, fenhexamid, prothioconazole, mefentrifluconazole, prochloraz, fenpropidin, fenpropimorph, fluxapyroxad, fluopyram, isopyrazam, sedaxane, benzovindiflupyr, pydiflumetofen, isoflucypram, bixafen, penthiopyrad, inpyrfluxam, isofetamid, pyrapropoyne, fluindapyr, fenpicoxamid, florylpicoxamid, acibenzolar-S-methyl, trinexepac-ethyl, fosetyl-aluminium, chlorothalonil, mancozeb, mandipropamid, oxathiapiprolin, fluazinam, fludioxonil, cyprodinil, metalaxyl-M, aminopyrifen, folpet, ipflufenoquin, quinofumelin, tebufloquin, tolprocarb, tricyclazole, pyroquilon, cyflufenamid, metrafenone, N'-[2-chloro-4-(2-fluorophenoxy)-5-methyl-phenyl]-N-ethyl-N-methyl-formamidine, N'-[4-(2-bromophenoxy)-5-chloro-2-methyl-phenyl]-N-ethyl-N-methyl-formamidine, N-(1-benzyl-1,3-dimethyl-butyl)-8-fluoro-quinoline-3-carboxamide, N-(1-benzyl-3,3,3-trifluoro-1-methyl-propyl)-8-fluoro-quinoline-3-carboxamide, N-(1-benzyl-3-chloro-1-methyl-but-3-enyl)-8-fluoro-quinoline-3-carboxamide, 1-(6,7-dimethylpyrazolo[1,5-a]pyridin-3-yl)-4,4,5-trifluoro-3,3-dimethyl-isoquinoline, 4,4-difluoro-3,3-dimethyl-1-(7-methylpyrazolo[1,5-a]pyridin-3-yl)isoquinoline, 1-(6,7-dimethylpyrazolo[1,5-a]pyridin-3-yl)-4,4,6-trifluoro-3,3-dimethyl-isoquinoline, 1-(4,5-dimethylbenzimidazol-1-yl)-4,4,5-trifluoro-3,3-dimethyl-isoquinoline, 1-(4,5-dimethylbenzimidazol-1-yl)-4,4-difluoro-3,3-dimethyl-isoquinoline, 6-chloro-4,4-difluoro-3,3-dimethyl-1-(4-methylbenzimidazol-1-yl)isoquinoline, N'-[5-bromo-2-methyl-6-(1-methyl-2-propoxy-ethoxy)-3-pyridyl]-N-ethyl-N-methyl-formamidine, N'-[5-chloro-2-methyl-6-(1-methyl-2-propoxy-ethoxy)-3-pyridyl]-N-ethyl-N-methyl-formamidine, N'-[5-bromo-2-methyl-6-(1-methyl-2-propoxy-ethoxy)-3-pyridyl]-N-isopropyl-N-methyl-formamidine, N-isopropyl-N'-[5-methoxy-2-methyl-4-(2,2,2-trifluoro-1-hydroxy-1-phenyl-ethyl)phenyl]-N-methyl-formamidineN-methoxy-N-[[4-[5-(trifluoromethyl)-1,2,4-oxadiazol-3-yl]phenyl]methyl]cyclopropanecarboxamide, N,2-dimethoxy-N-[[4-[5-(trifluoromethyl)-1,2,4-oxadiazol-3-yl]phenyl]methyl]propanamide, N-ethyl-2-methyl-N-[[4-[5-(trifluoromethyl)-1,2,4-oxadiazol-3-yl]phenyl]methyl]propanamide, 1-methoxy-3-methyl-1-[[4-[5-(trifluoromethyl)-1,2,4-oxadiazol-3-yl]phenyl]methyl]urea, 1,3-dimethoxy-1-[[4-[5-(trifluoromethyl)-1,2,4-oxadiazol-3-yl]phenyl]methyl]urea, 3-ethyl-1-methoxy-1-[[4-[5-(trifluoromethyl)-1,2,4-oxadiazol-3-yl]phenyl]methyl]urea, ethyl 1-[[4-[5-(trifluoromethyl)-1,2,4-oxadiazol-3-yl]phenyl]methyl]pyrazole-4-carboxylate, N,N-dimethyl-1-[[4-[5-(trifluoromethyl)-1,2,4-oxadiazol-3-yl]phenyl]methyl]-1,2,4-triazol-3-amine, methyl (Z)-3-methoxy-2-[2-methyl-5-[3-(trifluoromethyl)pyrazol-1-yl]phenoxy]prop-2-enoate, methyl (Z)-3-methoxy-2-[2-methyl-5-(3-propylpyrazol-1-yl)phenoxy]prop-2-enoate, methyl (Z)-2-[5-(3-isopropylpyrazol-1-yl)-2-methyl-phenoxy]-3-methoxy-prop-2-enoate, methyl (Z)-3-methoxy-2-[2-methyl-5-(4-propyltriazol-2-yl)phenoxy]prop-2-enoate, methyl (Z)-3-methoxy-2-[2-methyl-5-[4-(trifluoromethyl)triazol-2-yl]phenoxy]prop-2-enoate, methyl (Z)-2-(5-cyclohexyl-2-methyl-phenoxy)-3-methoxy-prop-2-enoate, methyl (Z)-2-(5-cyclopentyl-2-methyl-phenoxy)-3-methoxy-prop-2-enoate, methyl (Z)-2-[5-(4-cyclohexylthiazol-2-yl)-2-methyl-phenoxy]-3-methoxy-prop-2-enoate, methyl (Z)-2-[5-[4-(ethoxymethyl)thiazol-2-yl]-2-methyl-phenoxy]-3-methoxy-prop-2-enoate, methyl (Z)-2-[5-(4-bromothiazol-2-yl)-2-methyl-phenoxy]-3-methoxy-prop-2-enoate, and methyl (Z)-3-methoxy-2-[2-methyl-5-[5-(trifluoromethyl)thiazol-2-yl]phenoxy]prop-2-enoate.

In another set of embodiments, component (B) is selected from the group consisting of:

azoxystrobin, trifloxystrobin, pyraclostrobin, picoxystrobin, coumoxystrobin, metyltetraprole, cyproconazole, tebuconazole, difenoconazole, hexaconazole, propiconazole, fenhexamid, prothioconazole, mefentrifluconazole, prochloraz, fenpropidin, fenpropimorph, fluxapyroxad, fluopyram, isopyrazam, sedaxane, benzovindiflupyr, pydiflumetofen, isoflucypram, bixafen, penthiopyrad, inpyrfluxam, isofetamid, pyrapropoyne, fluindapyr, fenpicoxamid, florylpicoxamid, acibenzolar-S-methyl, trinexepac-ethyl, fosetyl-aluminium, chlorothalonil, mancozeb, mandipropamid, oxathiapiprolin, fluazinam, fludioxonil, cyprodinil, metalaxyl-M, aminopyrifen, folpet, ipflufenoquin, quinofumelin, tebufloquin, tolprocarb, tricyclazole, pyroquilon, cyflufenamid, metrafenone, N'-[2-chloro-4-(2-fluorophenoxy)-5-methyl-phenyl]-N-ethyl-N-methyl-formamidine, N'-[4-(2-bromophenoxy)-5-chloro-2-methyl-phenyl]-N-ethyl-N-methyl-formamidine, N-(1-benzyl-1,3-dimethyl-butyl)-8-fluoro-quinoline-3-carboxamide, N-(1-benzyl-3,3,3-trifluoro-1-methyl-propyl)-8-fluoro-quinoline-3-carboxamide, N-(1-benzyl-3-chloro-1-methyl-but-3-enyl)-8-fluoro-quinoline-3-carboxamide, 1-(6,7-dimethylpyrazolo[1,5-a]pyridin-3-yl)-4,4,5-trifluoro-3,3-dimethyl-isoquinoline, 4,4-difluoro-3,3-dimethyl-1-(7-methylpyrazolo[1,5-a]pyridin-3-yl)isoquinoline, 1-(6,7-dimethylpyrazolo[1,5-a]pyridin-3-yl)-4,4,6-trifluoro-3,3-dimethyl-isoquinoline, 1-(4,5-dimethylbenzimidazol-1-yl)-4,4,5-trifluoro-3,3-dimethyl-isoquinoline, 1-(4,5-dimethylbenzimidazol-1-yl)-4,4-difluoro-3,3-dimethyl-isoquinoline, 6-chloro-4,4-difluoro-3,3-dimethyl-1-(4-methylbenzimidazol-1-yl)isoquinoline, N'-[5-bromo-2-methyl-6-(1-methyl-2-propoxy-ethoxy)-3-pyridyl]-N-ethyl-N-methyl-formamidine, N'-[5-chloro-2-methyl-6-(1-methyl-2-propoxy-ethoxy)-3-pyridyl]-N-ethyl-N-methyl-formamidine, N'-[5-bromo-2-methyl-6-(1-methyl-2-propoxy-ethoxy)-3-pyridyl]-N-isopropyl-N-methyl-formamidine, N-isopropyl-N'-[5-methoxy-2-methyl-4-(2,2,2-trifluoro-1-hydroxy-1-phenyl-ethyl)phenyl]-N-methyl-formamidineN-methoxy-N-[[4-[5-(trifluoromethyl)-1,2,4-oxadiazol-3-yl]phenyl]methyl]cyclopropanecarboxamide, N,2-dimethoxy-N-[[4-[5-(trifluoromethyl)-1,2,4-oxadiazol-3-yl]phenyl]methyl]propanamide, N-ethyl-2-methyl-N-[[4-[5-(trifluoromethyl)-1,2,4-oxadiazol-3-yl]phenyl]methyl]propanamide, 1-methoxy-3-methyl-1-[[4-[5-(trifluoromethyl)-1,2,4-oxadiazol-3-yl]phenyl]methyl]urea, 1,3-dimethoxy-1-[[4-[5-(trifluoromethyl)-1,2,4-oxadiazol-3-yl]phenyl]methyl]urea, 3-ethyl-1-methoxy-1-[[4-[5-(trifluoromethyl)-1,2,4-oxadiazol-3-yl]phenyl]methyl]urea, ethyl 1-[[4-[5-(trifluoromethyl)-1,2,4-oxadiazol-3-yl]phenyl]methyl]pyrazole-4-carboxylate, N,N-dimethyl-1-[[4-[5-(trifluoromethyl)-1,2,4-oxadiazol-3-yl]phenyl]methyl]-1,2,4-triazol-3-amine, methyl (Z)-3-methoxy-2-[2-methyl-5-[3-(trifluoromethyl)pyrazol-1-yl]phenoxy]prop-2-enoate, methyl (Z)-3-methoxy-2-[2-methyl-5-(3-propylpyrazol-1-yl)phenoxy]prop-2-enoate, methyl (Z)-2-[5-(3-isopropylpyrazol-1-yl)-2-methyl-phenoxy]-3-methoxy-prop-2-enoate, methyl (Z)-3-methoxy-2-[2-methyl-5-(4-propyltriazol-2-yl)phenoxy]prop-2-enoate, methyl (Z)-3-methoxy-2-[2-methyl-5-[4-(trifluoromethyl)triazol-2-yl]phenoxy]prop-2-enoate, methyl (Z)-2-(5-cyclohexyl-2-methyl-phenoxy)-3-methoxy-prop-2-enoate, methyl (Z)-2-(5-cyclopentyl-2-methyl-phenoxy)-3-methoxy-prop-2-enoate, methyl (Z)-2-[5-(4-cyclohexylthiazol-2-yl)-2-methyl-phenoxy]-3-methoxy-prop-2-enoate, methyl (Z)-2-[5-[4-(ethoxymethyl)thiazol-2-yl]-2-methyl-phenoxy]-3-methoxy-prop-2-enoate, methyl (Z)-2-[5-(4-bromothiazol-2-yl)-2-methyl-phenoxy]-3-methoxy-prop-2-enoate, methyl (Z)-3-methoxy-2-[2-methyl-5-[5-(trifluoromethyl)thiazol-2-yl]phenoxy]prop-2-enoate, TAEGRO®, Timorex Gold™, and metarylpicoxamid.

More preferably, component (B) is a compound selected from the group consisting of: azoxystrobin, trifloxystrobin, metyltetraprole, difenoconazole, hexaconazole, propiconazole, prothioconazole, mefentrifluconazole, fenpropidin, fenpropimorph, fluxapyroxad, fluopyram, isopyrazam, sedaxane, benzovindiflupyr, pydiflumetofen, isoflucypram, isofetamid, pyrapropoyne, fluindapyr, fenpicoxamid, florylpicoxamid, acibenzolar-S-methyl, chlorothalonil, mancozeb, mandipropamid, oxathiapiprolin, fluazinam, fludioxonil, cyprodinil, metalaxyl-M, aminopyrifen, folpet, ipflufenoquin, quinofumelin, tricyclazole, pyroquilon, cyflufenamid, metrafenone, N'-[2-chloro-4-(2-fluorophenoxy)-5-methyl-phenyl]-N-ethyl-N-methyl-formamidine N'-[4-(2-bromophenoxy)-5-chloro-2-methyl-phenyl]-N-ethyl-N-methyl-formamidine, N-(1-benzyl-1,3-dimethyl-butyl)-8-fluoro-quinoline-3-carboxamide, N-(1-benzyl-3,3,3-trifluoro-1-methyl-propyl)-8-fluoro-quinoline-3-carboxamide, N-(1-benzyl-3-chloro-1-methyl-but-3-enyl)-8-fluoro-quinoline-3-carboxamide, 1-(6,7-dimethylpyrazolo[1,5-a]pyridin-3-yl)-4,4,5-trifluoro-3,3-dimethyl-isoquinoline, 4,4-difluoro-3,3-dimethyl-1-(7-methylpyrazolo[1,5-a]pyridin-3-yl)isoquinoline, 1-(6,7-dimethylpyrazolo[1,5-a]pyridin-3-yl)-4,4,6-trifluoro-3,3-dimethyl-isoquinoline, 1-(4,5-dimethylbenzimidazol-1-yl)-4,4,5-trifluoro-3,3-dimethyl-isoquinoline, 1-(4,5-dimethylbenzimidazol-1-yl)-4,4-difluoro-3,3-dimethyl-isoquinoline, 6-chloro-4,4-difluoro-3,3-dimethyl-1-(4-methylbenzimidazol-1-yl)isoquinoline, N'-[5-bromo-2-methyl-6-(1-methyl-2-propoxy-ethoxy)-3-pyridyl]-N-ethyl-N-methyl-formamidine, N'-[5-chloro-2-methyl-6-(1-methyl-2-propoxy-ethoxy)-3-pyridyl]-N-ethyl-N-methyl-formamidine, N'-[5-bromo-2-methyl-6-(1-methyl-2-propoxy-ethoxy)-3-pyridyl]-N-isopropyl-N-methyl-formamidine, N-isopropyl-N'-[5-methoxy-2-methyl-4-(2,2,2-trifluoro-1-hydroxy-1-phenyl-ethyl)phenyl]-N-methyl-formamidine, N-methoxy-N-[[4-[5-(trifluoromethyl)-1,2,4-oxadiazol-3-yl]phenyl]methyl]cyclopropanecarboxamide, N,2-dimethoxy-N-[[4-[5-(trifluoromethyl)-1,2,4-oxadiazol-3-yl]phenyl]methyl]propanamide, N-ethyl-2-methyl-N-[[4-[5-(trifluoromethyl)-1,2,4-oxadiazol-3-yl]phenyl]methyl]propanamide, 1-methoxy-3-methyl-1-[[4-[5-(trifluoromethyl)-1,2,4-oxadiazol-3-yl]phenyl]methyl]urea, 1,3-dimethoxy-1-[[4-[5-(trifluoromethyl)-1,2,4-oxadiazol-3-yl]phenyl]methyl]urea, 3-ethyl-1-methoxy-1-[[4-[5-(trifluoromethyl)-1,2,4-oxadiazol-3-yl]phenyl]methyl]urea, ethyl 1-[[4-[5-(trifluoromethyl)-1,2,4-oxadiazol-3-yl]phenyl]methyl]pyrazole-4-carboxylate, N,N-dimethyl-1-[[4-[5-

(trifluoromethyl)-1,2,4-oxadiazol-3-yl]phenyl]methyl]-1,2,4-triazol-3-amine, methyl (Z)-3-methoxy-2-[2-methyl-5-[3-(trifluoromethyl)pyrazol-1-yl]phenoxy]prop-2-enoate, methyl (Z)-3-methoxy-2-[2-methyl-5-(3-propylpyrazol-1-yl)phenoxy]prop-2-enoate, methyl (Z)-2-[5-(3-isopropylpyrazol-1-yl)-2-methyl-phenoxy]-3-methoxy-prop-2-enoate, methyl (Z)-3-methoxy-2-[2-methyl-5-(4-propyltriazol-2-yl)phenoxy]prop-2-enoate, methyl (Z)-3-methoxy-2-[2-methyl-5-[4-(trifluoromethyl)triazol-2-yl]phenoxy]prop-2-enoate, methyl (Z)-2-(5-cyclohexyl-2-methyl-phenoxy)-3-methoxy-prop-2-enoate, methyl (Z)-2-(5-cyclopentyl-2-methyl-phenoxy)-3-methoxy-prop-2-enoate, methyl (Z)-2-[5-(4-cyclohexylthiazol-2-yl)-2-methyl-phenoxy]-3-methoxy-prop-2-enoate, methyl (Z)-2-[5-[4-(ethoxymethyl)thiazol-2-yl]-2-methyl-phenoxy]-3-methoxy-prop-2-enoate, methyl (Z)-2-[5-(4-bromothiazol-2-yl)-2-methyl-phenoxy]-3-methoxy-prop-2-enoate, and methyl (Z)-3-methoxy-2-[2-methyl-5-[5-(trifluoromethyl)thiazol-2-yl]phenoxy]prop-2-enoate.

In another set of embodiments, component (B) is a compound selected from the group consisting of: azoxystrobin, trifloxystrobin, metyltetraprole, difenoconazole, hexaconazole, propiconazole, prothioconazole, mefentrifluconazole, fenpropidin, fenpropimorph, fluxapyroxad, fluopyram, isopyrazam, sedaxane, benzovindiflupyr, pydiflumetofen, isoflucypram, isofetamid, pyrapropoyne, fluindapyr, fenpicoxamid, florylpicoxamid, acibenzolar-S-methyl, chlorothalonil, mancozeb, mandipropamid, oxathiapiprolin, fluazinam, fludioxonil, cyprodinil, metalaxyl-M, aminopyrifen, folpet, ipflufenoquin, quinofumelin, tricyclazole, pyroquilon, cyflufenamid, metrafenone, N'-[2-chloro-4-(2-fluorophenoxy)-5-methyl-phenyl]-N-ethyl-N-methyl-formamidine N'-[4-(2-bromophenoxy)-5-chloro-2-methyl-phenyl]-N-ethyl-N-methyl-formamidine, N-(1-benzyl-1,3-dimethyl-butyl)-8-fluoro-quinoline-3-carboxamide, N-(1-benzyl-3,3,3-trifluoro-1-methyl-propyl)-8-fluoro-quinoline-3-carboxamide, N-(1-benzyl-3-chloro-1-methyl-but-3-enyl)-8-fluoro-quinoline-3-carboxamide, 1-(6,7-dimethylpyrazolo[1,5-a]pyridin-3-yl)-4,4,5-trifluoro-3,3-dimethyl-isoquinoline, 4,4-difluoro-3,3-dimethyl-1-(7-methylpyrazolo[1,5-a]pyridin-3-yl)isoquinoline, 1-(6,7-dimethylpyrazolo[1,5-a]pyridin-3-yl)-4,4,6-trifluoro-3,3-dimethyl-isoquinoline, 1-(4,5-dimethylbenzimidazol-1-yl)-4,4,5-trifluoro-3,3-dimethyl-isoquinoline, 1-(4,5-dimethylbenzimidazol-1-yl)-4,4-difluoro-3,3-dimethyl-isoquinoline, 6-chloro-4,4-difluoro-3,3-dimethyl-1-(4-methylbenzimidazol-1-yl)isoquinoline, N'-[5-bromo-2-methyl-6-(1-methyl-2-propoxy-ethoxy)-3-pyridyl]-N-ethyl-N-methyl-formamidine, N'-[5-chloro-2-methyl-6-(1-methyl-2-propoxy-ethoxy)-3-pyridyl]-N-ethyl-N-methyl-formamidine, N'-[5-bromo-2-methyl-6-(1-methyl-2-propoxy-ethoxy)-3-pyridyl]-N-isopropyl-N-methyl-formamidine, N-isopropyl-N'-[5-methoxy-2-methyl-4-(2,2,2-trifluoro-1-hydroxy-1-phenyl-ethyl)phenyl]-N-methyl-formamidine, N-methoxy-N-[[4-[5-(trifluoromethyl)-1,2,4-oxadiazol-3-yl]phenyl]methyl]cyclopropanecarboxamide, N,2-dimethoxy-N-[[4-[5-(trifluoromethyl)-1,2,4-oxadiazol-3-yl]phenyl]methyl]propanamide, N-ethyl-2-methyl-N-[[4-[5-(trifluoromethyl)-1,2,4-oxadiazol-3-yl]phenyl]methyl]propanamide, 1-methoxy-3-methyl-1-[[4-[5-(trifluoromethyl)-1,2,4-oxadiazol-3-yl]phenyl]methyl]urea, 1,3-dimethoxy-1-[[4-[5-(trifluoromethyl)-1,2,4-oxadiazol-3-yl]phenyl]methyl]urea, 3-ethyl-1-methoxy-1-[[4-[5-(trifluoromethyl)-1,2,4-oxadiazol-3-yl]phenyl]methyl]urea, ethyl 1-[[4-[5-(trifluoromethyl)-1,2,4-oxadiazol-3-yl]phenyl]methyl]pyrazole-4-carboxylate, N,N-dimethyl-1-[[4-[5-(trifluoromethyl)-1,2,4-oxadiazol-3-yl]phenyl]methyl]-1,2,4-triazol-3-amine, methyl (Z)-3-methoxy-2-[2-methyl-5-[3-(trifluoromethyl)pyrazol-1-yl]phenoxy]prop-2-enoate, methyl (Z)-3-methoxy-2-[2-methyl-5-(3-propylpyrazol-1-yl)phenoxy]prop-2-enoate, methyl (Z)-2-[5-(3-isopropylpyrazol-1-yl)-2-methyl-phenoxy]-3-methoxy-prop-2-enoate, methyl (Z)-3-methoxy-2-[2-methyl-5-(4-propyltriazol-2-yl)phenoxy]prop-2-enoate, methyl (Z)-3-methoxy-2-[2-methyl-5-[4-(trifluoromethyl)triazol-2-yl]phenoxy]prop-2-enoate, methyl (Z)-2-(5-cyclohexyl-2-methyl-phenoxy)-3-methoxy-prop-2-enoate, methyl (Z)-2-(5-cyclopentyl-2-methyl-phenoxy)-3-methoxy-prop-2-enoate, methyl (Z)-2-[5-(4-cyclohexylthiazol-2-yl)-2-methyl-phenoxy]-3-methoxy-prop-2-enoate, methyl (Z)-2-[5-[4-(ethoxymethyl)thiazol-2-yl]-2-methyl-phenoxy]-3-methoxy-prop-2-enoate, methyl (Z)-2-[5-(4-bromothiazol-2-yl)-2-methyl-phenoxy]-3-methoxy-prop-2-enoate, methyl (Z)-3-methoxy-2-[2-methyl-5-[5-(trifluoromethyl)thiazol-2-yl]phenoxy]prop-2-enoate, TAEGRO®, Timorex Gold™, and metarylpicoxamid.

Still more preferably, component (B) is a compound selected from the group consisting of: azoxystrobin, trifloxystrobin, metyltetraprole, difenoconazole, hexaconazole, propiconazole, prothioconazole, mefentrifluconazole, fenpropidin, fenpropimorph, fluxapyroxad, fluopyram, isopyrazam, sedaxane, benzovindiflupyr, pydiflumetofen, isoflucypram, isofetamid, pyrapropoyne, fluindapyr, fenpicoxamid, florylpicoxamid, chlorothalonil, mancozeb, mandipropamid, oxathiapiprolin, fluazinam, fludioxonil, cyprodinil, metalaxyl-M, aminopyrifen, folpet, ipflufenoquin, quinofumelin, tricyclazole, pyroquilon, N-(1-benzyl-1,3-dimethyl-butyl)-8-fluoro-quinoline-3-carboxamide, N-(1-benzyl-3,3,3-trifluoro-1-methyl-propyl)-8-fluoro-quinoline-3-carboxamide, 1-(6,7-dimethylpyrazolo[1,5-a]pyridin-3-yl)-4,4,5-trifluoro-3,3-dimethyl-isoquinoline, 4,4-difluoro-3,3-dimethyl-1-(7-methylpyrazolo[1,5-a]pyridin-3-yl)isoquinoline, 1-(4,5-dimethylbenzimidazol-1-yl)-4,4,5-trifluoro-3,3-dimethyl-isoquinoline, and 1-(4,5-dimethylbenzimidazol-1-yl)-4,4-difluoro-3,3-dimethyl-isoquinoline.

In a particularly preferred set of embodiments, component (B) is a compound selected from the group consisting of: azoxystrobin, trifloxystrobin, metyltetraprole, difenoconazole, hexaconazole, propiconazole, prothioconazole, mefentrifluconazole, fenpropidin, fenpropimorph, fluxapyroxad, fluopyram, isopyrazam, sedaxane, benzovindiflupyr, pydiflumetofen, isoflucypram, isofetamid, pyrapropoyne, fluindapyr, fenpicoxamid, florylpicoxamid, chlorothalonil, mancozeb, mandipropamid, oxathiapiprolin, fluazinam, fludioxonil, cyprodinil, metalaxyl-M, aminopyrifen, folpet, ipflufenoquin, quinofumelin, tricyclazole, pyroquilon, N-(1-benzyl-1,3-dimethyl-butyl)-8-fluoro-quinoline-3-carboxamide, N-(1-benzyl-3,3,3-trifluoro-1-methyl-propyl)-8-fluoro-quinoline-3-carboxamide, 1-(6,7-dimethylpyrazolo[1,5-a]pyridin-3-yl)-4,4,5-trifluoro-3,3-dimethyl-isoquinoline, 4,4-difluoro-3,3-dimethyl-1-(7-methylpyrazolo[1,5-a]pyridin-3-yl)isoquinoline, 1-(4,5-dimethylbenzimidazol-1-yl)-4,4,5-trifluoro-3,3-dimethyl-isoquinoline, 1-(4,5-dimethylbenzimidazol-1-yl)-4,4-difluoro-3,3-dimethyl-isoquinoline, N'-[5-bromo-2-methyl-6-(1-methyl-2-propoxy-ethoxy)-3-pyridyl]-N-ethyl-N-methyl-formamidine, N-isopropyl-N'-[5-methoxy-2-methyl-4-(2,2,2-trifluoro-1-hydroxy-1-phenyl-ethyl)phenyl]-N-methyl-formamidine, TAEGRO®, Timorex GoId™, acibenzolar-S-methyl, cyflufenamid, metrafenone, fosetyl-aluminium, metarylpicoxamid, methyl (Z)-3-methoxy-2-[2-methyl-5-[3-(trifluoromethyl)pyrazol-1-yl]phenoxy]prop-2-enoate, methyl (Z)-3-methoxy-2-[2- methyl-5-(3-propylpyrazol-1-yl)phenoxy]prop-2-enoate, methyl (Z)-2-(5-cyclohexyl-2-methyl-phenoxy)-3-methoxy-prop-2-enoate, methyl (Z)-2-(5-cyclopentyl-2-methyl-phenoxy)-3-methoxy-prop-2-enoate, methyl (Z)-2-[5-(3-isopropylpyrazol-1-yl)-2-methyl-phenoxy]-3-methoxy-prop-2-enoate, methyl (z)-3-methoxy-2-[2-methyl-5-(4-propyltriazol-2-yl)phenoxy]prop-2-enoate, methyl (Z)-3-methoxy-2-[2-methyl-5-[4-(trifluoromethyl) triazol-2-yl]phenoxy]prop-2-enoate, N-methoxy-N-[[4-[5-(trifluoromethyl)-1,2,4-oxadiazol-3-yl]phenyl]methyl]cyclopropanecarboxamide, N,2-dimethoxy-N-[[4-[5-(trifluoromethyl)-1,2,4-oxadiazol-3-yl]phenyl]methyl] propanamide, N-ethyl-2-methyl-N-[[4-[5-(trifluoromethyl)-1,2,4-oxadiazol-3-yl]phenyl]methyl]propanamide, 1-methoxy-3-methyl-1-[[4-[5-(trifluoromethyl)-1,2,4-oxadiazol-3-yl]phenyl]methyl]urea, 1,3-dimethoxy-1-[[4-[5-(trifluoromethyl)-1,2,4-oxadiazol-3-yl]phenyl]methyl]urea, 3-ethyl-1-methoxy-1-[[4-[5-(trifluoromethyl)-1,2,4-oxadiazol-3-yl]phenyl]methyl]urea, and ethyl 1-[[4-[5-(trifluoromethyl)-1,2,4-oxadiazol-3-yl]phenyl]methyl]pyrazole-4-carboxylate.

The component (B) compounds are referred to herein and above by a so-called "ISO common name" or another "common name" being used in individual cases or a trademark name. The component (B) compounds are known and are commercially available and/or can be prepared using procedures known in the art and/or procedures reported in the literature.

In a preferred composition according to the invention component (A) is compound no. X.01, [2-[(2,6-difluoro-4-pyridyl)-[5-methyl-4-(spiro[3.4]octan-3-ylcarbamoyl)thiazol-2-yl]amino]-1-methyl-2-oxo-ethyl]acetate or a salt, enantiomer, tautomer or N-oxide thereof, and component (B) is a compound selected from the group consisting of azoxystrobin, trifloxystrobin, metyltetraprole, difenoconazole, hexaconazole, propiconazole, prothioconazole, mefentrifluconazole, fenpropidin, fenpropimorph, fluxapyroxad, fluopyram, isopyrazam, sedaxane, benzovindiflupyr, pydiflumetofen, isoflucypram, isofetamid, pyrapropoyne, fluindapyr, fenpicoxamid, florylpicoxamid, acibenzolar-S-methyl, chlorothalonil, mancozeb, mandipropamid, oxathiapiprolin, fluazinam, fludioxonil, cyprodinil, metalaxyl-M, aminopyrifen, folpet, ipflufenoquin, quinofumelin, tricyclazole, pyroquilon, cyflufenamid, metrafenone, N'-[2-chloro-4-(2-fluorophenoxy)-5-methyl-phenyl]-N-ethyl-N-methyl-formamidine N'-[4-(2-bromophenoxy)-5-chloro-2-methyl-phenyl]-N-ethyl-N-methyl-formamidine, N-(1-benzyl-1,3-dimethyl-butyl)-8-fluoro-quinoline-3-carboxamide, N-(1-benzyl-3,3,3-trifluoro-1-methyl-propyl)-8-fluoro-quinoline-3-carboxamide, N-(1-benzyl-3-chloro-1-methyl-but-3-enyl)-8-fluoro-quinoline-3-carboxamide, 1-(6,7-dimethylpyrazolo[1,5-a]pyridin-3-yl)-4,4,5-trifluoro-3,3-dimethyl-isoquinoline, 4,4-difluoro-3,3-dimethyl-1-(7-methylpyrazolo[1,5-a]pyridin-3-yl) isoquinoline, 1-(6,7-dimethylpyrazolo[1,5-a]pyridin-3-yl)-4,4,6-trifluoro-3,3-dimethyl-isoquinoline, 1-(4,5-dimethylbenzimidazol-1-yl)-4,4,5-trifluoro-3,3-dimethyl-isoquinoline, 1-(4,5-dimethylbenzimidazol-1-yl)-4,4-difluoro-3,3-dimethyl-isoquinoline, 6-chloro-4,4-difluoro-3,3-dimethyl-1-(4-methylbenzimidazol-1-yl)isoquinoline, N'-[5-bromo-2-methyl-6-(1-methyl-2-propoxy-ethoxy)-3-pyridyl]-N-ethyl-N-methyl-formamidine, N'-[5-chloro-2-methyl-6-(1-methyl-2-propoxy-ethoxy)-3-pyridyl]-N-ethyl-N-methyl-formamidine, N'-[5-bromo-2-methyl-6-(1-methyl-2-propoxy-ethoxy)-3-pyridyl]-N-isopropyl-N-methyl-formamidine, N-isopropyl-N'-[5-methoxy-2-methyl-4-(2,2,2-trifluoro-1-hydroxy-1-phenyl-ethyl) phenyl]-N-methyl-formamidine, N-methoxy-N-[[4-[5-(trifluoromethyl)-1,2,4-oxadiazol-3-yl]phenyl]methyl]cyclopropanecarboxamide, N,2-dimethoxy-N-[[4-[5-(trifluoromethyl)-1,2,4-oxadiazol-3-yl]phenyl]methyl]propanamide, N-ethyl-2-methyl-N-[[4-[5-(trifluoromethyl)-1,2,4-oxadiazol-3-yl]phenyl]methyl]propanamide, 1-methoxy-3-methyl-1-[[4-[5-(trifluoromethyl)-1,2,4-oxadiazol-3-yl]phenyl]methyl]urea, 1,3-dimethoxy-1-[[4-[5-(trifluoromethyl)-1,2,4-oxadiazol-3-yl]phenyl]methyl]urea, 3-ethyl-1-methoxy-1-[[4-[5-(trifluoromethyl)-1,2,4-oxadiazol-3-yl] phenyl]methyl]urea, ethyl 1-[[4-[5-(trifluoromethyl)-1,2,4-oxadiazol-3-yl]phenyl]methyl]pyrazole-4-carboxylate, N,N-dimethyl-1-[[4-[5-(trifluoromethyl)-1,2,4-oxadiazol-3-yl]phenyl]methyl]-1,2,4-triazol-3-amine, methyl (Z)-3-methoxy-2-[2-methyl-5-[3-(trifluoromethyl)pyrazol-1-yl] phenoxy]prop-2-enoate, methyl (Z)-3-methoxy-2-[2-methyl-5-(3-propylpyrazol-1-yl)phenoxy]prop-2-enoate, methyl (Z)-2-[5-(3-isopropylpyrazol-1-yl)-2-methyl-phenoxy]-3-methoxy-prop-2-enoate, methyl (Z)-3-methoxy-2-[2-methyl-5-(4-propyltriazol-2-yl)phenoxy]prop-2-enoate, methyl (Z)-3-methoxy-2-[2-methyl-5-[4-(trifluoromethyl) triazol-2-yl]phenoxy]prop-2-enoate, methyl (Z)-2-(5-cyclohexyl-2-methyl-phenoxy)-3-methoxy-prop-2-enoate, methyl (Z)-2-(5-cyclopentyl-2-methyl-phenoxy)-3-methoxy-prop-2-enoate, methyl (Z)-2-[5-(4-cyclohexylthiazol-2-yl)-2-methyl-phenoxy]-3-methoxy-prop-2-enoate, methyl (Z)-2-[5-[4-(ethoxymethyl)thiazol-2-yl]-2-methyl-phenoxy]-3-methoxy-prop-2-enoate, methyl (Z)-2-[5-(4-bromothiazol-2-yl)-2-methyl-phenoxy]-3-methoxy-prop-2-enoate, methyl (Z)-3-methoxy-2-[2-methyl-5-[5-(trifluoromethyl)thiazol-2-yl]phenoxy]prop-2-enoate, TAEGRO®, Timorex Gold™, and metarylpicoxamid, wherein the weight ratio of component (A) to component (B) is from 15:1 to 1:30.

In another preferred composition according to the invention, component (A) is compound no. X.04, [2-[(2,6-difluoro-4-pyridyl)-[5-methyl-4-(spiro[3.4]octan-3-ylcarbamoyl)thiazol-2-yl]amino]-1-methyl-2-oxo-ethyl]ethyl carbonate or a salt, enantiomer, tautomer or N-oxide thereof, and component (B) is a compound selected from the group consisting of azoxystrobin, trifloxystrobin, metyltetraprole, difenoconazole, hexaconazole, propiconazole, prothioconazole, mefentrifluconazole, fenpropidin, fenpropimorph, fluxapyroxad, fluopyram, isopyrazam, sedaxane, benzovindiflupyr, pydiflumetofen, isoflucypram, isofetamid, pyrapropoyne, fluindapyr, fenpicoxamid, florylpicoxamid, acibenzolar-S-methyl, chlorothalonil, mancozeb, mandipropamid, oxathiapiprolin, fluazinam, fludioxonil, cyprodinil, metalaxyl-M, aminopyrifen, folpet, ipflufenoquin, quinofumelin, tricyclazole, pyroquilon, cyflufenamid, metrafenone, N'-[2-chloro-4-(2-fluorophenoxy)-5-methyl-phenyl]-N-ethyl-N-methyl-formamidine N'-[4-(2-bromophenoxy)-5-chloro-2-methyl-phenyl]-N-ethyl-N-methyl-formamidine, N-(1-benzyl-1,3-dimethyl-butyl)-8-fluoro-quinoline-3-carboxamide, N-(1-benzyl-3,3,3-trifluoro-1-methyl-propyl)-8-fluoro-quinoline-3-carboxamide, N-(1-benzyl-3-chloro-1-methyl-but-3-enyl)-8-fluoro-quinoline-3-carboxamide, 1-(6,7-dimethylpyrazolo[1,5-a]pyridin-3-yl)-4,4,5-trifluoro-3,3-dimethyl-isoquinoline, 4,4-difluoro-3,3-dimethyl-1-(7-methylpyrazolo[1,5-a]pyridin-3-yl) isoquinoline, 1-(6,7-dimethylpyrazolo[1,5-a]pyridin-3-yl)-4,4,6-trifluoro-3,3-dimethyl-isoquinoline, 1-(4,5-dimethylbenzimidazol-1-yl)-4,4,5-trifluoro-3,3-dimethyl-isoquinoline, 1-(4,5-dimethylbenzimidazol-1-yl)-4,4-difluoro-3,3-dimethyl-isoquinoline, 6-chloro-4,4-difluoro-3,3-dimethyl-1-(4-methylbenzimidazol-1-yl)isoquinoline, N'-[5-bromo-2-methyl-6-(1-methyl-2-propoxy-ethoxy)-3- pyridyl]-N-ethyl-N-methyl-formamidine, N'-[5-chloro-2-methyl-6-(1-methyl-2-propoxy-ethoxy)-3-pyridyl]-N-ethyl-N-methyl-formamidine, N'-[5-bromo-2-methyl-6-(1-methyl-2-propoxy-ethoxy)-3-pyridyl]-N-isopropyl-N-methyl-formamidine, N-isopropyl-N'-[5-methoxy-2-methyl-4-(2,2,2-trifluoro-1-hydroxy-1-phenyl-ethyl)phenyl]-N-methyl-formamidine, N-methoxy-N-[[4-[5-(trifluoromethyl)-1,2,4-oxadiazol-3-yl]phenyl]methyl]cyclopropanecarboxamide, N,2-dimethoxy-N-[[4-[5-(trifluoromethyl)-1,2,4-oxadiazol-3-yl]phenyl]methyl]propanamide, N-ethyl-2-methyl-N-[[4-[5-(trifluoromethyl)-1,2,4-oxadiazol-3-yl]phenyl]methyl]propanamide, 1-methoxy-3-methyl-1-[[4-[5-(trifluoromethyl)-1,2,4-oxadiazol-3-yl]phenyl]methyl]urea, 1,3-dimethoxy-1-[[4-[5-(trifluoromethyl)-1,2,4-oxadiazol-3-yl]phenyl]methyl]urea, 3-ethyl-1-methoxy-1-[[4-[5-(trifluoromethyl)-1,2,4-oxadiazol-3-yl]phenyl]methyl]urea, ethyl 1-[[4-[5-(trifluoromethyl)-1,2,4-oxadiazol-3-yl]phenyl]methyl]pyrazole-4-carboxylate, N,N-dimethyl-1-[[4-[5-(trifluoromethyl)-1,2,4-oxadiazol-3-yl]phenyl]methyl]-1,2,4-triazol-3-amine, methyl (Z)-3-methoxy-2-[2-methyl-5-[3-(trifluoromethyl)pyrazol-1-yl]phenoxy]prop-2-enoate, methyl (Z)-3-methoxy-2-[2-methyl-5-(3-propylpyrazol-1-yl)phenoxy]prop-2-enoate, methyl (Z)-2-[5-(3-isopropylpyrazol-1-yl)-2-methyl-phenoxy]-3-methoxy-prop-2-enoate, methyl (Z)-3-methoxy-2-[2-methyl-5-(4-propyltriazol-2-yl)phenoxy]prop-2-enoate, methyl (Z)-3-methoxy-2-[2-methyl-5-[4-(trifluoromethyl)triazol-2-yl]phenoxy]prop-2-enoate, methyl (Z)-2-(5-cyclohexyl-2-methyl-phenoxy)-3-methoxy-prop-2-enoate, methyl (Z)-2-(5-cyclopentyl-2-methyl-phenoxy)-3-methoxy-prop-2-enoate, methyl (Z)-2-[5-(4-cyclohexylthiazol-2-yl)-2-methyl-phenoxy]-3-methoxy-prop-2-enoate, methyl (Z)-2-[5-[4-(ethoxymethyl)thiazol-2-yl]-2-methyl-phenoxy]-3-methoxy-prop-2-enoate, methyl (Z)-2-[5-(4-bromothiazol-2-yl)-2-methyl-phenoxy]-3-methoxy-prop-2-enoate, methyl (Z)-3-methoxy-2-[2-methyl-5-[5-(trifluoromethyl)thiazol-2-yl]phenoxy]prop-2-enoate, TAEGRO®, Timorex Gold™, and metarylpicoxamid, wherein the weight ratio of component (A) to component (B) is from 15:1 to 1:30.

In another preferred composition according to the invention, component (A) is compound no. X.07, N-cyclobutyl-2-[(2,6-difluoro-4-pyridyl)-(2-methoxypropanoyl)amino]-5-methyl-thiazole-4-carboxamide or a salt, enantiomer, tautomer or N-oxide thereof, and component (B) is a compound selected from the group consisting of azoxystrobin, trifloxystrobin, metyltetraprole, difenoconazole, hexaconazole, propiconazole, prothioconazole, mefentrifluconazole, fenpropidin, fenpropimorph, fluxapyroxad, fluopyram, isopyrazam, sedaxane, benzovindiflupyr, pydiflumetofen, isoflucypram, isofetamid, pyrapropoyne, fluindapyr, fenpicoxamid, florylpicoxamid, acibenzolar-S-methyl, chlorothalonil, mancozeb, mandipropamid, oxathiapiprolin, fluazinam, fludioxonil, cyprodinil, metalaxyl-M, aminopyrifen, folpet, ipflufenoquin, quinofumelin, tricyclazole, pyroquilon, cyflufenamid, metrafenone, N'-[2-chloro-4-(2-fluorophenoxy)-5-methyl-phenyl]-N-ethyl-N-methyl-formamidine N'-[4-(2-bromophenoxy)-5-chloro-2-methyl-phenyl]-N-ethyl-N-methyl-formamidine, N-(1-benzyl-1,3-dimethyl-butyl)-8-fluoro-quinoline-3-carboxamide, N-(1-benzyl-3,3,3-trifluoro-1-methyl-propyl)-8-fluoro-quinoline-3-carboxamide, N-(1-benzyl-3-chloro-1-methyl-but-3-enyl)-8-fluoro-quinoline-3-carboxamide, 1-(6,7-dimethylpyrazolo[1,5-a]pyridin-3-yl)-4,4,5-trifluoro-3,3-dimethyl-isoquinoline, 4,4-difluoro-3,3-dimethyl-1-(7-methylpyrazolo[1,5-a]pyridin-3-yl)isoquinoline, 1-(6,7-dimethylpyrazolo[1,5-a]pyridin-3-yl)-4,4,6-trifluoro-3,3-dimethyl-isoquinoline, 1-(4,5-dimethylbenzimidazol-1-yl)-4,4,5-trifluoro-3,3-dimethyl-isoquinoline, 1-(4,5-dimethylbenzimidazol-1-yl)-4,4-difluoro-3,3-dimethyl-isoquinoline, 6-chloro-4,4-difluoro-3,3-dimethyl-1-(4-methylbenzimidazol-1-yl)isoquinoline, N'-[5-bromo-2-methyl-6-(1-methyl-2-propoxy-ethoxy)-3-pyridyl]-N-ethyl-N-methyl-formamidine, N'-[5-chloro-2-methyl-6-(1-methyl-2-propoxy-ethoxy)-3-pyridyl]-N-ethyl-N-methyl-formamidine, N'-[5-bromo-2-methyl-6-(1-methyl-2-propoxy-ethoxy)-3-pyridyl]-N-isopropyl-N-methyl-formamidine, N-isopropyl-N'-[5-methoxy-2-methyl-4-(2,2,2-trifluoro-1-hydroxy-1-phenyl-ethyl)phenyl]-N-methyl-formamidine, N-methoxy-N-[[4-[5-(trifluoromethyl)-1,2,4-oxadiazol-3-yl]phenyl]methyl]cyclopropanecarboxamide, N,2-dimethoxy-N-[[4-[5-(trifluoromethyl)-1,2,4-oxadiazol-3-yl]phenyl]methyl]propanamide, N-ethyl-2-methyl-N-[[4-[5-(trifluoromethyl)-1,2,4-oxadiazol-3-yl]phenyl]methyl]propanamide, 1-methoxy-3-methyl-1-[[4-[5-(trifluoromethyl)-1,2,4-oxadiazol-3-yl]phenyl]methyl]urea, 1,3-dimethoxy-1-[[4-[5-(trifluoromethyl)-1,2,4-oxadiazol-3-yl]phenyl]methyl]urea, 3-ethyl-1-methoxy-1-[[4-[5-(trifluoromethyl)-1,2,4-oxadiazol-3-yl]phenyl]methyl]urea, ethyl 1-[[4-[5-(trifluoromethyl)-1,2,4-oxadiazol-3-yl]phenyl]methyl]pyrazole-4-carboxylate, N,N-dimethyl-1-[[4-[5-(trifluoromethyl)-1,2,4-oxadiazol-3-yl]phenyl]methyl]-1,2,4-triazol-3-amine, methyl (Z)-3-methoxy-2-[2-methyl-5-[3-(trifluoromethyl)pyrazol-1-yl]phenoxy]prop-2-enoate, methyl (Z)-3-methoxy-2-[2-methyl-5-(3-propylpyrazol-1-yl)phenoxy]prop-2-enoate, methyl (Z)-2-[5-(3-isopropylpyrazol-1-yl)-2-methyl-phenoxy]-3-methoxy-prop-2-enoate, methyl (Z)-3-methoxy-2-[2-methyl-5-(4-propyltriazol-2-yl)phenoxy]prop-2-enoate, methyl (Z)-3-methoxy-2-[2-methyl-5-[4-(trifluoromethyl)triazol-2-yl]phenoxy]prop-2-enoate, methyl (Z)-2-(5-cyclohexyl-2-methyl-phenoxy)-3-methoxy-prop-2-enoate, methyl (Z)-2-(5-cyclopentyl-2-methyl-phenoxy)-3-methoxy-prop-2-enoate, methyl (Z)-2-[5-(4-cyclohexylthiazol-2-yl)-2-methyl-phenoxy]-3-methoxy-prop-2-enoate, methyl (Z)-2-[5-[4-(ethoxymethyl)thiazol-2-yl]-2-methyl-phenoxy]-3-methoxy-prop-2-enoate, methyl (Z)-2-[5-(4-bromothiazol-2-yl)-2-methyl-phenoxy]-3-methoxy-prop-2-enoate, methyl (Z)-3-methoxy-2-[2-methyl-5-[5-(trifluoromethyl)thiazol-2-yl]phenoxy]prop-2-enoate, TAEGRO®, Timorex Gold™, and metarylpicoxamid, wherein the weight ratio of component (A) to component (B) is from 15:1 to 1:30.

In another preferred composition according to the invention, component (A) is compound no. X.11, 2-[(2,6-difluoro-4-pyridyl)-(2-methoxyacetyl)amino]-5-methyl-N-spiro[3.4]octan-3-yl-thiazole-4-carboxamide or a salt, enantiomer, tautomer or N-oxide thereof, and component (B) is a compound selected from the group consisting of azoxystrobin, trifloxystrobin, metyltetraprole, difenoconazole, hexaconazole, propiconazole, prothioconazole, mefentrifluconazole, fenpropidin, fenpropimorph, fluxapyroxad, fluopyram, isopyrazam, sedaxane, benzovindiflupyr, pydiflumetofen, isoflucypram, isofetamid, pyrapropoyne, fluindapyr, fenpicoxamid, florylpicoxamid, acibenzolar-S-methyl, chlorothalonil, mancozeb, mandipropamid, oxathiapiprolin, fluazinam, fludioxonil, cyprodinil, metalaxyl-M, aminopyrifen, folpet, ipflufenoquin, quinofumelin, tricyclazole, pyroquilon, cyflufenamid, metrafenone, N'-[2-chloro-4-(2-fluorophenoxy)-5-methyl-phenyl]-N-ethyl-N-methyl-formamidine N'-[4-(2-bromophenoxy)-5-chloro-2-methyl-phenyl]-N-ethyl-N-methyl-formamidine, N-(1-benzyl-1,3-dimethyl-butyl)-8-fluoro-quinoline-3-carboxamide, N-(1-benzyl-3,3,3-trifluoro-1-methyl-propyl)-8-fluoro-quinoline-3-carboxamide, N-(1-benzyl-3-chloro-1-methyl-but-3-enyl)-

8-fluoro-quinoline-3-carboxamide, 1-(6,7-dimethylpyrazolo[1,5-a]pyridin-3-yl)-4,4,5-trifluoro-3,3-dimethyl-isoquinoline, 4,4-difluoro-3,3-dimethyl-1-(7-methylpyrazolo[1,5-a]pyridin-3-yl)isoquinoline, 1-(6,7-dimethylpyrazolo[1,5-a]pyridin-3-yl)-4,4,6-trifluoro-3,3-dimethyl-isoquinoline, 1-(4,5-dimethylbenzimidazol-1-yl)-4,4,5-trifluoro-3,3-dimethyl-isoquinoline, 1-(4,5-dimethylbenzimidazol-1-yl)-4,4-difluoro-3,3-dimethyl-isoquinoline, 6-chloro-4,4-difluoro-3,3-dimethyl-1-(4-methylbenzimidazol-1-yl)isoquinoline, N'-[5-bromo-2-methyl-6-(1-methyl-2-propoxy-ethoxy)-3-pyridyl]-N-ethyl-N-methyl-formamidine, N'-[5-chloro-2-methyl-6-(1-methyl-2-propoxy-ethoxy)-3-pyridyl]-N-ethyl-N-methyl-formamidine, N'-[5-bromo-2-methyl-6-(1-methyl-2-propoxy-ethoxy)-3-pyridyl]-N-isopropyl-N-methyl-formamidine, N-isopropyl-N'-[5-methoxy-2-methyl-4-(2,2,2-trifluoro-1-hydroxy-1-phenyl-ethyl)phenyl]-N-methyl-formamidine, N-methoxy-N-[[4-[5-(trifluoromethyl)-1,2,4-oxadiazol-3-yl]phenyl]methyl]cyclopropanecarboxamide, N,2-dimethoxy-N-[[4-[5-(trifluoromethyl)-1,2,4-oxadiazol-3-yl]phenyl]methyl]propanamide, N-ethyl-2-methyl-N-[[4-[5-(trifluoromethyl)-1,2,4-oxadiazol-3-yl]phenyl]methyl]propanamide, 1-methoxy-3-methyl-1-[[4-[5-(trifluoromethyl)-1,2,4-oxadiazol-3-yl]phenyl]methyl]urea, 1,3-dimethoxy-1-[[4-[5-(trifluoromethyl)-1,2,4-oxadiazol-3-yl]phenyl]methyl]urea, 3-ethyl-1-methoxy-1-[[4-[5-(trifluoromethyl)-1,2,4-oxadiazol-3-yl]phenyl]methyl]urea, ethyl 1-[[4-[5-(trifluoromethyl)-1,2,4-oxadiazol-3-yl]phenyl]methyl]pyrazole-4-carboxylate, N,N-dimethyl-1-[[4-[5-(trifluoromethyl)-1,2,4-oxadiazol-3-yl]phenyl]methyl]-1,2,4-triazol-3-amine, methyl (Z)-3-methoxy-2-[2-methyl-5-[3-(trifluoromethyl)pyrazol-1-yl]phenoxy]prop-2-enoate, methyl (Z)-3-methoxy-2-[2-methyl-5-(3-propylpyrazol-1-yl)phenoxy]prop-2-enoate, methyl (Z)-2-[5-(3-isopropylpyrazol-1-yl)-2-methyl-phenoxy]-3-methoxy-prop-2-enoate, methyl (Z)-3-methoxy-2-[2-methyl-5-(4-propyltriazol-2-yl)phenoxy]prop-2-enoate, methyl (Z)-3-methoxy-2-[2-methyl-5-[4-(trifluoromethyl)triazol-2-yl]phenoxy]prop-2-enoate, methyl (Z)-2-(5-cyclohexyl-2-methyl-phenoxy)-3-methoxy-prop-2-enoate, methyl (Z)-2-(5-cyclopentyl-2-methyl-phenoxy)-3-methoxy-prop-2-enoate, methyl (Z)-2-[5-(4-cyclohexylthiazol-2-yl)-2-methyl-phenoxy]-3-methoxy-prop-2-enoate, methyl (Z)-2-[5-[4-(ethoxymethyl)thiazol-2-yl]-2-methyl-phenoxy]-3-methoxy-prop-2-enoate, methyl (Z)-2-[5-(4-bromothiazol-2-yl)-2-methyl-phenoxy]-3-methoxy-prop-2-enoate, methyl (Z)-3-methoxy-2-[2-methyl-5-[5-(trifluoromethyl)thiazol-2-yl]phenoxy]prop-2-enoate, TAEGRO®, Timorex Gold™, and metarylpicoxamid, wherein the weight ratio of component (A) to component (B) is from 15:1 to 1:30.

In another preferred composition according to the invention, component (A) is compound no. X.12, N-cyclobutyl-2-[(2,6-difluoro-4-pyridyl)-(2-methoxyacetyl)amino]-5-methyl-thiazole-4-carboxamide or a salt, enantiomer, tautomer or N-oxide thereof, and component (B) is a compound selected from the group consisting of azoxystrobin, trifloxystrobin, metyltetraprole, difenoconazole, hexaconazole, propiconazole, prothioconazole, mefentrifluconazole, fenpropidin, fenpropimorph, fluxapyroxad, fluopyram, isopyrazam, sedaxane, benzovindiflupyr, pydiflumetofen, isoflucypram, isofetamid, pyrapropoyne, fluindapyr, fenpicoxamid, florylpicoxamid, acibenzolar-S-methyl, chlorothalonil, mancozeb, mandipropamid, oxathiapiprolin, fluazinam, fludioxonil, cyprodinil, metalaxyl-M, aminopyrifen, folpet, ipflufenoquin, quinofumelin, tricyclazole, pyroquilon, cyflufenamid, metrafenone, N'-[2-chloro-4-(2-fluorophenoxy)-5-methyl-phenyl]-N-ethyl-N-methyl-formamidine N'-[4-(2-bromophenoxy)-5-chloro-2-methyl-phenyl]-N-ethyl-N-methyl-formamidine, N-(1-benzyl-1,3-dimethyl-butyl)-8-fluoro-quinoline-3-carboxamide, N-(1-benzyl-3,3,3-trifluoro-1-methyl-propyl)-8-fluoro-quinoline-3-carboxamide, N-(1-benzyl-3-chloro-1-methyl-but-3-enyl)-8-fluoro-quinoline-3-carboxamide, 1-(6,7-dimethylpyrazolo[1,5-a]pyridin-3-yl)-4,4,5-trifluoro-3,3-dimethyl-isoquinoline, 4,4-difluoro-3,3-dimethyl-1-(7-methylpyrazolo[1,5-a]pyridin-3-yl)isoquinoline, 1-(6,7-dimethylpyrazolo[1,5-a]pyridin-3-yl)-4,4,6-trifluoro-3,3-dimethyl-isoquinoline, 1-(4,5-dimethylbenzimidazol-1-yl)-4,4,5-trifluoro-3,3-dimethyl-isoquinoline, 1-(4,5-dimethylbenzimidazol-1-yl)-4,4-difluoro-3,3-dimethyl-isoquinoline, 6-chloro-4,4-difluoro-3,3-dimethyl-1-(4-methylbenzimidazol-1-yl)isoquinoline, N'-[5-bromo-2-methyl-6-(1-methyl-2-propoxy-ethoxy)-3-pyridyl]-N-ethyl-N-methyl-formamidine, N'-[5-chloro-2-methyl-6-(1-methyl-2-propoxy-ethoxy)-3-pyridyl]-N-ethyl-N-methyl-formamidine, N'-[5-bromo-2-methyl-6-(1-methyl-2-propoxy-ethoxy)-3-pyridyl]-N-isopropyl-N-methyl-formamidine, N-isopropyl-N'-[5-methoxy-2-methyl-4-(2,2,2-trifluoro-1-hydroxy-1-phenyl-ethyl)phenyl]-N-methyl-formamidine, N-methoxy-N-[[4-[5-(trifluoromethyl)-1,2,4-oxadiazol-3-yl]phenyl]methyl]cyclopropanecarboxamide, N,2-dimethoxy-N-[[4-[5-(trifluoromethyl)-1,2,4-oxadiazol-3-yl]phenyl]methyl]propanamide, N-ethyl-2-methyl-N-[[4-[5-(trifluoromethyl)-1,2,4-oxadiazol-3-yl]phenyl]methyl]propanamide, 1-methoxy-3-methyl-1-[[4-[5-(trifluoromethyl)-1,2,4-oxadiazol-3-yl]phenyl]methyl]urea, 1,3-dimethoxy-1-[[4-[5-(trifluoromethyl)-1,2,4-oxadiazol-3-yl]phenyl]methyl]urea, 3-ethyl-1-methoxy-1-[[4-[5-(trifluoromethyl)-1,2,4-oxadiazol-3-yl]phenyl]methyl]urea, ethyl 1-[[4-[5-(trifluoromethyl)-1,2,4-oxadiazol-3-yl]phenyl]methyl]pyrazole-4-carboxylate, N,N-dimethyl-1-[[4-[5-(trifluoromethyl)-1,2,4-oxadiazol-3-yl]phenyl]methyl]-1,2,4-triazol-3-amine, methyl (Z)-3-methoxy-2-[2-methyl-5-[3-(trifluoromethyl)pyrazol-1-yl]phenoxy]prop-2-enoate, methyl (Z)-3-methoxy-2-[2-methyl-5-(3-propylpyrazol-1-yl)phenoxy]prop-2-enoate, methyl (Z)-2-[5-(3-isopropylpyrazol-1-yl)-2-methyl-phenoxy]-3-methoxy-prop-2-enoate, methyl (Z)-3-methoxy-2-[2-methyl-5-(4-propyltriazol-2-yl)phenoxy]prop-2-enoate, methyl (Z)-3-methoxy-2-[2-methyl-5-[4-(trifluoromethyl)triazol-2-yl]phenoxy]prop-2-enoate, methyl (Z)-2-(5-cyclohexyl-2-methyl-phenoxy)-3-methoxy-prop-2-enoate, methyl (Z)-2-(5-cyclopentyl-2-methyl-phenoxy)-3-methoxy-prop-2-enoate, methyl (Z)-2-[5-(4-cyclohexylthiazol-2-yl)-2-methyl-phenoxy]-3-methoxy-prop-2-enoate, methyl (Z)-2-[5-[4-(ethoxymethyl)thiazol-2-yl]-2-methyl-phenoxy]-3-methoxy-prop-2-enoate, methyl (Z)-2-[5-(4-bromothiazol-2-yl)-2-methyl-phenoxy]-3-methoxy-prop-2-enoate, methyl (Z)-3-methoxy-2-[2-methyl-5-[5-(trifluoromethyl)thiazol-2-yl]phenoxy]prop-2-enoate, TAEGRO®, Timorex Gold™, and metarylpicoxamid, wherein the weight ratio of component (A) to component (B) is from 15:1 to 1:30.

In another preferred composition according to the invention, component (A) is compound no. X.13, 2-[acetyl-(2,6-difluoro-4-pyridyl)amino]-N-cyclobutyl-5-methyl-thiazole-4-carboxamide or a salt, enantiomer, tautomer or N-oxide thereof, and component (B) is a compound selected from the group consisting of azoxystrobin, trifloxystrobin, metyltetraprole, difenoconazole, hexaconazole, propiconazole, prothioconazole, mefentrifluconazole, fenpropidin, fenpropimorph, fluxapyroxad, fluopyram, isopyrazam, sedaxane, benzovindiflupyr, pydiflumetofen, isoflucypram, isofetamid, pyrapropoyne, fluindapyr, fenpicoxamid, florylpicoxamid, acibenzolar-S-methyl, chlorothalonil, mancozeb, mandipropamid, oxathiapiprolin, fluazinam, fludioxonil, cyprodinil, metalaxyl-M, aminopyrifen, folpet, ipflufenoquin, quinofumelin, tricyclazole, pyroquilon, cyflufenamid, metrafenone, N'-[2-chloro-4-(2-fluorophenoxy)-5-methyl-phenyl]-N-ethyl-N-methyl-formamidine N'-[4-(2-bromophenoxy)-5-chloro-2-methyl-phenyl]-N-ethyl-N-methyl-formamidine, N-(1-benzyl-1,3-dimethyl-butyl)-8-fluoro-quinoline-3-carboxamide, N-(1-benzyl-3,3,3-trifluoro-1-methyl-propyl)-8-fluoro-quinoline-3-carboxamide, N-(1-benzyl-3-chloro-1-methyl-but-3-enyl)-8-fluoro-quinoline-3-carboxamide, 1-(6,7-dimethylpyrazolo[1,5-a]pyridin-3-yl)-4,4,5-trifluoro-3,3-dimethyl-isoquinoline, 4,4-difluoro-3,3-dimethyl-1-(7-methylpyrazolo[1,5-a]pyridin-3-yl)isoquinoline, 1-(6,7-dimethylpyrazolo[1,5-a]pyridin-3-yl)-4,4,6-trifluoro-3,3-dimethyl-isoquinoline, 1-(4,5-dimethylbenzimidazol-1-yl)-4,4,5-trifluoro-3,3-dimethyl-isoquinoline, 1-(4,5-dimethylbenzimidazol-1-yl)-4,4-difluoro-3,3-dimethyl-isoquinoline, 6-chloro-4,4-difluoro-3,3-dimethyl-1-(4-methylbenzimidazol-1-yl)isoquinoline, N'-[5-bromo-2-methyl-6-(1-methyl-2-propoxy-ethoxy)-3-pyridyl]-N-ethyl-N-methyl-formamidine, N'-[5-chloro-2-methyl-6-(1-methyl-2-propoxy-ethoxy)-3-pyridyl]-N-ethyl-N-methyl-formamidine, N'-[5-bromo-2-methyl-6-(1-methyl-2-propoxy-ethoxy)-3-pyridyl]-N-isopropyl-N-methyl-formamidine, N-isopropyl-N'-[5-methoxy-2-methyl-4-(2,2,2-trifluoro-1-hydroxy-1-phenyl-ethyl)phenyl]-N-methyl-formamidine, N-methoxy-N-[[4-[5-(trifluoromethyl)-1,2,4-oxadiazol-3-yl]phenyl]methyl]cyclopropanecarboxamide, N,2-dimethoxy-N-[[4-[5-(trifluoromethyl)-1,2,4-oxadiazol-3-yl]phenyl]methyl]propanamide, N-ethyl-2-methyl-N-[[4-[5-(trifluoromethyl)-1,2,4-oxadiazol-3-yl]phenyl]methyl]propanamide, 1-methoxy-3-methyl-1-[[4-[5-(trifluoromethyl)-1,2,4-oxadiazol-3-yl]phenyl]methyl]urea, 1,3-dimethoxy-1-[[4-[5-(trifluoromethyl)-1,2,4-oxadiazol-3-yl]phenyl]methyl]urea, 3-ethyl-1-methoxy-1-[[4-[5-(trifluoromethyl)-1,2,4-oxadiazol-3-yl]phenyl]methyl]urea, ethyl 1-[[4-[5-(trifluoromethyl)-1,2,4-oxadiazol-3-yl]phenyl]methyl]pyrazole-4-carboxylate, N,N-dimethyl-1-[[4-[5-(trifluoromethyl)-1,2,4-oxadiazol-3-yl]phenyl]methyl]-1,2,4-triazol-3-amine, methyl (Z)-3-methoxy-2-[2-methyl-5-[3-(trifluoromethyl)pyrazol-1-yl]phenoxy]prop-2-enoate, methyl (Z)-3-methoxy-2-[2-methyl-5-(3-propylpyrazol-1-yl)phenoxy]prop-2-enoate, methyl (Z)-2-[5-(3-isopropylpyrazol-1-yl)-2-methyl-phenoxy]-3-methoxy-prop-2-enoate, methyl (Z)-3-methoxy-2-[2-methyl-5-(4-propyltriazol-2-yl)phenoxy]prop-2-enoate, methyl (Z)-3-methoxy-2-[2-methyl-5-[4-(trifluoromethyl)triazol-2-yl]phenoxy]prop-2-enoate, methyl (Z)-2-(5-cyclohexyl-2-methyl-phenoxy)-3-methoxy-prop-2-enoate, methyl (Z)-2-(5-cyclopentyl-2-methyl-phenoxy)-3-methoxy-prop-2-enoate, methyl (Z)-2-[5-(4-cyclohexylthiazol-2-yl)-2-methyl-phenoxy]-3-methoxy-prop-2-enoate, methyl (Z)-2-[5-[4-(ethoxymethyl)thiazol-2-yl]-2-methyl-phenoxy]-3-methoxy-prop-2-enoate, methyl (Z)-2-[5-(4-bromothiazol-2-yl)-2-methyl-phenoxy]-3-methoxy-prop-2-enoate, methyl (Z)-3-methoxy-2-[2-methyl-5-[5-(trifluoromethyl)thiazol-2-yl]phenoxy]prop-2-enoate, TAEGRO®, Timorex Gold™, and metarylpicoxamid, wherein the weight ratio of component (A) to component (B) is from 15:1 to 1:30.

In another preferred composition according to the invention, component (A) is compound no. X.14, 2-[(2-benzyloxyacetyl)-(2,6-difluoro-4-pyridyl)amino]-N-(2,2-dimethylcyclobutyl)-5-methyl-thiazole-4-carboxamide or a salt, enantiomer, tautomer or N-oxide thereof, and component (B) is a compound selected from the group consisting of azoxystrobin, trifloxystrobin, metyltetraprole, difenoconazole, hexaconazole, propiconazole, prothioconazole, mefentrifluconazole, fenpropidin, fenpropimorph, fluxapyroxad, fluopyram, isopyrazam, sedaxane, benzovindiflupyr, pydiflumetofen, isoflucypram, isofetamid, pyrapropoyne, fluindapyr, fenpicoxamid, florylpicoxamid, acibenzolar-S-methyl, chlorothalonil, mancozeb, mandipropamid, oxathiapiprolin, fluazinam, fludioxonil, cyprodinil, metalaxyl-M, aminopyrifen, folpet, ipflufenoquin, quinofumelin, tricyclazole, pyroquilon, cyflufenamid, metrafenone, N'-[2-chloro-4-(2-fluorophenoxy)-5-methyl-phenyl]-N-ethyl-N-methyl-formamidine N'-[4-(2-bromophenoxy)-5-chloro-2-methyl-phenyl]-N-ethyl-N-methyl-formamidine, N-(1-benzyl-1,3-dimethyl-butyl)-8-fluoro-quinoline-3-carboxamide, N-(1-benzyl-3,3,3-trifluoro-1-methyl-propyl)-8-fluoro-quinoline-3-carboxamide, N-(1-benzyl-3-chloro-1-methyl-but-3-enyl)-8-fluoro-quinoline-3-carboxamide, 1-(6,7-dimethylpyrazolo[1,5-a]pyridin-3-yl)-4,4,5-trifluoro-3,3-dimethyl-isoquinoline, 4,4-difluoro-3,3-dimethyl-1-(7-methylpyrazolo[1,5-a]pyridin-3-yl)isoquinoline, 1-(6,7-dimethylpyrazolo[1,5-a]pyridin-3-yl)-4,4,6-trifluoro-3,3-dimethyl-isoquinoline, 1-(4,5-dimethylbenzimidazol-1-yl)-4,4,5-trifluoro-3,3-dimethyl-isoquinoline, 1-(4,5-dimethylbenzimidazol-1-yl)-4,4-difluoro-3,3-dimethyl-isoquinoline, 6-chloro-4,4-difluoro-3,3-dimethyl-1-(4-methylbenzimidazol-1-yl)isoquinoline, N'-[5-bromo-2-methyl-6-(1-methyl-2-propoxy-ethoxy)-3-pyridyl]-N-ethyl-N-methyl-formamidine, N'-[5-chloro-2-methyl-6-(1-methyl-2-propoxy-ethoxy)-3-pyridyl]-N-ethyl-N-methyl-formamidine, N'-[5-bromo-2-methyl-6-(1-methyl-2-propoxy-ethoxy)-3-pyridyl]-N-isopropyl-N-methyl-formamidine, N-isopropyl-N'-[5-methoxy-2-methyl-4-(2,2,2-trifluoro-1-hydroxy-1-phenyl-ethyl)phenyl]-N-methyl-formamidine, N-methoxy-N-[[4-[5-(trifluoromethyl)-1,2,4-oxadiazol-3-yl]phenyl]methyl]cyclopropanecarboxamide, N,2-dimethoxy-N-[[4-[5-(trifluoromethyl)-1,2,4-oxadiazol-3-yl]phenyl]methyl]propanamide, N-ethyl-2-methyl-N-[[4-[5-(trifluoromethyl)-1,2,4-oxadiazol-3-yl]phenyl]methyl]propanamide, 1-methoxy-3-methyl-1-[[4-[5-(trifluoromethyl)-1,2,4-oxadiazol-3-yl]phenyl]methyl]urea, 1,3-dimethoxy-1-[[4-[5-(trifluoromethyl)-1,2,4-oxadiazol-3-yl]phenyl]methyl]urea, 3-ethyl-1-methoxy-1-[[4-[5-(trifluoromethyl)-1,2,4-oxadiazol-3-yl]phenyl]methyl]urea, ethyl 1-[[4-[5-(trifluoromethyl)-1,2,4-oxadiazol-3-yl]phenyl]methyl]pyrazole-4-carboxylate, N,N-dimethyl-1-[[4-[5-(trifluoromethyl)-1,2,4-oxadiazol-3-yl]phenyl]methyl]-1,2,4-triazol-3-amine, methyl (Z)-3-methoxy-2-[2-methyl-5-[3-(trifluoromethyl)pyrazol-1-yl]phenoxy]prop-2-enoate, methyl (Z)-3-methoxy-2-[2-methyl-5-(3-propylpyrazol-1-yl)phenoxy]prop-2-enoate, methyl (Z)-2-[5-(3-isopropylpyrazol-1-yl)-2-methyl-phenoxy]-3-methoxy-prop-2-enoate, methyl (Z)-3-methoxy-2-[2-methyl-5-(4-propyltriazol-2-yl)phenoxy]prop-2-enoate, methyl (Z)-3-methoxy-2-[2-methyl-5-[4-(trifluoromethyl)triazol-2-yl]phenoxy]prop-2-enoate, methyl (Z)-2-(5-cyclohexyl-2-methyl-phenoxy)-3-methoxy-prop-2-enoate, methyl (Z)-2-(5-cyclopentyl-2-methyl-phenoxy)-3-methoxy-prop-2-enoate, methyl (Z)-2-[5-(4-cyclohexylthiazol-2-yl)-2-methyl-phenoxy]-3-methoxy-prop-2-enoate, methyl (Z)-2-[5-[4-(ethoxymethyl)thiazol-2-yl]-2-methyl-phenoxy]-3-methoxy-prop-2-enoate, methyl (Z)-2-[5-(4-bromothiazol-2-yl)-2-methyl-phenoxy]-3-methoxy-prop-2-enoate, methyl (Z)-3-methoxy-2-[2-methyl-5-[5-(trifluoromethyl)thiazol-2-yl]phenoxy]prop-2-enoate, TAEGRO®, Timorex Gold™, and metarylpicoxamid, wherein the weight ratio of component (A) to component (B) is from 15:1 to 1:30.

In another preferred composition according to the invention, component (A) is compound no. X.17, 2-[(2-chloroacetyl)-(2,6-difluoro-4-pyridyl)amino]-N-(2,2-dimethylcyclobutyl)-5-methyl-thiazole-4-carboxamide or a salt, enantiomer, tautomer or N-oxide thereof, and component (B) is a compound selected from the group consisting of azoxystrobin, trifloxystrobin, metyltetraprole, difenoconazole, hexaconazole, propiconazole, prothioconazole, mefentrifluconazole, fenpropidin, fenpropimorph, fluxapyroxad, fluopyram, isopyrazam, sedaxane, benzovindiflupyr, pydiflumetofen, isoflucypram, isofetamid, pyrapropoyne, fluindapyr, fenpicoxamid, florylpicoxamid, acibenzolar-S-methyl, chlorothalonil, mancozeb, mandipropamid, oxathiapiprolin, fluazinam, fludioxonil, cyprodinil, metalaxyl-M, aminopyrifen, folpet, ipflufenoquin, quinofumelin, tricyclazole, pyroquilon, cyflufenamid, metrafenone, N'-[2-chloro-4-(2-fluorophenoxy)-5-methyl-phenyl]-N-ethyl-N-methyl-formamidine N'-[4-(2-bromophenoxy)-5-chloro-2-methyl-phenyl]-N-ethyl-N-methyl-formamidine, N-(1-benzyl-1,3-dimethyl-butyl)-8-fluoro-quinoline-3-carboxamide, N-(1-benzyl-3,3,3-trifluoro-1-methyl-propyl)-8-fluoro-quinoline-3-carboxamide, N-(1-benzyl-3-chloro-1-methyl-but-3-enyl)-8-fluoro-quinoline-3-carboxamide, 1-(6,7-dimethylpyrazolo[1,5-a]pyridin-3-yl)-4,4,5-trifluoro-3,3-dimethyl-isoquinoline, 4,4-difluoro-3,3-dimethyl-1-(7-methylpyrazolo[1,5-a]pyridin-3-yl) isoquinoline, 1-(6,7-dimethylpyrazolo[1,5-a]pyridin-3-yl)-4,4,6-trifluoro-3,3-dimethyl-isoquinoline, 1-(4,5-dimethylbenzimidazol-1-yl)-4,4,5-trifluoro-3,3-dimethyl-isoquinoline, 1-(4,5-dimethylbenzimidazol-1-yl)-4,4-difluoro-3,3-dimethyl-isoquinoline, 6-chloro-4,4-difluoro-3,3-dimethyl-1-(4-methylbenzimidazol-1-yl)isoquinoline, N'-[5-bromo-2-methyl-6-(1-methyl-2-propoxy-ethoxy)-3-pyridyl]-N-ethyl-N-methyl-formamidine, N'-[5-chloro-2-methyl-6-(1-methyl-2-propoxy-ethoxy)-3-pyridyl]-N-ethyl-N-methyl-formamidine, N'-[5-bromo-2-methyl-6-(1-methyl-2-propoxy-ethoxy)-3-pyridyl]-N-isopropyl-N-methyl-formamidine, N-isopropyl-N'-[5-methoxy-2-methyl-4-(2,2,2-trifluoro-1-hydroxy-1-phenyl-ethyl) phenyl]-N-methyl-formamidine, N-methoxy-N-[[4-[5-(trifluoromethyl)-1,2,4-oxadiazol-3-yl]phenyl]methyl] cyclopropanecarboxamide, N,2-dimethoxy-N-[[4-[5-(trifluoromethyl)-1,2,4-oxadiazol-3-yl]phenyl]methyl] propanamide, N-ethyl-2-methyl-N-[[4-[5-(trifluoromethyl)-1,2,4-oxadiazol-3-yl]phenyl]methyl]propanamide, 1-methoxy-3-methyl-1-[[4-[5-(trifluoromethyl)-1,2,4-oxadiazol-3-yl]phenyl]methyl]urea, 1,3-dimethoxy-1-[[4-[5-(trifluoromethyl)-1,2,4-oxadiazol-3-yl]phenyl]methyl]urea, 3-ethyl-1-methoxy-1-[[4-[5-(trifluoromethyl)-1,2,4-oxadiazol-3-yl]phenyl]methyl]urea, ethyl 1-[[4-[5-(trifluoromethyl)-1,2,4-oxadiazol-3-yl]phenyl]methyl]pyrazole-4-carboxylate, N,N-dimethyl-1-[[4-[5-(trifluoromethyl)-1,2,4-oxadiazol-3-yl]phenyl]methyl]-1,2,4-triazol-3-amine, methyl (Z)-3-methoxy-2-[2-methyl-5-[3-(trifluoromethyl) pyrazol-1-yl]phenoxy]prop-2-enoate, methyl (Z)-3-methoxy-2-[2-methyl-5-(3-propylpyrazol-1-yl)phenoxy] prop-2-enoate, methyl (Z)-2-[5-(3-isopropylpyrazol-1-yl)-2-methyl-phenoxy]-3-methoxy-prop-2-enoate, methyl (Z)-3-methoxy-2-[2-methyl-5-(4-propyltriazol-2-yl)phenoxy] prop-2-enoate, methyl (Z)-3-methoxy-2-[2-methyl-5-[4-(trifluoromethyl)triazol-2-yl]phenoxy]prop-2-enoate, methyl (Z)-2-(5-cyclohexyl-2-methyl-phenoxy)-3-methoxy-prop-2-enoate, methyl (Z)-2-(5-cyclopentyl-2-methyl-phenoxy)-3-methoxy-prop-2-enoate, methyl (Z)-2-[5-(4-cyclohexylthiazol-2-yl)-2-methyl-phenoxy]-3-methoxy-prop-2-enoate, methyl (Z)-2-[5-[4-(ethoxymethyl) thiazol-2-yl]-2-methyl-phenoxy]-3-methoxy-prop-2-enoate, methyl (Z)-2-[5-(4-bromothiazol-2-yl)-2-methyl-phenoxy]-3-methoxy-prop-2-enoate, methyl (Z)-3-methoxy-2-[2-methyl-5-[5-(trifluoromethyl)thiazol-2-yl]phenoxy]prop-2-enoate, TAEGRO®, Timorex Gold™, and metarylpicoxamid, wherein the weight ratio of component (A) to component (B) is from 15:1 to 1:30.

In another preferred composition according to the invention, component (A) is compound no. X.18, methyl 3-[(2,6-difluoro-4-pyridyl)-[4-[(2,2-dimethyl cyclobutyl)carbamoyl]-5-methyl-thiazol-2-yl]amino]-3-oxo-propanoate or a salt, enantiomer, tautomer or N-oxide thereof, and component (B) is a compound selected from the group consisting of azoxystrobin, trifloxystrobin, metyltetraprole, difenoconazole, hexaconazole, propiconazole, prothioconazole, mefentrifluconazole, fenpropidin, fenpropimorph, fluxapyroxad, fluopyram, isopyrazam, sedaxane, benzovindiflupyr, pydiflumetofen, isoflucypram, isofetamid, pyrapropoyne, fluindapyr, fenpicoxamid, florylpicoxamid, acibenzolar-S-methyl, chlorothalonil, mancozeb, mandipropamid, oxathiapiprolin, fluazinam, fludioxonil, cyprodinil, metalaxyl-M, aminopyrifen, folpet, ipflufenoquin, quinofumelin, tricyclazole, pyroquilon, cyflufenamid, metrafenone, N'-[2-chloro-4-(2-fluorophenoxy)-5-methyl-phenyl]-N-ethyl-N-methyl-formamidine N'-[4-(2-bromophenoxy)-5-chloro-2-methyl-phenyl]-N-ethyl-N-methyl-formamidine, N-(1-benzyl-1,3-dimethyl-butyl)-8-fluoro-quinoline-3-carboxamide, N-(1-benzyl-3,3,3-trifluoro-1-methyl-propyl)-8-fluoro-quinoline-3-carboxamide, N-(1-benzyl-3-chloro-1-methyl-but-3-enyl)-8-fluoro-quinoline-3-carboxamide, 1-(6,7-dimethylpyrazolo[1,5-a]pyridin-3-yl)-4,4,5-trifluoro-3,3-dimethyl-isoquinoline, 4,4-difluoro-3,3-dimethyl-1-(7-methylpyrazolo[1,5-a]pyridin-3-yl)isoquinoline, 1-(6,7-dimethylpyrazolo[1,5-a]pyridin-3-yl)-4,4,6-trifluoro-3,3-dimethyl-isoquinoline, 1-(4,5-dimethylbenzimidazol-1-yl)-4,4,5-trifluoro-3,3-dimethyl-isoquinoline, 1-(4,5-dimethylbenzimidazol-1-yl)-4,4-difluoro-3,3-dimethyl-isoquinoline, 6-chloro-4,4-difluoro-3,3-dimethyl-1-(4-methylbenzimidazol-1-yl)isoquinoline, N'-[5-bromo-2-methyl-6-(1-methyl-2-propoxy-ethoxy)-3-pyridyl]-N-ethyl-N-methyl-formamidine, N'-[5-chloro-2-methyl-6-(1-methyl-2-propoxy-ethoxy)-3-pyridyl]-N-ethyl-N-methyl-formamidine, N'-[5-bromo-2-methyl-6-(1-methyl-2-propoxy-ethoxy)-3-pyridyl]-N-isopropyl-N-methyl-formamidine, N-isopropyl-N'-[5-methoxy-2-methyl-4-(2,2,2-trifluoro-1-hydroxy-1-phenyl-ethyl)phenyl]-N-methyl-formamidine, N-methoxy-N-[[4-[5-(trifluoromethyl)-1,2,4-oxadiazol-3-yl]phenyl]methyl]cyclopropanecarboxamide, N,2-dimethoxy-N-[[4-[5-(trifluoromethyl)-1,2,4-oxadiazol-3-yl]phenyl]methyl]propanamide, N-ethyl-2-methyl-N-[[4-[5-(trifluoromethyl)-1,2,4-oxadiazol-3-yl]phenyl]methyl] propanamide, 1-methoxy-3-methyl-1-[[4-[5-(trifluoromethyl)-1,2,4-oxadiazol-3-yl]phenyl]methyl]urea, 1,3-dimethoxy-1-[[4-[5-(trifluoromethyl)-1,2,4-oxadiazol-3-yl]phenyl]methyl]urea, 3-ethyl-1-methoxy-1-[[4-[5-(trifluoromethyl)-1,2,4-oxadiazol-3-yl]phenyl]methyl]urea, ethyl 1-[[4-[5-(trifluoromethyl)-1,2,4-oxadiazol-3-yl]phenyl]methyl]pyrazole-4-carboxylate, N,N-dimethyl-1-[[4-[5-(trifluoromethyl)-1,2,4-oxadiazol-3-yl]phenyl]methyl]-1,2,4-triazol-3-amine, methyl (Z)-3-methoxy-2-[2-methyl-5-[3-(trifluoromethyl)pyrazol-1-yl]phenoxy]prop-2-enoate, methyl (Z)-3-methoxy-2-[2-methyl-5-(3-propylpyrazol-1-yl)phenoxy]prop-2-enoate, methyl (Z)-2-[5-(3-isopropylpyrazol-1-yl)-2-methyl-phenoxy]-3-methoxy-prop-2-enoate, methyl (Z)-3-methoxy-2-[2-methyl-5-(4-propyltriazol-2-yl)phenoxy]prop-2-enoate, methyl (Z)-3-methoxy-2-[2-methyl-5-[4-(trifluoromethyl)triazol-2-yl]phenoxy]prop-2-enoate, methyl (Z)-2-(5-cyclohexyl-2-methyl-phenoxy)-3-methoxy-prop-2-enoate, methyl (Z)-2-(5-cyclopentyl-2-methyl-phenoxy)-3-methoxy-prop-2-enoate, methyl (Z)-2-

[5-(4-cyclohexylthiazol-2-yl)-2-methyl-phenoxy]-3-methoxy-prop-2-enoate, methyl (Z)-2-[5-[4-(ethoxymethyl)thiazol-2-yl]-2-methyl-phenoxy]-3-methoxy-prop-2-enoate, methyl (Z)-2-[5-(4-bromothiazol-2-yl)-2-methyl-phenoxy]-3-methoxy-prop-2-enoate, methyl (Z)-3-methoxy-2-[2-methyl-5-[5-(trifluoromethyl)thiazol-2-yl]phenoxy]prop-2-enoate, TAEGRO®, Timorex Gold™, and metarylpicoxamid, wherein the weight ratio of component (A) to component (B) is from 15:1 to 1:30.

In another preferred composition according to the invention, component (A) is compound no. X.19, 2-[(2,6-difluoro-4-pyridyl)-(furan-2-carbonyl)amino]-N-(2,2-dimethyl cyclobutyl)-5-methyl-thiazole-4-carboxamide or a salt, enantiomer, tautomer or N-oxide thereof, and component (B) is a compound selected from the group consisting of azoxystrobin, trifloxystrobin, metyltetraprole, difenoconazole, hexaconazole, propiconazole, prothioconazole, mefentrifluconazole, fenpropidin, fenpropimorph, fluxapyroxad, fluopyram, isopyrazam, sedaxane, benzovindiflupyr, pydiflumetofen, isoflucypram, isofetamid, pyrapropoyne, fluindapyr, fenpicoxamid, florylpicoxamid, acibenzolar-S-methyl, chlorothalonil, mancozeb, mandipropamid, oxathiapiprolin, fluazinam, fludioxonil, cyprodinil, metalaxyl-M, aminopyrifen, folpet, ipflufenoquin, quinofumelin, tricyclazole, pyroquilon, cyflufenamid, metrafenone, N'-[2-chloro-4-(2-fluorophenoxy)-5-methyl-phenyl]-N-ethyl-N-methyl-formamidine N'-[4-(2-bromophenoxy)-5-chloro-2-methyl-phenyl]-N-ethyl-N-methyl-formamidine, N-(1-benzyl-1,3-dimethyl-butyl)-8-fluoro-quinoline-3-carboxamide, N-(1-benzyl-3,3,3-trifluoro-1-methyl-propyl)-8-fluoro-quinoline-3-carboxamide, N-(1-benzyl-3-chloro-1-methyl-but-3-enyl)-8-fluoro-quinoline-3-carboxamide, 1-(6,7-dimethylpyrazolo[1,5-a]pyridin-3-yl)-4,4,5-trifluoro-3,3-dimethyl-isoquinoline, 4,4-difluoro-3,3-dimethyl-1-(7-methylpyrazolo[1,5-a]pyridin-3-yl)isoquinoline, 1-(6,7-dimethylpyrazolo[1,5-a]pyridin-3-yl)-4,4,6-trifluoro-3,3-dimethyl-isoquinoline, 1-(4,5-dimethylbenzimidazol-1-yl)-4,4,5-trifluoro-3,3-dimethyl-isoquinoline, 1-(4,5-dimethylbenzimidazol-1-yl)-4,4-difluoro-3,3-dimethyl-isoquinoline, 6-chloro-4,4-difluoro-3,3-dimethyl-1-(4-methylbenzimidazol-1-yl)isoquinoline, N'-[5-bromo-2-methyl-6-(1-methyl-2-propoxy-ethoxy)-3-pyridyl]-N-ethyl-N-methyl-formamidine, N'-[5-chloro-2-methyl-6-(1-methyl-2-propoxy-ethoxy)-3-pyridyl]-N-ethyl-N-methyl-formamidine, N'-[5-bromo-2-methyl-6-(1-methyl-2-propoxy-ethoxy)-3-pyridyl]-N-isopropyl-N-methyl-formamidine, N-isopropyl-N'-[5-methoxy-2-methyl-4-(2,2,2-trifluoro-1-hydroxy-1-phenyl-ethyl)phenyl]-N-methyl-formamidine, N-methoxy-N-[[4-[5-(trifluoromethyl)-1,2,4-oxadiazol-3-yl]phenyl]methyl]cyclopropanecarboxamide, N,2-dimethoxy-N-[[4-[5-(trifluoromethyl)-1,2,4-oxadiazol-3-yl]phenyl]methyl]propanamide, N-ethyl-2-methyl-N-[[4-[5-(trifluoromethyl)-1,2,4-oxadiazol-3-yl]phenyl]methyl]propanamide, 1-methoxy-3-methyl-1-[[4-[5-(trifluoromethyl)-1,2,4-oxadiazol-3-yl]phenyl]methyl]urea, 1,3-dimethoxy-1-[[4-[5-(trifluoromethyl)-1,2,4-oxadiazol-3-yl]phenyl]methyl]urea, 3-ethyl-1-methoxy-1-[[4-[5-(trifluoromethyl)-1,2,4-oxadiazol-3-yl]phenyl]methyl]urea, ethyl 1-[[4-[5-(trifluoromethyl)-1,2,4-oxadiazol-3-yl]phenyl]methyl]pyrazole-4-carboxylate, N,N-dimethyl-1-[[4-[5-(trifluoromethyl)-1,2,4-oxadiazol-3-yl]phenyl]methyl]-1,2,4-triazol-3-amine, methyl (Z)-3-methoxy-2-[2-methyl-5-[3-(trifluoromethyl)pyrazol-1-yl]phenoxy]prop-2-enoate, methyl (Z)-3-methoxy-2-[2-methyl-5-(3-propylpyrazol-1-yl)phenoxy]prop-2-enoate, methyl (Z)-2-[5-(3-isopropylpyrazol-1-yl)-2-methyl-phenoxy]-3-methoxy-prop-2-enoate, methyl (Z)-3-methoxy-2-[2-methyl-5-(4-propyltriazol-2-yl)phenoxy]prop-2-enoate, methyl (Z)-3-methoxy-2-[2-methyl-5-[4-(trifluoromethyl)triazol-2-yl]phenoxy]prop-2-enoate, methyl (Z)-2-(5-cyclohexyl-2-methyl-phenoxy)-3-methoxy-prop-2-enoate, methyl (Z)-2-(5-cyclopentyl-2-methyl-phenoxy)-3-methoxy-prop-2-enoate, methyl (Z)-2-[5-(4-cyclohexylthiazol-2-yl)-2-methyl-phenoxy]-3-methoxy-prop-2-enoate, methyl (Z)-2-[5-[4-(ethoxymethyl)thiazol-2-yl]-2-methyl-phenoxy]-3-methoxy-prop-2-enoate, methyl (Z)-2-[5-(4-bromothiazol-2-yl)-2-methyl-phenoxy]-3-methoxy-prop-2-enoate, methyl (Z)-3-methoxy-2-[2-methyl-5-[5-(trifluoromethyl)thiazol-2-yl]phenoxy]prop-2-enoate, TAEGRO®, Timorex Gold™, and metarylpicoxamid, wherein the weight ratio of component (A) to component (B) is from 15:1 to 1:30.

In another preferred composition according to the invention, component (A) is compound no. X.22, S-isopropyl N-(2,6-difluoro-4-pyridyl)-N-[4-[(2,2-dimethyl cyclobutyl)carbamoyl]-5-methyl-thiazol-2-yl]carbamothioate or a salt, enantiomer, tautomer or N-oxide thereof, and component (B) is a compound selected from the group consisting of azoxystrobin, trifloxystrobin, metyltetraprole, difenoconazole, hexaconazole, propiconazole, prothioconazole, mefentrifluconazole, fenpropidin, fenpropimorph, fluxapyroxad, fluopyram, isopyrazam, sedaxane, benzovindiflupyr, pydiflumetofen, isoflucypram, isofetamid, pyrapropoyne, fluindapyr, fenpicoxamid, florylpicoxamid, acibenzolar-S-methyl, chlorothalonil, mancozeb, mandipropamid, oxathiapiprolin, fluazinam, fludioxonil, cyprodinil, metalaxyl-M, aminopyrifen, folpet, ipflufenoquin, quinofumelin, tricyclazole, pyroquilon, cyflufenamid, metrafenone, N'-[2-chloro-4-(2-fluorophenoxy)-5-methyl-phenyl]-N-ethyl-N-methyl-formamidine N'-[4-(2-bromophenoxy)-5-chloro-2-methyl-phenyl]-N-ethyl-N-methyl-formamidine, N-(1-benzyl-1,3-dimethyl-butyl)-8-fluoro-quinoline-3-carboxamide, N-(1-benzyl-3,3,3-trifluoro-1-methyl-propyl)-8-fluoro-quinoline-3-carboxamide, N-(1-benzyl-3-chloro-1-methyl-but-3-enyl)-8-fluoro-quinoline-3-carboxamide, 1-(6,7-dimethylpyrazolo[1,5-a]pyridin-3-yl)-4,4,5-trifluoro-3,3-dimethyl-isoquinoline, 4,4-difluoro-3,3-dimethyl-1-(7-methylpyrazolo[1,5-a]pyridin-3-yl)isoquinoline, 1-(6,7-dimethylpyrazolo[1,5-a]pyridin-3-yl)-4,4,6-trifluoro-3,3-dimethyl-isoquinoline, 1-(4,5-dimethylbenzimidazol-1-yl)-4,4,5-trifluoro-3,3-dimethyl-isoquinoline, 1-(4,5-dimethylbenzimidazol-1-yl)-4,4-difluoro-3,3-dimethyl-isoquinoline, 6-chloro-4,4-difluoro-3,3-dimethyl-1-(4-methylbenzimidazol-1-yl)isoquinoline, N'-[5-bromo-2-methyl-6-(1-methyl-2-propoxy-ethoxy)-3-pyridyl]-N-ethyl-N-methyl-formamidine, N'-[5-chloro-2-methyl-6-(1-methyl-2-propoxy-ethoxy)-3-pyridyl]-N-ethyl-N-methyl-formamidine, N'-[5-bromo-2-methyl-6-(1-methyl-2-propoxy-ethoxy)-3-pyridyl]-N-isopropyl-N-methyl-formamidine, N-isopropyl-N'-[5-methoxy-2-methyl-4-(2,2,2-trifluoro-1-hydroxy-1-phenyl-ethyl)phenyl]-N-methyl-formamidine, N-methoxy-N-[[4-[5-(trifluoromethyl)-1,2,4-oxadiazol-3-yl]phenyl]methyl]cyclopropanecarboxamide, N,2-dimethoxy-N-[[4-[5-(trifluoromethyl)-1,2,4-oxadiazol-3-yl]phenyl]methyl]propanamide, N-ethyl-2-methyl-N-[[4-[5-(trifluoromethyl)-1,2,4-oxadiazol-3-yl]phenyl]methyl]propanamide, 1-methoxy-3-methyl-1-[[4-[5-(trifluoromethyl)-1,2,4-oxadiazol-3-yl]phenyl]methyl]urea, 1,3-dimethoxy-1-[[4-[5-(trifluoromethyl)-1,2,4-oxadiazol-3-yl]phenyl]methyl]urea, 3-ethyl-1-methoxy-1-[[4-[5-(trifluoromethyl)-1,2,4-oxadiazol-3-yl]phenyl]methyl]urea, ethyl 1-[[4-[5-(trifluoromethyl)-1,2,4-oxadiazol-3-yl]phenyl]methyl]pyrazole-4-carboxylate, N,N-dimethyl-1-[[4-[5-(trifluoromethyl)-1,2,4- oxadiazol-3-yl]phenyl]methyl]-1,2,4-triazol-3-amine, methyl (Z)-3-methoxy-2-[2-methyl-5-[3-(trifluoromethyl)pyrazol-1-yl]phenoxy]prop-2-enoate, methyl (Z)-3-methoxy-2-[2-methyl-5-(3-propylpyrazol-1-yl)phenoxy]prop-2-enoate, methyl (Z)-2-[5-(3-isopropylpyrazol-1-yl)-2-methyl-phenoxy]-3-methoxy-prop-2-enoate, methyl (Z)-3-methoxy-2-[2-methyl-5-(4-propyltriazol-2-yl)phenoxy]prop-2-enoate, methyl (Z)-3-methoxy-2-[2-methyl-5-[4-(trifluoromethyl)triazol-2-yl]phenoxy]prop-2-enoate, methyl (Z)-2-(5-cyclohexyl-2-methyl-phenoxy)-3-methoxy-prop-2-enoate, methyl (Z)-2-(5-cyclopentyl-2-methyl-phenoxy)-3-methoxy-prop-2-enoate, methyl (Z)-2-[5-(4-cyclohexylthiazol-2-yl)-2-methyl-phenoxy]-3-methoxy-prop-2-enoate, methyl (Z)-2-[5-[4-(ethoxymethyl)thiazol-2-yl]-2-methyl-phenoxy]-3-methoxy-prop-2-enoate, methyl (Z)-2-[5-(4-bromothiazol-2-yl)-2-methyl-phenoxy]-3-methoxy-prop-2-enoate, methyl (Z)-3-methoxy-2-[2-methyl-5-[5-(trifluoromethyl)thiazol-2-yl]phenoxy]prop-2-enoate, TAEGRO®, Timorex Gold™, and metarylpicoxamid, wherein the weight ratio of component (A) to component (B) is from 15:1 to 1:30.

In another preferred composition according to the invention, component (A) is compound no. X.24, 2-[cyclopropane carbonyl-(2,6-difluoro-4-pyridyl)amino]-N-(2,2-dimethyl cyclobutyl)-5-methyl-thiazole-4-carboxamide or a salt, enantiomer, tautomer or N-oxide thereof, and component (B) is a compound selected from the group consisting of azoxystrobin, trifloxystrobin, metyltetraprole, difenoconazole, hexaconazole, propiconazole, prothioconazole, mefentrifluconazole, fenpropidin, fenpropimorph, fluxapyroxad, fluopyram, isopyrazam, sedaxane, benzovindiflupyr, pydiflumetofen, isoflucypram, isofetamid, pyrapropoyne, fluindapyr, fenpicoxamid, florylpicoxamid, acibenzolar-S-methyl, chlorothalonil, mancozeb, mandipropamid, oxathiapiprolin, fluazinam, fludioxonil, cyprodinil, metalaxyl-M, aminopyrifen, folpet, ipflufenoquin, quinofumelin, tricyclazole, pyroquilon, cyflufenamid, metrafenone, N'-[2-chloro-4-(2-fluorophenoxy)-5-methyl-phenyl]-N-ethyl-N-methyl-formamidine N'-[4-(2-bromophenoxy)-5-chloro-2-methyl-phenyl]-N-ethyl-N-methyl-formamidine, N-(1-benzyl-1,3-dimethyl-butyl)-8-fluoro-quinoline-3-carboxamide, N-(1-benzyl-3,3,3-trifluoro-1-methyl-propyl)-8-fluoro-quinoline-3-carboxamide, N-(1-benzyl-3-chloro-1-methyl-but-3-enyl)-8-fluoro-quinoline-3-carboxamide, 1-(6,7-dimethylpyrazolo[1,5-a]pyridin-3-yl)-4,4,5-trifluoro-3,3-dimethyl-isoquinoline, 4,4-difluoro-3,3-dimethyl-1-(7-methylpyrazolo[1,5-a]pyridin-3-yl)isoquinoline, 1-(6,7-dimethylpyrazolo[1,5-a]pyridin-3-yl)-4,4,6-trifluoro-3,3-dimethyl-isoquinoline, 1-(4,5-dimethylbenzimidazol-1-yl)-4,4,5-trifluoro-3,3-dimethyl-isoquinoline, 1-(4,5-dimethylbenzimidazol-1-yl)-4,4-difluoro-3,3-dimethyl-isoquinoline, 6-chloro-4,4-difluoro-3,3-dimethyl-1-(4-methylbenzimidazol-1-yl)isoquinoline, N'-[5-bromo-2-methyl-6-(1-methyl-2-propoxy-ethoxy)-3-pyridyl]-N-ethyl-N-methyl-formamidine, N'-[5-chloro-2-methyl-6-(1-methyl-2-propoxy-ethoxy)-3-pyridyl]-N-ethyl-N-methyl-formamidine, N'-[5-bromo-2-methyl-6-(1-methyl-2-propoxy-ethoxy)-3-pyridyl]-N-isopropyl-N-methyl-formamidine, N-isopropyl-N'-[5-methoxy-2-methyl-4-(2,2,2-trifluoro-1-hydroxy-1-phenyl-ethyl)phenyl]-N-methyl-formamidine, N-methoxy-N-[[4-[5-(trifluoromethyl)-1,2,4-oxadiazol-3-yl]phenyl]methyl]cyclopropanecarboxamide, N,2-dimethoxy-N-[[4-[5-(trifluoromethyl)-1,2,4-oxadiazol-3-yl]phenyl]methyl]propanamide, N-ethyl-2-methyl-N-[[4-[5-(trifluoromethyl)-1,2,4-oxadiazol-3-yl]phenyl]methyl]propanamide, 1-methoxy-3-methyl-1-[[4-[5-(trifluoromethyl)-1,2,4-oxadiazol-3-yl]phenyl]methyl]urea, 1,3-dimethoxy-1-[[4-[5-(trifluoromethyl)-1,2,4-oxadiazol-3-yl]phenyl]methyl]urea, 3-ethyl-1-methoxy-1-[[4-[5-(trifluoromethyl)-1,2,4-oxadiazol-3-yl]phenyl]methyl]urea, ethyl 1-[[4-[5-(trifluoromethyl)-1,2,4-oxadiazol-3-yl]phenyl]methyl]pyrazole-4-carboxylate, N,N-dimethyl-1-[[4-[5-(trifluoromethyl)-1,2,4-oxadiazol-3-yl]phenyl]methyl]-1,2,4-triazol-3-amine, methyl (Z)-3-methoxy-2-[2-methyl-5-[3-(trifluoromethyl)pyrazol-1-yl]phenoxy]prop-2-enoate, methyl (Z)-3-methoxy-2-[2-methyl-5-(3-propylpyrazol-1-yl)phenoxy]prop-2-enoate, methyl (Z)-2-[5-(3-isopropylpyrazol-1-yl)-2-methyl-phenoxy]-3-methoxy-prop-2-enoate, methyl (Z)-3-methoxy-2-[2-methyl-5-(4-propyltriazol-2-yl)phenoxy]prop-2-enoate, methyl (Z)-3-methoxy-2-[2-methyl-5-[4-(trifluoromethyl)triazol-2-yl]phenoxy]prop-2-enoate, methyl (Z)-2-(5-cyclohexyl-2-methyl-phenoxy)-3-methoxy-prop-2-enoate, methyl (Z)-2-(5-cyclopentyl-2-methyl-phenoxy)-3-methoxy-prop-2-enoate, methyl (Z)-2-[5-(4-cyclohexylthiazol-2-yl)-2-methyl-phenoxy]-3-methoxy-prop-2-enoate, methyl (Z)-2-[5-[4-(ethoxymethyl)thiazol-2-yl]-2-methyl-phenoxy]-3-methoxy-prop-2-enoate, methyl (Z)-2-[5-(4-bromothiazol-2-yl)-2-methyl-phenoxy]-3-methoxy-prop-2-enoate, methyl (Z)-3-methoxy-2-[2-methyl-5-[5-(trifluoromethyl)thiazol-2-yl]phenoxy]prop-2-enoate, TAEGRO®, Timorex Gold™, and metarylpicoxamid, wherein the weight ratio of component (A) to component (B) is from 15:1 to 1:30.

In another preferred composition according to the invention, component (A) is compound no. X.26, phenyl N-(2,6-difluoro-4-pyridyl)-N-[4-[(2,2-dimethylcyclobutyl)carbamoyl]-5-methyl-thiazol-2-yl]carbamate or a salt, enantiomer, tautomer or N-oxide thereof, and component (B) is a compound selected from the group consisting of azoxystrobin, trifloxystrobin, metyltetraprole, difenoconazole, hexaconazole, propiconazole, prothioconazole, mefentrifluconazole, fenpropidin, fenpropimorph, fluxapyroxad, fluopyram, isopyrazam, sedaxane, benzovindiflupyr, pydiflumetofen, isoflucypram, isofetamid, pyrapropoyne, fluindapyr, fenpicoxamid, florylpicoxamid, acibenzolar-S-methyl, chlorothalonil, mancozeb, mandipropamid, oxathiapiprolin, fluazinam, fludioxonil, cyprodinil, metalaxyl-M, aminopyrifen, folpet, ipflufenoquin, quinofumelin, tricyclazole, pyroquilon, cyflufenamid, metrafenone, N'-[2-chloro-4-(2-fluorophenoxy)-5-methyl-phenyl]-N-ethyl-N-methyl-formamidine N'-[4-(2-bromophenoxy)-5-chloro-2-methyl-phenyl]-N-ethyl-N-methyl-formamidine, N-(1-benzyl-1,3-dimethyl-butyl)-8-fluoro-quinoline-3-carboxamide, N-(1-benzyl-3,3,3-trifluoro-1-methyl-propyl)-8-fluoro-quinoline-3-carboxamide, N-(1-benzyl-3-chloro-1-methyl-but-3-enyl)-8-fluoro-quinoline-3-carboxamide, 1-(6,7-dimethylpyrazolo[1,5-a]pyridin-3-yl)-4,4,5-trifluoro-3,3-dimethyl-isoquinoline, 4,4-difluoro-3,3-dimethyl-1-(7-methylpyrazolo[1,5-a]pyridin-3-yl)isoquinoline, 1-(6,7-dimethylpyrazolo[1,5-a]pyridin-3-yl)-4,4,6-trifluoro-3,3-dimethyl-isoquinoline, 1-(4,5-dimethylbenzimidazol-1-yl)-4,4,5-trifluoro-3,3-dimethyl-isoquinoline, 1-(4,5-dimethylbenzimidazol-1-yl)-4,4-difluoro-3,3-dimethyl-isoquinoline, 6-chloro-4,4-difluoro-3,3-dimethyl-1-(4-methylbenzimidazol-1-yl)isoquinoline, N'-[5-bromo-2-methyl-6-(1-methyl-2-propoxy-ethoxy)-3-pyridyl]-N-ethyl-N-methyl-formamidine, N'-[5-chloro-2-methyl-6-(1-methyl-2-propoxy-ethoxy)-3-pyridyl]-N-ethyl-N-methyl-formamidine, N'-[5-bromo-2-methyl-6-(1-methyl-2-propoxy-ethoxy)-3-pyridyl]-N-isopropyl-N-methyl-formamidine, N-isopropyl-N'-[5-methoxy-2-methyl-4-(2,2,2-trifluoro-1-hydroxy-1-phenyl-ethyl)phenyl]-N-methyl-formamidine, N-methoxy-N-[[4-[5-(trifluoromethyl)-1,2,4- oxadiazol-3-yl]phenyl]methyl]cyclopropanecarboxamide, N,2-dimethoxy-N-[[4-[5-(trifluoromethyl)-1,2,4-oxadiazol-3-yl]phenyl]methyl]propanamide, N-ethyl-2-methyl-N-[[4-[5-(trifluoromethyl)-1,2,4-oxadiazol-3-yl]phenyl]methyl]propanamide, 1-methoxy-3-methyl-1-[[4-[5-(trifluoromethyl)-1,2,4-oxadiazol-3-yl]phenyl]methyl]urea, 1,3-dimethoxy-1-[[4-[5-(trifluoromethyl)-1,2,4-oxadiazol-3-yl]phenyl]methyl]urea, 3-ethyl-1-methoxy-1-[[4-[5-(trifluoromethyl)-1,2,4-oxadiazol-3-yl]phenyl]methyl]urea, ethyl 1-[[4-[5-(trifluoromethyl)-1,2,4-oxadiazol-3-yl]phenyl]methyl]pyrazole-4-carboxylate, N,N-dimethyl-1-[[4-[5-(trifluoromethyl)-1,2,4-oxadiazol-3-yl]phenyl]methyl]-1,2,4-triazol-3-amine, methyl (Z)-3-methoxy-2-[2-methyl-5-[3-(trifluoromethyl)pyrazol-1-yl]phenoxy]prop-2-enoate, methyl (Z)-3-methoxy-2-[2-methyl-5-(3-propylpyrazol-1-yl)phenoxy]prop-2-enoate, methyl (Z)-2-[5-(3-isopropylpyrazol-1-yl)-2-methyl-phenoxy]-3-methoxy-prop-2-enoate, methyl (Z)-3-methoxy-2-[2-methyl-5-(4-propyltriazol-2-yl)phenoxy]prop-2-enoate, methyl (Z)-3-methoxy-2-[2-methyl-5-[4-(trifluoromethyl)triazol-2-yl]phenoxy]prop-2-enoate, methyl (Z)-2-(5-cyclohexyl-2-methyl-phenoxy)-3-methoxy-prop-2-enoate, methyl (Z)-2-(5-cyclopentyl-2-methyl-phenoxy)-3-methoxy-prop-2-enoate, methyl (Z)-2-[5-(4-cyclohexylthiazol-2-yl)-2-methyl-phenoxy]-3-methoxy-prop-2-enoate, methyl (Z)-2-[5-[4-(ethoxymethyl)thiazol-2-yl]-2-methyl-phenoxy]-3-methoxy-prop-2-enoate, methyl (Z)-2-[5-(4-bromothiazol-2-yl)-2-methyl-phenoxy]-3-methoxy-prop-2-enoate, methyl (Z)-3-methoxy-2-[2-methyl-5-[5-(trifluoromethyl)thiazol-2-yl]phenoxy]prop-2-enoate, TAEGRO®, Timorex Gold™, and metarylpicoxamid, wherein the weight ratio of component (A) to component (B) is from 15:1 to 1:30.

In another preferred composition according to the invention, component (A) is compound no. X.29, 2-[(2,6-difluoro-4-pyridyl)-(2-methoxyacetyl)amino]-N-(2,2-dimethyl cyclobutyl)-5-methyl-thiazole-4-carboxamide or a salt, enantiomer, tautomer or N-oxide thereof, and component (B) is a compound selected from the group consisting of azoxystrobin, trifloxystrobin, metyltetraprole, difenoconazole, hexaconazole, propiconazole, prothioconazole, mefentrifluconazole, fenpropidin, fenpropimorph, fluxapyroxad, fluopyram, isopyrazam, sedaxane, benzovindiflupyr, pydiflumetofen, isoflucypram, isofetamid, pyrapropoyne, fluindapyr, fenpicoxamid, florylpicoxamid, acibenzolar-S-methyl, chlorothalonil, mancozeb, mandipropamid, oxathiapiprolin, fluazinam, fludioxonil, cyprodinil, metalaxyl-M, aminopyrifen, folpet, ipflufenoquin, quinofumelin, tricyclazole, pyroquilon, cyflufenamid, metrafenone, N'-[2-chloro-4-(2-fluorophenoxy)-5-methyl-phenyl]-N-ethyl-N-methyl-formamidine N'-[4-(2-bromophenoxy)-5-chloro-2-methyl-phenyl]-N-ethyl-N-methyl-formamidine, N-(1-benzyl-1,3-dimethyl-butyl)-8-fluoro-quinoline-3-carboxamide, N-(1-benzyl-3,3,3-trifluoro-1-methyl-propyl)-8-fluoro-quinoline-3-carboxamide, N-(1-benzyl-3-chloro-1-methyl-but-3-enyl)-8-fluoro-quinoline-3-carboxamide, 1-(6,7-dimethylpyrazolo[1,5-a]pyridin-3-yl)-4,4,5-trifluoro-3,3-dimethyl-isoquinoline, 4,4-difluoro-3,3-dimethyl-1-(7-methylpyrazolo[1,5-a]pyridin-3-yl)isoquinoline, 1-(6,7-dimethylpyrazolo[1,5-a]pyridin-3-yl)-4,4,6-trifluoro-3,3-dimethyl-isoquinoline, 1-(4,5-dimethylbenzimidazol-1-yl)-4,4,5-trifluoro-3,3-dimethyl-isoquinoline, 1-(4,5-dimethylbenzimidazol-1-yl)-4,4-difluoro-3,3-dimethyl-isoquinoline, 6-chloro-4,4-difluoro-3,3-dimethyl-1-(4-methylbenzimidazol-1-yl)isoquinoline, N'-[5-bromo-2-methyl-6-(1-methyl-2-propoxy-ethoxy)-3-pyridyl]-N-ethyl-N-methyl-formamidine, N'-[5-chloro-2-methyl-6-(1-methyl-2-propoxy-ethoxy)-3-pyridyl]-N-ethyl-N-methyl-formamidine, N'-[5-bromo-2-methyl-6-(1-methyl-2-propoxy-ethoxy)-3-pyridyl]-N-isopropyl-N-methyl-formamidine, N-isopropyl-N'-[5-methoxy-2-methyl-4-(2,2,2-trifluoro-1-hydroxy-1-phenyl-ethyl)phenyl]-N-methyl-formamidine, N-methoxy-N-[[4-[5-(trifluoromethyl)-1,2,4-oxadiazol-3-yl]phenyl]methyl]cyclopropanecarboxamide, N,2-dimethoxy-N-[[4-[5-(trifluoromethyl)-1,2,4-oxadiazol-3-yl]phenyl]methyl]propanamide, N-ethyl-2-methyl-N-[[4-[5-(trifluoromethyl)-1,2,4-oxadiazol-3-yl]phenyl]methyl]propanamide, 1-methoxy-3-methyl-1-[[4-[5-(trifluoromethyl)-1,2,4-oxadiazol-3-yl]phenyl]methyl]urea, 1,3-dimethoxy-1-[[4-[5-(trifluoromethyl)-1,2,4-oxadiazol-3-yl]phenyl]methyl]urea, 3-ethyl-1-methoxy-1-[[4-[5-(trifluoromethyl)-1,2,4-oxadiazol-3-yl]phenyl]methyl]urea, ethyl 1-[[4-[5-(trifluoromethyl)-1,2,4-oxadiazol-3-yl]phenyl]methyl]pyrazole-4-carboxylate, N,N-dimethyl-1-[[4-[5-(trifluoromethyl)-1,2,4-oxadiazol-3-yl]phenyl]methyl]-1,2,4-triazol-3-amine, methyl (Z)-3-methoxy-2-[2-methyl-5-[3-(trifluoromethyl)pyrazol-1-yl]phenoxy]prop-2-enoate, methyl (Z)-3-methoxy-2-[2-methyl-5-(3-propylpyrazol-1-yl)phenoxy]prop-2-enoate, methyl (Z)-2-[5-(3-isopropylpyrazol-1-yl)-2-methyl-phenoxy]-3-methoxy-prop-2-enoate, methyl (Z)-3-methoxy-2-[2-methyl-5-(4-propyltriazol-2-yl)phenoxy]prop-2-enoate, methyl (Z)-3-methoxy-2-[2-methyl-5-[4-(trifluoromethyl)triazol-2-yl]phenoxy]prop-2-enoate, methyl (Z)-2-(5-cyclohexyl-2-methyl-phenoxy)-3-methoxy-prop-2-enoate, methyl (Z)-2-(5-cyclopentyl-2-methyl-phenoxy)-3-methoxy-prop-2-enoate, methyl (Z)-2-[5-(4-cyclohexylthiazol-2-yl)-2-methyl-phenoxy]-3-methoxy-prop-2-enoate, methyl (Z)-2-[5-[4-(ethoxymethyl)thiazol-2-yl]-2-methyl-phenoxy]-3-methoxy-prop-2-enoate, methyl (Z)-2-[5-(4-bromothiazol-2-yl)-2-methyl-phenoxy]-3-methoxy-prop-2-enoate, methyl (Z)-3-methoxy-2-[2-methyl-5-[5-(trifluoromethyl)thiazol-2-yl]phenoxy]prop-2-enoate, TAEGRO®, Timorex Gold™, and metarylpicoxamid, wherein the weight ratio of component (A) to component (B) is from 15:1 to 1:30.

In another preferred composition according to the invention, component (A) is compound no. X.31, 2-[(2,6-difluoro-4-pyridyl)-(thiophene-2-carbonyl)amino]-N-(2,2-dimethyl cyclobutyl)-5-methyl-thiazole-4-carboxamide or a salt, enantiomer, tautomer or N-oxide thereof, and component (B) is a compound selected from the group consisting of azoxystrobin, trifloxystrobin, metyltetraprole, difenoconazole, hexaconazole, propiconazole, prothioconazole, mefentrifluconazole, fenpropidin, fenpropimorph, fluxapyroxad, fluopyram, isopyrazam, sedaxane, benzovindiflupyr, pydiflumetofen, isoflucypram, isofetamid, pyrapropoyne, fluindapyr, fenpicoxamid, florylpicoxamid, acibenzolar-S-methyl, chlorothalonil, mancozeb, mandipropamid, oxathiapiprolin, fluazinam, fludioxonil, cyprodinil, metalaxyl-M, aminopyrifen, folpet, ipflufenoquin, quinofumelin, tricyclazole, pyroquilon, cyflufenamid, metrafenone, N'-[2-chloro-4-(2-fluorophenoxy)-5-methyl-phenyl]-N-ethyl-N-methyl-formamidine N'-[4-(2-bromophenoxy)-5-chloro-2-methyl-phenyl]-N-ethyl-N-methyl-formamidine, N-(1-benzyl-1,3-dimethyl-butyl)-8-fluoro-quinoline-3-carboxamide, N-(1-benzyl-3,3,3-trifluoro-1-methyl-propyl)-8-fluoro-quinoline-3-carboxamide, N-(1-benzyl-3-chloro-1-methyl-but-3-enyl)-8-fluoro-quinoline-3-carboxamide, 1-(6,7-dimethylpyrazolo[1,5-a]pyridin-3-yl)-4,4,5-trifluoro-3,3-dimethyl-isoquinoline, 4,4-difluoro-3,3-dimethyl-1-(7-methylpyrazolo[1,5-a]pyridin-3-yl)isoquinoline, 1-(6,7-dimethylpyrazolo[1,5-a]pyridin-3-yl)-4,4,6-trifluoro-3,3-dimethyl-isoquinoline, 1-(4,5-dimethylbenzimidazol-1-yl)-4,4,5-trifluoro-3,3-dimethyl-isoquinoline, 1-(4,5- dimethylbenzimidazol-1-yl)-4,4-difluoro-3,3-dimethyl-isoquinoline, 6-chloro-4,4-difluoro-3,3-dimethyl-1-(4-methylbenzimidazol-1-yl)isoquinoline, N'-[5-bromo-2-methyl-6-(1-methyl-2-propoxy-ethoxy)-3-pyridyl]-N-ethyl-N-methyl-formamidine, N'-[5-chloro-2-methyl-6-(1-methyl-2-propoxy-ethoxy)-3-pyridyl]-N-ethyl-N-methyl-formamidine, N'-[5-bromo-2-methyl-6-(1-methyl-2-propoxy-ethoxy)-3-pyridyl]-N-isopropyl-N-methyl-formamidine, N-isopropyl-N'-[5-methoxy-2-methyl-4-(2,2,2-trifluoro-1-hydroxy-1-phenyl-ethyl)phenyl]-N-methyl-formamidine, N-methoxy-N-[[4-[5-(trifluoromethyl)-1,2,4-oxadiazol-3-yl]phenyl]methyl]cyclopropanecarboxamide, N,2-dimethoxy-N-[[4-[5-(trifluoromethyl)-1,2,4-oxadiazol-3-yl]phenyl]methyl]propanamide, N-ethyl-2-methyl-N-[[4-[5-(trifluoromethyl)-1,2,4-oxadiazol-3-yl]phenyl]methyl]propanamide, 1-methoxy-3-methyl-1-[[4-[5-(trifluoromethyl)-1,2,4-oxadiazol-3-yl]phenyl]methyl]urea, 1,3-dimethoxy-1-[[4-[5-(trifluoromethyl)-1,2,4-oxadiazol-3-yl]phenyl]methyl]urea, 3-ethyl-1-methoxy-1-[[4-[5-(trifluoromethyl)-1,2,4-oxadiazol-3-yl]phenyl]methyl]urea, ethyl 1-[[4-[5-(trifluoromethyl)-1,2,4-oxadiazol-3-yl]phenyl]methyl]pyrazole-4-carboxylate, N,N-dimethyl-1-[[4-[5-(trifluoromethyl)-1,2,4-oxadiazol-3-yl]phenyl]methyl]-1,2,4-triazol-3-amine, methyl (Z)-3-methoxy-2-[2-methyl-5-[3-(trifluoromethyl)pyrazol-1-yl]phenoxy]prop-2-enoate, methyl (Z)-3-methoxy-2-[2-methyl-5-(3-propylpyrazol-1-yl)phenoxy]prop-2-enoate, methyl (Z)-2-[5-(3-isopropylpyrazol-1-yl)-2-methyl-phenoxy]-3-methoxy-prop-2-enoate, methyl (Z)-3-methoxy-2-[2-methyl-5-(4-propyltriazol-2-yl)phenoxy]prop-2-enoate, methyl (Z)-3-methoxy-2-[2-methyl-5-[4-(trifluoromethyl)triazol-2-yl]phenoxy]prop-2-enoate, methyl (Z)-2-(5-cyclohexyl-2-methyl-phenoxy)-3-methoxy-prop-2-enoate, methyl (Z)-2-(5-cyclopentyl-2-methyl-phenoxy)-3-methoxy-prop-2-enoate, methyl (Z)-2-[5-(4-cyclohexylthiazol-2-yl)-2-methyl-phenoxy]-3-methoxy-prop-2-enoate, methyl (Z)-2-[5-[4-(ethoxymethyl)thiazol-2-yl]-2-methyl-phenoxy]-3-methoxy-prop-2-enoate, methyl (Z)-2-[5-(4-bromothiazol-2-yl)-2-methyl-phenoxy]-3-methoxy-prop-2-enoate, methyl (Z)-3-methoxy-2-[2-methyl-5-[5-(trifluoromethyl)thiazol-2-yl]phenoxy]prop-2-enoate, TAEGRO®, Timorex Gold™, and metarylpicoxamid, wherein the weight ratio of component (A) to component (B) is from 15:1 to 1:30.

In another preferred composition according to the invention, component (A) is compound no. X.33, 2-[(2,6-difluoro-4-pyridyl)-formyl-amino]-N-(2,2-dimethyl cyclobutyl)-5-methyl-thiazole-4-carboxamide or a salt, enantiomer, tautomer or N-oxide thereof, and component (B) is a compound selected from the group consisting of azoxystrobin, trifloxystrobin, metyltetraprole, difenoconazole, hexaconazole, propiconazole, prothioconazole, mefentrifluconazole, fenpropidin, fenpropimorph, fluxapyroxad, fluopyram, isopyrazam, sedaxane, benzovindiflupyr, pydiflumetofen, isoflucypram, isofetamid, pyrapropoyne, fluindapyr, fenpicoxamid, florylpicoxamid, acibenzolar-S-methyl, chlorothalonil, mancozeb, mandipropamid, oxathiapiprolin, fluazinam, fludioxonil, cyprodinil, metalaxyl-M, aminopyrifen, folpet, ipflufenoquin, quinofumelin, tricyclazole, pyroquilon, cyflufenamid, metrafenone, N'-[2-chloro-4-(2-fluorophenoxy)-5-methyl-phenyl]-N-ethyl-N-methyl-formamidine N'-[4-(2-bromophenoxy)-5-chloro-2-methyl-phenyl]-N-ethyl-N-methyl-formamidine, N-(1-benzyl-1,3-dimethyl-butyl)-8-fluoro-quinoline-3-carboxamide, N-(1-benzyl-3,3,3-trifluoro-1-methyl-propyl)-8-fluoro-quinoline-3-carboxamide, N-(1-benzyl-3-chloro-1-methyl-but-3-enyl)-8-fluoro-quinoline-3-carboxamide, 1-(6,7-dimethylpyrazolo[1,5-a]pyridin-3-yl)-4,4,5-trifluoro-3,3-dimethyl-isoquinoline, 4,4-difluoro-3,3-dimethyl-1-(7-methylpyrazolo[1,5-a]pyridin-3-yl)isoquinoline, 1-(6,7-dimethylpyrazolo[1,5-a]pyridin-3-yl)-4,4,6-trifluoro-3,3-dimethyl-isoquinoline, 1-(4,5-dimethylbenzimidazol-1-yl)-4,4,5-trifluoro-3,3-dimethyl-isoquinoline, 1-(4,5-dimethylbenzimidazol-1-yl)-4,4-difluoro-3,3-dimethyl-isoquinoline, 6-chloro-4,4-difluoro-3,3-dimethyl-1-(4-methylbenzimidazol-1-yl)isoquinoline, N'-[5-bromo-2-methyl-6-(1-methyl-2-propoxy-ethoxy)-3-pyridyl]-N-ethyl-N-methyl-formamidine, N'-[5-chloro-2-methyl-6-(1-methyl-2-propoxy-ethoxy)-3-pyridyl]-N-ethyl-N-methyl-formamidine, N'-[5-bromo-2-methyl-6-(1-methyl-2-propoxy-ethoxy)-3-pyridyl]-N-isopropyl-N-methyl-formamidine, N-isopropyl-N'-[5-methoxy-2-methyl-4-(2,2,2-trifluoro-1-hydroxy-1-phenyl-ethyl)phenyl]-N-methyl-formamidine, N-methoxy-N-[[4-[5-(trifluoromethyl)-1,2,4-oxadiazol-3-yl]phenyl]methyl]cyclopropanecarboxamide, N,2-dimethoxy-N-[[4-[5-(trifluoromethyl)-1,2,4-oxadiazol-3-yl]phenyl]methyl]propanamide, N-ethyl-2-methyl-N-[[4-[5-(trifluoromethyl)-1,2,4-oxadiazol-3-yl]phenyl]methyl]propanamide, 1-methoxy-3-methyl-1-[[4-[5-(trifluoromethyl)-1,2,4-oxadiazol-3-yl]phenyl]methyl]urea, 1,3-dimethoxy-1-[[4-[5-(trifluoromethyl)-1,2,4-oxadiazol-3-yl]phenyl]methyl]urea, 3-ethyl-1-methoxy-1-[[4-[5-(trifluoromethyl)-1,2,4-oxadiazol-3-yl]phenyl]methyl]urea, ethyl 1-[[4-[5-(trifluoromethyl)-1,2,4-oxadiazol-3-yl]phenyl]methyl]pyrazole-4-carboxylate, N,N-dimethyl-1-[[4-[5-(trifluoromethyl)-1,2,4-oxadiazol-3-yl]phenyl]methyl]-1,2,4-triazol-3-amine, methyl (Z)-3-methoxy-2-[2-methyl-5-[3-(trifluoromethyl)pyrazol-1-yl]phenoxy]prop-2-enoate, methyl (Z)-3-methoxy-2-[2-methyl-5-(3-propylpyrazol-1-yl)phenoxy]prop-2-enoate, methyl (Z)-2-[5-(3-isopropylpyrazol-1-yl)-2-methyl-phenoxy]-3-methoxy-prop-2-enoate, methyl (Z)-3-methoxy-2-[2-methyl-5-(4-propyltriazol-2-yl)phenoxy]prop-2-enoate, methyl (Z)-3-methoxy-2-[2-methyl-5-[4-(trifluoromethyl)triazol-2-yl]phenoxy]prop-2-enoate, methyl (Z)-2-(5-cyclohexyl-2-methyl-phenoxy)-3-methoxy-prop-2-enoate, methyl (Z)-2-(5-cyclopentyl-2-methyl-phenoxy)-3-methoxy-prop-2-enoate, methyl (Z)-2-[5-(4-cyclohexylthiazol-2-yl)-2-methyl-phenoxy]-3-methoxy-prop-2-enoate, methyl (Z)-2-[5-[4-(ethoxymethyl)thiazol-2-yl]-2-methyl-phenoxy]-3-methoxy-prop-2-enoate, methyl (Z)-2-[5-(4-bromothiazol-2-yl)-2-methyl-phenoxy]-3-methoxy-prop-2-enoate, methyl (Z)-3-methoxy-2-[2-methyl-5-[5-(trifluoromethyl)thiazol-2-yl]phenoxy]prop-2-enoate, TAEGRO®, Timorex Gold™, and metarylpicoxamid, wherein the weight ratio of component (A) to component (B) is from 15:1 to 1:30.

In another preferred composition according to the invention, component (A) is compound no. X.34, ethyl 2-[(2,6-difluoro-4-pyridyl)-[4-[(2,2-dimethylcyclobutyl)carbamoyl]-5-methyl-thiazol-2-yl]amino]-2-oxo-acetate or a salt, enantiomer, tautomer or N-oxide thereof, and component (B) is a compound selected from the group consisting of azoxystrobin, trifloxystrobin, metyltetraprole, difenoconazole, hexaconazole, propiconazole, prothioconazole, mefentrifluconazole, fenpropidin, fenpropimorph, fluxapyroxad, fluopyram, isopyrazam, sedaxane, benzovindiflupyr, pydiflumetofen, isoflucypram, isofetamid, pyrapropoyne, fluindapyr, fenpicoxamid, florylpicoxamid, acibenzolar-S-methyl, chlorothalonil, mancozeb, mandipropamid, oxathiapiprolin, fluazinam, fludioxonil, cyprodinil, metalaxyl-M, aminopyrifen, folpet, ipflufenoquin, quinofumelin, tricyclazole, pyroquilon, cyflufenamid, metrafenone, N'-[2-chloro-4-(2-fluorophenoxy)-5-methyl-phenyl]-N-ethyl-N-methyl-formamidine N'-[4-(2-bromophenoxy)-5-chloro-2- methyl-phenyl]-N-ethyl-N-methyl-formamidine, N-(1-benzyl-1,3-dimethyl-butyl)-8-fluoro-quinoline-3-carboxamide, N-(1-benzyl-3,3,3-trifluoro-1-methyl-propyl)-8-fluoro-quinoline-3-carboxamide, N-(1-benzyl-3-chloro-1-methyl-but-3-enyl)-8-fluoro-quinoline-3-carboxamide, 1-(6,7-dimethylpyrazolo[1,5-a]pyridin-3-yl)-4,4,5-trifluoro-3,3-dimethyl-isoquinoline, 4,4-difluoro-3,3-dimethyl-1-(7-methylpyrazolo[1,5-a]pyridin-3-yl) isoquinoline, 1-(6,7-dimethylpyrazolo[1,5-a]pyridin-3-yl)-4,4,6-trifluoro-3,3-dimethyl-isoquinoline, 1-(4,5-dimethylbenzimidazol-1-yl)-4,4,5-trifluoro-3,3-dimethyl-isoquinoline, 1-(4,5-dimethylbenzimidazol-1-yl)-4,4-difluoro-3,3-dimethyl-isoquinoline, 6-chloro-4,4-difluoro-3,3-dimethyl-1-(4-methylbenzimidazol-1-yl)isoquinoline, N'-[5-bromo-2-methyl-6-(1-methyl-2-propoxy-ethoxy)-3-pyridyl]-N-ethyl-N-methyl-formamidine, N'-[5-chloro-2-methyl-6-(1-methyl-2-propoxy-ethoxy)-3-pyridyl]-N-ethyl-N-methyl-formamidine, N'-[5-bromo-2-methyl-6-(1-methyl-2-propoxy-ethoxy)-3-pyridyl]-N-isopropyl-N-methyl-formamidine, N-isopropyl-N'-[5-methoxy-2-methyl-4-(2,2,2-trifluoro-1-hydroxy-1-phenyl-ethyl) phenyl]-N-methyl-formamidine, N-methoxy-N-[[4-[5-(trifluoromethyl)-1,2,4-oxadiazol-3-yl]phenyl]methyl] cyclopropanecarboxamide, N,2-dimethoxy-N-[[4-[5-(trifluoromethyl)-1,2,4-oxadiazol-3-yl]phenyl]methyl] propanamide, N-ethyl-2-methyl-N-[[4-[5-(trifluoromethyl)-1,2,4-oxadiazol-3-yl]phenyl]methyl]propanamide, 1-methoxy-3-methyl-1-[[4-[5-(trifluoromethyl)-1,2,4-oxadiazol-3-yl]phenyl]methyl]urea, 1,3-dimethoxy-1-[[4-[5-(trifluoromethyl)-1,2,4-oxadiazol-3-yl]phenyl]methyl]urea, 3-ethyl-1-methoxy-1-[[4-[5-(trifluoromethyl)-1,2,4-oxadiazol-3-yl]phenyl]methyl]urea, ethyl 1-[[4-[5-(trifluoromethyl)-1,2,4-oxadiazol-3-yl]phenyl]methyl]pyrazole-4-carboxylate, N,N-dimethyl-1-[[4-[5-(trifluoromethyl)-1,2,4-oxadiazol-3-yl]phenyl]methyl]-1,2,4-triazol-3-amine, methyl (Z)-3-methoxy-2-[2-methyl-5-[3-(trifluoromethyl) pyrazol-1-yl]phenoxy]prop-2-enoate, methyl (Z)-3-methoxy-2-[2-methyl-5-(3-propylpyrazol-1-yl)phenoxy] prop-2-enoate, methyl (Z)-2-[5-(3-isopropylpyrazol-1-yl)-2-methyl-phenoxy]-3-methoxy-prop-2-enoate, methyl (Z)-3-methoxy-2-[2-methyl-5-(4-propyltriazol-2-yl)phenoxy] prop-2-enoate, methyl (Z)-3-methoxy-2-[2-methyl-5-[4-(trifluoromethyl)triazol-2-yl]phenoxy]prop-2-enoate, methyl (Z)-2-(5-cyclohexyl-2-methyl-phenoxy)-3-methoxy-prop-2-enoate, methyl (Z)-2-(5-cyclopentyl-2-methyl-phenoxy)-3-methoxy-prop-2-enoate, methyl (Z)-2-[5-(4-cyclohexylthiazol-2-yl)-2-methyl-phenoxy]-3-methoxy-prop-2-enoate, methyl (Z)-2-[5-[4-(ethoxymethyl) thiazol-2-yl]-2-methyl-phenoxy]-3-methoxy-prop-2-enoate, methyl (Z)-2-[5-(4-bromothiazol-2-yl)-2-methyl-phenoxy]-3-methoxy-prop-2-enoate, methyl (Z)-3-methoxy-2-[2-methyl-5-[5-(trifluoromethyl)thiazol-2-yl]phenoxy]prop-2-enoate, TAEGRO®, Timorex Gold™, and metarylpicoxamid, wherein the weight ratio of component (A) to component (B) is from 15:1 to 1:30.

In another preferred composition according to the invention, component (A) is compound no. X.35, 2-[benzoyl-(2,6-difluoro-4-pyridyl)amino]-N-(2,2-dimethylcyclobutyl)-5-methyl-thiazole-4-carboxamide or a salt, enantiomer, tautomer or N-oxide thereof, and component (B) is a compound selected from the group consisting of azoxystrobin, trifloxystrobin, metyltetraprole, difenoconazole, hexaconazole, propiconazole, prothioconazole, mefentrifluconazole, fenpropidin, fenpropimorph, fluxapyroxad, fluopyram, isopyrazam, sedaxane, benzovindiflupyr, pydiflumetofen, isoflucypram, isofetamid, pyrapropoyne, fluindapyr, fenpicoxamid, florylpicoxamid, acibenzolar-S-methyl, chlorothalonil, mancozeb, mandipropamid, oxathiapiprolin, fluazinam, fludioxonil, cyprodinil, metalaxyl-M, aminopyrifen, folpet, ipflufenoquin, quinofumelin, tricyclazole, pyroquilon, cyflufenamid, metrafenone, N'-[2-chloro-4-(2-fluorophenoxy)-5-methyl-phenyl]-N-ethyl-N-methyl-formamidine N'-[4-(2-bromophenoxy)-5-chloro-2-methyl-phenyl]-N-ethyl-N-methyl-formamidine, N-(1-benzyl-1,3-dimethyl-butyl)-8-fluoro-quinoline-3-carboxamide, N-(1-benzyl-3,3,3-trifluoro-1-methyl-propyl)-8-fluoro-quinoline-3-carboxamide, N-(1-benzyl-3-chloro-1-methyl-but-3-enyl)-8-fluoro-quinoline-3-carboxamide, 1-(6,7-dimethylpyrazolo [1,5-a]pyridin-3-yl)-4,4,5-trifluoro-3,3-dimethyl-isoquinoline, 4,4-difluoro-3,3-dimethyl-1-(7-methylpyrazolo[1,5-a]pyridin-3-yl)isoquinoline, 1-(6,7-dimethylpyrazolo[1,5-a]pyridin-3-yl)-4,4,6-trifluoro-3,3-dimethyl-isoquinoline, 1-(4,5-dimethylbenzimidazol-1-yl)-4,4,5-trifluoro-3,3-dimethyl-isoquinoline, 1-(4,5-dimethylbenzimidazol-1-yl)-4,4-difluoro-3,3-dimethyl-isoquinoline, 6-chloro-4,4-difluoro-3,3-dimethyl-1-(4-methylbenzimidazol-1-yl)isoquinoline, N'-[5-bromo-2-methyl-6-(1-methyl-2-propoxy-ethoxy)-3-pyridyl]-N-ethyl-N-methyl-formamidine, N'-[5-chloro-2-methyl-6-(1-methyl-2-propoxy-ethoxy)-3-pyridyl]-N-ethyl-N-methyl-formamidine, N'-[5-bromo-2-methyl-6-(1-methyl-2-propoxy-ethoxy)-3-pyridyl]-N-isopropyl-N-methyl-formamidine, N-isopropyl-N'-[5-methoxy-2-methyl-4-(2,2,2-trifluoro-1-hydroxy-1-phenyl-ethyl)phenyl]-N-methyl-formamidine, N-methoxy-N-[[4-[5-(trifluoromethyl)-1,2,4-oxadiazol-3-yl]phenyl]methyl]cyclopropanecarboxamide, N,2-dimethoxy-N-[[4-[5-(trifluoromethyl)-1,2,4-oxadiazol-3-yl]phenyl]methyl]propanamide, N-ethyl-2-methyl-N-[[4-[5-(trifluoromethyl)-1,2,4-oxadiazol-3-yl]phenyl]methyl] propanamide, 1-methoxy-3-methyl-1-[[4-[5-(trifluoromethyl)-1,2,4-oxadiazol-3-yl]phenyl]methyl]urea, 1,3-dimethoxy-1-[[4-[5-(trifluoromethyl)-1,2,4-oxadiazol-3-yl]phenyl]methyl]urea, 3-ethyl-1-methoxy-1-[[4-[5-(trifluoromethyl)-1,2,4-oxadiazol-3-yl]phenyl]methyl]urea, ethyl 1-[[4-[5-(trifluoromethyl)-1,2,4-oxadiazol-3-yl]phenyl]methyl]pyrazole-4-carboxylate, N,N-dimethyl-1-[[4-[5-(trifluoromethyl)-1,2,4-oxadiazol-3-yl]phenyl]methyl]-1,2,4-triazol-3-amine, methyl (Z)-3-methoxy-2-[2-methyl-5-[3-(trifluoromethyl)pyrazol-1-yl]phenoxy]prop-2-enoate, methyl (Z)-3-methoxy-2-[2-methyl-5-(3-propylpyrazol-1-yl)phenoxy]prop-2-enoate, methyl (Z)-2-[5-(3-isopropylpyrazol-1-yl)-2-methyl-phenoxy]-3-methoxy-prop-2-enoate, methyl (Z)-3-methoxy-2-[2-methyl-5-(4-propyltriazol-2-yl)phenoxy]prop-2-enoate, methyl (Z)-3-methoxy-2-[2-methyl-5-[4-(trifluoromethyl)triazol-2-yl]phenoxy]prop-2-enoate, methyl (Z)-2-(5-cyclohexyl-2-methyl-phenoxy)-3-methoxy-prop-2-enoate, methyl (Z)-2-(5-cyclopentyl-2-methyl-phenoxy)-3-methoxy-prop-2-enoate, methyl (Z)-2-[5-(4-cyclohexylthiazol-2-yl)-2-methyl-phenoxy]-3-methoxy-prop-2-enoate, methyl (Z)-2-[5-[4-(ethoxymethyl) thiazol-2-yl]-2-methyl-phenoxy]-3-methoxy-prop-2-enoate, methyl (Z)-2-[5-(4-bromothiazol-2-yl)-2-methyl-phenoxy]-3-methoxy-prop-2-enoate, methyl (Z)-3-methoxy-2-[2-methyl-5-[5-(trifluoromethyl)thiazol-2-yl]phenoxy]prop-2-enoate, TAEGRO®, Timorex Gold™, and metarylpicoxamid, wherein the weight ratio of component (A) to component (B) is from 15:1 to 1:30.

In another preferred composition according to the invention, component (A) is compound no. X.36, 2-[acetyl-(2,6-difluoro-4-pyridyl)amino]-N-(2,2-dimethyl cyclobutyl)-5-methyl-thiazole-4-carboxamide or a salt, enantiomer, tautomer or N-oxide thereof, and component (B) is a compound selected from the group consisting of azoxystrobin, trifloxystrobin, metyltetraprole, difenoconazole, hexaconazole, propiconazole, prothioconazole, mefentrifluconazole, fenpropidin, fenpropimorph, fluxapyroxad, fluopyram, isopyrazam, sedaxane, benzovindiflupyr, pydiflumetofen, isoflucypram, isofetamid, pyrapropoyne, fluindapyr, fenpicoxamid, florylpicoxamid, acibenzolar-S-methyl, chlorothalonil, mancozeb, mandipropamid, oxathiapiprolin, fluazinam, fludioxonil, cyprodinil, metalaxyl-M, aminopyrifen, folpet, ipflufenoquin, quinofumelin, tricyclazole, pyroquilon, cyflufenamid, metrafenone, N'-[2-chloro-4-(2-fluorophenoxy)-5-methyl-phenyl]-N-ethyl-N-methyl-formamidine N'-[4-(2-bromophenoxy)-5-chloro-2-methyl-phenyl]-N-ethyl-N-methyl-formamidine, N-(1-benzyl-1,3-dimethyl-butyl)-8-fluoro-quinoline-3-carboxamide, N-(1-benzyl-3,3,3-trifluoro-1-methyl-propyl)-8-fluoro-quinoline-3-carboxamide, N-(1-benzyl-3-chloro-1-methyl-but-3-enyl)-8-fluoro-quinoline-3-carboxamide, 1-(6,7-dimethylpyrazolo[1,5-a]pyridin-3-yl)-4,4,5-trifluoro-3,3-dimethyl-isoquinoline, 4,4-difluoro-3,3-dimethyl-1-(7-methylpyrazolo[1,5-a]pyridin-3-yl)isoquinoline, 1-(6,7-dimethylpyrazolo[1,5-a]pyridin-3-yl)-4,4,6-trifluoro-3,3-dimethyl-isoquinoline, 1-(4,5-dimethylbenzimidazol-1-yl)-4,4,5-trifluoro-3,3-dimethyl-isoquinoline, 1-(4,5-dimethylbenzimidazol-1-yl)-4,4-difluoro-3,3-dimethyl-isoquinoline, 6-chloro-4,4-difluoro-3,3-dimethyl-1-(4-methylbenzimidazol-1-yl)isoquinoline, N'-[5-bromo-2-methyl-6-(1-methyl-2-propoxy-ethoxy)-3-pyridyl]-N-ethyl-N-methyl-formamidine, N'-[5-chloro-2-methyl-6-(1-methyl-2-propoxy-ethoxy)-3-pyridyl]-N-ethyl-N-methyl-formamidine, N'-[5-bromo-2-methyl-6-(1-methyl-2-propoxy-ethoxy)-3-pyridyl]-N-isopropyl-N-methyl-formamidine, N-isopropyl-N'-[5-methoxy-2-methyl-4-(2,2,2-trifluoro-1-hydroxy-1-phenyl-ethyl)phenyl]-N-methyl-formamidine, N-methoxy-N-[[4-[5-(trifluoromethyl)-1,2,4-oxadiazol-3-yl]phenyl]methyl]cyclopropanecarboxamide, N,2-dimethoxy-N-[[4-[5-(trifluoromethyl)-1,2,4-oxadiazol-3-yl]phenyl]methyl]propanamide, N-ethyl-2-methyl-N-[[4-[5-(trifluoromethyl)-1,2,4-oxadiazol-3-yl]phenyl]methyl]propanamide, 1-methoxy-3-methyl-1-[[4-[5-(trifluoromethyl)-1,2,4-oxadiazol-3-yl]phenyl]methyl]urea, 1,3-dimethoxy-1-[[4-[5-(trifluoromethyl)-1,2,4-oxadiazol-3-yl]phenyl]methyl]urea, 3-ethyl-1-methoxy-1-[[4-[5-(trifluoromethyl)-1,2,4-oxadiazol-3-yl]phenyl]methyl]urea, ethyl 1-[[4-[5-(trifluoromethyl)-1,2,4-oxadiazol-3-yl]phenyl]methyl]pyrazole-4-carboxylate, N,N-dimethyl-1-[[4-[5-(trifluoromethyl)-1,2,4-oxadiazol-3-yl]phenyl]methyl]-1,2,4-triazol-3-amine, methyl (Z)-3-methoxy-2-[2-methyl-5-[3-(trifluoromethyl)pyrazol-1-yl]phenoxy]prop-2-enoate, methyl (Z)-3-methoxy-2-[2-methyl-5-(3-propylpyrazol-1-yl)phenoxy]prop-2-enoate, methyl (Z)-2-[5-(3-isopropylpyrazol-1-yl)-2-methyl-phenoxy]-3-methoxy-prop-2-enoate, methyl (Z)-3-methoxy-2-[2-methyl-5-(4-propyltriazol-2-yl)phenoxy]prop-2-enoate, methyl (Z)-3-methoxy-2-[2-methyl-5-[4-(trifluoromethyl)triazol-2-yl]phenoxy]prop-2-enoate, methyl (Z)-2-(5-cyclohexyl-2-methyl-phenoxy)-3-methoxy-prop-2-enoate, methyl (Z)-2-(5-cyclopentyl-2-methyl-phenoxy)-3-methoxy-prop-2-enoate, methyl (Z)-2-[5-(4-cyclohexylthiazol-2-yl)-2-methyl-phenoxy]-3-methoxy-prop-2-enoate, methyl (Z)-2-[5-[4-(ethoxymethyl)thiazol-2-yl]-2-methyl-phenoxy]-3-methoxy-prop-2-enoate, methyl (Z)-2-[5-(4-bromothiazol-2-yl)-2-methyl-phenoxy]-3-methoxy-prop-2-enoate, methyl (Z)-3-methoxy-2-[2-methyl-5-[5-(trifluoromethyl)thiazol-2-yl]phenoxy]prop-2-enoate, TAEGRO®, Timorex Gold™, and metarylpicoxamid, wherein the weight ratio of component (A) to component (B) is from 15:1 to 1:30.

In another preferred composition according to the invention, component (A) is compound no. X.37, 2-[acetyl-(2,6-difluoro-4-pyridyl)amino]-5-methyl-N-spiro[3.4]octan-3-yl-thiazole-4-carboxamide or a salt, enantiomer, tautomer or N-oxide thereof, and component (B) is a compound selected from the group consisting of azoxystrobin, trifloxystrobin, metyltetraprole, difenoconazole, hexaconazole, propiconazole, prothioconazole, mefentrifluconazole, fenpropidin, fenpropimorph, fluxapyroxad, fluopyram, isopyrazam, sedaxane, benzovindiflupyr, pydiflumetofen, isoflucypram, isofetamid, pyrapropoyne, fluindapyr, fenpicoxamid, florylpicoxamid, acibenzolar-S-methyl, chlorothalonil, mancozeb, mandipropamid, oxathiapiprolin, fluazinam, fludioxonil, cyprodinil, metalaxyl-M, aminopyrifen, folpet, ipflufenoquin, quinofumelin, tricyclazole, pyroquilon, cyflufenamid, metrafenone, N'-[2-chloro-4-(2-fluorophenoxy)-5-methyl-phenyl]-N-ethyl-N-methyl-formamidine N'-[4-(2-bromophenoxy)-5-chloro-2-methyl-phenyl]-N-ethyl-N-methyl-formamidine, N-(1-benzyl-1,3-dimethyl-butyl)-8-fluoro-quinoline-3-carboxamide, N-(1-benzyl-3,3,3-trifluoro-1-methyl-propyl)-8-fluoro-quinoline-3-carboxamide, N-(1-benzyl-3-chloro-1-methyl-but-3-enyl)-8-fluoro-quinoline-3-carboxamide, 1-(6,7-dimethylpyrazolo[1,5-a]pyridin-3-yl)-4,4,5-trifluoro-3,3-dimethyl-isoquinoline, 4,4-difluoro-3,3-dimethyl-1-(7-methylpyrazolo[1,5-a]pyridin-3-yl)isoquinoline, 1-(6,7-dimethylpyrazolo[1,5-a]pyridin-3-yl)-4,4,6-trifluoro-3,3-dimethyl-isoquinoline, 1-(4,5-dimethylbenzimidazol-1-yl)-4,4,5-trifluoro-3,3-dimethyl-isoquinoline, 1-(4,5-dimethylbenzimidazol-1-yl)-4,4-difluoro-3,3-dimethyl-isoquinoline, 6-chloro-4,4-difluoro-3,3-dimethyl-1-(4-methylbenzimidazol-1-yl)isoquinoline, N'-[5-bromo-2-methyl-6-(1-methyl-2-propoxy-ethoxy)-3-pyridyl]-N-ethyl-N-methyl-formamidine, N'-[5-chloro-2-methyl-6-(1-methyl-2-propoxy-ethoxy)-3-pyridyl]-N-ethyl-N-methyl-formamidine, N'-[5-bromo-2-methyl-6-(1-methyl-2-propoxy-ethoxy)-3-pyridyl]-N-isopropyl-N-methyl-formamidine, N-isopropyl-N'-[5-methoxy-2-methyl-4-(2,2,2-trifluoro-1-hydroxy-1-phenyl-ethyl)phenyl]-N-methyl-formamidine, N-methoxy-N-[[4-[5-(trifluoromethyl)-1,2,4-oxadiazol-3-yl]phenyl]methyl]cyclopropanecarboxamide, N,2-dimethoxy-N-[[4-[5-(trifluoromethyl)-1,2,4-oxadiazol-3-yl]phenyl]methyl]propanamide, N-ethyl-2-methyl-N-[[4-[5-(trifluoromethyl)-1,2,4-oxadiazol-3-yl]phenyl]methyl]propanamide, 1-methoxy-3-methyl-1-[[4-[5-(trifluoromethyl)-1,2,4-oxadiazol-3-yl]phenyl]methyl]urea, 1,3-dimethoxy-1-[[4-[5-(trifluoromethyl)-1,2,4-oxadiazol-3-yl]phenyl]methyl]urea, 3-ethyl-1-methoxy-1-[[4-[5-(trifluoromethyl)-1,2,4-oxadiazol-3-yl]phenyl]methyl]urea, ethyl 1-[[4-[5-(trifluoromethyl)-1,2,4-oxadiazol-3-yl]phenyl]methyl]pyrazole-4-carboxylate, N,N-dimethyl-1-[[4-[5-(trifluoromethyl)-1,2,4-oxadiazol-3-yl]phenyl]methyl]-1,2,4-triazol-3-amine, methyl (Z)-3-methoxy-2-[2-methyl-5-[3-(trifluoromethyl)pyrazol-1-yl]phenoxy]prop-2-enoate, methyl (Z)-3-methoxy-2-[2-methyl-5-(3-propylpyrazol-1-yl)phenoxy]prop-2-enoate, methyl (Z)-2-[5-(3-isopropylpyrazol-1-yl)-2-methyl-phenoxy]-3-methoxy-prop-2-enoate, methyl (Z)-3-methoxy-2-[2-methyl-5-(4-propyltriazol-2-yl)phenoxy]prop-2-enoate, methyl (Z)-3-methoxy-2-[2-methyl-5-[4-(trifluoromethyl)triazol-2-yl]phenoxy]prop-2-enoate, methyl (Z)-2-(5-cyclohexyl-2-methyl-phenoxy)-3-methoxy-prop-2-enoate, methyl (Z)-2-(5-cyclopentyl-2-methyl-phenoxy)-3-methoxy-prop-2-enoate, methyl (Z)-2-[5-(4-cyclohexylthiazol-2-yl)-2-methyl-phenoxy]-3-methoxy-prop-2-enoate, methyl (Z)-2-[5-[4-(ethoxymethyl)thiazol-2-yl]-2-methyl-phenoxy]-3-methoxy-prop-2-enoate, methyl (Z)-2-[5-(4-bromothiazol-2-yl)-2-methyl-phenoxy]-3-methoxy-prop-2-enoate, methyl (Z)-3-methoxy-2-[2-methyl-5-[5-(trifluoromethyl)thiazol-2-yl]phenoxy]prop-2- enoate, TAEGRO®, Timorex Gold™, and metarylpicoxamid, wherein the weight ratio of component (A) to component (B) is from 15:1 to 1:30.

In another preferred composition according to the invention, component (A) is compound no. X.38, 2-[(2,6-difluoro-4-pyridyl)-(2-methylpropanoyl)amino]-N-(2,2-dimethylcyclobutyl)-5-methyl-thiazole-4-carboxamide or a salt, enantiomer, tautomer or N-oxide thereof, and component (B) is a compound selected from the group consisting of azoxystrobin, trifloxystrobin, metyltetraprole, difenoconazole, hexaconazole, propiconazole, prothioconazole, mefentrifluconazole, fenpropidin, fenpropimorph, fluxapyroxad, fluopyram, isopyrazam, sedaxane, benzovindiflupyr, pydiflumetofen, isoflucypram, isofetamid, pyrapropoyne, fluindapyr, fenpicoxamid, florylpicoxamid, acibenzolar-S-methyl, chlorothalonil, mancozeb, mandipropamid, oxathiapiprolin, fluazinam, fludioxonil, cyprodinil, metalaxyl-M, aminopyrifen, folpet, ipflufenoquin, quinofumelin, tricyclazole, pyroquilon, cyflufenamid, metrafenone, N'-[2-chloro-4-(2-fluorophenoxy)-5-methyl-phenyl]-N-ethyl-N-methyl-formamidine N'-[4-(2-bromophenoxy)-5-chloro-2-methyl-phenyl]-N-ethyl-N-methyl-formamidine, N-(1-benzyl-1,3-dimethyl-butyl)-8-fluoro-quinoline-3-carboxamide, N-(1-benzyl-3,3,3-trifluoro-1-methyl-propyl)-8-fluoro-quinoline-3-carboxamide, N-(1-benzyl-3-chloro-1-methyl-but-3-enyl)-8-fluoro-quinoline-3-carboxamide, 1-(6,7-dimethylpyrazolo[1,5-a]pyridin-3-yl)-4,4,5-trifluoro-3,3-dimethyl-isoquinoline, 4,4-difluoro-3,3-dimethyl-1-(7-methylpyrazolo[1,5-a]pyridin-3-yl)isoquinoline, 1-(6,7-dimethylpyrazolo[1,5-a]pyridin-3-yl)-4,4,6-trifluoro-3,3-dimethyl-isoquinoline, 1-(4,5-dimethylbenzimidazol-1-yl)-4,4,5-trifluoro-3,3-dimethyl-isoquinoline, 1-(4,5-dimethylbenzimidazol-1-yl)-4,4-difluoro-3,3-dimethyl-isoquinoline, 6-chloro-4,4-difluoro-3,3-dimethyl-1-(4-methylbenzimidazol-1-yl)isoquinoline, N'-[5-bromo-2-methyl-6-(1-methyl-2-propoxy-ethoxy)-3-pyridyl]-N-ethyl-N-methyl-formamidine, N'-[5-chloro-2-methyl-6-(1-methyl-2-propoxy-ethoxy)-3-pyridyl]-N-ethyl-N-methyl-formamidine, N'-[5-bromo-2-methyl-6-(1-methyl-2-propoxy-ethoxy)-3-pyridyl]-N-isopropyl-N-methyl-formamidine, N-isopropyl-N'-[5-methoxy-2-methyl-4-(2,2,2-trifluoro-1-hydroxy-1-phenyl-ethyl)phenyl]-N-methyl-formamidine, N-methoxy-N-[[4-[5-(trifluoromethyl)-1,2,4-oxadiazol-3-yl]phenyl]methyl]cyclopropanecarboxamide, N,2-dimethoxy-N-[[4-[5-(trifluoromethyl)-1,2,4-oxadiazol-3-yl]phenyl]methyl]propanamide, N-ethyl-2-methyl-N-[[4-[5-(trifluoromethyl)-1,2,4-oxadiazol-3-yl]phenyl]methyl]propanamide, 1-methoxy-3-methyl-1-[[4-[5-(trifluoromethyl)-1,2,4-oxadiazol-3-yl]phenyl]methyl]urea, 1,3-dimethoxy-1-[[4-[5-(trifluoromethyl)-1,2,4-oxadiazol-3-yl]phenyl]methyl]urea, 3-ethyl-1-methoxy-1-[[4-[5-(trifluoromethyl)-1,2,4-oxadiazol-3-yl]phenyl]methyl]urea, ethyl 1-[[4-[5-(trifluoromethyl)-1,2,4-oxadiazol-3-yl]phenyl]methyl]pyrazole-4-carboxylate, N,N-dimethyl-1-[[4-[5-(trifluoromethyl)-1,2,4-oxadiazol-3-yl]phenyl]methyl]-1,2,4-triazol-3-amine, methyl (Z)-3-methoxy-2-[2-methyl-5-[3-(trifluoromethyl)pyrazol-1-yl]phenoxy]prop-2-enoate, methyl (Z)-3-methoxy-2-[2-methyl-5-(3-propylpyrazol-1-yl)phenoxy]prop-2-enoate, methyl (Z)-2-[5-(3-isopropylpyrazol-1-yl)-2-methyl-phenoxy]-3-methoxy-prop-2-enoate, methyl (Z)-3-methoxy-2-[2-methyl-5-(4-propyltriazol-2-yl)phenoxy]prop-2-enoate, methyl (Z)-3-methoxy-2-[2-methyl-5-[4-(trifluoromethyl)triazol-2-yl]phenoxy]prop-2-enoate, methyl (Z)-2-(5-cyclohexyl-2-methyl-phenoxy)-3-methoxy-prop-2-enoate, methyl (Z)-2-(5-cyclopentyl-2-methyl-phenoxy)-3-methoxy-prop-2-enoate, methyl (Z)-2-[5-(4-cyclohexylthiazol-2-yl)-2-methyl-phenoxy]-3-methoxy-prop-2-enoate, methyl (Z)-2-[5-[4-(ethoxymethyl)thiazol-2-yl]-2-methyl-phenoxy]-3-methoxy-prop-2-enoate, methyl (Z)-2-[5-(4-bromothiazol-2-yl)-2-methyl-phenoxy]-3-methoxy-prop-2-enoate, methyl (Z)-3-methoxy-2-[2-methyl-5-[5-(trifluoromethyl)thiazol-2-yl]phenoxy]prop-2-enoate, TAEGRO®, Timorex Gold™, and metarylpicoxamid, wherein the weight ratio of component (A) to component (B) is from 15:1 to 1:30.

In a more preferred composition according to the invention component (A) is compound no. X.01, [2-[(2,6-difluoro-4-pyridyl)-[5-methyl-4-(spiro[3.4]octan-3-ylcarbamoyl)thiazol-2-yl]amino]-1-methyl-2-oxo-ethyl]acetate or a salt, enantiomer, tautomer or N-oxide thereof, and component (B) is a compound selected from the group consisting of azoxystrobin, trifloxystrobin, metyltetraprole, difenoconazole, hexaconazole, propiconazole, prothioconazole, mefentrifluconazole, fenpropidin, fenpropimorph, fluxapyroxad, fluopyram, isopyrazam, sedaxane, benzovindiflupyr, pydiflumetofen, isoflucypram, isofetamid, pyrapropoyne, fluindapyr, fenpicoxamid, florylpicoxamid, chlorothalonil, mancozeb, mandipropamid, oxathiapiprolin, fluazinam, fludioxonil, cyprodinil, metalaxyl-M, aminopyrifen, folpet, ipflufenoquin, quinofumelin, tricyclazole, pyroquilon, N-(1-benzyl-1,3-dimethyl-butyl)-8-fluoro-quinoline-3-carboxamide, N-(1-benzyl-3,3,3-trifluoro-1-methyl-propyl)-8-fluoro-quinoline-3-carboxamide, 1-(6,7-dimethylpyrazolo[1,5-a]pyridin-3-yl)-4,4,5-trifluoro-3,3-dimethyl-isoquinoline, 4,4-difluoro-3,3-dimethyl-1-(7-methylpyrazolo[1,5-a]pyridin-3-yl)isoquinoline, 1-(4,5-dimethylbenzimidazol-1-yl)-4,4,5-trifluoro-3,3-dimethyl-isoquinoline, and 1-(4,5-dimethylbenzimidazol-1-yl)-4,4-difluoro-3,3-dimethyl-isoquinoline, wherein the weight ratio of component (A) to component (B) is from 15:1 to 1:30.

In another preferred composition according to the invention, component (A) is compound no. X.04, [2-[(2,6-difluoro-4-pyridyl)-[5-methyl-4-(spiro[3.4]octan-3-ylcarbamoyl)thiazol-2-yl]amino]-1-methyl-2-oxo-ethyl]ethyl carbonate or a salt, enantiomer, tautomer or N-oxide thereof, and component (B) is a compound selected from the group consisting of azoxystrobin, trifloxystrobin, metyltetraprole, difenoconazole, hexaconazole, propiconazole, prothioconazole, mefentrifluconazole, fenpropidin, fenpropimorph, fluxapyroxad, fluopyram, isopyrazam, sedaxane, benzovindiflupyr, pydiflumetofen, isoflucypram, isofetamid, pyrapropoyne, fluindapyr, fenpicoxamid, florylpicoxamid, chlorothalonil, mancozeb, mandipropamid, oxathiapiprolin, fluazinam, fludioxonil, cyprodinil, metalaxyl-M, aminopyrifen, folpet, ipflufenoquin, quinofumelin, tricyclazole, pyroquilon, N-(1-benzyl-1,3-dimethyl-butyl)-8-fluoro-quinoline-3-carboxamide, N-(1-benzyl-3,3,3-trifluoro-1-methyl-propyl)-8-fluoro-quinoline-3-carboxamide, 1-(6,7-dimethylpyrazolo[1,5-a]pyridin-3-yl)-4,4,5-trifluoro-3,3-dimethyl-isoquinoline, 4,4-difluoro-3,3-dimethyl-1-(7-methylpyrazolo[1,5-a]pyridin-3-yl)isoquinoline, 1-(4,5-dimethylbenzimidazol-1-yl)-4,4,5-trifluoro-3,3-dimethyl-isoquinoline, and 1-(4,5-dimethylbenzimidazol-1-yl)-4,4-difluoro-3,3-dimethyl-isoquinoline, wherein the weight ratio of component (A) to component (B) is from 15:1 to 1:30.

In another preferred composition according to the invention, component (A) is compound no. X.07, N-cyclobutyl-2-[(2,6-difluoro-4-pyridyl)-(2-methoxypropanoyl)amino]-5-methyl-thiazole-4-carboxamide or a salt, enantiomer, tautomer or N-oxide thereof, and component (B) is a compound selected from the group consisting of azoxystrobin, trifloxystrobin, metyltetraprole, difenoconazole, hexaconazole, propiconazole, prothioconazole, mefentrifluconazole, fenpropidin, fenpropimorph, fluxapyroxad, fluopyram, isopyrazam, sedaxane, benzovindiflupyr, pydiflumetofen, isoflucypram, isofetamid, pyrapropoyne, fluindapyr, fenpicoxamid, florylpicoxamid, chlorothalonil, mancozeb, mandipropamid, oxathiapiprolin, fluazinam, fludioxonil, cyprodinil, metalaxyl-M, aminopyrifen, folpet, ipflufenoquin, quinofumelin, tricyclazole, pyroquilon, N-(1-benzyl-1,3-dimethyl-butyl)-8-fluoro-quinoline-3-carboxamide, N-(1-benzyl-3,3,3-trifluoro-1-methyl-propyl)-8-fluoro-quinoline-3-carboxamide, 1-(6,7-dimethylpyrazolo[1,5-a]pyridin-3-yl)-4,4,5-trifluoro-3,3-dimethyl-isoquinoline, 4,4-difluoro-3,3-dimethyl-1-(7-methylpyrazolo[1,5-a]pyridin-3-yl)isoquinoline, 1-(4,5-dimethylbenzimidazol-1-yl)-4,4,5-trifluoro-3,3-dimethyl-isoquinoline, and 1-(4,5-dimethylbenzimidazol-1-yl)-4,4-difluoro-3,3-dimethyl-isoquinoline, wherein the weight ratio of component (A) to component (B) is from 15:1 to 1:30.

In another preferred composition according to the invention, component (A) is compound no. X.11, 2-[(2,6-difluoro-4-pyridyl)-(2-methoxyacetyl)amino]-5-methyl-N-spiro[3.4]octan-3-yl-thiazole-4-carboxamide or a salt, enantiomer, tautomer or N-oxide thereof, and component (B) is a compound selected from the group consisting of azoxystrobin, trifloxystrobin, metyltetraprole, difenoconazole, hexaconazole, propiconazole, prothioconazole, mefentrifluconazole, fenpropidin, fenpropimorph, fluxapyroxad, fluopyram, isopyrazam, sedaxane, benzovindiflupyr, pydiflumetofen, isoflucypram, isofetamid, pyrapropoyne, fluindapyr, fenpicoxamid, florylpicoxamid, chlorothalonil, mancozeb, mandipropamid, oxathiapiprolin, fluazinam, fludioxonil, cyprodinil, metalaxyl-M, aminopyrifen, folpet, ipflufenoquin, quinofumelin, tricyclazole, pyroquilon, N-(1-benzyl-1,3-dimethyl-butyl)-8-fluoro-quinoline-3-carboxamide, N-(1-benzyl-3,3,3-trifluoro-1-methyl-propyl)-8-fluoro-quinoline-3-carboxamide, 1-(6,7-dimethylpyrazolo[1,5-a]pyridin-3-yl)-4,4,5-trifluoro-3,3-dimethyl-isoquinoline, 4,4-difluoro-3,3-dimethyl-1-(7-methylpyrazolo[1,5-a]pyridin-3-yl)isoquinoline, 1-(4,5-dimethylbenzimidazol-1-yl)-4,4,5-trifluoro-3,3-dimethyl-isoquinoline, and 1-(4,5-dimethylbenzimidazol-1-yl)-4,4-difluoro-3,3-dimethyl-isoquinoline, wherein the weight ratio of component (A) to component (B) is from 15:1 to 1:30.

In another preferred composition according to the invention, component (A) is compound no. X.12, N-cyclobutyl-2-[(2,6-difluoro-4-pyridyl)-(2-methoxyacetyl)amino]-5-methyl-thiazole-4-carboxamide or a salt, enantiomer, tautomer or N-oxide thereof, and component (B) is a compound selected from the group consisting of azoxystrobin, trifloxystrobin, metyltetraprole, difenoconazole, hexaconazole, propiconazole, prothioconazole, mefentrifluconazole, fenpropidin, fenpropimorph, fluxapyroxad, fluopyram, isopyrazam, sedaxane, benzovindiflupyr, pydiflumetofen, isoflucypram, isofetamid, pyrapropoyne, fluindapyr, fenpicoxamid, florylpicoxamid, chlorothalonil, mancozeb, mandipropamid, oxathiapiprolin, fluazinam, fludioxonil, cyprodinil, metalaxyl-M, aminopyrifen, folpet, ipflufenoquin, quinofumelin, tricyclazole, pyroquilon, N-(1-benzyl-1,3-dimethyl-butyl)-8-fluoro-quinoline-3-carboxamide, N-(1-benzyl-3,3,3-trifluoro-1-methyl-propyl)-8-fluoro-quinoline-3-carboxamide, 1-(6,7-dimethylpyrazolo[1,5-a]pyridin-3-yl)-4,4,5-trifluoro-3,3-dimethyl-isoquinoline, 4,4-difluoro-3,3-dimethyl-1-(7-methylpyrazolo[1,5-a]pyridin-3-yl)isoquinoline, 1-(4,5-dimethylbenzimidazol-1-yl)-4,4,5-trifluoro-3,3-dimethyl-isoquinoline, and 1-(4,5-dimethylbenzimidazol-1-yl)-4,4-difluoro-3,3-dimethyl-isoquinoline, wherein the weight ratio of component (A) to component (B) is from 15:1 to 1:30.

In another preferred composition according to the invention, component (A) is compound no. X.13, 2-[acetyl-(2,6-difluoro-4-pyridyl)amino]-N-cyclobutyl-5-methyl-thiazole-4-carboxamide or a salt, enantiomer, tautomer or N-oxide thereof, and component (B) is a compound selected from the group consisting of azoxystrobin, trifloxystrobin, metyltetraprole, difenoconazole, hexaconazole, propiconazole, prothioconazole, mefentrifluconazole, fenpropidin, fenpropimorph, fluxapyroxad, fluopyram, isopyrazam, sedaxane, benzovindiflupyr, pydiflumetofen, isoflucypram, isofetamid, pyrapropoyne, fluindapyr, fenpicoxamid, florylpicoxamid, chlorothalonil, mancozeb, mandipropamid, oxathiapiprolin, fluazinam, fludioxonil, cyprodinil, metalaxyl-M, aminopyrifen, folpet, ipflufenoquin, quinofumelin, tricyclazole, pyroquilon, N-(1-benzyl-1,3-dimethyl-butyl)-8-fluoro-quinoline-3-carboxamide, N-(1-benzyl-3,3,3-trifluoro-1-methyl-propyl)-8-fluoro-quinoline-3-carboxamide, 1-(6,7-dimethylpyrazolo[1,5-a]pyridin-3-yl)-4,4,5-trifluoro-3,3-dimethyl-isoquinoline, 4,4-difluoro-3,3-dimethyl-1-(7-methylpyrazolo[1,5-a]pyridin-3-yl)isoquinoline, 1-(4,5-dimethylbenzimidazol-1-yl)-4,4,5-trifluoro-3,3-dimethyl-isoquinoline, and 1-(4,5-dimethylbenzimidazol-1-yl)-4,4-difluoro-3,3-dimethyl-isoquinoline, wherein the weight ratio of component (A) to component (B) is from 15:1 to 1:30.

In another preferred composition according to the invention, component (A) is compound no. X.14, 2-[(2-benzyloxyacetyl)-(2,6-difluoro-4-pyridyl)amino]-N-(2,2-dimethylcyclobutyl)-5-methyl-thiazole-4-carboxamide or a salt, enantiomer, tautomer or N-oxide thereof, and component (B) is a compound selected from the group consisting of azoxystrobin, trifloxystrobin, metyltetraprole, difenoconazole, hexaconazole, propiconazole, prothioconazole, mefentrifluconazole, fenpropidin, fenpropimorph, fluxapyroxad, fluopyram, isopyrazam, sedaxane, benzovindiflupyr, pydiflumetofen, isoflucypram, isofetamid, pyrapropoyne, fluindapyr, fenpicoxamid, florylpicoxamid, chlorothalonil, mancozeb, mandipropamid, oxathiapiprolin, fluazinam, fludioxonil, cyprodinil, metalaxyl-M, aminopyrifen, folpet, ipflufenoquin, quinofumelin, tricyclazole, pyroquilon, N-(1-benzyl-1,3-dimethyl-butyl)-8-fluoro-quinoline-3-carboxamide, N-(1-benzyl-3,3,3-trifluoro-1-methyl-propyl)-8-fluoro-quinoline-3-carboxamide, 1-(6,7-dimethylpyrazolo[1,5-a]pyridin-3-yl)-4,4,5-trifluoro-3,3-dimethyl-isoquinoline, 4,4-difluoro-3,3-dimethyl-1-(7-methylpyrazolo[1,5-a]pyridin-3-yl)isoquinoline, 1-(4,5-dimethylbenzimidazol-1-yl)-4,4,5-trifluoro-3,3-dimethyl-isoquinoline, and 1-(4,5-dimethylbenzimidazol-1-yl)-4,4-difluoro-3,3-dimethyl-isoquinoline, wherein the weight ratio of component (A) to component (B) is from 15:1 to 1:30.

In another preferred composition according to the invention, component (A) is compound no. X.17, 2-[(2-chloroacetyl)-(2,6-difluoro-4-pyridyl)amino]-N-(2,2-dimethylcyclobutyl)-5-methyl-thiazole-4-carboxamide or a salt, enantiomer, tautomer or N-oxide thereof, and component (B) is a compound selected from the group consisting of azoxystrobin, trifloxystrobin, metyltetraprole, difenoconazole, hexaconazole, propiconazole, prothioconazole, mefentrifluconazole, fenpropidin, fenpropimorph, fluxapyroxad, fluopyram, isopyrazam, sedaxane, benzovindiflupyr, pydiflumetofen, isoflucypram, isofetamid, pyrapropoyne, fluindapyr, fenpicoxamid, florylpicoxamid, chlorothalonil, mancozeb, mandipropamid, oxathiapiprolin, fluazinam, fludioxonil, cyprodinil, metalaxyl-M, aminopyrifen, folpet, ipflufenoquin, quinofumelin, tricyclazole, pyroquilon, N-(1-benzyl-1,3-dimethyl-butyl)-8-fluoro-quinoline-3-carboxamide, N-(1-benzyl-3,3,3-trifluoro-1-methyl-propyl)-8-fluoro-quinoline-3-carboxamide, 1-(6,7-dimethylpyrazolo

[1,5-a]pyridin-3-yl)-4,4,5-trifluoro-3,3-dimethyl-isoquinoline, 4,4-difluoro-3,3-dimethyl-1-(7-methylpyrazolo[1,5-a]pyridin-3-yl)isoquinoline, 1-(4,5-dimethylbenzimidazol-1-yl)-4,4,5-trifluoro-3,3-dimethyl-isoquinoline, and 1-(4,5-dimethylbenzimidazol-1-yl)-4,4-difluoro-3,3-dimethyl-isoquinoline, wherein the weight ratio of component (A) to component (B) is from 15:1 to 1:30.

In another preferred composition according to the invention, component (A) is compound no. X.18, methyl 3-[(2,6-difluoro-4-pyridyl)-[4-[(2,2-dimethyl cyclobutyl)carbamoyl]-5-methyl-thiazol-2-yl]amino]-3-oxo-propanoate or a salt, enantiomer, tautomer or N-oxide thereof, and component (B) is a compound selected from the group consisting of azoxystrobin, trifloxystrobin, metyltetraprole, difenoconazole, hexaconazole, propiconazole, prothioconazole, mefentrifluconazole, fenpropidin, fenpropimorph, fluxapyroxad, fluopyram, isopyrazam, sedaxane, benzovindiflupyr, pydiflumetofen, isoflucypram, isofetamid, pyrapropoyne, fluindapyr, fenpicoxamid, florylpicoxamid, chlorothalonil, mancozeb, mandipropamid, oxathiapiprolin, fluazinam, fludioxonil, cyprodinil, metalaxyl-M, aminopyrifen, folpet, ipflufenoquin, quinofumelin, tricyclazole, pyroquilon, N-(1-benzyl-1,3-dimethyl-butyl)-8-fluoro-quinoline-3-carboxamide, N-(1-benzyl-3,3,3-trifluoro-1-methyl-propyl)-8-fluoro-quinoline-3-carboxamide, 1-(6,7-dimethylpyrazolo[1,5-a]pyridin-3-yl)-4,4,5-trifluoro-3,3-dimethyl-isoquinoline, 4,4-difluoro-3,3-dimethyl-1-(7-methylpyrazolo[1,5-a]pyridin-3-yl)isoquinoline, 1-(4,5-dimethylbenzimidazol-1-yl)-4,4,5-trifluoro-3,3-dimethyl-isoquinoline, and 1-(4,5-dimethylbenzimidazol-1-yl)-4,4-difluoro-3,3-dimethyl-isoquinoline, wherein the weight ratio of component (A) to component (B) is from 15:1 to 1:30.

In another preferred composition according to the invention, component (A) is compound no. X.19, 2-[(2,6-difluoro-4-pyridyl)-(furan-2-carbonyl)amino]-N-(2,2-dimethyl cyclobutyl)-5-methyl-thiazole-4-carboxamide or a salt, enantiomer, tautomer or N-oxide thereof, and component (B) is a compound selected from the group consisting of azoxystrobin, trifloxystrobin, metyltetraprole, difenoconazole, hexaconazole, propiconazole, prothioconazole, mefentrifluconazole, fenpropidin, fenpropimorph, fluxapyroxad, fluopyram, isopyrazam, sedaxane, benzovindiflupyr, pydiflumetofen, isoflucypram, isofetamid, pyrapropoyne, fluindapyr, fenpicoxamid, florylpicoxamid, chlorothalonil, mancozeb, mandipropamid, oxathiapiprolin, fluazinam, fludioxonil, cyprodinil, metalaxyl-M, aminopyrifen, folpet, ipflufenoquin, quinofumelin, tricyclazole, pyroquilon, N-(1-benzyl-1,3-dimethyl-butyl)-8-fluoro-quinoline-3-carboxamide, N-(1-benzyl-3,3,3-trifluoro-1-methyl-propyl)-8-fluoro-quinoline-3-carboxamide, 1-(6,7-dimethylpyrazolo[1,5-a]pyridin-3-yl)-4,4,5-trifluoro-3,3-dimethyl-isoquinoline, 4,4-difluoro-3,3-dimethyl-1-(7-methylpyrazolo[1,5-a]pyridin-3-yl)isoquinoline, 1-(4,5-dimethylbenzimidazol-1-yl)-4,4,5-trifluoro-3,3-dimethyl-isoquinoline, and 1-(4,5-dimethylbenzimidazol-1-yl)-4,4-difluoro-3,3-dimethyl-isoquinoline, wherein the weight ratio of component (A) to component (B) is from 15:1 to 1:30.

In another preferred composition according to the invention, component (A) is compound no. X.22, S-isopropyl N-(2,6-difluoro-4-pyridyl)-N-[4-[(2,2-dimethyl cyclobutyl) carbamoyl]-5-methyl-thiazol-2-yl]carbamothioate or a salt, enantiomer, tautomer or N-oxide thereof, and component (B) is a compound selected from the group consisting of azoxystrobin, trifloxystrobin, metyltetraprole, difenoconazole, hexaconazole, propiconazole, prothioconazole, mefentrifluconazole, fenpropidin, fenpropimorph, fluxapyroxad, fluopyram, isopyrazam, sedaxane, benzovindiflupyr, pydiflumetofen, isoflucypram, isofetamid, pyrapropoyne, fluindapyr, fenpicoxamid, florylpicoxamid, chlorothalonil, mancozeb, mandipropamid, oxathiapiprolin, fluazinam, fludioxonil, cyprodinil, metalaxyl-M, aminopyrifen, folpet, ipflufenoquin, quinofumelin, tricyclazole, pyroquilon, N-(1-benzyl-1,3-dimethyl-butyl)-8-fluoro-quinoline-3-carboxamide, N-(1-benzyl-3,3,3-trifluoro-1-methyl-propyl)-8-fluoro-quinoline-3-carboxamide, 1-(6,7-dimethylpyrazolo[1,5-a]pyridin-3-yl)-4,4,5-trifluoro-3,3-dimethyl-isoquinoline, 4,4-difluoro-3,3-dimethyl-1-(7-methylpyrazolo[1,5-a]pyridin-3-yl)isoquinoline, 1-(4,5-dimethylbenzimidazol-1-yl)-4,4,5-trifluoro-3,3-dimethyl-isoquinoline, and 1-(4,5-dimethylbenzimidazol-1-yl)-4,4-difluoro-3,3-dimethyl-isoquinoline, wherein the weight ratio of component (A) to component (B) is from 15:1 to 1:30.

In another preferred composition according to the invention, component (A) is compound no. X.24, 2-[cyclopropane carbonyl-(2,6-difluoro-4-pyridyl)amino]-N-(2,2-dimethyl cyclobutyl)-5-methyl-thiazole-4-carboxamide or a salt, enantiomer, tautomer or N-oxide thereof, and component (B) is a compound selected from the group consisting of azoxystrobin, trifloxystrobin, metyltetraprole, difenoconazole, hexaconazole, propiconazole, prothioconazole, mefentrifluconazole, fenpropidin, fenpropimorph, fluxapyroxad, fluopyram, isopyrazam, sedaxane, benzovindiflupyr, pydiflumetofen, isoflucypram, isofetamid, pyrapropoyne, fluindapyr, fenpicoxamid, florylpicoxamid, chlorothalonil, mancozeb, mandipropamid, oxathiapiprolin, fluazinam, fludioxonil, cyprodinil, metalaxyl-M, aminopyrifen, folpet, ipflufenoquin, quinofumelin, tricyclazole, pyroquilon, N-(1-benzyl-1,3-dimethyl-butyl)-8-fluoro-quinoline-3-carboxamide, N-(1-benzyl-3,3,3-trifluoro-1-methyl-propyl)-8-fluoro-quinoline-3-carboxamide, 1-(6,7-dimethylpyrazolo[1,5-a]pyridin-3-yl)-4,4,5-trifluoro-3,3-dimethyl-isoquinoline, 4,4-difluoro-3,3-dimethyl-1-(7-methylpyrazolo[1,5-a]pyridin-3-yl)isoquinoline, 1-(4,5-dimethylbenzimidazol-1-yl)-4,4,5-trifluoro-3,3-dimethyl-isoquinoline, and 1-(4,5-dimethylbenzimidazol-1-yl)-4,4-difluoro-3,3-dimethyl-isoquinoline, wherein the weight ratio of component (A) to component (B) is from 15:1 to 1:30.

In another preferred composition according to the invention, component (A) is compound no. X.26, phenyl N-(2,6-difluoro-4-pyridyl)-N-[4-[(2,2-dimethylcyclobutyl)carbamoyl]-5-methyl-thiazol-2-yl]carbamate or a salt, enantiomer, tautomer or N-oxide thereof, and component (B) is a compound selected from the group consisting of azoxystrobin, trifloxystrobin, metyltetraprole, difenoconazole, hexaconazole, propiconazole, prothioconazole, mefentrifluconazole, fenpropidin, fenpropimorph, fluxapyroxad, fluopyram, isopyrazam, sedaxane, benzovindiflupyr, pydiflumetofen, isoflucypram, isofetamid, pyrapropoyne, fluindapyr, fenpicoxamid, florylpicoxamid, chlorothalonil, mancozeb, mandipropamid, oxathiapiprolin, fluazinam, fludioxonil, cyprodinil, metalaxyl-M, aminopyrifen, folpet, ipflufenoquin, quinofumelin, tricyclazole, pyroquilon, N-(1-benzyl-1,3-dimethyl-butyl)-8-fluoro-quinoline-3-carboxamide, N-(1-benzyl-3,3,3-trifluoro-1-methyl-propyl)-8-fluoro-quinoline-3-carboxamide, 1-(6,7-dimethylpyrazolo[1,5-a]pyridin-3-yl)-4,4,5-trifluoro-3,3-dimethyl-isoquinoline, 4,4-difluoro-3,3-dimethyl-1-(7-methylpyrazolo[1,5-a]pyridin-3-yl)isoquinoline, 1-(4,5-dimethylbenzimidazol-1-yl)-4,4,5-trifluoro-3,3-dimethyl-isoquinoline, and 1-(4,5-dimethylbenzimidazol-1-yl)-4,4-difluoro-3,3-dimethyl-isoquinoline, wherein the weight ratio of component (A) to component (B) is from 15:1 to 1:30.

In another preferred composition according to the invention, component (A) is compound no. X.29, 2-[(2,6-difluoro-4-pyridyl)-(2-methoxyacetyl)amino]-N-(2,2-dimethyl cyclobutyl)-5-methyl-thiazole-4-carboxamide or a salt, enantiomer, tautomer or N-oxide thereof, and component (B) is a compound selected from the group consisting of azoxystrobin, trifloxystrobin, metyltetraprole, difenoconazole, hexaconazole, propiconazole, prothioconazole, mefentrifluconazole, fenpropidin, fenpropimorph, fluxapyroxad, fluopyram, isopyrazam, sedaxane, benzovindiflupyr, pydiflumetofen, isoflucypram, isofetamid, pyrapropoyne, fluindapyr, fenpicoxamid, florylpicoxamid, chlorothalonil, mancozeb, mandipropamid, oxathiapiprolin, fluazinam, fludioxonil, cyprodinil, metalaxyl-M, aminopyrifen, folpet, ipflufenoquin, quinofumelin, tricyclazole, pyroquilon, N-(1-benzyl-1,3-dimethyl-butyl)-8-fluoro-quinoline-3-carboxamide, N-(1-benzyl-3,3,3-trifluoro-1-methyl-propyl)-8-fluoro-quinoline-3-carboxamide, 1-(6,7-dimethylpyrazolo[1,5-a]pyridin-3-yl)-4,4,5-trifluoro-3,3-dimethyl-isoquinoline, 4,4-difluoro-3,3-dimethyl-1-(7-methylpyrazolo[1,5-a]pyridin-3-yl)isoquinoline, 1-(4,5-dimethylbenzimidazol-1-yl)-4,4,5-trifluoro-3,3-dimethyl-isoquinoline, and 1-(4,5-dimethylbenzimidazol-1-yl)-4,4-difluoro-3,3-dimethyl-isoquinoline, wherein the weight ratio of component (A) to component (B) is from 15:1 to 1:30.

In another preferred composition according to the invention, component (A) is compound no. X.31, 2-[(2,6-difluoro-4-pyridyl)-(thiophene-2-carbonyl)amino]-N-(2,2-dimethyl cyclobutyl)-5-methyl-thiazole-4-carboxamide or a salt, enantiomer, tautomer or N-oxide thereof, and component (B) is a compound selected from the group consisting of azoxystrobin, trifloxystrobin, metyltetraprole, difenoconazole, hexaconazole, propiconazole, prothioconazole, mefentrifluconazole, fenpropidin, fenpropimorph, fluxapyroxad, fluopyram, isopyrazam, sedaxane, benzovindiflupyr, pydiflumetofen, isoflucypram, isofetamid, pyrapropoyne, fluindapyr, fenpicoxamid, florylpicoxamid, chlorothalonil, mancozeb, mandipropamid, oxathiapiprolin, fluazinam, fludioxonil, cyprodinil, metalaxyl-M, aminopyrifen, folpet, ipflufenoquin, quinofumelin, tricyclazole, pyroquilon, N-(1-benzyl-1,3-dimethyl-butyl)-8-fluoro-quinoline-3-carboxamide, N-(1-benzyl-3,3,3-trifluoro-1-methyl-propyl)-8-fluoro-quinoline-3-carboxamide, 1-(6,7-dimethylpyrazolo[1,5-a]pyridin-3-yl)-4,4,5-trifluoro-3,3-dimethyl-isoquinoline, 4,4-difluoro-3,3-dimethyl-1-(7-methylpyrazolo[1,5-a]pyridin-3-yl)isoquinoline, 1-(4,5-dimethylbenzimidazol-1-yl)-4,4,5-trifluoro-3,3-dimethyl-isoquinoline, and 1-(4,5-dimethylbenzimidazol-1-yl)-4,4-difluoro-3,3-dimethyl-isoquinoline, wherein the weight ratio of component (A) to component (B) is from 15:1 to 1:30.

In another preferred composition according to the invention, component (A) is compound no. X.33, 2-[(2,6-difluoro-4-pyridyl)-formyl-amino]-N-(2,2-dimethyl cyclobutyl)-5-methyl-thiazole-4-carboxamide or a salt, enantiomer, tautomer or N-oxide thereof, and component (B) is a compound selected from the group consisting of azoxystrobin, trifloxystrobin, metyltetraprole, difenoconazole, hexaconazole, propiconazole, prothioconazole, mefentrifluconazole, fenpropidin, fenpropimorph, fluxapyroxad, fluopyram, isopyrazam, sedaxane, benzovindiflupyr, pydiflumetofen, isoflucypram, isofetamid, pyrapropoyne, fluindapyr, fenpicoxamid, florylpicoxamid, chlorothalonil, mancozeb, mandipropamid, oxathiapiprolin, fluazinam, fludioxonil, cyprodinil, metalaxyl-M, aminopyrifen, folpet, ipflufenoquin, quinofumelin, tricyclazole, pyroquilon, N-(1-benzyl-1,3-dimethyl-butyl)-8-fluoro-quinoline-3-carboxamide, N-(1-benzyl-3,3,3-trifluoro-1-methyl-propyl)-8-fluoro-quinoline-3-carboxamide, 1-(6,7-dimethylpyrazolo[1,5-a]pyridin-3-yl)-4,4,5-trifluoro-3,3-dimethyl-isoquinoline, 4,4-difluoro-3,3-dimethyl-1-(7-methylpyrazolo[1,5-a]pyridin-3-yl)isoquinoline, 1-(4,5-dimethylbenzimidazol-1-yl)-4,4,5-trifluoro-3,3-dimethyl-isoquinoline, and 1-(4,5-dimethylbenzimidazol-1-yl)-4,4-difluoro-3,3-dimethyl-isoquinoline, wherein the weight ratio of component (A) to component (B) is from 15:1 to 1:30.

In another preferred composition according to the invention, component (A) is compound no. X.34, ethyl 2-[(2,6-difluoro-4-pyridyl)-[4-[(2,2-dimethylcyclobutyl)carbamoyl]-5-methyl-thiazol-2-yl]amino]-2-oxo-acetate or a salt, enantiomer, tautomer or N-oxide thereof, and component (B) is a compound selected from the group consisting of azoxystrobin, trifloxystrobin, metyltetraprole, difenoconazole, hexaconazole, propiconazole, prothioconazole, mefentrifluconazole, fenpropidin, fenpropimorph, fluxapyroxad, fluopyram, isopyrazam, sedaxane, benzovindiflupyr, pydiflumetofen, isoflucypram, isofetamid, pyrapropoyne, fluindapyr, fenpicoxamid, florylpicoxamid, chlorothalonil, mancozeb, mandipropamid, oxathiapiprolin, fluazinam, fludioxonil, cyprodinil, metalaxyl-M, aminopyrifen, folpet, ipflufenoquin, quinofumelin, tricyclazole, pyroquilon, N-(1-benzyl-1,3-dimethyl-butyl)-8-fluoro-quinoline-3-carboxamide, N-(1-benzyl-3,3,3-trifluoro-1-methyl-propyl)-8-fluoro-quinoline-3-carboxamide, 1-(6,7-dimethylpyrazolo[1,5-a]pyridin-3-yl)-4,4,5-trifluoro-3,3-dimethyl-isoquinoline, 4,4-difluoro-3,3-dimethyl-1-(7-methylpyrazolo[1,5-a]pyridin-3-yl)isoquinoline, 1-(4,5-dimethylbenzimidazol-1-yl)-4,4,5-trifluoro-3,3-dimethyl-isoquinoline, and 1-(4,5-dimethylbenzimidazol-1-yl)-4,4-difluoro-3,3-dimethyl-isoquinoline, wherein the weight ratio of component (A) to component (B) is from 15:1 to 1:30.

In another preferred composition according to the invention, component (A) is compound no. X.35, 2-[benzoyl-(2,6-difluoro-4-pyridyl)amino]-N-(2,2-dimethylcyclobutyl)-5-methyl-thiazole-4-carboxamide or a salt, enantiomer, tautomer or N-oxide thereof, and component (B) is a compound selected from the group consisting of azoxystrobin, trifloxystrobin, metyltetraprole, difenoconazole, hexaconazole, propiconazole, prothioconazole, mefentrifluconazole, fenpropidin, fenpropimorph, fluxapyroxad, fluopyram, isopyrazam, sedaxane, benzovindiflupyr, pydiflumetofen, isoflucypram, isofetamid, pyrapropoyne, fluindapyr, fenpicoxamid, florylpicoxamid, chlorothalonil, mancozeb, mandipropamid, oxathiapiprolin, fluazinam, fludioxonil, cyprodinil, metalaxyl-M, aminopyrifen, folpet, ipflufenoquin, quinofumelin, tricyclazole, pyroquilon, N-(1-benzyl-1,3-dimethyl-butyl)-8-fluoro-quinoline-3-carboxamide, N-(1-benzyl-3,3,3-trifluoro-1-methyl-propyl)-8-fluoro-quinoline-3-carboxamide, 1-(6,7-dimethylpyrazolo[1,5-a]pyridin-3-yl)-4,4,5-trifluoro-3,3-dimethyl-isoquinoline, 4,4-difluoro-3,3-dimethyl-1-(7-methylpyrazolo[1,5-a]pyridin-3-yl)isoquinoline, 1-(4,5-dimethylbenzimidazol-1-yl)-4,4,5-trifluoro-3,3-dimethyl-isoquinoline, and 1-(4,5-dimethylbenzimidazol-1-yl)-4,4-difluoro-3,3-dimethyl-isoquinoline, wherein the weight ratio of component (A) to component (B) is from 15:1 to 1:30.

In another preferred composition according to the invention, component (A) is compound no. X.36, 2-[acetyl-(2,6-difluoro-4-pyridyl)amino]-N-(2,2-dimethyl cyclobutyl)-5-methyl-thiazole-4-carboxamide or a salt, enantiomer, tautomer or N-oxide thereof, and component (B) is a compound selected from the group consisting of azoxystrobin, trifloxystrobin, metyltetraprole, difenoconazole, hexaconazole, propiconazole, prothioconazole, mefentrifluconazole, fenpropidin, fenpropimorph, fluxapyroxad, fluopyram, isopyrazam, sedaxane, benzovindiflupyr, pydiflumetofen, isoflucypram, isofetamid, pyrapropoyne, fluindapyr, fenpicoxamid, florylpicoxamid, chlorothalonil, mancozeb, mandipropamid, oxathiapiprolin, fluazinam, fludioxonil, cyprodinil, metalaxyl-M, aminopyrifen, folpet, ipflufenoquin, quinofumelin, tricyclazole, pyroquilon, N-(1-benzyl-1,3-dimethyl-butyl)-8-fluoro-quinoline-3-carboxamide, N-(1-benzyl-3,3,3-trifluoro-1-methyl-propyl)-8-fluoro-quinoline-3-carboxamide, 1-(6,7-dimethylpyrazolo[1,5-a]pyridin-3-yl)-4,4,5-trifluoro-3,3-dimethyl-isoquinoline, 4,4-difluoro-3,3-dimethyl-1-(7-methylpyrazolo[1,5-a]pyridin-3-yl)isoquinoline, 1-(4,5-dimethylbenzimidazol-1-yl)-4,4,5-trifluoro-3,3-dimethyl-isoquinoline, and 1-(4,5-dimethylbenzimidazol-1-yl)-4,4-difluoro-3,3-dimethyl-isoquinoline, wherein the weight ratio of component (A) to component (B) is from 15:1 to 1:30.

In another preferred composition according to the invention, component (A) is compound no. X.37, 2-[acetyl-(2,6-difluoro-4-pyridyl)amino]-5-methyl-N-spiro[3.4]octan-3-yl-thiazole-4-carboxamide or a salt, enantiomer, tautomer or N-oxide thereof, and component (B) is a compound selected from the group consisting of azoxystrobin, trifloxystrobin, metyltetraprole, difenoconazole, hexaconazole, propiconazole, prothioconazole, mefentrifluconazole, fenpropidin, fenpropimorph, fluxapyroxad, fluopyram, isopyrazam, sedaxane, benzovindiflupyr, pydiflumetofen, isoflucypram, isofetamid, pyrapropoyne, fluindapyr, fenpicoxamid, florylpicoxamid, chlorothalonil, mancozeb, mandipropamid, oxathiapiprolin, fluazinam, fludioxonil, cyprodinil, metalaxyl-M, aminopyrifen, folpet, ipflufenoquin, quinofumelin, tricyclazole, pyroquilon, N-(1-benzyl-1,3-dimethyl-butyl)-8-fluoro-quinoline-3-carboxamide, N-(1-benzyl-3,3,3-trifluoro-1-methyl-propyl)-8-fluoro-quinoline-3-carboxamide, 1-(6,7-dimethylpyrazolo[1,5-a]pyridin-3-yl)-4,4,5-trifluoro-3,3-dimethyl-isoquinoline, 4,4-difluoro-3,3-dimethyl-1-(7-methylpyrazolo[1,5-a]pyridin-3-yl)isoquinoline, 1-(4,5-dimethylbenzimidazol-1-yl)-4,4,5-trifluoro-3,3-dimethyl-isoquinoline, and 1-(4,5-dimethylbenzimidazol-1-yl)-4,4-difluoro-3,3-dimethyl-isoquinoline, wherein the weight ratio of component (A) to component (B) is from 15:1 to 1:30.

In another preferred composition according to the invention, component (A) is compound no. X.38, 2-[(2,6-difluoro-4-pyridyl)-(2-methylpropanoyl)amino]-N-(2,2-dimethylcyclobutyl)-5-methyl-thiazole-4-carboxamide or a salt, enantiomer, tautomer or N-oxide thereof, and component (B) is a compound selected from the group consisting of azoxystrobin, trifloxystrobin, metyltetraprole, difenoconazole, hexaconazole, propiconazole, prothioconazole, mefentrifluconazole, fenpropidin, fenpropimorph, fluxapyroxad, fluopyram, isopyrazam, sedaxane, benzovindiflupyr, pydiflumetofen, isoflucypram, isofetamid, pyrapropoyne, fluindapyr, fenpicoxamid, florylpicoxamid, chlorothalonil, mancozeb, mandipropamid, oxathiapiprolin, fluazinam, fludioxonil, cyprodinil, metalaxyl-M, aminopyrifen, folpet, ipflufenoquin, quinofumelin, tricyclazole, pyroquilon, N-(1-benzyl-1,3-dimethyl-butyl)-8-fluoro-quinoline-3-carboxamide, N-(1-benzyl-3,3,3-trifluoro-1-methyl-propyl)-8-fluoro-quinoline-3-carboxamide, 1-(6,7-dimethylpyrazolo[1,5-a]pyridin-3-yl)-4,4,5-trifluoro-3,3-dimethyl-isoquinoline, 4,4-difluoro-3,3-dimethyl-1-(7-methylpyrazolo[1,5-a]pyridin-3-yl)isoquinoline, 1-(4,5-dimethylbenzimidazol-1-yl)-4,4,5-trifluoro-3,3-dimethyl-isoquinoline, and 1-(4,5-dimethylbenzimidazol-1-yl)-4,4-difluoro-3,3-dimethyl-isoquinoline, wherein the weight ratio of component (A) to component (B) is from 15:1 to 1:30.

In a preferred composition according to the invention component (A) is compound no. X.01, [2-[(2,6-difluoro-4-pyridyl)-[5-methyl-4-(spiro[3.4]octan-3-ylcarbamoyl)thiazol-2-yl]amino]-1-methyl-2-oxo-ethyl]acetate or a salt, enantiomer, tautomer or N-oxide thereof, and component (B) is a compound selected from the group consisting of azoxystrobin, trifloxystrobin, metyltetraprole, difenoconazole, hexaconazole, propiconazole, prothioconazole, mefentrifluconazole, fenpropidin, fenpropimorph, fluxapyroxad, fluopyram, isopyrazam, sedaxane, benzovindiflupyr, pydiflumetofen, isoflucypram, isofetamid, pyrapropoyne, fluindapyr, fenpicoxamid, florylpicoxamid, acibenzolar-S-methyl, chlorothalonil, mancozeb, mandipropamid, oxathiapiprolin, fluazinam, fludioxonil, cyprodinil, metalaxyl-M, aminopyrifen, folpet, ipflufenoquin, quinofumelin, tricyclazole, pyroquilon, cyflufenamid, metrafenone, N'-[2-chloro-4-(2-fluorophenoxy)-5-methyl-phenyl]-N-ethyl-N-methyl-formamidine N'-[4-(2-bromophenoxy)-5-chloro-2-methyl-phenyl]-N-ethyl-N-methyl-formamidine, N-(1-benzyl-1,3-dimethyl-butyl)-8-fluoro-quinoline-3-carboxamide, N-(1-benzyl-3,3,3-trifluoro-1-methyl-propyl)-8-fluoro-quinoline-3-carboxamide, N-(1-benzyl-3-chloro-1-methyl-but-3-enyl)-8-fluoro-quinoline-3-carboxamide, 1-(6,7-dimethylpyrazolo[1,5-a]pyridin-3-yl)-4,4,5-trifluoro-3,3-dimethyl-isoquinoline, 4,4-difluoro-3,3-dimethyl-1-(7-methylpyrazolo[1,5-a]pyridin-3-yl) isoquinoline, 1-(6,7-dimethylpyrazolo[1,5-a]pyridin-3-yl)-4,4,6-trifluoro-3,3-dimethyl-isoquinoline, 1-(4,5-dimethylbenzimidazol-1-yl)-4,4,5-trifluoro-3,3-dimethyl-isoquinoline, 1-(4,5-dimethylbenzimidazol-1-yl)-4,4-difluoro-3,3-dimethyl-isoquinoline, 6-chloro-4,4-difluoro-3,3-dimethyl-1-(4-methylbenzimidazol-1-yl)isoquinoline, N'-[5-bromo-2-methyl-6-(1-methyl-2-propoxy-ethoxy)-3-pyridyl]-N-ethyl-N-methyl-formamidine, N'-[5-chloro-2-methyl-6-(1-methyl-2-propoxy-ethoxy)-3-pyridyl]-N-ethyl-N-methyl-formamidine, N'-[5-bromo-2-methyl-6-(1-methyl-2-propoxy-ethoxy)-3-pyridyl]-N-isopropyl-N-methyl-formamidine, N-isopropyl-N'-[5-methoxy-2-methyl-4-(2,2,2-trifluoro-1-hydroxy-1-phenyl-ethyl) phenyl]-N-methyl-formamidine, N-methoxy-N-[[4-[5-(trifluoromethyl)-1,2,4-oxadiazol-3-yl]phenyl]methyl] cyclopropanecarboxamide, N,2-dimethoxy-N-[[4-[5-(trifluoromethyl)-1,2,4-oxadiazol-3-yl]phenyl]methyl] propanamide, N-ethyl-2-methyl-N-[[4-[5-(trifluoromethyl)-1,2,4-oxadiazol-3-yl]phenyl]methyl]propanamide, 1-methoxy-3-methyl-1-[[4-[5-(trifluoromethyl)-1,2,4-oxadiazol-3-yl]phenyl]methyl]urea, 1,3-dimethoxy-1-[[4-[5-(trifluoromethyl)-1,2,4-oxadiazol-3-yl]phenyl]methyl]urea, 3-ethyl-1-methoxy-1-[[4-[5-(trifluoromethyl)-1,2,4-oxadiazol-3-yl]phenyl]methyl]urea, ethyl 1-[[4-[5-(trifluoromethyl)-1,2,4-oxadiazol-3-yl]phenyl]methyl]pyrazole-4-carboxylate, N,N-dimethyl-1-[[4-[5-(trifluoromethyl)-1,2,4-oxadiazol-3-yl]phenyl]methyl]-1,2,4-triazol-3-amine, methyl (Z)-3-methoxy-2-[2-methyl-5-[3-(trifluoromethyl) pyrazol-1-yl]phenoxy]prop-2-enoate, methyl (Z)-3-methoxy-2-[2-methyl-5-(3-propylpyrazol-1-yl)phenoxy] prop-2-enoate, methyl (Z)-2-[5-(3-isopropylpyrazol-1-yl)-2-methyl-phenoxy]-3-methoxy-prop-2-enoate, methyl (Z)-3-methoxy-2-[2-methyl-5-(4-propyltriazol-2-yl)phenoxy] prop-2-enoate, methyl (Z)-3-methoxy-2-[2-methyl-5-[4-(trifluoromethyl)triazol-2-yl]phenoxy]prop-2-enoate, methyl (Z)-2-(5-cyclohexyl-2-methyl-phenoxy)-3-methoxy-prop-2-enoate, methyl (Z)-2-(5-cyclopentyl-2-methyl-phenoxy)-3-methoxy-prop-2-enoate, methyl (Z)-2-[5-(4-cyclohexylthiazol-2-yl)-2-methyl-phenoxy]-3-methoxy-prop-2-enoate, methyl (Z)-2-[5-[4-(ethoxymethyl) thiazol-2-yl]-2-methyl-phenoxy]-3-methoxy-prop-2-enoate, methyl (Z)-2-[5-(4-bromothiazol-2-yl)-2-methyl-phenoxy]-3-methoxy-prop-2-enoate, and methyl (Z)-3-methoxy-2-[2-methyl-5-[5-(trifluoromethyl)thiazol-2-yl]phenoxy]prop-2- enoate, wherein the weight ratio of component (A) to component (B) is from 10:1 to 1:10 (or even more preferably, 5:1 to 1:5).

In another preferred composition according to the invention, component (A) is compound no. X.04, [2-[(2,6-difluoro-4-pyridyl)-[5-methyl-4-(spiro[3.4]octan-3-ylcarbamoyl)thiazol-2-yl]amino]-1-methyl-2-oxo-ethyl]ethyl carbonate or a salt, enantiomer, tautomer or N-oxide thereof, and component (B) is a compound selected from the group consisting of azoxystrobin, trifloxystrobin, metyltetraprole, difenoconazole, hexaconazole, propiconazole, prothioconazole, mefentrifluconazole, fenpropidin, fenpropimorph, fluxapyroxad, fluopyram, isopyrazam, sedaxane, benzovindiflupyr, pydiflumetofen, isoflucypram, isofetamid, pyrapropoyne, fluindapyr, fenpicoxamid, florylpicoxamid, acibenzolar-S-methyl, chlorothalonil, mancozeb, mandipropamid, oxathiapiprolin, fluazinam, fludioxonil, cyprodinil, metalaxyl-M, aminopyrifen, folpet, ipflufenoquin, quinofumelin, tricyclazole, pyroquilon, cyflufenamid, metrafenone, N'-[2-chloro-4-(2-fluorophenoxy)-5-methyl-phenyl]-N-ethyl-N-methyl-formamidine N'-[4-(2-bromophenoxy)-5-chloro-2-methyl-phenyl]-N-ethyl-N-methyl-formamidine, N-(1-benzyl-1,3-dimethyl-butyl)-8-fluoro-quinoline-3-carboxamide, N-(1-benzyl-3,3,3-trifluoro-1-methyl-propyl)-8-fluoro-quinoline-3-carboxamide, N-(1-benzyl-3-chloro-1-methyl-but-3-enyl)-8-fluoro-quinoline-3-carboxamide, 1-(6,7-dimethylpyrazolo[1,5-a]pyridin-3-yl)-4,4,5-trifluoro-3,3-dimethyl-isoquinoline, 4,4-difluoro-3,3-dimethyl-1-(7-methylpyrazolo[1,5-a]pyridin-3-yl) isoquinoline, 1-(6,7-dimethylpyrazolo[1,5-a]pyridin-3-yl)-4,4,6-trifluoro-3,3-dimethyl-isoquinoline, 1-(4,5-dimethylbenzimidazol-1-yl)-4,4,5-trifluoro-3,3-dimethyl-isoquinoline, 1-(4,5-dimethylbenzimidazol-1-yl)-4,4-difluoro-3,3-dimethyl-isoquinoline, 6-chloro-4,4-difluoro-3,3-dimethyl-1-(4-methylbenzimidazol-1-yl)isoquinoline, N'-[5-bromo-2-methyl-6-(1-methyl-2-propoxy-ethoxy)-3-pyridyl]-N-ethyl-N-methyl-formamidine, N'-[5-chloro-2-methyl-6-(1-methyl-2-propoxy-ethoxy)-3-pyridyl]-N-ethyl-N-methyl-formamidine, N'-[5-bromo-2-methyl-6-(1-methyl-2-propoxy-ethoxy)-3-pyridyl]-N-isopropyl-N-methyl-formamidine, N-isopropyl-N'-[5-methoxy-2-methyl-4-(2,2,2-trifluoro-1-hydroxy-1-phenyl-ethyl) phenyl]-N-methyl-formamidine, N-methoxy-N-[[4-[5-(trifluoromethyl)-1,2,4-oxadiazol-3-yl]phenyl]methyl] cyclopropanecarboxamide, N,2-dimethoxy-N-[[4-[5-(trifluoromethyl)-1,2,4-oxadiazol-3-yl]phenyl]methyl] propanamide, N-ethyl-2-methyl-N-[[4-[5-(trifluoromethyl)-1,2,4-oxadiazol-3-yl]phenyl]methyl]propanamide, 1-methoxy-3-methyl-1-[[4-[5-(trifluoromethyl)-1,2,4-oxadiazol-3-yl]phenyl]methyl]urea, 1,3-dimethoxy-1-[[4-[5-(trifluoromethyl)-1,2,4-oxadiazol-3-yl]phenyl]methyl]urea, 3-ethyl-1-methoxy-1-[[4-[5-(trifluoromethyl)-1,2,4-oxadiazol-3-yl]phenyl]methyl]urea, ethyl 1-[[4-[5-(trifluoromethyl)-1,2,4-oxadiazol-3-yl]phenyl]methyl]pyrazole-4-carboxylate, N,N-dimethyl-1-[[4-[5-(trifluoromethyl)-1,2,4-oxadiazol-3-yl]phenyl]methyl]-1,2,4-triazol-3-amine, methyl (Z)-3-methoxy-2-[2-methyl-5-[3-(trifluoromethyl) pyrazol-1-yl]phenoxy]prop-2-enoate, methyl (Z)-3-methoxy-2-[2-methyl-5-(3-propylpyrazol-1-yl)phenoxy] prop-2-enoate, methyl (Z)-2-[5-(3-isopropylpyrazol-1-yl)-2-methyl-phenoxy]-3-methoxy-prop-2-enoate, methyl (Z)-3-methoxy-2-[2-methyl-5-(4-propyltriazol-2-yl)phenoxy] prop-2-enoate, methyl (Z)-3-methoxy-2-[2-methyl-5-[4-(trifluoromethyl)triazol-2-yl]phenoxy]prop-2-enoate, methyl (Z)-2-(5-cyclohexyl-2-methyl-phenoxy)-3-methoxy-prop-2-enoate, methyl (Z)-2-(5-cyclopentyl-2-methyl-phenoxy)-3-methoxy-prop-2-enoate, methyl (Z)-2-[5-(4-cyclohexylthiazol-2-yl)-2-methyl-phenoxy]-3-methoxy-prop-2-enoate, methyl (Z)-2-[5-[4-(ethoxymethyl) thiazol-2-yl]-2-methyl-phenoxy]-3-methoxy-prop-2-enoate, methyl (Z)-2-[5-(4-bromothiazol-2-yl)-2-methyl-phenoxy]-3-methoxy-prop-2-enoate, and methyl (Z)-3-methoxy-2-[2-methyl-5-[5-(trifluoromethyl)thiazol-2-yl]phenoxy]prop-2-enoate, wherein the weight ratio of component (A) to component (B) is from 10:1 to 1:10 (or even more preferably, 5:1 to 1:5).

In another preferred composition according to the invention, component (A) is compound no. X.07, N-cyclobutyl-2-[(2,6-difluoro-4-pyridyl)-(2-methoxypropanoyl)amino]-5-methyl-thiazole-4-carboxamide or a salt, enantiomer, tautomer or N-oxide thereof, and component (B) is a compound selected from the group consisting of azoxystrobin, trifloxystrobin, metyltetraprole, difenoconazole, hexaconazole, propiconazole, prothioconazole, mefentrifluconazole, fenpropidin, fenpropimorph, fluxapyroxad, fluopyram, isopyrazam, sedaxane, benzovindiflupyr, pydiflumetofen, isoflucypram, isofetamid, pyrapropoyne, fluindapyr, fenpicoxamid, florylpicoxamid, acibenzolar-S-methyl, chlorothalonil, mancozeb, mandipropamid, oxathiapiprolin, fluazinam, fludioxonil, cyprodinil, metalaxyl-M, aminopyrifen, folpet, ipflufenoquin, quinofumelin, tricyclazole, pyroquilon, cyflufenamid, metrafenone, N'-[2-chloro-4-(2-fluorophenoxy)-5-methyl-phenyl]-N-ethyl-N-methyl-formamidine N'-[4-(2-bromophenoxy)-5-chloro-2-methyl-phenyl]-N-ethyl-N-methyl-formamidine, N-(1-benzyl-1,3-dimethyl-butyl)-8-fluoro-quinoline-3-carboxamide, N-(1-benzyl-3,3,3-trifluoro-1-methyl-propyl)-8-fluoro-quinoline-3-carboxamide, N-(1-benzyl-3-chloro-1-methyl-but-3-enyl)-8-fluoro-quinoline-3-carboxamide, 1-(6,7-dimethylpyrazolo[1,5-a]pyridin-3-yl)-4,4,5-trifluoro-3,3-dimethyl-isoquinoline, 4,4-difluoro-3,3-dimethyl-1-(7-methylpyrazolo[1,5-a]pyridin-3-yl)isoquinoline, 1-(6,7-dimethylpyrazolo[1,5-a]pyridin-3-yl)-4,4,6-trifluoro-3,3-dimethyl-isoquinoline, 1-(4,5-dimethylbenzimidazol-1-yl)-4,4,5-trifluoro-3,3-dimethyl-isoquinoline, 1-(4,5-dimethylbenzimidazol-1-yl)-4,4-difluoro-3,3-dimethyl-isoquinoline, 6-chloro-4,4-difluoro-3,3-dimethyl-1-(4-methylbenzimidazol-1-yl)isoquinoline, N'-[5-bromo-2-methyl-6-(1-methyl-2-propoxy-ethoxy)-3-pyridyl]-N-ethyl-N-methyl-formamidine, N'-[5-chloro-2-methyl-6-(1-methyl-2-propoxy-ethoxy)-3-pyridyl]-N-ethyl-N-methyl-formamidine, N'-[5-bromo-2-methyl-6-(1-methyl-2-propoxy-ethoxy)-3-pyridyl]-N-isopropyl-N-methyl-formamidine, N-isopropyl-N'-[5-methoxy-2-methyl-4-(2,2,2-trifluoro-1-hydroxy-1-phenyl-ethyl)phenyl]-N-methyl-formamidine, N-methoxy-N-[[4-[5-(trifluoromethyl)-1,2,4-oxadiazol-3-yl]phenyl]methyl]cyclopropanecarboxamide, N,2-dimethoxy-N-[[4-[5-(trifluoromethyl)-1,2,4-oxadiazol-3-yl]phenyl]methyl]propanamide, N-ethyl-2-methyl-N-[[4-[5-(trifluoromethyl)-1,2,4-oxadiazol-3-yl]phenyl]methyl] propanamide, 1-methoxy-3-methyl-1-[[4-[5-(trifluoromethyl)-1,2,4-oxadiazol-3-yl]phenyl]methyl]urea, 1,3-dimethoxy-1-[[4-[5-(trifluoromethyl)-1,2,4-oxadiazol-3-yl]phenyl]methyl]urea, 3-ethyl-1-methoxy-1-[[4-[5-(trifluoromethyl)-1,2,4-oxadiazol-3-yl]phenyl]methyl]urea, ethyl 1-[[4-[5-(trifluoromethyl)-1,2,4-oxadiazol-3-yl]phenyl]methyl]pyrazole-4-carboxylate, N,N-dimethyl-1-[[4-[5-(trifluoromethyl)-1,2,4-oxadiazol-3-yl]phenyl]methyl]-1,2,4-triazol-3-amine, methyl (Z)-3-methoxy-2-[2-methyl-5-[3-(trifluoromethyl)pyrazol-1-yl]phenoxy]prop-2-enoate, methyl (Z)-3-methoxy-2-[2-methyl-5-(3-propylpyrazol-1-yl)phenoxy]prop-2-enoate, methyl (Z)-2-[5-(3-isopropylpyrazol-1-yl)-2-methyl-phenoxy]-3-methoxy-prop-2-enoate, methyl (Z)-3-methoxy-2-[2-methyl-5-(4-propyltriazol- 2-yl)phenoxy]prop-2-enoate, methyl (Z)-3-methoxy-2-[2-methyl-5-[4-(trifluoromethyl)triazol-2-yl]phenoxy]prop-2-enoate, methyl (Z)-2-(5-cyclohexyl-2-methyl-phenoxy)-3-methoxy-prop-2-enoate, methyl (Z)-2-(5-cyclopentyl-2-methyl-phenoxy)-3-methoxy-prop-2-enoate, methyl (Z)-2-[5-(4-cyclohexylthiazol-2-yl)-2-methyl-phenoxy]-3-methoxy-prop-2-enoate, methyl (Z)-2-[5-[4-(ethoxymethyl) thiazol-2-yl]-2-methyl-phenoxy]-3-methoxy-prop-2-enoate, methyl (Z)-2-[5-(4-bromothiazol-2-yl)-2-methyl-phenoxy]-3-methoxy-prop-2-enoate, and methyl (Z)-3-methoxy-2-[2-methyl-5-[5-(trifluoromethyl)thiazol-2-yl]phenoxy]prop-2-enoate, wherein the weight ratio of component (A) to component (B) is from 10:1 to 1:10 (or even more preferably, 5:1 to 1:5).

In another preferred composition according to the invention, component (A) is compound no. X.11, 2-[(2,6-difluoro-4-pyridyl)-(2-methoxyacetyl)amino]-5-methyl-N-spiro[3.4] octan-3-yl-thiazole-4-carboxamide or a salt, enantiomer, tautomer or N-oxide thereof, and component (B) is a compound selected from the group consisting of azoxystrobin, trifloxystrobin, metyltetraprole, difenoconazole, hexaconazole, propiconazole, prothioconazole, mefentrifluconazole, fenpropidin, fenpropimorph, fluxapyroxad, fluopyram, isopyrazam, sedaxane, benzovindiflupyr, pydiflumetofen, isoflucypram, isofetamid, pyrapropoyne, fluindapyr, fenpicoxamid, florylpicoxamid, acibenzolar-S-methyl, chlorothalonil, mancozeb, mandipropamid, oxathiapiprolin, fluazinam, fludioxonil, cyprodinil, metalaxyl-M, aminopyrifen, folpet, ipflufenoquin, quinofumelin, tricyclazole, pyroquilon, cyflufenamid, metrafenone, N'-[2-chloro-4-(2-fluorophenoxy)-5-methyl-phenyl]-N-ethyl-N-methyl-formamidine N'-[4-(2-bromophenoxy)-5-chloro-2-methyl-phenyl]-N-ethyl-N-methyl-formamidine, N-(1-benzyl-1,3-dimethyl-butyl)-8-fluoro-quinoline-3-carboxamide, N-(1-benzyl-3,3,3-trifluoro-1-methyl-propyl)-8-fluoro-quinoline-3-carboxamide, N-(1-benzyl-3-chloro-1-methyl-but-3-enyl)-8-fluoro-quinoline-3-carboxamide, 1-(6,7-dimethylpyrazolo[1,5-a]pyridin-3-yl)-4,4,5-trifluoro-3,3-dimethyl-isoquinoline, 4,4-difluoro-3,3-dimethyl-1-(7-methylpyrazolo[1,5-a]pyridin-3-yl)isoquinoline, 1-(6,7-dimethylpyrazolo[1,5-a]pyridin-3-yl)-4,4,6-trifluoro-3,3-dimethyl-isoquinoline, 1-(4,5-dimethylbenzimidazol-1-yl)-4,4,5-trifluoro-3,3-dimethyl-isoquinoline, 1-(4,5-dimethylbenzimidazol-1-yl)-4,4-difluoro-3,3-dimethyl-isoquinoline, 6-chloro-4,4-difluoro-3,3-dimethyl-1-(4-methylbenzimidazol-1-yl)isoquinoline, N'-[5-bromo-2-methyl-6-(1-methyl-2-propoxy-ethoxy)-3-pyridyl]-N-ethyl-N-methyl-formamidine, N'-[5-chloro-2-methyl-6-(1-methyl-2-propoxy-ethoxy)-3-pyridyl]-N-ethyl-N-methyl-formamidine, N'-[5-bromo-2-methyl-6-(1-methyl-2-propoxy-ethoxy)-3-pyridyl]-N-isopropyl-N-methyl-formamidine, N-isopropyl-N'-[5-methoxy-2-methyl-4-(2,2,2-trifluoro-1-hydroxy-1-phenyl-ethyl)phenyl]-N-methyl-formamidine, N-methoxy-N-[[4-[5-(trifluoromethyl)-1,2,4-oxadiazol-3-yl]phenyl]methyl]cyclopropanecarboxamide, N,2-dimethoxy-N-[[4-[5-(trifluoromethyl)-1,2,4-oxadiazol-3-yl]phenyl]methyl]propanamide, N-ethyl-2-methyl-N-[[4-[5-(trifluoromethyl)-1,2,4-oxadiazol-3-yl]phenyl]methyl] propanamide, 1-methoxy-3-methyl-1-[[4-[5-(trifluoromethyl)-1,2,4-oxadiazol-3-yl]phenyl]methyl]urea, 1,3-dimethoxy-1-[[4-[5-(trifluoromethyl)-1,2,4-oxadiazol-3-yl]phenyl]methyl]urea, 3-ethyl-1-methoxy-1-[[4-[5-(trifluoromethyl)-1,2,4-oxadiazol-3-yl]phenyl]methyl]urea, ethyl 1-[[4-[5-(trifluoromethyl)-1,2,4-oxadiazol-3-yl]phenyl]methyl]pyrazole-4-carboxylate, N,N-dimethyl-1-[[4-[5-(trifluoromethyl)-1,2,4-oxadiazol-3-yl]phenyl]methyl]-1,2,4-triazol-3-amine, methyl (Z)-3-methoxy-2-[2-methyl-5-[3-(trifluoromethyl)pyrazol-1-yl]phenoxy]prop-2-enoate, methyl (Z)-3-methoxy-2-[2-methyl-5-(3-propylpyrazol-1-yl)phenoxy]prop-2-enoate, methyl (Z)-2-[5-(3-isopropylpyrazol-1-yl)-2-methyl-phenoxy]-3-methoxy-prop-2-enoate, methyl (Z)-3-methoxy-2-[2-methyl-5-(4-propyltriazol-2-yl)phenoxy]prop-2-enoate, methyl (Z)-3-methoxy-2-[2-methyl-5-[4-(trifluoromethyl)triazol-2-yl]phenoxy]prop-2-enoate, methyl (Z)-2-(5-cyclohexyl-2-methyl-phenoxy)-3-methoxy-prop-2-enoate, methyl (Z)-2-(5-cyclopentyl-2-methyl-phenoxy)-3-methoxy-prop-2-enoate, methyl (Z)-2-[5-(4-cyclohexylthiazol-2-yl)-2-methyl-phenoxy]-3-methoxy-prop-2-enoate, methyl (Z)-2-[5-[4-(ethoxymethyl) thiazol-2-yl]-2-methyl-phenoxy]-3-methoxy-prop-2-enoate, methyl (Z)-2-[5-(4-bromothiazol-2-yl)-2-methyl-phenoxy]-3-methoxy-prop-2-enoate, and methyl (Z)-3-methoxy-2-[2-methyl-5-[5-(trifluoromethyl)thiazol-2-yl]phenoxy]prop-2-enoate, wherein the weight ratio of component (A) to component (B) is from 10:1 to 1:10 (or even more preferably, 5:1 to 1:5).

In another preferred composition according to the invention, component (A) is compound no. X.12, N-cyclobutyl-2-[(2,6-difluoro-4-pyridyl)-(2-methoxyacetyl)amino]-5-methyl-thiazole-4-carboxamide or a salt, enantiomer, tautomer or N-oxide thereof, and component (B) is a compound selected from the group consisting of azoxystrobin, trifloxystrobin, metyltetraprole, difenoconazole, hexaconazole, propiconazole, prothioconazole, mefentrifluconazole, fenpropidin, fenpropimorph, fluxapyroxad, fluopyram, isopyrazam, sedaxane, benzovindiflupyr, pydiflumetofen, isoflucypram, isofetamid, pyrapropoyne, fluindapyr, fenpicoxamid, florylpicoxamid, acibenzolar-S-methyl, chlorothalonil, mancozeb, mandipropamid, oxathiapiprolin, fluazinam, fludioxonil, cyprodinil, metalaxyl-M, aminopyrifen, folpet, ipflufenoquin, quinofumelin, tricyclazole, pyroquilon, cyflufenamid, metrafenone, N'-[2-chloro-4-(2-fluorophenoxy)-5-methyl-phenyl]-N-ethyl-N-methyl-formamidine N'-[4-(2-bromophenoxy)-5-chloro-2-methyl-phenyl]-N-ethyl-N-methyl-formamidine, N-(1-benzyl-1,3-dimethyl-butyl)-8-fluoro-quinoline-3-carboxamide, N-(1-benzyl-3,3,3-trifluoro-1-methyl-propyl)-8-fluoro-quinoline-3-carboxamide, N-(1-benzyl-3-chloro-1-methyl-but-3-enyl)-8-fluoro-quinoline-3-carboxamide, 1-(6,7-dimethylpyrazolo[1,5-a]pyridin-3-yl)-4,4,5-trifluoro-3,3-dimethyl-isoquinoline, 4,4-difluoro-3,3-dimethyl-1-(7-methylpyrazolo[1,5-a]pyridin-3-yl)isoquinoline, 1-(6,7-dimethylpyrazolo[1,5-a]pyridin-3-yl)-4,4,6-trifluoro-3,3-dimethyl-isoquinoline, 1-(4,5-dimethylbenzimidazol-1-yl)-4,4,5-trifluoro-3,3-dimethyl-isoquinoline, 1-(4,5-dimethylbenzimidazol-1-yl)-4,4-difluoro-3,3-dimethyl-isoquinoline, 6-chloro-4,4-difluoro-3,3-dimethyl-1-(4-methylbenzimidazol-1-yl)isoquinoline, N'-[5-bromo-2-methyl-6-(1-methyl-2-propoxy-ethoxy)-3-pyridyl]-N-ethyl-N-methyl-formamidine, N'-[5-chloro-2-methyl-6-(1-methyl-2-propoxy-ethoxy)-3-pyridyl]-N-ethyl-N-methyl-formamidine, N'-[5-bromo-2-methyl-6-(1-methyl-2-propoxy-ethoxy)-3-pyridyl]-N-isopropyl-N-methyl-formamidine, N-isopropyl-N'-[5-methoxy-2-methyl-4-(2,2,2-trifluoro-1-hydroxy-1-phenyl-ethyl)phenyl]-N-methyl-formamidine, N-methoxy-N-[[4-[5-(trifluoromethyl)-1,2,4-oxadiazol-3-yl]phenyl]methyl]cyclopropanecarboxamide, N,2-dimethoxy-N-[[4-[5-(trifluoromethyl)-1,2,4-oxadiazol-3-yl]phenyl]methyl]propanamide, N-ethyl-2-methyl-N-[[4-[5-(trifluoromethyl)-1,2,4-oxadiazol-3-yl]phenyl]methyl] propanamide, 1-methoxy-3-methyl-1-[[4-[5-(trifluoromethyl)-1,2,4-oxadiazol-3-yl]phenyl]methyl]urea, 1,3-dimethoxy-1-[[4-[5-(trifluoromethyl)-1,2,4-oxadiazol-3-yl]phenyl]methyl]urea, 3-ethyl-1-methoxy-1-[[4-[5-(trifluoromethyl)-1,2,4-oxadiazol-3-yl]phenyl]methyl]urea, ethyl 1-[[4-[5-(trifluoromethyl)-1,2,4-oxadiazol-3-yl]phenyl]methyl]pyrazole-4-carboxylate, N,N-dimethyl-1-[[4-[5-(trifluoromethyl)-1,2,4-oxadiazol-3-yl]phenyl]methyl]-1,2,4-triazol-3-amine, methyl (Z)-3-methoxy-2-[2-methyl-5-[3-(trifluoromethyl)pyrazol-1-yl]phenoxy]prop-2-enoate, methyl (Z)-3-methoxy-2-[2-methyl-5-(3-propylpyrazol-1-yl)phenoxy]prop-2-enoate, methyl (Z)-2-[5-(3-isopropylpyrazol-1-yl)-2-methyl-phenoxy]-3-methoxy-prop-2-enoate, methyl (Z)-3-methoxy-2-[2-methyl-5-(4-propyltriazol-2-yl)phenoxy]prop-2-enoate, methyl (Z)-3-methoxy-2-[2-methyl-5-[4-(trifluoromethyl)triazol-2-yl]phenoxy]prop-2-enoate, methyl (Z)-2-(5-cyclohexyl-2-methyl-phenoxy)-3-methoxy-prop-2-enoate, methyl (Z)-2-(5-cyclopentyl-2-methyl-phenoxy)-3-methoxy-prop-2-enoate, methyl (Z)-2-[5-(4-cyclohexylthiazol-2-yl)-2-methyl-phenoxy]-3-methoxy-prop-2-enoate, methyl (Z)-2-[5-[4-(ethoxymethyl)thiazol-2-yl]-2-methyl-phenoxy]-3-methoxy-prop-2-enoate, methyl (Z)-2-[5-(4-bromothiazol-2-yl)-2-methyl-phenoxy]-3-methoxy-prop-2-enoate, and methyl (Z)-3-methoxy-2-[2-methyl-5-[5-(trifluoromethyl)thiazol-2-yl]phenoxy]prop-2-enoate, wherein the weight ratio of component (A) to component (B) is from 10:1 to 1:10 (or even more preferably, 5:1 to 1:5).

In another preferred composition according to the invention, component (A) is compound no. X.13, 2-[acetyl-(2,6-difluoro-4-pyridyl)amino]-N-cyclobutyl-5-methyl-thiazole-4-carboxamide or a salt, enantiomer, tautomer or N-oxide thereof, and component (B) is a compound selected from the group consisting of azoxystrobin, trifloxystrobin, metyltetraprole, difenoconazole, hexaconazole, propiconazole, prothioconazole, mefentrifluconazole, fenpropidin, fenpropimorph, fluxapyroxad, fluopyram, isopyrazam, sedaxane, benzovindiflupyr, pydiflumetofen, isoflucypram, isofetamid, pyrapropoyne, fluindapyr, fenpicoxamid, florylpicoxamid, acibenzolar-S-methyl, chlorothalonil, mancozeb, mandipropamid, oxathiapiprolin, fluazinam, fludioxonil, cyprodinil, metalaxyl-M, aminopyrifen, folpet, ipflufenoquin, quinofumelin, tricyclazole, pyroquilon, cyflufenamid, metrafenone, N'-[2-chloro-4-(2-fluorophenoxy)-5-methyl-phenyl]-N-ethyl-N-methyl-formamidine N'-[4-(2-bromophenoxy)-5-chloro-2-methyl-phenyl]-N-ethyl-N-methyl-formamidine, N-(1-benzyl-1,3-dimethyl-butyl)-8-fluoro-quinoline-3-carboxamide, N-(1-benzyl-3,3,3-trifluoro-1-methyl-propyl)-8-fluoro-quinoline-3-carboxamide, N-(1-benzyl-3-chloro-1-methyl-but-3-enyl)-8-fluoro-quinoline-3-carboxamide, 1-(6,7-dimethylpyrazolo[1,5-a]pyridin-3-yl)-4,4,5-trifluoro-3,3-dimethyl-isoquinoline, 4,4-difluoro-3,3-dimethyl-1-(7-methylpyrazolo[1,5-a]pyridin-3-yl)isoquinoline, 1-(6,7-dimethylpyrazolo[1,5-a]pyridin-3-yl)-4,4,6-trifluoro-3,3-dimethyl-isoquinoline, 1-(4,5-dimethylbenzimidazol-1-yl)-4,4,5-trifluoro-3,3-dimethyl-isoquinoline, 1-(4,5-dimethylbenzimidazol-1-yl)-4,4-difluoro-3,3-dimethyl-isoquinoline, 6-chloro-4,4-difluoro-3,3-dimethyl-1-(4-methylbenzimidazol-1-yl)isoquinoline, N'-[5-bromo-2-methyl-6-(1-methyl-2-propoxy-ethoxy)-3-pyridyl]-N-ethyl-N-methyl-formamidine, N'-[5-chloro-2-methyl-6-(1-methyl-2-propoxy-ethoxy)-3-pyridyl]-N-ethyl-N-methyl-formamidine, N'-[5-bromo-2-methyl-6-(1-methyl-2-propoxy-ethoxy)-3-pyridyl]-N-isopropyl-N-methyl-formamidine, N-isopropyl-N'-[5-methoxy-2-methyl-4-(2,2,2-trifluoro-1-hydroxy-1-phenyl-ethyl)phenyl]-N-methyl-formamidine, N-methoxy-N-[[4-[5-(trifluoromethyl)-1,2,4-oxadiazol-3-yl]phenyl]methyl]cyclopropanecarboxamide, N,2-dimethoxy-N-[[4-[5-(trifluoromethyl)-1,2,4-oxadiazol-3-yl]phenyl]methyl]propanamide, N-ethyl-2-methyl-N-[[4-[5-(trifluoromethyl)-1,2,4-oxadiazol-3-yl]phenyl]methyl]propanamide, 1-methoxy-3-methyl-1-[[4-[5-(trifluoromethyl)-1,2,4-oxadiazol-3-yl]phenyl]methyl]urea, 1,3-dimethoxy-1-[[4-[5-(trifluoromethyl)-1,2,4-oxadiazol-3-yl]phenyl]methyl]urea, 3-ethyl-1-methoxy-1-[[4-[5-(trifluoromethyl)-1,2,4-oxadiazol-3-yl]phenyl]methyl]urea, ethyl 1-[[4-[5-(trifluoromethyl)-1,2,4-oxadiazol-3-yl]phenyl]methyl]pyrazole-4-carboxylate, N,N-dimethyl-1-[[4-[5-(trifluoromethyl)-1,2,4-oxadiazol-3-yl]phenyl]methyl]-1,2,4-triazol-3-amine, methyl (Z)-3-methoxy-2-[2-methyl-5-[3-(trifluoromethyl)pyrazol-1-yl]phenoxy]prop-2-enoate, methyl (Z)-3-methoxy-2-[2-methyl-5-(3-propylpyrazol-1-yl)phenoxy]prop-2-enoate, methyl (Z)-2-[5-(3-isopropylpyrazol-1-yl)-2-methyl-phenoxy]-3-methoxy-prop-2-enoate, methyl (Z)-3-methoxy-2-[2-methyl-5-(4-propyltriazol-2-yl)phenoxy]prop-2-enoate, methyl (Z)-3-methoxy-2-[2-methyl-5-[4-(trifluoromethyl)triazol-2-yl]phenoxy]prop-2-enoate, methyl (Z)-2-(5-cyclohexyl-2-methyl-phenoxy)-3-methoxy-prop-2-enoate, methyl (Z)-2-(5-cyclopentyl-2-methyl-phenoxy)-3-methoxy-prop-2-enoate, methyl (Z)-2-[5-(4-cyclohexylthiazol-2-yl)-2-methyl-phenoxy]-3-methoxy-prop-2-enoate, methyl (Z)-2-[5-[4-(ethoxymethyl)thiazol-2-yl]-2-methyl-phenoxy]-3-methoxy-prop-2-enoate, methyl (Z)-2-[5-(4-bromothiazol-2-yl)-2-methyl-phenoxy]-3-methoxy-prop-2-enoate, and methyl (Z)-3-methoxy-2-[2-methyl-5-[5-(trifluoromethyl)thiazol-2-yl]phenoxy]prop-2-enoate, wherein the weight ratio of component (A) to component (B) is from 10:1 to 1:10 (or even more preferably, 5:1 to 1:5).

In another preferred composition according to the invention, component (A) is compound no. X.14, 2-[(2-benzyloxyacetyl)-(2,6-difluoro-4-pyridyl)amino]-N-(2,2-dimethylcyclobutyl)-5-methyl-thiazole-4-carboxamide or a salt, enantiomer, tautomer or N-oxide thereof, and component (B) is a compound selected from the group consisting of azoxystrobin, trifloxystrobin, metyltetraprole, difenoconazole, hexaconazole, propiconazole, prothioconazole, mefentrifluconazole, fenpropidin, fenpropimorph, fluxapyroxad, fluopyram, isopyrazam, sedaxane, benzovindiflupyr, pydiflumetofen, isoflucypram, isofetamid, pyrapropoyne, fluindapyr, fenpicoxamid, florylpicoxamid, acibenzolar-S-methyl, chlorothalonil, mancozeb, mandipropamid, oxathiapiprolin, fluazinam, fludioxonil, cyprodinil, metalaxyl-M, aminopyrifen, folpet, ipflufenoquin, quinofumelin, tricyclazole, pyroquilon, cyflufenamid, metrafenone, N'-[2-chloro-4-(2-fluorophenoxy)-5-methyl-phenyl]-N-ethyl-N-methyl-formamidine N'-[4-(2-bromophenoxy)-5-chloro-2-methyl-phenyl]-N-ethyl-N-methyl-formamidine, N-(1-benzyl-1,3-dimethyl-butyl)-8-fluoro-quinoline-3-carboxamide, N-(1-benzyl-3,3,3-trifluoro-1-methyl-propyl)-8-fluoro-quinoline-3-carboxamide, N-(1-benzyl-3-chloro-1-methyl-but-3-enyl)-8-fluoro-quinoline-3-carboxamide, 1-(6,7-dimethylpyrazolo[1,5-a]pyridin-3-yl)-4,4,5-trifluoro-3,3-dimethyl-isoquinoline, 4,4-difluoro-3,3-dimethyl-1-(7-methylpyrazolo[1,5-a]pyridin-3-yl)isoquinoline, 1-(6,7-dimethylpyrazolo[1,5-a]pyridin-3-yl)-4,4,6-trifluoro-3,3-dimethyl-isoquinoline, 1-(4,5-dimethylbenzimidazol-1-yl)-4,4,5-trifluoro-3,3-dimethyl-isoquinoline, 1-(4,5-dimethylbenzimidazol-1-yl)-4,4-difluoro-3,3-dimethyl-isoquinoline, 6-chloro-4,4-difluoro-3,3-dimethyl-1-(4-methylbenzimidazol-1-yl)isoquinoline, N'-[5-bromo-2-methyl-6-(1-methyl-2-propoxy-ethoxy)-3-pyridyl]-N-ethyl-N-methyl-formamidine, N'-[5-chloro-2-methyl-6-(1-methyl-2-propoxy-ethoxy)-3-pyridyl]-N-ethyl-N-methyl-formamidine, N'-[5-bromo-2-methyl-6-(1-methyl-2-propoxy-ethoxy)-3-pyridyl]-N-isopropyl-N-methyl-formamidine, N-isopropyl-N'-[5-methoxy-2-methyl-4-(2,2,2-trifluoro-1-hydroxy-1-phenyl-ethyl)

phenyl]-N-methyl-formamidine, N-methoxy-N-[[4-[5-(trifluoromethyl)-1,2,4-oxadiazol-3-yl]phenyl]methyl]cyclopropanecarboxamide, N,2-dimethoxy-N-[[4-[5-(trifluoromethyl)-1,2,4-oxadiazol-3-yl]phenyl]methyl]propanamide, N-ethyl-2-methyl-N-[[4-[5-(trifluoromethyl)-1,2,4-oxadiazol-3-yl]phenyl]methyl]propanamide, 1-methoxy-3-methyl-1-[[4-[5-(trifluoromethyl)-1,2,4-oxadiazol-3-yl]phenyl]methyl]urea, 1,3-dimethoxy-1-[[4-[5-(trifluoromethyl)-1,2,4-oxadiazol-3-yl]phenyl]methyl]urea, 3-ethyl-1-methoxy-1-[[4-[5-(trifluoromethyl)-1,2,4-oxadiazol-3-yl]phenyl]methyl]urea, ethyl 1-[[4-[5-(trifluoromethyl)-1,2,4-oxadiazol-3-yl]phenyl]methyl]pyrazole-4-carboxylate, N,N-dimethyl-1-[[4-[5-(trifluoromethyl)-1,2,4-oxadiazol-3-yl]phenyl]methyl]-1,2,4-triazol-3-amine, methyl (Z)-3-methoxy-2-[2-methyl-5-[3-(trifluoromethyl)pyrazol-1-yl]phenoxy]prop-2-enoate, methyl (Z)-3-methoxy-2-[2-methyl-5-(3-propylpyrazol-1-yl)phenoxy]prop-2-enoate, methyl (Z)-2-[5-(3-isopropylpyrazol-1-yl)-2-methyl-phenoxy]-3-methoxy-prop-2-enoate, methyl (Z)-3-methoxy-2-[2-methyl-5-(4-propyltriazol-2-yl)phenoxy]prop-2-enoate, methyl (Z)-3-methoxy-2-[2-methyl-5-[4-(trifluoromethyl)triazol-2-yl]phenoxy]prop-2-enoate, methyl (Z)-2-(5-cyclohexyl-2-methyl-phenoxy)-3-methoxy-prop-2-enoate, methyl (Z)-2-(5-cyclopentyl-2-methyl-phenoxy)-3-methoxy-prop-2-enoate, methyl (Z)-2-[5-(4-cyclohexylthiazol-2-yl)-2-methyl-phenoxy]-3-methoxy-prop-2-enoate, methyl (Z)-2-[5-[4-(ethoxymethyl)thiazol-2-yl]-2-methyl-phenoxy]-3-methoxy-prop-2-enoate, methyl (Z)-2-[5-(4-bromothiazol-2-yl)-2-methyl-phenoxy]-3-methoxy-prop-2-enoate, and methyl (Z)-3-methoxy-2-[2-methyl-5-[5-(trifluoromethyl)thiazol-2-yl]phenoxy]prop-2-enoate, wherein the weight ratio of component (A) to component (B) is from 10:1 to 1:10 (or even more preferably, 5:1 to 1:5).

In another preferred composition according to the invention, component (A) is compound no. X.17, 2-[(2-chloroacetyl)-(2,6-difluoro-4-pyridyl)amino]-N-(2,2-dimethylcyclobutyl)-5-methyl-thiazole-4-carboxamide or a salt, enantiomer, tautomer or N-oxide thereof, and component (B) is a compound selected from the group consisting of azoxystrobin, trifloxystrobin, metyltetraprole, difenoconazole, hexaconazole, propiconazole, prothioconazole, mefentrifluconazole, fenpropidin, fenpropimorph, fluxapyroxad, fluopyram, isopyrazam, sedaxane, benzovindiflupyr, pydiflumetofen, isoflucypram, isofetamid, pyrapropoyne, fluindapyr, fenpicoxamid, florylpicoxamid, acibenzolar-S-methyl, chlorothalonil, mancozeb, mandipropamid, oxathiapiprolin, fluazinam, fludioxonil, cyprodinil, metalaxyl-M, aminopyrifen, folpet, ipflufenoquin, quinofumelin, tricyclazole, pyroquilon, cyflufenamid, metrafenone, N'-[2-chloro-4-(2-fluorophenoxy)-5-methyl-phenyl]-N-ethyl-N-methyl-formamidine N'-[4-(2-bromophenoxy)-5-chloro-2-methyl-phenyl]-N-ethyl-N-methyl-formamidine, N-(1-benzyl-1,3-dimethyl-butyl)-8-fluoro-quinoline-3-carboxamide, N-(1-benzyl-3,3,3-trifluoro-1-methyl-propyl)-8-fluoro-quinoline-3-carboxamide, N-(1-benzyl-3-chloro-1-methyl-but-3-enyl)-8-fluoro-quinoline-3-carboxamide, 1-(6,7-dimethylpyrazolo[1,5-a]pyridin-3-yl)-4,4,5-trifluoro-3,3-dimethyl-isoquinoline, 4,4-difluoro-3,3-dimethyl-1-(7-methylpyrazolo[1,5-a]pyridin-3-yl)isoquinoline, 1-(6,7-dimethylpyrazolo[1,5-a]pyridin-3-yl)-4,4,6-trifluoro-3,3-dimethyl-isoquinoline, 1-(4,5-dimethylbenzimidazol-1-yl)-4,4,5-trifluoro-3,3-dimethyl-isoquinoline, 1-(4,5-dimethylbenzimidazol-1-yl)-4,4-difluoro-3,3-dimethyl-isoquinoline, 6-chloro-4,4-difluoro-3,3-dimethyl-1-(4-methylbenzimidazol-1-yl)isoquinoline, N'-[5-bromo-2-methyl-6-(1-methyl-2-propoxy-ethoxy)-3-pyridyl]-N-ethyl-N-methyl-formamidine, N'-[5-chloro-2-methyl-6-(1-methyl-2-propoxy-ethoxy)-3-pyridyl]-N-ethyl-N-methyl-formamidine, N'-[5-bromo-2-methyl-6-(1-methyl-2-propoxy-ethoxy)-3-pyridyl]-N-isopropyl-N-methyl-formamidine, N-isopropyl-N'-[5-methoxy-2-methyl-4-(2,2,2-trifluoro-1-hydroxy-1-phenyl-ethyl)phenyl]-N-methyl-formamidine, N-methoxy-N-[[4-[5-(trifluoromethyl)-1,2,4-oxadiazol-3-yl]phenyl]methyl]cyclopropanecarboxamide, N,2-dimethoxy-N-[[4-[5-(trifluoromethyl)-1,2,4-oxadiazol-3-yl]phenyl]methyl]propanamide, N-ethyl-2-methyl-N-[[4-[5-(trifluoromethyl)-1,2,4-oxadiazol-3-yl]phenyl]methyl]propanamide, 1-methoxy-3-methyl-1-[[4-[5-(trifluoromethyl)-1,2,4-oxadiazol-3-yl]phenyl]methyl]urea, 1,3-dimethoxy-1-[[4-[5-(trifluoromethyl)-1,2,4-oxadiazol-3-yl]phenyl]methyl]urea, 3-ethyl-1-methoxy-1-[[4-[5-(trifluoromethyl)-1,2,4-oxadiazol-3-yl]phenyl]methyl]urea, ethyl 1-[[4-[5-(trifluoromethyl)-1,2,4-oxadiazol-3-yl]phenyl]methyl]pyrazole-4-carboxylate, N,N-dimethyl-1-[[4-[5-(trifluoromethyl)-1,2,4-oxadiazol-3-yl]phenyl]methyl]-1,2,4-triazol-3-amine, methyl (Z)-3-methoxy-2-[2-methyl-5-[3-(trifluoromethyl)pyrazol-1-yl]phenoxy]prop-2-enoate, methyl (Z)-3-methoxy-2-[2-methyl-5-(3-propylpyrazol-1-yl)phenoxy]prop-2-enoate, methyl (Z)-2-[5-(3-isopropylpyrazol-1-yl)-2-methyl-phenoxy]-3-methoxy-prop-2-enoate, methyl (Z)-3-methoxy-2-[2-methyl-5-(4-propyltriazol-2-yl)phenoxy]prop-2-enoate, methyl (Z)-3-methoxy-2-[2-methyl-5-[4-(trifluoromethyl)triazol-2-yl]phenoxy]prop-2-enoate, methyl (Z)-2-(5-cyclohexyl-2-methyl-phenoxy)-3-methoxy-prop-2-enoate, methyl (Z)-2-(5-cyclopentyl-2-methyl-phenoxy)-3-methoxy-prop-2-enoate, methyl (Z)-2-[5-(4-cyclohexylthiazol-2-yl)-2-methyl-phenoxy]-3-methoxy-prop-2-enoate, methyl (Z)-2-[5-[4-(ethoxymethyl)thiazol-2-yl]-2-methyl-phenoxy]-3-methoxy-prop-2-enoate, methyl (Z)-2-[5-(4-bromothiazol-2-yl)-2-methyl-phenoxy]-3-methoxy-prop-2-enoate, and methyl (Z)-3-methoxy-2-[2-methyl-5-[5-(trifluoromethyl)thiazol-2-yl]phenoxy]prop-2-enoate, wherein the weight ratio of component (A) to component (B) is from 10:1 to 1:10 (or even more preferably, 5:1 to 1:5).

In another preferred composition according to the invention, component (A) is compound no. X.18, methyl 3-[(2,6-difluoro-4-pyridyl)-[4-[(2,2-dimethyl cyclobutyl)carbamoyl]-5-methyl-thiazol-2-yl]amino]-3-oxo-propanoate or a salt, enantiomer, tautomer or N-oxide thereof, and component (B) is a compound selected from the group consisting of azoxystrobin, trifloxystrobin, metyltetraprole, difenoconazole, hexaconazole, propiconazole, prothioconazole, mefentrifluconazole, fenpropidin, fenpropimorph, fluxapyroxad, fluopyram, isopyrazam, sedaxane, benzovindiflupyr, pydiflumetofen, isoflucypram, isofetamid, pyrapropoyne, fluindapyr, fenpicoxamid, florylpicoxamid, acibenzolar-S-methyl, chlorothalonil, mancozeb, mandipropamid, oxathiapiprolin, fluazinam, fludioxonil, cyprodinil, metalaxyl-M, aminopyrifen, folpet, ipflufenoquin, quinofumelin, tricyclazole, pyroquilon, cyflufenamid, metrafenone, N'-[2-chloro-4-(2-fluorophenoxy)-5-methyl-phenyl]-N-ethyl-N-methyl-formamidine N'-[4-(2-bromophenoxy)-5-chloro-2-methyl-phenyl]-N-ethyl-N-methyl-formamidine, N-(1-benzyl-1,3-dimethyl-butyl)-8-fluoro-quinoline-3-carboxamide, N-(1-benzyl-3,3,3-trifluoro-1-methyl-propyl)-8-fluoro-quinoline-3-carboxamide, N-(1-benzyl-3-chloro-1-methyl-but-3-enyl)-8-fluoro-quinoline-3-carboxamide, 1-(6,7-dimethylpyrazolo[1,5-a]pyridin-3-yl)-4,4,5-trifluoro-3,3-dimethyl-isoquinoline, 4,4-difluoro-3,3-dimethyl-1-(7-methylpyrazolo[1,5-a]pyridin-3-yl)isoquinoline, 1-(6,7-dimethylpyrazolo[1,5-a]pyridin-3-yl)-4,4,6-trifluoro-3,3-dimethyl-isoquinoline, 1-(4,5-dimethylbenzimidazol-1-yl)-

4,4,5-trifluoro-3,3-dimethyl-isoquinoline, 1-(4,5-dimethylbenzimidazol-1-yl)-4,4-difluoro-3,3-dimethyl-isoquinoline, 6-chloro-4,4-difluoro-3,3-dimethyl-1-(4-methylbenzimidazol-1-yl)isoquinoline, N'-[5-bromo-2-methyl-6-(1-methyl-2-propoxy-ethoxy)-3-pyridyl]-N-ethyl-N-methyl-formamidine, N'-[5-chloro-2-methyl-6-(1-methyl-2-propoxy-ethoxy)-3-pyridyl]-N-ethyl-N-methyl-formamidine, N'-[5-bromo-2-methyl-6-(1-methyl-2-propoxy-ethoxy)-3-pyridyl]-N-isopropyl-N-methyl-formamidine, N-isopropyl-N'-[5-methoxy-2-methyl-4-(2,2,2-trifluoro-1-hydroxy-1-phenyl-ethyl)phenyl]-N-methyl-formamidine, N-methoxy-N-[[4-[5-(trifluoromethyl)-1,2,4-oxadiazol-3-yl]phenyl]methyl]cyclopropanecarboxamide, N,2-dimethoxy-N-[[4-[5-(trifluoromethyl)-1,2,4-oxadiazol-3-yl]phenyl]methyl]propanamide, N-ethyl-2-methyl-N-[[4-[5-(trifluoromethyl)-1,2,4-oxadiazol-3-yl]phenyl]methyl]propanamide, 1-methoxy-3-methyl-1-[[4-[5-(trifluoromethyl)-1,2,4-oxadiazol-3-yl]phenyl]methyl]urea, 1,3-dimethoxy-1-[[4-[5-(trifluoromethyl)-1,2,4-oxadiazol-3-yl]phenyl]methyl]urea, 3-ethyl-1-methoxy-1-[[4-[5-(trifluoromethyl)-1,2,4-oxadiazol-3-yl]phenyl]methyl]urea, ethyl 1-[[4-[5-(trifluoromethyl)-1,2,4-oxadiazol-3-yl]phenyl]methyl]pyrazole-4-carboxylate, N,N-dimethyl-1-[[4-[5-(trifluoromethyl)-1,2,4-oxadiazol-3-yl]phenyl]methyl]-1,2,4-triazol-3-amine, methyl (Z)-3-methoxy-2-[2-methyl-5-[3-(trifluoromethyl)pyrazol-1-yl]phenoxy]prop-2-enoate, methyl (Z)-3-methoxy-2-[2-methyl-5-(3-propylpyrazol-1-yl)phenoxy]prop-2-enoate, methyl (Z)-2-[5-(3-isopropylpyrazol-1-yl)-2-methyl-phenoxy]-3-methoxy-prop-2-enoate, methyl (Z)-3-methoxy-2-[2-methyl-5-(4-propyltriazol-2-yl)phenoxy]prop-2-enoate, methyl (Z)-3-methoxy-2-[2-methyl-5-[4-(trifluoromethyl)triazol-2-yl]phenoxy]prop-2-enoate, methyl (Z)-2-(5-cyclohexyl-2-methyl-phenoxy)-3-methoxy-prop-2-enoate, methyl (Z)-2-(5-cyclopentyl-2-methyl-phenoxy)-3-methoxy-prop-2-enoate, methyl (Z)-2-[5-(4-cyclohexylthiazol-2-yl)-2-methyl-phenoxy]-3-methoxy-prop-2-enoate, methyl (Z)-2-[5-[4-(ethoxymethyl)thiazol-2-yl]-2-methyl-phenoxy]-3-methoxy-prop-2-enoate, methyl (Z)-2-[5-(4-bromothiazol-2-yl)-2-methyl-phenoxy]-3-methoxy-prop-2-enoate, and methyl (Z)-3-methoxy-2-[2-methyl-5-[5-(trifluoromethyl)thiazol-2-yl]phenoxy]prop-2-enoate, wherein the weight ratio of component (A) to component (B) is from 10:1 to 1:10 (or even more preferably, 5:1 to 1:5).

In another preferred composition according to the invention, component (A) is compound no. X.19, 2-[(2,6-difluoro-4-pyridyl)-(furan-2-carbonyl)amino]-N-(2,2-dimethyl cyclobutyl)-5-methyl-thiazole-4-carboxamide or a salt, enantiomer, tautomer or N-oxide thereof, and component (B) is a compound selected from the group consisting of azoxystrobin, trifloxystrobin, metyltetraprole, difenoconazole, hexaconazole, propiconazole, prothioconazole, mefentrifluconazole, fenpropidin, fenpropimorph, fluxapyroxad, fluopyram, isopyrazam, sedaxane, benzovindiflupyr, pydiflumetofen, isoflucypram, isofetamid, pyrapropoyne, fluindapyr, fenpicoxamid, florylpicoxamid, acibenzolar-S-methyl, chlorothalonil, mancozeb, mandipropamid, oxathiapiprolin, fluazinam, fludioxonil, cyprodinil, metalaxyl-M, aminopyrifen, folpet, ipflufenoquin, quinofumelin, tricyclazole, pyroquilon, cyflufenamid, metrafenone, N'-[2-chloro-4-(2-fluorophenoxy)-5-methyl-phenyl]-N-ethyl-N-methyl-formamidine N'-[4-(2-bromophenoxy)-5-chloro-2-methyl-phenyl]-N-ethyl-N-methyl-formamidine, N-(1-benzyl-1,3-dimethyl-butyl)-8-fluoro-quinoline-3-carboxamide, N-(1-benzyl-3,3,3-trifluoro-1-methyl-propyl)-8-fluoro-quinoline-3-carboxamide, N-(1-benzyl-3-chloro-1-methyl-but-3-enyl)-8-fluoro-quinoline-3-carboxamide, 1-(6,7-dimethylpyrazolo[1,5-a]pyridin-3-yl)-4,4,5-trifluoro-3,3-dimethyl-isoquinoline, 4,4-difluoro-3,3-dimethyl-1-(7-methylpyrazolo[1,5-a]pyridin-3-yl)isoquinoline, 1-(6,7-dimethylpyrazolo[1,5-a]pyridin-3-yl)-4,4,6-trifluoro-3,3-dimethyl-isoquinoline, 1-(4,5-dimethylbenzimidazol-1-yl)-4,4,5-trifluoro-3,3-dimethyl-isoquinoline, 1-(4,5-dimethylbenzimidazol-1-yl)-4,4-difluoro-3,3-dimethyl-isoquinoline, 6-chloro-4,4-difluoro-3,3-dimethyl-1-(4-methylbenzimidazol-1-yl)isoquinoline, N'-[5-bromo-2-methyl-6-(1-methyl-2-propoxy-ethoxy)-3-pyridyl]-N-ethyl-N-methyl-formamidine, N'-[5-chloro-2-methyl-6-(1-methyl-2-propoxy-ethoxy)-3-pyridyl]-N-ethyl-N-methyl-formamidine, N'-[5-bromo-2-methyl-6-(1-methyl-2-propoxy-ethoxy)-3-pyridyl]-N-isopropyl-N-methyl-formamidine, N-isopropyl-N'-[5-methoxy-2-methyl-4-(2,2,2-trifluoro-1-hydroxy-1-phenyl-ethyl)phenyl]-N-methyl-formamidine, N-methoxy-N-[[4-[5-(trifluoromethyl)-1,2,4-oxadiazol-3-yl]phenyl]methyl]cyclopropanecarboxamide, N,2-dimethoxy-N-[[4-[5-(trifluoromethyl)-1,2,4-oxadiazol-3-yl]phenyl]methyl]propanamide, N-ethyl-2-methyl-N-[[4-[5-(trifluoromethyl)-1,2,4-oxadiazol-3-yl]phenyl]methyl]propanamide, 1-methoxy-3-methyl-1-[[4-[5-(trifluoromethyl)-1,2,4-oxadiazol-3-yl]phenyl]methyl]urea, 1,3-dimethoxy-1-[[4-[5-(trifluoromethyl)-1,2,4-oxadiazol-3-yl]phenyl]methyl]urea, 3-ethyl-1-methoxy-1-[[4-[5-(trifluoromethyl)-1,2,4-oxadiazol-3-yl]phenyl]methyl]urea, ethyl 1-[[4-[5-(trifluoromethyl)-1,2,4-oxadiazol-3-yl]phenyl]methyl]pyrazole-4-carboxylate, N,N-dimethyl-1-[[4-[5-(trifluoromethyl)-1,2,4-oxadiazol-3-yl]phenyl]methyl]-1,2,4-triazol-3-amine, methyl (Z)-3-methoxy-2-[2-methyl-5-[3-(trifluoromethyl)pyrazol-1-yl]phenoxy]prop-2-enoate, methyl (Z)-3-methoxy-2-[2-methyl-5-(3-propylpyrazol-1-yl)phenoxy]prop-2-enoate, methyl (Z)-2-[5-(3-isopropylpyrazol-1-yl)-2-methyl-phenoxy]-3-methoxy-prop-2-enoate, methyl (Z)-3-methoxy-2-[2-methyl-5-(4-propyltriazol-2-yl)phenoxy]prop-2-enoate, methyl (Z)-3-methoxy-2-[2-methyl-5-[4-(trifluoromethyl)triazol-2-yl]phenoxy]prop-2-enoate, methyl (Z)-2-(5-cyclohexyl-2-methyl-phenoxy)-3-methoxy-prop-2-enoate, methyl (Z)-2-(5-cyclopentyl-2-methyl-phenoxy)-3-methoxy-prop-2-enoate, methyl (Z)-2-[5-(4-cyclohexylthiazol-2-yl)-2-methyl-phenoxy]-3-methoxy-prop-2-enoate, methyl (Z)-2-[5-[4-(ethoxymethyl)thiazol-2-yl]-2-methyl-phenoxy]-3-methoxy-prop-2-enoate, methyl (Z)-2-[5-(4-bromothiazol-2-yl)-2-methyl-phenoxy]-3-methoxy-prop-2-enoate, and methyl (Z)-3-methoxy-2-[2-methyl-5-[5-(trifluoromethyl)thiazol-2-yl]phenoxy]prop-2-enoate, wherein the weight ratio of component (A) to component (B) is from 10:1 to 1:10 (or even more preferably, 5:1 to 1:5).

In another preferred composition according to the invention, component (A) is compound no. X.22, S-isopropyl N-(2,6-difluoro-4-pyridyl)-N-[4-[(2,2-dimethyl cyclobutyl)carbamoyl]-5-methyl-thiazol-2-yl]carbamothioate or a salt, enantiomer, tautomer or N-oxide thereof, and component (B) is a compound selected from the group consisting of azoxystrobin, trifloxystrobin, metyltetraprole, difenoconazole, hexaconazole, propiconazole, prothioconazole, mefentrifluconazole, fenpropidin, fenpropimorph, fluxapyroxad, fluopyram, isopyrazam, sedaxane, benzovindiflupyr, pydiflumetofen, isoflucypram, isofetamid, pyrapropoyne, fluindapyr, fenpicoxamid, florylpicoxamid, acibenzolar-S-methyl, chlorothalonil, mancozeb, mandipropamid, oxathiapiprolin, fluazinam, fludioxonil, cyprodinil, metalaxyl-M, aminopyrifen, folpet, ipflufenoquin, quinofumelin, tricyclazole, pyroquilon, cyflufenamid, metrafenone, N'-[2-chloro-4-(2-fluorophenoxy)-5-methyl-phenyl]-N-ethyl-N- methyl-formamidine N'-[4-(2-bromophenoxy)-5-chloro-2-methyl-phenyl]-N-ethyl-N-methyl-formamidine, N-(1-benzyl-1,3-dimethyl-butyl)-8-fluoro-quinoline-3-carboxamide, N-(1-benzyl-3,3,3-trifluoro-1-methyl-propyl)-8-fluoro-quinoline-3-carboxamide, N-(1-benzyl-3-chloro-1-methyl-but-3-enyl)-8-fluoro-quinoline-3-carboxamide, 1-(6,7-dimethylpyrazolo[1,5-a]pyridin-3-yl)-4,4,5-trifluoro-3,3-dimethyl-isoquinoline, 4,4-difluoro-3,3-dimethyl-1-(7-methylpyrazolo[1,5-a]pyridin-3-yl) isoquinoline, 1-(6,7-dimethylpyrazolo[1,5-a]pyridin-3-yl)-4,4,6-trifluoro-3,3-dimethyl-isoquinoline, 1-(4,5-dimethylbenzimidazol-1-yl)-4,4,5-trifluoro-3,3-dimethyl-isoquinoline, 1-(4,5-dimethylbenzimidazol-1-yl)-4,4-difluoro-3,3-dimethyl-isoquinoline, 6-chloro-4,4-difluoro-3,3-dimethyl-1-(4-methylbenzimidazol-1-yl)isoquinoline, N'-[5-bromo-2-methyl-6-(1-methyl-2-propoxy-ethoxy)-3-pyridyl]-N-ethyl-N-methyl-formamidine, N'-[5-chloro-2-methyl-6-(1-methyl-2-propoxy-ethoxy)-3-pyridyl]-N-ethyl-N-methyl-formamidine, N'-[5-bromo-2-methyl-6-(1-methyl-2-propoxy-ethoxy)-3-pyridyl]-N-isopropyl-N-methyl-formamidine, N-isopropyl-N'-[5-methoxy-2-methyl-4-(2,2,2-trifluoro-1-hydroxy-1-phenyl-ethyl) phenyl]-N-methyl-formamidine, N-methoxy-N-[[4-[5-(trifluoromethyl)-1,2,4-oxadiazol-3-yl]phenyl]methyl] cyclopropanecarboxamide, N,2-dimethoxy-N-[[4-[5-(trifluoromethyl)-1,2,4-oxadiazol-3-yl]phenyl]methyl] propanamide, N-ethyl-2-methyl-N-[[4-[5-(trifluoromethyl)-1,2,4-oxadiazol-3-yl]phenyl]methyl]propanamide, 1-methoxy-3-methyl-1-[[4-[5-(trifluoromethyl)-1,2,4-oxadiazol-3-yl]phenyl]methyl]urea, 1,3-dimethoxy-1-[[4-[5-(trifluoromethyl)-1,2,4-oxadiazol-3-yl]phenyl]methyl]urea, 3-ethyl-1-methoxy-1-[[4-[5-(trifluoromethyl)-1,2,4-oxadiazol-3-yl]phenyl]methyl]urea, ethyl 1-[[4-[5-(trifluoromethyl)-1,2,4-oxadiazol-3-yl]phenyl]methyl]pyrazole-4-carboxylate, N,N-dimethyl-1-[[4-[5-(trifluoromethyl)-1,2,4-oxadiazol-3-yl]phenyl]methyl]-1,2,4-triazol-3-amine, methyl (Z)-3-methoxy-2-[2-methyl-5-[3-(trifluoromethyl) pyrazol-1-yl]phenoxy]prop-2-enoate, methyl (Z)-3-methoxy-2-[2-methyl-5-(3-propylpyrazol-1-yl)phenoxy] prop-2-enoate, methyl (Z)-2-[5-(3-isopropylpyrazol-1-yl)-2-methyl-phenoxy]-3-methoxy-prop-2-enoate, methyl (Z)-3-methoxy-2-[2-methyl-5-(4-propyltriazol-2-yl)phenoxy] prop-2-enoate, methyl (Z)-3-methoxy-2-[2-methyl-5-[4-(trifluoromethyl)triazol-2-yl]phenoxy]prop-2-enoate, methyl (Z)-2-(5-cyclohexyl-2-methyl-phenoxy)-3-methoxy-prop-2-enoate, methyl (Z)-2-(5-cyclopentyl-2-methyl-phenoxy)-3-methoxy-prop-2-enoate, methyl (Z)-2-[5-(4-cyclohexylthiazol-2-yl)-2-methyl-phenoxy]-3-methoxy-prop-2-enoate, methyl (Z)-2-[5-[4-(ethoxymethyl) thiazol-2-yl]-2-methyl-phenoxy]-3-methoxy-prop-2-enoate, methyl (Z)-2-[5-(4-bromothiazol-2-yl)-2-methyl-phenoxy]-3-methoxy-prop-2-enoate, and methyl (Z)-3-methoxy-2-[2-methyl-5-[5-(trifluoromethyl)thiazol-2-yl]phenoxy]prop-2-enoate, wherein the weight ratio of component (A) to component (B) is from 10:1 to 1:10 (or even more preferably, 5:1 to 1:5).

In another preferred composition according to the invention, component (A) is compound no. X.24, 2-[cyclopropane carbonyl-(2,6-difluoro-4-pyridyl)amino]-N-(2,2-dimethyl cyclobutyl)-5-methyl-thiazole-4-carboxamide or a salt, enantiomer, tautomer or N-oxide thereof, and component (B) is a compound selected from the group consisting of azoxystrobin, trifloxystrobin, metyltetraprole, difenoconazole, hexaconazole, propiconazole, prothioconazole, mefentrifluconazole, fenpropidin, fenpropimorph, fluxapyroxad, fluopyram, isopyrazam, sedaxane, benzovindiflupyr, pydiflumetofen, isoflucypram, isofetamid, pyrapropoyne, fluindapyr, fenpicoxamid, florylpicoxamid, acibenzolar-S-methyl, chlorothalonil, mancozeb, mandipropamid, oxathiapiprolin, fluazinam, fludioxonil, cyprodinil, metalaxyl-M, aminopyrifen, folpet, ipflufenoquin, quinofumelin, tricyclazole, pyroquilon, cyflufenamid, metrafenone, N'-[2-chloro-4-(2-fluorophenoxy)-5-methyl-phenyl]-N-ethyl-N-methyl-formamidine N'-[4-(2-bromophenoxy)-5-chloro-2-methyl-phenyl]-N-ethyl-N-methyl-formamidine, N-(1-benzyl-1,3-dimethyl-butyl)-8-fluoro-quinoline-3-carboxamide, N-(1-benzyl-3,3,3-trifluoro-1-methyl-propyl)-8-fluoro-quinoline-3-carboxamide, N-(1-benzyl-3-chloro-1-methyl-but-3-enyl)-8-fluoro-quinoline-3-carboxamide, 1-(6,7-dimethylpyrazolo[1,5-a]pyridin-3-yl)-4,4,5-trifluoro-3,3-dimethyl-isoquinoline, 4,4-difluoro-3,3-dimethyl-1-(7-methylpyrazolo[1,5-a]pyridin-3-yl) isoquinoline, 1-(6,7-dimethylpyrazolo[1,5-a]pyridin-3-yl)-4,4,6-trifluoro-3,3-dimethyl-isoquinoline, 1-(4,5-dimethylbenzimidazol-1-yl)-4,4,5-trifluoro-3,3-dimethyl-isoquinoline, 1-(4,5-dimethylbenzimidazol-1-yl)-4,4-difluoro-3,3-dimethyl-isoquinoline, 6-chloro-4,4-difluoro-3,3-dimethyl-1-(4-methylbenzimidazol-1-yl)isoquinoline, N'-[5-bromo-2-methyl-6-(1-methyl-2-propoxy-ethoxy)-3-pyridyl]-N-ethyl-N-methyl-formamidine, N'-[5-chloro-2-methyl-6-(1-methyl-2-propoxy-ethoxy)-3-pyridyl]-N-ethyl-N-methyl-formamidine, N'-[5-bromo-2-methyl-6-(1-methyl-2-propoxy-ethoxy)-3-pyridyl]-N-isopropyl-N-methyl-formamidine, N-isopropyl-N'-[5-methoxy-2-methyl-4-(2,2,2-trifluoro-1-hydroxy-1-phenyl-ethyl) phenyl]-N-methyl-formamidine, N-methoxy-N-[[4-[5-(trifluoromethyl)-1,2,4-oxadiazol-3-yl]phenyl]methyl] cyclopropanecarboxamide, N,2-dimethoxy-N-[[4-[5-(trifluoromethyl)-1,2,4-oxadiazol-3-yl]phenyl]methyl] propanamide, N-ethyl-2-methyl-N-[[4-[5-(trifluoromethyl)-1,2,4-oxadiazol-3-yl]phenyl]methyl]propanamide, 1-methoxy-3-methyl-1-[[4-[5-(trifluoromethyl)-1,2,4-oxadiazol-3-yl]phenyl]methyl]urea, 1,3-dimethoxy-1-[[4-[5-(trifluoromethyl)-1,2,4-oxadiazol-3-yl]phenyl]methyl]urea, 3-ethyl-1-methoxy-1-[[4-[5-(trifluoromethyl)-1,2,4-oxadiazol-3-yl]phenyl]methyl]urea, ethyl 1-[[4-[5-(trifluoromethyl)-1,2,4-oxadiazol-3-yl]phenyl]methyl]pyrazole-4-carboxylate, N,N-dimethyl-1-[[4-[5-(trifluoromethyl)-1,2,4-oxadiazol-3-yl]phenyl]methyl]-1,2,4-triazol-3-amine, methyl (Z)-3-methoxy-2-[2-methyl-5-[3-(trifluoromethyl) pyrazol-1-yl]phenoxy]prop-2-enoate, methyl (Z)-3-methoxy-2-[2-methyl-5-(3-propylpyrazol-1-yl)phenoxy] prop-2-enoate, methyl (Z)-2-[5-(3-isopropylpyrazol-1-yl)-2-methyl-phenoxy]-3-methoxy-prop-2-enoate, methyl (Z)-3-methoxy-2-[2-methyl-5-(4-propyltriazol-2-yl)phenoxy] prop-2-enoate, methyl (Z)-3-methoxy-2-[2-methyl-5-[4-(trifluoromethyl)triazol-2-yl]phenoxy]prop-2-enoate, methyl (Z)-2-(5-cyclohexyl-2-methyl-phenoxy)-3-methoxy-prop-2-enoate, methyl (Z)-2-(5-cyclopentyl-2-methyl-phenoxy)-3-methoxy-prop-2-enoate, methyl (Z)-2-[5-(4-cyclohexylthiazol-2-yl)-2-methyl-phenoxy]-3-methoxy-prop-2-enoate, methyl (Z)-2-[5-[4-(ethoxymethyl) thiazol-2-yl]-2-methyl-phenoxy]-3-methoxy-prop-2-enoate, methyl (Z)-2-[5-(4-bromothiazol-2-yl)-2-methyl-phenoxy]-3-methoxy-prop-2-enoate, and methyl (Z)-3-methoxy-2-[2-methyl-5-[5-(trifluoromethyl)thiazol-2-yl]phenoxy]prop-2-enoate, wherein the weight ratio of component (A) to component (B) is from 10:1 to 1:10 (or even more preferably, 5:1 to 1:5).

In another preferred composition according to the invention, component (A) is compound no. X.26, phenyl N-(2,6-difluoro-4-pyridyl)-N-[4-[(2,2-dimethylcyclobutyl)carbamoyl]-5-methyl-thiazol-2-yl]carbamate or a salt, enantiomer, tautomer or N-oxide thereof, and component (B) is a compound selected from the group consisting of azoxystrobin, trifloxystrobin, metyltetraprole, difenoconazole, hexaconazole, propiconazole, prothioconazole, mefentrifluconazole, fenpropidin, fenpropimorph, fluxapyroxad, fluopyram, isopyrazam, sedaxane, benzovindiflupyr, pydiflumetofen, isoflucypram, isofetamid, pyrapropoyne, fluindapyr, fenpicoxamid, florylpicoxamid, acibenzolar-S-methyl, chlorothalonil, mancozeb, mandipropamid, oxathiapiprolin, fluazinam, fludioxonil, cyprodinil, metalaxyl-M, aminopyrifen, folpet, ipflufenoquin, quinofumelin, tricyclazole, pyroquilon, cyflufenamid, metrafenone, N'-[2-chloro-4-(2-fluorophenoxy)-5-methyl-phenyl]-N-ethyl-N-methyl-formamidine N'-[4-(2-bromophenoxy)-5-chloro-2-methyl-phenyl]-N-ethyl-N-methyl-formamidine, N-(1-benzyl-1,3-dimethyl-butyl)-8-fluoro-quinoline-3-carboxamide, N-(1-benzyl-3,3,3-trifluoro-1-methyl-propyl)-8-fluoro-quinoline-3-carboxamide, N-(1-benzyl-3-chloro-1-methyl-but-3-enyl)-8-fluoro-quinoline-3-carboxamide, 1-(6,7-dimethylpyrazolo[1,5-a]pyridin-3-yl)-4,4,5-trifluoro-3,3-dimethyl-isoquinoline, 4,4-difluoro-3,3-dimethyl-1-(7-methylpyrazolo[1,5-a]pyridin-3-yl)isoquinoline, 1-(6,7-dimethylpyrazolo[1,5-a]pyridin-3-yl)-4,4,6-trifluoro-3,3-dimethyl-isoquinoline, 1-(4,5-dimethylbenzimidazol-1-yl)-4,4,5-trifluoro-3,3-dimethyl-isoquinoline, 1-(4,5-dimethylbenzimidazol-1-yl)-4,4-difluoro-3,3-dimethyl-isoquinoline, 6-chloro-4,4-difluoro-3,3-dimethyl-1-(4-methylbenzimidazol-1-yl)isoquinoline, N'-[5-bromo-2-methyl-6-(1-methyl-2-propoxy-ethoxy)-3-pyridyl]-N-ethyl-N-methyl-formamidine, N'-[5-chloro-2-methyl-6-(1-methyl-2-propoxy-ethoxy)-3-pyridyl]-N-ethyl-N-methyl-formamidine, N'-[5-bromo-2-methyl-6-(1-methyl-2-propoxy-ethoxy)-3-pyridyl]-N-isopropyl-N-methyl-formamidine, N-isopropyl-N'-[5-methoxy-2-methyl-4-(2,2,2-trifluoro-1-hydroxy-1-phenyl-ethyl)phenyl]-N-methyl-formamidine, N-methoxy-N-[[4-[5-(trifluoromethyl)-1,2,4-oxadiazol-3-yl]phenyl]methyl]cyclopropanecarboxamide, N,2-dimethoxy-N-[[4-[5-(trifluoromethyl)-1,2,4-oxadiazol-3-yl]phenyl]methyl]propanamide, N-ethyl-2-methyl-N-[[4-[5-(trifluoromethyl)-1,2,4-oxadiazol-3-yl]phenyl]methyl]propanamide, 1-methoxy-3-methyl-1-[[4-[5-(trifluoromethyl)-1,2,4-oxadiazol-3-yl]phenyl]methyl]urea, 1,3-dimethoxy-1-[[4-[5-(trifluoromethyl)-1,2,4-oxadiazol-3-yl]phenyl]methyl]urea, 3-ethyl-1-methoxy-1-[[4-[5-(trifluoromethyl)-1,2,4-oxadiazol-3-yl]phenyl]methyl]urea, ethyl 1-[[4-[5-(trifluoromethyl)-1,2,4-oxadiazol-3-yl]phenyl]methyl]pyrazole-4-carboxylate, N,N-dimethyl-1-[[4-[5-(trifluoromethyl)-1,2,4-oxadiazol-3-yl]phenyl]methyl]-1,2,4-triazol-3-amine, methyl (Z)-3-methoxy-2-[2-methyl-5-[3-(trifluoromethyl)pyrazol-1-yl]phenoxy]prop-2-enoate, methyl (Z)-3-methoxy-2-[2-methyl-5-(3-propylpyrazol-1-yl)phenoxy]prop-2-enoate, methyl (Z)-2-[5-(3-isopropylpyrazol-1-yl)-2-methyl-phenoxy]-3-methoxy-prop-2-enoate, methyl (Z)-3-methoxy-2-[2-methyl-5-(4-propyltriazol-2-yl)phenoxy]prop-2-enoate, methyl (Z)-3-methoxy-2-[2-methyl-5-[4-(trifluoromethyl)triazol-2-yl]phenoxy]prop-2-enoate, methyl (Z)-2-(5-cyclohexyl-2-methyl-phenoxy)-3-methoxy-prop-2-enoate, methyl (Z)-2-(5-cyclopentyl-2-methyl-phenoxy)-3-methoxy-prop-2-enoate, methyl (Z)-2-[5-(4-cyclohexylthiazol-2-yl)-2-methyl-phenoxy]-3-methoxy-prop-2-enoate, methyl (Z)-2-[5-[4-(ethoxymethyl)thiazol-2-yl]-2-methyl-phenoxy]-3-methoxy-prop-2-enoate, methyl (Z)-2-[5-(4-bromothiazol-2-yl)-2-methyl-phenoxy]-3-methoxy-prop-2-enoate, and methyl (Z)-3-methoxy-2-[2-methyl-5-[5-(trifluoromethyl)thiazol-2-yl]phenoxy]prop-2-enoate, wherein the weight ratio of component (A) to component (B) is from 10:1 to 1:10 (or even more preferably, 5:1 to 1:5).

In another preferred composition according to the invention, component (A) is compound no. X.29, 2-[(2,6-difluoro-4-pyridyl)-(2-methoxyacetyl)amino]-N-(2,2-dimethyl cyclobutyl)-5-methyl-thiazole-4-carboxamide or a salt, enantiomer, tautomer or N-oxide thereof, and component (B) is a compound selected from the group consisting of azoxystrobin, trifloxystrobin, metyltetraprole, difenoconazole, hexaconazole, propiconazole, prothioconazole, mefentrifluconazole, fenpropidin, fenpropimorph, fluxapyroxad, fluopyram, isopyrazam, sedaxane, benzovindiflupyr, pydiflumetofen, isoflucypram, isofetamid, pyrapropoyne, fluindapyr, fenpicoxamid, florylpicoxamid, acibenzolar-S-methyl, chlorothalonil, mancozeb, mandipropamid, oxathiapiprolin, fluazinam, fludioxonil, cyprodinil, metalaxyl-M, aminopyrifen, folpet, ipflufenoquin, quinofumelin, tricyclazole, pyroquilon, cyflufenamid, metrafenone, N'-[2-chloro-4-(2-fluorophenoxy)-5-methyl-phenyl]-N-ethyl-N-methyl-formamidine N'-[4-(2-bromophenoxy)-5-chloro-2-methyl-phenyl]-N-ethyl-N-methyl-formamidine, N-(1-benzyl-1,3-dimethyl-butyl)-8-fluoro-quinoline-3-carboxamide, N-(1-benzyl-3,3,3-trifluoro-1-methyl-propyl)-8-fluoro-quinoline-3-carboxamide, N-(1-benzyl-3-chloro-1-methyl-but-3-enyl)-8-fluoro-quinoline-3-carboxamide, 1-(6,7-dimethylpyrazolo[1,5-a]pyridin-3-yl)-4,4,5-trifluoro-3,3-dimethyl-isoquinoline, 4,4-difluoro-3,3-dimethyl-1-(7-methylpyrazolo[1,5-a]pyridin-3-yl)isoquinoline, 1-(6,7-dimethylpyrazolo[1,5-a]pyridin-3-yl)-4,4,6-trifluoro-3,3-dimethyl-isoquinoline, 1-(4,5-dimethylbenzimidazol-1-yl)-4,4,5-trifluoro-3,3-dimethyl-isoquinoline, 1-(4,5-dimethylbenzimidazol-1-yl)-4,4-difluoro-3,3-dimethyl-isoquinoline, 6-chloro-4,4-difluoro-3,3-dimethyl-1-(4-methylbenzimidazol-1-yl)isoquinoline, N'-[5-bromo-2-methyl-6-(1-methyl-2-propoxy-ethoxy)-3-pyridyl]-N-ethyl-N-methyl-formamidine, N'-[5-chloro-2-methyl-6-(1-methyl-2-propoxy-ethoxy)-3-pyridyl]-N-ethyl-N-methyl-formamidine, N'-[5-bromo-2-methyl-6-(1-methyl-2-propoxy-ethoxy)-3-pyridyl]-N-isopropyl-N-methyl-formamidine, N-isopropyl-N'-[5-methoxy-2-methyl-4-(2,2,2-trifluoro-1-hydroxy-1-phenyl-ethyl)phenyl]-N-methyl-formamidine, N-methoxy-N-[[4-[5-(trifluoromethyl)-1,2,4-oxadiazol-3-yl]phenyl]methyl]cyclopropanecarboxamide, N,2-dimethoxy-N-[[4-[5-(trifluoromethyl)-1,2,4-oxadiazol-3-yl]phenyl]methyl]propanamide, N-ethyl-2-methyl-N-[[4-[5-(trifluoromethyl)-1,2,4-oxadiazol-3-yl]phenyl]methyl]propanamide, 1-methoxy-3-methyl-1-[[4-[5-(trifluoromethyl)-1,2,4-oxadiazol-3-yl]phenyl]methyl]urea, 1,3-dimethoxy-1-[[4-[5-(trifluoromethyl)-1,2,4-oxadiazol-3-yl]phenyl]methyl]urea, 3-ethyl-1-methoxy-1-[[4-[5-(trifluoromethyl)-1,2,4-oxadiazol-3-yl]phenyl]methyl]urea, ethyl 1-[[4-[5-(trifluoromethyl)-1,2,4-oxadiazol-3-yl]phenyl]methyl]pyrazole-4-carboxylate, N,N-dimethyl-1-[[4-[5-(trifluoromethyl)-1,2,4-oxadiazol-3-yl]phenyl]methyl]-1,2,4-triazol-3-amine, methyl (Z)-3-methoxy-2-[2-methyl-5-[3-(trifluoromethyl)pyrazol-1-yl]phenoxy]prop-2-enoate, methyl (Z)-3-methoxy-2-[2-methyl-5-(3-propylpyrazol-1-yl)phenoxy]prop-2-enoate, methyl (Z)-2-[5-(3-isopropylpyrazol-1-yl)-2-methyl-phenoxy]-3-methoxy-prop-2-enoate, methyl (Z)-3-methoxy-2-[2-methyl-5-(4-propyltriazol-2-yl)phenoxy]prop-2-enoate, methyl (Z)-3-methoxy-2-[2-methyl-5-[4-(trifluoromethyl)triazol-2-yl]phenoxy]prop-2-enoate, methyl (Z)-2-(5-cyclohexyl-2-methyl-phenoxy)-3-methoxy-prop-2-enoate, methyl (Z)-2-(5-cyclopentyl-2-methyl-phenoxy)-3-methoxy-prop-2-enoate, methyl (Z)-2-[5-(4-cyclohexylthiazol-2-yl)-2-methyl-phenoxy]-3-methoxy-prop-2-enoate, methyl (Z)-2-[5-[4-(ethoxymethyl)thiazol-2-yl]-2-methyl-phenoxy]-3-methoxy-prop-2-enoate, methyl (Z)-2-[5-(4-bromothiazol-2-yl)-2-methyl-phenoxy]-3-methoxy-prop-2-enoate, and methyl (Z)-3-methoxy-2-[2-methyl-5-[5-(trifluoromethyl)thiazol-2-yl]phenoxy]prop-2-enoate, wherein the weight ratio of component (A) to component (B) is from 10:1 to 1:10 (or even more preferably, 5:1 to 1:5).

In another preferred composition according to the invention, component (A) is compound no. X.31, 2-[(2,6-difluoro-4-pyridyl)-(thiophene-2-carbonyl)amino]-N-(2,2-dimethyl cyclobutyl)-5-methyl-thiazole-4-carboxamide or a salt, enantiomer, tautomer or N-oxide thereof, and component (B) is a compound selected from the group consisting of azoxystrobin, trifloxystrobin, metyltetraprole, difenoconazole, hexaconazole, propiconazole, prothioconazole, mefentrifluconazole, fenpropidin, fenpropimorph, fluxapyroxad, fluopyram, isopyrazam, sedaxane, benzovindiflupyr, pydiflumetofen, isoflucypram, isofetamid, pyrapropoyne, fluindapyr, fenpicoxamid, florylpicoxamid, acibenzolar-S-methyl, chlorothalonil, mancozeb, mandipropamid, oxathiapiprolin, fluazinam, fludioxonil, cyprodinil, metalaxyl-M, aminopyrifen, folpet, ipflufenoquin, quinofumelin, tricyclazole, pyroquilon, cyflufenamid, metrafenone, N'-[2-chloro-4-(2-fluorophenoxy)-5-methyl-phenyl]-N-ethyl-N-methyl-formamidine N'-[4-(2-bromophenoxy)-5-chloro-2-methyl-phenyl]-N-ethyl-N-methyl-formamidine, N-(1-benzyl-1,3-dimethyl-butyl)-8-fluoro-quinoline-3-carboxamide, N-(1-benzyl-3,3,3-trifluoro-1-methyl-propyl)-8-fluoro-quinoline-3-carboxamide, N-(1-benzyl-3-chloro-1-methyl-but-3-enyl)-8-fluoro-quinoline-3-carboxamide, 1-(6,7-dimethylpyrazolo[1,5-a]pyridin-3-yl)-4,4,5-trifluoro-3,3-dimethyl-isoquinoline, 4,4-difluoro-3,3-dimethyl-1-(7-methylpyrazolo[1,5-a]pyridin-3-yl)isoquinoline, 1-(6,7-dimethylpyrazolo[1,5-a]pyridin-3-yl)-4,4,6-trifluoro-3,3-dimethyl-isoquinoline, 1-(4,5-dimethylbenzimidazol-1-yl)-4,4,5-trifluoro-3,3-dimethyl-isoquinoline, 1-(4,5-dimethylbenzimidazol-1-yl)-4,4-difluoro-3,3-dimethyl-isoquinoline, 6-chloro-4,4-difluoro-3,3-dimethyl-1-(4-methylbenzimidazol-1-yl)isoquinoline, N'-[5-bromo-2-methyl-6-(1-methyl-2-propoxy-ethoxy)-3-pyridyl]-N-ethyl-N-methyl-formamidine, N'-[5-chloro-2-methyl-6-(1-methyl-2-propoxy-ethoxy)-3-pyridyl]-N-ethyl-N-methyl-formamidine, N'-[5-bromo-2-methyl-6-(1-methyl-2-propoxy-ethoxy)-3-pyridyl]-N-isopropyl-N-methyl-formamidine, N-isopropyl-N'-[5-methoxy-2-methyl-4-(2,2,2-trifluoro-1-hydroxy-1-phenyl-ethyl)phenyl]-N-methyl-formamidine, N-methoxy-N-[[4-[5-(trifluoromethyl)-1,2,4-oxadiazol-3-yl]phenyl]methyl]cyclopropanecarboxamide, N,2-dimethoxy-N-[[4-[5-(trifluoromethyl)-1,2,4-oxadiazol-3-yl]phenyl]methyl]propanamide, N-ethyl-2-methyl-N-[[4-[5-(trifluoromethyl)-1,2,4-oxadiazol-3-yl]phenyl]methyl]propanamide, 1-methoxy-3-methyl-1-[[4-[5-(trifluoromethyl)-1,2,4-oxadiazol-3-yl]phenyl]methyl]urea, 1,3-dimethoxy-1-[[4-[5-(trifluoromethyl)-1,2,4-oxadiazol-3-yl]phenyl]methyl]urea, 3-ethyl-1-methoxy-1-[[4-[5-(trifluoromethyl)-1,2,4-oxadiazol-3-yl]phenyl]methyl]urea, ethyl 1-[[4-[5-(trifluoromethyl)-1,2,4-oxadiazol-3-yl]phenyl]methyl]pyrazole-4-carboxylate, N,N-dimethyl-1-[[4-[5-(trifluoromethyl)-1,2,4-oxadiazol-3-yl]phenyl]methyl]-1,2,4-triazol-3-amine, methyl (Z)-3-methoxy-2-[2-methyl-5-[3-(trifluoromethyl)pyrazol-1-yl]phenoxy]prop-2-enoate, methyl (Z)-3-methoxy-2-[2-methyl-5-(3-propylpyrazol-1-yl)phenoxy]prop-2-enoate, methyl (Z)-2-[5-(3-isopropylpyrazol-1-yl)-2-methyl-phenoxy]-3-methoxy-prop-2-enoate, methyl (Z)-3-methoxy-2-[2-methyl-5-(4-propyltriazol-2-yl)phenoxy]prop-2-enoate, methyl (Z)-3-methoxy-2-[2-methyl-5-[4-(trifluoromethyl)triazol-2-yl]phenoxy]prop-2-enoate, methyl (Z)-2-(5-cyclohexyl-2-methyl-phenoxy)-3-methoxy-prop-2-enoate, methyl (Z)-2-(5-cyclopentyl-2-methyl-phenoxy)-3-methoxy-prop-2-enoate, methyl (Z)-2-[5-(4-cyclohexylthiazol-2-yl)-2-methyl-phenoxy]-3-methoxy-prop-2-enoate, methyl (Z)-2-[5-[4-(ethoxymethyl)thiazol-2-yl]-2-methyl-phenoxy]-3-methoxy-prop-2-enoate, methyl (Z)-2-[5-(4-bromothiazol-2-yl)-2-methyl-phenoxy]-3-methoxy-prop-2-enoate, and methyl (Z)-3-methoxy-2-[2-methyl-5-[5-(trifluoromethyl)thiazol-2-yl]phenoxy]prop-2-enoate, wherein the weight ratio of component (A) to component (B) is from 10:1 to 1:10 (or even more preferably, 5:1 to 1:5).

In another preferred composition according to the invention, component (A) is compound no. X.33, 2-[(2,6-difluoro-4-pyridyl)-formyl-amino]-N-(2,2-dimethyl cyclobutyl)-5-methyl-thiazole-4-carboxamide or a salt, enantiomer, tautomer or N-oxide thereof, and component (B) is a compound selected from the group consisting of azoxystrobin, trifloxystrobin, metyltetraprole, difenoconazole, hexaconazole, propiconazole, prothioconazole, mefentrifluconazole, fenpropidin, fenpropimorph, fluxapyroxad, fluopyram, isopyrazam, sedaxane, benzovindiflupyr, pydiflumetofen, isoflucypram, isofetamid, pyrapropoyne, fluindapyr, fenpicoxamid, florylpicoxamid, acibenzolar-S-methyl, chlorothalonil, mancozeb, mandipropamid, oxathiapiprolin, fluazinam, fludioxonil, cyprodinil, metalaxyl-M, aminopyrifen, folpet, ipflufenoquin, quinofumelin, tricyclazole, pyroquilon, cyflufenamid, metrafenone, N'-[2-chloro-4-(2-fluorophenoxy)-5-methyl-phenyl]-N-ethyl-N-methyl-formamidine N'-[4-(2-bromophenoxy)-5-chloro-2-methyl-phenyl]-N-ethyl-N-methyl-formamidine, N-(1-benzyl-1,3-dimethyl-butyl)-8-fluoro-quinoline-3-carboxamide, N-(1-benzyl-3,3,3-trifluoro-1-methyl-propyl)-8-fluoro-quinoline-3-carboxamide, N-(1-benzyl-3-chloro-1-methyl-but-3-enyl)-8-fluoro-quinoline-3-carboxamide, 1-(6,7-dimethylpyrazolo[1,5-a]pyridin-3-yl)-4,4,5-trifluoro-3,3-dimethyl-isoquinoline, 4,4-difluoro-3,3-dimethyl-1-(7-methylpyrazolo[1,5-a]pyridin-3-yl)isoquinoline, 1-(6,7-dimethylpyrazolo[1,5-a]pyridin-3-yl)-4,4,6-trifluoro-3,3-dimethyl-isoquinoline, 1-(4,5-dimethylbenzimidazol-1-yl)-4,4,5-trifluoro-3,3-dimethyl-isoquinoline, 1-(4,5-dimethylbenzimidazol-1-yl)-4,4-difluoro-3,3-dimethyl-isoquinoline, 6-chloro-4,4-difluoro-3,3-dimethyl-1-(4-methylbenzimidazol-1-yl)isoquinoline, N'-[5-bromo-2-methyl-6-(1-methyl-2-propoxy-ethoxy)-3-pyridyl]-N-ethyl-N-methyl-formamidine, N'-[5-chloro-2-methyl-6-(1-methyl-2-propoxy-ethoxy)-3-pyridyl]-N-ethyl-N-methyl-formamidine, N'-[5-bromo-2-methyl-6-(1-methyl-2-propoxy-ethoxy)-3-pyridyl]-N-isopropyl-N-methyl-formamidine, N-isopropyl-N'-[5-methoxy-2-methyl-4-(2,2,2-trifluoro-1-hydroxy-1-phenyl-ethyl)phenyl]-N-methyl-formamidine, N-methoxy-N-[[4-[5-(trifluoromethyl)-1,2,4-oxadiazol-3-yl]phenyl]methyl]cyclopropanecarboxamide, N,2-dimethoxy-N-[[4-[5-(trifluoromethyl)-1,2,4-oxadiazol-3-yl]phenyl]methyl]propanamide, N-ethyl-2-methyl-N-[[4-[5-(trifluoromethyl)-1,2,4-oxadiazol-3-yl]phenyl]methyl]propanamide, 1-methoxy-3-methyl-1-[[4-[5-(trifluoromethyl)-1,2,4-oxadiazol-3-yl]phenyl]methyl]urea, 1,3-dimethoxy-1-[[4-[5-(trifluoromethyl)-1,2,4-oxadiazol-3-yl]phenyl]methyl]urea, 3-ethyl-1-methoxy-1-[[4-[5-(trifluoromethyl)-1,2,4-oxadiazol-3-yl]phenyl]methyl]urea, ethyl 1-[[4-[5-(trifluoromethyl)-1,2,4-oxadiazol-3-yl]phenyl]methyl]pyrazole-4-carboxylate, N,N-dimethyl-1-[[4-[5-(trifluoromethyl)-1,2,4-oxadiazol-3-yl]phenyl]methyl]-1,2,4-triazol-3-amine, methyl (Z)-3-methoxy-2-[2-methyl-5-[3-(trifluoromethyl)pyrazol-1-yl]phenoxy]prop-2-enoate, methyl (Z)-3-methoxy-2-[2-methyl-5-(3-propylpyrazol-1-yl)phenoxy]

prop-2-enoate, methyl (Z)-2-[5-(3-isopropylpyrazol-1-yl)-2-methyl-phenoxy]-3-methoxy-prop-2-enoate, methyl (Z)-3-methoxy-2-[2-methyl-5-(4-propyltriazol-2-yl)phenoxy] prop-2-enoate, methyl (Z)-3-methoxy-2-[2-methyl-5-[4-(trifluoromethyl)triazol-2-yl]phenoxy]prop-2-enoate, methyl (Z)-2-(5-cyclohexyl-2-methyl-phenoxy)-3-methoxy-prop-2-enoate, methyl (Z)-2-(5-cyclopentyl-2-methyl-phenoxy)-3-methoxy-prop-2-enoate, methyl (Z)-2-[5-(4-cyclohexylthiazol-2-yl)-2-methyl-phenoxy]-3-methoxy-prop-2-enoate, methyl (Z)-2-[5-[4-(ethoxymethyl) thiazol-2-yl]-2-methyl-phenoxy]-3-methoxy-prop-2-enoate, methyl (Z)-2-[5-(4-bromothiazol-2-yl)-2-methyl-phenoxy]-3-methoxy-prop-2-enoate, and methyl (Z)-3-methoxy-2-[2-methyl-5-[5-(trifluoromethyl)thiazol-2-yl]phenoxy]prop-2-enoate, wherein the weight ratio of component (A) to component (B) is from 10:1 to 1:10 (or even more preferably, 5:1 to 1:5).

In another preferred composition according to the invention, component (A) is compound no. X.34, ethyl 2-[(2,6-difluoro-4-pyridyl)-[4-[(2,2-dimethylcyclobutyl)carbamoyl]-5-methyl-thiazol-2-yl]amino]-2-oxo-acetate or a salt, enantiomer, tautomer or N-oxide thereof, and component (B) is a compound selected from the group consisting of azoxystrobin, trifloxystrobin, metyltetraprole, difenoconazole, hexaconazole, propiconazole, prothioconazole, mefentrifluconazole, fenpropidin, fenpropimorph, fluxapyroxad, fluopyram, isopyrazam, sedaxane, benzovindiflupyr, pydiflumetofen, isoflucypram, isofetamid, pyrapropoyne, fluindapyr, fenpicoxamid, florylpicoxamid, acibenzolar-S-methyl, chlorothalonil, mancozeb, mandipropamid, oxathiapiprolin, fluazinam, fludioxonil, cyprodinil, metalaxyl-M, aminopyrifen, folpet, ipflufenoquin, quinofumelin, tricyclazole, pyroquilon, cyflufenamid, metrafenone, N'-[2-chloro-4-(2-fluorophenoxy)-5-methyl-phenyl]-N-ethyl-N-methyl-formamidine N'-[4-(2-bromophenoxy)-5-chloro-2-methyl-phenyl]-N-ethyl-N-methyl-formamidine, N-(1-benzyl-1,3-dimethyl-butyl)-8-fluoro-quinoline-3-carboxamide, N-(1-benzyl-3,3,3-trifluoro-1-methyl-propyl)-8-fluoro-quinoline-3-carboxamide, N-(1-benzyl-3-chloro-1-methyl-but-3-enyl)-8-fluoro-quinoline-3-carboxamide, 1-(6,7-dimethylpyrazolo[1,5-a]pyridin-3-yl)-4,4,5-trifluoro-3,3-dimethyl-isoquinoline, 4,4-difluoro-3,3-dimethyl-1-(7-methylpyrazolo[1,5-a]pyridin-3-yl) isoquinoline, 1-(6,7-dimethylpyrazolo[1,5-a]pyridin-3-yl)-4,4,6-trifluoro-3,3-dimethyl-isoquinoline, 1-(4,5-dimethylbenzimidazol-1-yl)-4,4,5-trifluoro-3,3-dimethyl-isoquinoline, 1-(4,5-dimethylbenzimidazol-1-yl)-4,4-difluoro-3,3-dimethyl-isoquinoline, 6-chloro-4,4-difluoro-3,3-dimethyl-1-(4-methylbenzimidazol-1-yl)isoquinoline, N'-[5-bromo-2-methyl-6-(1-methyl-2-propoxy-ethoxy)-3-pyridyl]-N-ethyl-N-methyl-formamidine, N'-[5-chloro-2-methyl-6-(1-methyl-2-propoxy-ethoxy)-3-pyridyl]-N-ethyl-N-methyl-formamidine, N'-[5-bromo-2-methyl-6-(1-methyl-2-propoxy-ethoxy)-3-pyridyl]-N-isopropyl-N-methyl-formamidine, N-isopropyl-N'-[5-methoxy-2-methyl-4-(2,2,2-trifluoro-1-hydroxy-1-phenyl-ethyl) phenyl]-N-methyl-formamidine, N-methoxy-N-[[4-[5-(trifluoromethyl)-1,2,4-oxadiazol-3-yl]phenyl]methyl] cyclopropanecarboxamide, N,2-dimethoxy-N-[[4-[5-(trifluoromethyl)-1,2,4-oxadiazol-3-yl]phenyl]methyl] propanamide, N-ethyl-2-methyl-N-[[4-[5-(trifluoromethyl)-1,2,4-oxadiazol-3-yl]phenyl]methyl]propanamide, 1-methoxy-3-methyl-1-[[4-[5-(trifluoromethyl)-1,2,4-oxadiazol-3-yl]phenyl]methyl]urea, 1,3-dimethoxy-1-[[4-[5-(trifluoromethyl)-1,2,4-oxadiazol-3-yl]phenyl]methyl]urea, 3-ethyl-1-methoxy-1-[[4-[5-(trifluoromethyl)-1,2,4-oxadiazol-3-yl]phenyl]methyl]urea, ethyl 1-[[4-[5-(trifluoromethyl)-1,2,4-oxadiazol-3-yl]phenyl]methyl]pyrazole-4-carboxylate, N,N-dimethyl-1-[[4-[5-(trifluoromethyl)-1,2,4-oxadiazol-3-yl]phenyl]methyl]-1,2,4-triazol-3-amine, methyl (Z)-3-methoxy-2-[2-methyl-5-[3-(trifluoromethyl) pyrazol-1-yl]phenoxy]prop-2-enoate, methyl (Z)-3-methoxy-2-[2-methyl-5-(3-propylpyrazol-1-yl)phenoxy] prop-2-enoate, methyl (Z)-2-[5-(3-isopropylpyrazol-1-yl)-2-methyl-phenoxy]-3-methoxy-prop-2-enoate, methyl (Z)-3-methoxy-2-[2-methyl-5-(4-propyltriazol-2-yl)phenoxy] prop-2-enoate, methyl (Z)-3-methoxy-2-[2-methyl-5-[4-(trifluoromethyl)triazol-2-yl]phenoxy]prop-2-enoate, methyl (Z)-2-(5-cyclohexyl-2-methyl-phenoxy)-3-methoxy-prop-2-enoate, methyl (Z)-2-(5-cyclopentyl-2-methyl-phenoxy)-3-methoxy-prop-2-enoate, methyl (Z)-2-[5-(4-cyclohexylthiazol-2-yl)-2-methyl-phenoxy]-3-methoxy-prop-2-enoate, methyl (Z)-2-[5-[4-(ethoxymethyl) thiazol-2-yl]-2-methyl-phenoxy]-3-methoxy-prop-2-enoate, methyl (Z)-2-[5-(4-bromothiazol-2-yl)-2-methyl-phenoxy]-3-methoxy-prop-2-enoate, and methyl (Z)-3-methoxy-2-[2-methyl-5-[5-(trifluoromethyl)thiazol-2-yl]phenoxy]prop-2-enoate, wherein the weight ratio of component (A) to component (B) is from 10:1 to 1:10 (or even more preferably, 5:1 to 1:5).

In another preferred composition according to the invention, component (A) is compound no. X.35, 2-[benzoyl-(2,6-difluoro-4-pyridyl)amino]-N-(2,2-dimethylcyclobutyl)-5-methyl-thiazole-4-carboxamide or a salt, enantiomer, tautomer or N-oxide thereof, and component (B) is a compound selected from the group consisting of azoxystrobin, trifloxystrobin, metyltetraprole, difenoconazole, hexaconazole, propiconazole, prothioconazole, mefentrifluconazole, fenpropidin, fenpropimorph, fluxapyroxad, fluopyram, isopyrazam, sedaxane, benzovindiflupyr, pydiflumetofen, isoflucypram, isofetamid, pyrapropoyne, fluindapyr, fenpicoxamid, florylpicoxamid, acibenzolar-S-methyl, chlorothalonil, mancozeb, mandipropamid, oxathiapiprolin, fluazinam, fludioxonil, cyprodinil, metalaxyl-M, aminopyrifen, folpet, ipflufenoquin, quinofumelin, tricyclazole, pyroquilon, cyflufenamid, metrafenone, N'-[2-chloro-4-(2-fluorophenoxy)-5-methyl-phenyl]-N-ethyl-N-methyl-formamidine N'-[4-(2-bromophenoxy)-5-chloro-2-methyl-phenyl]-N-ethyl-N-methyl-formamidine, N-(1-benzyl-1,3-dimethyl-butyl)-8-fluoro-quinoline-3-carboxamide, N-(1-benzyl-3,3,3-trifluoro-1-methyl-propyl)-8-fluoro-quinoline-3-carboxamide, N-(1-benzyl-3-chloro-1-methyl-but-3-enyl)-8-fluoro-quinoline-3-carboxamide, 1-(6,7-dimethylpyrazolo[1,5-a]pyridin-3-yl)-4,4,5-trifluoro-3,3-dimethyl-isoquinoline, 4,4-difluoro-3,3-dimethyl-1-(7-methylpyrazolo[1,5-a]pyridin-3-yl)isoquinoline, 1-(6,7-dimethylpyrazolo[1,5-a]pyridin-3-yl)-4,4,6-trifluoro-3,3-dimethyl-isoquinoline, 1-(4,5-dimethylbenzimidazol-1-yl)-4,4,5-trifluoro-3,3-dimethyl-isoquinoline, 1-(4,5-dimethylbenzimidazol-1-yl)-4,4-difluoro-3,3-dimethyl-isoquinoline, 6-chloro-4,4-difluoro-3,3-dimethyl-1-(4-methylbenzimidazol-1-yl)isoquinoline, N'-[5-bromo-2-methyl-6-(1-methyl-2-propoxy-ethoxy)-3-pyridyl]-N-ethyl-N-methyl-formamidine, N'-[5-chloro-2-methyl-6-(1-methyl-2-propoxy-ethoxy)-3-pyridyl]-N-ethyl-N-methyl-formamidine, N'-[5-bromo-2-methyl-6-(1-methyl-2-propoxy-ethoxy)-3-pyridyl]-N-isopropyl-N-methyl-formamidine, N-isopropyl-N'-[5-methoxy-2-methyl-4-(2,2,2-trifluoro-1-hydroxy-1-phenyl-ethyl)phenyl]-N-methyl-formamidine, N-methoxy-N-[[4-[5-(trifluoromethyl)-1,2,4-oxadiazol-3-yl]phenyl]methyl]cyclopropanecarboxamide, N,2-dimethoxy-N-[[4-[5-(trifluoromethyl)-1,2,4-oxadiazol-3-yl]phenyl]methyl]propanamide, N-ethyl-2-methyl-N-[[4-[5-(trifluoromethyl)-1,2,4-oxadiazol-3-yl]phenyl]methyl]

propanamide, 1-methoxy-3-methyl-1-[[4-[5-(trifluoromethyl)-1,2,4-oxadiazol-3-yl]phenyl]methyl]urea, 1,3-dimethoxy-1-[[4-[5-(trifluoromethyl)-1,2,4-oxadiazol-3-yl]phenyl]methyl]urea, 3-ethyl-1-methoxy-1-[[4-[5-(trifluoromethyl)-1,2,4-oxadiazol-3-yl]phenyl]methyl]urea, ethyl 1-[[4-[5-(trifluoromethyl)-1,2,4-oxadiazol-3-yl]phenyl]methyl]pyrazole-4-carboxylate, N,N-dimethyl-1-[[4-[5-(trifluoromethyl)-1,2,4-oxadiazol-3-yl]phenyl]methyl]-1,2,4-triazol-3-amine, methyl (Z)-3-methoxy-2-[2-methyl-5-[3-(trifluoromethyl)pyrazol-1-yl]phenoxy]prop-2-enoate, methyl (Z)-3-methoxy-2-[2-methyl-5-(3-propylpyrazol-1-yl)phenoxy]prop-2-enoate, methyl (Z)-2-[5-(3-isopropylpyrazol-1-yl)-2-methyl-phenoxy]-3-methoxy-prop-2-enoate, methyl (Z)-3-methoxy-2-[2-methyl-5-(4-propyltriazol-2-yl)phenoxy]prop-2-enoate, methyl (Z)-3-methoxy-2-[2-methyl-5-[4-(trifluoromethyl)triazol-2-yl]phenoxy]prop-2-enoate, methyl (Z)-2-(5-cyclohexyl-2-methyl-phenoxy)-3-methoxy-prop-2-enoate, methyl (Z)-2-(5-cyclopentyl-2-methyl-phenoxy)-3-methoxy-prop-2-enoate, methyl (Z)-2-[5-(4-cyclohexylthiazol-2-yl)-2-methyl-phenoxy]-3-methoxy-prop-2-enoate, methyl (Z)-2-[5-[4-(ethoxymethyl)thiazol-2-yl]-2-methyl-phenoxy]-3-methoxy-prop-2-enoate, methyl (Z)-2-[5-(4-bromothiazol-2-yl)-2-methyl-phenoxy]-3-methoxy-prop-2-enoate, and methyl (Z)-3-methoxy-2-[2-methyl-5-[5-(trifluoromethyl)thiazol-2-yl]phenoxy]prop-2-enoate, wherein the weight ratio of component (A) to component (B) is from 10:1 to 1:10 (or even more preferably, 5:1 to 1:5).

In another preferred composition according to the invention, component (A) is compound no. X.36, 2-[acetyl-(2,6-difluoro-4-pyridyl)amino]-N-(2,2-dimethyl cyclobutyl)-5-methyl-thiazole-4-carboxamide or a salt, enantiomer, tautomer or N-oxide thereof, and component (B) is a compound selected from the group consisting of azoxystrobin, trifloxystrobin, metyltetraprole, difenoconazole, hexaconazole, propiconazole, prothioconazole, mefentrifluconazole, fenpropidin, fenpropimorph, fluxapyroxad, fluopyram, isopyrazam, sedaxane, benzovindiflupyr, pydiflumetofen, isoflucypram, isofetamid, pyrapropoyne, fluindapyr, fenpicoxamid, florylpicoxamid, acibenzolar-S-methyl, chlorothalonil, mancozeb, mandipropamid, oxathiapiprolin, fluazinam, fludioxonil, cyprodinil, metalaxyl-M, aminopyrifen, folpet, ipflufenoquin, quinofumelin, tricyclazole, pyroquilon, cyflufenamid, metrafenone, N'-[2-chloro-4-(2-fluorophenoxy)-5-methyl-phenyl]-N-ethyl-N-methyl-formamidine N'-[4-(2-bromophenoxy)-5-chloro-2-methyl-phenyl]-N-ethyl-N-methyl-formamidine, N-(1-benzyl-1,3-dimethyl-butyl)-8-fluoro-quinoline-3-carboxamide, N-(1-benzyl-3,3,3-trifluoro-1-methyl-propyl)-8-fluoro-quinoline-3-carboxamide, N-(1-benzyl-3-chloro-1-methyl-but-3-enyl)-8-fluoro-quinoline-3-carboxamide, 1-(6,7-dimethylpyrazolo[1,5-a]pyridin-3-yl)-4,4,5-trifluoro-3,3-dimethyl-isoquinoline, 4,4-difluoro-3,3-dimethyl-1-(7-methylpyrazolo[1,5-a]pyridin-3-yl)isoquinoline, 1-(6,7-dimethylpyrazolo[1,5-a]pyridin-3-yl)-4,4,6-trifluoro-3,3-dimethyl-isoquinoline, 1-(4,5-dimethylbenzimidazol-1-yl)-4,4,5-trifluoro-3,3-dimethyl-isoquinoline, 1-(4,5-dimethylbenzimidazol-1-yl)-4,4-difluoro-3,3-dimethyl-isoquinoline, 6-chloro-4,4-difluoro-3,3-dimethyl-1-(4-methylbenzimidazol-1-yl)isoquinoline, N'-[5-bromo-2-methyl-6-(1-methyl-2-propoxy-ethoxy)-3-pyridyl]-N-ethyl-N-methyl-formamidine, N'-[5-chloro-2-methyl-6-(1-methyl-2-propoxy-ethoxy)-3-pyridyl]-N-ethyl-N-methyl-formamidine, N'-[5-bromo-2-methyl-6-(1-methyl-2-propoxy-ethoxy)-3-pyridyl]-N-isopropyl-N-methyl-formamidine, N-isopropyl-N'-[5-methoxy-2-methyl-4-(2,2,2-trifluoro-1-hydroxy-1-phenyl-ethyl)phenyl]-N-methyl-formamidine, N-methoxy-N-[[4-[5-(trifluoromethyl)-1,2,4-oxadiazol-3-yl]phenyl]methyl]cyclopropanecarboxamide, N,2-dimethoxy-N-[[4-[5-(trifluoromethyl)-1,2,4-oxadiazol-3-yl]phenyl]methyl]propanamide, N-ethyl-2-methyl-N-[[4-[5-(trifluoromethyl)-1,2,4-oxadiazol-3-yl]phenyl]methyl]propanamide, 1-methoxy-3-methyl-1-[[4-[5-(trifluoromethyl)-1,2,4-oxadiazol-3-yl]phenyl]methyl]urea, 1,3-dimethoxy-1-[[4-[5-(trifluoromethyl)-1,2,4-oxadiazol-3-yl]phenyl]methyl]urea, 3-ethyl-1-methoxy-1-[[4-[5-(trifluoromethyl)-1,2,4-oxadiazol-3-yl]phenyl]methyl]urea, ethyl 1-[[4-[5-(trifluoromethyl)-1,2,4-oxadiazol-3-yl]phenyl]methyl]pyrazole-4-carboxylate, N,N-dimethyl-1-[[4-[5-(trifluoromethyl)-1,2,4-oxadiazol-3-yl]phenyl]methyl]-1,2,4-triazol-3-amine, methyl (Z)-3-methoxy-2-[2-methyl-5-[3-(trifluoromethyl)pyrazol-1-yl]phenoxy]prop-2-enoate, methyl (Z)-3-methoxy-2-[2-methyl-5-(3-propylpyrazol-1-yl)phenoxy]prop-2-enoate, methyl (Z)-2-[5-(3-isopropylpyrazol-1-yl)-2-methyl-phenoxy]-3-methoxy-prop-2-enoate, methyl (Z)-3-methoxy-2-[2-methyl-5-(4-propyltriazol-2-yl)phenoxy]prop-2-enoate, methyl (Z)-3-methoxy-2-[2-methyl-5-[4-(trifluoromethyl)triazol-2-yl]phenoxy]prop-2-enoate, methyl (Z)-2-(5-cyclohexyl-2-methyl-phenoxy)-3-methoxy-prop-2-enoate, methyl (Z)-2-(5-cyclopentyl-2-methyl-phenoxy)-3-methoxy-prop-2-enoate, methyl (Z)-2-[5-(4-cyclohexylthiazol-2-yl)-2-methyl-phenoxy]-3-methoxy-prop-2-enoate, methyl (Z)-2-[5-[4-(ethoxymethyl)thiazol-2-yl]-2-methyl-phenoxy]-3-methoxy-prop-2-enoate, methyl (Z)-2-[5-(4-bromothiazol-2-yl)-2-methyl-phenoxy]-3-methoxy-prop-2-enoate, and methyl (Z)-3-methoxy-2-[2-methyl-5-[5-(trifluoromethyl)thiazol-2-yl]phenoxy]prop-2-enoate, wherein the weight ratio of component (A) to component (B) is from 10:1 to 1:10 (or even more preferably, 5:1 to 1:5).

In another preferred composition according to the invention, component (A) is compound no. X.37, 2-[acetyl-(2,6-difluoro-4-pyridyl)amino]-5-methyl-N-spiro[3.4]octan-3-yl-thiazole-4-carboxamide or a salt, enantiomer, tautomer or N-oxide thereof, and component (B) is a compound selected from the group consisting of azoxystrobin, trifloxystrobin, metyltetraprole, difenoconazole, hexaconazole, propiconazole, prothioconazole, mefentrifluconazole, fenpropidin, fenpropimorph, fluxapyroxad, fluopyram, isopyrazam, sedaxane, benzovindiflupyr, pydiflumetofen, isoflucypram, isofetamid, pyrapropoyne, fluindapyr, fenpicoxamid, florylpicoxamid, acibenzolar-S-methyl, chlorothalonil, mancozeb, mandipropamid, oxathiapiprolin, fluazinam, fludioxonil, cyprodinil, metalaxyl-M, aminopyrifen, folpet, ipflufenoquin, quinofumelin, tricyclazole, pyroquilon, cyflufenamid, metrafenone, N'-[2-chloro-4-(2-fluorophenoxy)-5-methyl-phenyl]-N-ethyl-N-methyl-formamidine N'-[4-(2-bromophenoxy)-5-chloro-2-methyl-phenyl]-N-ethyl-N-methyl-formamidine, N-(1-benzyl-1,3-dimethyl-butyl)-8-fluoro-quinoline-3-carboxamide, N-(1-benzyl-3,3,3-trifluoro-1-methyl-propyl)-8-fluoro-quinoline-3-carboxamide, N-(1-benzyl-3-chloro-1-methyl-but-3-enyl)-8-fluoro-quinoline-3-carboxamide, 1-(6,7-dimethylpyrazolo[1,5-a]pyridin-3-yl)-4,4,5-trifluoro-3,3-dimethyl-isoquinoline, 4,4-difluoro-3,3-dimethyl-1-(7-methylpyrazolo[1,5-a]pyridin-3-yl)isoquinoline, 1-(6,7-dimethylpyrazolo[1,5-a]pyridin-3-yl)-4,4,6-trifluoro-3,3-dimethyl-isoquinoline, 1-(4,5-dimethylbenzimidazol-1-yl)-4,4,5-trifluoro-3,3-dimethyl-isoquinoline, 1-(4,5-dimethylbenzimidazol-1-yl)-4,4-difluoro-3,3-dimethyl-isoquinoline, 6-chloro-4,4-difluoro-3,3-dimethyl-1-(4-methylbenzimidazol-1-yl)isoquinoline, N'-[5-bromo-2-methyl-6-(1-methyl-2-propoxy-ethoxy)-3-pyridyl]-N-ethyl-N-methyl-formamidine, N'-[5-chloro-2-methyl-6-(1- methyl-2-propoxy-ethoxy)-3-pyridyl]-N-ethyl-N-methyl-formamidine, N'-[5-bromo-2-methyl-6-(1-methyl-2-propoxy-ethoxy)-3-pyridyl]-N-isopropyl-N-methyl-formamidine, N-isopropyl-N'-[5-methoxy-2-methyl-4-(2,2,2-trifluoro-1-hydroxy-1-phenyl-ethyl)phenyl]-N-methyl-formamidine, N-methoxy-N-[[4-[5-(trifluoromethyl)-1,2,4-oxadiazol-3-yl]phenyl]methyl]cyclopropanecarboxamide, N,2-dimethoxy-N-[[4-[5-(trifluoromethyl)-1,2,4-oxadiazol-3-yl]phenyl]methyl]propanamide, N-ethyl-2-methyl-N-[[4-[5-(trifluoromethyl)-1,2,4-oxadiazol-3-yl]phenyl]methyl]propanamide, 1-methoxy-3-methyl-1-[[4-[5-(trifluoromethyl)-1,2,4-oxadiazol-3-yl]phenyl]methyl]urea, 1,3-dimethoxy-1-[[4-[5-(trifluoromethyl)-1,2,4-oxadiazol-3-yl]phenyl]methyl]urea, 3-ethyl-1-methoxy-1-[[4-[5-(trifluoromethyl)-1,2,4-oxadiazol-3-yl]phenyl]methyl]urea, ethyl 1-[[4-[5-(trifluoromethyl)-1,2,4-oxadiazol-3-yl]phenyl]methyl]pyrazole-4-carboxylate, N,N-dimethyl-1-[[4-[5-(trifluoromethyl)-1,2,4-oxadiazol-3-yl]phenyl]methyl]-1,2,4-triazol-3-amine, methyl (Z)-3-methoxy-2-[2-methyl-5-[3-(trifluoromethyl)pyrazol-1-yl]phenoxy]prop-2-enoate, methyl (Z)-3-methoxy-2-[2-methyl-5-(3-propylpyrazol-1-yl)phenoxy]prop-2-enoate, methyl (Z)-2-[5-(3-isopropylpyrazol-1-yl)-2-methyl-phenoxy]-3-methoxy-prop-2-enoate, methyl (Z)-3-methoxy-2-[2-methyl-5-(4-propyltriazol-2-yl)phenoxy]prop-2-enoate, methyl (Z)-3-methoxy-2-[2-methyl-5-[4-(trifluoromethyl)triazol-2-yl]phenoxy]prop-2-enoate, methyl (Z)-2-(5-cyclohexyl-2-methyl-phenoxy)-3-methoxy-prop-2-enoate, methyl (Z)-2-(5-cyclopentyl-2-methyl-phenoxy)-3-methoxy-prop-2-enoate, methyl (Z)-2-[5-(4-cyclohexylthiazol-2-yl)-2-methyl-phenoxy]-3-methoxy-prop-2-enoate, methyl (Z)-2-[5-[4-(ethoxymethyl)thiazol-2-yl]-2-methyl-phenoxy]-3-methoxy-prop-2-enoate, methyl (Z)-2-[5-(4-bromothiazol-2-yl)-2-methyl-phenoxy]-3-methoxy-prop-2-enoate, and methyl (Z)-3-methoxy-2-[2-methyl-5-[5-(trifluoromethyl)thiazol-2-yl]phenoxy]prop-2-enoate, wherein the weight ratio of component (A) to component (B) is from 10:1 to 1:10 (or even more preferably, 5:1 to 1:5).

In another preferred composition according to the invention, component (A) is compound no. X.38, 2-[(2,6-difluoro-4-pyridyl)-(2-methylpropanoyl)amino]-N-(2,2-dimethylcyclobutyl)-5-methyl-thiazole-4-carboxamide or a salt, enantiomer, tautomer or N-oxide thereof, and component (B) is a compound selected from the group consisting of azoxystrobin, trifloxystrobin, metyltetraprole, difenoconazole, hexaconazole, propiconazole, prothioconazole, mefentrifluconazole, fenpropidin, fenpropimorph, fluxapyroxad, fluopyram, isopyrazam, sedaxane, benzovindiflupyr, pydiflumetofen, isoflucypram, isofetamid, pyrapropoyne, fluindapyr, fenpicoxamid, florylpicoxamid, acibenzolar-S-methyl, chlorothalonil, mancozeb, mandipropamid, oxathiapiprolin, fluazinam, fludioxonil, cyprodinil, metalaxyl-M, aminopyrifen, folpet, ipflufenoquin, quinofumelin, tricyclazole, pyroquilon, cyflufenamid, metrafenone, N'-[2-chloro-4-(2-fluorophenoxy)-5-methyl-phenyl]-N-ethyl-N-methyl-formamidine N'-[4-(2-bromophenoxy)-5-chloro-2-methyl-phenyl]-N-ethyl-N-methyl-formamidine, N-(1-benzyl-1,3-dimethyl-butyl)-8-fluoro-quinoline-3-carboxamide, N-(1-benzyl-3,3,3-trifluoro-1-methyl-propyl)-8-fluoro-quinoline-3-carboxamide, N-(1-benzyl-3-chloro-1-methyl-but-3-enyl)-8-fluoro-quinoline-3-carboxamide, 1-(6,7-dimethylpyrazolo[1,5-a]pyridin-3-yl)-4,4,5-trifluoro-3,3-dimethyl-isoquinoline, 4,4-difluoro-3,3-dimethyl-1-(7-methylpyrazolo[1,5-a]pyridin-3-yl)isoquinoline, 1-(6,7-dimethylpyrazolo[1,5-a]pyridin-3-yl)-4,4,6-trifluoro-3,3-dimethyl-isoquinoline, 1-(4,5-dimethylbenzimidazol-1-yl)-4,4,5-trifluoro-3,3-dimethyl-isoquinoline, 1-(4,5-dimethylbenzimidazol-1-yl)-4,4-difluoro-3,3-dimethyl-isoquinoline, 6-chloro-4,4-difluoro-3,3-dimethyl-1-(4-methylbenzimidazol-1-yl)isoquinoline, N'-[5-bromo-2-methyl-6-(1-methyl-2-propoxy-ethoxy)-3-pyridyl]-N-ethyl-N-methyl-formamidine, N'-[5-chloro-2-methyl-6-(1-methyl-2-propoxy-ethoxy)-3-pyridyl]-N-ethyl-N-methyl-formamidine, N'-[5-bromo-2-methyl-6-(1-methyl-2-propoxy-ethoxy)-3-pyridyl]-N-isopropyl-N-methyl-formamidine, N-isopropyl-N'-[5-methoxy-2-methyl-4-(2,2,2-trifluoro-1-hydroxy-1-phenyl-ethyl)phenyl]-N-methyl-formamidine, N-methoxy-N-[[4-[5-(trifluoromethyl)-1,2,4-oxadiazol-3-yl]phenyl]methyl]cyclopropanecarboxamide, N,2-dimethoxy-N-[[4-[5-(trifluoromethyl)-1,2,4-oxadiazol-3-yl]phenyl]methyl]propanamide, N-ethyl-2-methyl-N-[[4-[5-(trifluoromethyl)-1,2,4-oxadiazol-3-yl]phenyl]methyl]propanamide, 1-methoxy-3-methyl-1-[[4-[5-(trifluoromethyl)-1,2,4-oxadiazol-3-yl]phenyl]methyl]urea, 1,3-dimethoxy-1-[[4-[5-(trifluoromethyl)-1,2,4-oxadiazol-3-yl]phenyl]methyl]urea, 3-ethyl-1-methoxy-1-[[4-[5-(trifluoromethyl)-1,2,4-oxadiazol-3-yl]phenyl]methyl]urea, ethyl 1-[[4-[5-(trifluoromethyl)-1,2,4-oxadiazol-3-yl]phenyl]methyl]pyrazole-4-carboxylate, N,N-dimethyl-1-[[4-[5-(trifluoromethyl)-1,2,4-oxadiazol-3-yl]phenyl]methyl]-1,2,4-triazol-3-amine, methyl (Z)-3-methoxy-2-[2-methyl-5-[3-(trifluoromethyl)pyrazol-1-yl]phenoxy]prop-2-enoate, methyl (Z)-3-methoxy-2-[2-methyl-5-(3-propylpyrazol-1-yl)phenoxy]prop-2-enoate, methyl (Z)-2-[5-(3-isopropylpyrazol-1-yl)-2-methyl-phenoxy]-3-methoxy-prop-2-enoate, methyl (Z)-3-methoxy-2-[2-methyl-5-(4-propyltriazol-2-yl)phenoxy]prop-2-enoate, methyl (Z)-3-methoxy-2-[2-methyl-5-[4-(trifluoromethyl)triazol-2-yl]phenoxy]prop-2-enoate, methyl (Z)-2-(5-cyclohexyl-2-methyl-phenoxy)-3-methoxy-prop-2-enoate, methyl (Z)-2-(5-cyclopentyl-2-methyl-phenoxy)-3-methoxy-prop-2-enoate, methyl (Z)-2-[5-(4-cyclohexylthiazol-2-yl)-2-methyl-phenoxy]-3-methoxy-prop-2-enoate, methyl (Z)-2-[5-[4-(ethoxymethyl)thiazol-2-yl]-2-methyl-phenoxy]-3-methoxy-prop-2-enoate, methyl (Z)-2-[5-(4-bromothiazol-2-yl)-2-methyl-phenoxy]-3-methoxy-prop-2-enoate, and methyl (Z)-3-methoxy-2-[2-methyl-5-[5-(trifluoromethyl)thiazol-2-yl]phenoxy]prop-2-enoate, wherein the weight ratio of component (A) to component (B) is from 10:1 to 1:10 (or even more preferably, 5:1 to 1:5).

In a preferred composition according to the invention component (A) is compound no. X.01, [2-[(2,6-difluoro-4-pyridyl)-[5-methyl-4-(spiro[3.4]octan-3-ylcarbamoyl)thiazol-2-yl]amino]-1-methyl-2-oxo-ethyl]acetate or a salt, enantiomer, tautomer or N-oxide thereof, and component (B) is a compound selected from the group consisting of azoxystrobin, trifloxystrobin, metyltetraprole, difenoconazole, hexaconazole, propiconazole, prothioconazole, mefentrifluconazole, fenpropidin, fenpropimorph, fluxapyroxad, fluopyram, isopyrazam, sedaxane, benzovindiflupyr, pydiflumetofen, isoflucypram, isofetamid, pyrapropoyne, fluindapyr, fenpicoxamid, florylpicoxamid, chlorothalonil, mancozeb, mandipropamid, oxathiapiprolin, fluazinam, fludioxonil, cyprodinil, metalaxyl-M, aminopyrifen, folpet, ipflufenoquin, quinofumelin, tricyclazole, pyroquilon, N-(1-benzyl-1,3-dimethyl-butyl)-8-fluoro-quinoline-3-carboxamide, N-(1-benzyl-3,3,3-trifluoro-1-methyl-propyl)-8-fluoro-quinoline-3-carboxamide, 1-(6,7-dimethylpyrazolo[1,5-a]pyridin-3-yl)-4,4,5-trifluoro-3,3-dimethyl-isoquinoline, 4,4-difluoro-3,3-dimethyl-1-(7-methylpyrazolo[1,5-a]pyridin-3-yl)isoquinoline, 1-(4,5-dimethylbenzimidazol-1-yl)-4,4,5-trifluoro-3,3-dimethyl-isoquinoline, and 1-(4,5-dimethylbenzimidazol-1-yl)-4,4- difluoro-3,3-dimethyl-isoquinoline, wherein the weight ratio of component (A) to component (B) is from 10:1 to 1:10 (or even more preferably, 5:1 to 1:5).

In another preferred composition according to the invention, component (A) is compound no. X.04, [2-[(2,6-difluoro-4-pyridyl)-[5-methyl-4-(spiro[3.4]octan-3-ylcarbamoyl)thiazol-2-yl]amino]-1-methyl-2-oxo-ethyl]ethyl carbonate or a salt, enantiomer, tautomer or N-oxide thereof, and component (B) is a compound selected from the group consisting of azoxystrobin, trifloxystrobin, metyltetraprole, difenoconazole, hexaconazole, propiconazole, prothioconazole, mefentrifluconazole, fenpropidin, fenpropimorph, fluxapyroxad, fluopyram, isopyrazam, sedaxane, benzovindiflupyr, pydiflumetofen, isoflucypram, isofetamid, pyrapropoyne, fluindapyr, fenpicoxamid, florylpicoxamid, chlorothalonil, mancozeb, mandipropamid, oxathiapiprolin, fluazinam, fludioxonil, cyprodinil, metalaxyl-M, aminopyrifen, folpet, ipflufenoquin, quinofumelin, tricyclazole, pyroquilon, N-(1-benzyl-1,3-dimethyl-butyl)-8-fluoro-quinoline-3-carboxamide, N-(1-benzyl-3,3,3-trifluoro-1-methyl-propyl)-8-fluoro-quinoline-3-carboxamide, 1-(6,7-dimethylpyrazolo[1,5-a]pyridin-3-yl)-4,4,5-trifluoro-3,3-dimethyl-isoquinoline, 4,4-difluoro-3,3-dimethyl-1-(7-methylpyrazolo[1,5-a]pyridin-3-yl)isoquinoline, 1-(4,5-dimethylbenzimidazol-1-yl)-4,4,5-trifluoro-3,3-dimethyl-isoquinoline, and 1-(4,5-dimethylbenzimidazol-1-yl)-4,4-difluoro-3,3-dimethyl-isoquinoline, wherein the weight ratio of component (A) to component (B) is from 10:1 to 1:10 (or even more preferably, 5:1 to 1:5).

In another preferred composition according to the invention, component (A) is compound no. X.07, N-cyclobutyl-2-[(2,6-difluoro-4-pyridyl)-(2-methoxypropanoyl)amino]-5-methyl-thiazole-4-carboxamide or a salt, enantiomer, tautomer or N-oxide thereof, and component (B) is a compound selected from the group consisting of azoxystrobin, trifloxystrobin, metyltetraprole, difenoconazole, hexaconazole, propiconazole, prothioconazole, mefentrifluconazole, fenpropidin, fenpropimorph, fluxapyroxad, fluopyram, isopyrazam, sedaxane, benzovindiflupyr, pydiflumetofen, isoflucypram, isofetamid, pyrapropoyne, fluindapyr, fenpicoxamid, florylpicoxamid, chlorothalonil, mancozeb, mandipropamid, oxathiapiprolin, fluazinam, fludioxonil, cyprodinil, metalaxyl-M, aminopyrifen, folpet, ipflufenoquin, quinofumelin, tricyclazole, pyroquilon, N-(1-benzyl-1,3-dimethyl-butyl)-8-fluoro-quinoline-3-carboxamide, N-(1-benzyl-3,3,3-trifluoro-1-methyl-propyl)-8-fluoro-quinoline-3-carboxamide, 1-(6,7-dimethylpyrazolo[1,5-a]pyridin-3-yl)-4,4,5-trifluoro-3,3-dimethyl-isoquinoline, 4,4-difluoro-3,3-dimethyl-1-(7-methylpyrazolo[1,5-a]pyridin-3-yl)isoquinoline, 1-(4,5-dimethylbenzimidazol-1-yl)-4,4,5-trifluoro-3,3-dimethyl-isoquinoline, and 1-(4,5-dimethylbenzimidazol-1-yl)-4,4-difluoro-3,3-dimethyl-isoquinoline, wherein the weight ratio of component (A) to component (B) is from 10:1 to 1:10 (or even more preferably, 5:1 to 1:5).

In another preferred composition according to the invention, component (A) is compound no. X.11, 2-[(2,6-difluoro-4-pyridyl)-(2-methoxyacetyl)amino]-5-methyl-N-spiro[3.4]octan-3-yl-thiazole-4-carboxamide or a salt, enantiomer, tautomer or N-oxide thereof, and component (B) is a compound selected from the group consisting of azoxystrobin, trifloxystrobin, metyltetraprole, difenoconazole, hexaconazole, propiconazole, prothioconazole, mefentrifluconazole, fenpropidin, fenpropimorph, fluxapyroxad, fluopyram, isopyrazam, sedaxane, benzovindiflupyr, pydiflumetofen, isoflucypram, isofetamid, pyrapropoyne, fluindapyr, fenpicoxamid, florylpicoxamid, chlorothalonil, mancozeb, mandipropamid, oxathiapiprolin, fluazinam, fludioxonil, cyprodinil, metalaxyl-M, aminopyrifen, folpet, ipflufenoquin, quinofumelin, tricyclazole, pyroquilon, N-(1-benzyl-1,3-dimethyl-butyl)-8-fluoro-quinoline-3-carboxamide, N-(1-benzyl-3,3,3-trifluoro-1-methyl-propyl)-8-fluoro-quinoline-3-carboxamide, 1-(6,7-dimethylpyrazolo[1,5-a]pyridin-3-yl)-4,4,5-trifluoro-3,3-dimethyl-isoquinoline, 4,4-difluoro-3,3-dimethyl-1-(7-methylpyrazolo[1,5-a]pyridin-3-yl)isoquinoline, 1-(4,5-dimethylbenzimidazol-1-yl)-4,4,5-trifluoro-3,3-dimethyl-isoquinoline, and 1-(4,5-dimethylbenzimidazol-1-yl)-4,4-difluoro-3,3-dimethyl-isoquinoline, wherein the weight ratio of component (A) to component (B) is from 10:1 to 1:10 (or even more preferably, 5:1 to 1:5).

In another preferred composition according to the invention, component (A) is compound no. X.12, N-cyclobutyl-2-[(2,6-difluoro-4-pyridyl)-(2-methoxyacetyl)amino]-5-methyl-thiazole-4-carboxamide or a salt, enantiomer, tautomer or N-oxide thereof, and component (B) is a compound selected from the group consisting of azoxystrobin, trifloxystrobin, metyltetraprole, difenoconazole, hexaconazole, propiconazole, prothioconazole, mefentrifluconazole, fenpropidin, fenpropimorph, fluxapyroxad, fluopyram, isopyrazam, sedaxane, benzovindiflupyr, pydiflumetofen, isoflucypram, isofetamid, pyrapropoyne, fluindapyr, fenpicoxamid, florylpicoxamid, chlorothalonil, mancozeb, mandipropamid, oxathiapiprolin, fluazinam, fludioxonil, cyprodinil, metalaxyl-M, aminopyrifen, folpet, ipflufenoquin, quinofumelin, tricyclazole, pyroquilon, N-(1-benzyl-1,3-dimethyl-butyl)-8-fluoro-quinoline-3-carboxamide, N-(1-benzyl-3,3,3-trifluoro-1-methyl-propyl)-8-fluoro-quinoline-3-carboxamide, 1-(6,7-dimethylpyrazolo[1,5-a]pyridin-3-yl)-4,4,5-trifluoro-3,3-dimethyl-isoquinoline, 4,4-difluoro-3,3-dimethyl-1-(7-methylpyrazolo[1,5-a]pyridin-3-yl)isoquinoline, 1-(4,5-dimethylbenzimidazol-1-yl)-4,4,5-trifluoro-3,3-dimethyl-isoquinoline, and 1-(4,5-dimethylbenzimidazol-1-yl)-4,4-difluoro-3,3-dimethyl-isoquinoline, wherein the weight ratio of component (A) to component (B) is from 10:1 to 1:10 (or even more preferably, 5:1 to 1:5).

In another preferred composition according to the invention, component (A) is compound no. X.13, 2-[acetyl-(2,6-difluoro-4-pyridyl)amino]-N-cyclobutyl-5-methyl-thiazole-4-carboxamide or a salt, enantiomer, tautomer or N-oxide thereof, and component (B) is a compound selected from the group consisting of azoxystrobin, trifloxystrobin, metyltetraprole, difenoconazole, hexaconazole, propiconazole, prothioconazole, mefentrifluconazole, fenpropidin, fenpropimorph, fluxapyroxad, fluopyram, isopyrazam, sedaxane, benzovindiflupyr, pydiflumetofen, isoflucypram, isofetamid, pyrapropoyne, fluindapyr, fenpicoxamid, florylpicoxamid, chlorothalonil, mancozeb, mandipropamid, oxathiapiprolin, fluazinam, fludioxonil, cyprodinil, metalaxyl-M, aminopyrifen, folpet, ipflufenoquin, quinofumelin, tricyclazole, pyroquilon, N-(1-benzyl-1,3-dimethyl-butyl)-8-fluoro-quinoline-3-carboxamide, N-(1-benzyl-3,3,3-trifluoro-1-methyl-propyl)-8-fluoro-quinoline-3-carboxamide, 1-(6,7-dimethylpyrazolo[1,5-a]pyridin-3-yl)-4,4,5-trifluoro-3,3-dimethyl-isoquinoline, 4,4-difluoro-3,3-dimethyl-1-(7-methylpyrazolo[1,5-a]pyridin-3-yl)isoquinoline, 1-(4,5-dimethylbenzimidazol-1-yl)-4,4,5-trifluoro-3,3-dimethyl-isoquinoline, and 1-(4,5-dimethylbenzimidazol-1-yl)-4,4-difluoro-3,3-dimethyl-isoquinoline, wherein the weight ratio of component (A) to component (B) is from 10:1 to 1:10 (or even more preferably, 5:1 to 1:5).

In another preferred composition according to the invention, component (A) is compound no. X.14, 2-[(2-benzyloxyacetyl)-(2,6-difluoro-4-pyridyl)amino]-N-(2,2-dimethylcyclobutyl)-5-methyl-thiazole-4-carboxamide or a salt, enantiomer, tautomer or N-oxide thereof, and component (B) is a compound selected from the group consisting of azoxystrobin, trifloxystrobin, metyltetraprole, difenoconazole, hexaconazole, propiconazole, prothioconazole, mefentrifluconazole, fenpropidin, fenpropimorph, fluxapyroxad, fluopyram, isopyrazam, sedaxane, benzovindiflupyr, pydiflumetofen, isoflucypram, isofetamid, pyrapropoyne, fluindapyr, fenpicoxamid, florylpicoxamid, chlorothalonil, mancozeb, mandipropamid, oxathiapiprolin, fluazinam, fludioxonil, cyprodinil, metalaxyl-M, aminopyrifen, folpet, ipflufenoquin, quinofumelin, tricyclazole, pyroquilon, N-(1-benzyl-1,3-dimethyl-butyl)-8-fluoro-quinoline-3-carboxamide, N-(1-benzyl-3,3,3-trifluoro-1-methyl-propyl)-8-fluoro-quinoline-3-carboxamide, 1-(6,7-dimethylpyrazolo[1,5-a]pyridin-3-yl)-4,4,5-trifluoro-3,3-dimethyl-isoquinoline, 4,4-difluoro-3,3-dimethyl-1-(7-methylpyrazolo[1,5-a]pyridin-3-yl)isoquinoline, 1-(4,5-dimethylbenzimidazol-1-yl)-4,4,5-trifluoro-3,3-dimethyl-isoquinoline, and 1-(4,5-dimethylbenzimidazol-1-yl)-4,4-difluoro-3,3-dimethyl-isoquinoline, wherein the weight ratio of component (A) to component (B) is from 10:1 to 1:10 (or even more preferably, 5:1 to 1:5).

In another preferred composition according to the invention, component (A) is compound no. X.17, 2-[(2-chloroacetyl)-(2,6-difluoro-4-pyridyl)amino]-N-(2,2-dimethylcyclobutyl)-5-methyl-thiazole-4-carboxamide or a salt, enantiomer, tautomer or N-oxide thereof, and component (B) is a compound selected from the group consisting of azoxystrobin, trifloxystrobin, metyltetraprole, difenoconazole, hexaconazole, propiconazole, prothioconazole, mefentrifluconazole, fenpropidin, fenpropimorph, fluxapyroxad, fluopyram, isopyrazam, sedaxane, benzovindiflupyr, pydiflumetofen, isoflucypram, isofetamid, pyrapropoyne, fluindapyr, fenpicoxamid, florylpicoxamid, chlorothalonil, mancozeb, mandipropamid, oxathiapiprolin, fluazinam, fludioxonil, cyprodinil, metalaxyl-M, aminopyrifen, folpet, ipflufenoquin, quinofumelin, tricyclazole, pyroquilon, N-(1-benzyl-1,3-dimethyl-butyl)-8-fluoro-quinoline-3-carboxamide, N-(1-benzyl-3,3,3-trifluoro-1-methyl-propyl)-8-fluoro-quinoline-3-carboxamide, 1-(6,7-dimethylpyrazolo[1,5-a]pyridin-3-yl)-4,4,5-trifluoro-3,3-dimethyl-isoquinoline, 4,4-difluoro-3,3-dimethyl-1-(7-methylpyrazolo[1,5-a]pyridin-3-yl)isoquinoline, 1-(4,5-dimethylbenzimidazol-1-yl)-4,4,5-trifluoro-3,3-dimethyl-isoquinoline, and 1-(4,5-dimethylbenzimidazol-1-yl)-4,4-difluoro-3,3-dimethyl-isoquinoline, wherein the weight ratio of component (A) to component (B) is from 10:1 to 1:10 (or even more preferably, 5:1 to 1:5).

In another preferred composition according to the invention, component (A) is compound no. X.18, methyl 3-[(2,6-difluoro-4-pyridyl)-[4-[(2,2-dimethyl cyclobutyl)carbamoyl]-5-methyl-thiazol-2-yl]amino]-3-oxo-propanoate or a salt, enantiomer, tautomer or N-oxide thereof, and component (B) is a compound selected from the group consisting of azoxystrobin, trifloxystrobin, metyltetraprole, difenoconazole, hexaconazole, propiconazole, prothioconazole, mefentrifluconazole, fenpropidin, fenpropimorph, fluxapyroxad, fluopyram, isopyrazam, sedaxane, benzovindiflupyr, pydiflumetofen, isoflucypram, isofetamid, pyrapropoyne, fluindapyr, fenpicoxamid, florylpicoxamid, chlorothalonil, mancozeb, mandipropamid, oxathiapiprolin, fluazinam, fludioxonil, cyprodinil, metalaxyl-M, aminopyrifen, folpet, ipflufenoquin, quinofumelin, tricyclazole, pyroquilon, N-(1-benzyl-1,3-dimethyl-butyl)-8-fluoro-quinoline-3-carboxamide, N-(1-benzyl-3,3,3-trifluoro-1-methyl-propyl)-8-fluoro-quinoline-3-carboxamide, 1-(6,7-dimethylpyrazolo[1,5-a]pyridin-3-yl)-4,4,5-trifluoro-3,3-dimethyl-isoquinoline, 4,4-difluoro-3,3-dimethyl-1-(7-methylpyrazolo[1,5-a]pyridin-3-yl)isoquinoline, 1-(4,5-dimethylbenzimidazol-1-yl)-4,4,5-trifluoro-3,3-dimethyl-isoquinoline, and 1-(4,5-dimethylbenzimidazol-1-yl)-4,4-difluoro-3,3-dimethyl-isoquinoline, wherein the weight ratio of component (A) to component (B) is from 10:1 to 1:10 (or even more preferably, 5:1 to 1:5).

In another preferred composition according to the invention, component (A) is compound no. X.19, 2-[(2,6-difluoro-4-pyridyl)-(furan-2-carbonyl)amino]-N-(2,2-dimethyl cyclobutyl)-5-methyl-thiazole-4-carboxamide or a salt, enantiomer, tautomer or N-oxide thereof, and component (B) is a compound selected from the group consisting of azoxystrobin, trifloxystrobin, metyltetraprole, difenoconazole, hexaconazole, propiconazole, prothioconazole, mefentrifluconazole, fenpropidin, fenpropimorph, fluxapyroxad, fluopyram, isopyrazam, sedaxane, benzovindiflupyr, pydiflumetofen, isoflucypram, isofetamid, pyrapropoyne, fluindapyr, fenpicoxamid, florylpicoxamid, chlorothalonil, mancozeb, mandipropamid, oxathiapiprolin, fluazinam, fludioxonil, cyprodinil, metalaxyl-M, aminopyrifen, folpet, ipflufenoquin, quinofumelin, tricyclazole, pyroquilon, N-(1-benzyl-1,3-dimethyl-butyl)-8-fluoro-quinoline-3-carboxamide, N-(1-benzyl-3,3,3-trifluoro-1-methyl-propyl)-8-fluoro-quinoline-3-carboxamide, 1-(6,7-dimethylpyrazolo[1,5-a]pyridin-3-yl)-4,4,5-trifluoro-3,3-dimethyl-isoquinoline, 4,4-difluoro-3,3-dimethyl-1-(7-methylpyrazolo[1,5-a]pyridin-3-yl)isoquinoline, 1-(4,5-dimethylbenzimidazol-1-yl)-4,4,5-trifluoro-3,3-dimethyl-isoquinoline, and 1-(4,5-dimethylbenzimidazol-1-yl)-4,4-difluoro-3,3-dimethyl-isoquinoline, wherein the weight ratio of component (A) to component (B) is from 10:1 to 1:10 (or even more preferably, 5:1 to 1:5).

In another preferred composition according to the invention, component (A) is compound no. X.22, S-isopropyl N-(2,6-difluoro-4-pyridyl)-N-[4-[(2,2-dimethyl cyclobutyl) carbamoyl]-5-methyl-thiazol-2-yl]carbamothioate or a salt, enantiomer, tautomer or N-oxide thereof, and component (B) is a compound selected from the group consisting of azoxystrobin, trifloxystrobin, metyltetraprole, difenoconazole, hexaconazole, propiconazole, prothioconazole, mefentrifluconazole, fenpropidin, fenpropimorph, fluxapyroxad, fluopyram, isopyrazam, sedaxane, benzovindiflupyr, pydiflumetofen, isoflucypram, isofetamid, pyrapropoyne, fluindapyr, fenpicoxamid, florylpicoxamid, chlorothalonil, mancozeb, mandipropamid, oxathiapiprolin, fluazinam, fludioxonil, cyprodinil, metalaxyl-M, aminopyrifen, folpet, ipflufenoquin, quinofumelin, tricyclazole, pyroquilon, N-(1-benzyl-1,3-dimethyl-butyl)-8-fluoro-quinoline-3-carboxamide, N-(1-benzyl-3,3,3-trifluoro-1-methyl-propyl)-8-fluoro-quinoline-3-carboxamide, 1-(6,7-dimethylpyrazolo[1,5-a]pyridin-3-yl)-4,4,5-trifluoro-3,3-dimethyl-isoquinoline, 4,4-difluoro-3,3-dimethyl-1-(7-methylpyrazolo[1,5-a]pyridin-3-yl)isoquinoline, 1-(4,5-dimethylbenzimidazol-1-yl)-4,4,5-trifluoro-3,3-dimethyl-isoquinoline, and 1-(4,5-dimethylbenzimidazol-1-yl)-4,4-difluoro-3,3-dimethyl-isoquinoline, wherein the weight ratio of component (A) to component (B) is from 10:1 to 1:10 (or even more preferably, 5:1 to 1:5).

In another preferred composition according to the invention, component (A) is compound no. X.24, 2-[cyclopropane carbonyl-(2,6-difluoro-4-pyridyl)amino]-N-(2,2-dimethyl cyclobutyl)-5-methyl-thiazole-4-carboxamide or a salt, enantiomer, tautomer or N-oxide thereof, and component (B) is a compound selected from the group consisting of azoxystrobin, trifloxystrobin, metyltetraprole, difenoconazole, hexaconazole, propiconazole, prothioconazole, mefentrifluconazole, fenpropidin, fenpropimorph, fluxapyroxad, fluopyram, isopyrazam, sedaxane, benzovindiflupyr, pydiflumetofen, isoflucypram, isofetamid, pyrapropoyne, fluindapyr, fenpicoxamid, florylpicoxamid, chlorothalonil, mancozeb, mandipropamid, oxathiapiprolin, fluazinam, fludioxonil, cyprodinil, metalaxyl-M, aminopyrifen, folpet, ipflufenoquin, quinofumelin, tricyclazole, pyroquilon, N-(1-benzyl-1,3-dimethyl-butyl)-8-fluoro-quinoline-3-carboxamide, N-(1-benzyl-3,3,3-trifluoro-1-methyl-propyl)-8-fluoro-quinoline-3-carboxamide, 1-(6,7-dimethylpyrazolo[1,5-a]pyridin-3-yl)-4,4,5-trifluoro-3,3-dimethyl-isoquinoline, 4,4-difluoro-3,3-dimethyl-1-(7-methylpyrazolo[1,5-a]pyridin-3-yl)isoquinoline, 1-(4,5-dimethylbenzimidazol-1-yl)-4,4,5-trifluoro-3,3-dimethyl-isoquinoline, and 1-(4,5-dimethylbenzimidazol-1-yl)-4,4-difluoro-3,3-dimethyl-isoquinoline, wherein the weight ratio of component (A) to component (B) is from 10:1 to 1:10 (or even more preferably, 5:1 to 1:5).

In another preferred composition according to the invention, component (A) is compound no. X.26, phenyl N-(2,6-difluoro-4-pyridyl)-N-[4-[(2,2-dimethylcyclobutyl)carbamoyl]-5-methyl-thiazol-2-yl]carbamate or a salt, enantiomer, tautomer or N-oxide thereof, and component (B) is a compound selected from the group consisting of azoxystrobin, trifloxystrobin, metyltetraprole, difenoconazole, hexaconazole, propiconazole, prothioconazole, mefentrifluconazole, fenpropidin, fenpropimorph, fluxapyroxad, fluopyram, isopyrazam, sedaxane, benzovindiflupyr, pydiflumetofen, isoflucypram, isofetamid, pyrapropoyne, fluindapyr, fenpicoxamid, florylpicoxamid, chlorothalonil, mancozeb, mandipropamid, oxathiapiprolin, fluazinam, fludioxonil, cyprodinil, metalaxyl-M, aminopyrifen, folpet, ipflufenoquin, quinofumelin, tricyclazole, pyroquilon, N-(1-benzyl-1,3-dimethyl-butyl)-8-fluoro-quinoline-3-carboxamide, N-(1-benzyl-3,3,3-trifluoro-1-methyl-propyl)-8-fluoro-quinoline-3-carboxamide, 1-(6,7-dimethylpyrazolo[1,5-a]pyridin-3-yl)-4,4,5-trifluoro-3,3-dimethyl-isoquinoline, 4,4-difluoro-3,3-dimethyl-1-(7-methylpyrazolo[1,5-a]pyridin-3-yl)isoquinoline, 1-(4,5-dimethylbenzimidazol-1-yl)-4,4,5-trifluoro-3,3-dimethyl-isoquinoline, and 1-(4,5-dimethylbenzimidazol-1-yl)-4,4-difluoro-3,3-dimethyl-isoquinoline, wherein the weight ratio of component (A) to component (B) is from 10:1 to 1:10 (or even more preferably, 5:1 to 1:5).

In another preferred composition according to the invention, component (A) is compound no. X.29, 2-[(2,6-difluoro-4-pyridyl)-(2-methoxyacetyl)amino]-N-(2,2-dimethyl cyclobutyl)-5-methyl-thiazole-4-carboxamide or a salt, enantiomer, tautomer or N-oxide thereof, and component (B) is a compound selected from the group consisting of azoxystrobin, trifloxystrobin, metyltetraprole, difenoconazole, hexaconazole, propiconazole, prothioconazole, mefentrifluconazole, fenpropidin, fenpropimorph, fluxapyroxad, fluopyram, isopyrazam, sedaxane, benzovindiflupyr, pydiflumetofen, isoflucypram, isofetamid, pyrapropoyne, fluindapyr, fenpicoxamid, florylpicoxamid, chlorothalonil, mancozeb, mandipropamid, oxathiapiprolin, fluazinam, fludioxonil, cyprodinil, metalaxyl-M, aminopyrifen, folpet, ipflufenoquin, quinofumelin, tricyclazole, pyroquilon, N-(1-benzyl-1,3-dimethyl-butyl)-8-fluoro-quinoline-3-carboxamide, N-(1-benzyl-3,3,3-trifluoro-1-methyl-propyl)-8-fluoro-quinoline-3-carboxamide, 1-(6,7-dimethylpyrazolo[1,5-a]pyridin-3-yl)-4,4,5-trifluoro-3,3-dimethyl-isoquinoline, 4,4-difluoro-3,3-dimethyl-1-(7-methylpyrazolo[1,5-a]pyridin-3-yl)isoquinoline, 1-(4,5-dimethylbenzimidazol-1-yl)-4,4,5-trifluoro-3,3-dimethyl-isoquinoline, and 1-(4,5-dimethylbenzimidazol-1-yl)-4,4-difluoro-3,3-dimethyl-isoquinoline, wherein the weight ratio of component (A) to component (B) is from 10:1 to 1:10 (or even more preferably, 5:1 to 1:5).

In another preferred composition according to the invention, component (A) is compound no. X.31, 2-[(2,6-difluoro-4-pyridyl)-(thiophene-2-carbonyl)amino]-N-(2,2-dimethyl cyclobutyl)-5-methyl-thiazole-4-carboxamide or a salt, enantiomer, tautomer or N-oxide thereof, and component (B) is a compound selected from the group consisting of azoxystrobin, trifloxystrobin, metyltetraprole, difenoconazole, hexaconazole, propiconazole, prothioconazole, mefentrifluconazole, fenpropidin, fenpropimorph, fluxapyroxad, fluopyram, isopyrazam, sedaxane, benzovindiflupyr, pydiflumetofen, isoflucypram, isofetamid, pyrapropoyne, fluindapyr, fenpicoxamid, florylpicoxamid, chlorothalonil, mancozeb, mandipropamid, oxathiapiprolin, fluazinam, fludioxonil, cyprodinil, metalaxyl-M, aminopyrifen, folpet, ipflufenoquin, quinofumelin, tricyclazole, pyroquilon, N-(1-benzyl-1,3-dimethyl-butyl)-8-fluoro-quinoline-3-carboxamide, N-(1-benzyl-3,3,3-trifluoro-1-methyl-propyl)-8-fluoro-quinoline-3-carboxamide, 1-(6,7-dimethylpyrazolo[1,5-a]pyridin-3-yl)-4,4,5-trifluoro-3,3-dimethyl-isoquinoline, 4,4-difluoro-3,3-dimethyl-1-(7-methylpyrazolo[1,5-a]pyridin-3-yl)isoquinoline, 1-(4,5-dimethylbenzimidazol-1-yl)-4,4,5-trifluoro-3,3-dimethyl-isoquinoline, and 1-(4,5-dimethylbenzimidazol-1-yl)-4,4-difluoro-3,3-dimethyl-isoquinoline, wherein the weight ratio of component (A) to component (B) is from 10:1 to 1:10 (or even more preferably, 5:1 to 1:5).

In another preferred composition according to the invention, component (A) is compound no. X.33, 2-[(2,6-difluoro-4-pyridyl)-formyl-amino]-N-(2,2-dimethyl cyclobutyl)-5-methyl-thiazole-4-carboxamide or a salt, enantiomer, tautomer or N-oxide thereof, and component (B) is a compound selected from the group consisting of azoxystrobin, trifloxystrobin, metyltetraprole, difenoconazole, hexaconazole, propiconazole, prothioconazole, mefentrifluconazole, fenpropidin, fenpropimorph, fluxapyroxad, fluopyram, isopyrazam, sedaxane, benzovindiflupyr, pydiflumetofen, isoflucypram, isofetamid, pyrapropoyne, fluindapyr, fenpicoxamid, florylpicoxamid, chlorothalonil, mancozeb, mandipropamid, oxathiapiprolin, fluazinam, fludioxonil, cyprodinil, metalaxyl-M, aminopyrifen, folpet, ipflufenoquin, quinofumelin, tricyclazole, pyroquilon, N-(1-benzyl-1,3-dimethyl-butyl)-8-fluoro-quinoline-3-carboxamide, N-(1-benzyl-3,3,3-trifluoro-1-methyl-propyl)-8-fluoro-quinoline-3-carboxamide, 1-(6,7-dimethylpyrazolo[1,5-a]pyridin-3-yl)-4,4,5-trifluoro-3,3-dimethyl-isoquinoline, 4,4-difluoro-3,3-dimethyl-1-(7-methylpyrazolo[1,5-a]pyridin-3-yl)isoquinoline, 1-(4,5-dimethylbenzimidazol-1-yl)-4,4,5-trifluoro-3,3-dimethyl-isoquinoline, and 1-(4,5-dimethylbenzimidazol-1-yl)-4,4-difluoro-3,3-dimethyl-isoquinoline, wherein the weight ratio of component (A) to component (B) is from 10:1 to 1:10 (or even more preferably, 5:1 to 1:5).

In another preferred composition according to the invention, component (A) is compound no. X.34, ethyl 2-[(2,6-difluoro-4-pyridyl)-[4-[(2,2-dimethylcyclobutyl)carbamoyl]-5-methyl-thiazol-2-yl]amino]-2-oxo-acetate or a salt, enantiomer, tautomer or N-oxide thereof, and component (B) is a compound selected from the group consisting of azoxystrobin, trifloxystrobin, metyltetraprole, difenoconazole, hexaconazole, propiconazole, prothioconazole, mefentrifluconazole, fenpropidin, fenpropimorph, fluxapyroxad, fluopyram, isopyrazam, sedaxane, benzovindiflupyr, pydiflumetofen, isoflucypram, isofetamid, pyrapropoyne, fluindapyr, fenpicoxamid, florylpicoxamid, chlorothalonil, mancozeb, mandipropamid, oxathiapiprolin, fluazinam, fludioxonil, cyprodinil, metalaxyl-M, aminopyrifen, folpet, ipflufenoquin, quinofumelin, tricyclazole, pyroquilon, N-(1-benzyl-1,3-dimethyl-butyl)-8-fluoro-quinoline-3-carboxamide, N-(1-benzyl-3,3,3-trifluoro-1-methyl-propyl)-8-fluoro-quinoline-3-carboxamide, 1-(6,7-dimethylpyrazolo[1,5-a]pyridin-3-yl)-4,4,5-trifluoro-3,3-dimethyl-isoquinoline, 4,4-difluoro-3,3-dimethyl-1-(7-methylpyrazolo[1,5-a]pyridin-3-yl)isoquinoline, 1-(4,5-dimethylbenzimidazol-1-yl)-4,4,5-trifluoro-3,3-dimethyl-isoquinoline, and 1-(4,5-dimethylbenzimidazol-1-yl)-4,4-difluoro-3,3-dimethyl-isoquinoline, wherein the weight ratio of component (A) to component (B) is from 10:1 to 1:10 (or even more preferably, 5:1 to 1:5).

In another preferred composition according to the invention, component (A) is compound no. X.35, 2-[benzoyl-(2,6-difluoro-4-pyridyl)amino]-N-(2,2-dimethylcyclobutyl)-5-methyl-thiazole-4-carboxamide or a salt, enantiomer, tautomer or N-oxide thereof, and component (B) is a compound selected from the group consisting of azoxystrobin, trifloxystrobin, metyltetraprole, difenoconazole, hexaconazole, propiconazole, prothioconazole, mefentrifluconazole, fenpropidin, fenpropimorph, fluxapyroxad, fluopyram, isopyrazam, sedaxane, benzovindiflupyr, pydiflumetofen, isoflucypram, isofetamid, pyrapropoyne, fluindapyr, fenpicoxamid, florylpicoxamid, chlorothalonil, mancozeb, mandipropamid, oxathiapiprolin, fluazinam, fludioxonil, cyprodinil, metalaxyl-M, aminopyrifen, folpet, ipflufenoquin, quinofumelin, tricyclazole, pyroquilon, N-(1-benzyl-1,3-dimethyl-butyl)-8-fluoro-quinoline-3-carboxamide, N-(1-benzyl-3,3,3-trifluoro-1-methyl-propyl)-8-fluoro-quinoline-3-carboxamide, 1-(6,7-dimethylpyrazolo[1,5-a]pyridin-3-yl)-4,4,5-trifluoro-3,3-dimethyl-isoquinoline, 4,4-difluoro-3,3-dimethyl-1-(7-methylpyrazolo[1,5-a]pyridin-3-yl)isoquinoline, 1-(4,5-dimethylbenzimidazol-1-yl)-4,4,5-trifluoro-3,3-dimethyl-isoquinoline, and 1-(4,5-dimethylbenzimidazol-1-yl)-4,4-difluoro-3,3-dimethyl-isoquinoline, wherein the weight ratio of component (A) to component (B) is from 10:1 to 1:10 (or even more preferably, 5:1 to 1:5).

In another preferred composition according to the invention, component (A) is compound no. X.36, 2-[acetyl-(2,6-difluoro-4-pyridyl)amino]-N-(2,2-dimethyl cyclobutyl)-5-methyl-thiazole-4-carboxamide or a salt, enantiomer, tautomer or N-oxide thereof, and component (B) is a compound selected from the group consisting of azoxystrobin, trifloxystrobin, metyltetraprole, difenoconazole, hexaconazole, propiconazole, prothioconazole, mefentrifluconazole, fenpropidin, fenpropimorph, fluxapyroxad, fluopyram, isopyrazam, sedaxane, benzovindiflupyr, pydiflumetofen, isoflucypram, isofetamid, pyrapropoyne, fluindapyr, fenpicoxamid, florylpicoxamid, chlorothalonil, mancozeb, mandipropamid, oxathiapiprolin, fluazinam, fludioxonil, cyprodinil, metalaxyl-M, aminopyrifen, folpet, ipflufenoquin, quinofumelin, tricyclazole, pyroquilon, N-(1-benzyl-1,3-dimethyl-butyl)-8-fluoro-quinoline-3-carboxamide, N-(1-benzyl-3,3,3-trifluoro-1-methyl-propyl)-8-fluoro-quinoline-3-carboxamide, 1-(6,7-dimethylpyrazolo[1,5-a]pyridin-3-yl)-4,4,5-trifluoro-3,3-dimethyl-isoquinoline, 4,4-difluoro-3,3-dimethyl-1-(7-methylpyrazolo[1,5-a]pyridin-3-yl)isoquinoline, 1-(4,5-dimethylbenzimidazol-1-yl)-4,4,5-trifluoro-3,3-dimethyl-isoquinoline, and 1-(4,5-dimethylbenzimidazol-1-yl)-4,4-difluoro-3,3-dimethyl-isoquinoline, wherein the weight ratio of component (A) to component (B) is from 10:1 to 1:10 (or even more preferably, 5:1 to 1:5).

In another preferred composition according to the invention, component (A) is compound no. X.37, 2-[acetyl-(2,6-difluoro-4-pyridyl)amino]-5-methyl-N-spiro[3.4]octan-3-yl-thiazole-4-carboxamide or a salt, enantiomer, tautomer or N-oxide thereof, and component (B) is a compound selected from the group consisting of azoxystrobin, trifloxystrobin, metyltetraprole, difenoconazole, hexaconazole, propiconazole, prothioconazole, mefentrifluconazole, fenpropidin, fenpropimorph, fluxapyroxad, fluopyram, isopyrazam, sedaxane, benzovindiflupyr, pydiflumetofen, isoflucypram, isofetamid, pyrapropoyne, fluindapyr, fenpicoxamid, florylpicoxamid, chlorothalonil, mancozeb, mandipropamid, oxathiapiprolin, fluazinam, fludioxonil, cyprodinil, metalaxyl-M, aminopyrifen, folpet, ipflufenoquin, quinofumelin, tricyclazole, pyroquilon, N-(1-benzyl-1,3-dimethyl-butyl)-8-fluoro-quinoline-3-carboxamide, N-(1-benzyl-3,3,3-trifluoro-1-methyl-propyl)-8-fluoro-quinoline-3-carboxamide, 1-(6,7-dimethylpyrazolo[1,5-a]pyridin-3-yl)-4,4,5-trifluoro-3,3-dimethyl-isoquinoline, 4,4-difluoro-3,3-dimethyl-1-(7-methylpyrazolo[1,5-a]pyridin-3-yl)isoquinoline, 1-(4,5-dimethylbenzimidazol-1-yl)-4,4,5-trifluoro-3,3-dimethyl-isoquinoline, and 1-(4,5-dimethylbenzimidazol-1-yl)-4,4-difluoro-3,3-dimethyl-isoquinoline, wherein the weight ratio of component (A) to component (B) is from 10:1 to 1:10 (or even more preferably, 5:1 to 1:5).

In another preferred composition according to the invention, component (A) is compound no. X.38, 2-[(2,6-difluoro-4-pyridyl)-(2-methylpropanoyl)amino]-N-(2,2-dimethylcyclobutyl)-5-methyl-thiazole-4-carboxamide or a salt, enantiomer, tautomer or N-oxide thereof, and component (B) is a compound selected from the group consisting of azoxystrobin, trifloxystrobin, metyltetraprole, difenoconazole, hexaconazole, propiconazole, prothioconazole, mefentrifluconazole, fenpropidin, fenpropimorph, fluxapyroxad, fluopyram, isopyrazam, sedaxane, benzovindiflupyr, pydiflumetofen, isoflucypram, isofetamid, pyrapropoyne, fluindapyr, fenpicoxamid, florylpicoxamid, chlorothalonil, mancozeb, mandipropamid, oxathiapiprolin, fluazinam, fludioxonil, cyprodinil, metalaxyl-M, aminopyrifen, folpet, ipflufenoquin, quinofumelin, tricyclazole, pyroquilon, N-(1-benzyl-1,3-dimethyl-butyl)-8-fluoro-quinoline-3-carboxamide, N-(1-benzyl-3,3,3-trifluoro-1-methyl-propyl)-8-fluoro-quinoline-3-carboxamide, 1-(6,7-dimethylpyrazolo[1,5-a]pyridin-3-yl)-4,4,5-trifluoro-3,3-dimethyl-isoquinoline, 4,4-difluoro-3,3-dimethyl-1-(7-methylpyrazolo[1,5-a]pyridin-3-yl)isoquinoline, 1-(4,5-dimethylbenzimidazol-1-yl)-4,4,5-trifluoro-3,3-dimethyl-isoquinoline, and 1-(4,5-dimethylbenzimidazol-1-yl)-4,4-difluoro-3,3-dimethyl-isoquinoline, wherein the weight ratio of component (A) to component (B) is from 10:1 to 1:10 (or even more preferably, 5:1 to 1:5).

In a preferred composition according to the invention, component (A) is compound no. X.29, 2-[(2,6-difluoro-4-pyridyl)-(2-methoxyacetyl)amino]-N-(2,2-dimethyl cyclobutyl)-5-methyl-thiazole-4-carboxamide or a salt, enantiomer, tautomer or N-oxide thereof, and component (B) is a compound selected from the group consisting of: azoxystrobin, trifloxystrobin, metyltetraprole, difenoconazole, hexaconazole, propiconazole, prothioconazole, mefentrifluconazole, fenpropidin, fenpropimorph, fluxapyroxad, fluopyram, isopyrazam, sedaxane, benzovindiflupyr, pydiflumetofen, isoflucypram, isofetamid, pyrapropoyne, fluindapyr, fenpicoxamid, florylpicoxamid, chlorothalonil, mancozeb, mandipropamid, oxathiapiprolin, fluazinam, fludioxonil, cyprodinil, metalaxyl-M, aminopyrifen, folpet, ipflufenoquin, quinofumelin, tricyclazole, pyroquilon, N-(1-benzyl-1,3-dimethyl-butyl)-8-fluoro-quinoline-3-carboxamide, N-(1-benzyl-3,3,3-trifluoro-1-methyl-propyl)-8-fluoro-quinoline-3-carboxamide, 1-(6,7-dimethylpyrazolo [1,5-a]pyridin-3-yl)-4,4,5-trifluoro-3,3-dimethyl-isoquinoline, 4,4-difluoro-3,3-dimethyl-1-(7-methylpyrazolo[1,5-a]pyridin-3-yl)isoquinoline, 1-(4,5-dimethylbenzimidazol-1-yl)-4,4,5-trifluoro-3,3-dimethyl-isoquinoline, 1-(4,5-dimethylbenzimidazol-1-yl)-4,4-difluoro-3,3-dimethyl-isoquinoline, N'-[5-bromo-2-methyl-6-(1-methyl-2-propoxy-ethoxy)-3-pyridyl]-N-ethyl-N-methyl-formamidine, N-isopropyl-N'-[5-methoxy-2-methyl-4-(2,2,2-trifluoro-1-hydroxy-1-phenyl-ethyl) phenyl]-N-methyl-formamidine, TAEGRO®, Timorex Gold™, acibenzolar-S-methyl, cyflufenamid, metrafenone, fosetyl-aluminium, metarylpicoxamid, methyl (Z)-3-methoxy-2-[2-methyl-5-[3-(trifluoromethyl)pyrazol-1-yl] phenoxy]prop-2-enoate, methyl (Z)-3-methoxy-2-[2-methyl-5-(3-propylpyrazol-1-yl)phenoxy]prop-2-enoate, methyl (Z)-2-(5-cyclohexyl-2-methyl-phenoxy)-3-methoxy-prop-2-enoate, methyl (Z)-2-(5-cyclopentyl-2-methyl-phenoxy)-3-methoxy-prop-2-enoate, methyl (Z)-2-[5-(3-isopropylpyrazol-1-yl)-2-methyl-phenoxy]-3-methoxy-prop-2-enoate, methyl (z)-3-methoxy-2-[2-methyl-5-(4-propyltriazol-2-yl)phenoxy]prop-2-enoate, methyl (Z)-3-methoxy-2-[2-methyl-5-[4-(trifluoromethyl) triazol-2-yl]phenoxy]prop-2-enoate, N-methoxy-N-[[4-[5-(trifluoromethyl)-1,2,4-oxadiazol-3-yl]phenyl]methyl]cyclopropanecarboxamide, N,2-dimethoxy-N-[[4-[5-(trifluoromethyl)-1,2,4-oxadiazol-3-yl]phenyl]methyl] propanamide, N-ethyl-2-methyl-N-[[4-[5-(trifluoromethyl)-1,2,4-oxadiazol-3-yl]phenyl]methyl]propanamide, 1-methoxy-3-methyl-1-[[4-[5-(trifluoromethyl)-1,2,4-oxadiazol-3-yl]phenyl]methyl]urea, 1,3-dimethoxy-1-[[4-[5-(trifluoromethyl)-1,2,4-oxadiazol-3-yl]phenyl]methyl]urea, 3-ethyl-1-methoxy-1-[[4-[5-(trifluoromethyl)-1,2,4-oxadiazol-3-yl]phenyl]methyl]urea, and ethyl 1-[[4-[5-(trifluoromethyl)-1,2,4-oxadiazol-3-yl]phenyl]methyl]pyrazole-4-carboxylate, wherein the weight ratio of component (A) to component (B) is from 15:1 to 1:30, preferably, wherein the weight ratio of component (A) to component (B) is from 10:1 to 1:10, or even more preferably, 5:1 to 1:5.

In another preferred composition according to the invention, component (A) is compound no. X.36, 2-[acetyl-(2,6-difluoro-4-pyridyl)amino]-N-(2,2-dimethyl cyclobutyl)-5-methyl-thiazole-4-carboxamide or a salt, enantiomer, tautomer or N-oxide thereof, and component (B) is a compound selected from the group consisting of: azoxystrobin, trifloxystrobin, metyltetraprole, difenoconazole, hexaconazole, propiconazole, prothioconazole, mefentrifluconazole, fenpropidin, fenpropimorph, fluxapyroxad, fluopyram, isopyrazam, sedaxane, benzovindiflupyr, pydiflumetofen, isoflucypram, isofetamid, pyrapropoyne, fluindapyr, fenpicoxamid, florylpicoxamid, chlorothalonil, mancozeb, mandipropamid, oxathiapiprolin, fluazinam, fludioxonil, cyprodinil, metalaxyl-M, aminopyrifen, folpet, ipflufenoquin, quinofumelin, tricyclazole, pyroquilon, N-(1-benzyl-1,3-dimethyl-butyl)-8-fluoro-quinoline-3-carboxamide, N-(1-benzyl-3,3,3-trifluoro-1-methyl-propyl)-8-fluoro-quinoline-3-carboxamide, 1-(6,7-dimethylpyrazolo[1,5-a]pyridin-3-yl)-4,4,5-trifluoro-3,3-dimethyl-isoquinoline, 4,4-difluoro-3,3-dimethyl-1-(7-methylpyrazolo[1,5-a]pyridin-3-yl)isoquinoline, 1-(4,5-dimethylbenzimidazol-1-yl)-4,4,5-trifluoro-3,3-dimethyl-isoquinoline, 1-(4,5-dimethylbenzimidazol-1-yl)-4,4-difluoro-3,3-dimethyl-isoquinoline, N'-[5-bromo-2-methyl-6-(1-methyl-2-propoxy-ethoxy)-3-pyridyl]-N-ethyl-N-methyl-formamidine, N-isopropyl-N'-[5-methoxy-2-methyl-4-(2,2,2-trifluoro-1-hydroxy-1-phenyl-ethyl)phenyl]-N-methyl-formamidine, TAEGRO®, Timorex Gold™, acibenzolar-S-methyl, cyflufenamid, metrafenone, fosetyl-aluminium, metarylpicoxamid, methyl (Z)-3-methoxy-2-[2-methyl-5-[3-(trifluoromethyl)pyrazol-1-yl]phenoxy]prop-2-enoate, methyl (Z)-3-methoxy-2-[2-methyl-5-(3-propylpyrazol-1-yl)phenoxy]prop-2-enoate, methyl (Z)-2-(5-cyclohexyl-2-methyl-phenoxy)-3-methoxy-prop-2-enoate, methyl (Z)-2-(5-cyclopentyl-2-methyl-phenoxy)-3-methoxy-prop-2-enoate, methyl (Z)-2-[5-(3-isopropylpyrazol-1-yl)-2-methyl-phenoxy]-3-methoxy-prop-2-enoate, methyl (Z)-3-methoxy-2-[2-methyl-5-(4-propyltriazol-2-yl)phenoxy] prop-2-enoate, methyl (Z)-3-methoxy-2-[2-methyl-5-[4-(trifluoromethyl)triazol-2-yl]phenoxy]prop-2-enoate, N-methoxy-N-[[4-[5-(trifluoromethyl)-1,2,4-oxadiazol-3-yl]phenyl]methyl]cyclopropanecarboxamide, N,2-dimethoxy-N-[[4-[5-(trifluoromethyl)-1,2,4-oxadiazol-3-yl]phenyl]methyl]propanamide, N-ethyl-2-methyl-N-[[4-[5-(trifluoromethyl)-1,2,4-oxadiazol-3-yl]phenyl]methyl] propanamide, 1-methoxy-3-methyl-1-[[4-[5-(trifluoromethyl)-1,2,4-oxadiazol-3-yl]phenyl]methyl]urea, 1,3-dimethoxy-1-[[4-[5-(trifluoromethyl)-1,2,4-oxadiazol-3-yl]phenyl]methyl]urea, 3-ethyl-1-methoxy-1-[[4-[5-(trifluoromethyl)-1,2,4-oxadiazol-3-yl]phenyl]methyl]urea, and ethyl 1-[[4-[5-(trifluoromethyl)-1,2,4-oxadiazol-3-yl]phenyl]methyl]pyrazole-4-carboxylate, wherein the weight ratio of component (A) to component (B) is from 15:1 to 1:30, preferably, wherein the weight ratio of component (A) to component (B) is from 10:1 to 1:10, or even more preferably, 5:1 to 1:5.

In a further preferred composition according to the invention, component (A) is compound no. X.38, 2-[(2,6-difluoro-4-pyridyl)-(2-methylpropanoyl)amino]-N-(2,2-dimethylcyclobutyl)-5-methyl-thiazole-4-carboxamide or a salt, enantiomer, tautomer or N-oxide thereof, and component (B) is a compound selected from the group consisting of: azoxystrobin, trifloxystrobin, metyltetraprole, difenoconazole, hexaconazole, propiconazole, prothioconazole, mefentrifluconazole, fenpropidin, fenpropimorph, fluxapyroxad, fluopyram, isopyrazam, sedaxane, benzovindiflupyr, pydiflumetofen, isoflucypram, isofetamid, pyrapropoyne, fluindapyr, fenpicoxamid, florylpicoxamid, chlorothalonil, mancozeb, mandipropamid, oxathiapiprolin, fluazinam, fludioxonil, cyprodinil, metalaxyl-M, aminopyrifen, folpet, ipflufenoquin, quinofumelin, tricyclazole, pyroquilon, N-(1-benzyl-1,3-dimethyl-butyl)-8-fluoro-quinoline-3-carboxamide, N-(1-benzyl-3,3,3-trifluoro-1-methyl-propyl)-8-fluoro-quinoline-3-carboxamide, 1-(6,7-dimethylpyrazolo [1,5-a]pyridin-3-yl)-4,4,5-trifluoro-3,3-dimethyl-isoquinoline, 4,4-difluoro-3,3-dimethyl-1-(7-methylpyrazolo[1,5-a]pyridin-3-yl)isoquinoline, 1-(4,5-dimethylbenzimidazol-1-yl)-4,4,5-trifluoro-3,3-dimethyl-isoquinoline, 1-(4,5-dimethylbenzimidazol-1-yl)-4,4-difluoro-3,3-dimethyl-isoquinoline, N'-[5-bromo-2-methyl-6-(1-methyl-2-propoxy-ethoxy)-3-pyridyl]-N-ethyl-N-methyl-formamidine, N-isopropyl-N'-[5-methoxy-2-methyl-4-(2,2,2-trifluoro-1-hydroxy-1-phenyl-ethyl) phenyl]-N-methyl-formamidine, TAEGRO®, Timorex Gold™, acibenzolar-S-methyl, cyflufenamid, metrafenone, fosetyl-aluminium, metarylpicoxamid, methyl (Z)-3-methoxy-2-[2-methyl-5-[3-(trifluoromethyl)pyrazol-1-yl] phenoxy]prop-2-enoate, methyl (Z)-3-methoxy-2-[2-methyl-5-(3-propylpyrazol-1-yl)phenoxy]prop-2-enoate, methyl (Z)-2-(5-cyclohexyl-2-methyl-phenoxy)-3-methoxy-prop-2-enoate, methyl (Z)-2-(5-cyclopentyl-2- methyl-phenoxy)-3-methoxy-prop-2-enoate, methyl (Z)-2-[5-(3-isopropylpyrazol-1-yl)-2-methyl-phenoxy]-3-methoxy-prop-2-enoate, methyl (Z)-3-methoxy-2-[2-methyl-5-(4-propyltriazol-2-yl)phenoxy]prop-2-enoate, methyl (Z)-3-methoxy-2-[2-methyl-5-[4-(trifluoromethyl)triazol-2-yl]phenoxy]prop-2-enoate, N-methoxy-N-[[4-[5-(trifluoromethyl)-1,2,4-oxadiazol-3-yl]phenyl]methyl]cyclopropanecarboxamide, N,2-dimethoxy-N-[[4-[5-(trifluoromethyl)-1,2,4-oxadiazol-3-yl]phenyl]methyl]propanamide, N-ethyl-2-methyl-N-[[4-[5-(trifluoromethyl)-1,2,4-oxadiazol-3-yl]phenyl]methyl]propanamide, 1-methoxy-3-methyl-1-[[4-[5-(trifluoromethyl)-1,2,4-oxadiazol-3-yl]phenyl]methyl]urea, 1,3-dimethoxy-1-[[4-[5-(trifluoromethyl)-1,2,4-oxadiazol-3-yl]phenyl]methyl]urea, 3-ethyl-1-methoxy-1-[[4-[5-(trifluoromethyl)-1,2,4-oxadiazol-3-yl]phenyl]methyl]urea, and ethyl 1-[[4-[5-(trifluoromethyl)-1,2,4-oxadiazol-3-yl]phenyl]methyl]pyrazole-4-carboxylate, wherein the weight ratio of component (A) to component (B) is from 15:1 to 1:30, preferably, wherein the weight ratio of component (A) to component (B) is from 10:1 to 1:10, or even more preferably, 5:1 to 1:5.

The term "fungicide" as used herein means a compound that controls, modifies, or prevents the growth of fungi. The term "fungicidally effective amount" means the quantity of such a compound or combination of such compounds that is capable of producing an effect on the growth offungi. Controlling or modifying effects include all deviation from natural development, such as killing, retardation and the like, and prevention includes barrier or other defensive formation in or on a plant to prevent fungal infection.

The term "plants" refers to all physical parts of a plant, including seeds, seedlings, saplings, roots, tubers, stems, stalks, foliage, and fruits.

The term "plant propagation material" denotes all generative parts of a plant, for example seeds or vegetative parts of plants such as cuttings and tubers. It includes seeds in the strict sense, as well as roots, fruits, tubers, bulbs, rhizomes, and parts of plants.

The term "locus" as used herein means fields in or on which plants are growing, or where seeds of cultivated plants are sown, or where seed will be placed into the soil. It includes soil, seeds, and seedlings, as well as established vegetation.

Throughout this document the expression "composition" stands for the various mixtures or combinations of components (A) and (B) (including the above-defined embodiments), for example in a single "ready-mix" form, in a combined spray mixture composed from separate formulations of the single active ingredient components, such as a "tank-mix", and in a combined use of the single active ingredients when applied in a sequential manner, i.e. one after the other with a reasonably short period, such as a few hours or days. The order of applying the components (A) and (B) is not essential for working the present invention.

The composition according to the invention is effective against harmful microorganisms, such as microorganisms, that cause phytopathogenic diseases, in particular against phytopathogenic fungi and bacteria.

The composition of the invention may be used to control plant diseases caused by a broad spectrum of fungal plant pathogens in the Basidiomycete, Ascomycete, Oomycete and/or Deuteromycete, Blasocladiomycete, Chrytidiomycete, Glomeromycete and/or Mucoromycete classes.

The composition is effective in controlling a broad spectrum of plant diseases, such as foliar pathogens of ornamental, turf, vegetable, field, cereal, and fruit crops.

These pathogens may include:

Oomycetes, including *Phytophthora* diseases such as those caused by *Phytophthora capsici, Phytophthora infestans, Phytophthora sojae, Phytophthora fragariae, Phytophthora nicotianae, Phytophthora cinnamomi, Phytophthora citricola, Phytophthora citrophthora* and *Phytophthora erythroseptica; Pythium* diseases such as those caused by *Pythium aphanidermatum, Pythium arrhenomanes, Pythium graminicola, Pythium irregulare* and *Pythium ultimum*; diseases caused by Peronosporales such as *Peronospora destructor, Peronospora parasitica, Plasmopara viticola, Plasmopara halstedii, Pseudoperonospora cubensis, Albugo candida, Sclerophthora macrospora* and *Bremia lactucae*; and others such as *Aphanomyces cochlioides, Labyrinthula zosterae, Peronosclerospora sorghi* and *Sclerospora graminicola;*

Ascomycetes, including blotch, spot, blast or blight diseases and/or rots for example those caused by Pleosporales such as *Stemphylium solani, Stagonospora tainanensis, Spilocaea oleaginea, Setosphaeria turcica, Pyrenochaeta lycoperisici, Pleospora herbarum, Phoma destructiva, Phaeosphaeria herpotrichoides, Phaeocryptocus gaeumannii, Ophiosphaerella graminicola, Ophiobolus graminis, Leptosphaeria maculans, Hendersonia creberrima, Helminthosporium triticirepentis, Setosphaeria turcica, Drechslera glycines, Didymella bryoniae, Cycloconium oleagineum, Corynespora cassiicola, Cochliobolus sativus, Bipolaris cactivora, Venturia inaequalis, Pyrenophora teres, Pyrenophora tritici-repentis, Alternaria alternata, Alternaria brassicicola, Alternaria solani* and *Alternaria tomatophila*, Capnodiales such as *Septoria tritici, Septoria nodorum, Septoria glycines, Cercospora arachidicola, Cercospora sojina, Cercospora zeae-maydis, Cercosporella capsellae* and *Cercosporella herpotrichoides, Cladosporium carpophilum, Cladosporium effusum, Passalora fulva, Cladosporium oxysporum, Dothistroma septosporum, Isariopsis clavispora, Mycosphaerella fijiensis, Mycosphaerella graminicola, Mycovellosiella koepkeii, Phaeoisariopsis bataticola, Pseudocercospora vitis, Pseudocercosporella herpotrichoides, Ramularia beticola, Ramularia collo-cygni*, Magnaporthales such as *Gaeumannomyces graminis, Magnaporthe grisea, Pyricularia oryzae*, Diaporthales such as *Anisogramma anomala, Apiognomonia errabunda, Cytospora platani, Diaporthe phaseolorum, Discula destructiva, Gnomonia fructicola, Greeneria uvicola, Melanconium juglandinum, Phomopsis viticola, Sirococcus clavigignenti-juglandacearum, Tubakia dryina, Dicarpella* spp., *Valsa ceratosperma*, and others such as *Actinothyrium graminis, Ascochyta pisi, Aspergillus flavus, Aspergillus fumigatus, Aspergillus nidulans, Asperisporium caricae, Blumeriella jaapii, Candida* spp., *Capnodium ramosum, Cephaloascus* spp., *Cephalosporium gramineum, Ceratocystis paradoxa, Chaetomium* spp., *Hymenoscyphus pseudoalbidus, Coccidioides* spp., *Cylindrosporium padi, Diplocarpon malae, Drepanopeziza campestris, Elsinoe ampelina, Epicoccum nigrum, Epidermophyton* spp., *Eutypa lata, Geotrichum candidum, Gibellina cerealis, Gloeocercospora sorghi, Gloeodes pomigena, Gloeosporium perennans; Gloeotinia temulenta, Griphospaeria corticola, Kabatiella lini, Leptographium microsporum, Leptosphaerulinia crassiasca, Lophodermium seditiosum, Marssonina graminicola, Microdochium nivale, Monilinia fructicola, Monographella albescens, Mono-*

*sporascus cannonballus*, *Naemacyclus* spp., *Ophiostoma* novo-*ulmi*, *Paracoccidioides brasiliensis*, *Penicillium expansum*, *Pestalotia rhododendri*, *Petriellidium* spp., *Pezicula* spp., *Phialophora gregata*, *Phyllachora pomigena*, *Phymatotrichum omnivora*, *Physalospora abdita*, *Plectosporium tabacinum*, *Polyscytalum pustulans*, *Pseudopeziza medicaginis*, *Pyrenopeziza brassicae*, *Ramulispora sorghi*, *Rhabdocline pseudotsugae*, *Rhynchosporium secalis*, *Sacrocladium oryzae*, *Scedosporium* spp., *Schizothyrium pomi*, *Sclerotinia sclerotiorum*, *Sclerotinia minor; Sclerotium* spp., *Typhula ishikariensis*, *Seimatosporium mariae*, *Lepteutypa cupressi*, *Septocyta ruborum*, *Sphaceloma perseae*, *Sporonema phacidioides*, *Stigmina palmivora*, *Tapesia yallundae*, *Taphrina bullata*, *Thielviopsis basicola*, *Trichoseptoria fructigena*, *Zygophiala jamaicensis; powdery mildew diseases for example those caused by Erysiphales such as Blumeria graminis*, *Erysiphe polygoni*, *Uncinula necator*, *Sphaerotheca fuligena*, *Podosphaera leucotricha*, *Podospaera macularis Golovinomyces cichoracearum*, *Leveillula taurica*, *Microsphaera diffusa*, *Oidiopsis gossypii*, *Phyllactinia guttata* and *Oidium arachidis*; molds for example those caused by Botryosphaeriales such as *Dothiorella aromatica*, *Diplodia seriata*, *Guignardia bidwellii*, *Botrytis cinerea*, *Botryotinia allii*, *Botryotinia fabae*, *Fusicoccum amygdali*, *Lasiodiplodia theobromae*, *Macrophoma theicola*, *Macrophomina phaseolina*, *Phyllosticta cucurbitacearum*; anthracnoses for example those caused by Glommerelales such as *Colletotrichum gloeosporioides*, *Colletotrichum lagenarium*, *Colletotrichum gossypii*, *Glomerella cingulata*, and *Colletotrichum graminicola*; and wilts or blights for example those caused by Hypocreales such as *Acremonium strictum*, *Claviceps purpurea*, *Fusarium culmorum*, *Fusarium graminearum*, *Fusarium virguliforme*, *Fusarium oxysporum*, *Fusarium subglutinans*, *Fusarium oxysporum* f. sp. *cubense*, *Gerlachia nivale*, *Gibberella fujikuroi*, *Gibberella zeae*, *Gliocladium* spp., *Myrothecium* verrucaria, *Nectria ramulariae*, *Trichoderma viride*, *Trichothecium roseum*, and *Verticillium theobromae;*

Basidiomycetes, including smuts for example those caused by Ustilaginales such as *Ustilaginoidea virens*, *Ustilago nuda*, *Ustilago tritici*, *Ustilago zeae*, rusts for example those caused by Pucciniales such as *Cerotelium fici*, *Chrysomyxa arctostaphyli*, *Coleosporium ipomoeae*, *Hemileia vastatrix*, *Puccinia arachidis*, *Puccinia cacabata*, *Puccinia graminis*, *Puccinia recondita*, *Puccinia sorghi*, *Puccinia hordei*, *Puccinia striiformis* f. sp. *Hordei*, *Puccinia striiformis* f. sp. Secalis, *Pucciniastrum coryli*, or Uredinales such as *Cronartium ribicola*, *Gymnosporangium juniperi-viginianae*, *Melampsora medusae*, *Phakopsora pachyrhizi*, *Phragmidium mucronatum*, *Physopella ampelosidis*, *Tranzschelia discolor* and *Uromyces viciae-fabae*; and other rots and diseases such as those caused by *Cryptococcus* spp., *Exobasidium vexans*, *Marasmiellus inoderma*, *Mycena* spp., *Sphacelotheca reiliana*, *Typhula ishikariensis*, *Urocystis agropyri*, *Itersonilia perplexans*, *Corticium invisum*, *Laetisaria fuciformis*, *Waitea circinata*, *Rhizoctonia solani*, *Thanetephorus cucurmeris*, *Entyloma dahliae*, *Entylomella microspora*, *Neovossia moliniae* and *Tilletia* caries;

Blastocladiomycetes, such as *Physoderma maydis;*

Mucoromycetes, such as *Choanephora cucurbitarum; Mucor* spp.; *Rhizopus arrhizus*; as well as diseases caused by other species and genera closely related to those listed above.

In addition to their fungicidal activity, the compositions may also have activity against bacteria such as *Erwinia amylovora*, *Erwinia caratovora*, *Xanthomonas campestris*, *Pseudomonas syringae*, Strptomyces scabies and other related species as well as certain protozoa.

The composition according to the invention is particularly effective against phytopathogenic fungi belonging to the following classes: Ascomycetes (e.g. *Venturia*, *Podosphaera*, *Erysiphe*, *Monilinia*, *Mycosphaerella*, *Uncinula*); Basidiomycetes (e.g. the genus *Hemileia*, *Rhizoctonia*, *Phakopsora*, *Puccinia*, *Ustilago*, *Tilletia*); Fungi *imperfecti* (also known as Deuteromycetes; e.g. *Botrytis*, *Helminthosporium*, *Rhynchosporium*, *Fusarium*, *Septoria*, *Cercospora*, *Alternaria*, *Pyricularia* and *Pseudocercosporella*); Oomycetes (e.g. *Phytophthora*, *Peronospora*, *Pseudoperonospora*, *Albugo*, *Bremia*, *Pythium*, *Pseudosclerospora*, *Plasmopara*).

Crops of useful plants in which the composition according to the invention can be used include perennial and annual crops, such as berry plants for example blackberries, blueberries, cranberries, raspberries and strawberries; cereals for example barley, maize (corn), millet, oats, rice, rye, sorghum triticale and wheat; fibre plants for example cotton, flax, hemp, jute and sisal; field crops for example sugar and fodder beet, coffee, hops, mustard, oilseed rape (canola), poppy, sugar cane, sunflower, tea and tobacco; fruit trees for example apple, apricot, avocado, banana, cherry, citrus, nectarine, peach, pear and plum; grasses for example Bermuda grass, bluegrass, bentgrass, centipede grass, fescue, ryegrass, St. Augustine grass and *Zoysia* grass; herbs such as basil, borage, chives, coriander, lavender, lovage, mint, oregano, parsley, rosemary, sage and thyme; legumes for example beans, lentils, peas and soya beans; nuts for example almond, cashew, ground nut, hazelnut, peanut, pecan, pistachio and walnut; palms for example oil palm; ornamentals for example flowers, shrubs and trees; other trees, for example cacao, coconut, olive and rubber; vegetables for example asparagus, aubergine, broccoli, cabbage, carrot, cucumber, garlic, lettuce, marrow, melon, okra, onion, pepper, potato, pumpkin, rhubarb, spinach and tomato; and vines for example grapes.

Crops are to be understood as being those which are naturally occurring, obtained by conventional methods of breeding, or obtained by genetic engineering. They include crops which contain so-called output traits (e.g. improved storage stability, higher nutritional value and improved flavour).

Crops are to be understood as also including those crops which have been rendered tolerant to herbicides like bromoxynil or classes of herbicides such as ALS-, EPSPS-, GS-, HPPD- and PPO-inhibitors. An example of a crop that has been rendered tolerant to imidazolinones, e.g. imazamox, by conventional methods of breeding is Clearfield® summer canola. Examples of crops that have been rendered tolerant to herbicides by genetic engineering methods include e.g. glyphosate- and glufosinate-resistant maize varieties commercially available under the trade names RoundupReady®, Herculex I® and LibertyLink®.

Crops are also to be understood as being those which naturally are or have been rendered resistant to harmful insects. This includes plants transformed by the use of recombinant DNA techniques, for example, to be capable of synthesising one or more selectively acting toxins, such as are known, for example, from toxin-producing bacteria. Examples of toxins which can be expressed include 6-endotoxins, vegetative insecticidal proteins (Vip), insecticidal proteins of bacteria colonising nematodes, and toxins produced by scorpions, arachnids, wasps and fungi.

An example of a crop that has been modified to express the *Bacillus thuringiensis* toxin is the Bt maize KnockOut® (Syngenta Seeds). An example of a crop comprising more than one gene that codes for insecticidal resistance and thus expresses more than one toxin is VipCot® (Syngenta Seeds). Crops or seed material thereof can also be resistant to multiple types of pests (so-called stacked transgenic events when created by genetic modification). For example, a plant can have the ability to express an insecticidal protein while at the same time being herbicide tolerant, for example Herculex I® (Dow AgroSciences, Pioneer Hi-Bred International).

The term "useful plants" is to be understood as including also useful plants which have been so transformed by the use of recombinant DNA techniques that they are capable of synthesising one or more selectively acting toxins, such as are known, for example, from toxin-producing bacteria, especially those of the genus *Bacillus*.

Examples of such plants are: YieldGard® (maize variety that expresses a CryIA(b) toxin); YieldGard Rootworm® (maize variety that expresses a CrylllB(b1) toxin); YieldGard Plus® (maize variety that expresses a CryIA(b) and a CryIIIB(b1) toxin); Starlink® (maize variety that expresses a Cry9(c) toxin); Herculex I® (maize variety that expresses a CryIF(a2) toxin and the enzyme phosphinothricine N-acetyltransferase (PAT) to achieve tolerance to the herbicide glufosinate ammonium); NuCOTN 33B® (cotton variety that expresses a CryIA(c) toxin); Bollgard I® (cotton variety that expresses a CryIA(c) toxin); Bollgard I1 (cotton variety that expresses a CryIA(c) and a CryllA(b) toxin); VIPCOT® (cotton variety that expresses a VIP toxin); NewLeaf® (potato variety that expresses a CrylliA toxin); NatureGard® Agrisure® GT Advantage (GA21 glyphosate-tolerant trait), Agrisure® CB Advantage (Bt11 corn borer (CB) trait), Agrisure® RW (corn rootworm trait) and Protecta®.

The term "crops" is to be understood as including also crop plants which have been so transformed by the use of recombinant DNA techniques that they are capable of synthesising one or more selectively acting toxins, such as are known, for example, from toxin-producing bacteria, especially those of the genus *Bacillus.*

Toxins that can be expressed by such transgenic plants include, for example, insecticidal proteins from *Bacillus cereus* or *Bacillus popilliae*; or insecticidal proteins from *Bacillus thuringiensis*, such as 8-endotoxins, e.g. Cry1Ab, Cry1Ac, Cry1F, Cry1Fa2, Cry2Ab, Cry3A, Cry3Bb1 or Cry9C, or vegetative insecticidal proteins (Vip), e.g. Vip1, Vip2, Vip3 or Vip3A; or insecticidal proteins of bacteria colonising nematodes, for example *Photorhabdus* spp. or *Xenorhabdus* spp., such as *Photorhabdus luminescens, Xenorhabdus nematophilus*; toxins produced by animals, such as scorpion toxins, arachnid toxins, wasp toxins and other insect-specific neurotoxins; toxins produced by fungi, such as Streptomycetes toxins, plant lectins, such as pea lectins, barley lectins or snowdrop lectins; agglutinins; proteinase inhibitors, such as trypsin inhibitors, serine protease inhibitors, patatin, cystatin, papain inhibitors; ribosome-inactivating proteins (RIP), such as ricin, maize-RIP, abrin, luffin, saporin or bryodin; steroid metabolism enzymes, such as 3-hydroxysteroidoxidase, ecdysteroid-UDP-glycosyl-transferase, cholesterol oxidases, ecdysone inhibitors, HMG-COA-reductase, ion channel blockers, such as blockers of sodium or calcium channels, juvenile hormone esterase, diuretic hormone receptors, stilbene synthase, bibenzyl synthase, chitinases and glucanases.

In the context of the present invention there are to be understood by 6-endotoxins, for example Cry1Ab, Cry1Ac, Cry1F, CrylFa2, Cry2Ab, Cry3A, Cry3Bb1 or Cry9C, or vegetative insecticidal proteins (Vip), for example Vip1, Vip2, Vip3 or Vip3A, expressly also hybrid toxins, truncated toxins and modified toxins. Hybrid toxins are produced recombinantly by a new combination of different domains of those proteins (see, for example, WO 02/15701). Truncated toxins, for example a truncated Cry1Ab, are known. In the case of modified toxins, one or more amino acids of the naturally occurring toxin are replaced. In such amino acid replacements, preferably non-naturally present protease recognition sequences are inserted into the toxin, such as, for example, in the case of Cry3A055, a cathepsin-G-recognition sequence is inserted into a Cry3A toxin (see WO 03/018810).

Examples of such toxins or transgenic plants capable of synthesising such toxins are disclosed, for example, in EP-A-0 374 753, WO 93/07278, WO 95/34656, EP-A-0 427 529, EP-A-451 878 and WO 03/052073.

The processes for the preparation of such transgenic plants are generally known to the person skilled in the art and are described, for example, in the publications mentioned above. CryI-type deoxyribonucleic acids and their preparation are known, for example, from WO 95/34656, EP-A-0 367 474, EP-A-0 401 979 and WO 90/13651.

The toxin contained in the transgenic plants imparts to the plants tolerance to harmful insects. Such insects can occur in any taxonomic group of insects, but are especially commonly found in the beetles (Coleoptera), two-winged insects (Diptera) and butterflies (Lepidoptera).

Transgenic plants containing one or more genes that code for an insecticidal resistance and express one or more toxins are known and some of them are commercially available. Examples of such plants are: YieldGard® (maize variety that expresses a Cry1Ab toxin); YieldGard Rootworm® (maize variety that expresses a Cry3Bb1 toxin); YieldGard Plus® (maize variety that expresses a Cry1Ab and a Cry3Bb1 toxin); Starlink® (maize variety that expresses a Cry9C toxin); Herculex 1® (maize variety that expresses a CrylFa2 toxin and the enzyme phosphinothricine N-acetyltransferase (PAT) to achieve tolerance to the herbicide glufosinate ammonium); NuCOTN 33B® (cotton variety that expresses a CrylAc toxin); Bollgard 1® (cotton variety that expresses a Cry1Ac toxin); Bollgard I1 (cotton variety that expresses a Cry1Ac and a Cry2Ab toxin); VipCot® (cotton variety that expresses a Vip3A and a Cry1Ab toxin); NewLeaf® (potato variety that expresses a Cry3A toxin); NatureGard®, Agrisure® GT Advantage (GA21 glyphosate-tolerant trait), Agrisure® CB Advantage (Bt11 corn borer (CB) trait) and Protecta®.

Further examples of such transgenic crops are:

1. Bt11 Maize from Syngenta Seeds SAS, Chemin de l'Hobit 27, F-31 790 St. Sauveur, France, registration number C/FR/96/05/10. Genetically modified *Zea mays* which has been rendered resistant to attack by the European corn borer (*Ostrinia nubilalis* and Sesamia nonagrioides) by transgenic expression of a truncated Cry1Ab toxin. Bt11 maize also transgenically expresses the enzyme PAT to achieve tolerance to the herbicide glufosinate ammonium.
2. Bt176 Maize from Syngenta Seeds SAS, Chemin de l'Hobit 27, F-31 790 St. Sauveur, France, registration number C/FR/96/05/10. Genetically modified *Zea mays* which has been rendered resistant to attack by the European corn borer (*Ostrinia nubilalis* and Sesamia nonagrioides) by transgenic expression of a Cry1Ab toxin. Bt176 maize also transgenically expresses the enzyme PAT to achieve tolerance to the herbicide glufosinate ammonium.

3. MIR604 Maize from Syngenta Seeds SAS, Chemin de l'Hobit 27, F-31 790 St. Sauveur, France, registration number C/FR/96/05/10. Maize which has been rendered insect-resistant by transgenic expression of a modified Cry3A toxin. This toxin is Cry3A055 modified by insertion of a cathepsin-G-protease recognition sequence. The preparation of such transgenic maize plants is described in WO 03/018810.
4. MON 863 Maize from Monsanto Europe S.A. 270-272 Avenue de Tervuren, B-1150 Brussels, Belgium, registration number C/DE/02/9. MON 863 expresses a Cry3Bb1 toxin and has resistance to certain Coleoptera insects.
5. IPC 531 Cotton from Monsanto Europe S.A. 270-272 Avenue de Tervuren, B-1150 Brussels, Belgium, registration number C/ES/96/02.
6. 1507 Maize from Pioneer Overseas Corporation, Avenue Tedesco, 7 B-1160 Brussels, Belgium, registration number C/NL/00/10. Genetically modified maize for the expression of the protein Cry1F for achieving resistance to certain Lepidoptera insects and of the PAT protein for achieving tolerance to the herbicide glufosinate ammonium.
7. NK603×MON 810 Maize from Monsanto Europe S.A. 270-272 Avenue de Tervuren, B-1150 Brussels, Belgium, registration number C/GB/02/M3/03. Consists of conventionally bred hybrid maize varieties by crossing the genetically modified varieties NK603 and MON 810. NK603×MON 810 Maize transgenically expresses the protein CP4 EPSPS, obtained from *Agrobacterium* sp. strain CP4, which imparts tolerance to the herbicide Roundup® (contains glyphosate), and also a Cry1Ab toxin obtained from *Bacillus thuringiensis* subsp. kurstaki which brings about tolerance to certain Lepidoptera, include the European corn borer.

Additionally, to date, no cross-resistance has been observed between the composition comprising a mixture of components (A) and (B) and any fungicidal solutions used to control phytopathogenic fungi such as *Absidia corymbifera, Alternaria* spp, *Aphanomyces* spp, *Ascochyta* spp, *Aspergillus* spp. including *A. flavus, A. fumigatus, A. nidulans, A. niger, A. terrus, Aureobasidium* spp. including *A. pullulans, Blastomyces dermatitidis, Blumeria graminis, Bremia lactucae, Botryosphaeria* spp. including *B. dothidea, B. obtusa, Botrytis* spp. including *B. cinerea, Candida* spp. including *C. albicans, C. glabrata, C. krusei, C. lusitaniae, C. parapsilosis, C. tropicalis, Cephaloascus fragrans, Ceratocystis* spp, *Cercospora* spp. including *C. arachidicola, Cercosporidium personatum, Cladosporium* spp, *Claviceps purpurea, Coccidioides immitis, Cochliobolus* spp, *Colletotrichum* spp. including *C. musae, Cryptococcus neoformans, Diaporthe* spp, *Didymella* spp, *Drechslera* spp, *Elsinoe* spp, *Epidermophyton* spp, *Erwinia amylovora, Erysiphe* spp. including *E. cichoracearum, Eutypa lata, Fusarium* spp. including *F. culmorum, F. graminearum, F. langsethiae, F. moniliforme, F. oxysporum, F. proliferatum, F. subglutinans, F. solani, Gaeumannomyces graminis, Gibberella fujikuroi, Gloeodes pomigena, Gloeosporium musarum, Glomerella cingulate, Guignardia bidwellii, Gymnosporangium juniperi-virginianae, Helminthosporium* spp, *Hemileia* spp, *Histoplasma* spp. including *H. capsulatum, Laetisaria fuciformis, Leptographium lindbergi, Leveillula taurica, Lophodermium seditiosum, Microdochium nivale, Microsporum* spp, *Monilinia* spp, *Mucor* spp, *Mycosphaerella* spp. including *M. graminicola, M. pomi, Oncobasidium theobromaeon, Ophiostoma piceae, Paracoccidioides* spp, *Penicillium* spp. including *P. digitatum, P. italicum, Petriellidium* spp, *Peronosclerospora* spp. Including *P. maydis, P. philippinensis* and *P. sorghi, Peronospora* spp, *Phaeosphaeria nodorum, Phakopsora pachyrhizi, Phellinus igniarus, Phialophora* spp, *Phoma* spp, *Phomopsis viticola, Phytophthora* spp. including *P. infestans, Plasmopara* spp. including *P. halstedii, P. viticola, Pleospora* spp., *Podosphaera* spp. including *P. leucotricha, Polymyxa graminis, Polymyxa betae, Pseudocercosporella herpotrichoides, Pseudomonas* spp, *Pseudoperonospora* spp. including *P. cubensis, P. humuli, Pseudopeziza tracheiphila, Puccinia* Spp. including *P. hordei, P. recondita, P. striiformis, P. triticina, Pyrenopeziza* spp, *Pyrenophora* spp, *Pyricularia* spp. including *P. oryzae, Pythium* spp. including *P. ultimum, Ramularia* spp, *Rhizoctonia* spp, *Rhizomucor pusillus, Rhizopus arrhizus, Rhynchosporium* spp, *Scedosporium* spp. including *S. apiospermum* and *S. prolificans, Schizothyrium pomi, Sclerotinia* spp, *Sclerotium* spp, *Septoria* spp, including *S. nodorum, S. tritici, Sphaerotheca macularis, Sphaerotheca fusca* (*Sphaerotheca fuliginea*), *Sporothorix* spp, *Stagonospora nodorum, Stemphylium* spp., *Stereum hirsutum, Thanatephorus cucumeris, Thielaviopsis basicola, Tilletia* spp, *Trichoderma* spp., including *T. harzianum, T. pseudokoningii, T. viride, Trichophyton* spp, *Typhula* spp, *Uncinula necator, Urocystis* spp, *Ustilago* spp, *Venturia* spp. including *V. inaequalis, Verticillium* spp, and *Xanthomonas* spp., in particular, *Zymoseptoria tritici, Puccinia recondita, Puccinia striiformis, Erysiphe graminis, Uncinula necator, Sphaerotheca fuliginea, Leveillula taurica, Phakopsora pachyrhizi, Pyricularia oryzae, Alternaria solani, Altemaria alternata, Mycosphaerella fijiensis, Colletotrichum lagenarium, Didymella bryoniae, Ascochyta pisii, Verticillium dahliae, Pyrenophora teres, Cercospora beticola, Ramularia collo-cygni, Botrytis cinerea, Sclerotinia sclerotiorum, Monilinia laxa, Monographaella nivalis* and *Venturia inaequalis.*

Indeed, fungicidal-resistant strains in any of the species as outlined above have been reported in the scientific literature, with strains resistant to one or more fungicides from at least one of the following fungicidal mode of action classes: quinone-outside-inhibitors (Qol), quinone-inside-inhibitors (Qil), succinate dehydrogenase inhibitors (SDHI) and sterol demethylation-inhibitors (DMI). Such fungicidal-resistant strains may contain:

- A mutation in the mitochondrial cytochrome b gene conferring resistance to Qo inhibitors, wherein the mutation is G143A, F129L or G137R. See for example: Gisi et al., Pest Manag Sci 56, 833-841, (2000), Lucas, Pestic Outlook 14(6), 268-70 (2003), Fraaije et al., Phytopathol 95(8), 933-41 (2005), Sierotzki et al., Pest Manag Sci 63(3), 225-233 (2007), Semar et al., Journal of Plant Diseases and Protection (3), 117-119 (2007); and Pasche et al., Crop Protection 27(3-5), 427-435 (2008).
- A mutation in the mitochondrial cytochrome b gene conferring resistance to Qi inhibitors, wherein the mutation is G37A/C/D/S/V. See for example: Meunier et al., Pest Manag Sci 2019; 75: 2107-2114.
- A mutation in the genes encoding the SdhB,C,D subunits conferring resistance to SDHI inhibitors wherein the mutation is in the following major pathogens:

*Botrytis cinerea*: B-P225H/L/T/Y/F, B-N2301, B-H272L/Y/R, C-P80H/L, C-N87S;

*Alternaria solani*: B-H278R/Y, C-H134R/Q, D-D123E, D-H133R and C—H134R;

*Zymoseptoria tritici*: sdhB: N225T, N2251, R265P, T2681, T268A. In sdhC: T79N, T791, W80S, W80A, A84F, N86S, N86A, P127A, R151M/S/T/G, R151S, R151T, H152R/Y, V166M, T168R. In sdhD: I50F, M114V, D129G, T20P+K186R;

*Pyrenophora teres*: In sdhB: S66P, N2351, H277Y. In sdhC: K49E, R64K, N75S, G79R, H134R, S135R. In sdhD: D124E, H134R, G138V, D145G;

*Ramularia collo-cymni*: In sdhB: N224T, T2671. In sdhC: N87S, G91R, H146R/L, G171D, H153R;

*Phakopsora pachyrhizi*: C-186F;

*Sclerotinia sclerotiorum*: In sdhB: H273Y. In sdhC: G91R, H146R. In sdhD: T108K, H132R, G150R.

Major source of information is www.frac.info, Sierotzki and Scalliet Phytopathology (2013) 103(9): 880-887 and Simões et al., J Plant Dis Prot (2018) 125: 21-2.

A mutation or combination of mutations in the CYP51 gene conferring resistance to DMI inhibitors wherein the mutations are: L50S, D134G, V136A/C, Y137F, S188N, A379G, 1381V, deletion 459-460, Y461H/S, N513K, S524T. Major source of information is www.frac.info, Cools et al., Plant Pathol (2013) 62: 36-42 and Schmitz H K et al., Pest Manag Sci (2014) 70: 378-388.

Thus, in a preferred embodiment, the compositions according to the present invention comprising a mixture of components (A) and (B), are used to control fungal strains which are resistant to one or more fungicides from any of the following fungicidal MoA classes: quinone-outside-inhibitors (QoI), quinone-inside-inhibitors (QiI), succinate dehydrogenase inhibitors (SDHI) and sterol demethylation-inhibitors (DMI).

Compounds of the present invention can be made as shown in the following schemes, in which, unless otherwise stated, the definition of each variable is as defined above for a compound of formula (I).

The compounds of formula (I) according to the invention, wherein $R^1$, $R^2$, $R^3$, X and Y are as defined for formula (I), can be obtained by transformation of a compound of formula (II), wherein $R^2$, $R^3$, X and Y are as defined for formula (I), with a compound of formula (111), wherein $R^1$ is as defined for formula (I) and $R^{12}$ is halogen, preferably chloro, either by thermal heating, or with the aid of a base. This is shown in Scheme 1 below.

Scheme 1

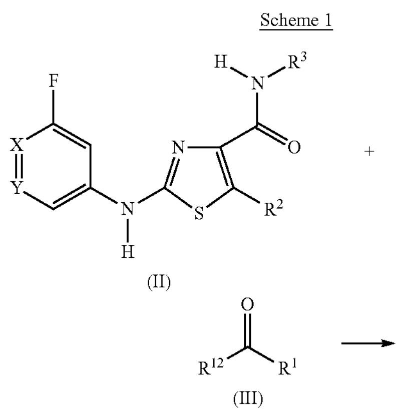

(II)

(III)

-continued

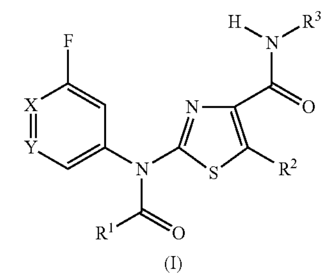

(I)

The compounds of formula (II), wherein $R^2$, $R^3$, X and Y are as defined for formula (I), can be obtained by transformation of a compound of formula (IV), wherein X and Y are as defined for formula (I), with a compound of formula (V), wherein $R^2$ and $R^3$ are as defined for formula (I) and $R^{13}$ is halogen, preferably bromo, either by thermal heating, or with the aid of a base or under the conditions of the transition metal catalysed Buchwald-Hartwig amination. This is shown in Scheme 2 below.

Scheme 2

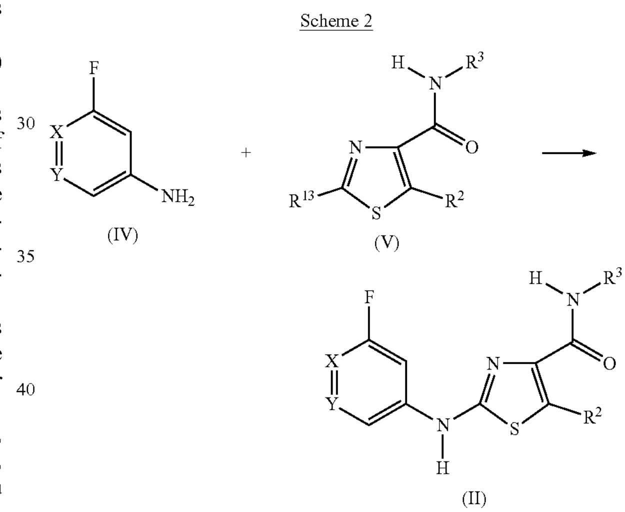

(IV)

(V)

(II)

The compounds of formula (V), wherein $R^2$ and $R^3$ are as defined for formula (I) and $R^{13}$ is halogen, preferably bromo, can be obtained by transformation of a compound of formula (VI), wherein $R^2$ is as defined for formula (I) and $R^{13}$ is halogen, preferably bromo, and a compound of formula (VII), wherein $R^3$ is as defined for formula (I), either via an intermediate acid chloride or directly with a peptide coupling agent. This is shown in Scheme 3 below.

Scheme 3

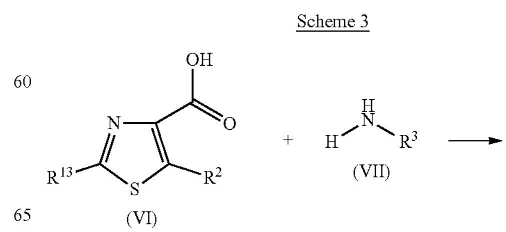

(VI)

(VII)

-continued

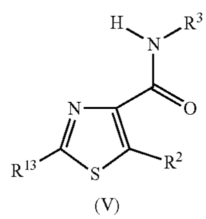

(V)

The compounds of formula (VI), wherein $R^2$ is as defined for formula (I) and $R^{13}$ is halogen, preferably bromo, can be obtained by transformation of a compound of formula (VIII), wherein $R^2$ is as defined for formula (I), $R^{13}$ is halogen, preferably bromo, and $R^{14}$ is $C_1$-$C_6$alkyl, and a base. This is shown in Scheme 4 below.

Scheme 4

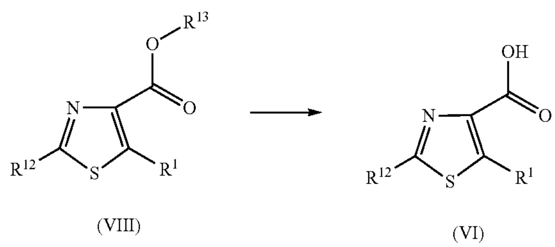

(VIII) (VI)

Alternatively, the compounds of formula (II), wherein $R^2$, $R^3$, X and Y are as defined for formula (I), can be obtained by transformation of a compound of formula (IX), wherein $R^2$, X and Y are as defined for formula (I), with a compound of formula (VII), wherein $R^3$ is as defined for formula (I), either via an intermediate acid chloride or directly with an peptide coupling agent. This is shown in Scheme 5 below.

Scheme 5

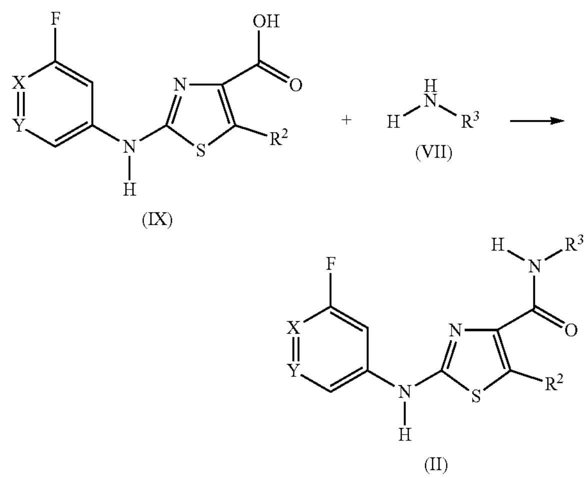

(IX) (VII) (II)

The compounds of formula (IX), wherein $R^2$, X and Y are as defined for formula (I), can be obtained by transformation of a compound of formula (X), wherein $R^2$, X and Y are as defined for formula (I) and $R^{14}$ is $C_1$-$C_6$alkyl, with a base. This is shown in Scheme 6 below.

Scheme 6

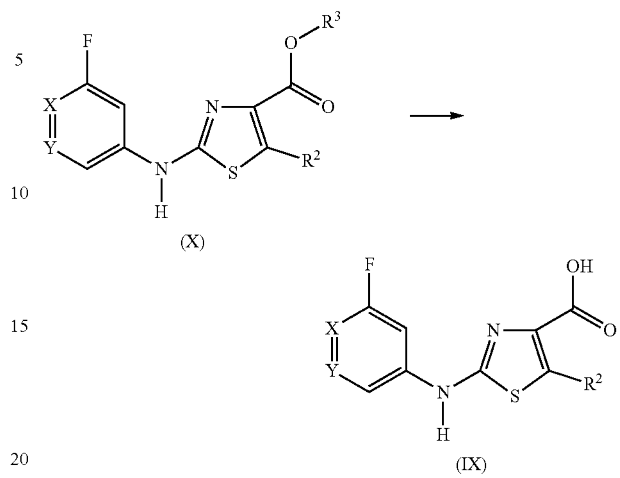

(X) (IX)

The compounds of formula (X), wherein $R^2$, X, and Y are as defined for formula (I) and $R^{14}$ is $C_1$-$C_6$alkyl, can be obtained by transformation of a compound of formula (IV), wherein X and Y are as defined for formula (I), with a compound of formula (VII), wherein $R^2$ is as defined for formula (I), $R^{12}$ is halogen, preferably bromo, and $R^{13}$ is $C_1$-$C_6$alkyl, either by thermal heating, or with the aid of a base or under the conditions of the transition metal catalysed Buchwald-Hartwig amination. This is shown in Scheme 7 below.

Scheme 7

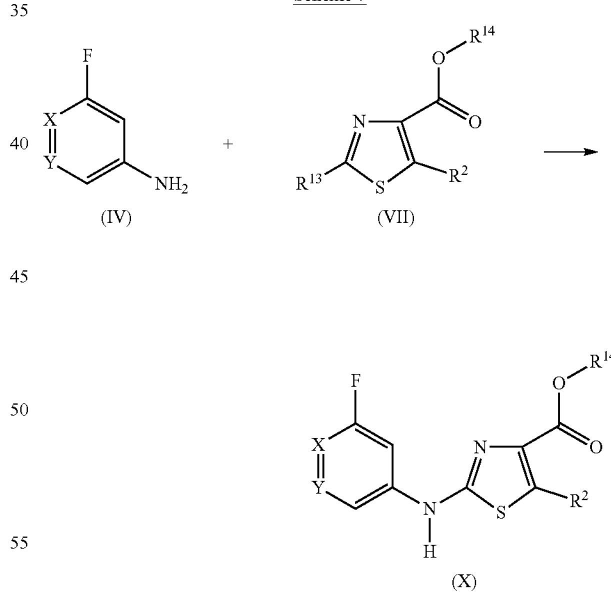

(IV) (VII) (X)

Alternatively, the compounds of formula (X), wherein $R^2$, X and Y are as defined for formula (I) and $R^{14}$ is $C_1$-$C_6$alkyl, can be obtained by transformation of a compound of formula (XI), wherein X and Y are as defined for formula (I) and $R^{13}$ is halogen, preferably bromo or iodo, with a compound of formula (XII), wherein $R^2$ is as defined for formula (I) and $R^{14}$ is $C_1$-$C_6$alkyl, under the conditions of the transition metal catalysed Buchwald-Hartwig amination. This is shown in Scheme 8 below.

Scheme 8

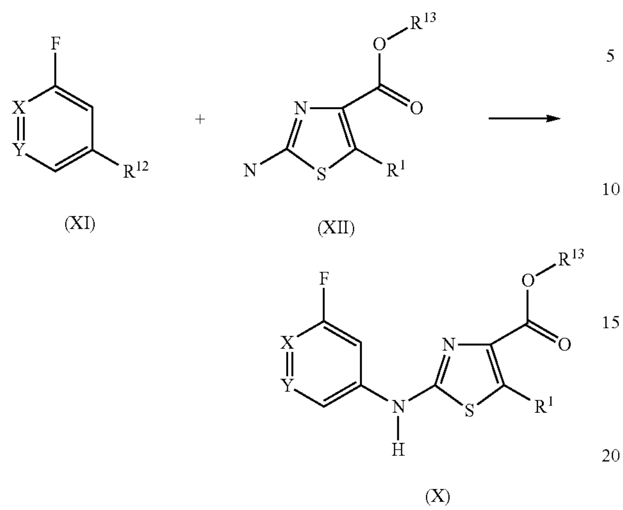

(XI) (XII) (X)

Alternatively, the compounds of formula (II), wherein $R^2$, $R^3$, X and Y are as defined for formula (I), can be obtained by transformation of a compound of formula (XI), wherein X and Y are as defined for formula (I) and $R^{13}$ is halogen, preferably bromo or iodo, with a compound of formula (XIII), wherein $R^2$ and $R^3$ are as defined for formula (I), either by thermal heating, or with the aid of a base or under the conditions of the transition metal catalysed Buchwald-Hartwig amination. This is shown in Scheme 9 below.

Scheme 9

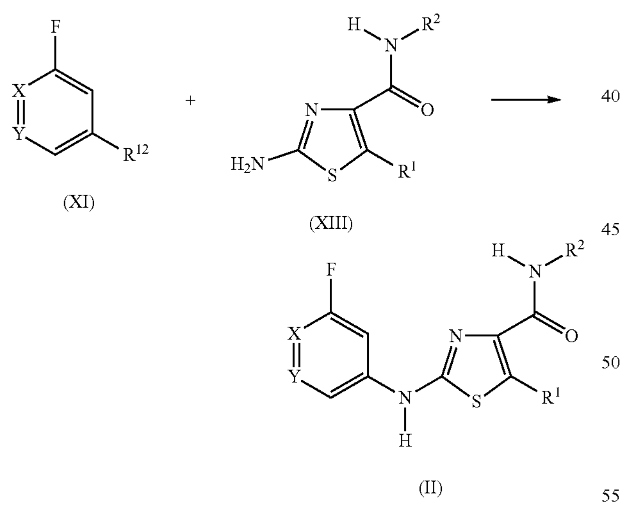

(XI) (XIII) (II)

Alternatively, the compounds of formula (I) according to the invention, wherein $R^1$, $R^2$, $R^3$, X and Y are as defined for formula (I), can be obtained by transformation of a compound of formula (V), wherein $R^2$ and $R^3$ are as defined for formula (I) and $R^{13}$ is halogen, preferably bromo, with a compound of formula (XIV), wherein $R^1$, X and Y are as defined for formula (I) either by thermal heating, or with the aid of a base or under the conditions of the transition metal catalysed Buchwald-Hartwig amination. This is shown in Scheme 10 below.

Scheme 10

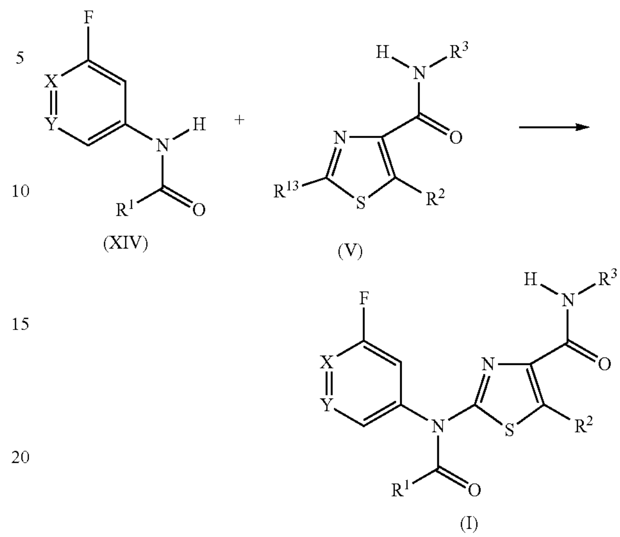

(XIV) (V) (I)

The compounds of formula (XIV), wherein $R^1$, X and Y are as defined for formula (I), can be obtained by transformation of a compound of formula (XV), wherein X and Y are as defined for formula (I), with a compound of formula (III), wherein $R^1$ is as defined for formula (I) and $R^{12}$ is halogen, preferably chloro, either by thermal heating, or with the aid of a base. This is shown in Scheme 11 below.

Scheme 11

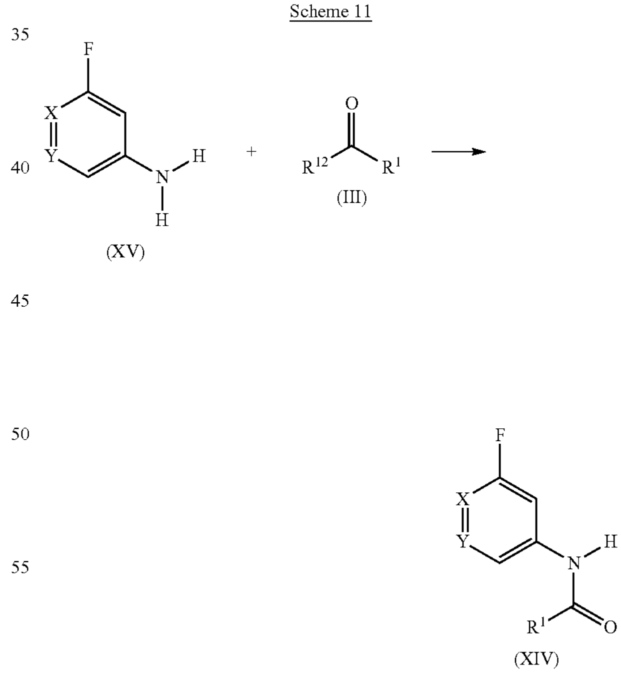

(XV) (III) (XIV)

Alternatively, the compounds of formula (I), wherein $R^1$, $R^2$, $R^3$, X and Y are as defined for formula (I), can be obtained by transformation of a compound of formula (XVI), wherein $R^1$, $R^2$, X and Y are as defined for formula (I), with a compound of formula (VII), wherein $R^3$ is as defined for formula (I), either by thermal heating, or with the aid of a base. This is shown in Scheme 12 below.

Scheme 12

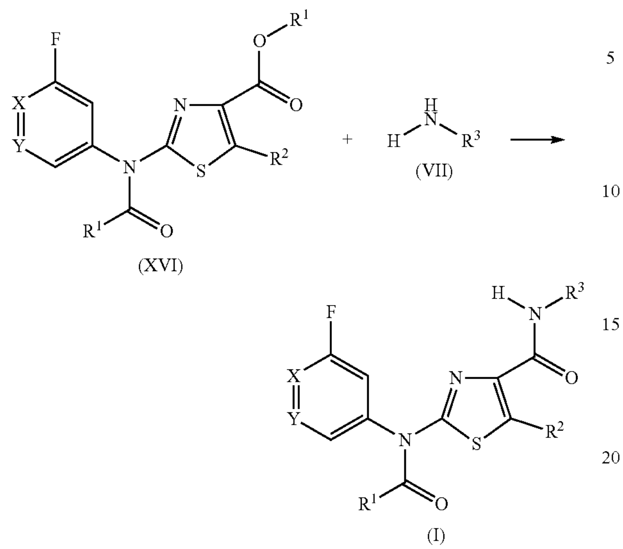

(XVI) (VII) (I)

The compounds of formula (XVI), wherein $R^1$, $R^2$, X and Y are as defined for formula (I), can be obtained by transformation of a compound of formula (IX), wherein $R^2$, X and Y are as defined for formula (I), with a compound of formula (III), wherein $R^1$ is as defined for formula (I) and $R^{12}$ is halogen, preferably chloro, either by thermal heating, or with the aid of a base. This is shown in Scheme 13 below.

Scheme 13

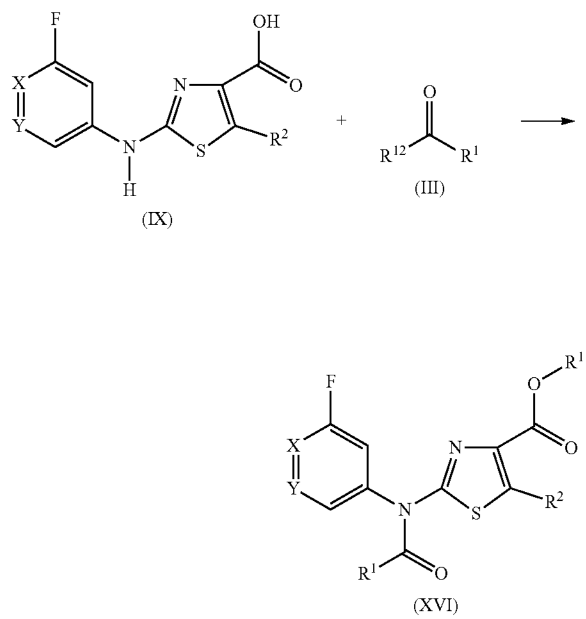

(IX) (III) (XVI)

Alternatively, the compounds of formula (XVI), wherein $R^1$, $R^2$, X and Y are as defined for formula (I), can be obtained by transformation of a compound of formula (IX), wherein $R^2$, X and Y are as defined for formula (I), with a compound of formula (XVII), wherein $R^1$ is as defined for formula (I), either by thermal heating, or with the aid of a base. This is shown in Scheme 14 below.

Scheme 14

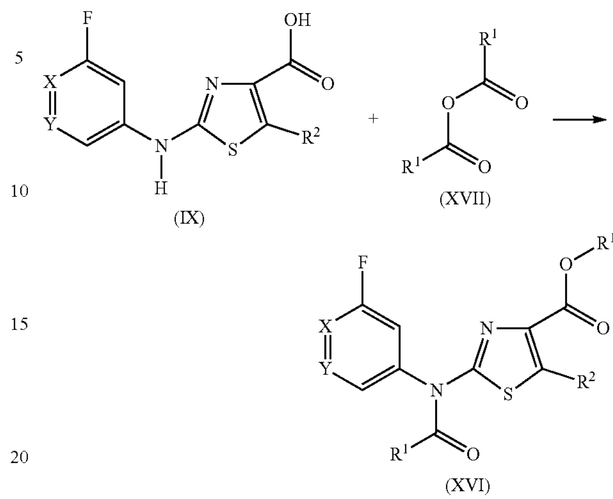

(IX) (XVII) (XVI)

Compositions of this invention, including all of the above disclosed embodiments and preferred examples thereof, can be mixed with one or more further pesticides including further fungicides, insecticides, nematocides, bactericides, acaricides, growth regulators, chemosterilants, semiochemicals, repellents, attractants, pheromones, feeding stimulants or other biologically active compounds to form a multi-component pesticide giving an even broader spectrum of agricultural protection.

Examples of such agricultural protectants with which the composition of this invention can be formulated are: Fungicides such as etridiazole, fluazinam, benalaxyl, benalaxyl-M (kiralaxyl), furalaxyl, metalaxyl, metalaxyl-M (mefenoxam), dodicin, N'-(2,5-dimethyl-4-phenoxy-phenyl)-N-ethyl-N-methyl-formamidine, N'-[4-(4,5-dichloro-thiazol-2-yloxy)-2,5-dimethyl-phenyl]-N-ethyl-N-methyl-formamidine, N'-[4-[[3-[(4-chlorophenyl)methyl]-1,2,4-thiadiazol-5-yl]oxy]-2,5-dimethyl-phenyl]-N-ethyl-N-methyl-formamidine, ethirimol, 3'-chloro-2-methoxy-N-[(3RS)-tetrahydro-2-oxofuran-3-yl]acet-2',6'-xylidide (clozylacon), cyprodinil, mepanipyrim, pyrimethanil, dithianon, aureofungin, blasticidin-S, biphenyl, chloroneb, dicloran, benzovindiflupyr, pydiflumetofen, hexachlorobenzene, quintozene, tecnazene, (TCNB), tolclofos-methyl, metrafenone, 2,6-dichloro-N-(4-trifluoromethylbenzyl)-benzamide, fluopicolide (flupicolide), tioxymid, flusulfamide, benomyl, carbendazim, carbendazim chlorhydrate, chlorfenazole, fuberidazole, thiabendazole, thiophanate-methyl, benthiavalicarb, chlobenthiazone, probenazole, acibenzolar, bethoxazin, pyriofenone (IKF-309), acibenzolar-S-methyl, pyribencarb (KIF-7767), butylamine, 3-iodo-2-propinyl n-butylcarbamate (IPBC), iodocarb (isopropanyl butylcarbamate), isopropanyl butylcarbamate (iodocarb), picarbutrazox, polycarbamate, propamocarb, tolprocarb, 3-(difluoromethyl)-N-(7-fluoro-1,1,3,3-tetramethyl-indan-4-yl)-1-methyl-pyrazole-4-carboxamide diclocymet, N-[(5-chloro-2-isopropyl-phenyl)methyl]-N-cyclopropyl-3-(difluoromethyl)-5-fluoro-1-methyl-pyrazole-4-carboxamide N-cyclopropyl-3-(difluoromethyl)-5-fluoro-N-[(2-isopropylphenyl)methyl]-1-methyl-pyrazole-4-carboxamide carpropamid, chlorothalonil, flumorph, oxine-copper, cymoxanil, phenamacril, cyazofamid, flutianil, thicyofen, chlozolinate, iprodione, procymidone, vinclozolin, bupirimate, dinocton, dinopenton, dinobuton, dinocap, meptyldinocap, diphenylamine, phosdiphen, 2,6-dimethyl-[1,4]dithiino[2,3-c:5,6-c']dipyrrole-1,3,5,7(2H,6H)-tetra-one, azithiram, etem, ferbam, mancozeb, maneb, metam, metiram (polyram), metiram-zinc, nabam, propineb, thiram, vapam (metam sodium), zineb, ziram, dithioether, isoprothiolane, ethaboxam, fosetyl, phosetyl-Al (fosetyl-al), methyl bromide, methyl iodide, methyl isothiocyanate, cyclafuramid, fenfuram, validamycin, streptomycin, (2RS)-2-bromo-2-(bromomethyl)glutaronitrile (bromothalonil), dodine, doguadine, guazatine, iminoctadine, iminoctadine triacetate, 2,4-D, 2,4-DB, kasugamycin, dimethirimol, fenhexamid, hymexazole, hydroxyisoxazole imazalil, imazalil sulphate, oxpoconazole, pefurazoate, prochloraz, triflumizole, fenamidone, Bordeaux mixture, calcium polysulfide, copper acetate, copper carbonate, copper hydroxide, copper naphthenate, copper oleate, copper oxychloride, copper oxyquinolate, copper silicate, copper sulphate, copper tallate, cuprous oxide, sulphur, carbaryl, phthalide (fthalide), dingjunezuo (Jun Si Qi), oxathiapiprolin, fluoroimide, mandipropamid, KSF-1002, benzamorf, dimethomorph, fenpropimorph, tridemorph, dodemorph, diethofencarb, fentin acetate, fentin hydroxide, carboxin, oxycarboxin, drazoxolon, famoxadone, m-phenylphenol, p-phenylphenol, tribromophenol (TBP), 2-[2-[(7,8-difluoro-2-methyl-3-quinolyl)oxy]-6-fluoro-phenyl]propan-2-ol 2-[2-fluoro-6-[(8-fluoro-2-methyl-3-quinolyl)oxy]phenyl]propan-2-ol cyflufenamid, ofurace, oxadixyl, flutolanil, mepronil, isofetamid, fenpiclonil, fludioxonil, pencycuron, edifenphos, iprobenfos, pyrazophos, phosphorus acids, tecloftalam, captafol, captan, ditalimfos, triforine, fenpropidin, piperalin, osthol, 1-methylcyclopropene, 4-CPA, chlormequat, clofencet, dichlorprop, dimethipin, endothal, ethephon, flumetralin, forchlorfenuron, gibberellic acid, gibberellins, hymexazol, maleic hydrazide, mepiquat, naphthalene acetamide, paclobutrazol, prohexadione, prohexadione-calcium, thidiazuron, tribufos (tributyl phosphorotrithioate), trinexapac, uniconazole, α-naphthalene acetic acid, polyoxin D (polyoxrim), BLAD, chitosan, fenoxanil, folpet, 3-(difluoromethyl)-N-methoxy-1-methyl-N-[1-methyl-2-(2,4,6-trichlorophenyl)ethyl]pyrazole-4-carboxamide, bixafen, fluxapyroxad, furametpyr, isopyrazam, penflufen, penthiopyrad, sedaxane, fenpyrazamine, diclomezine, pyrifenox, boscalid, fluopyram, diflumetorim, fenarimol, 5-fluoro-2-(p-tolylmethoxy)pyrimidin-4-amine ferimzone, dimetachlone (dimethaclone), pyroquilon, proquinazid, ethoxyquin, quinoxyfen, 4,4,5-trifluoro-3,3-dimethyl-1-(3-quinolyl)isoquinoline, 4,4-difluoro-3,3-dimethyl-1-(3-quinolyl)isoquinoline 5-fluoro-3,3,4,4-tetramethyl-1-(3-quinolyl)isoquinoline 9-fluoro-2,2-dimethyl-5-(3-quinolyl)-3H-1,4-benzoxazepine, tebufloquin, oxolinic acid, chinomethionate (oxythioquinox, quinoxymethionate), spiroxamine, (E)-N-methyl-2-[2-(2, 5-dimethylphenoxymethyl)phenyl]-2-methoxy-iminoacetamide, (mandestrobin), azoxystrobin, coumoxystrobin, dimoxystrobin, enestroburin, enoxastrobin, fenamistrobin, flufenoxystrobin, fluoxastrobin, kresoxim-methyl, mandestrobin, metaminostrobin, metominostrobin, orysastrobin, picoxystrobin, pyraclostrobin, pyrametostrobin, pyraoxystrobin, triclopyricarb, trifloxystrobin, amisulbrom, dichlofluanid, tolylfluanid, but-3-ynyl N-[6-[[(Z)-[(1-methyltetrazol-5-yl)-phenyl-methylene]amino]oxymethyl]-2-pyridyl]carbamate, dazomet, isotianil, tiadinil, thifluzamide, benthiazole (TCMTB), silthiofam, zoxamide, anilazine, tricyclazole, (.+−.)-cis-1-(4-chlorophenyl)-2-(1H-1,2,4-triazol-1-yl)-cycloheptanol (huanjunzuo), 1-(5-bromo-2-pyridyl)-2-(2,4-difluorophenyl)-1,1-difluoro-3-(1,2,4-triazol-1-yl)propan-2-ol 2-(1-tert-butyl)-1-(2-chlorophenyl)-3-(1,2,4-triazol-1-yl)-propan-2-ol (TCDP), azaconazole, bitertanol (biloxazol), bromuconazole, climbazole, cyproconazole, difenoconazole, dimetconazole, diniconazole, diniconazole-M, epoxiconazole, etaconazole, fenbuconazole, fluquinconazole, flusilazole, flutriafol, hexaconazole, imibenconazole, ipconazole, ipfentrifluconazole, metconazole, myclobutanil, penconazole, propiconazole, prothioconazole, simeconazole, tebuconazole, tetraconazole, triadimefon, triadimenol, triazoxide, triticonazole, mefentrifluconazole, 2-[[(1R,5S)-5-[(4-fluorophenyl)methyl]-1-hydroxy-2,2-dimethyl-cyclopentyl]methyl]-4H-1,2,4-triazole-3-thione, 2-[[3-(2-chlorophenyl)-2-(2,4-difluorophenyl)oxiran-2-yl]methyl]-4H-1,2,4-triazole-3-thione, ametoctradin (imidium), iprovalicarb, valifenalate, 2-benzyl-4-chlorophenol (Chlorophene), allyl alcohol, azafenidin, benzalkonium chloride, chloropicrin, cresol, daracide, dichlorophen (dichlorophene), difenzoquat, dipyrithione, N-(2-p-chlorobenzoylethyl)-hexaminium chloride, NNF-0721, octhilinone, oxasulfuron, propamidine and propionic acid.

Insecticides such as abamectin, acephate, acetamiprid, amidoflumet (S-1955), avermectin, azadirachtin, azinphos-methyl, bifenthrin, bifenazate, buprofezin, carbofuran, cartap, chlorantraniliprole (DPX-E2Y45), chlorfenapyr, chlorfluazuron, chlorpyrifos, chlorpyrifos-methyl, chromafenozide, clothianidin, cyflumetofen, cyfluthrin, beta-cyfluthrin, cyhalothrin, lambda-cyhalothrin, cypermethrin, cyromazine, deltamethrin, diafenthiuron, diazinon, dieldrin, diflubenzuron, dimefluthrin, dimethoate, dinotefuran, diofenolan, emamectin, endosulfan, esfenvalerate, ethiprole, fenothiocarb, fenoxycarb, fenpropathrin, fenvalerate, fipronil, flonicamid, flubendiamide, flucythrinate, tau-fluvalinate, flufenerim (UR-50701), flufenoxuron, fonophos, halofenozide, hexaflumuron, hydramethylnon, imidacloprid, indoxacarb, isofenphos, lufenuron, malathion, metaflumizone, metaldehyde, methamidophos, methidathion, methomyl, methoprene, methoxychlor, metofluthrin, monocrotophos, methoxyfenozide, nitenpyram, nithiazine, novaluron, noviflumuron (XDE-007), oxamyl, parathion, parathion-methyl, permethrin, phorate, phosalone, phosmet, phosphamidon, pirimicarb, profenofos, profluthrin, pymetrozine, pyrafluprole, pyrethrin, pyridalyl, pyrifluquinazon, pyriprole, pyriproxyfen, rotenone, ryanodine, spinetoram, spinosad, spirodiclofen, spiromesifen (BSN 2060), spirotetramat, sulprofos, tebufenozide, teflubenzuron, tefluthrin, terbufos, tetrachlorvinphos, thiacloprid, thiamethoxam, thiodicarb, thiosultap-sodium, tralomethrin, triazamate, trichlorfon and triflumuron;

Bactericides such as streptomycin;

Acaricides such as amitraz, chinomethionat, chlorobenzilate, cyenopyrafen, cyhexatin, dicofol, dienochlor, etoxazole, fenazaquin, fenbutatin oxide, fenpropathrin, fenpyroximate, hexythiazox, propargite, pyridaben and tebufenpyrad; and Biological agents such as *Bacillus thuringiensis, Bacillus thuringiensis* delta endotoxin, baculovirus, and entomopathogenic bacteria, virus and fungi.

Other examples of "reference" mixture compositions are as follows (wherein the term "TX" represents a compound (according to the definition of component (A) of the compositions of the present invention) selected from compound no. X.01, X.02, X.03, X.04, X.05, X.06, X.07, X.08, X.09, X.10, X.11, X.12, X.13, X.14, X.15, X.16, X.17, X.18, X.19, X.20, X.21, X.22, X.23, X.24, X.25, X.26, X.27, X.28, X.29, X.30, X.31, X.32, X.33, X.34, X.35, X.36, and X.37 as defined in the Table X above): a compound selected from the group of substances consisting of petroleum oils+TX, 1,1-bis(4-chloro-phenyl)-2-ethoxyethanol+TX, 2,4-dichlorophenyl benzenesulfonate+TX, 2-fluoro-N-methyl-N-1-naphthylacetamide+TX, 4-chlorophenyl phenyl sulfone+TX, acetoprole+TX, aldoxycarb+TX, amidithion+TX, amidothioate+TX, amiton+TX, amiton hydrogen oxalate+TX, amitraz+TX, aramite+TX, arsenous oxide+TX, azobenzene+TX, azothoate+TX, benomyl+TX, benoxafos+TX, benzyl benzoate+TX, bixafen+TX, brofenvalerate+TX, bromocyclen+TX, bromophos+TX, bromopropylate+TX, buprofezin+TX, butocarboxim+TX, butoxycarboxim+TX, butylpyridaben+TX, calcium polysulfide+TX, camphechlor+TX, carbanolate+TX, carbophenothion+TX, cymiazole+TX, chinomethionat+TX, chlorbenside+TX, chlordimeform+TX, chlordimeform hydrochloride+TX, chlorfenethol+TX, chlorfenson+TX, chlorfensulfide+TX, chlorobenzilate+TX, chloromebuform+TX, chloromethiuron+TX, chloropropylate+TX, chlorthiophos+TX, cinerin I+TX, cinerin II+TX, cinerins+TX, closantel+TX, coumaphos+TX, crotamiton+TX, crotoxyphos+TX, cufraneb+TX, cyanthoate+TX, DCPM+TX, DDT+TX, demephion+TX, demephion-O+TX, demephion-S+TX, demeton-methyl+TX, demeton-O+TX, demeton-O-methyl+TX, demeton-S+TX, demeton-S-methyl+TX, demeton-S-methylsulfon+TX, dichlofluanid+TX, dichlorvos+TX, dicliphos+TX, dienochlor+TX, dimefox+TX, dinex+TX, dinex-diclexine+TX, dinocap-4+TX, dinocap-6+TX, dinocton+TX, dinopenton+TX, dinosulfon+TX, dinoterbon+TX, dioxathion+TX, diphenyl sulfone+TX, disulfiram+TX, DNOC+TX, dofenapyn+TX, doramectin+TX, endothion+TX, eprinomectin+TX, ethoate-methyl+TX, etrimfos+TX, fenazaflor+TX, fenbutatin oxide+TX, fenothiocarb+TX, fenpyrad+TX, fenpyroximate+TX, fenpyrazamine+TX, fenson+TX, fentrifanil+TX, flubenzimine+TX, flucycloxuron+TX, fluenetil+TX, fluorbenside+TX, FMC 1137+TX, formetanate+TX, formetanate hydrochloride+TX, formparanate+TX, gamma-HCH+TX, glyodin+TX, halfenprox+TX, hexadecyl cyclopropanecarboxylate+TX, isocarbophos+TX, jasmolin I+TX, jasmolin II+TX, jodfenphos+TX, lindane+TX, malonoben+TX, mecarbam+TX, mephosfolan+TX, mesulfen+TX, methacrifos+TX, methyl bromide+TX, metolcarb+TX, mexacarbate+TX, milbemycin oxime+TX, mipafox+TX, monocrotophos+TX, morphothion+TX, moxidectin+TX, naled+TX, 4-chloro-2-(2-chloro-2-methyl-propyl)-5-[(6-iodo-3-pyridyl)methoxy]pyridazin-3-one+TX, nifluridide+TX, nikkomycins+TX, nitrilacarb+TX, nitrilacarb 1:1 zinc chloride complex+TX, omethoate+TX, oxydeprofos+TX, oxydisulfoton+TX, pp'-DDT+TX, parathion+TX, permethrin+TX, phenkapton+TX, phosalone+TX, phosfolan+TX, phosphamidon+TX, polychloroterpenes+TX, polynactins+TX, proclonol+TX, promacyl+TX, propoxur+TX, prothidathion+TX, prothoate+TX, pyrethrin I+TX, pyrethrin II+TX, pyrethrins+TX, pyridaphenthion+TX, pyrimitate+TX, quinalphos+TX, quintiofos+TX, R-1492+TX, phosglycin+TX, rotenone+TX, schradan+TX, sebufos+TX, selamectin+TX, sophamide+TX, SSI-121+TX, sulfiram+TX, sulfluramid+TX, sulfotep+TX, sulfur+TX, diflovidazin+TX, tau-fluvalinate+TX, TEPP+TX, terbam+TX, tetradifon+TX, tetrasul+TX, thiafenox+TX, thiocarboxime+TX, thiofanox+TX, thiometon+TX, thioquinox+TX, thuringiensin+TX, triamiphos+TX, triarathene+TX, triazophos+TX, triazuron+TX, trifenofos+TX, trinactin+TX, vamidothion+TX, vaniliprole+TX, bethoxazin+TX, copper dioctanoate+TX, copper sulfate+TX, cybutryne+TX, dichlone+TX, dichlorophen+TX, endothal+TX, fentin+TX, hydrated lime+TX, nabam+TX, quinoclamine+TX, quinonamid+TX, simazine+TX, triphenyltin acetate+TX, triphenyltin hydroxide+TX, crufomate+TX, piperazine+TX, thiophanate+TX, chloralose+TX, fenthion+TX, pyridin-4-amine+TX, strychnine+TX, 1-hydroxy-1H-pyridine-2-thione+TX, 4-(quinoxalin-2-ylamino)benzenesulfonamide+TX, 8-hydroxyquinoline sulfate+TX, bronopol+TX, copper hydroxide+TX, cresol+TX, dipyrithione+TX, dodicin+TX, fenaminosulf+TX, formaldehyde+TX, hydrargaphen+TX, kasugamycin+TX, kasugamycin hydrochloride hydrate+TX, nickel bis(dimethyldithiocarbamate)+TX, nitrapyrin+TX, octhilinone+TX, oxolinic acid+TX, oxytetracycline+TX, potassium hydroxyquinoline sulfate+TX, probenazole+TX, streptomycin+TX, streptomycin sesquisulfate+TX, tecloftalam+TX, thiomersal+TX, *Adoxophyes orana* GV+TX, *Agrobacterium radiobacter*+TX, *Amblyseius* spp.+TX, *Anagrapha falcifera* NPV+TX, *Anagrus atomus*+TX, *Aphelinus abdominalis*+TX, *Aphidius colemani*+TX, *Aphidoletes aphidimyza*+TX, *Autographa californica* NPV+TX, *Bacillus sphaericus* Neide+TX, *Beauveria brongniartii*+TX, *Chrysoperla carnea*+TX, *Cryptolaemus montrouzieri*+TX, *Cydia pomonella* GV+TX, *Dacnusa sibirica*+TX, *Diglyphus isaea*+TX, *Encarsia formosa*+TX, *Eretmocerus eremicus*+TX, *Heterorhabditis bacteriophora* and *H. megidis*+TX, *Hippodamia convergens*+TX, *Leptomastix dactylopii*+TX, *Macrolophus caliginosus*+TX, *Mamestra brassicae* NPV+TX, *Metaphycus helvolus*+TX, *Metarhizium anisopliae* var. *acridum*+TX, *Metarhizium anisopliae* var. *anisopliae*+TX, *Neodiprion sertifer* NPV and *N. lecontei* NPV+TX, *Orius* spp.+TX, *Paecilomyces fumosoroseus*+TX, *Phytoseiulus persimilis*+TX, *Steinernema bibionis*+TX, *Steinernema carpocapsae*+TX, *Steinernema feltiae*+TX, *Steinernema glaseri*+TX, *Steinernema riobrave*+TX, *Steinernema riobravis*+TX, *Steinernema scapterisci*+TX, *Steinernema* spp.+TX, *Trichogramma* spp.+TX, *Typhlodromus occidentalis*+TX, *Verticillium lecanii*+TX, apholate+TX, bisazir+TX, busulfan+TX, dimatif+TX, hemel+TX, hempa+TX, metepa+TX, methiotepa+TX, methyl apholate+TX, morzid+TX, penfluron+TX, tepa+TX, thiohempa+TX, thiotepa+TX, tretamine+TX, uredepa+TX, (E)-dec-5-en-1-yl acetate with (E)-dec-5-en-1-ol+TX, (E)-tridec-4-en-1-yl acetate+TX, (E)-6-methylhept-2-en-4-ol+TX, (E,Z)-tetradeca-4,10-dien-1-yl acetate+TX, (Z)-dodec-7-en-1-yl acetate+TX, (Z)-hexadec-11-enal+TX, (Z)-hexadec-11-en-1-yl acetate+TX, (Z)-hexadec-13-en-11-yn-1-yl acetate+TX, (Z)-icos-13-en-10-one+TX, (Z)-tetradec-7-en-1-al+TX, (Z)-tetradec-9-en-1-ol+TX, (Z)-tetradec-9-en-1-yl acetate+TX, (7E,9Z)-dodeca-7,9-dien-1-yl acetate+TX, (9Z,11 E)-tetradeca-9,11-dien-1-yl acetate+TX, (9Z,12E)-tetradeca-9,12-dien-1-yl acetate+TX, 14-methyloctadec-1-ene+TX, 4-methylnonan-5-ol with 4-methylnonan-5-one+TX, alpha-multistriatin+TX, brevicomin+TX, codlelure+TX, codlemone+TX, cuelure+TX, disparlure+TX, dodec-8-en-1-yl acetate+TX, dodec-9-en-1-yl acetate+TX, dodeca-8+TX, 10-dien-1-yl acetate+TX, dominicalure+TX, ethyl 4-methyloctanoate+TX, eugenol+TX, frontalin+TX, grandlure+TX, grandlure I+TX, grandlure II+TX, grandlure III+TX, grandlure IV+TX, hexalure+TX, ipsdienol+TX, ipsenol+TX, japonilure+TX, lineatin+TX, litlure+TX, looplure+TX, medlure+TX, megatomoic acid+TX, methyl eugenol+TX, muscalure+TX, octadeca-2,13-dien-1-yl acetate+TX, octadeca-3,13-dien-1-yl acetate+TX, orfralure+TX, oryctalure+TX, ostramone+TX, siglure+TX, sordidin+TX, sulcatol+TX, tetradec-11-en-1-yl acetate+TX, trimedlure+TX, trimedlure A+TX, trimedlure $B_1$+TX, trimedlure $B_2$+TX, trimedlure C+TX, trunc-call+TX, 2-(octylthio)ethanol+TX, butopyronoxyl+TX, butoxy(polypropylene glycol)+TX, dibutyl adipate+TX, dibutyl phthalate+TX, dibutyl succinate+TX, diethyltoluamide+TX, dimethyl carbate+TX, dimethyl phthalate+TX, ethyl hexanediol+TX, hexamide+TX, methoquin-butyl+TX, methylneodecanamide+TX, oxamate+TX, picaridin+TX, 1-dichloro-1-nitroethane+TX, 1,1-dichloro-2,2-bis(4-ethylphenyl)ethane+TX, 1,2-dichloropropane with 1,3-dichloropropene+TX, 1-bromo-2-chloroethane+TX, 2,2,2-trichloro-1-(3,4-dichlorophenyl)ethyl acetate+TX, 2,2-dichlorovinyl 2-ethylsulfinylethyl methyl phosphate+TX, 2-(1,3-dithiolan-2-yl)phenyl dimethylcarbamate+TX, 2-(2-butoxyethoxy)ethyl thiocyanate+TX, 2-(4,5-dimethyl-1,3-dioxolan-2-yl)phenyl methylcarbamate+TX, 2-(4-chloro-3,5-xylyloxy)ethanol+TX, 2-chlorovinyl diethyl phosphate+TX, 2-imidazolidone+TX, 2-isovalerylindan-1,3-dione+TX, 2-methyl(prop-2-ynyl)aminophenyl methylcarbamate+TX, 2-thiocyanatoethyl laurate+TX, 3-bromo-1-chloroprop-1-ene+TX, 3-methyl-1-phenylpyrazol-5-yl dimethylcarbamate+TX, 4-methyl(prop-2-ynyl)amino-3,5-xylyl methylcarbamate+TX, 5,5-dimethyl-3-oxocyclohex-1-enyl dimethylcarbamate+TX, acethion+TX, acrylonitrile+TX, aldrin+TX, allosamidin+TX, allyxycarb+TX, alpha-ecdysone+TX, aluminium phosphide+TX, aminocarb+TX, anabasine+TX, athidathion+TX, azamethiphos+TX, *Bacillus thuringiensis* delta endotoxins+TX, barium hexafluorosilicate+TX, barium polysulfide+TX, barthrin+TX, Bayer 22/190+TX, Bayer 22408+TX, beta-cyfluthrin+TX, beta-cypermethrin+TX, bioethanomethrin+TX, biopermethrin+TX, bis(2-chloroethyl) ether+TX, borax+TX, bromfenvinfos+TX, bromo-DDT+TX, bufencarb+TX, butacarb+TX, butathiofos+TX, butonate+TX, calcium arsenate+TX, calcium cyanide+TX, carbon disulfide+TX, carbon tetrachloride+TX, cartap hydrochloride+TX, cevadine+TX, chlorbicyclen+TX, chlordane+TX, chlordecone+TX, chloroform+TX, chloropicrin+TX, chlorphoxim+TX, chlorprazophos+TX, cis-resmethrin+TX, cismethrin+TX, clocythrin+TX, copper acetoarsenite+TX, copper arsenate+TX, copper oleate+TX, coumithoate+TX, cryolite+TX, CS 708+TX, cyanofenphos+TX, cyanophos+TX, cyclethrin+TX, cythioate+TX, d-tetramethrin+TX, DAEP+TX, dazomet+TX, decarbofuran+TX, diamidafos+TX, dicapthon+TX, dichlofenthion+TX, dicresyl+TX, dicyclanil+TX, dieldrin+TX, diethyl 5-methylpyrazol-3-yl phosphate+TX, dilor+TX, dimefluthrin+TX, dimetan+TX, dimethrin+TX, dimethylvinphos+TX, dimetilan+TX, dinoprop+TX, dinosam+TX, dinoseb+TX, diofenolan+TX, dioxabenzofos+TX, dithicrofos+TX, DSP+TX, ecdysterone+TX, El 1642+TX, EMPC+TX, EPBP+TX, etaphos+TX, ethiofencarb+TX, ethyl formate+TX, ethylene dibromide+TX, ethylene dichloride+TX, ethylene oxide+TX, EXD+TX, fenchlorphos+TX, fenethacarb+TX, fenitrothion+TX, fenoxacrim+TX, fenpirithrin+TX, fensulfothion+TX, fenthion-ethyl+TX, flucofuron+TX, fosmethilan+TX, fospirate+TX, fosthietan+TX, furathiocarb+TX, furethrin+TX, guazatine+TX, guazatine acetates+TX, sodium tetrathiocarbonate+TX, halfenprox+TX, HCH+TX, HEOD+TX, heptachlor+TX, heterophos+TX, HHDN+TX, hydrogen cyanide+TX, hyquincarb+TX, IPSP+TX, isazofos+TX, isobenzan+TX, isodrin+TX, isofenphos+TX, isolane+TX, isoprothiolane+TX, isoxathion+TX, juvenile hormone I+TX, juvenile hormone II+TX, juvenile hormone III+TX, kelevan+TX, kinoprene+TX, lead arsenate+TX, leptophos+TX, lirimfos+TX, lythidathion+TX, m-cumenyl methylcarbamate+TX, magnesium phosphide+TX, mazidox+TX, mecarphon+TX, menazon+TX, mercurous chloride+TX, mesulfenfos+TX, metam+TX, metam-potassium+TX, metam-sodium+TX, methanesulfonyl fluoride+TX, methocrotophos+TX, methoprene+TX, methothrin+TX, methoxychlor+TX, methyl isothiocyanate+TX, methylchloroform+TX, methylene chloride+TX, metoxadiazone+TX, mirex+TX, naftalofos+TX, naphthalene+TX, NC-170+TX, nicotine+TX, nicotine sulfate+TX, nithiazine+TX, nornicotine+TX, 0-5-dichloro-4-iodophenyl O-ethyl ethylphosphonothioate+TX, O,O-diethyl O-4-methyl-2-oxo-2H-chromen-7-yl phosphorothioate+TX, O,O-diethyl O-6-methyl-2-propylpyrimidin-4-yl phosphorothioate+TX, O,O,O',O'-tetrapropyl dithiopyrophosphate+TX, oleic acid+TX, para-dichlorobenzene+TX, parathion-methyl+TX, pentachlorophenol+TX, pentachlorophenyl laurate+TX, PH 60-38+TX, phenkapton+TX, phosnichlor+TX, phosphine+TX, phoxim-methyl+TX, pirimetaphos+TX, polychlorodicyclopentadiene isomers+TX, potassium arsenite+TX, potassium thiocyanate+TX, precocene I+TX, precocene II+TX, precocene III+TX, primidophos+TX, profluthrin+TX, promecarb+TX, prothiofos+TX, pyrazophos+TX, pyresmethrin+TX, quassia+TX, quinalphos-methyl+TX, quinothion+TX, rafoxanide+TX, resmethrin+TX, rotenone+TX, kadethrin+TX, ryania+TX, ryanodine+TX, sabadilla)+TX, schradan+TX, sebufos+TX, SI-0009+TX, thiapronil+TX, sodium arsenite+TX, sodium cyanide+TX, sodium fluoride+TX, sodium hexafluorosilicate+TX, sodium pentachlorophenoxide+TX, sodium selenate+TX, sodium thiocyanate+TX, sulcofuron+TX, sulcofuron-sodium+TX, sulfuryl fluoride+TX, sulprofos+TX, tar oils+TX, tazimcarb+TX, TDE+TX, tebupirimfos+TX, temephos+TX, terallethrin+TX, tetrachloroethane+TX, thicrofos+TX, thiocyclam+TX, thiocyclam hydrogen oxalate+TX, thionazin+TX, thiosultap+TX, thiosultap-sodium+TX, tralomethrin+TX, transpermethrin+TX, triazamate+TX, trichlormetaphos-3+TX, trichloronat+TX, trimethacarb+TX, tolprocarb+TX, triclopyricarb+TX, triprene+TX, veratridine+TX, veratrine+TX, XMC+TX, zetamethrin+TX, zinc phosphide+TX, zolaprofos+TX, and meperfluthrin+TX, tetramethylfluthrin+TX, bis(tributyltin) oxide+TX, bromoacetamide+TX, ferric phosphate+TX, niclosamide-olamine+TX, tributyltin oxide+TX, pyrimorph+TX, trifenmorph+TX, 1,2-dibromo-3-chloropropane+TX, 1,3-dichloropropene+TX, 3,4-dichlorotetrahydrothiophene 1,1-dioxide+TX, 3-(4-chlorophenyl)-5-methylrhodanine+TX, 5-methyl-6-thioxo-1,3,5-thiadiazinan-3-ylacetic acid+TX, 6-isopentenylaminopurine+TX, anisiflupurin+TX, benclothiaz+TX, cytokinins+TX, DCIP+TX, furfural+TX, isamidofos+TX, kinetin+TX, *Myrothecium* verrucaria composition+TX, tetrachlorothiophene+TX, xylenols+TX, zeatin+TX, potassium ethylxanthate+TX, acibenzolar+TX, acibenzolar-S-methyl+TX, *Reynoutria sachalinensis* extract+TX, alpha-chlorohydrin+TX, antu+TX, barium carbonate+TX, bisthiosemi+TX, brodifacoum+TX, bromadiolone+TX, bromethalin+TX, chlorophacinone+TX, cholecalciferol+TX, coumachlor+TX, coumafuryl+TX, coumatetralyl+TX, crimidine+TX, difenacoum+TX, difethialone+TX, diphacinone+TX, ergocalciferol+TX, flocoumafen+TX, fluoroacetamide+TX, flupropadine+TX, flupropadine hydrochloride+TX, norbormide+TX, phosacetim+TX, phosphorus+TX, pindone+TX, pyrinuron+TX, scilliroside+TX, sodium fluoroacetate+TX, thallium sulfate+TX, warfarin+TX, 2-(2-butoxyethoxy)ethyl piperonylate+TX, 5-(1,3-benzodioxol-5-yl)-3-hexylcyclohex-2-enone+TX, farnesol with nerolidol+TX, verbutin+TX, MGK 264+TX, piperonyl butoxide+TX, piprotal+TX, propyl isomer+TX, S421+TX, sesamex+TX, sesasmolin+TX, sulfoxide+TX, anthraquinone+TX, copper naphthenate+TX, copper oxychloride+TX, dicyclopentadiene+TX, thiram+TX, zinc naphthenate+TX, ziram+TX, imanin+TX, ribavirin+TX, chloroinconazide+TX, mercuric oxide+TX, thiophanate-methyl+TX, azaconazole+TX, bitertanol+TX, bromuconazole+TX, cyproconazole+TX, difenoconazole+TX, diniconazole+TX, epoxiconazole+TX, fenbuconazole+TX, fluquinconazole+TX, flusilazole+TX, flutriafol+TX, furametpyr+TX, hexaconazole+TX, imazalil+TX, imibenconazole+TX, ipconazole+TX, metconazole+TX, myclobutanil+TX, paclobutrazole+TX, pefurazoate+TX, penconazole+TX, prothioconazole+TX, pyrifenox+TX, prochloraz+TX, propiconazole+TX, pyrisoxazole+TX, simeconazole+TX, tebuconazole+TX, tetraconazole+TX, triadimefon+TX, triadimenol+TX, triflumizole+TX, triticonazole+TX, ancymidol+TX, fenarimol+TX, nuarimol+TX, bupirimate+TX, dimethirimol+TX, ethirimol+TX, dodemorph+TX, fenpropidin+TX, fenpropimorph+TX, spiroxamine+TX, tridemorph+TX, cyprodinil+TX, mepanipyrim+TX, pyrimethanil+TX, fenpiclonil+TX, fludioxonil+TX, benalaxyl+TX, furalaxyl+TX, metalaxyl−+TX, Rmetalaxyl+TX, ofurace+TX, oxadixyl+TX, carbendazim+TX, debacarb+TX, fuberidazole+TX, thiabendazole+TX, chlozolinate+TX, dichlozoline+TX, myclozoline+TX, procymidone+TX, vinclozoline+TX, boscalid+TX, carboxin+TX, fenfuram+TX, flutolanil+TX, mepronil+TX, oxycarboxin+TX, penthiopyrad+TX, thifluzamide+TX, dodine+TX, iminoctadine+TX, azoxystrobin+TX, dimoxystrobin+TX, enestroburin+TX, fenaminstrobin+TX, flufenoxystrobin+TX, fluoxastrobin+TX, kresoxim-methyl+TX, metominostrobin+TX, trifloxystrobin+TX, orysastrobin+TX, picoxystrobin+TX, pyraclostrobin+TX, pyrametostrobin+TX, pyraoxystrobin+TX, ferbam+TX, mancozeb+TX, maneb+TX, metiram+TX, propineb+TX, zineb+TX, captafol+TX, captan+TX, fluoroimide+TX, folpet+TX, tolylfluanid+TX, bordeaux mixture+TX, copper oxide+TX, mancopper+TX, oxine-copper+TX, nitrothal-isopropyl+TX, edifenphos+TX, iprobenphos+TX, phosdiphen+TX, tolclofos-methyl+TX, anilazine+TX, benthiavalicarb+TX, blasticidin-S+TX, chloroneb+TX, chlorothalonil+TX, cyflufenamid+TX, cymoxanil+TX, cyclobutrifluram+TX, diclocymet+TX, diclomezine+TX, dicloran+TX, diethofencarb+TX, dimethomorph+TX, flumorph+TX, dithianon+TX, ethaboxam+TX, etridiazole+TX, famoxadone+TX, fenamidone+TX, fenoxanil+TX, ferimzone+TX, fluazinam+TX, flumetylsulforim+TX, fluopicolide+TX, fluoxytioconazole+TX, flusulfamide+TX, fluxapyroxad+TX, fenhexamid+TX, fosetyl-aluminium+TX, hymexazol+TX, iprovalicarb+TX, cyazofamid+TX, methasulfocarb+TX, metrafenone+TX, pencycuron+TX, phthalide+TX, polyoxins+TX, propamocarb+TX, pyribencarb+TX, proquinazid+TX, pyroquilon+TX, pyriofenone+TX, quinoxyfen+TX, quintozene+TX, tiadinil+TX, triazoxide+TX, tricyclazole+TX, triforine+TX, validamycin+TX, valifenalate+TX, zoxamide+TX, mandipropamid+TX, flubeneteram+TX, isopyrazam+TX, sedaxane+TX, benzovindiflupyr+TX, pydiflumetofen+TX, 3-difluoromethyl-1-methyl-1H-pyrazole-4-carboxylic acid (3',4',5'-trifluoro-biphenyl-2-yl)-amide+TX, isoflucypram+TX, isotianil+TX, dipymetitrone+TX, 6-ethyl-5,7-dioxo-pyrrolo[4,5][1,4]dithiino[1,2-c]isothiazole-3-carbonitrile+TX, 2-(difluoromethyl)-N-[3-ethyl-1,1-dimethyl-indan-4-yl]pyridine-3-carboxamide+TX, 4-(2,6-difluorophenyl)-6-methyl-5-phenyl-pyridazine-3-carbonitrile+TX, (R)-3-(difluoromethyl)-1-methyl-N-[1,1,3-trimethylindan-4-yl]pyrazole-4-carboxamide+TX, 4-(2-bromo-4-fluoro-phenyl)-N-(2-chloro-6-fluoro-phenyl)-2,5-dimethyl-pyrazol-3-amine+TX, 4-(2-bromo-4-fluorophenyl)-N-(2-chloro-6-fluorophenyl)-1, 3-dimethyl-1H-pyrazol-5-amine+TX, fluindapyr+TX, coumethoxystrobin (jiaxiangjunzhi)+TX, Ivbenmixianan+TX, dichlobentiazox+TX, mandestrobin+TX, 3-(4,4-difluoro-3,4-dihydro-3,3-dimethylisoquinolin-1-yl)quinolone+TX, 2-[2-fluoro-6-[(8-fluoro-2-methyl-3-quinolyl)oxy]phenyl]propan-2-ol+TX, oxathiapiprolin+TX, tert-butyl N-[6-[[[(1-methyltetrazol-5-yl)-phenyl-methylene]amino]oxymethyl]-2-pyridyl]carbamate+TX, pyraziflumid+TX, inpyrfluxam+TX, trolprocarb+TX, mefentrifluconazole+TX, ipfentrifluconazole+TX, 2-(difluoromethyl)-N-[(3R)-3-ethyl-1,1-dimethyl-indan-4-yl]pyridine-3-carboxamide+TX, N'-(2,5-dimethyl-4-phenoxy-phenyl)-N-ethyl-N-methyl-formamidine+TX, N'-[4-(4,5-dichlorothiazol-2-yl)oxy-2,5-dimethyl-phenyl]-N-ethyl-N-methyl-formamidine+TX, [2-[3-[2-[1-[2-[3,5-bis(difluoromethyl)pyrazol-1-yl]acetyl]-4-piperidyl]thiazol-4-yl]-4,5-dihydroisoxazol-5-yl]-3-chlorophenyl]methanesulfonate+TX, but-3-ynyl N-[6-[[(Z)-[(1-methyltetrazol-5-yl)-phenyl-methylene]amino]oxymethyl]-2-pyridyl]carbamate+TX, methyl N-[[5-[4-(2,4-dimethylphenyl)triazol-2-yl]-2-methyl-phenyl]methyl]carbamate+TX, 3-chloro-6-methyl-5-phenyl-4-(2,4,6-trifluorophenyl)pyridazine+TX, pyridachlometyl+TX, 3-(difluoromethyl)-1-methyl-N-[1,1,3-trimethylindan-4-yl]pyrazole-4-carboxamide+TX, 1-[2-[[1-(4-chlorophenyl)pyrazol-3-yl]oxymethyl]-3-methyl-phenyl]-4-methyl-tetrazol-5-one+TX, 1-methyl-4-[3-methyl-2-[[2-methyl-4-(3,4,5-trimethylpyrazol-1-yl)phenoxy]methyl]phenyl]tetrazol-5-one+TX, aminopyrifen+TX, ametoctradin+TX, amisulbrom+TX, penflufen+TX, (Z,2E)-5-[1-(4-chlorophenyl)pyrazol-3-yl]oxy-2-methoxyimino-N,3-dimethyl-pent-3-enamide+TX, florylpicoxamid+TX, fenpicoxamid+TX, metarylpicoxamid+TX, tebufloquin+TX, ipflufenoquin+TX, quinofumelin+TX, isofetamid+TX, N-[2-[2,4-dichlorophenoxy]phenyl]-3-(difluoromethyl)-1-methyl-pyrazole-4-carboxamide+TX, N-[2-[2-chloro-4-(trifluoromethyl)phenoxy]phenyl]-3-(difluoromethyl)-1-methyl-pyrazole-4-carboxamide+TX, benzothiostrobin+TX, phenamacril+TX, 5-amino-1,3,4-thiadiazole-2-thiol zinc salt (2:1)+TX, fluopyram+TX, flufenoxadiazam+TX, flutianil+TX, fluopimomide+TX, pyrapropoyne+TX, picarbutrazox+TX, 2-(difluoromethyl)-N-(3-ethyl-1,1-dimethyl-indan-4-yl)pyridine-3-carboxamide+TX, 2-(difluoromethyl)-N-((3R)-1, 1, 3-trimethylindan-4-yl)pyridine-3-carboxamide+TX, 4-[[6-[2-(2,4-difluorophenyl)-1,1-difluoro-2-hydroxy-3-(1,2,4-triazol-1-yl)propyl]-3-pyridyl]oxy]benzonitrile+TX, metyltetraprole+TX, 2-(difluoromethyl)-N-((3R)-1, 1, 3-trimethylindan-4-yl)pyridine-3-carboxamide+TX, α-(1, 1-dimethylethyl)-α-[4'-(trifluoromethoxy) [1,1'-biphenyl]-4-yl]-5-pyrimidinemethanol+TX, fluoxapiprolin+TX, enoxastrobin+TX, 4-[[6-[2-(2,4-difluorophenyl)-1,1-difluoro-2-hydroxy-3-(1,2,4-triazol-1-yl)propyl]-3-pyridyl]oxy]benzonitrile+TX, 4-[[6-[2-(2,4-difluorophenyl)-1,1-difluoro-2-hydroxy-3-(5-sulfanyl-1,2,4-triazol-1-yl)propyl]-3-pyridyl]oxy]benzonitrile+TX, 4-[[6-[2-(2,4-difluorophenyl)-1,1-difluoro-2-hydroxy-3-(5-thioxo-4H-1,2,4-triazol-1-yl)propyl]-3-pyridyl]oxy]benzonitrile+TX, trinexapac+TX, coumoxystrobin+TX, zhongshengmycin+TX, thiodiazole copper+TX, zinc thiazole+TX, amectotractin+TX, iprodione+TX, seboctylamine+TX; N'-[5-bromo-2-methyl-6-[(1S)-1-methyl-2-propoxy-ethoxy]-3-pyridyl]-N-ethyl-N-methyl-formamidine+TX, N'-[5-bromo-2-methyl-6-[(1R)-1-methyl-2-propoxy-ethoxy]-3-pyridyl]-N-ethyl-N-methyl-formamidine+TX, N'-[5-bromo-2-methyl-6-(1-methyl-2-propoxy-ethoxy)-3-pyridyl]-N-ethyl-N-methyl-formamidine+TX, N'-[5-chloro-2-methyl-6-(1-methyl-2-propoxy-ethoxy)-3-pyridyl]-N-ethyl-N-methyl-formamidine+TX, N'-[5-bromo-2-methyl-6-(1-methyl-2-propoxy-ethoxy)-3-pyridyl]-N-isopropyl-N-methyl-formamidine+TX (these compounds may be prepared from the methods described in WO2015/155075); N'-[5-bromo-2-methyl-6-(2-propoxypropoxy)-3-pyridyl]-N-ethyl-N-methyl-formamidine+TX (this compound may be prepared from the methods described in IPCOM000249876D); N-isopropyl-N'-[5-methoxy-2-methyl-4-(2,2,2-trifluoro-1-hydroxy-1-phenyl-ethyl)phenyl]-N-methyl-formamidine+TX, N'-[4-(1-cyclopropyl-2,2,2-trifluoro-1-hydroxy-ethyl)-5-methoxy-2-methyl-phenyl]-N-isopropyl-N-methyl-formamidine+TX (these compounds may be prepared from the methods described in WO2018/228896); N-ethyl-N'-[5-methoxy-2-methyl-4-[(2-trifluoromethyl)oxetan-2-yl]phenyl]-N-methyl-formamidine+TX, N-ethyl-N'-[5-methoxy-2-methyl-4-[(2-trifuoromethyl)tetrahydrofuran-2-yl]phenyl]-N-methyl-formamidine+TX (these compounds may be prepared from the methods described in WO2019/110427); N-[(1R)-1-benzyl-3-chloro-1-methyl-but-3-enyl]-8-fluoro-quinoline-3-carboxamide+TX, N-[(1S)-1-benzyl-3-chloro-1-methyl-but-3-enyl]-8-fluoro-quinoline-3-carboxamide+TX, N-[(1R)-1-benzyl-3,3,3-trifluoro-1-methyl-propyl]-8-fluoro-quinoline-3-carboxamide+TX, N-[(1S)-1-benzyl-3,3,3-trifluoro-1-methyl-propyl]-8-fluoro-quinoline-3-carboxamide+TX, N-[(1R)-1-benzyl-1,3-dimethyl-butyl]-7,8-difluoro-quinoline-3-carboxamide+TX, N-[(1S)-1-benzyl-1,3-dimethyl-butyl]-7,8-difluoro-quinoline-3-carboxamide+TX, 8-fluoro-N-[(1R)-1-[(3-fluorophenyl)methyl]-1,3-dimethyl-butyl]quinoline-3-carboxamide+TX, 8-fluoro-N-[(1S)-1-[(3-fluorophenyl)methyl]-1,3-dimethyl-butyl]quinoline-3-carboxamide+TX, N-[(1R)-1-benzyl-1,3-dimethyl-butyl]-8-fluoro-quinoline-3-carboxamide+TX, N-[(1S)-1-benzyl-1,3-dimethyl-butyl]-8-fluoro-quinoline-3-carboxamide+TX, N-((1R)-1-benzyl-3-chloro-1-methyl-but-3-enyl)-8-fluoro-quinoline-3-carboxamide+TX, N-((1S)-1-benzyl-3-chloro-1-methyl-but-3-enyl)-8-fluoro-quinoline-3-carboxamide+TX (these compounds may be prepared from the methods described in WO2017/153380); 1-(6,7-dimethylpyrazolo[1,5-a]pyridin-3-yl)-4,4,5-trifluoro-3,3-dimethyl-isoquinoline+TX, 1-(6,7-dimethylpyrazolo[1,5-a]pyridin-3-yl)-4,4,6-trifluoro-3,3-dimethyl-isoquinoline+TX, 4,4-difluoro-3,3-dimethyl-1-(6-methylpyrazolo[1,5-a]pyridin-3-yl)isoquinoline+TX, 4,4-difluoro-3,3-dimethyl-1-(7-methylpyrazolo[1,5-a]pyridin-3-yl)isoquinoline+TX, 1-(6-chloro-7-methyl-pyrazolo[1,5-a]pyridin-3-yl)-4,4-difluoro-3,3-dimethyl-isoquinoline+TX (these compounds may be prepared from the methods described in WO2017/025510); 1-(4,5-dimethylbenzimidazol-1-yl)-4,4,5-trifluoro-3,3-dimethyl-isoquinoline+TX, 1-(4,5-dimethylbenzimidazol-1-yl)-4,4-difluoro-3,3-dimethyl-isoquinoline+TX, 6-chloro-4,4-difluoro-3,3-dimethyl-1-(4-methylbenzimidazol-1-yl)isoquinoline+TX, 4,4-difluoro-1-(5-fluoro-4-methyl-benzimidazol-1-yl)-3,3-dimethyl-isoquinoline+TX, 3-(4,4-difluoro-3,3-dimethyl-1-isoquinolyl)-7,8-dihydro-6H-cyclopenta[e]benzimidazole+TX (these compounds may be prepared from the methods described in WO2016/156085); N-methoxy-N-[[4-[5-(trifluoromethyl)-1,2,4-oxadiazol-3-yl]phenyl]methyl]cyclopropanecarboxamide+TX, N,2-dimethoxy-N-[[4-[5-(trifluoromethyl)-1,2,4-oxadiazol-3-yl]phenyl]methyl]propanamide+TX, N-ethyl-2-methyl-N-[[4-[5-(trifluoromethyl)-1,2,4-oxadiazol-3-yl]phenyl]methyl]propanamide+TX, 1-methoxy-3-methyl-1-[[4-[5-(trifluoromethyl)-1,2,4-oxadiazol-3-yl]phenyl]methyl]urea+TX, 1,3-dimethoxy-1-[[4-[5-(trifluoromethyl)-1,2,4-oxadiazol-3-yl]phenyl]methyl]urea+TX, 3-ethyl-1-methoxy-1-[[4-[5-(trifluoromethyl)-1,2,4-oxadiazol-3-yl]phenyl]methyl]urea+TX, N-[[4-[5-(trifluoromethyl)-1,2,4-oxadiazol-3-yl]phenyl]methyl]propanamide+TX, 4,4-dimethyl-2-[[4-[5-(trifluoromethyl)-1,2,4-oxadiazol-3-yl]phenyl]methyl]isoxazolidin-3-one+TX, 5,5-dimethyl-2-[[4-[5-(trifluoromethyl)-1,2,4-oxadiazol-3-yl]phenyl]methyl]isoxazolidin-3-one+TX, ethyl 1-[[4-[5-(trifluoromethyl)-1,2,4-oxadiazol-3-yl]phenyl]methyl]pyrazole-4-carboxylate+TX, N,N-dimethyl-1-[[4-[5-(trifluoromethyl)-1,2,4-oxadiazol-3-yl]phenyl]methyl]-1,2,4-triazol-3-amine+TX. The compounds in this paragraph may be prepared from the methods described in WO 2017/055473, WO 2017/055469, WO 2017/093348 and WO 2017/118689; 2-[6-(4-chlorophenoxy)-2-(trifluoromethyl)-3-pyridyl]-1-(1,2,4-triazol-1-yl)propan-2-oI+TX (this compound may be prepared from the methods described in WO 2017/029179); 2-[6-(4-bromophenoxy)-2-(trifluoromethyl)-3-pyridyl]-1-(1,2,4-triazol-1-yl)propan-2-ol+TX (this compound may be prepared from the methods described in WO 2017/029179); 3-[2-(1-chlorocyclopropyl)-3-(2-fluorophenyl)-2-hydroxy-propyl]imidazole-4-carbonitrile+TX (this compound may be prepared from the methods described in WO 2016/156290); 3-[2-(1-chlorocyclopropyl)-3-(3-chloro-2-fluoro-phenyl)-2-hydroxy-propyl]imidazole-4-carbonitrile+TX (this compound may be prepared from the methods described in WO 2016/156290); (4-phenoxyphenyl)methyl 2-amino-6-methyl-pyridine-3-carboxylate+TX (this compound may be prepared from the methods described in WO 2014/006945); 2,6-Dimethyl-1H,5H-[1,4]dithiino[2,3-c:5,6-c']dipyrrole-1,3,5,7(2H,6H)-tetrone+TX (this compound may be prepared from the methods described in WO 2011/138281); N-methyl-4-[5-(trifluoromethyl)-1,2,4-oxadiazol-3-yl]benzenecarbothioamide+TX; N-methyl-4-[5-(trifluoromethyl)-1,2,4-oxadiazol-3-yl]benzamide+TX; (Z,2E)-5-[1-(2,4-dichlorophenyl)pyrazol-3-yl]oxy-2-methoxyimino-N,3-dimethyl-pent-3-enamide+TX (this compound may be prepared from the methods described in WO 2018/153707); N'-(2-chloro-5-methyl-4-phenoxy-phenyl)-N-ethyl-N-methyl-formamidine+TX; N'-[2-chloro-4-(2-fluorophenoxy)-5-methyl-phenyl]-N-ethyl-N-methyl-formamidine+TX (this compound may be prepared from the methods described in WO 2016/202742); 2-(difluoromethyl)-N-[(3S)-3-ethyl-1,1-dimethyl-indan-4-yl]pyridine-3-carboxamide+TX (this compound may be prepared from the methods described in WO 2014/095675); (5-methyl-2-pyridyl)-[4-[5-(trifluoromethyl)-1,2,4-oxadiazol-3-yl]phenyl]methanone+TX, (3-methylisoxazol-5-yl)-[4-[5-(trifluoromethyl)-1,2,4-oxadiazol-3-yl]phenyl]methanone+TX (these compounds may be prepared from the methods described in WO 2017/220485); 2-oxo-N-propyl-2-[4-[5-(trifluoromethyl)-1,2,4-oxadiazol-3-yl]phenyl]acetamide+TX (this compound may be prepared from the methods described in WO 2018/065414); ethyl 1-[[5-[5-(trifluoromethyl)-1,2,4-oxadiazol-3-yl]-2-thienyl]methyl]pyrazole-4-carboxylate+TX (this compound may be prepared from the methods described in WO 2018/158365); 2,2-difluoro-N-methyl-2-[4-[5-(trifluoromethyl)-1,2,4-oxadiazol-3-yl]phenyl]acetamide+TX, N—[(E)-methoxyiminomethyl]-4-[5-(trifluoromethyl)-1,2,4-oxadiazol-3-yl]benzamide+TX, N—[(Z)-methoxyiminomethyl]-4-[5-(trifluoromethyl)-1,2,4-oxadiazol-3-yl]benzamide+TX, N—[N-methoxy-C-methyl-carbonimidoyl]-4-[5-(trifluoromethyl)-1,2,4-oxadiazol-3-yl]benzamide+TX (these compounds may be prepared from the methods described in WO 2018/202428).

In the “reference” mixture compositions the mixtures of compounds of formula (I) (selected from Table X (above)) with active ingredients described above comprise a compound selected from Table X (above) and an active ingredient as described above preferably in a mixing ratio of from 100:1 to 1:100, especially from 50:1 to 1:50, more especially in a ratio of from 20:1 to 1:20, even more especially from 10:1 to 1:10, very especially from 5:1 and 1:5, special preference being given to a ratio of from 2:1 to 1:2, and a ratio of from 4:1 to 2:1 being likewise preferred, above all in a ratio of 1:1, or 5:1, or 5:2, or 5:3, or 5:4, or 4:1, or 4:2, or 4:3, or 3:1, or 3:2, or 2:1, or 1:5, or 2:5, or 3:5, or 4:5, or 1:4, or 2:4, or 3:4, or 1:3, or 2:3, or 1:2, or 1:600, or 1:300, or 1:150, or 1:35, or 2:35, or 4:35, or 1:75, or 2:75, or 4:75, or 1:6000, or 1:3000, or 1:1500, or 1:350, or 2:350, or 4:350, or 1:750, or 2:750, or 4:750. Those mixing ratios are by weight.

The mixture compositions as described above (both according to the invention and the "reference" mixture compositions) can be used in a method for controlling pests, which comprises applying a composition comprising a mixture as described above to the pests or their environment.

The mixtures comprising a compound of formula (I) selected from Table X (above) and one or more active ingredients as described above can be applied, for example, in a single "ready-mix" form, in a combined spray mixture composed from separate formulations of the single active ingredient components, such as a "tank-mix", and in a combined use of the single active ingredients when applied in a sequential manner, i.e. one after the other with a reasonably short period, such as a few hours or days. The order of applying the compounds of formula (I) selected from Table X (above) and the active ingredients as described above is not essential for working the present invention.

The compositions of the present invention may also be used in crop enhancement. According to the present invention, 'crop enhancement' means an improvement in plant vigour, an improvement in plant quality, improved tolerance to stress factors, and/or improved input use efficiency.

According to the present invention, an 'improvement in plant vigour' means that certain traits are improved qualitatively or quantitatively when compared with the same trait in a control plant which has been grown under the same conditions in the absence of the method of the invention. Such traits include, but are not limited to, early and/or improved germination, improved emergence, the ability to use less seeds, increased root growth, a more developed root system, increased root nodulation, increased shoot growth, increased tillering, stronger tillers, more productive tillers, increased or improved plant stand, less plant verse (lodging), an increase and/or improvement in plant height, an increase in plant weight (fresh or dry), bigger leaf blades, greener leaf colour, increased pigment content, increased photosynthetic activity, earlier flowering, longer panicles, early grain maturity, increased seed, fruit or pod size, increased pod or ear number, increased seed number per pod or ear, increased seed mass, enhanced seed filling, less dead basal leaves, delay of senescence, improved vitality of the plant, increased levels of amino acids in storage tissues and/or less inputs needed (e.g. less fertiliser, water and/or labour needed). A plant with improved vigour may have an increase in any of the aforementioned traits or any combination or two or more of the aforementioned traits.

According to the present invention, an 'improvement in plant quality' means that certain traits are improved qualitatively or quantitatively when compared with the same trait in a control plant which has been grown under the same conditions in the absence of the method of the invention. Such traits include, but are not limited to, improved visual appearance of the plant, reduced ethylene (reduced production and/or inhibition of reception), improved quality of harvested material, e.g. seeds, fruits, leaves, vegetables (such improved quality may manifest as improved visual appearance of the harvested material), improved carbohydrate content (e.g. increased quantities of sugar and/or starch, improved sugar acid ratio, reduction of reducing sugars, increased rate of development of sugar), improved protein content, improved oil content and composition, improved nutritional value, reduction in anti-nutritional compounds, improved organoleptic properties (e.g. improved taste) and/or improved consumer health benefits (e.g. increased levels of vitamins and anti-oxidants)), improved post-harvest characteristics (e.g. enhanced shelf-life and/or storage stability, easier processability, easier extraction of compounds), more homogenous crop development (e.g. synchronised germination, flowering and/or fruiting of plants), and/or improved seed quality (e.g. for use in following seasons). A plant with improved quality may have an increase in any of the aforementioned traits or any combination or two or more of the aforementioned traits.

According to the present invention, an 'improved tolerance to stress factors' means that certain traits are improved qualitatively or quantitatively when compared with the same trait in a control plant which has been grown under the same conditions in the absence of the method of the invention. Such traits include, but are not limited to, an increased tolerance and/or resistance to abiotic stress factors which cause sub-optimal growing conditions such as drought (e.g. any stress which leads to a lack of water content in plants, a lack of water uptake potential or a reduction in the water supply to plants), cold exposure, heat exposure, osmotic stress, UV stress, flooding, increased salinity (e.g. in the soil), increased mineral exposure, ozone exposure, high light exposure and/or limited availability of nutrients (e.g. nitrogen and/or phosphorus nutrients). A plant with improved tolerance to stress factors may have an increase in any of the aforementioned traits or any combination or two or more of the aforementioned traits. In the case of drought and nutrient stress, such improved tolerances may be due to, for example, more efficient uptake, use or retention of water and nutrients.

According to the present invention, an 'improved input use efficiency' means that the plants are able to grow more effectively using given levels of inputs compared to the grown of control plants which are grown under the same conditions in the absence of the method of the invention. In particular, the inputs include, but are not limited to fertiliser (such as nitrogen, phosphorous, potassium, micronutrients), light and water. A plant with improved input use efficiency may have an improved use of any of the aforementioned inputs or any combination of two or more of the aforementioned inputs.

Other crop enhancements of the present invention include a decrease in plant height, or reduction in tillering, which are beneficial features in crops or conditions where it is desirable to have less biomass and fewer tillers.

Any or all of the above crop enhancements may lead to an improved yield by improving e.g. plant physiology, plant growth and development and/or plant architecture. In the context of the present invention 'yield' includes, but is not limited to, (i) an increase in biomass production, grain yield, starch content, oil content and/or protein content, which may result from (a) an increase in the amount produced by the plant per se or (b) an improved ability to harvest plant matter, (ii) an improvement in the composition of the harvested material (e.g. improved sugar acid ratios, improved oil composition, increased nutritional value, reduction of anti-nutritional compounds, increased consumer health benefits) and/or (iii) an increased/facilitated ability to harvest the crop, improved processability of the crop and/or better storage stability/shelf life. Increased yield of an agricultural plant means that, where it is possible to take a quantitative measurement, the yield of a product of the respective plant is increased by a measurable amount over the yield of the same product of the plant produced under the same conditions, but without application of the present invention. According to the present invention, it is preferred that the yield be increased by at least 0.5%, more preferred at least 1%, even more preferred at least 2%, still more preferred at least 4%, preferably 5% or even more.

Any or all of the above crop enhancements may also lead to an improved utilisation of land, i.e. land which was previously unavailable or sub-optimal for cultivation may become available. For example, plants which show an increased ability to survive in drought conditions, may be able to be cultivated in areas of sub-optimal rainfall, e.g. perhaps on the fringe of a desert or even the desert itself.

In one aspect of the present invention, crop enhancements are made in the substantial absence of pressure from pests and/or diseases and/or abiotic stress. In a further aspect of the present invention, improvements in plant vigour, stress tolerance, quality and/or yield are made in the substantial absence of pressure from pests and/or diseases. For example pests and/or diseases may be controlled by a pesticidal treatment that is applied prior to, or at the same time as, the method of the present invention.

In a still further aspect of the present invention, improvements in plant vigour, stress tolerance, quality and/or yield are made in the absence of pest and/or disease pressure. In a further embodiment, improvements in plant vigour, quality and/or yield are made in the absence, or substantial absence, of abiotic stress.

The compositions of the present invention may also be used in the field of protecting storage goods against attack of fungi. According to the present invention, the term "storage goods" is understood to denote natural substances of vegetable and/or animal origin and their processed forms, which have been taken from the natural life cycle and for which long-term protection is desired. Storage goods of vegetable origin, such as plants or parts thereof, for example stalks, leafs, tubers, seeds, fruits or grains, can be protected in the freshly harvested state or in processed form, such as pre-dried, moistened, comminuted, ground, pressed or roasted. Also falling under the definition of storage goods is timber, whether in the form of crude timber, such as construction timber, electricity pylons and barriers, or in the form of finished articles, such as furniture or objects made from wood. Storage goods of animal origin are hides, leather, furs, hairs and the like. The composition according the present invention can prevent disadvantageous effects such as decay, discoloration or mold. Preferably "storage goods" is understood to denote natural substances of vegetable origin and/or their processed forms, more preferably fruits and their processed forms, such as pomes, stone fruits, soft fruits and citrus fruits and their processed forms. In another preferred embodiment of the invention "storage goods" is understood to denote wood.

Therefore, a further aspect of the present invention is a method of protecting storage goods, which comprises applying to the storage goods a composition according to the invention.

The composition of the present invention may also be used in the field of protecting technical material against attack of fungi. According to the present invention, the term "technical material" includes paper; carpets; constructions; cooling and heating systems; wall-boards; ventilation and air conditioning systems and the like; preferably "technical material" is understood to denote wall-boards. The composition according the present invention can prevent disadvantageous effects such as decay, discoloration or mold.

The composition according to the invention is generally formulated in various ways using formulation adjuvants, such as carriers, solvents and surface-active substances. The formulations can be in various physical forms, e.g. in the form of dusting powders, gels, wettable powders, water-dispersible granules, water-dispersible tablets, effervescent pellets, emulsifiable concentrates, micro-emulsifiable concentrates, oil-in-water emulsions, oil-flowables, aqueous dispersions, oily dispersions, suspo-emulsions, capsule suspensions, emulsifiable granules, soluble liquids, water-soluble concentrates (with water or a water-miscible organic solvent as carrier), impregnated polymer films or in other forms known e.g. from the Manual on Development and Use of FAO and WHO Specifications for Pesticides, United Nations, First Edition, Second Revision (2010). Such formulations can either be used directly or diluted prior to use. The dilutions can be made, for example, with water, liquid fertilisers, micronutrients, biological organisms, oil or solvents.

The formulations can be prepared e.g. by mixing the active ingredient with the formulation adjuvants in order to obtain compositions in the form of finely divided solids, granules, solutions, dispersions or emulsions. The active ingredients can also be formulated with other adjuvants, such as finely divided solids, mineral oils, oils of vegetable or animal origin, modified oils of vegetable or animal origin, organic solvents, water, surface-active substances or combinations thereof.

The active ingredients can also be contained in microcapsules. Microcapsules contain the active ingredients in a porous carrier. This enables the active ingredients to be released into the environment in controlled amounts (e.g. slow-release). Microcapsules usually have a diameter of from 0.1 to 500 microns. They contain active ingredients in an amount of about from 25 to 95% by weight of the capsule weight. The active ingredients can be in the form of a monolithic solid, in the form of fine particles in solid or liquid dispersion or in the form of a suitable solution. The encapsulating membranes can comprise, for example, natural or synthetic rubbers, cellulose, styrene/butadiene copolymers, polyacrylonitrile, polyacrylate, polyesters, polyamides, polyureas, polyurethane or chemically modified polymers and starch xanthates or other polymers that are known to the person skilled in the art.

Alternatively, very fine microcapsules can be formed in which the active ingredient is contained in the form of finely divided particles in a solid matrix of base substance, but the microcapsules are not themselves encapsulated.

The formulation adjuvants that are suitable for the preparation of the formulations according to the invention are known per se. As liquid carriers there may be used: water, toluene, xylene, petroleum ether, vegetable oils, acetone, methyl ethyl ketone, cyclohexanone, acid anhydrides, acetonitrile, acetophenone, amyl acetate, 2-butanone, butylene carbonate, chlorobenzene, cyclohexane, cyclohexanol, alkyl esters of acetic acid, diacetone alcohol, 1,2-dichloropropane, diethanolamine, p-diethylbenzene, diethylene glycol, diethylene glycol abietate, diethylene glycol butyl ether, diethylene glycol ethyl ether, diethylene glycol methyl ether, N,N-dimethylformamide, dimethyl sulfoxide, 1,4-dioxane, dipropylene glycol, dipropylene glycol methyl ether, dipropylene glycol dibenzoate, diproxitol, alkylpyrrolidone, ethyl acetate, 2-ethylhexanol, ethylene carbonate, 1,1,1-trichloroethane, 2-heptanone, alpha-pinene, d-limonene, ethyl lactate, ethylene glycol, ethylene glycol butyl ether, ethylene glycol methyl ether, gamma-butyrolactone, glycerol, glycerol acetate, glycerol diacetate, glycerol triacetate, hexadecane, hexylene glycol, isoamyl acetate, isobornyl acetate, isooctane, isophorone, isopropylbenzene, isopropyl myristate, lactic acid, laurylamine, mesityl oxide, methoxypropanol, methyl isoamyl ketone, methyl isobutyl ketone, methyl laurate, methyl octanoate, methyl oleate, methylene chloride, m-xylene, n-hexane, n-octylamine, octadecanoic acid, octylamine acetate, oleic acid, oleylamine, o-xylene, phenol, polyethylene glycol, propionic acid, propyl lactate, propylene carbonate, propylene glycol, propylene glycol methyl ether, p-xylene, toluene, triethyl phosphate, triethylene glycol, xylenesulfonic acid, paraffin, mineral oil, trichloroethylene, perchloroethylene, ethyl acetate, amyl acetate, butyl acetate, propylene glycol methyl ether, diethylene glycol methyl ether, methanol, ethanol, isopropanol, and alcohols of higher molecular weight, such as amyl alcohol, tetrahydrofurfuryl alcohol, hexanol, octanol, ethylene glycol, propylene glycol, glycerol, N-methyl-2-pyrrolidone and the like.

Suitable solid carriers are, for example, talc, titanium dioxide, pyrophyllite clay, silica, attapulgite clay, kieselguhr, limestone, calcium carbonate, bentonite, calcium montmorillonite, cottonseed husks, wheat flour, soybean flour, pumice, wood flour, ground walnut shells, lignin and similar substances.

A large number of surface-active substances can advantageously be used in both solid and liquid formulations, especially in those formulations which can be diluted with a carrier prior to use.

Surface-active substances may be anionic, cationic, nonionic or polymeric and they can be used as emulsifiers, wetting agents or suspending agents or for other purposes. Typical surface-active substances include, for example, salts of alkyl sulfates, such as diethanolammonium lauryl sulfate; salts of alkylarylsulfonates, such as calcium dodecylbenzenesulfonate; alkylphenol/alkylene oxide addition products, such as nonylphenol ethoxylate; alcohol/alkylene oxide addition products, such as tridecylalcohol ethoxylate; soaps, such as sodium stearate; salts of alkylnaphthalenesulfonates, such as sodium dibutylnaphthalenesulfonate; dialkyl esters of sulfosuccinate salts, such as sodium di(2-ethylhexyl) sulfosuccinate; sorbitol esters, such as sorbitol oleate; quaternary amines, such as lauryltrimethylammonium chloride, polyethylene glycol esters of fatty acids, such as polyethylene glycol stearate; block copolymers of ethylene oxide and propylene oxide; and salts of mono- and di-alkylphosphate esters; and also further substances described e.g. in McCutcheon's Detergents and Emulsifiers Annual, MC Publishing Corp., Ridgewood New Jersey (1981).

Further adjuvants that can be used in pesticidal formulations include crystallisation inhibitors, viscosity modifiers, suspending agents, dyes, anti-oxidants, foaming agents, light absorbers, mixing auxiliaries, antifoams, complexing agents, neutralising or pH-modifying substances and buffers, corrosion inhibitors, fragrances, wetting agents, take-up enhancers, micronutrients, plasticisers, glidants, lubricants, dispersants, thickeners, antifreezes, microbicides, and liquid and solid fertilisers.

The formulations according to the invention can include an additive comprising an oil of vegetable or animal origin, a mineral oil, alkyl esters of such oils or mixtures of such oils and oil derivatives. The amount of oil additive in the formulation according to the invention is generally from 0.01 to 10%, based on the mixture to be applied. For example, the oil additive can be added to a spray tank in the desired concentration after a spray mixture has been prepared. Preferred oil additives comprise mineral oils or an oil of vegetable origin, for example rapeseed oil, olive oil or sunflower oil, emulsified vegetable oil, alkyl esters of oils of vegetable origin, for example the methyl derivatives, or an oil of animal origin, such as fish oil or beef tallow. Preferred oil additives comprise alkyl esters of $C_5$-$C_{22}$ fatty acids, especially the methyl derivatives of $C_{12}$-$C_{18}$ fatty acids, for example the methyl esters of lauric acid, palmitic acid and oleic acid (methyl laurate, methyl palmitate and methyl oleate, respectively). Many oil derivatives are known from the Compendium of Herbicide Adjuvants, $10^{th}$ Edition, Southern Illinois University, 2010.

The formulations generally comprise from 0.1 to 99% by weight, especially from 0.1 to 95% by weight, of compounds of component (A) and component (B) and from 1 to 99.9% by weight of a formulation adjuvant which preferably includes from 0 to 25% by weight of a surface-active substance. Whereas commercial products may preferably be formulated as concentrates, the end user will normally employ dilute formulations.

The rates of application vary within wide limits and depend on the nature of the soil, the method of application, the crop plant, the pest to be controlled, the prevailing climatic conditions, and other factors governed by the method of application, the time of application and the target crop. As a general guideline compounds may be applied at a rate of from 1 to 2000 l/ha, especially from 10 to 1000 l/ha.

Certain mixture compositions comprising a compound of formula (I) described above may show a synergistic effect. This occurs whenever the action of an active ingredient combination is greater than the sum of the actions of the individual components. The action to be expected E for a given active ingredient combination obeys the so-called COLBY formula and can be calculated as follows (COLBY, S.R. "Calculating synergistic and antagonistic responses of herbicide combination". Weeds, Vol. 15, pages 20-22; 1967):

ppm=milligrams of active ingredient (=a.i.) per liter of spray mixture

X=% action by active ingredient A) using p ppm of active ingredient

Y=% action by active ingredient B) using q ppm of active ingredient.

According to COLBY, the expected (additive) action of active ingredients A)+B) using p+q ppm of active ingredient is:

$$E=X+Y-X\cdot Y/100.$$

If the action actually observed (O) is greater than the expected action (E), then the action of the combination is super-additive, i.e. there is a synergistic effect. In mathematical terms, synergism corresponds to a positive value for the difference of (O-E). In the case of purely complementary addition of activities (expected activity), said difference (O-E) is zero. A negative value of said difference (O-E) signals a loss of activity compared to the expected activity.

However, besides the actual synergistic action with respect to fungicidal activity, the composition according to the invention may also have further surprising advantageous properties. Examples of such advantageous properties that may be mentioned are: more advantageous degradability; improved toxicological and/or ecotoxicological behaviour; or improved characteristics of the useful plants including: emergence, crop yields, more developed root system, tillering increase, increase in plant height, bigger leaf blade, less dead basal leaves, stronger tillers, greener leaf colour, less fertilizers needed, less seeds needed, more productive tillers, earlier flowering, early grain maturity, less plant verse (lodging), increased shoot growth, improved plant vigor, and early germination.

The composition according to the invention can be applied to the phytopathogenic microorganisms, the useful plants, the locus thereof, the propagation material thereof, storage goods or technical materials threatened by microorganism attack.

The composition according to the invention may be applied before or after infection of the useful plants, the propagation material thereof, storage goods or technical materials by the microorganisms.

The amount of a composition according to the invention to be applied, will depend on various factors, such as the compounds employed; the subject of the treatment, such as, for example plants, soil or seeds; the type of treatment, such as, for example spraying, dusting or seed dressing; the purpose of the treatment, such as, for example prophylactic or therapeutic; the type of fungi to be controlled or the application time.

When applied to the useful plants component (A) is typically applied at a rate of 5 to 2000 g a.i./ha, particularly 10 to 1000 g a.i./ha, e.g. 50, 75, 100 or 200 g a.i./ha, typically in association with 1 to 5000 g a.i./ha, particularly 2 to 2000 g a.i./ha, e.g. 100, 250, 500, 800, 1000, 1500 g a.i./ha of component (B).

In agricultural practice the application rates of the composition according to the invention depend on the type of effect desired, and typically range from 20 to 4000 g of total composition per hectare.

When the composition according to the invention is used for treating seed, rates of 0.001 to 50 g of a compound of component (A) per kg of seed, preferably from 0.01 to 10 g per kg of seed, and 0.001 to 50 g of a compound of component (B), per kg of seed, preferably from 0.01 to 10 g per kg of seed, are generally sufficient.

For the avoidance of doubt, where a literary reference, patent application, or patent, is cited within the text of this application, the entire text of said citation is herein incorporated by reference.

EXAMPLES

The Examples which follow serve to illustrate the invention. The compounds (and compositions) of the invention may be distinguished from known compounds (and compositions) by virtue of greater efficacy at low application rates, which can be verified by the person skilled in the art using the experimental procedures outlined in the Examples, using lower application rates if necessary, for example 50 ppm, 12.5 ppm, 6 ppm, 3 ppm, 1.5 ppm or 0.2 ppm of active ingredient(s).

Throughout this description, temperatures are given in degrees Celsius (° C.) and "m.p." means melting point. LC/MS means Liquid Chromatography Mass Spectrometry and the description of the apparatus and the methods are: Method A: ACQUITY UPLC from Waters, Waters UPLC HSS T3, 1.8 □m particle size, 30×2.1 mm column, 0.85 mL/min., 60° C., $H_2O$/MeOH 95:5+0.05% HCOOH (90%)/ $CH_3CN$+0.05% HCOOH (10%)—1.2 min.—$CH_3CN$+ 0.05% HCOOH (100%)—0.30 min., ACQUITY SQD Mass Spectrometer from Waters, ionization method: electrospray (ESI), Polarity: positive ions, Capillary (kV) 3.00, Cone (V) 30.00, Extractor (V) 2.00, Source Temperature (° C.) 150, Desolvation Temperature (° C.) 350, Cone Gas Flow (L/Hr) 0, Desolvation Gas Flow (L/Hr) 650).

Method B: ACQUITY UPLC from Waters, Waters UPLC HSS T3, 1.8 Dm particle size, 30×2.1 mm column, 0.85 mL/min., 60° C., $H_2O$/MeOH 95:5+0.05% HCOOH (90%)/ $CH_3CN$+0.05% HCOOH (10%)—2.7 min.—$CH_3CN$+ 0.05% HCOOH (100%)—0.30 min., ACQUITY SQD Mass Spectrometer from Waters, ionization method: electrospray (ESI), Polarity: positive ions, Capillary (kV) 3.00, Cone (V) 30.00, Extractor (V) 2.00, Source Temperature (° C.) 150, Desolvation Temperature (° C.) 350, Cone Gas Flow (L/Hr) 0, Desolvation Gas Flow (L/Hr) 650)).

Method C: MS: ZQ Mass Spectrometer from Waters (Single quadrupole mass spectrometer) Instrument Parameter: Ionisation method: Electrospray Polarity: positive (negative) ions Capillary (kV) 3.00, Cone (V) 30.00, Extractor (V) 2.00, Gas Temperature (° C.) 350, Drying Gas Flow (mL/min)9.8, Neb press 45 psig, Mass range: 90 to 1000 Da.

HPLC: HP 1100 HPLC from Agilent: solvent degasser, quaternary pump (ZCQ)/binary pump (ZDQ), heated column compartment and diode-array detector. Column: porpshell 120 C18, 2.7 m particle size, 120 Angström, 4.6×50 mm, Temp: 30° C. DAD Wavelength range (nm): 190 to 400 Solvent Gradient: A=water+0.1% HCOOH. B=Acetonitrile+0.08% HCOOH. Mobile phase:

| Time (min) | A % | B % | Flow (ml/min) |
|---|---|---|---|
| 0 | 85 | 15 | 0.6 |
| 4 | 5 | 95 | 0.6 |
| 10 | 5 | 95 | 0.6 |

Method D: Mass Spectrometer as method C.

HPLC: Shimadzu LC-20A. Column: Dikma, DiamonsilC18(2) (5 μm, 150*4.6 mm).

Mobile phase A: $H_2O$ (add 0.1% TFA); Mobile phase B: ACN (add 0.1% TFA). Flow: 1.0 ml/min.

Detection: UV@254 nm. Oven Temperature: 40° C. Mobile Phase:

| Time (mins) | A % | B % |
|---|---|---|
| 0 | 90 | 10 |
| 15 | 0 | 100 |
| 25 | 0 | 100 |
| 27 | 90 | 10 |
| 35 | 90 | 10 |

Formulation Examples

| Wettable powders | a) | b) | c) |
|---|---|---|---|
| active ingredients [components (A) and (B)] | 25% | 50% | 75% |
| sodium lignosulfonate | 5% | 5% | — |
| sodium lauryl sulfate | 3% | — | 5% |
| sodium diisobutylnaphthalenesulfonate | — | 6% | 10% |
| phenol polyethylene glycol ether (7-8 mol of ethylene oxide) | — | 2% | — |
| highly dispersed silicic acid | 5% | 10% | 10% |
| Kaolin | 62% | 27% | — |

The active ingredient is thoroughly mixed with the adjuvants and the mixture is thoroughly ground in a suitable mill, affording wettable powders that can be diluted with water to give suspensions of the desired concentration.

| Powders for dry seed treatment | a) | b) | c) |
|---|---|---|---|
| active ingredients [components (A) and (B)] | 25% | 50% | 75% |
| light mineral oil | 5% | 5% | 5% |
| highly dispersed silicic acid | 5% | 5% | — |

| Powders for dry seed treatment | a) | b) | c) |
|---|---|---|---|
| Kaolin | 65% | 40% | — |
| Talcum | — | — | 20% |

The active ingredient is thoroughly mixed with the adjuvants and the mixture is thoroughly ground in a suitable mill, affording powders that can be used directly for seed treatment.

| Emulsifiable concentrate | |
|---|---|
| active ingredients [components (A) and (B)] | 10% |
| octylphenol polyethylene glycol ether (4-5 mol of ethylene oxide) | 3% |
| calcium dodecylbenzenesulfonate | 3% |
| castor oil polyglycol ether (35 mol of ethylene oxide) | 4% |
| Cyclohexanone | 30% |
| xylene mixture | 50% |

Emulsions of any required dilution, which can be used in plant protection, can be obtained from this concentrate by dilution with water.

| Dusts | a) | b) | c) |
|---|---|---|---|
| active ingredients [components (A) and (B)] | 5% | 6% | 4% |
| talcum | 95% | — | — |
| Kaolin | — | 94% | — |
| mineral filler | — | — | 96% |

Ready-for-use dusts are obtained by mixing the active ingredient with the carrier and grinding the mixture in a suitable mill. Such powders can also be used for dry dressings for seed.

| Extruder granules | |
|---|---|
| active ingredients [components (A) and (B)] | 15% |
| sodium lignosulfonate | 2% |
| carboxymethylcellulose | 1% |
| Kaolin | 82% |

The active ingredient is mixed and ground with the adjuvants, and the mixture is moistened with water. The mixture is extruded and then dried in a stream of air.

| Coated granules | |
|---|---|
| active ingredients [components (A) and (B)] | 8% |
| polyethylene glycol (mol. wt. 200) | 3% |
| Kaolin | 89% |

The finely ground active ingredient is uniformly applied, in a mixer, to the kaolin moistened with polyethylene glycol. Non-dusty coated granules are obtained in this manner.

| Suspension concentrate | |
|---|---|
| active ingredients [components (A) and (B)] | 40% |
| propylene glycol | 10% |
| nonylphenol polyethylene glycol ether (15 mol of ethylene oxide) | 6% |
| Sodium lignosulfonate | 10% |
| carboxymethylcellulose | 1% |
| silicone oil (in the form of a 75% emulsion in water) | 1% |
| Water | 32% |

The finely ground active ingredient is intimately mixed with the adjuvants, giving a suspension concentrate from which suspensions of any desired dilution can be obtained by dilution with water. Using such dilutions, living plants as well as plant propagation material can be treated and protected against infestation by microorganisms, by spraying, pouring or immersion.

| Flowable concentrate for seed treatment | |
|---|---|
| active ingredients [components (A) and (B)] | 40% |
| propylene glycol | 5% |
| copolymer butanol PO/EO | 2% |
| tristyrenephenole with 10-20 moles EO | 2% |
| 1,2-benzisothiazolin-3-one (in the form of a 20% solution in water) | 0.5% |
| monoazo-pigment calcium salt | 5% |
| Silicone oil (in the form of a 75% emulsion in water) | 0.2% |
| Water | 45.3% |

The finely ground active ingredient is intimately mixed with the adjuvants, giving a suspension concentrate from which suspensions of any desired dilution can be obtained by dilution with water. Using such dilutions, living plants as well as plant propagation material can be treated and protected against infestation by microorganisms, by spraying, pouring or immersion.

Slow Release Capsule Suspension 28 parts of a combination of the active ingredients [components (A) and (B)] is mixed with 2 parts of an aromatic solvent and 7 parts of toluene diisocyanate/polymethylene-polyphenylisocyanate-mixture (8:1). This mixture is emulsified in a mixture of 1.2 parts of polyvinylalcohol, 0.05 parts of a defoamer and 51.6 parts of water until the desired particle size is achieved. To this emulsion a mixture of 2.8 parts 1,6-diaminohexane in 5.3 parts of water is added. The mixture is agitated until the polymerization reaction is completed. The obtained capsule suspension is stabilized by adding 0.25 parts of a thickener and 3 parts of a dispersing agent. The capsule suspension formulation contains 28% of the active ingredients. The medium capsule diameter is 8-15 microns. The resulting formulation is applied to seeds as an aqueous suspension in an apparatus suitable for that purpose.

List of Abbreviations: ° C.=degrees Celsius, $CDCl_3$=chloroform-d, d=doublet, $Pd_2(dba)_3$=Tris(dibenzylideneacetone)dipalladium(0), DIPEA=N,N-diisopropylethylamine, DMF=dimethylformamide, HATU=1-[Bis(dimethylamino)methylene]-1H-1,2,3-triazolo[4,5-b]pyridinium 3-oxid hexafluorophosphate, m=multiplet, MHz=mega hertz, mp=melting point, N=normal, ppm=parts per million, q=quartet, s=singlet, t=triplet, THF=tetrahydrofuran, Xantphos=4,5-Bis(diphenylphosphino)-9,9-dimethylxanthene

Preparation Examples

Using the synthetic techniques described both above and below, compounds of formula (I) may be prepared accordingly.

a) Preparation of methyl 2-[(2,6-difluoro-4-pyridyl)amino]-5-methyl-thiazole-4-carboxylate

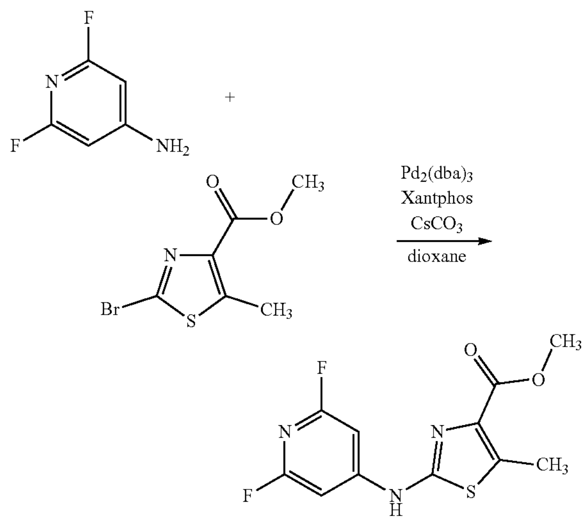

Under Argon atmosphere, Xantphos (0.2 equiv.), $Pd_2(dba)_3$ (0.1 equiv.) and cesium carbonate (2 equiv.) were added to a degassed, stirred mixture of methyl 2-bromo-5-methyl-thiazole-4-carboxylate (4.6 g, 18.5 mmol, 1 equiv.) and 2,6-difluoropyridin-4-amine (1 equiv.) in 1,4-dioxane (660 mL). The reaction was heated to reflux and stirred for 4 h before allowing the temperature to cool to room temperature. The mixture was diluted with ethyl acetate and filtered over Celite, and the resulting filtrate was concentrated using a rotatory evaporator. Purification by column chromatography on silica gel (eluent mixtures cyclohexane/ethyl acetate) afforded the desired methyl 2-[(2,6-difluoro-4-pyridyl)amino]-5-methyl-thiazole-4-carboxylate (1.8 g, 6.31 mmol). $^1$H-NMR (400 MHz, $CDCl_3$): δ=2.73 (s, 3H), 3.94 (s, 3H), 6.75 (s, 1H).

b) Preparation of 2-[(2,6-difluoro-4-pyridyl)amino]-5-methyl-thiazole-4-carboxylic acid

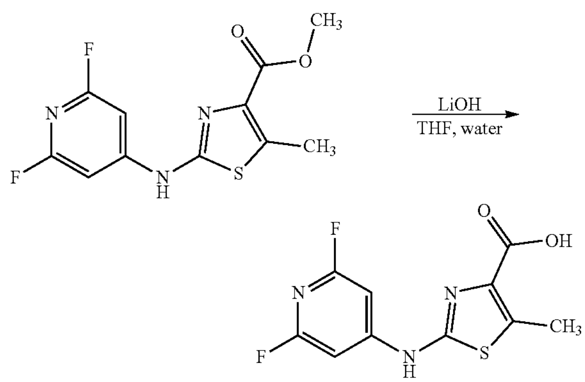

Lithium hydroxide monohydrate (4 equiv.) was added to a solution of 2-[(2,6-difluoro-4-pyridyl)amino]-5-methyl-thiazole-4-carboxylic acid (1.8 g, 6.31 mmol) in a mixture of tetrahydrofuran (35 mL) and water (12 mL). The reaction mixture was stirred 16 h at room temperature, then the solvents were removed in vacuo. The residue was diluted with ethyl acetate and water, then 2 N hydrochloric acid was slowly added until a pH of 3-4 was reached. The formed precipitate was isolated by filtration and washed twice with water, giving the desired product 2-[(2,6-difluoro-4-pyridyl)amino]-5-methyl-thiazole-4-carboxylic acid (1.55 g, 5.71 mmol). $^1$H-NMR (400 MHz, $(CD_3)_2SO$): δ=2.69 (s, 3H), 7.30 (s, 2H), 11.35 (bs, 1H), 12.90 (bs, 1H).

c) Preparation of 2-[(2,6-difluoro-4-pyridyl)amino]-N-(2,2-dimethylcyclobutyl)-5-methyl-thiazole-4-carboxamide

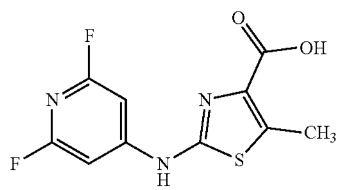

+

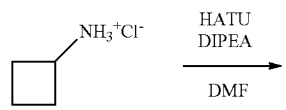

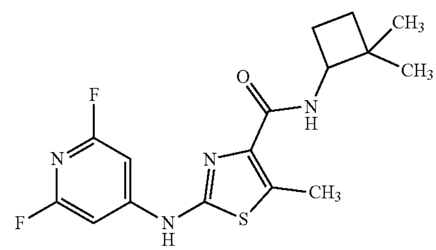

(2,2-dimethylcyclobutyl) ammonium chloride (1.1 equiv.), HATU (1.1. equiv.), and DIP{EA (2.6 equiv.), were added in sequence to a DMF solution (9.2 mL) of 2-[(2,6-difluoro-4-pyridyl)amino]-5-methyl-thiazole-4-carboxylic acid (250 mg, 0.92 mmol, 1 equiv.). The resulting solution was stirred at room temperature for 1 h until consumption of starting material (LCMS control). Then a saturated $NaHCO_3$ solution was added to the mixture and the solution extracted three times with ethyl acetate. The organic phases were combined, dried over sodium sulphate and the volatiles removed by rotatory evaporator. Purification by column chromatography on silica gel (eluent: mixtures of cyclohexane/ethyl acetate) gave the desired product 2-[(2,6-difluoro-4-pyridyl)amino]-N-(2,2-dimethylcyclobutyl)-5-methyl-thiazole-4-carboxamide (280 mg, 86% yield). $^1$H-NMR (400 MHz, $CDCl_3$): δ=1.17 (s, 3H), 1.20 (s, 3H), 1.50-1.75 (m, 2H), 1.86-1.92 (m, 1H), 2.29-2.36 (m, 1H), 2.79 (s, 3H), 4.25-4.31 (m, 1H), 6.87 (s, 2H), 7.32 (d, 1H), 7.67 (s, 1H).

d) 2-[acetyl-(2,6-difluoro-4-pyridyl)amino]-N-(2,2-dimethylcyclobutyl)-5-methyl-thiazole-4-carboxamide (Compound X.36)

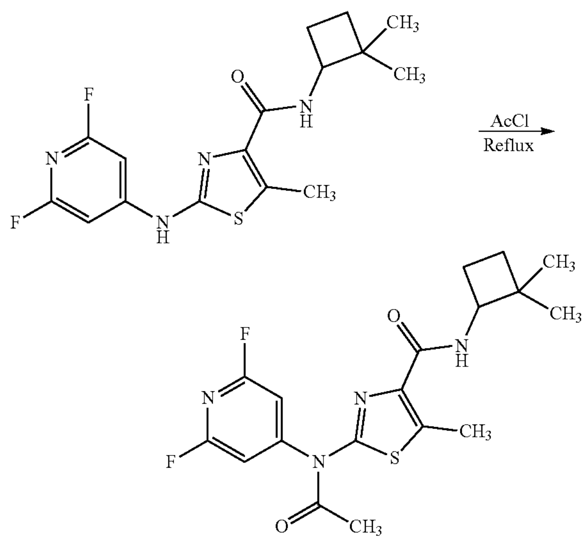

A mixture of 2-[(2,6-difluoro-4-pyridyl)amino]-N-(2,2-dimethylcyclobutyl)-5-methyl-thiazole-4-carboxamide (1.9 g, 5.4 mmol) in acetyl chloride (20 ml) was stirred under reflux for 3 days. The reaction was then allowed to cool to room temperature and the volatiles removed by rotatory evaporator. Purification of the crude material obtained by column chromatography on silica gel (eluent: mixtures of cyclohexane/ethyl acetate) gave the desired product 2-[acetyl-(2,6-difluoro-4-pyridyl)amino]-N-(2,2-dimethylcyclobutyl)-5-methyl-thiazole-4-carboxamide (1.57 g, 3.98 mmol, 74% yield). $^1$H-NMR (400 MHz, $CDCl_3$): δ=0.92 (s, 3H), 1.12 (s, 3H), 1.48-1.75 (m, 3H), 2.10-2.30 (m, 1H), 2.17 (s, 3H), 2.79 (s, 3H), 4.25-4.31 (m, 1H), 6.87 (s, 2H), 7.32 (d, 1H).

2-[(2,6-difluoro-4-pyridyl)-(2-methylpropanoyl)amino]-N-(2,2-dimethylcyclobutyl)-5-methyl-thiazole-4-carboxamide (compound X.38) may be prepared in an analogous fashion. $^1$H NMR (400 MHz, $CDCl_3$) δ ppm 0.92 (s, 3H) 1.12 (s, 3H) 1.18-1.26 (m, 6H) 1.47-1.63 (m, 2H) 1.63-1.76 (m, 1H) 2.25 (m, 1H) 2.55-2.71 (m, 1H) 2.80 (s, 3H) 4.20 (m, 1H) 6.90 (s, 2H) 7.00 (br d, 1H).

methyl (Z)-2-(5-cyclopentyl-2-methyl-phenoxy)-3-methoxy-prop-2-enoate may be prepared as follows: Under an argon atmosphere, a zinc chloride 1 M THF solution (2.54 mmol) was added to a cyclopentyl magnesium bromide 2M THF solution (2.54 mmol) and the pale-yellow suspension was stirred at RT for 10 min during time which a small exotherm was observed. After, a solution of methyl (Z)-2-(5-bromo-2-methyl-phenoxy)-3-methoxy-prop-2-enoate (0.153 g, 0.51 mmol) in tetrahydrofuran (2.5 mL) and $PdCl_2$(dppf) (0.19 g, 0.025 mmol) were added and the pale yellow suspension was heated at 50° C. for 3 hours. The reaction mixture was then allowed to reach RT, quenched with an aqueous saturated $NH_4Cl$ solution, and extracted with tert-butyl methylether. The total combined organic fraction was then washed with water and brine, dried over sodium sulfate, filtered, and concentrated under reduced pressure. The resultant crude residue was purified by flash chromatography (cyclohexane:EtOAc gradient) to give 0.106 mg the title compound as a white solid (mp 80-83° C.). $^1$H NMR (400 MHz, $CDCl_3$) δ ppm: 7.35 (s, 1H), 7.09 (d, 1H), 6.82 (d, 1H), 6.60 (s, 1H), 3.90 (s, 3H), 3.72 (s, 3H), 2.91 (m, 1H), 2.32 (s, 3H), 2.10-1.97 (m, 2H), 1.85-1.75 (m, 2H), 1.74-1.65 (m, 2H), 1.60-1.45 (m, 2H).

The skilled person will recognize that methyl (Z)-2-(5-cyclohexyl-2-methyl-phenoxy)-3-methoxy-prop-2-enoate can be synthesized using an equivalent method, by replacing cyclopentyl magnesium bromide with cyclohexyl magnesium bromide.

methyl (Z)-2-[5-(4-bromothiazol-2-yl)-2-methyl-phenoxy]-3-methoxy-prop-2-enoate may be prepared as follows:

To a solution of [3-[(Z)-2-methoxy-1-methoxycarbonyl-vinyloxy]-4-methyl-phenyl]boronic acid (1 g, 3.76 mmol, 1.00 equiv.) and 2,4-dibromothiazole (1.37 g, 5.64 mmol, 1.50 equiv.) in 1,4-dioxane (15 mL) and water (3 mL) under argon was added sodium carbonate (1.19 g, 11.28 mmol, 3 equiv.) and Pd(dppf$Cl_2$-DCM (0.157 g, 0.188 mmol, 0.05 equiv.). The reaction was warmed to 90° C. and stirred at this temperature for 2 h. The resulting dark brown solution was cooled to RT, diluted with EtOAc and washed with aq. saturated $NaHCO_3$ solution. The organic layer was washed with brine, dried over $Na_2SO_4$, filtered and concentrated in vacuo. The residue was purified by flash chromatography (cyclohexane:EtOAc) to give methyl (Z)-2-[5-(4-bromothiazol-2-yl)-2-methyl-phenoxy]-3-methoxy-prop-2-enoate as an orange solid. $^1$H NMR (400 MHz, $CDCl_3$) δ ppm=7.43-7.47 (dd, 1H), 7.32-7.34 (d, 1H), 7.28-7.30 (s, 1H), 7.21-7.25 (m, 1H), 7.18 (s, 1H), 3.93 (s, 3H), 3.74 (s, 3H), 2.41 (s, 3H).

methyl (Z)-3-methoxy-2-[2-methyl-5-[5-(trifluoromethyl)thiazol-2-yl]phenoxy]prop-2-enoate may be prepared as follows: To a solution of methyl (Z)-3-methoxy-2-[2-methyl-5-(4,4,5,5-tetramethyl-1,3,2-dioxaborolan-2-yl)phenoxy]prop-2-enoate (5.00 g, 14.4 mmol) in tetrahydrofuran: water mixture (4:1 VN, 72 mL) was added sodium periodate (9.31 g, 43.1 mmol, 3.00 equiv.) followed by an aqueous solution of HCl (2.0 M, 1.79 mL, 3.59 mmol, 0.25 equiv.). The obtained white suspension was stirred at room temperature for 4 h, then EtOAc and water were added. The layers were separated, and the aqueous phase was extracted with EtOAc. The total combined organic layer was washed with brine, dried with $Na_2SO_4$, filtered and concentrated in vacuo to give [3-[(Z)-2-methoxy-1-methoxycarbonyl-vinyloxy]-4-methyl-phenyl]boronic acid as a white solid. $^1$H NMR (400 MHz, DMSO) δ ppm 7.96 (brs, 2H), 7.54 (s, 1H), 7.33 (d, 1H), 7.12 (m, 2H), 3.85 (s, 3H), 3.64 (s, 3H), 2.23 (s, 3H).

Then: To a solution of [3-[(Z)-2-methoxy-1-methoxycarbonyl-vinyloxy]-4-methyl-phenyl]boronic acid (5.0 g, 19 mmol) and 2-bromo-5-(trifluoromethyl)thiazole (1.2 equiv.) in 1,4-dioxane (38 mL) and water (3.8 mL), degassed with argon, X-Phos Pd G2 (0.032 equiv.) was added then cesium carbonate (2.0 equiv.). Reaction mixture was stirred at 90° C. for 2 h. The dark brown solution was allowed to come back at RT, diluted with EtOAc and washed with aq. $NaHCO_3$ solution and brine. The organic layer was dried with $MgSO_4$, filtered. and concentrated in vacuo. The residue was purified by flash chromatography (cyclohexane: EtOAc) to give methyl (Z)-3-methoxy-2-[2-methyl-5-[5-(trifluoromethyl)thiazol-2-yl]phenoxy]prop-2-enoate.

The skilled person will recognize that methyl (Z)-2-[5-(4-cyclohexylthiazol-2-yl)-2-methyl-phenoxy]-3-methoxy-prop-2-enoate and methyl (Z)-2-[5-[4-(ethoxymethyl)thiazol-2-yl]-2-methyl-phenoxy]-3-methoxy-prop-2-enoate can be synthesized using an equivalent method, by replacing 2-bromo-5-(trifluoromethyl)thiazole with the suitable thiazole group.

TABLE T1

| No. | Compound Name | Structure | Mp (° C.) | LC/MS |
|---|---|---|---|---|
| X.01 | [2-[(2,6-difluoro-4-pyridyl)-[5-methyl-4-(spiro[3.4]octan-3-ylcarbamoyl)thiazol-2-yl]amino]-1-methyl-2-oxo-ethyl]acetate | 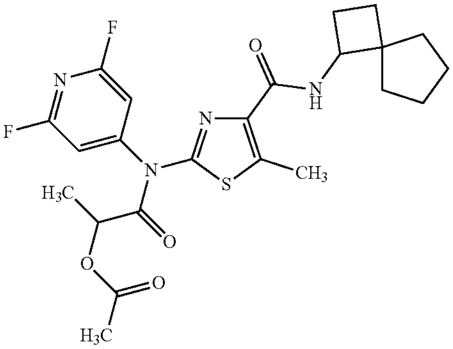 [SMILES: CC(=O)OC(C)C(=O)N(c1cc(F)nc(F)c1)c1nc(C(=O)NC2CCC23CCCC3)c(C)s1] | | $R_t$ = 5.10 min (C); MS: m/z = 493 (M + 1) |
| X.02 | [2-[4-(cyclobutylcarbamoyl)-5-methyl-thiazol-2-yl]-(2,6-difluoro-4-pyridyl)amino]-1-methyl-2-oxo-ethyl]ethyl carbonate | 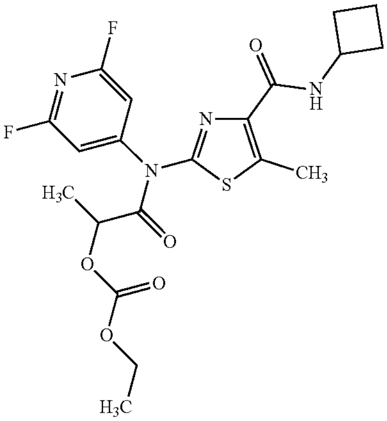 [SMILES: CCOC(=O)OC(C)C(=O)N(c1cc(F)nc(F)c1)c1nc(C(=O)NC2CCC2)c(C)s1] | 105-106 | $R_t$ = 15.33 min (D); MS: m/z = 469 (M + 1) |
| X.03 | [2-[(2,6-difluoro-4-pyridyl)-[5-methyl-4-(spiro[3.4]octan-3-ylcarbamoyl)thiazol-2-ylamino]-1-methyl-2-oxo-ethyl]methyl carbonate | 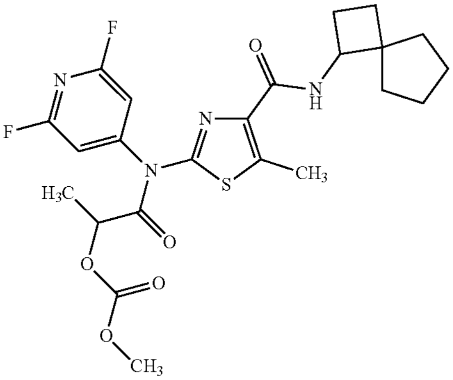 [SMILES: COC(=O)OC(C)C(=O)N(c1cc(F)nc(F)c1)c1nc(C(=O)NC2CCC23CCCC3)c(C)s1] | | $R_t$ = 5.18 min (C); MS: m/z = 509 (M + 1) |

Melting point (mp) data and/or retention times ($R_t$) for compounds X.01 to X.38 according to formula (I):

TABLE T1-continued

Melting point (mp) data and/or retention times ($R_t$) for compounds X.01 to X.38 according to formula (I):

| No. | Compound Name | Structure | Mp (° C.) | LC/MS |
|---|---|---|---|---|
| X.04 | [2-[(2,6-difluoro-4-pyridyl)-[5-methyl-4-(spiro[3.4]octan-3-ylcarbamoyl)thiazol-2-yl]amino]-1-methyl-2-oxo-ethyl]ethyl carbonate | 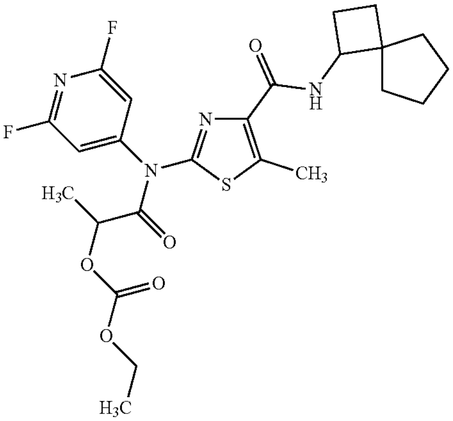 [SMILES: CCOC(=O)OC(C)C(=O)N(c1cc(F)nc(F)c1)c1nc(C(=O)NC2CCC23CCCC3)c(C)s1] | 106-108 | $R_t$ = 5.41 min (C); MS: m/z = 523 (M + 1) |
| X.05 | 2-[(2,6-difluoro-4-pyridyl)-(2-hydroxypropanoyl)amino]-5-methyl-N-spiro[3.4]octan-3-yl-thiazole-4-carboxamide | 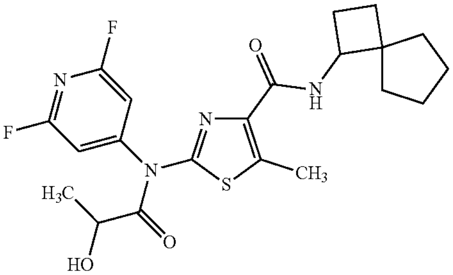 [SMILES: Cc1sc(N(C(=O)C(C)O)c2cc(F)nc(F)c2)nc1C(=O)NC1CCC12CCCC2] | 101-103 | $R_t$ = 5.15 min (C); MS: m/z = 451 (M + 1) |
| X.06 | 2-[2-benzyloxypropanoyl-(2,6-difluoro-4-pyridyl)amino]-N-cyclobutyl-5-methyl-thiazole-4-carboxamide | 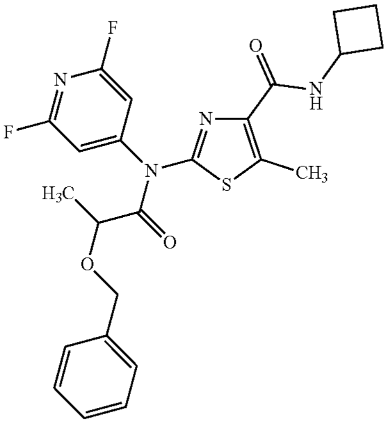 | 98-100 | $R_t$ = 5.10 min (C); MS: m/z = 497 (M + 1) |
| X.07 | N-cyclobutyl-2-[(2,6-difluoro-4-pyridyl)-(2-methoxypropanoyl)amino]-5-methyl-thiazole-4-carboxamide | 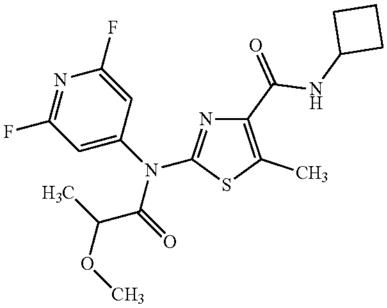 [SMILES: COC(C)C(=O)N(c1cc(F)nc(F)c1)c1nc(C(=O)NC2CCC2)c(C)s1] | 128-130 | $R_t$ = 13.80 min (D); MS: m/z = 411 (M + 1) |

TABLE T1-continued

| Melting point (mp) data and/or retention times ($R_t$) for compounds X.01 to X.38 according to formula (I): | | | | |
|---|---|---|---|---|
| No. | Compound Name | Structure | Mp (° C.) | LC/MS |
| X.08 | [2-[(2,6-difluoro-4-pyridyl)-[4-[(2,2-dimethylcyclobutyl) carbamoyl]-5-methyl-thiazol-2-yl]amino]-2-oxo-ethyl]acetate | 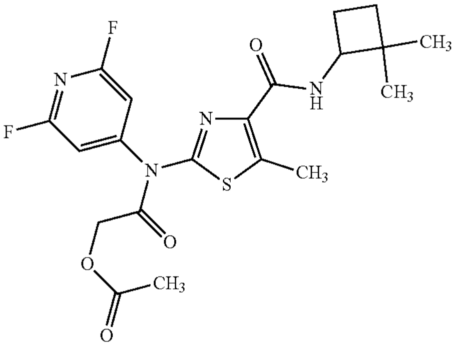 [SMILES: CC(=O)OCC(=O)N(c1cc(F)nc(F)c1)c1nc(C(=O)NC2CCC2(C)C)c(C)s1] | 65.5-67.2 | $R_t$ = 1.10 min (A); MS: m/z = 453 (M + 1) |
| X.09 | 2-[(2,6-difluoro-4-pyridyl)-(2-phenylacetyl)amino]-N-(2,2-dimethylcyclobutyl)-5-methyl-thiazole-4-carboxamide | 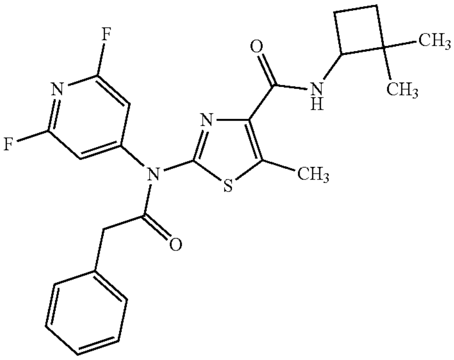 [SMILES: Cc1sc(N(C(=O)Cc2ccccc2)c2cc(F)nc(F)c2)nc1C(=O)NC1CCC1(C)C] | | $R_t$ = 1.23 min (A); MS: m/z = 471 (M + 1) |
| X.10 | 2-[acetyl-(2,6-difluoro-4-pyridyl)amino]-5-methoxy-N-spiro[3.4]octan-3-yl-thiazole-4-carboxamide | 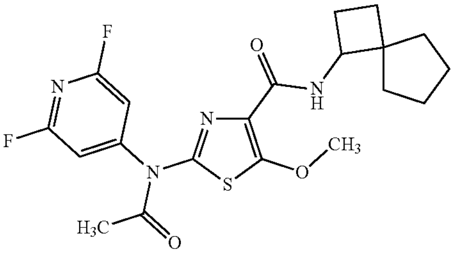 [SMILES: COc1sc(N(C(C)=O)c2cc(F)nc(F)c2)nc1C(=O)NC1CCC12CCCC2] | 199-200 | $R_t$ = 1.06 min (A); MS: m/z = 437 (M + 1) |
| X.11 | 2-[(2,6-difluoro-4-pyridyl)-(2-methoxyacetyl)amino]-5-methyl-N-spiro[3.4]octan-3-yl-thiazole-4-carboxamide | 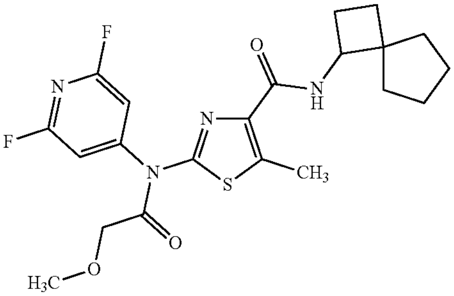 [SMILES: COCC(=O)N(c1cc(F)nc(F)c1)c1nc(C(=O)NC2CCC23CCCC3)c(C)s1] | | $R_t$ = 15.94 min (D); MS: m/z = 451 (M + 1) |

TABLE T1-continued

| Melting point (mp) data and/or retention times ($R_t$) for compounds X.01 to X.38 according to formula (I): | | | | |
|---|---|---|---|---|
| No. | Compound Name | Structure | Mp (° C.) | LC/MS |
| X.12 | N-cyclobutyl-2-[(2,6-difluoro-4-pyridyl)-(2-methoxyacetyl)amino]-5-methyl-thiazole-4-carboxamide | 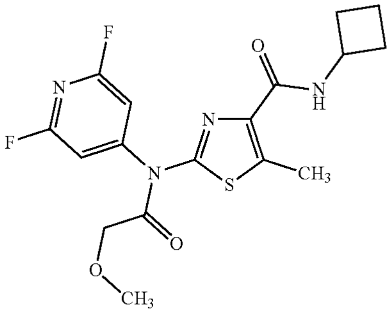 [SMILES: COCC(=O)N(c1cc(F)nc(F)c1)c1nc(C(=O)NC2CCC2)c(C)s1] | | $R_t$ = 13.64 min (D); MS: m/z = 398 (M + 1) |
| X.13 | 2-[acetyl-(2,6-difluoro-4-pyridyl)amino]-N-cyclobutyl-5-methyl-thiazole-4-carboxamide | 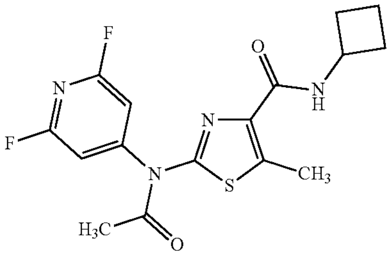 [SMILES: CC(=O)N(c1cc(F)nc(F)c1)c1nc(C(=O)NC2CCC2)c(C)s1] | 174-175 | $R_t$ = 13.92 min (D); MS: m/z = 367 (M + 1) |
| X.14 | 2-[(2-benzyloxyacetyl)-(2,6-difluoro-4-pyridyl)amino]-N-(2,2-dimethylcyclobutyl)-5-methyl-thiazole-4-carboxamide | 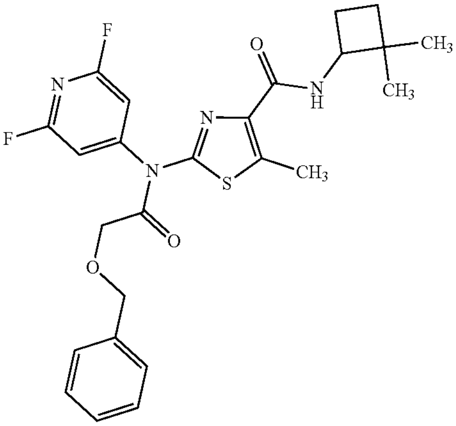 [SMILES: Cc1sc(N(C(=O)COCc2ccccc2)c2cc(F)nc(F)c2)nc1C(=O)NC1CCC1(C)C] | 182.9-187.1 | $R_t$ = 1.22 min (A); MS: m/z = 501 (M + 1) |
| X.15 | 2-[(2,6-difluoro-4-pyridyl)-(2-ethoxyacetyl)amino]-N-(2,2-dimethylcyclobutyl)-5-methyl-thiazole-4-carboxamide | 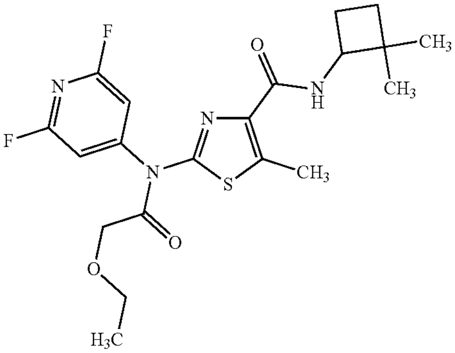 [SMILES: CCOCC(=O)N(c1cc(F)nc(F)c1)c1nc(C(=O)NC2CCC2(C)C)c(C)s1] | 146.1-147.6 | $R_t$ = 1.14 min (A); MS: m/z = 439 (M + 1) |

TABLE T1-continued

| Melting point (mp) data and/or retention times ($R_t$) for compounds X.01 to X.38 according to formula (I): | | | | |
|---|---|---|---|---|
| No. | Compound Name | Structure | Mp (° C.) | LC/MS |
| X.16 | 2-[diethylcarbamoyl-(2,6-difluoro-4-pyridyl)amino]-N-(2,2-dimethylcyclobutyl)-5-methyl-thiazole-4-carboxamide | 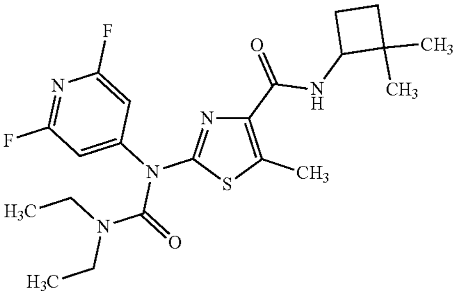 [SMILES: CCN(CC)C(=O)N(c1cc(F)nc(F)c1)c1nc(C(=O)NC2CCC2(C)C)c(C)s1] | | $R_t$ = 1.19 min (A); MS: m/z = 452 (M + 1) |
| X.17 | 2-[(2-chloroacetyl)-(2,6-difluoro-4-pyridyl)amino]-N-(2,2-dimethylcyclobutyl)-5-methyl-thiazole-4-carboxamide | 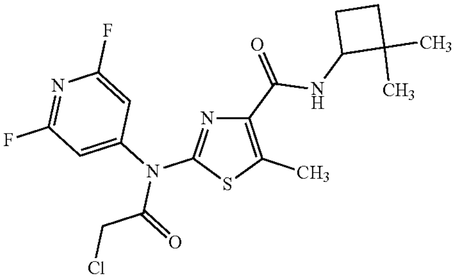 [SMILES: Cc1sc(N(C(=O)CCl)c2cc(F)nc(F)c2)nc1C(=O)NC1CCC1(C)C] | 155.6-157.1 | $R_t$ = 1.11 min (A); MS: m/z = 429/431 (M + 1) |
| X.18 | methyl 3-[(2,6-difluoro-4-pyridyl)-[4-[(2,2-dimethyl cyclobutyl)carbamoyl]-5-methyl-thiazol-2-yl]amino]-3-oxo-propanoate | 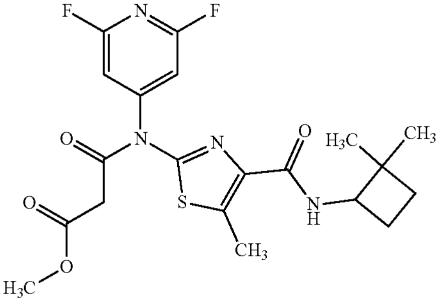 [SMILES: COC(=O)CC(=O)N(c1cc(F)nc(F)c1)c1nc(C(=O)NC2CCC2(C)C)c(C)s1] | | $R_t$ = 1.09 min (A); MS: m/z = 453 (M + 1) |
| X.19 | 2-[(2,6-difluoro-4-pyridyl)-(furan-2-carbonyl)amino]-N-(2,2-dimethyl cyclobutyl)-5-methyl-thiazole-4-carboxamide | 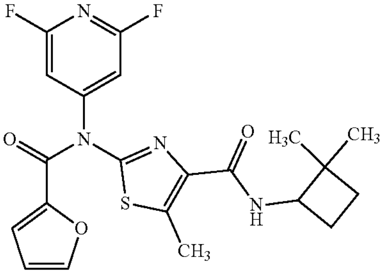 [SMILES: Cc1sc(N(C(=O)c2ccco2)c2cc(F)nc(F)c2)nc1C(=O)NC1CCC1(C)C] | 166-172 | $R_t$ = 1.15 min (A); MS: m/z = 447 (M + 1) |

TABLE T1-continued

Melting point (mp) data and/or retention times ($R_t$) for compounds X.01 to X.38 according to formula (I):

| No. | Compound Name | Structure | Mp (° C.) | LC/MS |
|---|---|---|---|---|
| X.20 | methyl 5-[(2,6-difluoro-4-pyridyl)-[4-[(2,2-dimethyl cyclobutyl)carbamoyl]-5-methyl-thiazol-2-yl]amino]-5-oxo-pentanoate | 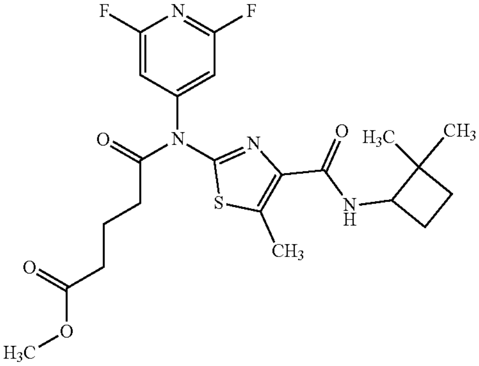 [SMILES: COC(=O)CCCC(=O)N(c1cc(F)nc(F)c1)c1nc(C(=O)NC2CCC2(C)C)c(C)s1] | 175-178 | $R_t$ = 1.12 min (A); MS: m/z = 481 (M + 1) |
| X.21 | 2-[(2,6-difluoro-4-pyridyl)-(3,3,3-trifluoropropanoyl)amino]-N-(2,2-dimethyl cyclobutyl)-5-methyl-thiazole-4-carboxamide | 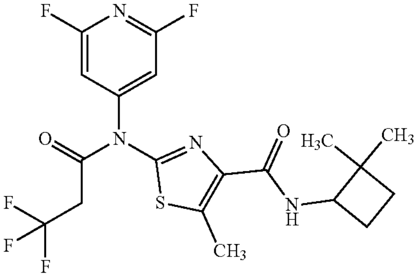 [SMILES: Cc1sc(N(C(=O)CC(F)(F)F)c2cc(F)nc(F)c2)nc1C(=O)NC1CCC1(C)C] | 157-163 | $R_t$ = 1.15 min (A); MS: m/z = 463 (M + 1) |
| X.22 | S-isopropyl N-(2,6-difluoro-4-pyridyl)-N-[4-[(2,2-dimethyl cyclobutyl)carbamoyl]-5-methyl-thiazol-2-yl]carbamothioate | 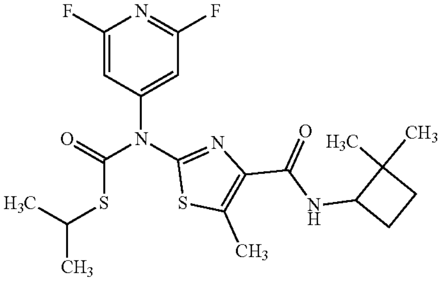 [SMILES: Cc1sc(N(C(=O)SC(C)C)c2cc(F)nc(F)c2)nc1C(=O)NC1CCC1(C)C] | 155-158 | $R_t$ = 1.28 min (A); MS: m/z = 455 (M + 1) |
| X.23 | methyl 4-[(2,6-difluoro-4-pyridyl)-[4-[(2,2-dimethyl cyclobutyl)carbamoyl]-5-methyl-thiazol-2-yl]amino]-4-oxo-butanoate | 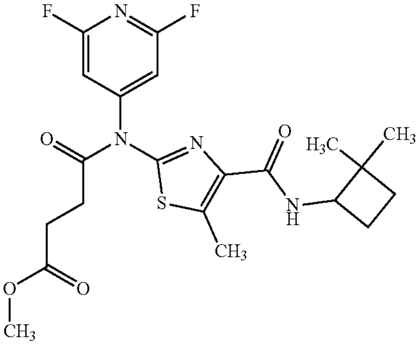 [SMILES: COC(=O)CCC(=O)N(c1cc(F)nc(F)c1)c1nc(C(=O)NC2CCC2(C)C)c(C)s1] | 160-163 | $R_t$ = 1.11 min (A); MS: m/z = 467 (M + 1) |

TABLE T1-continued

| Melting point (mp) data and/or retention times ($R_t$) for compounds X.01 to X.38 according to formula (I): | | | | |
|---|---|---|---|---|
| No. | Compound Name | Structure | Mp (° C.) | LC/MS |
| X.24 | 2-[cyclopropane carbonyl-(2,6-difluoro-4-pyridyl)amino]-N-(2,2-dimethyl cyclobutyl)-5-methyl-thiazole-4-carboxamide | 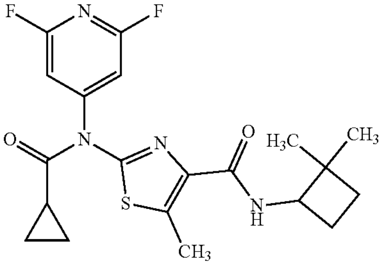 [SMILES: Cc1sc(N(C(=O)C2CC2)c2cc(F)nc(F)c2)nc1C(=O)NC1CCC1(C)C] | 165-170 | $R_t$ = 1.16 min (A); MS: m/z = 421 (M + 1) |
| X.25 | prop-2-ynyl N-(2,6-difluoro-4-pyridyl)-N-[4-[(2,2-dimethyl cyclobutyl)carbamoyl]-5-methyl-thiazol-2-yl]carbamate | 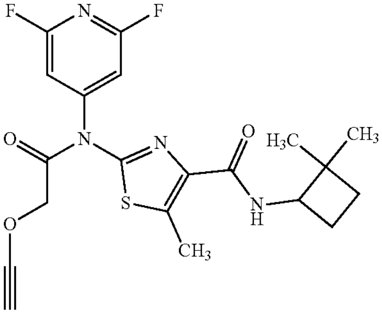 [SMILES: C#COCC(=O)N(c1cc(F)nc(F)c1)c1nc(C(=O)NC2CCC2(C)C)c(C)s1] | 129-131 | $R_t$ = 1.14 min (A); MS: m/z = 435 (M + 1) |
| X.26 | phenyl N-(2,6-difluoro-4-pyridyl)-N-[4-[(2,2-dimethylcyclobutyl) carbamoyl]-5-methyl-thiazol-2-yl]carbamate | 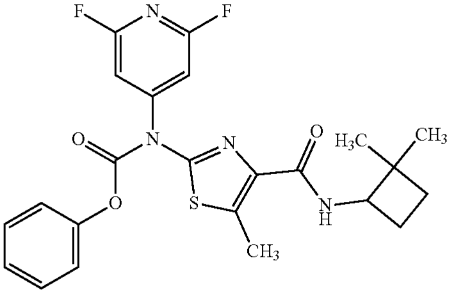 [SMILES: Cc1sc(N(C(=O)Oc2ccccc2)c2cc(F)nc(F)c2)nc1C(=O)NC1CCC1(C)C] | 138-140 | $R_t$ = 1.23 min (A); MS: m/z = 473 (M + 1) |
| X.27 | 2-[(2,6-difluoro-4-pyridyl)-(2-fluoroacetyl)amino]-N-(2,2-dimethyl cyclobutyl)-5-methyl-thiazole-4-carboxamide | 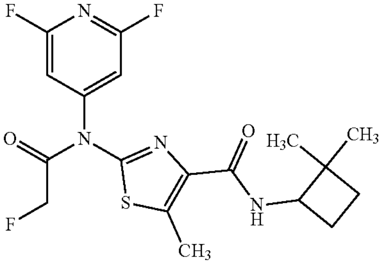 [SMILES: Cc1sc(N(C(=O)CF)c2cc(F)nc(F)c2)nc1C(=O)NC1CCC1(C)C] | 158-162 | $R_t$ = 1.09 min (A); MS: m/z = 413 (M + 1) |
| X.28 | 2-methoxyethyl N-(2,6-difluoro-4-pyridyl)-N-[4-[(2,2-dimethylcyclobutyl) carbamoyl]-5-methyl-thiazol-2-yl]carbamate | 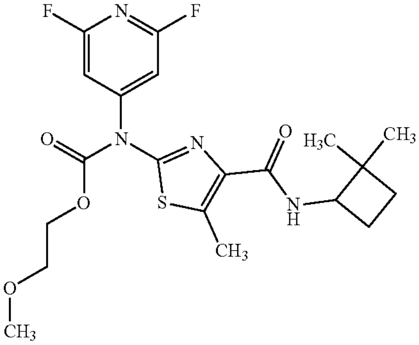 [SMILES: COCCOC(=O)N(c1cc(F)nc(F)c1)c1nc(C(=O)NC2CCC2(C)C)c(C)s1] | | $R_t$ = 1.14 min (A); MS: m/z = 455 (M + 1) |

TABLE T1-continued

| Melting point (mp) data and/or retention times ($R_t$) for compounds X.01 to X.38 according to formula (I): | | | | |
|---|---|---|---|---|
| No. | Compound Name | Structure | Mp (° C.) | LC/MS |
| X.29 | 2-[(2,6-difluoro-4-pyridyl)-(2-methoxyacetyl)amino]-N-(2,2-dimethyl cyclobutyl)-5-methyl-thiazole-4-carboxamide | 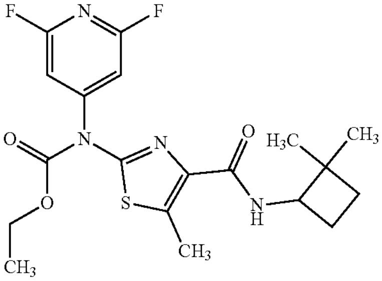 [SMILES: CCOC(=O)N(c1cc(F)nc(F)c1)c1nc(C(=O)NC2CCC2(C)C)c(C)s1] | 102-108 | $R_t$ = 1.08 min (A); MS: m/z = 425 (M + 1) |
| X.30 | ethyl N-(2,6-difluoro-4-pyridyl)-N-[4-[(2,2-dimethylcyclobutyl) carbamoyl]-5-methyl-thiazol-2-yl]carbamate | 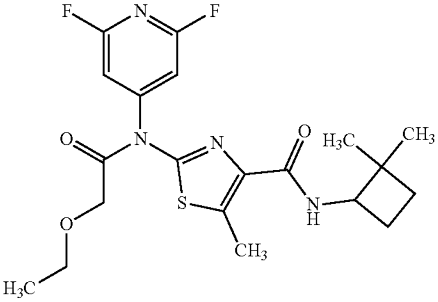 | | $R_t$ = 1.16 min (A); MS: m/z = 425 (M + 1) |
| X.31 | 2-[(2,6-difluoro-4-pyridyl)-(thiophene-2-carbonyl)amino]-N-(2,2-dimethyl cyclobutyl)-5-methyl-thiazole-4-carboxamide | 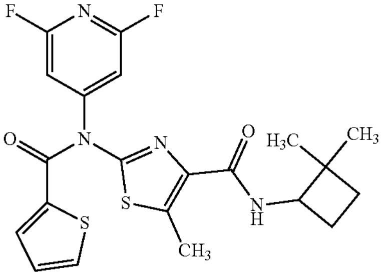 [SMILES: Cc1sc(N(C(=O)c2cccs2)c2cc(F)nc(F)c2)nc1C(=O)NC1CCC1(C)C] | 178-185 | $R_t$ = 1.19 min (A); MS: m/z = 463 (M + 1) |
| X.32 | methyl N-(2,6-difluoro-4-pyridyl)-N-[4-[(2,2-dimethylcyclobutyl) carbamoyl]-5-methyl-thiazol-2-yl]carbamate | 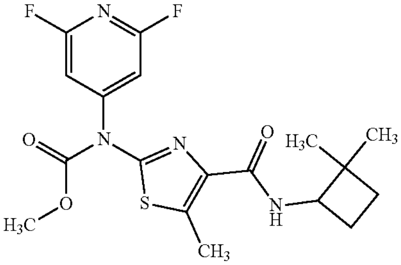 [SMILES: COC(=O)N(c1cc(F)nc(F)c1)c1nc(C(=O)NC2CCC2(C)C)c(C)s1] | | $R_t$ = 1.14 min (A); MS: m/z = 411 (M + 1) |
| X.33 | 2-[(2,6-difluoro-4-pyridyl)-formyl-amino]-N-(2,2-dimethyl cyclobutyl)-5-methyl-thiazole-4-carboxamide | 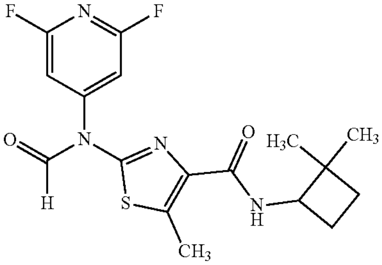 [SMILES: Cc1sc(N(C=O)c2cc(F)nc(F)c2)nc1C(=O)NC1CCC1(C)C] | 132-135 | $R_t$ = 1.09 min (A); MS: m/z = 381 (M + 1) |

TABLE T1-continued

Melting point (mp) data and/or retention times ($R_t$) for compounds X.01 to X.38 according to formula (I):

| No. | Compound Name | Structure | Mp (° C.) | LC/MS |
|---|---|---|---|---|
| X.34 | ethyl 2-[(2,6-difluoro-4-pyridyl)-[4-[(2,2-dimethylcyclobutyl) carbamoyl]-5-methyl-thiazol-2-yllamino]-2-oxo-acetate | 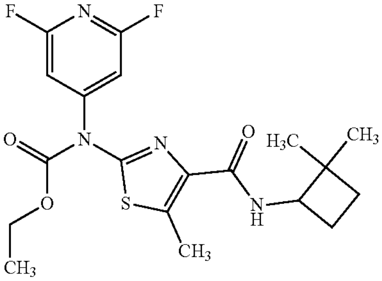 | 159-161 | $R_t$ = 1.17 min (A); MS: m/z = 453 (M + 1) |
| X.35 | 2-[benzoyl-(2,6-difluoro-4-pyridyl)amino]-N-(2,2-dimethylcyclobutyl)-5-methyl-thiazole-4-carboxamide | 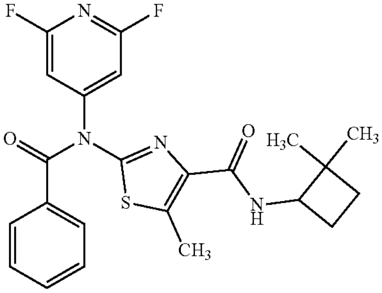 [SMILES: Cc1sc(N(C(=O)c2ccccc2)c2cc(F)nc(F)c2)nc1C(=O)NC1CCC1(C)C] | 142-151 | $R_t$ = 1.19 min (A); MS: m/z = 457 (M + 1) |
| X.36 | 2-[acetyl-(2,6-difluoro-4-pyridyl)amino]-N-(2,2-dimethyl cyclobutyl)-5-methyl-thiazole-4-carboxamide | 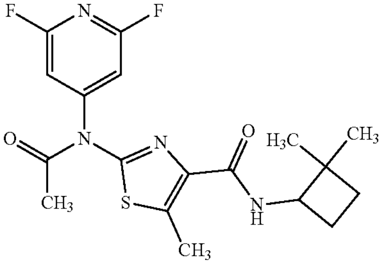 [SMILES: CC(=O)N(c1cc(F)nc(F)c1)c1nc(C(=O)NC2CCC2(C)C)c(C)s1] | 141-145 | $R_t$ = 1.09 min (A); MS: m/z = 395 (M + 1) |
| X.37 | 2-[acetyl-(2,6-difluoro-4-pyridyl)amino]-5-methyl-N-spiro[3.4]octan-3-yl-thiazole-4-carboxamide | 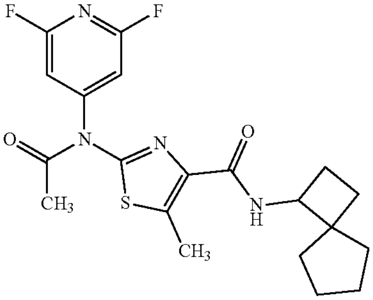 [SMILES: CC(=O)N(c1cc(F)nc(F)c1)c1nc(C(=O)NC2CCC23CCCC3)c(C)s1] | | $R_t$ = 1.15 min (A); MS: m/z = 421 (M + 1) |
| X.38 | 2-[(2,6-difluoro-4-pyridyl)-(2-methylpropanoyl)amino]-N-(2,2-dimethylcyclobutyl)-5-methyl-thiazole-4-carboxamide | 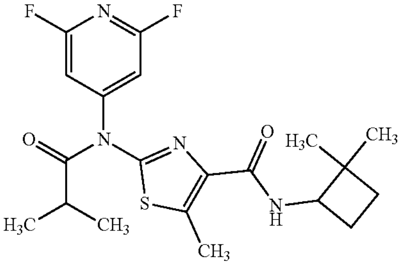 [SMILES: Cc1sc(N(C(=O)C(C)C)c2cc(F)nc(F)c2)nc1C(=O)NC1CCC1(C)C] | 123-126 | $R_t$ = 1.19 min (C); MS: m/z = 423 (M + 1) |

BIOLOGICAL EXAMPLES

Example A1: *Alternaria solani*/Tomato/Leaf Disc (Early Blight)

Tomato leaf disks cv. Baby are placed on agar in multiwell plates (24-well format) and sprayed with the formulated test compound diluted in water. The leaf disks are inoculated with a spore suspension of the fungus 2 days after application. The inoculated leaf disks are incubated at 23° C./21° C. (day/night) and 80% rh under a light regime of 12/12 h (light/dark) in a climate cabinet and the activity of a compound is assessed as percent disease control compared to untreated when an appropriate level of disease damage appears on untreated check disk leaf disks (5-7 days after application). The following compounds gave at least 80% control of *Alternaria solani* at 200 ppm when compared to untreated control under the same conditions, which showed extensive disease development: X.01, X.04, X.08, X.09, X.14, X.15, X.17, X.18, X.21, X.23, X.25, X.27, X.29, X.33, X.34, X.35, X.36, X.38.

Example A2: *Botryotinia fuckeliana* (*Botrytis cinerea*)/liquid culture (Gray mould)

Conidia of the fungus from cryogenic storage are directly mixed into nutrient broth (Vogels broth). After placing a (DMSO) solution of test compound into a microtiter plate (96-well format), the nutrient broth containing the fungal spores is added. The test plates are incubated at 24° C. and the inhibition of growth is determined photometrically 3-4 days after application. The following compounds gave at least 70% control of *Botryotinia fuckeliana* at 20 ppm when compared to untreated control under the same conditions, which showed extensive disease development: X.14, X.15, X.29, X.33, X.34, X.35, X.36, X.38.

Example A3: *Glomerella lagenarium* (*Colletotrichum lagenarium*)/Liquid Culture (Anthracnose)

Conidia of the fungus from cryogenic storage are directly mixed into nutrient broth (PDB potato dextrose broth). After placing a (DMSO) solution of test compound into a microtiter plate (96-well format), the nutrient broth containing the fungal spores is added. The test plates are incubated at 24° C. and the inhibition of growth is measured photometrically 3-4 days after application. The following compounds gave at least 80% control of *Glomerella lagenarium* at 20 ppm when compared to untreated control under the same conditions, which showed extensive disease development: X.01, X.03, X.04, X.05, X.08, X.09, X.11, X.14, X.15, X.16, X.17, X.18, X.21, X.23, X.27, X.29, X.33, X.34, X.35, X.36, X.38.

Example A4: *Blumeria graminis* f. sp. *tritici* (*Erysiphe graminis* f. sp. *tritici*)/Wheat/Leaf Disc Preventative (Powdery Mildew on Wheat)

Wheat leaf segments cv. Kanzler are placed on agar in a multiwell plate (24-well format) and sprayed with the formulated test compound diluted in water. The leaf disks are inoculated by shaking powdery mildew infected plants above the test plates 1 day after application. The inoculated leaf disks are incubated at 20° C. and 60% rh under a light regime of 24 h darkness followed by 12 h light/12 h darkness in a climate chamber and the activity of a compound is assessed as percent disease control compared to untreated when an appropriate level of disease damage appears on untreated check leaf segments (6-8 days after application). The following compounds gave at least 80% control of *Blumeria graminis* f. sp. *tritici* at 200 ppm when compared to untreated control under the same conditions, which showed extensive disease development: X.01, X.02, X.03, X.04, X.05, X.07, X.08, X.09, X.10, X.11, X.12, X.13, X.14, X.15, X.16, X.17, X.18, X.19, X.21, X.23, X.24, X.25, X.26, X.27, X.28, X.29, X.30, X.31, X.32, X.33, X.34, X.35, X.36, X.37, X.38.

Example A5: *Phaeosphaeria nodorum* (*Septoria nodorum*)/Wheat/Leaf Disc Preventative (Glume Blotch)

Wheat leaf segments cv. Kanzler are placed on agar in a multiwell plate (24-well format) and sprayed with the formulated test compound diluted in water. The leaf disks are inoculated with a spore suspension of the fungus 2 days after application. The inoculated test leaf disks are incubated at 20° C. and 75% rh under a light regime of 12 h light/12 h darkness in a climate cabinet and the activity of a compound is assessed as percent disease control compared to untreated when an appropriate level of disease damage appears in untreated check leaf disks (5-7 days after application). The following compounds gave at least 80% control of *Phaeosphaeria nodorum* at 200 ppm when compared to untreated control under the same conditions, which showed extensive disease development: X.02, X.17, X.18, X.27.

Example A6: *Monographella nivalis* (*Microdochium nivale*)/Liquid Culture (Foot Rot Cereals)

Conidia of the fungus from cryogenic storage are directly mixed into nutrient broth (PDB potato dextrose broth). After placing a (DMSO) solution of test compound into a microtiter plate (96-well format), the nutrient broth containing the fungal spores is added. The test plates are incubated at 24° C. and the inhibition of growth is determined photometrically 4-5 days after application. The following compounds gave at least 80% control of *Monographella nivalis* at 20 ppm when compared to untreated control under the same conditions, which showed extensive disease development: X.01, X.03, X.04, X.05, X.08, X.09, X.11, X.12, X.14, X.15, X.16, X.17, X.18, X.21, X.23, X.26, X.27, X.28, X.29, X.31, X.33, X.34, X.35, X.36, X.38.

Example A7: *Mycosphaerella arachidis* (*Cercospora arachidicola*)/Liquid Culture (Early Leaf Spot)

Conidia of the fungus from cryogenic storage are directly mixed into nutrient broth (PDB potato dextrose broth). After placing a (DMSO) solution of test compound into a microtiter plate (96-well format), the nutrient broth containing the fungal spores is added. The test plates are incubated at 24° C. and the inhibition of growth is determined photometrically 4-5 days after application. The following compounds gave at least 80% control of *Mycosphaerella arachidis* at 20 ppm when compared to untreated control under the same conditions, which showed extensive disease development: X.04, X.08, X.17, X.18, X.21, X.27, X.29, X.33, X.34.

Example A8: *Phakopsora pachyrhizi*/Soybean/Preventative (Soybean Rust)

Soybean leaf disks are placed on water agar in multiwell plates (24-well format) and sprayed with the formulated test compound diluted in water. One day after application leaf discs are inoculated by spraying a spore suspension on the lower leaf surface. After an incubation period in a climate cabinet of 24-36 hours in darkness at 20° C. and 75% rh leaf disc are kept at 20° C. with 12 h light/day and 75% rh. The activity of a compound is assessed as percent disease control compared to untreated when an appropriate level of disease damage appears in untreated check leaf disks (12-14 days after application). The following compounds gave at least 80% control of *Phakopsora pachyrhizi* at 200 ppm when compared to untreated control under the same conditions, which showed extensive disease development: X.07, X.08, X.14, X.15, X.17, X.27, X.29, X.33, X.34, X.35, X.38.

Example A9: *Puccinia recondita* f. Sp. *Tritici*/Wheat/Leaf Disc Curative (Brown Rust)

Wheat leaf segments cv. Kanzler are placed on agar in multiwell plates (24-well format). The leaf segments are inoculated with a spore suspension of the fungus. Plates are stored in darkness at 19° C. and 75% rh. The formulated test compound diluted in water is applied 1 day after inoculation. The leaf segments are incubated at 19° C. and 75% rh under a light regime of 12 h light/12 h darkness in a climate cabinet and the activity of a compound is assessed as percent disease control compared to untreated when an appropriate level of disease damage appears in untreated check leaf segments (6-8 days after application). The following compounds gave at least 80% control of *Puccinia recondita* f. sp. *tritici* at 200 ppm when compared to untreated control under the same conditions, which showed extensive disease development: X.08, X.14, X.15, X.17, X.18, X.21, X.23, X.27 X.28, X.29, X.33, X.34, X.38.

Example A10: *Puccinia recondita* f. Sp. *tritici*/Wheat/Leaf Disc Preventative (Brown Rust)

Wheat leaf segments cv. Kanzler are placed on agar in multiwell plates (24-well format) and sprayed with the formulated test compound diluted in water. The leaf disks are inoculated with a spore suspension of the fungus 1 day after application. The inoculated leaf segments are incubated at 19° C. and 75% rh under a light regime of 12 h light/12 h darkness in a climate cabinet and the activity of a compound is assessed as percent disease control compared to untreated when an appropriate level of disease damage appears in untreated check leaf segments (7-9 days after application). The following compounds gave at least 80% control of *Puccinia recondita* f. sp. *tritici* at 200 ppm when compared to untreated control under the same conditions, which showed extensive disease development: X.01, X.02, X.03, X.04, X.05, X.07, X.08, X.09, X.11, X.12, X.13, X.14, X.15, X.17, X.18, X.19, X.21, X.23, X.27, X.28, X.29, X.33, X.34, X.35, X.36, X.38.

Example A11: *Magnaporthe grisea* (*Pyricularia oryzae*)/Rice/Leaf Disc Preventative (Rice Blast)

Rice leaf segments cv. Ballila are placed on agar in a multiwell plate (24-well format) and sprayed with the formulated test compound diluted in water. The leaf segments are inoculated with a spore suspension of the fungus 2 days after application. The inoculated leaf segments are incubated at 22° C. and 80% rh under a light regime of 24 h darkness followed by 12 h light/12 h darkness in a climate cabinet and the activity of a compound is assessed as percent disease control compared to untreated when an appropriate level of disease damage appears in untreated check leaf segments (5-7 days after application). The following compounds gave at least 80% control of *Magnaporthe grisea* at 200 ppm when compared to untreated control under the same conditions, which showed extensive disease development: X.01, X.02, X.03, X.04, X.05, X.07, X.08, X.09, X.10, X.11, X.12, X.13, X.14, X.15, X.16, X.17, X.18, X.19, X.21, X.23, X.25, X.26, X.27, X.28, X.29, X.31, X.32, X.33, X.34, X.35, X.36, X.37, X.38.

Example A12: *Pyrenophora teres*/Barley/Leaf Disc Preventative (Net Blotch)

Barley leaf segments cv. Hasso are placed on agar in a multiwell plate (24-well format) and sprayed with the formulated test compound diluted in water. The leaf segments are inoculated with a spore suspension of the fungus 2 days after application. The inoculated leaf segments are incubated at 20° C. and 65% rh under a light regime of 12 h light/12 h darkness in a climate cabinet and the activity of a compound is assessed as disease control compared to untreated when an appropriate level of disease damage appears in untreated check leaf segments (5-7 days after application). The following compounds gave at least 80% control of *Pyrenophora teres* at 200 ppm when compared to untreated control under the same conditions, which showed extensive disease development: X.01, X.03, X.04, X.08, X.10, X.11, X.12, X.14, X.15, X.17, X.18, X.23, X.25, X.27, X.29, X.33, X.34, X.35, X.36, X.37, X.38.

Example A13: *Sclerotinia sclerotiorum*/Liquid Culture (Cottony Rot)

Mycelia fragments of a newly grown liquid culture of the fungus are directly mixed into nutrient broth (PDB potato dextrose broth). After placing a (DMSO) solution of test compound into a microtiter plate (96-well format) the nutrient broth containing the fungal material is added. The test plates are incubated at 24° C. and the inhibition of growth is determined photometrically 3-4 days after application. The following compounds gave at least 80% control of *Sclerotinia sclerotiorum* at 20 ppm when compared to untreated control under the same conditions, which showed extensive disease development: X.18, X.34.

Example A14: *Mycosphaerella graminicola* (*Septoria tritici*)/Liquid Culture (*Septoria* Blotch)

Conidia of the fungus from cryogenic storage are directly mixed into nutrient broth (PDB potato dextrose broth). After placing a (DMSO) solution of test compound into a microtiter plate (96-well format), the nutrient broth containing the fungal spores is added. The test plates are incubated at 24° C. and the inhibition of growth is determined photometrically 4-5 days after application. The following compounds gave at least 80% control of *Mycosphaerella graminicola* at 20 ppm when compared to untreated control under the same conditions, which showed extensive disease development: X.01, X.03, X.04, X.05, X.08, X.09, X.14, X.15, X.17, X.18, X.21, X.27, X.29, X.33, X.34, X.36.

Further biological test examples relating to fungicidal compositions comprising a mixture of components (A) and (B) as active ingredients:

Example B1: Activity Against *Zymoseptoria tritici* (Leaf Blotch)

Conidia of the fungus from cryogenic storage were directly mixed into nutrient broth (PDB potato dextrose broth). A DMSC solution of the test compounds was placed into a microtiter plate (96-well format) and the nutrient broth containing the fungal spores was added to it. The test plates were incubated at 24° C. and the inhibition of growth was determined photometrically after 72 hrs. The following mixture compositions (A:B) at the reported concentration (in ppm) gave at least 70% disease control in this test.

| Component A (Compound) | Component B | Ratio A:B | Conc. (ppm) (A:B) |
|---|---|---|---|
| X.29 | Azoxystrobin | 10:1 | 20:2 |
| X.29 | Azoxystrobin | 100:1 | 20:0.2 |
| X.29 | Trifloxystrobin | 10:1 | 20:2 |
| X.29 | Trifloxystrobin | 100:1 | 20:0.2 |
| X.29 | Metyltetraprole | 10:1 | 20:2 |
| X.29 | Metyltetraprole | 100:1 | 20:0.2 |
| X.29 | Metyltetraprole | 1:1 | 2:2 |
| X.29 | Metyltetraprole | 10:1 | 2:0.2 |
| X.29 | Difenoconazole | 3.3:1 | 20:6 |
| X.29 | Difenoconazole | 33.3:1 | 20:0.6 |
| X.29 | Difenoconazole | 1:3 | 2:6 |
| X.29 | Difenoconazole | 3.3:1 | 2:0.6 |
| X.29 | Hexaconazole | 3.3:1 | 20:6 |
| X.29 | Hexaconazole | 33.3:1 | 20:0.6 |
| X.29 | Propiconazole | 3.3:1 | 20:6 |
| X.29 | Propiconazole | 33.3:1 | 20:0.6 |
| X.29 | Prothioconazole | 3.3:1 | 20:6 |
| X.29 | Prothioconazole | 33.3:1 | 20:0.6 |
| X.29 | Mefentrifluconazole | 3.3:1 | 20:6 |
| X.29 | Mefentrifluconazole | 33.3:1 | 20:0.6 |
| X.29 | Mefentrifluconazole | 1:3 | 2:6 |
| X.29 | Mefentrifluconazole | 3.3:1 | 2:0.6 |
| X.29 | Fenpropidin | 1:1 | 20:20 |
| X.29 | Fenpropidin | 10:1 | 20:2 |
| X.29 | Fenpropimorph | 1:1 | 20:20 |
| X.29 | Fenpropimorph | 10:1 | 20:2 |
| X.29 | Fenpropimorph | 1:10 | 2:20 |
| X.29 | Fluxapyroxad | 10:1 | 20:2 |
| X.29 | Fluxapyroxad | 100:1 | 20:0.2 |
| X.29 | Fluopyram | 10:1 | 20:2 |
| X.29 | Fluopyram | 100:1 | 20:0.2 |
| X.29 | Isopyrazam | 10:1 | 20:2 |
| X.29 | Isopyrazam | 100:1 | 20:0.2 |
| X.29 | Sedaxane | 10:1 | 20:2 |
| X.29 | Sedaxane | 100:1 | 20:0.2 |
| X.29 | Benzovindiflupyr | 10:1 | 20:2 |
| X.29 | Benzovindiflupyr | 100:1 | 20:0.2 |
| X.29 | Benzovindiflupyr | 1:1 | 2:2 |
| X.29 | Pydiflumetofen | 10:1 | 20:2 |
| X.29 | Pydiflumetofen | 100:1 | 20:0.2 |
| X.29 | Pydiflumetofen | 1:1 | 2:2 |
| X.29 | Pydiflumetofen | 10:1 | 2:0.2 |
| X.29 | Isoflucypram | 10:1 | 20:2 |
| X.29 | Isoflucypram | 100:1 | 20:0.2 |
| X.29 | Isoflucypram | 1:1 | 2:2 |
| X.29 | Isofetamid | 10:1 | 20:2 |
| X.29 | Isofetamid | 100:1 | 20:0.2 |
| X.29 | Pyrapropoyne | 10:1 | 20:2 |
| X.29 | Pyrapropoyne | 100:1 | 20:0.2 |
| X.29 | Pyrapropoyne | 1:1 | 2:2 |
| X.29 | Pyrapropoyne | 10:1 | 2:0.2 |
| X.29 | Fluindapyr | 10:1 | 20:2 |
| X.29 | Fluindapyr | 100:1 | 20:0.2 |
| X.29 | Fenpicoxamid | 3.3:1 | 20:6 |
| X.29 | Fenpicoxamid | 33.3:1 | 20:0.6 |
| X.29 | Fenpicoxamid | 1:3 | 2:6 |
| X.29 | Fenpicoxamid | 3.3:1 | 2:0.6 |
| X.29 | Florylpicoxamid | 10:1 | 20:2 |
| X.29 | Florylpicoxamid | 100:1 | 20:0.2 |
| X.29 | Florylpicoxamid | 1:1 | 2:2 |
| X.29 | Florylpicoxamid | 10:1 | 2:0.2 |
| X.29 | Chlorothalonil | 3.3:1 | 20:6 |
| X.29 | Chlorothalonil | 33.3:1 | 20:0.6 |
| X.29 | Chlorothalonil | 1:3 | 2:6 |
| X.29 | Chlorothalonil | 3.33:1 | 2:0.6 |
| X.29 | Mancozeb | 1:1 | 20:20 |
| X.29 | Mancozeb | 3.3:1 | 20:6 |

-continued

| Component A (Compound) | Component B | Ratio A:B | Conc. (ppm) (A:B) |
|---|---|---|---|
| X.29 | Mancozeb | 1:10 | 2:20 |
| X.29 | Mandipropamid | 1:1 | 20:20 |
| X.29 | Mandipropamid | 3.3:1 | 20:6 |
| X.29 | Oxathiapiprolin | 1:1 | 20:20 |
| X.29 | Oxathiapiprolin | 3.3:1 | 20:6 |
| X.29 | Fluazinam | 10:1 | 20:2 |
| X.29 | Fluazinam | 100:1 | 20:0.2 |
| X.29 | Fluazinam | 1:1 | 2:2 |
| X.29 | Fludioxonil | 3.3:1 | 20:6 |
| X.29 | Fludioxonil | 33.3:1 | 20:0.6 |
| X.29 | Fludioxonil | 1:3 | 2:6 |
| X.29 | Cyprodinil | 3.3:1 | 20:6 |
| X.29 | Cyprodinil | 33.3:1 | 20:0.6 |
| X.29 | Metalaxyl-M | 1:1 | 20:20 |
| X.29 | Metalaxyl-M | 3.3:1 | 20:6 |
| X.29 | Aminopyrifen | 10:1 | 20:2 |
| X.29 | Aminopyrifen | 100:1 | 20:0.2 |
| X.29 | Aminopyrifen | 1:1 | 2:2 |
| X.29 | Aminopyrifen | 10:1 | 2:0.2 |
| X.29 | Folpet | 3.3:1 | 20:6 |
| X.29 | Folpet | 10:1 | 20:2 |
| X.29 | Folpet | 1:3 | 2:6 |
| X.29 | Folpet | 1:1 | 2:2 |
| X.29 | Ipflufenoquin | 10:1 | 20:2 |
| X.29 | Ipflufenoquin | 100:1 | 20:0.2 |
| X.29 | Quinofumelin | 10:1 | 20:2 |
| X.29 | Quinofumelin | 100:1 | 20:0.2 |
| X.29 | Tricyclazole | 1:1 | 20:20 |
| X.29 | Tricyclazole | 3:1 | 20:6 |
| X.29 | Pyroquilon | 1:1 | 20:20 |
| X.29 | Pyroquilon | 3:1 | 20:6 |
| X.29 | N-(1-benzyl-1,3-dimethyl-butyl)-8-fluoro-quinoline-3-carboxamide | 10:1 | 20:2 |
| X.29 | N-(1-benzyl-1,3-dimethyl-butyl)-8-fluoro-quinoline-3-carboxamide | 100:1 | 20:0.2 |
| X.29 | N-(1-benzyl-3,3,3-trifluoro-1-methyl-propyl)-8-fluoro-quinoline-3-carboxamide | 10:1 | 20:2 |
| X.29 | N-(1-benzyl-3,3,3-trifluoro-1-methyl-propyl)-8-fluoro-quinoline-3-carboxamide | 100:1 | 20:0.2 |
| X.29 | 1-(6,7-dimethylpyrazolo[1,5-a]pyridin-3-yl)-4,4,5-trifluoro-3,3-dimethyl-isoquinoline | 10:1 | 20:2 |
| X.29 | 1-(6,7-dimethylpyrazolo[1,5-a]pyridin-3-yl)-4,4,5-trifluoro-3,3-dimethyl-isoquinoline | 100:1 | 20:0.2 |
| X.29 | 4,4-difluoro-3,3-dimethyl-1-(7-methylpyrazolo[1,5-a]pyridin-3-yl)isoquinoline | 10:1 | 20:2 |
| X.29 | 4,4-difluoro-3,3-dimethyl-1-(7-methylpyrazolo[1,5-a]pyridin-3-yl)isoquinoline | 100:1 | 20:0.2 |
| X.29 | 1-(4,5-dimethylbenzimidazol-1-yl)-4,4,5-trifluoro-3,3-dimethyl-isoquinoline | 10:1 | 20:2 |
| X.29 | 1-(4,5-dimethylbenzimidazol-1-yl)-4,4,5-trifluoro-3,3-dimethyl-isoquinoline | 100:1 | 20:0.2 |
| X.29 | 1-(4,5-dimethylbenzimidazol-1-yl)-4,4-difluoro-3,3-dimethyl-isoquinoline | 10:1 | 20:2 |
| X.29 | 1-(4,5-dimethylbenzimidazol-1-yl)-4,4-difluoro-3,3-dimethyl-isoquinoline | 100:1 | 20:0.2 |
| X.36 | Azoxystrobin | 10:1 | 60:6 |
| X.36 | Azoxystrobin | 100:1 | 60:0.6 |
| X.36 | Azoxystrobin | 3.3:1 | 20:6 |
| X.36 | Azoxystrobin | 33.3:1 | 20:0.6 |
| X.36 | Trifloxystrobin | 10:1 | 60:6 |
| X.36 | Trifloxystrobin | 100:1 | 60:0.6 |
| X.36 | Trifloxystrobin | 3.3:1 | 20:6 |
| X.36 | Trifloxystrobin | 33.3:1 | 20:0.6 |
| X.36 | Metyltetraprole | 10:1 | 60:6 |
| X.36 | Metyltetraprole | 100:1 | 60:0.6 |

-continued

| Component A (Compound) | Component B | Ratio A:B | Conc. (ppm) (A:B) |
|---|---|---|---|
| X.36 | Metyltetraprole | 3.3:1 | 20:6 |
| X.36 | Metyltetraprole | 33.3:1 | 20:0.6 |
| X.36 | Difenoconazole | 10:1 | 60:6 |
| X.36 | Difenoconazole | 100:1 | 60:0.6 |
| X.36 | Difenoconazole | 3.3:1 | 20:6 |
| X.36 | Difenoconazole | 33.3:1 | 20:0.6 |
| X.36 | Propiconazole | 10:1 | 60:6 |
| X.36 | Propiconazole | 100:1 | 60:0.6 |
| X.36 | Propiconazole | 3.3:1 | 20:6 |
| X.36 | Propiconazole | 33.3:1 | 20:0.6 |
| X.36 | Prothioconazole | 10:1 | 60:6 |
| X.36 | Prothioconazole | 100:1 | 60:0.6 |
| X.36 | Prothioconazole | 3.3:1 | 20:6 |
| X.36 | Prothioconazole | 33.3:1 | 20:0.6 |
| X.36 | Mefentrifluconazole | 10:1 | 60:6 |
| X.36 | Mefentrifluconazole | 100:1 | 60:0.6 |
| X.36 | Mefentrifluconazole | 3.3:1 | 20:6 |
| X.36 | Mefentrifluconazole | 33.3:1 | 20:0.6 |
| X.36 | Fenpropidin | 3:1 | 60:20 |
| X.36 | Fenpropidin | 10:1 | 60:6 |
| X.36 | Fenpropidin | 1:1 | 20:20 |
| X.36 | Fenpropidin | 3.3:1 | 20:6 |
| X.36 | Fenpropimorph | 3:1 | 60:20 |
| X.36 | Fenpropimorph | 10:1 | 60:6 |
| X.36 | Fenpropimorph | 1:1 | 20:20 |
| X.36 | Fenpropimorph | 3.3:1 | 20:6 |
| X.36 | Fluxapyroxad | 10:1 | 60:6 |
| X.36 | Fluxapyroxad | 100:1 | 60:0.6 |
| X.36 | Fluxapyroxad | 3.3:1 | 20:6 |
| X.36 | Fluxapyroxad | 33.3:1 | 20:0.6 |
| X.36 | Fluopyram | 10:1 | 60:6 |
| X.36 | Fluopyram | 100:1 | 60:0.6 |
| X.36 | Fluopyram | 3.3:1 | 20:6 |
| X.36 | Fluopyram | 33.3:1 | 20:0.6 |
| X.36 | Benzovindiflupyr | 10:1 | 60:6 |
| X.36 | Benzovindiflupyr | 100:1 | 60:0.6 |
| X.36 | Benzovindiflupyr | 3.3:1 | 20:6 |
| X.36 | Benzovindiflupyr | 33.3:1 | 20:0.6 |
| X.36 | Pydiflumetofen | 10:1 | 60:6 |
| X.36 | Pydiflumetofen | 100:1 | 60:0.6 |
| X.36 | Pydiflumetofen | 3.3:1 | 20:6 |
| X.36 | Pydiflumetofen | 33.3:1 | 20:0.6 |
| X.36 | Isoflucypram | 10:1 | 60:6 |
| X.36 | Isoflucypram | 100:1 | 60:0.6 |
| X.36 | Isoflucypram | 3.3:1 | 20:6 |
| X.36 | Isoflucypram | 33.3:1 | 20:0.6 |
| X.36 | Fluindapyr | 10:1 | 60:6 |
| X.36 | Fluindapyr | 100:1 | 60:0.6 |
| X.36 | Fluindapyr | 3.3:1 | 20:6 |
| X.36 | Fluindapyr | 33.3:1 | 20:0.6 |
| X.36 | Florylpicoxamid | 10:1 | 60:6 |
| X.36 | Florylpicoxamid | 100:1 | 60:0.6 |
| X.36 | Florylpicoxamid | 3.3:1 | 20:6 |
| X.36 | Florylpicoxamid | 33.3:1 | 20:0.6 |
| X.36 | Metarylpicoxamid | 10:1 | 60:6 |
| X.36 | Metarylpicoxamid | 100:1 | 60:0.6 |
| X.36 | Metarylpicoxamid | 3.3:1 | 20:6 |
| X.36 | Metarylpicoxamid | 33.3:1 | 20:0.6 |
| X.36 | Chlorothalonil | 10:1 | 60:6 |
| X.36 | Chlorothalonil | 100:1 | 60:0.6 |
| X.36 | Chlorothalonil | 3.3:1 | 20:6 |
| X.36 | Chlorothalonil | 33.3:1 | 20:0.6 |
| X.36 | Mancozeb | 3:1 | 60:20 |
| X.36 | Mancozeb | 10:1 | 60:6 |
| X.36 | Mancozeb | 1:1 | 20:20 |
| X.36 | Mancozeb | 3.3:1 | 20:6 |
| X.36 | Mandipropamid | 3:1 | 60:20 |
| X.36 | Mandipropamid | 10:1 | 60:6 |
| X.36 | Mandipropamid | 1:1 | 20:20 |
| X.36 | Mandipropamid | 3.3:1 | 20:6 |
| X.36 | Oxathiapiprolin | 3:1 | 60:20 |
| X.36 | Oxathiapiprolin | 10:1 | 60:6 |
| X.36 | Oxathiapiprolin | 1:1 | 20:20 |
| X.36 | Oxathiapiprolin | 3.3:1 | 20:6 |
| X.36 | Fluazinam | 10:1 | 60:6 |

-continued

| Component A (Compound) | Component B | Ratio A:B | Conc. (ppm) (A:B) |
|---|---|---|---|
| X.36 | Fluazinam | 100:1 | 60:0.6 |
| X.36 | Fluazinam | 3.3:1 | 20:6 |
| X.36 | Fluazinam | 33.3:1 | 20:0.6 |
| X.36 | Fludioxonil | 10:1 | 60:6 |
| X.36 | Fludioxonil | 100:1 | 60:0.6 |
| X.36 | Fludioxonil | 3.3:1 | 20:6 |
| X.36 | Fludioxonil | 33.3:1 | 20:0.6 |
| X.36 | Cyprodinil | 10:1 | 60:6 |
| X.36 | Cyprodinil | 100:1 | 60:0.6 |
| X.36 | Cyprodinil | 3.3:1 | 20:6 |
| X.36 | Cyprodinil | 33.3:1 | 20:0.6 |
| X.36 | Metalaxyl-M | 3:1 | 60:20 |
| X.36 | Metalaxyl-M | 10:1 | 60:6 |
| X.36 | Metalaxyl-M | 1:1 | 20:20 |
| X.36 | Metalaxyl-M | 3.3:1 | 20:6 |
| X.36 | Folpet | 10:1 | 60:6 |
| X.36 | Folpet | 30:1 | 60:2 |
| X.36 | Folpet | 3.3:1 | 20:6 |
| X.36 | Folpet | 10:1 | 20:2 |
| X.36 | Aminopyrifen | 10:1 | 60:6 |
| X.36 | Aminopyrifen | 100:1 | 60:0.6 |
| X.36 | Aminopyrifen | 3.3:1 | 20:6 |
| X.36 | Aminopyrifen | 33.3:1 | 20:0.6 |
| X.36 | N-(1-benzyl-1,3-dimethyl-butyl)-8-fluoro-quinoline-3-carboxamide | 10:1 | 60:6 |
| X.36 | N-(1-benzyl-1,3-dimethyl-butyl)-8-fluoro-quinoline-3-carboxamide | 100:1 | 60:0.6 |
| X.36 | N-(1-benzyl-1,3-dimethyl-butyl)-8-fluoro-quinoline-3-carboxamide | 3.3:1 | 20:6 |
| X.36 | N-(1-benzyl-1,3-dimethyl-butyl)-8-fluoro-quinoline-3-carboxamide | 33.3:1 | 20:0.6 |
| X.36 | N-(1-benzyl-3,3,3-trifluoro-1-methyl-propyl)-8-fluoro-quinoline-3-carboxamide | 10:1 | 60:6 |
| X.36 | N-(1-benzyl-3,3,3-trifluoro-1-methyl-propyl)-8-fluoro-quinoline-3-carboxamide | 100:1 | 60:0.6 |
| X.36 | N-(1-benzyl-3,3,3-trifluoro-1-methyl-propyl)-8-fluoro-quinoline-3-carboxamide | 3.3:1 | 20:6 |
| X.36 | N-(1-benzyl-3,3,3-trifluoro-1-methyl-propyl)-8-fluoro-quinoline-3-carboxamide | 33.3:1 | 20:0.6 |
| X.36 | 1-(6,7-dimethylpyrazolo[1,5-a]pyridin-3-yl)-4,4,5-trifluoro-3,3-dimethyl-isoquinoline | 10:1 | 60:6 |
| X.36 | 1-(6,7-dimethylpyrazolo[1,5-a]pyridin-3-yl)-4,4,5-trifluoro-3,3-dimethyl-isoquinoline | 100:1 | 60:0.6 |
| X.36 | 1-(6,7-dimethylpyrazolo[1,5-a]pyridin-3-yl)-4,4,5-trifluoro-3,3-dimethyl-isoquinoline | 3.3:1 | 20:6 |
| X.36 | 1-(6,7-dimethylpyrazolo[1,5-a]pyridin-3-yl)-4,4,5-trifluoro-3,3-dimethyl-isoquinoline | 33.3:1 | 20:0.6 |
| X.36 | 4,4-difluoro-3,3-dimethyl-1-(7-methylpyrazolo[1,5-a]pyridin-3-yl)isoquinoline | 10:1 | 60:6 |
| X.36 | 4,4-difluoro-3,3-dimethyl-1-(7-methylpyrazolo[1,5-a]pyridin-3-yl)isoquinoline | 100:1 | 60:0.6 |
| X.36 | 4,4-difluoro-3,3-dimethyl-1-(7-methylpyrazolo[1,5-a]pyridin-3-yl)isoquinoline | 3.3:1 | 20:6 |
| X.36 | 4,4-difluoro-3,3-dimethyl-1-(7-methylpyrazolo[1,5-a]pyridin-3-yl)isoquinoline | 33.3:1 | 20:0.6 |
| X.36 | 1-(4,5-dimethylbenzimidazol-1-yl)-4,4,5-trifluoro-3,3-dimethyl-isoquinoline | 10:1 | 60:6 |
| X.36 | 1-(4,5-dimethylbenzimidazol-1-yl)-4,4,5-trifluoro-3,3-dimethyl-isoquinoline | 100:1 | 60:0.6 |

-continued

| Component A (Compound) | Component B | Ratio A:B | Conc. (ppm) (A:B) |
|---|---|---|---|
| X.36 | 1-(4,5-dimethylbenzimidazol-1-yl)-4,4,5-trifluoro-3,3-dimethyl-isoquinoline | 3.3:1 | 20:6 |
| X.36 | 1-(4,5-dimethylbenzimidazol-1-yl)-4,4,5-trifluoro-3,3-dimethyl-isoquinoline | 33.3:1 | 20:0.6 |
| X.36 | 1-(4,5-dimethylbenzimidazol-1-yl)-4,4-difluoro-3,3-dimethyl-isoquinoline | 10:1 | 60:6 |
| X.36 | 1-(4,5-dimethylbenzimidazol-1-yl)-4,4-difluoro-3,3-dimethyl-isoquinoline | 100:1 | 60:0.6 |
| X.36 | 1-(4,5-dimethylbenzimidazol-1-yl)-4,4-difluoro-3,3-dimethyl-isoquinoline | 3.3:1 | 20:6 |
| X.36 | 1-(4,5-dimethylbenzimidazol-1-yl)-4,4-difluoro-3,3-dimethyl-isoquinoline | 33.3:1 | 20:0.6 |
| X.36 | Isopyrazam | 10:1 | 60:6 |
| X.36 | Isopyrazam | 100:1 | 60:0.6 |
| X.36 | Isopyrazam | 3.3:1 | 20:6 |
| X.36 | Isopyrazam | 33.3:1 | 20:0.6 |
| X.36 | Sedaxane | 10:1 | 60:6 |
| X.36 | Sedaxane | 100:1 | 60:0.6 |
| X.36 | Sedaxane | 3.3:1 | 20:6 |
| X.36 | Sedaxane | 33.3:1 | 20:0.6 |
| X.36 | Isofetamid | 10:1 | 60:6 |
| X.36 | Isofetamid | 100:1 | 60:0.6 |
| X.36 | Isofetamid | 3.3:1 | 20:6 |
| X.36 | Isofetamid | 33.3:1 | 20:0.6 |
| X.36 | Ipflufenoquin | 10:1 | 60:6 |
| X.36 | Ipflufenoquin | 100:1 | 60:0.6 |
| X.36 | Ipflufenoquin | 3.3:1 | 20:6 |
| X.36 | Ipflufenoquin | 33.3:1 | 20:0.6 |
| X.36 | Quinofumelin | 10:1 | 60:6 |
| X.36 | Quinofumelin | 100:1 | 60:0.6 |
| X.36 | Quinofumelin | 3.3:1 | 20:6 |
| X.36 | Quinofumelin | 33.3:1 | 20:0.6 |
| X.36 | Tricyclazole | 3:1 | 60:20 |
| X.36 | Tricyclazole | 10:1 | 60:6 |
| X.36 | Tricyclazole | 1:1 | 20:20 |
| X.36 | Tricyclazole | 3.3:1 | 20:6 |
| X.36 | Pyroquilon | 3:1 | 60:20 |
| X.36 | Pyroquilon | 10:1 | 60:6 |
| X.36 | Pyroquilon | 1:1 | 20:20 |
| X.36 | Pyroquilon | 3.3:1 | 20:6 |
| X.38 | Azoxystrobin | 10:1 | 60:6 |
| X.38 | Azoxystrobin | 100:1 | 60:0.6 |
| X.38 | Azoxystrobin | 3.3:1 | 20:6 |
| X.38 | Azoxystrobin | 33.3:1 | 20:0.6 |
| X.38 | Trifloxystrobin | 10:1 | 60:6 |
| X.38 | Trifloxystrobin | 100:1 | 60:0.6 |
| X.38 | Trifloxystrobin | 3.3:1 | 20:6 |
| X.38 | Trifloxystrobin | 33.3:1 | 20:0.6 |
| X.38 | Metyltetraprole | 10:1 | 60:6 |
| X.38 | Metyltetraprole | 100:1 | 60:0.6 |
| X.38 | Metyltetraprole | 3.3:1 | 20:6 |
| X.38 | Metyltetraprole | 33.3:1 | 20:0.6 |
| X.38 | Difenoconazole | 10:1 | 60:6 |
| X.38 | Difenoconazole | 100:1 | 60:0.6 |
| X.38 | Difenoconazole | 3.3:1 | 20:6 |
| X.38 | Difenoconazole | 33.3:1 | 20:0.6 |
| X.38 | Propiconazole | 10:1 | 60:6 |
| X.38 | Propiconazole | 100:1 | 60:0.6 |
| X.38 | Propiconazole | 3.3:1 | 20:6 |
| X.38 | Propiconazole | 33.3:1 | 20:0.6 |
| X.38 | Prothioconazole | 10:1 | 60:6 |
| X.38 | Prothioconazole | 100:1 | 60:0.6 |
| X.38 | Prothioconazole | 3.3:1 | 20:6 |
| X.38 | Prothioconazole | 33.3:1 | 20:0.6 |
| X.38 | Mefentrifluconazole | 10:1 | 60:6 |
| X.38 | Mefentrifluconazole | 100:1 | 60:0.6 |
| X.38 | Mefentrifluconazole | 3.3:1 | 20:6 |
| X.38 | Mefentrifluconazole | 33.3:1 | 20:0.6 |
| X.38 | Fenpropidin | 3:1 | 60:20 |
| X.38 | Fenpropidin | 10:1 | 60:6 |
| X.38 | Fenpropidin | 1:1 | 20:20 |
| X.38 | Fenpropidin | 3.3:1 | 20:6 |
| X.38 | Fenpropimorph | 3:1 | 60:20 |
| X.38 | Fenpropimorph | 10:1 | 60:6 |
| X.38 | Fenpropimorph | 1:1 | 20:20 |
| X.38 | Fluxapyroxad | 10:1 | 60:6 |
| X.38 | Fluxapyroxad | 100:1 | 60:0.6 |
| X.38 | Fluxapyroxad | 3.3:1 | 20:6 |
| X.38 | Fluxapyroxad | 33.3:1 | 20:0.6 |
| X.38 | Fluopyram | 10:1 | 60:6 |
| X.38 | Fluopyram | 100:1 | 60:0.6 |
| X.38 | Fluopyram | 3.3:1 | 20:6 |
| X.38 | Fluopyram | 33.3:1 | 20:0.6 |
| X.38 | Benzovindiflupyr | 10:1 | 60:6 |
| X.38 | Benzovindiflupyr | 100:1 | 60:0.6 |
| X.38 | Benzovindiflupyr | 3.3:1 | 20:6 |
| X.38 | Benzovindiflupyr | 33.3:1 | 20:0.6 |
| X.38 | Pydiflumetofen | 10:1 | 60:6 |
| X.38 | Pydiflumetofen | 100:1 | 60:0.6 |
| X.38 | Pydiflumetofen | 3.3:1 | 20:6 |
| X.38 | Pydiflumetofen | 33.3:1 | 20:0.6 |
| X.38 | Isoflucypram | 10:1 | 60:6 |
| X.38 | Isoflucypram | 100:1 | 60:0.6 |
| X.38 | Isoflucypram | 3.3:1 | 20:6 |
| X.38 | Isoflucypram | 33.3:1 | 20:0.6 |
| X.38 | Fluindapyr | 10:1 | 60:6 |
| X.38 | Fluindapyr | 100:1 | 60:0.6 |
| X.38 | Fluindapyr | 3.3:1 | 20:6 |
| X.38 | Fluindapyr | 33.3:1 | 20:0.6 |
| X.38 | Florylpicoxamid | 10:1 | 60:6 |
| X.38 | Florylpicoxamid | 100:1 | 60:0.6 |
| X.38 | Florylpicoxamid | 3.3:1 | 20:6 |
| X.38 | Florylpicoxamid | 33.3:1 | 20:0.6 |
| X.38 | Metarylpicoxamid | 10:1 | 60:6 |
| X.38 | Metarylpicoxamid | 100:1 | 60:0.6 |
| X.38 | Metarylpicoxamid | 3.3:1 | 20:6 |
| X.38 | Metarylpicoxamid | 33.3:1 | 20:0.6 |
| X.38 | Chlorothalonil | 10:1 | 60:6 |
| X.38 | Chlorothalonil | 100:1 | 60:0.6 |
| X.38 | Chlorothalonil | 3.3:1 | 20:6 |
| X.38 | Chlorothalonil | 33.3:1 | 20:0.6 |
| X.38 | Mancozeb | 3:1 | 60:20 |
| X.38 | Mancozeb | 10:1 | 60:6 |
| X.38 | Mancozeb | 1:1 | 20:20 |
| X.38 | Fluazinam | 10:1 | 60:6 |
| X.38 | Fluazinam | 3.3:1 | 20:6 |
| X.38 | Fluazinam | 33.3:1 | 20:0.6 |
| X.38 | Fludioxonil | 10:1 | 60:6 |
| X.38 | Fludioxonil | 100:1 | 60:0.6 |
| X.38 | Fludioxonil | 3.3:1 | 20:6 |
| X.38 | Fludioxonil | 33.3:1 | 20:0.6 |
| X.38 | Cyprodinil | 10:1 | 60:6 |
| X.38 | Cyprodinil | 3.3:1 | 20:6 |
| X.38 | Folpet | 10:1 | 60:6 |
| X.38 | Folpet | 30:1 | 60:2 |
| X.38 | Folpet | 3.3:1 | 20:6 |
| X.38 | Folpet | 10:1 | 20:2 |
| X.38 | Aminopyrifen | 10:1 | 60:6 |
| X.38 | Aminopyrifen | 100:1 | 60:0.6 |
| X.38 | Aminopyrifen | 3.3:1 | 20:6 |
| X.38 | Aminopyrifen | 33.3:1 | 20:0.6 |
| X.38 | 1-(6,7-dimethylpyrazolo[1,5-a]pyridin-3-yl)-4,4,5-trifluoro-3,3-dimethyl-isoquinoline | 10:1 | 60:6 |
| X.38 | 1-(6,7-dimethylpyrazolo[1,5-a]pyridin-3-yl)-4,4,5-trifluoro-3,3-dimethyl-isoquinoline | 100:1 | 60:0.6 |
| X.38 | 4,4-difluoro-3,3-dimethyl-1-(7-methylpyrazolo[1,5-a]pyridin-3-yl)isoquinoline | 10:1 | 60:6 |

-continued

| Component A (Compound) | Component B | Ratio A:B | Conc. (ppm) (A:B) |
|---|---|---|---|
| X.38 | 1-(4,5-dimethylbenzimidazol-1-yl)-4,4,5-trifluoro-3,3-dimethyl-isoquinoline | 10:1 | 60:6 |
| X.38 | 1-(4,5-dimethylbenzimidazol-1-yl)-4,4-difluoro-3,3-dimethyl-isoquinoline | 10:1 | 60:6 |
| X.38 | Isopyrazam | 10:1 | 60:6 |
| X.38 | Isopyrazam | 100:1 | 60:0.6 |
| X.38 | Isopyrazam | 3.3:1 | 20:6 |
| X.38 | Isopyrazam | 33.3:1 | 20:0.6 |
| X.38 | Sedaxane | 10:1 | 60:6 |
| X.38 | Sedaxane | 100:1 | 60:0.6 |
| X.38 | Sedaxane | 3.3:1 | 20:6 |
| X.38 | Isofetamid | 10:1 | 60:6 |
| X.38 | Isofetamid | 100:1 | 60:0.6 |
| X.38 | Isofetamid | 3.3:1 | 20:6 |
| X.38 | Isofetamid | 33.3:1 | 20:0.6 |
| X.38 | Ipflufenoquin | 10:1 | 60:6 |

Example B2: Activity Against *Botrytis cinerea* (Gray Mold)

Conidia of the fungus from cryogenic storage were directly mixed into nutrient broth (Vogel's minimal media) containing 200 μMol SHAM. A DMSO solution of the test compounds was placed into a microtiter plate (96-well format) and the nutrient broth containing the fungal spores was added to it. The test plates were incubated at 24° C. and the inhibition of growth was determined photometrically after 72 hrs. The following mixture compositions (A:B) at the reported concentration (in ppm) gave at least 80% disease control in this test.

| Component A (Compound) | Component B | Ratio A:B | Conc. (ppm) (A:B) |
|---|---|---|---|
| X.29 | Azoxystrobin | 10:1 | 20:2 |
| X.29 | Azoxystrobin | 100:1 | 20:0.2 |
| X.29 | Azoxystrobin | 1:1 | 2:2 |
| X.29 | Azoxystrobin | 10:1 | 2:0.2 |
| X.29 | Trifloxystrobin | 10:1 | 20:2 |
| X.29 | Trifloxystrobin | 100:1 | 20:0.2 |
| X.29 | Trifloxystrobin | 1:1 | 2:2 |
| X.29 | Trifloxystrobin | 10:1 | 2:0.2 |
| X.29 | Metyltetraprole | 10:1 | 20:2 |
| X.29 | Metyltetraprole | 100:1 | 20:0.2 |
| X.29 | Metyltetraprole | 1:1 | 2:2 |
| X.29 | Metyltetraprole | 10:1 | 2:0.2 |
| X.29 | Difenoconazole | 3.3:1 | 20:6 |
| X.29 | Difenoconazole | 33.3:1 | 20:0.6 |
| X.29 | Difenoconazole | 1:3 | 2:6 |
| X.29 | Difenoconazole | 3.3:1 | 2:0.6 |
| X.29 | Hexaconazole | 3.3:1 | 20:6 |
| X.29 | Hexaconazole | 33.3:1 | 20:0.6 |
| X.29 | Hexaconazole | 1:3 | 2:6 |
| X.29 | Hexaconazole | 3.3:1 | 2:0.6 |
| X.29 | Propiconazole | 3.3:1 | 20:6 |
| X.29 | Propiconazole | 33.3:1 | 20:0.6 |
| X.29 | Propiconazole | 1:3 | 2:6 |
| X.29 | Propiconazole | 3.3:1 | 2:0.6 |
| X.29 | Prothioconazole | 3.3:1 | 20:6 |
| X.29 | Prothioconazole | 33.3:1 | 20:0.6 |
| X.29 | Prothioconazole | 1:3 | 2:6 |
| X.29 | Prothioconazole | 3.3:1 | 2:0.6 |
| X.29 | Mefentrifluconazole | 3.3:1 | 20:6 |
| X.29 | Mefentrifluconazole | 33.3:1 | 20:0.6 |
| X.29 | Mefentrifluconazole | 1:3 | 2:6 |
| X.29 | Mefentrifluconazole | 3.3:1 | 2:0.6 |

-continued

| Component A (Compound) | Component B | Ratio A:B | Conc. (ppm) (A:B) |
|---|---|---|---|
| X.29 | Fenpropidin | 1:1 | 20:20 |
| X.29 | Fenpropidin | 10:1 | 20:2 |
| X.29 | Fenpropidin | 1:10 | 2:20 |
| X.29 | Fenpropidin | 1:1 | 2:2 |
| X.29 | Fenpropimorph | 1:1 | 20:20 |
| X.29 | Fenpropimorph | 10:1 | 20:2 |
| X.29 | Fenpropimorph | 1:10 | 2:20 |
| X.29 | Fenpropimorph | 1:1 | 2:2 |
| X.29 | Fluxapyroxad | 10:1 | 20:2 |
| X.29 | Fluxapyroxad | 100:1 | 20:0.2 |
| X.29 | Fluxapyroxad | 1:1 | 2:2 |
| X.29 | Fluxapyroxad | 10:1 | 2:0.2 |
| X.29 | Fluopyram | 10:1 | 20:2 |
| X.29 | Fluopyram | 100:1 | 20:0.2 |
| X.29 | Fluopyram | 1:1 | 2:2 |
| X.29 | Fluopyram | 10:1 | 2:0.2 |
| X.29 | Isopyrazam | 10:1 | 20:2 |
| X.29 | Isopyrazam | 100:1 | 20:0.2 |
| X.29 | Isopyrazam | 1:1 | 2:2 |
| X.29 | Isopyrazam | 10:1 | 2:0.2 |
| X.29 | Sedaxane | 10:1 | 20:2 |
| X.29 | Sedaxane | 100:1 | 20:0.2 |
| X.29 | Sedaxane | 1:1 | 2:2 |
| X.29 | Sedaxane | 10:1 | 2:0.2 |
| X.29 | Benzovindiflupyr | 10:1 | 20:2 |
| X.29 | Benzovindiflupyr | 100:1 | 20:0.2 |
| X.29 | Benzovindiflupyr | 1:1 | 2:2 |
| X.29 | Benzovindiflupyr | 10:1 | 2:0.2 |
| X.29 | Pydiflumetofen | 10:1 | 20:2 |
| X.29 | Pydiflumetofen | 100:1 | 20:0.2 |
| X.29 | Pydiflumetofen | 1:1 | 2:2 |
| X.29 | Pydiflumetofen | 10:1 | 2:0.2 |
| X.29 | Isoflucypram | 10:1 | 20:2 |
| X.29 | Isoflucypram | 100:1 | 20:0.2 |
| X.29 | Isoflucypram | 1:1 | 2:2 |
| X.29 | Isoflucypram | 10:1 | 2:0.2 |
| X.29 | Isofetamid | 10:1 | 20:2 |
| X.29 | Isofetamid | 100:1 | 20:0.2 |
| X.29 | Isofetamid | 1:1 | 2:2 |
| X.29 | Isofetamid | 10:1 | 2:0.2 |
| X.29 | Pyrapropoyne | 10:1 | 20:2 |
| X.29 | Pyrapropoyne | 100:1 | 20:0.2 |
| X.29 | Pyrapropoyne | 1:1 | 2:2 |
| X.29 | Pyrapropoyne | 10:1 | 2:0.2 |
| X.29 | Fluindapyr | 10:1 | 20:2 |
| X.29 | Fluindapyr | 100:1 | 20:0.2 |
| X.29 | Fluindapyr | 1:1 | 2:2 |
| X.29 | Fluindapyr | 10:1 | 2:0.2 |
| X.29 | Fenpicoxamid | 3.3:1 | 20:6 |
| X.29 | Fenpicoxamid | 33.3:1 | 20:0.6 |
| X.29 | Fenpicoxamid | 1:3 | 2:6 |
| X.29 | Fenpicoxamid | 3.3:1 | 2:0.6 |
| X.29 | Florylpicoxamid | 10:1 | 20:2 |
| X.29 | Florylpicoxamid | 100:1 | 20:0.2 |
| X.29 | Florylpicoxamid | 1:1 | 2:2 |
| X.29 | Florylpicoxamid | 10:1 | 2:0.2 |
| X.29 | Chlorothalonil | 3.3:1 | 20:6 |
| X.29 | Chlorothalonil | 33.3:1 | 20:0.6 |
| X.29 | Chlorothalonil | 1:3 | 2:6 |
| X.29 | Chlorothalonil | 33.3:1 | 2:0.6 |
| X.29 | Mancozeb | 1:1 | 20:20 |
| X.29 | Mancozeb | 3.3:1 | 20:6 |
| X.29 | Mancozeb | 1:10 | 2:20 |
| X.29 | Mancozeb | 1:3 | 2:6 |
| X.29 | Mandipropamid | 1:1 | 20:20 |
| X.29 | Mandipropamid | 3.3:1 | 20:6 |
| X.29 | Mandipropamid | 1:10 | 2:20 |
| X.29 | Mandipropamid | 1:3 | 2:6 |
| X.29 | Oxathiapiprolin | 1:1 | 20:20 |
| X.29 | Oxathiapiprolin | 3.3:1 | 20:6 |
| X.29 | Oxathiapiprolin | 1:10 | 2:20 |
| X.29 | Oxathiapiprolin | 1:3 | 2:6 |
| X.29 | Fluazinam | 10:1 | 20:2 |
| X.29 | Fluazinam | 100:1 | 20:0.2 |
| X.29 | Fluazinam | 1:1 | 2:2 |

-continued

| Component A (Compound) | Component B | Ratio A:B | Conc. (ppm) (A:B) |
|---|---|---|---|
| X.29 | Fluazinam | 10:1 | 2:0.2 |
| X.29 | Fludioxonil | 3.3:1 | 20:6 |
| X.29 | Fludioxonil | 33.3:1 | 20:0.6 |
| X.29 | Fludioxonil | 1:3 | 2:6 |
| X.29 | Fludioxonil | 3.3:1 | 2:0.6 |
| X.29 | Cyprodinil | 3.3:1 | 20:6 |
| X.29 | Cyprodinil | 33.3:1 | 20:0.6 |
| X.29 | Cyprodinil | 1:3 | 2:6 |
| X.29 | Cyprodinil | 3.3:1 | 2:0.6 |
| X.29 | Metalaxyl-M | 1:1 | 20:20 |
| X.29 | Metalaxyl-M | 3.3:1 | 20:6 |
| X.29 | Metalaxyl-M | 1:10 | 2:20 |
| X.29 | Metalaxyl-M | 1:3 | 2:6 |
| X.29 | Aminopyrifen | 10:1 | 20:2 |
| X.29 | Aminopyrifen | 100:1 | 20:0.2 |
| X.29 | Aminopyrifen | 1:1 | 2:2 |
| X.29 | Aminopyrifen | 10:1 | 2:0.2 |
| X.29 | Folpet | 3.3:1 | 20:6 |
| X.29 | Folpet | 10:1 | 20:2 |
| X.29 | Folpet | 1:3 | 2:6 |
| X.29 | Folpet | 1:1 | 2:2 |
| X.29 | Ipflufenoquin | 10:1 | 20:2 |
| X.29 | Ipflufenoquin | 100:1 | 20:0.2 |
| X.29 | Ipflufenoquin | 1:1 | 2:2 |
| X.29 | Ipflufenoquin | 10:1 | 2:0.2 |
| X.29 | Quinofumelin | 10:1 | 20:2 |
| X.29 | Quinofumelin | 100:1 | 20:0.2 |
| X.29 | Quinofumelin | 1:1 | 2:2 |
| X.29 | Quinofumelin | 10:1 | 2:0.2 |
| X.29 | Tricyclazole | 1:1 | 20:20 |
| X.29 | Tricyclazole | 3:1 | 20:6 |
| X.29 | Tricyclazole | 1:10 | 2:20 |
| X.29 | Tricyclazole | 1:3 | 2:6 |
| X.29 | Pyroquilon | 1:1 | 20:20 |
| X.29 | Pyroquilon | 3:1 | 20:6 |
| X.29 | Pyroquilon | 1:10 | 2:20 |
| X.29 | Pyroquilon | 1:3 | 2:6 |
| X.29 | N-(1-benzyl-1,3-dimethyl-butyl)-8-fluoro-quinoline-3-carboxamide | 10:1 | 20:2 |
| X.29 | N-(1-benzyl-1,3-dimethyl-butyl)-8-fluoro-quinoline-3-carboxamide | 100:1 | 20:0.2 |
| X.29 | N-(1-benzyl-1,3-dimethyl-butyl)-8-fluoro-quinoline-3-carboxamide | 1:1 | 2:2 |
| X.29 | N-(1-benzyl-1,3-dimethyl-butyl)-8-fluoro-quinoline-3-carboxamide | 10:1 | 2:0.2 |
| X.29 | N-(1-benzyl-3,3,3-trifluoro-1-methyl-propyl)-8-fluoro-quinoline-3-carboxamide | 10:1 | 20:2 |
| X.29 | N-(1-benzyl-3,3,3-trifluoro-1-methyl-propyl)-8-fluoro-quinoline-3-carboxamide | 100:1 | 20:0.2 |
| X.29 | N-(1-benzyl-3,3,3-trifluoro-1-methyl-propyl)-8-fluoro-quinoline-3-carboxamide | 1:1 | 2:2 |
| X.29 | N-(1-benzyl-3,3,3-trifluoro-1-methyl-propyl)-8-fluoro-quinoline-3-carboxamide | 10:1 | 2:0.2 |
| X.29 | 1-(6,7-dimethylpyrazolo[1,5-a]pyridin-3-yl)-4,4,5-trifluoro-3,3-dimethyl-isoquinoline | 10:1 | 20:2 |
| X.29 | 1-(6,7-dimethylpyrazolo[1,5-a]pyridin-3-yl)-4,4,5-trifluoro-3,3-dimethyl-isoquinoline | 100:1 | 20:0.2 |
| X.29 | 1-(6,7-dimethylpyrazolo[1,5-a]pyridin-3-yl)-4,4,5-trifluoro-3,3-dimethyl-isoquinoline | 1:1 | 2:2 |
| X.29 | 1-(6,7-dimethylpyrazolo[1,5-a]pyridin-3-yl)-4,4,5-trifluoro-3,3-dimethyl-isoquinoline | 10:1 | 2:0.2 |
| X.29 | 4,4-difluoro-3,3-dimethyl-1-(7-methylpyrazolo[1,5-a]pyridin-3-yl)isoquinoline | 10:1 | 20:2 |
| X.29 | 4,4-difluoro-3,3-dimethyl-1-(7-methylpyrazolo[1,5-a]pyridin-3-yl)isoquinoline | 100:1 | 20:0.2 |

-continued

| Component A (Compound) | Component B | Ratio A:B | Conc. (ppm) (A:B) |
|---|---|---|---|
| X.29 | 4,4-difluoro-3,3-dimethyl-1-(7-methylpyrazolo[1,5-a]pyridin-3-yl)isoquinoline | 1:1 | 2:2 |
| X.29 | 4,4-difluoro-3,3-dimethyl-1-(7-methylpyrazolo[1,5-a]pyridin-3-yl)isoquinoline | 10:1 | 2:0.2 |
| X.29 | 1-(4,5-dimethylbenzimidazol-1-yl)-4,4,5-trifluoro-3,3-dimethyl-isoquinoline | 10:1 | 20:2 |
| X.29 | 1-(4,5-dimethylbenzimidazol-1-yl)-4,4,5-trifluoro-3,3-dimethyl-isoquinoline | 100:1 | 20:0.2 |
| X.29 | 1-(4,5-dimethylbenzimidazol-1-yl)-4,4,5-trifluoro-3,3-dimethyl-isoquinoline | 1:1 | 2:2 |
| X.29 | 1-(4,5-dimethylbenzimidazol-1-yl)-4,4,5-trifluoro-3,3-dimethyl-isoquinoline | 10:1 | 2:0.2 |
| X.29 | 1-(4,5-dimethylbenzimidazol-1-yl)-4,4-difluoro-3,3-dimethyl-isoquinoline | 10:1 | 20:2 |
| X.29 | 1-(4,5-dimethylbenzimidazol-1-yl)-4,4-difluoro-3,3-dimethyl-isoquinoline | 100:1 | 20:0.2 |
| X.29 | 1-(4,5-dimethylbenzimidazol-1-yl)-4,4-difluoro-3,3-dimethyl-isoquinoline | 1:1 | 2:2 |
| X.29 | 1-(4,5-dimethylbenzimidazol-1-yl)-4,4-difluoro-3,3-dimethyl-isoquinoline | 10:1 | 2:0.2 |
| X.36 | Azoxystrobin | 10:1 | 60:6 |
| X.36 | Azoxystrobin | 100:1 | 60:0.6 |
| X.36 | Azoxystrobin | 3.3:1 | 20:6 |
| X.36 | Azoxystrobin | 33.3:1 | 20:0.6 |
| X.36 | Trifloxystrobin | 10:1 | 60:6 |
| X.36 | Trifloxystrobin | 100:1 | 60:0.6 |
| X.36 | Trifloxystrobin | 3.3:1 | 20:6 |
| X.36 | Trifloxystrobin | 33.3:1 | 20:0.6 |
| X.36 | Metyltetraprole | 10:1 | 60:6 |
| X.36 | Metyltetraprole | 100:1 | 60:0.6 |
| X.36 | Metyltetraprole | 3.3:1 | 20:6 |
| X.36 | Metyltetraprole | 33.3:1 | 20:0.6 |
| X.36 | Difenoconazole | 10:1 | 60:6 |
| X.36 | Difenoconazole | 100:1 | 60:0.6 |
| X.36 | Difenoconazole | 3.3:1 | 20:6 |
| X.36 | Difenoconazole | 33.3:1 | 20:0.6 |
| X.36 | Propiconazole | 10:1 | 60:6 |
| X.36 | Propiconazole | 100:1 | 60:0.6 |
| X.36 | Propiconazole | 3.3:1 | 20:6 |
| X.36 | Propiconazole | 33.3:1 | 20:0.6 |
| X.36 | Prothioconazole | 10:1 | 60:6 |
| X.36 | Prothioconazole | 100:1 | 60:0.6 |
| X.36 | Prothioconazole | 3.3:1 | 20:6 |
| X.36 | Prothioconazole | 33.3:1 | 20:0.6 |
| X.36 | Mefentrifluconazole | 10:1 | 60:6 |
| X.36 | Mefentrifluconazole | 100:1 | 60:0.6 |
| X.36 | Mefentrifluconazole | 3.3:1 | 20:6 |
| X.36 | Mefentrifluconazole | 33.3:1 | 20:0.6 |
| X.36 | Fenpropidin | 3:1 | 60:20 |
| X.36 | Fenpropidin | 10:1 | 60:6 |
| X.36 | Fenpropidin | 1:1 | 20:20 |
| X.36 | Fenpropidin | 3.3:1 | 20:6 |
| X.36 | Fenpropimorph | 3:1 | 60:20 |
| X.36 | Fenpropimorph | 10:1 | 60:6 |
| X.36 | Fenpropimorph | 1:1 | 20:20 |
| X.36 | Fenpropimorph | 3.3:1 | 20:6 |
| X.36 | Fluxapyroxad | 10:1 | 60:6 |
| X.36 | Fluxapyroxad | 100:1 | 60:0.6 |
| X.36 | Fluxapyroxad | 3.3:1 | 20:6 |
| X.36 | Fluxapyroxad | 33.3:1 | 20:0.6 |
| K.36 | Fluopyram | 10:1 | 60:6 |
| X.36 | Fluopyram | 100:1 | 60:0.6 |
| X.36 | Fluopyram | 3.3:1 | 20:6 |
| X.36 | Fluopyram | 33.3:1 | 20:0.6 |
| X.36 | Benzovindiflupyr | 10:1 | 60:6 |

-continued

| Component A (Compound) | Component B | Ratio A:B | Conc. (ppm) (A:B) |
|---|---|---|---|
| X.36 | Benzovindiflupyr | 100:1 | 60:0.6 |
| X.36 | Benzovindiflupyr | 3.3:1 | 20:6 |
| X.36 | Benzovindiflupyr | 33.3:1 | 20:0.6 |
| X.36 | Pydiflumetofen | 10:1 | 60:6 |
| X.36 | Pydiflumetofen | 100:1 | 60:0.6 |
| X.36 | Pydiflumetofen | 3.3:1 | 20:6 |
| X.36 | Pydiflumetofen | 33.3:1 | 20:0.6 |
| X.36 | Isoflucypram | 10:1 | 60:6 |
| X.36 | Isoflucypram | 100:1 | 60:0.6 |
| X.36 | Isoflucypram | 3.3:1 | 20:6 |
| X.36 | Isoflucypram | 33.3:1 | 20:0.6 |
| X.36 | Fluindapyr | 10:1 | 60:6 |
| X.36 | Fluindapyr | 100:1 | 60:0.6 |
| X.36 | Fluindapyr | 3.3:1 | 20:6 |
| X.36 | Fluindapyr | 33.3:1 | 20:0.6 |
| X.36 | Florylpicoxamid | 10:1 | 60:6 |
| X.36 | Florylpicoxamid | 100:1 | 60:0.6 |
| X.36 | Florylpicoxamid | 3.3:1 | 20:6 |
| X.36 | Florylpicoxamid | 33.3:1 | 20:0.6 |
| X.36 | Metarylpicoxamid | 10:1 | 60:6 |
| X.36 | Metarylpicoxamid | 100:1 | 60:0.6 |
| X.36 | Metarylpicoxamid | 3.3:1 | 20:6 |
| X.36 | Metarylpicoxamid | 33.3:1 | 20:0.6 |
| X.36 | Chlorothalonil | 10:1 | 60:6 |
| X.36 | Chlorothalonil | 100:1 | 60:0.6 |
| X.36 | Chlorothalonil | 3.3:1 | 20:6 |
| X.36 | Chlorothalonil | 33.3:1 | 20:0.6 |
| X.36 | Mancozeb | 3:1 | 60:20 |
| X.36 | Mancozeb | 10:1 | 60:6 |
| X.36 | Mancozeb | 1:1 | 20:20 |
| X.36 | Mancozeb | 3.3:1 | 20:6 |
| X.36 | Mandipropamid | 3:1 | 60:20 |
| X.36 | Mandipropamid | 10:1 | 60:6 |
| X.36 | Mandipropamid | 1:1 | 20:20 |
| X.36 | Mandipropamid | 3.3:1 | 20:6 |
| X.36 | Oxathiapiprolin | 3:1 | 60:20 |
| X.36 | Oxathiapiprolin | 10:1 | 60:6 |
| X.36 | Oxathiapiprolin | 1:1 | 20:20 |
| X.36 | Oxathiapiprolin | 3.3:1 | 20:6 |
| X.36 | Fluazinam | 10:1 | 60:6 |
| X.36 | Fluazinam | 100:1 | 60:0.6 |
| X.36 | Fluazinam | 3.3:1 | 20:6 |
| X.36 | Fluazinam | 33.3:1 | 20:0.6 |
| X.36 | Fludioxonil | 10:1 | 60:6 |
| X.36 | Fludioxonil | 100:1 | 60:0.6 |
| X.36 | Fludioxonil | 3.3:1 | 20:6 |
| X.36 | Fludioxonil | 33.3:1 | 20:0.6 |
| X.36 | Cyprodinil | 10:1 | 60:6 |
| X.36 | Cyprodinil | 100:1 | 60:0.6 |
| X.36 | Cyprodinil | 3.3:1 | 20:6 |
| X.36 | Cyprodinil | 33.3:1 | 20:0.6 |
| X.36 | Metalaxyl-M | 3:1 | 60:20 |
| X.36 | Metalaxyl-M | 10:1 | 60:6 |
| X.36 | Metalaxyl-M | 1:1 | 20:20 |
| X.36 | Metalaxyl-M | 3.3:1 | 20:6 |
| X.36 | Folpet | 10:1 | 60:6 |
| X.36 | Folpet | 30:1 | 60:2 |
| X.36 | Folpet | 3.3:1 | 20:6 |
| X.36 | Folpet | 10:1 | 20:2 |
| X.36 | Aminopyrifen | 10:1 | 60:6 |
| X.36 | Aminopyrifen | 100:1 | 60:0.6 |
| X.36 | Aminopyrifen | 3.3:1 | 20:6 |
| X.36 | Aminopyrifen | 33.3:1 | 20:0.6 |
| X.36 | N-(1-benzyl-1,3-dimethyl-butyl)-8-fluoro-quinoline-3-carboxamide | 10:1 | 60:6 |
| X.36 | N-(1-benzyl-1,3-dimethyl-butyl)-8-fluoro-quinoline-3-carboxamide | 100:1 | 60:0.6 |
| X.36 | N-(1-benzyl-1,3-dimethyl-butyl)-8-fluoro-quinoline-3-carboxamide | 3.3:1 | 20:6 |
| X.36 | N-(1-benzyl-1,3-dimethyl-butyl)-8-fluoro-quinoline-3-carboxamide | 33.3:1 | 20:0.6 |
| X.36 | N-(1-benzyl-3,3,3-trifluoro-1-methyl-propyl)-8-fluoro-quinoline-3-carboxamide | 10:1 | 60:6 |

-continued

| Component A (Compound) | Component B | Ratio A:B | Conc. (ppm) (A:B) |
|---|---|---|---|
| X.36 | N-(1-benzyl-3,3,3-trifluoro-1-methyl-propyl)-8-fluoro-quinoline-3-carboxamide | 100:1 | 60:0.6 |
| X.36 | N-(1-benzyl-3,3,3-trifluoro-1-methyl-propyl)-8-fluoro-quinoline-3-carboxamide | 3.3:1 | 20:6 |
| X.36 | N-(1-benzyl-3,3,3-trifluoro-1-methyl-propyl)-8-fluoro-quinoline-3-carboxamide | 33.3:1 | 20:0.6 |
| X.36 | 1-(6,7-dimethylpyrazolo[1,5-a]pyridin-3-yl)-4,4,5-trifluoro-3,3-dimethyl-isoquinoline | 10:1 | 60:6 |
| X.36 | 1-(6,7-dimethylpyrazolo[1,5-a]pyridin-3-yl)-4,4,5-trifluoro-3,3-dimethyl-isoquinoline | 100:1 | 60:0.6 |
| X.36 | 1-(6,7-dimethylpyrazolo[1,5-a]pyridin-3-yl)-4,4,5-trifluoro-3,3-dimethyl-isoquinoline | 3.3:1 | 20:6 |
| X.36 | 1-(6,7-dimethylpyrazolo[1,5-a]pyridin-3-yl)-4,4, 5-trifluoro-3,3-dimethyl-isoquinoline | 33.3:1 | 20:0.6 |
| X.36 | 4,4-difluoro-3,3-dimethyl-1-(7-methylpyrazolo[1,5-a]pyridin-3-yl)isoquinoline | 10:1 | 60:6 |
| X.36 | 4,4-difluoro-3,3-dimethyl-1-(7-methylpyrazolo[1,5-a]pyridin-3-yl)isoquinoline | 100:1 | 60:0.6 |
| X.36 | 4,4-difluoro-3,3-dimethyl-1-(7-methylpyrazolo[1,5-a]pyridin-3-yl)isoquinoline | 3.3:1 | 20:6 |
| X.36 | 4,4-difluoro-3,3-dimethyl-1-(7-methylpyrazolo[1,5-a]pyridin-3-yl)isoquinoline | 33.3:1 | 20:0.6 |
| X.36 | 1-(4,5-dimethylbenzimidazol-1-yl)-4,4,5-trifluoro-3,3-dimethyl-isoquinoline | 10:1 | 60:6 |
| X.36 | 1-(4,5-dimethylbenzimidazol-1-yl)-4,4,5-trifluoro-3,3-dimethyl-isoquinoline | 100:1 | 60:0.6 |
| X.36 | 1-(4,5-dimethylbenzimidazol-1-yl)-4,4,5-trifluoro-3,3-dimethyl-isoquinoline | 3.3:1 | 20:6 |
| X.36 | 1-(4,5-dimethylbenzimidazol-1-yl)-4,4,5-trifluoro-3,3-dimethyl-isoquinoline | 33.3:1 | 20:0.6 |
| X.36 | 1-(4,5-dimethylbenzimidazol-1-yl)-4,4-difluoro-3,3-dimethyl-isoquinoline | 10:1 | 60:6 |
| X.36 | 1-(4,5-dimethylbenzimidazol-1-yl)-4,4-difluoro-3,3-dimethyl-isoquinoline | 100:1 | 60:0.6 |
| X.36 | 1-(4,5-dimethylbenzimidazol-1-yl)-4,4-difluoro-3,3-dimethyl-isoquinoline | 3.3:1 | 20:6 |
| X.36 | 1-(4,5-dimethylbenzimidazol-1-yl)-4,4-difluoro-3,3-dimethyl-isoquinoline | 33.3:1 | 20:0.6 |
| X.36 | Isopyrazam | 10:1 | 60:6 |
| X.36 | Isopyrazam | 100:1 | 60:0.6 |
| X.36 | Isopyrazam | 3.3:1 | 20:6 |
| X.36 | Isopyrazam | 33.3:1 | 20:0.6 |
| X.36 | Sedaxane | 10:1 | 60:6 |
| X.36 | Sedaxane | 100:1 | 60:0.6 |
| X.36 | Sedaxane | 3.3:1 | 20:6 |
| X.36 | Sedaxane | 33.3:1 | 20:0.6 |
| X.36 | Isofetamid | 10:1 | 60:6 |
| X.36 | Isofetamid | 100:1 | 60:0.6 |
| X.36 | Isofetamid | 3.3:1 | 20:6 |
| X.36 | Isofetamid | 33.3:1 | 20:0.6 |
| X.36 | Ipflufenoquin | 10:1 | 60:6 |
| X.36 | Ipflufenoquin | 100:1 | 60:0.6 |
| X.36 | Ipflufenoquin | 3.3:1 | 20:6 |
| X.36 | Ipflufenoquin | 33.3:1 | 20:0.6 |
| X.36 | Quinofumelin | 10:1 | 60:6 |
| X.36 | Quinofumelin | 100:1 | 60:0.6 |

-continued

| Component A (Compound) | Component B | Ratio A:B | Conc. (ppm) (A:B) |
|---|---|---|---|
| X.36 | Quinofumelin | 3.3:1 | 20:6 |
| X.36 | Quinofumelin | 33.3:1 | 20:0.6 |
| X.36 | Tricyclazole | 3:1 | 60:20 |
| X.36 | Tricyclazole | 10:1 | 60:6 |
| X.36 | Tricyclazole | 1:1 | 20:20 |
| X.36 | Tricyclazole | 3.3:1 | 20:6 |
| X.36 | Pyroquilon | 3:1 | 60:20 |
| X.36 | Pyroquilon | 10:1 | 60:6 |
| X.36 | Pyroquilon | 1:1 | 20:20 |
| X.36 | Pyroquilon | 3.3:1 | 20:6 |
| X.38 | Azoxystrobin | 10:1 | 60:6 |
| X.38 | Azoxystrobin | 100:1 | 60:0.6 |
| X.38 | Azoxystrobin | 3.3:1 | 20:6 |
| X.38 | Azoxystrobin | 33.3:1 | 20:0.6 |
| X.38 | Trifloxystrobin | 10:1 | 60:6 |
| X.38 | Trifloxystrobin | 100:1 | 60:0.6 |
| X.38 | Trifloxystrobin | 3.3:1 | 20:6 |
| X.38 | Trifloxystrobin | 33.3:1 | 20:0.6 |
| X.38 | Metyltetraprole | 10:1 | 60:6 |
| X.38 | Metyltetraprole | 100:1 | 60:0.6 |
| X.38 | Metyltetraprole | 3.3:1 | 20:6 |
| X.38 | Metyltetraprole | 33.3:1 | 20:0.6 |
| X.38 | Difenoconazole | 10:1 | 60:6 |
| X.38 | Difenoconazole | 3.3:1 | 20:6 |
| X.38 | Difenoconazole | 33.3:1 | 20:0.6 |
| X.38 | Propiconazole | 10:1 | 60:6 |
| X.38 | Propiconazole | 100:1 | 60:0.6 |
| X.38 | Propiconazole | 3.3:1 | 20:6 |
| X.38 | Propiconazole | 33.3:1 | 20:0.6 |
| X.38 | Prothioconazole | 10:1 | 60:6 |
| X.38 | Prothioconazole | 100:1 | 60:0.6 |
| X.38 | Prothioconazole | 3.3:1 | 20:6 |
| X.38 | Prothioconazole | 33.3:1 | 20:0.6 |
| X.38 | Mefentrifluconazole | 10:1 | 60:6 |
| X.38 | Mefentrifluconazole | 100:1 | 60:0.6 |
| X.38 | Mefentrifluconazole | 3.3:1 | 20:6 |
| X.38 | Mefentrifluconazole | 33.3:1 | 20:0.6 |
| X.38 | Fenpropidin | 3:1 | 60:20 |
| X.38 | Fenpropidin | 10:1 | 60:6 |
| X.38 | Fenpropidin | 1:1 | 20:20 |
| X.38 | Fenpropidin | 3.3:1 | 20:6 |
| X.38 | Fenpropimorph | 3:1 | 60:20 |
| X.38 | Fenpropimorph | 10:1 | 60:6 |
| X.38 | Fenpropimorph | 1:1 | 20:20 |
| X.38 | Fenpropimorph | 3.3:1 | 20:6 |
| X.38 | Fluxapyroxad | 10:1 | 60:6 |
| X.38 | Fluxapyroxad | 100:1 | 60:0.6 |
| X.38 | Fluxapyroxad | 3.3:1 | 20:6 |
| X.38 | Fluxapyroxad | 33.3:1 | 20:0.6 |
| X.38 | Fluopyram | 10:1 | 60:6 |
| X.38 | Fluopyram | 100:1 | 60:0.6 |
| X.38 | Fluopyram | 3.3:1 | 20:6 |
| X.38 | Fluopyram | 33.3:1 | 20:0.6 |
| X.38 | Benzovindiflupyr | 10:1 | 60:6 |
| X.38 | Benzovindiflupyr | 100:1 | 60:0.6 |
| X.38 | Benzovindiflupyr | 3.3:1 | 20:6 |
| X.38 | Benzovindiflupyr | 33.3:1 | 20:0.6 |
| X.38 | Pydiflumetofen | 10:1 | 60:6 |
| X.38 | Pydiflumetofen | 100:1 | 60:0.6 |
| X.38 | Pydiflumetofen | 3.3:1 | 20:6 |
| X.38 | Pydiflumetofen | 33.3:1 | 20:0.6 |
| X.38 | Isoflucypram | 10:1 | 60:6 |
| X.38 | Isoflucypram | 100:1 | 60:0.6 |
| X.38 | Isoflucypram | 3.3:1 | 20:6 |
| X.38 | Isoflucypram | 33.3:1 | 20:0.6 |
| X.38 | Fluindapyr | 10:1 | 60:6 |
| X.38 | Fluindapyr | 100:1 | 60:0.6 |
| X.38 | Fluindapyr | 3.3:1 | 20:6 |
| X.38 | Fluindapyr | 33.3:1 | 20:0.6 |
| X.38 | Florylpicoxamid | 10:1 | 60:6 |
| X.38 | Florylpicoxamid | 100:1 | 60:0.6 |
| X.38 | Florylpicoxamid | 3.3:1 | 20:6 |
| X.38 | Florylpicoxamid | 33.3:1 | 20:0.6 |
| X.38 | Metarylpicoxamid | 10:1 | 60:6 |
| X.38 | Metarylpicoxamid | 100:1 | 60:0.6 |

-continued

| Component A (Compound) | Component B | Ratio A:B | Conc. (ppm) (A:B) |
|---|---|---|---|
| X.38 | Metarylpicoxamid | 3.3:1 | 20:6 |
| X.38 | Metarylpicoxamid | 33.3:1 | 20:0.6 |
| X.38 | Chlorothalonil | 10:1 | 60:6 |
| X.38 | Chlorothalonil | 100:1 | 60:0.6 |
| X.38 | Chlorothalonil | 3.3:1 | 20:6 |
| X.38 | Chlorothalonil | 33.3:1 | 20:0.6 |
| X.38 | Mancozeb | 3:1 | 60:20 |
| X.38 | Mancozeb | 10:1 | 60:6 |
| X.38 | Mancozeb | 1:1 | 20:20 |
| X.38 | Mancozeb | 3.3:1 | 20:6 |
| X.38 | Mandipropamid | 3:1 | 60:20 |
| X.38 | Mandipropamid | 10:1 | 60:6 |
| X.38 | Mandipropamid | 1:1 | 20:20 |
| X.38 | Mandipropamid | 3.3:1 | 20:6 |
| X.38 | Oxathiapiprolin | 3:1 | 60:20 |
| X.38 | Oxathiapiprolin | 10:1 | 60:6 |
| X.38 | Oxathiapiprolin | 1:1 | 20:20 |
| X.38 | Oxathiapiprolin | 3.3:1 | 20:6 |
| X.38 | Fluazinam | 10:1 | 60:6 |
| X.38 | Fluazinam | 100:1 | 60:0.6 |
| X.38 | Fluazinam | 3.3:1 | 20:6 |
| X.38 | Fluazinam | 33.3:1 | 20:0.6 |
| X.38 | Fludioxonil | 10:1 | 60:6 |
| X.38 | Fludioxonil | 100:1 | 60:0.6 |
| X.38 | Fludioxonil | 3.3:1 | 20:6 |
| X.38 | Fludioxonil | 33.3:1 | 20:0.6 |
| X.38 | Cyprodinil | 10:1 | 60:6 |
| X.38 | Cyprodinil | 100:1 | 60:0.6 |
| X.38 | Cyprodinil | 3.3:1 | 20:6 |
| X.38 | Cyprodinil | 33.3:1 | 20:0.6 |
| X.38 | Metalaxyl-M | 3:1 | 60:20 |
| X.38 | Metalaxyl-M | 10:1 | 60:6 |
| X.38 | Metalaxyl-M | 1:1 | 20:20 |
| X.38 | Metalaxyl-M | 3.3:1 | 20:6 |
| X.38 | Folpet | 10:1 | 60:6 |
| X.38 | Folpet | 30:1 | 60:2 |
| X.38 | Folpet | 3.3:1 | 20:6 |
| X.38 | Folpet | 10:1 | 20:2 |
| X.38 | Aminopyrifen | 10:1 | 60:6 |
| X.38 | Aminopyrifen | 100:1 | 60:0.6 |
| X.38 | Aminopyrifen | 3.3:1 | 20:6 |
| X.38 | Aminopyrifen | 33.3:1 | 20:0.6 |
| X.38 | N-(1-benzyl-1,3-dimethyl-butyl)-8-fluoro-quinoline-3-carboxamide | 10:1 | 60:6 |
| X.38 | N-(1-benzyl-1,3-dimethyl-butyl)-8-fluoro-quinoline-3-carboxamide | 100:1 | 60:0.6 |
| X.38 | N-(1-benzyl-1,3-dimethyl-butyl)-8-fluoro-quinoline-3-carboxamide | 3.3:1 | 20:6 |
| X.38 | N-(1-benzyl-1,3-dimethyl-butyl)-8-fluoro-quinoline-3-carboxamide | 33.3:1 | 20:0.6 |
| X.38 | N-(1-benzyl-3,3,3-trifluoro-1-methyl-propyl)-8-fluoro-quinoline-3-carboxamide | 10:1 | 60:6 |
| X.38 | N-(1-benzyl-3,3,3-trifluoro-1-methyl-propyl)-8-fluoro-quinoline-3-carboxamide | 100:1 | 60:0.6 |
| X.38 | N-(1-benzyl-3,3,3-trifluoro-1-methyl-propyl)-8-fluoro-quinoline-3-carboxamide | 3.3:1 | 20:6 |
| X.38 | N-(1-benzyl-3,3,3-trifluoro-1-methyl-propyl)-8-fluoro-quinoline-3-carboxamide | 33.3:1 | 20:0.6 |
| X.38 | 1-(6,7-dimethylpyrazolo[1,5-a]pyridin-3-yl)-4,4,5-trifluoro-3,3-dimethyl-isoquinoline | 10:1 | 60:6 |
| X.38 | 1-(6,7-dimethylpyrazolo[1,5-a]pyridin-3-yl)-4,4,5-trifluoro-3,3-dimethyl-isoquinoline | 100:1 | 60:0.6 |
| X.38 | 1-(6,7-dimethylpyrazolo[1,5-a]pyridin-3-yl)-4,4,5-trifluoro-3,3-dimethyl-isoquinoline | 3.3:1 | 20:6 |

-continued

| Component A (Compound) | Component B | Ratio A:B | Conc. (ppm) (A:B) |
|---|---|---|---|
| X.38 | 1-(6,7-dimethylpyrazolo[1,5-a]pyridin-3-yl)-4,4,5-trifluoro-3,3-dimethyl-isoquinoline | 33.3:1 | 20:0.6 |
| X.38 | 4,4-difluoro-3,3-dimethyl-1-(7-methylpyrazolo[1,5-a]pyridin-3-yl)isoquinoline | 10:1 | 60:6 |
| X.38 | 4,4-difluoro-3,3-dimethyl-1-(7-methylpyrazolo[1,5-a]pyridin-3-yl)isoquinoline | 100:1 | 60:0.6 |
| X.38 | 4,4-difluoro-3,3-dimethyl-1-(7-methylpyrazolo[1,5-a]pyridin-3-yl)isoquinoline | 3.3:1 | 20:6 |
| X.38 | 4,4-difluoro-3,3-dimethyl-1-(7-methylpyrazolo[1,5-a]pyridin-3-yl)isoquinoline | 33.3:1 | 20:0.6 |
| X.38 | 1-(4,5-dimethylbenzimidazol-1-yl)-4,4,5-trifluoro-3,3-dimethyl-isoquinoline | 10:1 | 60:6 |
| X.38 | 1-(4,5-dimethylbenzimidazol-1-yl)-4,4,5-trifluoro-3,3-dimethyl-isoquinoline | 100:1 | 60:0.6 |
| X.38 | 1-(4,5-dimethylbenzimidazol-1-yl)-4,4,5-trifluoro-3,3-dimethyl-isoquinoline | 3.3:1 | 20:6 |
| X.38 | 1-(4,5-dimethylbenzimidazol-1-yl)-4,4,5-trifluoro-3,3-dimethyl-isoquinoline | 33.3:1 | 20:0.6 |
| X.38 | 1-(4,5-dimethylbenzimidazol-1-yl)-4,4-difluoro-3,3-dimethyl-isoquinoline | 10:1 | 60:6 |
| X.38 | 1-(4,5-dimethylbenzimidazol-1-yl)-4,4-difluoro-3,3-dimethyl-isoquinoline | 100:1 | 60:0.6 |
| X.38 | 1-(4,5-dimethylbenzimidazol-1-yl)-4,4-difluoro-3,3-dimethyl-isoquinoline | 3.3:1 | 20:6 |
| X.38 | 1-(4,5-dimethylbenzimidazol-1-yl)-4,4-difluoro-3,3-dimethyl-isoquinoline | 33.3:1 | 20:0.6 |
| X.38 | Isopyrazam | 10:1 | 60:6 |
| X.38 | Isopyrazam | 100:1 | 60:0.6 |
| X.38 | Isopyrazam | 3.3:1 | 20:6 |
| X.38 | Isopyrazam | 33.3:1 | 20:0.6 |
| X.38 | Sedaxane | 10:1 | 60:6 |
| X.38 | Sedaxane | 100:1 | 60:0.6 |
| X.38 | Sedaxane | 3.3:1 | 20:6 |
| X.38 | Sedaxane | 33.3:1 | 20:0.6 |
| X.38 | Isofetamid | 10:1 | 60:6 |
| X.38 | Isofetamid | 100:1 | 60:0.6 |
| X.38 | Isofetamid | 3.3:1 | 20:6 |
| X.38 | Isofetamid | 33.3:1 | 20:0.6 |
| X.38 | Ipflufenoquin | 10:1 | 60:6 |
| X.38 | Ipflufenoquin | 100:1 | 60:0.6 |
| X.38 | Ipflufenoquin | 3.3:1 | 20:6 |
| X.38 | Ipflufenoquin | 33.3:1 | 20:0.6 |
| X.38 | Quinofumelin | 10:1 | 60:6 |
| X.38 | Quinofumelin | 100:1 | 60:0.6 |
| X.38 | Quinofumelin | 3.3:1 | 20:6 |
| X.38 | Quinofumelin | 33.3:1 | 20:0.6 |
| X.38 | Tricyclazole | 3:1 | 60:20 |
| X.38 | Tricyclazole | 10:1 | 60:6 |
| X.38 | Tricyclazole | 1:1 | 20:20 |
| X.38 | Tricyclazole | 3.3:1 | 20:6 |
| X.38 | Pyroquilon | 3:1 | 60:20 |
| X.38 | Pyroquilon | 10:1 | 60:6 |
| X.38 | Pyroquilon | 1:1 | 20:20 |
| X.38 | Pyroquilon | 3.3:1 | 20:6 |

Example B33: Activity Against *Glomerella agenarium* syn. *Colletotrichum lagenarium* (Anthracnose of Cucurbits)

Conidia of the fungus from cryogenic storage were directly mixed into nutrient broth (PDB potato dextrose broth). A DMSO solution of the test compounds was placed into a microtiter plate (96-well format) and the nutrient broth containing the fungal spores was added to it. The test plates were incubated at 24° C. and the inhibition of growth was determined photometrically after 72 hrs at 620 nm. The following mixture compositions (A:B) at the reported concentration (in ppm) gave at least 70% disease control in this test.

| Component A (Compound) | Component B | Ratio A:B | Conc. (ppm) (A:B) |
|---|---|---|---|
| X.29 | Azoxystrobin | 10:1 | 20:2 |
| X.29 | Azoxystrobin | 100:1 | 20:0.2 |
| X.29 | Azoxystrobin | 1:1 | 2:2 |
| X.29 | Azoxystrobin | 10:1 | 2:0.2 |
| X.29 | Trifloxystrobin | 10:1 | 20:2 |
| X.29 | Trifloxystrobin | 100:1 | 20:0.2 |
| X.29 | Trifloxystrobin | 1:1 | 2:2 |
| X.29 | Trifloxystrobin | 10:1 | 2:0.2 |
| X.29 | Metyltetraprole | 10:1 | 20:2 |
| X.29 | Metyltetraprole | 100:1 | 20:0.2 |
| X.29 | Metyltetraprole | 1:1 | 2:2 |
| X.29 | Metyltetraprole | 10:1 | 2:0.2 |
| X.29 | Difenoconazole | 3.3:1 | 20:6 |
| X.29 | Difenoconazole | 33.3:1 | 20:0.6 |
| X.29 | Difenoconazole | 1:3 | 2:6 |
| X.29 | Hexaconazole | 3.3:1 | 20:6 |
| X.29 | Hexaconazole | 33.3:1 | 20:0.6 |
| X.29 | Hexaconazole | 1:3 | 2:6 |
| X.29 | Propiconazole | 3.3:1 | 20:6 |
| X.29 | Propiconazole | 33.3:1 | 20:0.6 |
| X.29 | Propiconazole | 1:3 | 2:6 |
| X.29 | Propiconazole | 3.3:1 | 2:0.6 |
| X.29 | Prothioconazole | 3.3:1 | 20:6 |
| X.29 | Prothioconazole | 33.3:1 | 20:0.6 |
| X.29 | Prothioconazole | 1:3 | 2:6 |
| X.29 | Prothioconazole | 3.3:1 | 2:0.6 |
| X.29 | Mefentrifluconazole | 3.3:1 | 20:6 |
| X.29 | Mefentrifluconazole | 33.3:1 | 20:0.6 |
| X.29 | Mefentrifluconazole | 1:3 | 2:6 |
| X.29 | Fenpropidin | 1:1 | 20:20 |
| X.29 | Fenpropidin | 10:1 | 20:2 |
| X.29 | Fenpropidin | 1:10 | 2:20 |
| X.29 | Fenpropimorph | 1:1 | 20:20 |
| X.29 | Fenpropimorph | 10:1 | 20:2 |
| X.29 | Fenpropimorph | 1:10 | 2:20 |
| X.29 | Fenpropimorph | 1:1 | 2:2 |
| X.29 | Fluxapyroxad | 10:1 | 20:2 |
| X.29 | Fluxapyroxad | 100:1 | 20:0.2 |
| X.29 | Fluopyram | 10:1 | 20:2 |
| X.29 | Fluopyram | 100:1 | 20:0.2 |
| X.29 | Fluopyram | 1:1 | 2:2 |
| X.29 | Fluopyram | 10:1 | 2:0.2 |
| X.29 | Isopyrazam | 10:1 | 20:2 |
| X.29 | Isopyrazam | 100:1 | 20:0.2 |
| X.29 | Isopyrazam | 1:1 | 2:2 |
| X.29 | Sedaxane | 10:1 | 20:2 |
| X.29 | Sedaxane | 100:1 | 20:0.2 |
| X.29 | Sedaxane | 1:1 | 2:2 |
| X.29 | Sedaxane | 10:1 | 2:0.2 |
| X.29 | Benzovindiflupyr | 10:1 | 20:2 |
| X.29 | Benzovindiflupyr | 100:1 | 20:0.2 |
| X.29 | Benzovindiflupyr | 1:1 | 2:2 |
| X.29 | Benzovindiflupyr | 10:1 | 2:0.2 |
| X.29 | Pydiflumetofen | 10:1 | 20:2 |
| X.29 | Pydiflumetofen | 100:1 | 20:0.2 |
| X.29 | Pydiflumetofen | 1:1 | 2:2 |
| X.29 | Isoflucypram | 10:1 | 20:2 |
| X.29 | Isoflucypram | 100:1 | 20:0.2 |
| X.29 | Isofetamid | 10:1 | 20:2 |
| X.29 | Isofetamid | 100:1 | 20:0.2 |
| X.29 | Isofetamid | 1:1 | 2:2 |
| X.29 | Isofetamid | 10:1 | 2:0.2 |
| X.29 | Pyrapropoyne | 10:1 | 20:2 |
| X.29 | Pyrapropoyne | 100:1 | 20:0.2 |
| X.29 | Pyrapropoyne | 1:1 | 2:2 |
| X.29 | Fluindapyr | 10:1 | 20:2 |

-continued

| Component A (Compound) | Component B | Ratio A:B | Conc. (ppm) (A:B) |
|---|---|---|---|
| X.29 | Fluindapyr | 100:1 | 20:0.2 |
| X.29 | Fluindapyr | 1:1 | 2:2 |
| X.29 | Fenpicoxamid | 3.3:1 | 20:6 |
| X.29 | Fenpicoxamid | 33.3:1 | 20:0.6 |
| X.29 | Fenpicoxamid | 1:3 | 2:6 |
| X.29 | Fenpicoxamid | 3.3:1 | 2:0.6 |
| X.29 | Florylpicoxamid | 10:1 | 20:2 |
| X.29 | Florylpicoxamid | 100:1 | 20:0.2 |
| X.29 | Florylpicoxamid | 1:1 | 2:2 |
| X.29 | Florylpicoxamid | 10:1 | 2:0.2 |
| X.29 | Chlorothalonil | 3.3:1 | 20:6 |
| X.29 | Chlorothalonil | 33.3:1 | 20:0.6 |
| X.29 | Chlorothalonil | 1:3 | 2:6 |
| X.29 | Chlorothalonil | 3.33:1 | 2:0.6 |
| X.29 | Mancozeb | 1:1 | 20:20 |
| X.29 | Mancozeb | 3.3:1 | 20:6 |
| X.29 | Mancozeb | 1:10 | 2:20 |
| X.29 | Mancozeb | 1:3 | 2:6 |
| X.29 | Mandipropamid | 1:1 | 20:20 |
| X.29 | Mandipropamid | 3.3:1 | 20:6 |
| X.29 | Mandipropamid | 1:10 | 2:20 |
| X.29 | Mandipropamid | 1:3 | 2:6 |
| X.29 | Oxathiapiprolin | 1:1 | 20:20 |
| X.29 | Oxathiapiprolin | 3.3:1 | 20:6 |
| X.29 | Oxathiapiprolin | 1:10 | 2:20 |
| X.29 | Oxathiapiprolin | 1:3 | 2:6 |
| X.29 | Fluazinam | 10:1 | 20:2 |
| X.29 | Fluazinam | 100:1 | 20:0.2 |
| X.29 | Fluazinam | 1:1 | 2:2 |
| X.29 | Fluazinam | 10:1 | 2:0.2 |
| X.29 | Fludioxonil | 3.3:1 | 20:6 |
| X.29 | Fludioxonil | 33.3:1 | 20:0.6 |
| X.29 | Fludioxonil | 1:3 | 2:6 |
| X.29 | Fludioxonil | 3.3:1 | 2:0.6 |
| X.29 | Cyprodinil | 3.3:1 | 20:6 |
| X.29 | Cyprodinil | 33.3:1 | 20:0.6 |
| X.29 | Cyprodinil | 1:3 | 2:6 |
| X.29 | Cyprodinil | 3.3:1 | 2:0.6 |
| X.29 | Metalaxyl-M | 1:1 | 20:20 |
| X.29 | Metalaxyl-M | 3.3:1 | 20:6 |
| X.29 | Metalaxyl-M | 1:10 | 2:20 |
| X.29 | Metalaxyl-M | 1:3 | 2:6 |
| X.29 | Aminopyrifen | 10:1 | 20:2 |
| X.29 | Aminopyrifen | 100:1 | 20:0.2 |
| X.29 | Aminopyrifen | 1:1 | 2:2 |
| X.29 | Aminopyrifen | 10:1 | 2:0.2 |
| X.29 | Folpet | 3.3:1 | 20:6 |
| X.29 | Folpet | 10:1 | 20:2 |
| X.29 | Folpet | 1:3 | 2:6 |
| X.29 | Folpet | 1:1 | 2:2 |
| X.29 | Ipflufenoquin | 10:1 | 20:2 |
| X.29 | Ipflufenoquin | 100:1 | 20:0.2 |
| X.29 | Ipflufenoquin | 1:1 | 2:2 |
| X.29 | Ipflufenoquin | 10:1 | 2:0.2 |
| X.29 | Quinofumelin | 10:1 | 20:2 |
| X.29 | Quinofumelin | 100:1 | 20:0.2 |
| X.29 | Quinofumelin | 1:1 | 2:2 |
| X.29 | Quinofumelin | 10:1 | 2:0.2 |
| X.29 | Tricyclazole | 1:1 | 20:20 |
| X.29 | Tricyclazole | 3:1 | 20:6 |
| X.29 | Tricyclazole | 1:10 | 2:20 |
| X.29 | Tricyclazole | 1:3 | 2:6 |
| X.29 | Pyroquilon | 1:1 | 20:20 |
| X.29 | Pyroquilon | 3:1 | 20:6 |
| X.29 | Pyroquilon | 1:10 | 2:20 |
| X.29 | Pyroquilon | 1:3 | 2:6 |
| X.29 | N-(1-benzyl-1,3-dimethyl-butyl)-8-fluoro-quinoline-3-carboxamide | 10:1 | 20:2 |
| X.29 | N-(1-benzyl-1,3-dimethyl-butyl)-8-fluoro-quinoline-3-carboxamide | 100:1 | 20:0.2 |
| X.29 | N-(1-benzyl-1,3-dimethyl-butyl)-8-fluoro-quinoline-3-carboxamide | 1:1 | 2:2 |

-continued

| Component A (Compound) | Component B | Ratio A:B | Conc. (ppm) (A:B) |
|---|---|---|---|
| X.29 | N-(1-benzyl-1,3-dimethyl-butyl)-8-fluoro-quinoline-3-carboxamide | 10:1 | 2:0.2 |
| X.29 | N-(1-benzyl-3,3,3-trifluoro-1-methyl-propyl)-8-fluoro-quinoline-3-carboxamide | 10:1 | 20:2 |
| X.29 | N-(1-benzyl-3,3,3-trifluoro-1-methyl-propyl)-8-fluoro-quinoline-3-carboxamide | 100:1 | 20:0.2 |
| X.29 | N-(1-benzyl-3,3,3-trifluoro-1-methyl-propyl)-8-fluoro-quinoline-3-carboxamide | 1:1 | 2:2 |
| X.29 | N-(1-benzyl-3,3,3-trifluoro-1-methyl-propyl)-8-fluoro-quinoline-3-carboxamide | 10:1 | 2:0.2 |
| X.29 | 1-(6,7-dimethylpyrazolo[1,5-a]pyridin-3-yl)-4,4,5-trifluoro-3,3-dimethyl-isoquinoline | 10:1 | 20:2 |
| X.29 | 1-(6,7-dimethylpyrazolo[1,5-a]pyridin-3-yl)-4,4,5-trifluoro-3,3-dimethyl-isoquinoline | 100:1 | 20:0.2 |
| X.29 | 1-(6,7-dimethylpyrazolo[1,5-a]pyridin-3-yl)-4,4,5-trifluoro-3,3-dimethyl-isoquinoline | 1:1 | 2:2 |
| X.29 | 1-(6,7-dimethylpyrazolo[1,5-a]pyridin-3-yl)-4,4,5-trifluoro-3,3-dimethyl-isoquinoline | 10:1 | 2:0.2 |
| X.29 | 4,4-difluoro-3,3-dimethyl-1-(7-methylpyrazolo[1,5-a]pyridin-3-yl) isoquinoline | 10:1 | 20:2 |
| X.29 | 4,4-difluoro-3,3-dimethyl-1-(7-methylpyrazolo[1,5-a]pyridin-3-yl) isoquinoline | 100:1 | 20:0.2 |
| X.29 | 4,4-difluoro-3,3-dimethyl-1-(7-methylpyrazolo[1,5-a]pyridin-3-yl) isoquinoline | 1:1 | 2:2 |
| X.29 | 4,4-difluoro-3,3-dimethyl-1-(7-methylpyrazolo[1,5-a]pyridin-3-yl) isoquinoline | 10:1 | 2:0.2 |
| X.29 | 1-(4,5-dimethylbenzimidazol-1-yl)-4,4,5-trifluoro-3,3-dimethyl-isoquinoline | 10:1 | 20:2 |
| X.29 | 1-(4,5-dimethylbenzimidazol-1-yl)-4,4,5-trifluoro-3,3-dimethyl-isoquinoline | 100:1 | 20:0.2 |
| X.29 | 1-(4,5-dimethylbenzimidazol-1-yl)-4,4,5-trifluoro-3,3-dimethyl-isoquinoline | 1:1 | 2:2 |
| X.29 | 1-(4,5-dimethylbenzimidazol-1-yl)-4,4,5-trifluoro-3,3-dimethyl-isoquinoline | 10:1 | 2:0.2 |
| X.29 | 1-(4,5-dimethylbenzimidazol-1-yl)-4,4-difluoro-3,3-dimethyl-isoquinoline | 10:1 | 20:2 |
| X.29 | 1-(4,5-dimethylbenzimidazol-1-yl)-4,4-difluoro-3,3-dimethyl-isoquinoline | 100:1 | 20:0.2 |
| X.29 | 1-(4,5-dimethylbenzimidazol-1-yl)-4,4-difluoro-3,3-dimethyl-isoquinoline | 1:1 | 2:2 |
| X.29 | 1-(4,5-dimethylbenzimidazol-1-yl)-4,4-difluoro-3,3-dimethyl-isoquinoline | 10:1 | 2:0.2 |
| X.36 | Azoxystrobin | 10:1 | 60:6 |
| X.36 | Azoxystrobin | 100:1 | 60:0.6 |
| X.36 | Azoxystrobin | 3.3:1 | 20:6 |
| X.36 | Azoxystrobin | 33.3:1 | 20:0.6 |
| X.36 | Trifloxystrobin | 10:1 | 60:6 |
| X.36 | Trifloxystrobin | 100:1 | 60:0.6 |
| X.36 | Trifloxystrobin | 3.3:1 | 20:6 |
| X.36 | Trifloxystrobin | 33.3:1 | 20:0.6 |
| X.36 | Metyltetraprole | 10:1 | 60:6 |
| X.36 | Metyltetraprole | 100:1 | 60:0.6 |
| X.36 | Metyltetraprole | 3.3:1 | 20:6 |
| X.36 | Metyltetraprole | 33.3:1 | 20:0.6 |
| X.36 | Difenoconazole | 10:1 | 60:6 |

-continued

| Component A (Compound) | Component B | Ratio A:B | Conc. (ppm) (A:B) |
|---|---|---|---|
| X.36 | Difenoconazole | 100:1 | 60:0.6 |
| X.36 | Difenoconazole | 3.3:1 | 20:6 |
| X.36 | Difenoconazole | 33.3:1 | 20:0.6 |
| X.36 | Propiconazole | 10:1 | 60:6 |
| X.36 | Propiconazole | 100:1 | 60:0.6 |
| X.36 | Propiconazole | 3.3:1 | 20:6 |
| X.36 | Propiconazole | 33.3:1 | 20:0.6 |
| X.36 | Prothioconazole | 10:1 | 60:6 |
| X.36 | Prothioconazole | 100:1 | 60:0.6 |
| X.36 | Prothioconazole | 3.3:1 | 20:6 |
| X.36 | Prothioconazole | 33.3:1 | 20:0.6 |
| X.36 | Mefentrifluconazole | 10:1 | 60:6 |
| X.36 | Mefentrifluconazole | 100:1 | 60:0.6 |
| X.36 | Mefentrifluconazole | 3.3:1 | 20:6 |
| X.36 | Mefentrifluconazole | 33.3:1 | 20:0.6 |
| X.36 | Fenpropidin | 3:1 | 60:20 |
| X.36 | Fenpropidin | 10:1 | 60:6 |
| X.36 | Fenpropidin | 1:1 | 20:20 |
| X.36 | Fenpropidin | 3.3:1 | 20:6 |
| X.36 | Fenpropimorph | 3:1 | 60:20 |
| X.36 | Fenpropimorph | 10:1 | 60:6 |
| X.36 | Fenpropimorph | 1:1 | 20:20 |
| X.36 | Fenpropimorph | 3.3:1 | 20:6 |
| X.36 | Fluxapyroxad | 10:1 | 60:6 |
| X.36 | Fluxapyroxad | 100:1 | 60:0.6 |
| X.36 | Fluxapyroxad | 3.3:1 | 20:6 |
| X.36 | Fluxapyroxad | 33.3:1 | 20:0.6 |
| X.36 | Fluopyram | 10:1 | 60:6 |
| X.36 | Fluopyram | 100:1 | 60:0.6 |
| X.36 | Fluopyram | 3.3:1 | 20:6 |
| X.36 | Fluopyram | 33.3:1 | 20:0.6 |
| X.36 | Benzovindiflupyr | 10:1 | 60:6 |
| X.36 | Benzovindiflupyr | 100:1 | 60:0.6 |
| X.36 | Benzovindiflupyr | 3.3:1 | 20:6 |
| X.36 | Benzovindiflupyr | 33.3:1 | 20:0.6 |
| X.36 | Pydiflumetofen | 10:1 | 60:6 |
| X.36 | Pydiflumetofen | 100:1 | 60:0.6 |
| X.36 | Pydiflumetofen | 3.3:1 | 20:6 |
| X.36 | Pydiflumetofen | 33.3:1 | 20:0.6 |
| X.36 | Isoflucypram | 10:1 | 60:6 |
| X.36 | Isoflucypram | 100:1 | 60:0.6 |
| X.36 | Isoflucypram | 3.3:1 | 20:6 |
| X.36 | Isoflucypram | 33.3:1 | 20:0.6 |
| X.36 | Fluindapyr | 10:1 | 60:6 |
| X.36 | Fluindapyr | 100:1 | 60:0.6 |
| X.36 | Fluindapyr | 3.3:1 | 20:6 |
| X.36 | Fluindapyr | 33.3:1 | 20:0.6 |
| X.36 | Florylpicoxamid | 10:1 | 60:6 |
| X.36 | Florylpicoxamid | 100:1 | 60:0.6 |
| X.36 | Florylpicoxamid | 3.3:1 | 20:6 |
| X.36 | Florylpicoxamid | 33.3:1 | 20:0.6 |
| X.36 | Metarylpicoxamid | 10:1 | 60:6 |
| X.36 | Metarylpicoxamid | 100:1 | 60:0.6 |
| X.36 | Metarylpicoxamid | 3.3:1 | 20:6 |
| X.36 | Metarylpicoxamid | 33.3:1 | 20:0.6 |
| X.36 | Chlorothalonil | 10:1 | 60:6 |
| X.36 | Chlorothalonil | 100:1 | 60:0.6 |
| X.36 | Chlorothalonil | 3.3:1 | 20:6 |
| X.36 | Chlorothalonil | 33.3:1 | 20:0.6 |
| X.36 | Mancozeb | 3:1 | 60:20 |
| X.36 | Mancozeb | 10:1 | 60:6 |
| X.36 | Mancozeb | 1:1 | 20:20 |
| X.36 | Mancozeb | 3.3:1 | 20:6 |
| X.36 | Mandipropamid | 3:1 | 60:20 |
| X.36 | Mandipropamid | 10:1 | 60:6 |
| X.36 | Mandipropamid | 1:1 | 20:20 |
| X.36 | Mandipropamid | 3.3:1 | 20:6 |
| X.36 | Oxathiapiprolin | 3:1 | 60:20 |
| X.36 | Oxathiapiprolin | 10:1 | 60:6 |
| X.36 | Oxathiapiprolin | 1:1 | 20:20 |
| X.36 | Oxathiapiprolin | 3.3:1 | 20:6 |
| X.36 | Fluazinam | 10:1 | 60:6 |
| X.36 | Fluazinam | 100:1 | 60:0.6 |
| X.36 | Fluazinam | 3.3:1 | 20:6 |
| X.36 | Fluazinam | 33.3:1 | 20:0.6 |

-continued

| Component A (Compound) | Component B | Ratio A:B | Conc. (ppm) (A:B) |
|---|---|---|---|
| X.36 | Fludioxonil | 10:1 | 60:6 |
| X.36 | Fludioxonil | 100:1 | 60:0.6 |
| X.36 | Fludioxonil | 3.3:1 | 20:6 |
| X.36 | Fludioxonil | 33.3:1 | 20:0.6 |
| X.36 | Cyprodinil | 10:1 | 60:6 |
| X.36 | Cyprodinil | 100:1 | 60:0.6 |
| X.36 | Cyprodinil | 3.3:1 | 20:6 |
| X.36 | Cyprodinil | 33.3:1 | 20:0.6 |
| X.36 | Metalaxyl-M | 3:1 | 60:20 |
| X.36 | Metalaxyl-M | 10:1 | 60:6 |
| X.36 | Metalaxyl-M | 1:1 | 20:20 |
| X.36 | Metalaxyl-M | 3.3:1 | 20:6 |
| X.36 | Folpet | 10:1 | 60:6 |
| X.36 | Folpet | 30:1 | 60:2 |
| X.36 | Folpet | 3.3:1 | 20:6 |
| X.36 | Folpet | 10:1 | 20:2 |
| X.36 | Aminopyrifen | 10:1 | 60:6 |
| X.36 | Aminopyrifen | 100:1 | 60:0.6 |
| X.36 | Aminopyrifen | 3.3:1 | 20:6 |
| X.36 | Aminopyrifen | 33.3:1 | 20:0.6 |
| X.36 | N-(1-benzyl-1,3-dimethyl-butyl)-8-fluoro-quinoline-3-carboxamide | 10:1 | 60:6 |
| X.36 | N-(1-benzyl-1,3-dimethyl-butyl)-8-fluoro-quinoline-3-carboxamide | 100:1 | 60:0.6 |
| X.36 | N-(1-benzyl-1,3-dimethyl-butyl)-8-fluoro-quinoline-3-carboxamide | 3.3:1 | 20:6 |
| X.36 | N-(1-benzyl-1,3-dimethyl-butyl)-8-fluoro-quinoline-3-carboxamide | 33.3:1 | 20:0.6 |
| X.36 | N-(1-benzyl-3,3,3-trifluoro-1-methyl-propyl)-8-fluoro-quinoline-3-carboxamide | 10:1 | 60:6 |
| X.36 | N-(1-benzyl-3,3,3-trifluoro-1-methyl-propyl)-8-fluoro-quinoline-3-carboxamide | 100:1 | 60:0.6 |
| X.36 | N-(1-benzyl-3,3,3-trifluoro-1-methyl-propyl)-8-fluoro-quinoline-3-carboxamide | 3.3:1 | 20:6 |
| X.36 | N-(1-benzyl-3,3,3-trifluoro-1-methyl-propyl)-8-fluoro-quinoline-3-carboxamide | 33.3:1 | 20:0.6 |
| X.36 | 1-(6,7-dimethylpyrazolo[1,5-a]pyridin-3-yl)-4,4,5-trifluoro-3,3-dimethyl-isoquinoline | 10:1 | 60:6 |
| X.36 | 1-(6,7-dimethylpyrazolo[1,5-a]pyridin-3-yl)-4,4,5-trifluoro-3,3-dimethyl-isoquinoline | 100:1 | 60:0.6 |
| X.36 | 1-(6,7-dimethylpyrazolo[1,5-a]pyridin-3-yl)-4,4,5-trifluoro-3,3-dimethyl-isoquinoline | 3.3:1 | 20:6 |
| X.36 | 1-(6,7-dimethylpyrazolo[1,5-a]pyridin-3-yl)-4,4,5-trifluoro-3,3-dimethyl-isoquinoline | 33.3:1 | 20:0.6 |
| X.36 | 4,4-difluoro-3,3-dimethyl-1-(7-methylpyrazolo[1,5-a]pyridin-3-yl)isoquinoline | 10:1 | 60:6 |
| X.36 | 4,4-difluoro-3,3-dimethyl-1-(7-methylpyrazolo[1,5-a]pyridin-3-yl)isoquinoline | 100:1 | 60:0.6 |
| X.36 | 4,4-difluoro-3,3-dimethyl-1-(7-methylpyrazolo[1,5-a]pyridin-3-yl)isoquinoline | 3.3:1 | 20:6 |
| X.36 | 4,4-difluoro-3,3-dimethyl-1-(7-methylpyrazolo[1,5-a]pyridin-3-yl)isoquinoline | 33.3:1 | 20:0.6 |
| X.36 | 1-(4,5-dimethylbenzimidazol-1-yl)-4,4,5-trifluoro-3,3-dimethyl-isoquinoline | 10:1 | 60:6 |
| X.36 | 1-(4,5-dimethylbenzimidazol-1-yl)-4,4,5-trifluoro-3,3-dimethyl-isoquinoline | 100:1 | 60:0.6 |

-continued

| Component A (Compound) | Component B | Ratio A:B | Conc. (ppm) (A:B) |
|---|---|---|---|
| X.36 | 1-(4,5-dimethylbenzimidazol-1-yl)-4,4,5-trifluoro-3,3-dimethyl-isoquinoline | 3.3:1 | 20:6 |
| X.36 | 1-(4,5-dimethylbenzimidazol-1-yl)-4,4,5-trifluoro-3,3-dimethyl-isoquinoline | 33.3:1 | 20:0.6 |
| X.36 | 1-(4,5-dimethylbenzimidazol-1-yl)-4,4-difluoro-3,3-dimethyl-isoquinoline | 10:1 | 60:6 |
| X.36 | 1-(4,5-dimethylbenzimidazol-1-yl)-4,4-difluoro-3,3-dimethyl-isoquinoline | 100:1 | 60:0.6 |
| X.36 | 1-(4,5-dimethylbenzimidazol-1-yl)-4,4-difluoro-3,3-dimethyl-isoquinoline | 3.3:1 | 20:6 |
| X.36 | 1-(4,5-dimethylbenzimidazol-1-yl)-4,4-difluoro-3,3-dimethyl-isoquinoline | 33.3:1 | 20:0.6 |
| X.36 | Isopyrazam | 10:1 | 60:6 |
| X.36 | Isopyrazam | 100:1 | 60:0.6 |
| X.36 | Isopyrazam | 3.3:1 | 20:6 |
| X.36 | Isopyrazam | 33.3:1 | 20:0.6 |
| X.36 | Sedaxane | 10:1 | 60:6 |
| X.36 | Sedaxane | 100:1 | 60:0.6 |
| X.36 | Sedaxane | 3.3:1 | 20:6 |
| X.36 | Sedaxane | 33.3:1 | 20:0.6 |
| X.36 | Isofetamid | 10:1 | 60:6 |
| X.36 | Isofetamid | 100:1 | 60:0.6 |
| X.36 | Isofetamid | 3.3:1 | 20:6 |
| X.36 | Isofetamid | 33.3:1 | 20:0.6 |
| X.36 | Ipflufenoquin | 10:1 | 60:6 |
| X.36 | Ipflufenoquin | 100:1 | 60:0.6 |
| X.36 | Ipflufenoquin | 3.3:1 | 20:6 |
| X.36 | Ipflufenoquin | 33.3:1 | 20:0.6 |
| X.36 | Quinofumelin | 10:1 | 60:6 |
| X.36 | Quinofumelin | 100:1 | 60:0.6 |
| X.36 | Quinofumelin | 3.3:1 | 20:6 |
| X.36 | Quinofumelin | 33.3:1 | 20:0.6 |
| X.36 | Tricyclazole | 3:1 | 60:20 |
| X.36 | Tricyclazole | 10:1 | 60:6 |
| X.36 | Tricyclazole | 1:1 | 20:20 |
| X.36 | Tricyclazole | 3.3:1 | 20:6 |
| X.36 | Pyroquilon | 3:1 | 60:20 |
| X.36 | Pyroquilon | 10:1 | 60:6 |
| X.36 | Pyroquilon | 1:1 | 20:20 |
| X.36 | Pyroquilon | 3.3:1 | 20:6 |
| X.38 | Azoxystrobin | 10:1 | 60:6 |
| X.38 | Azoxystrobin | 100:1 | 60:0.6 |
| X.38 | Azoxystrobin | 3.3:1 | 20:6 |
| X.38 | Azoxystrobin | 33.3:1 | 20:0.6 |
| X.38 | Trifloxystrobin | 10:1 | 60:6 |
| X.38 | Trifloxystrobin | 100:1 | 60:0.6 |
| X.38 | Trifloxystrobin | 3.3:1 | 20:6 |
| X.38 | Trifloxystrobin | 33.3:1 | 20:0.6 |
| X.38 | Metyltetraprole | 10:1 | 60:6 |
| X.38 | Metyltetraprole | 100:1 | 60:0.6 |
| X.38 | Metyltetraprole | 3.3:1 | 20:6 |
| X.38 | Metyltetraprole | 33.3:1 | 20:0.6 |
| X.38 | Difenoconazole | 10:1 | 60:6 |
| X.38 | Difenoconazole | 100:1 | 60:0.6 |
| X.38 | Difenoconazole | 3.3:1 | 20:6 |
| X.38 | Propiconazole | 10:1 | 60:6 |
| X.38 | Propiconazole | 100:1 | 60:0.6 |
| X.38 | Propiconazole | 3.3:1 | 20:6 |
| X.38 | Prothioconazole | 10:1 | 60:6 |
| X.38 | Prothioconazole | 100:1 | 60:0.6 |
| X.38 | Prothioconazole | 3.3:1 | 20:6 |
| X.38 | Prothioconazole | 33.3:1 | 20:0.6 |
| X.38 | Mefentrifluconazole | 10:1 | 60:6 |
| X.38 | Mefentrifluconazole | 100:1 | 60:0.6 |
| X.38 | Mefentrifluconazole | 3.3:1 | 20:6 |
| X.38 | Fenpropidin | 3:1 | 60:20 |
| X.38 | Fenpropidin | 10:1 | 60:6 |
| X.38 | Fenpropidin | 1:1 | 20:20 |
| X.38 | Fenpropidin | 3.3:1 | 20:6 |
| X.38 | Fenpropimorph | 3:1 | 60:20 |
| X.38 | Fenpropimorph | 10:1 | 60:6 |
| X.38 | Fenpropimorph | 1:1 | 20:20 |
| X.38 | Fenpropimorph | 3.3:1 | 20:6 |
| X.38 | Fluxapyroxad | 10:1 | 60:6 |
| X.38 | Fluxapyroxad | 100:1 | 60:0.6 |
| X.38 | Fluopyram | 10:1 | 60:6 |
| X.38 | Fluopyram | 100:1 | 60:0.6 |
| X.38 | Benzovindiflupyr | 10:1 | 60:6 |
| X.38 | Benzovindiflupyr | 100:1 | 60:0.6 |
| X.38 | Benzovindiflupyr | 3.3:1 | 20:6 |
| X.38 | Benzovindiflupyr | 33.3:1 | 20:0.6 |
| X.38 | Pydiflumetofen | 10:1 | 60:6 |
| X.38 | Pydiflumetofen | 100:1 | 60:0.6 |
| X.38 | Pydiflumetofen | 3.3:1 | 20:6 |
| X.38 | Isoflucypram | 10:1 | 60:6 |
| X.38 | Isoflucypram | 100:1 | 60:0.6 |
| X.38 | Isoflucypram | 3.3:1 | 20:6 |
| X.38 | Fluindapyr | 10:1 | 60:6 |
| X.38 | Fluindapyr | 100:1 | 60:0.6 |
| X.38 | Fluindapyr | 3.3:1 | 20:6 |
| X.38 | Florylpicoxamid | 10:1 | 60:6 |
| X.38 | Florylpicoxamid | 100:1 | 60:0.6 |
| X.38 | Florylpicoxamid | 3.3:1 | 20:6 |
| X.38 | Florylpicoxamid | 33.3:1 | 20:0.6 |
| X.38 | Metarylpicoxamid | 10:1 | 60:6 |
| X.38 | Metarylpicoxamid | 100:1 | 60:0.6 |
| X.38 | Metarylpicoxamid | 3.3:1 | 20:6 |
| X.38 | Metarylpicoxamid | 33.3:1 | 20:0.6 |
| X.38 | Chlorothalonil | 10:1 | 60:6 |
| X.38 | Chlorothalonil | 100:1 | 60:0.6 |
| X.38 | Chlorothalonil | 3.3:1 | 20:6 |
| X.38 | Chlorothalonil | 33.3:1 | 20:0.6 |
| X.38 | Mancozeb | 3:1 | 60:20 |
| X.38 | Mancozeb | 10:1 | 60:6 |
| X.38 | Mancozeb | 1:1 | 20:20 |
| X.38 | Mancozeb | 3.3:1 | 20:6 |
| X.38 | Mandipropamid | 3:1 | 60:20 |
| X.38 | Mandipropamid | 10:1 | 60:6 |
| X.38 | Mandipropamid | 1:1 | 20:20 |
| X.38 | Mandipropamid | 3.3:1 | 20:6 |
| X.38 | Oxathiapiprolin | 3:1 | 60:20 |
| X.38 | Oxathiapiprolin | 10:1 | 60:6 |
| X.38 | Oxathiapiprolin | 1:1 | 20:20 |
| X.38 | Fluazinam | 10:1 | 60:6 |
| X.38 | Fluazinam | 100:1 | 60:0.6 |
| X.38 | Fluazinam | 3.3:1 | 20:6 |
| X.38 | Fluazinam | 33.3:1 | 20:0.6 |
| X.38 | Fludioxonil | 10:1 | 60:6 |
| X.38 | Fludioxonil | 100:1 | 60:0.6 |
| X.38 | Fludioxonil | 3.3:1 | 20:6 |
| X.38 | Fludioxonil | 33.3:1 | 20:0.6 |
| X.38 | Cyprodinil | 10:1 | 60:6 |
| X.38 | Cyprodinil | 100:1 | 60:0.6 |
| X.38 | Cyprodinil | 3.3:1 | 20:6 |
| X.38 | Cyprodinil | 33.3:1 | 20:0.6 |
| X.38 | Metalaxyl-M | 3:1 | 60:20 |
| X.38 | Metalaxyl-M | 10:1 | 60:6 |
| X.38 | Folpet | 10:1 | 60:6 |
| X.38 | Folpet | 30:1 | 60:2 |
| X.38 | Folpet | 3.3:1 | 20:6 |
| X.38 | Folpet | 10:1 | 20:2 |
| X.38 | Aminopyrifen | 10:1 | 60:6 |
| X.38 | Aminopyrifen | 100:1 | 60:0.6 |
| X.38 | Aminopyrifen | 3.3:1 | 20:6 |
| X.38 | Aminopyrifen | 33.3:1 | 20:0.6 |
| X.38 | N-(1-benzyl-1,3-dimethyl-butyl)-8-fluoro-quinoline-3-carboxamide | 10:1 | 60:6 |
| X.38 | N-(1-benzyl-1,3-dimethyl-butyl)-8-fluoro-quinoline-3-carboxamide | 100:1 | 60:0.6 |

-continued

| Component A (Compound) | Component B | Ratio A:B | Conc. (ppm) (A:B) |
|---|---|---|---|
| X.38 | N-(1-benzyl-1,3-dimethyl-butyl)-8-fluoro-quinoline-3-carboxamide | 3.3:1 | 20:6 |
| X.38 | N-(1-benzyl-1,3-dimethyl-butyl)-8-fluoro-quinoline-3-carboxamide | 33.3:1 | 20:0.6 |
| X.38 | N-(1-benzyl-3,3,3-trifluoro-1-methyl-propyl)-8-fluoro-quinoline-3-carboxamide | 10:1 | 60:6 |
| X.38 | N-(1-benzyl-3,3,3-trifluoro-1-methyl-propyl)-8-fluoro-quinoline-3-carboxamide | 100:1 | 60:0.6 |
| X.38 | N-(1-benzyl-3,3,3-trifluoro-1-methyl-propyl)-8-fluoro-quinoline-3-carboxamide | 3.3:1 | 20:6 |
| X.38 | N-(1-benzyl-3,3,3-trifluoro-1-methyl-propyl)-8-fluoro-quinoline-3-carboxamide | 33.3:1 | 20:0.6 |
| X.38 | 1-(6,7-dimethylpyrazolo[1,5-a]pyridin-3-yl)-4,4,5-trifluoro-3,3-dimethyl-isoquinoline | 10:1 | 60:6 |
| X.38 | 1-(6,7-dimethylpyrazolo[1,5-a]pyridin-3-yl)-4,4,5-trifluoro-3,3-dimethyl-isoquinoline | 100:1 | 60:0.6 |
| X.38 | 1-(6,7-dimethylpyrazolo[1,5-a]pyridin-3-yl)-4,4,5-trifluoro-3,3-dimethyl-isoquinoline | 3.3:1 | 20:6 |
| X.38 | 1-(6,7-dimethylpyrazolo[1,5-a]pyridin-3-yl)-4,4,5-trifluoro-3,3-dimethyl-isoquinoline | 33.3:1 | 20:0.6 |
| X.38 | 1-(6,7-dimethylpyrazolo[1,5-a]pyridin-3-yl)-4,4,5-trifluoro-3,3-dimethyl-isoquinoline | 10:1 | 60:6 |
| X.38 | 4,4-difluoro-3,3-dimethyl-1-(7-methylpyrazolo[1,5-a]pyridin-3-yl) isoquinoline | 100:1 | 60:0.6 |
| X.38 | 4,4-difluoro-3,3-dimethyl-1-(7-methylpyrazolo[1,5-a]pyridin-3-yl) isoquinoline | 3.3:1 | 20:6 |
| X.38 | 4,4-difluoro-3,3-dimethyl-1-(7-methylpyrazolo[1,5-a]pyridin-3-yl) isoquinoline | 33.3:1 | 20:0.6 |
| X.38 | 1-(4,5-dimethylbenzimidazol-1-yl)-4,4,5-trifluoro-3,3-dimethyl-isoquinoline | 10:1 | 60:6 |
| X.38 | 1-(4,5-dimethylbenzimidazol-1-yl)-4,4,5-trifluoro-3,3-dimethyl-isoquinoline | 100:1 | 60:0.6 |
| X.38 | 1-(4,5-dimethylbenzimidazol-1-yl)-4,4,5-trifluoro-3,3-dimethyl-isoquinoline | 3.3:1 | 20:6 |
| X.38 | 1-(4,5-dimethylbenzimidazol-1-yl)-4,4,5-trifluoro-3,3-dimethyl-isoquinoline | 33.3:1 | 20:0.6 |
| X.38 | 1-(4,5-dimethylbenzimidazol-1-yl)-4,4-difluoro-3,3-dimethyl-isoquinoline | 10:1 | 60:6 |
| X.38 | 1-(4,5-dimethylbenzimidazol-1-yl)-4,4-difluoro-3,3-dimethyl-isoquinoline | 100:1 | 60:0.6 |
| X.38 | 1-(4,5-dimethylbenzimidazol-1-yl)-4,4-difluoro-3,3-dimethyl-isoquinoline | 3.3:1 | 20:6 |
| X.38 | 1-(4,5-dimethylbenzimidazol-1-yl)-4,4-difluoro-3,3-dimethyl-isoquinoline | 33.3:1 | 20:0.6 |
| X.38 | Isopyrazam | 10:1 | 60:6 |
| X.38 | Isopyrazam | 100:1 | 60:0.6 |
| X.38 | Isopyrazam | 3.3:1 | 20:6 |
| X.38 | Isopyrazam | 33.3:1 | 20:0.6 |
| X.38 | Sedaxane | 10:1 | 60:6 |
| X.38 | Sedaxane | 100:1 | 60:0.6 |
| X.38 | Sedaxane | 3.3:1 | 20:6 |
| X.38 | Isofetamid | 10:1 | 60:6 |
| X.38 | Isofetamid | 100:1 | 60:0.6 |
| X.38 | Isofetamid | 3.3:1 | 20:6 |
| X.38 | Isofetamid | 33.3:1 | 20:0.6 |

-continued

| Component A (Compound) | Component B | Ratio A:B | Conc. (ppm) (A:B) |
|---|---|---|---|
| X.38 | Ipflufenoquin | 10:1 | 60:6 |
| X.38 | Ipflufenoquin | 100:1 | 60:0.6 |
| X.38 | Ipflufenoquin | 3.3:1 | 20:6 |
| X.38 | Ipflufenoquin | 33.3:1 | 20:0.6 |
| X.38 | Quinofumelin | 10:1 | 60:6 |
| X.38 | Quinofumelin | 100:1 | 60:0.6 |
| X.38 | Quinofumelin | 3.3:1 | 20:6 |
| X.38 | Quinofumelin | 33.3:1 | 20:0.6 |
| X.38 | Tricyclazole | 3:1 | 60:20 |
| X.38 | Tricyclazole | 10:1 | 60:6 |
| X.38 | Tricyclazole | 1:1 | 20:20 |
| X.38 | Tricyclazole | 3.3:1 | 20:6 |
| X.38 | Pyroquilon | 3:1 | 60:20 |
| X.38 | Pyroquilon | 10:1 | 60:6 |
| X.38 | Pyroquilon | 1:1 | 20:20 |
| X.38 | Pyroquilon | 3.3:1 | 20:6 |

Example B34: Activity Against *Mycosphaerella arachidis* syn. *Cercospora arachidicola* (Brown Leaf Spot of Peanut)

Conidia of the fungus from cryogenic storage were directly mixed into nutrient broth (PDB potato dextrose broth). A DMSO solution of the test compounds was placed into a microtiter plate (96-well format) and the nutrient broth containing the fungal spores was added to it. The test plates were incubated at 24° C. and the inhibition of growth was determined photometrically after approximately 5-6 days at 620 nm. The following mixture compositions (A:B) at the reported concentration (in ppm) gave at least 70% disease control in this test.

| Component A (Compound) | Component B | Ratio A:B | Conc. (ppm) (A:B) |
|---|---|---|---|
| X.29 | Azoxystrobin | 10:1 | 20:2 |
| X.29 | Azoxystrobin | 100:1 | 20:0.2 |
| X.29 | Azoxystrobin | 1:1 | 2:2 |
| X.29 | Azoxystrobin | 10:1 | 2:0.2 |
| X.29 | Trifloxystrobin | 10:1 | 20:2 |
| X.29 | Trifloxystrobin | 100:1 | 20:0.2 |
| X.29 | Trifloxystrobin | 1:1 | 2:2 |
| X.29 | Trifloxystrobin | 10:1 | 2:0.2 |
| X.29 | Metyltetraprole | 10:1 | 20:2 |
| X.29 | Metyltetraprole | 100:1 | 20:0.2 |
| X.29 | Metyltetraprole | 1:1 | 2:2 |
| X.29 | Metyltetraprole | 10:1 | 2:0.2 |
| X.29 | Difenoconazole | 3.3:1 | 20:6 |
| X.29 | Difenoconazole | 33.3:1 | 20:0.6 |
| X.29 | Difenoconazole | 1:3 | 2:6 |
| X.29 | Difenoconazole | 3.3:1 | 2:0.6 |
| X.29 | Hexaconazole | 3.3:1 | 20:6 |
| X.29 | Hexaconazole | 33.3:1 | 20:0.6 |
| X.29 | Hexaconazole | 1:3 | 2:6 |
| X.29 | Hexaconazole | 3.3:1 | 2:0.6 |
| X.29 | Propiconazole | 3.3:1 | 20:6 |
| X.29 | Propiconazole | 33.3:1 | 20:0.6 |
| X.29 | Propiconazole | 1:3 | 2:6 |
| X.29 | Propiconazole | 3.3:1 | 2:0.6 |
| X.29 | Prothioconazole | 3.3:1 | 20:6 |
| X.29 | Prothioconazole | 33.3:1 | 20:0.6 |
| X.29 | Prothioconazole | 1:3 | 2:6 |
| X.29 | Prothioconazole | 3.3:1 | 2:0.6 |
| X.29 | Mefentrifluconazole | 3.3:1 | 20:6 |
| X.29 | Mefentrifluconazole | 33.3:1 | 20:0.6 |
| X.29 | Mefentrifluconazole | 1:3 | 2:6 |
| X.29 | Mefentrifluconazole | 3.3:1 | 2:0.6 |
| X.29 | Fenpropidin | 1:1 | 20:20 |

-continued

| Component A (Compound) | Component B | Ratio A:B | Conc. (ppm) (A:B) |
|---|---|---|---|
| X.29 | Fenpropidin | 1:10 | 2:20 |
| X.29 | Fenpropimorph | 1:1 | 20:20 |
| X.29 | Fenpropimorph | 10:1 | 20:2 |
| X.29 | Fenpropimorph | 1:10 | 2:20 |
| X.29 | Fenpropimorph | 1:1 | 2:2 |
| X.29 | Fluopyram | 10:1 | 20:2 |
| X.29 | Fluopyram | 1:1 | 2:2 |
| X.29 | Isopyrazam | 10:1 | 20:2 |
| X.29 | Isopyrazam | 100:1 | 20:0.2 |
| X.29 | Isopyrazam | 1:1 | 2:2 |
| X.29 | Isopyrazam | 10:1 | 2:0.2 |
| X.29 | Benzovindiflupyr | 10:1 | 20:2 |
| X.29 | Benzovindiflupyr | 100:1 | 20:0.2 |
| X.29 | Benzovindiflupyr | 1:1 | 2:2 |
| X.29 | Benzovindiflupyr | 10:1 | 2:0.2 |
| X.29 | Pydiflumetofen | 10:1 | 20:2 |
| X.29 | Pydiflumetofen | 100:1 | 20:0.2 |
| X.29 | Pydiflumetofen | 1:1 | 2:2 |
| X.29 | Pydiflumetofen | 10:1 | 2:0.2 |
| X.29 | Isoflucypram | 10:1 | 20:2 |
| X.29 | Isoflucypram | 100:1 | 20:0.2 |
| X.29 | Isoflucypram | 1:1 | 2:2 |
| X.29 | Isoflucypram | 10:1 | 2:0.2 |
| X.29 | Isofetamid | 10:1 | 20:2 |
| X.29 | Isofetamid | 1:1 | 2:2 |
| X.29 | Pyrapropoyne | 10:1 | 20:2 |
| X.29 | Pyrapropoyne | 100:1 | 20:0.2 |
| X.29 | Pyrapropoyne | 1:1 | 2:2 |
| X.29 | Pyrapropoyne | 10:1 | 2:0.2 |
| X.29 | Fluindapyr | 10:1 | 20:2 |
| X.29 | Fluindapyr | 1:1 | 2:2 |
| X.29 | Fenpicoxamid | 3.3:1 | 20:6 |
| X.29 | Fenpicoxamid | 33.3:1 | 20:0.6 |
| X.29 | Fenpicoxamid | 1:3 | 2:6 |
| X.29 | Florylpicoxamid | 10:1 | 20:2 |
| X.29 | Florylpicoxamid | 100:1 | 20:0.2 |
| X.29 | Florylpicoxamid | 1:1 | 2:2 |
| X.29 | Florylpicoxamid | 10:1 | 2:0.2 |
| X.29 | Chlorothalonil | 3.3:1 | 20:6 |
| X.29 | Chlorothalonil | 33.3:1 | 20:0.6 |
| X.29 | Chlorothalonil | 1:3 | 2:6 |
| X.29 | Mancozeb | 1:1 | 20:20 |
| X.29 | Fluazinam | 10:1 | 20:2 |
| X.29 | Fluazinam | 1:1 | 2:2 |
| X.29 | Fludioxonil | 3.3:1 | 20:6 |
| X.29 | Fludioxonil | 1:3 | 2:6 |
| X.29 | Aminopyrifen | 10:1 | 20:2 |
| X.29 | Aminopyrifen | 100:1 | 20:0.2 |
| X.29 | Aminopyrifen | 1:1 | 2:2 |
| X.29 | Aminopyrifen | 10:1 | 2:0.2 |
| X.36 | Azoxystrobin | 10:1 | 60:6 |
| X.36 | Azoxystrobin | 100:1 | 60:0.6 |
| X.36 | Azoxystrobin | 3.3:1 | 20:6 |
| X.36 | Azoxystrobin | 33.3:1 | 20:0.6 |
| X.36 | Trifloxystrobin | 10:1 | 60:6 |
| X.36 | Trifloxystrobin | 100:1 | 60:0.6 |
| X.36 | Trifloxystrobin | 3.3:1 | 20:6 |
| X.36 | Trifloxystrobin | 33.3:1 | 20:0.6 |
| X.36 | Metyltetraprole | 10:1 | 60:6 |
| X.36 | Metyltetraprole | 100:1 | 60:0.6 |
| X.36 | Metyltetraprole | 3.3:1 | 20:6 |
| X.36 | Metyltetraprole | 33.3:1 | 20:0.6 |
| X.36 | Difenoconazole | 10:1 | 60:6 |
| X.36 | Difenoconazole | 100:1 | 60:0.6 |
| X.36 | Difenoconazole | 3.3:1 | 20:6 |
| X.36 | Difenoconazole | 33.3:1 | 20:0.6 |
| X.36 | Propiconazole | 10:1 | 60:6 |
| X.36 | Propiconazole | 100:1 | 60:0.6 |
| X.36 | Propiconazole | 3.3:1 | 20:6 |
| X.36 | Propiconazole | 33.3:1 | 20:0.6 |
| X.36 | Prothioconazole | 10:1 | 60:6 |
| X.36 | Prothioconazole | 100:1 | 60:0.6 |
| X.36 | Prothioconazole | 3.3:1 | 20:6 |
| X.36 | Prothioconazole | 33.3:1 | 20:0.6 |
| X.36 | Mefentrifluconazole | 10:1 | 60:6 |

-continued

| Component A (Compound) | Component B | Ratio A:B | Conc. (ppm) (A:B) |
|---|---|---|---|
| X.36 | Mefentrifluconazole | 100:1 | 60:0.6 |
| X.36 | Mefentrifluconazole | 3.3:1 | 20:6 |
| X.36 | Mefentrifluconazole | 33.3:1 | 20:0.6 |
| X.36 | Fenpropidin | 3:1 | 60:20 |
| X.36 | Fenpropidin | 10:1 | 60:6 |
| X.36 | Fenpropidin | 1:1 | 20:20 |
| X.36 | Fenpropidin | 3.3:1 | 20:6 |
| X.36 | Fenpropimorph | 3:1 | 60:20 |
| X.36 | Fenpropimorph | 10:1 | 60:6 |
| X.36 | Fenpropimorph | 1:1 | 20:20 |
| X.36 | Fenpropimorph | 3.3:1 | 20:6 |
| X.36 | Fluxapyroxad | 10:1 | 60:6 |
| X.36 | Fluxapyroxad | 100:1 | 60:0.6 |
| X.36 | Fluxapyroxad | 3.3:1 | 20:6 |
| X.36 | Fluxapyroxad | 33.3:1 | 20:0.6 |
| X.36 | Fluopyram | 10:1 | 60:6 |
| X.36 | Fluopyram | 100:1 | 60:0.6 |
| X.36 | Fluopyram | 3.3:1 | 20:6 |
| X.36 | Fluopyram | 33.3:1 | 20:0.6 |
| X.36 | Benzovindiflupyr | 10:1 | 60:6 |
| X.36 | Benzovindiflupyr | 100:1 | 60:0.6 |
| X.36 | Benzovindiflupyr | 3.3:1 | 20:6 |
| X.36 | Benzovindiflupyr | 33.3:1 | 20:0.6 |
| X.36 | Pydiflumetofen | 10:1 | 60:6 |
| X.36 | Pydiflumetofen | 100:1 | 60:0.6 |
| X.36 | Pydiflumetofen | 3.3:1 | 20:6 |
| X.36 | Pydiflumetofen | 33.3:1 | 20:0.6 |
| X.36 | Isoflucypram | 10:1 | 60:6 |
| X.36 | Isoflucypram | 100:1 | 60:0.6 |
| X.36 | Isoflucypram | 3.3:1 | 20:6 |
| X.36 | Isoflucypram | 33.3:1 | 20:0.6 |
| X.36 | Fluindapyr | 10:1 | 60:6 |
| X.36 | Fluindapyr | 100:1 | 60:0.6 |
| X.36 | Fluindapyr | 3.3:1 | 20:6 |
| X.36 | Fluindapyr | 33.3:1 | 20:0.6 |
| X.36 | Florylpicoxamid | 10:1 | 60:6 |
| X.36 | Florylpicoxamid | 100:1 | 60:0.6 |
| X.36 | Florylpicoxamid | 3.3:1 | 20:6 |
| X.36 | Florylpicoxamid | 33.3:1 | 20:0.6 |
| X.36 | Metarylpicoxamid | 10:1 | 60:6 |
| X.36 | Metarylpicoxamid | 100:1 | 60:0.6 |
| X.36 | Metarylpicoxamid | 3.3:1 | 20:6 |
| X.36 | Metarylpicoxamid | 33.3:1 | 20:0.6 |
| X.36 | Chlorothalonil | 10:1 | 60:6 |
| X.36 | Chlorothalonil | 100:1 | 60:0.6 |
| X.36 | Chlorothalonil | 3.3:1 | 20:6 |
| X.36 | Chlorothalonil | 33.3:1 | 20:0.6 |
| X.36 | Mancozeb | 3:1 | 60:20 |
| X.36 | Mancozeb | 10:1 | 60:6 |
| X.36 | Mandipropamid | 3:1 | 60:20 |
| X.36 | Mandipropamid | 10:1 | 60:6 |
| X.36 | Oxathiapiprolin | 3:1 | 60:20 |
| X.36 | Oxathiapiprolin | 10:1 | 60:6 |
| X.36 | Fluazinam | 10:1 | 60:6 |
| X.36 | Fluazinam | 100:1 | 60:0.6 |
| X.36 | Fluazinam | 3.3:1 | 20:6 |
| X.36 | Fluazinam | 33.3:1 | 20:0.6 |
| X.36 | Fludioxonil | 10:1 | 60:6 |
| X.36 | Fludioxonil | 100:1 | 60:0.6 |
| X.36 | Fludioxonil | 3.3:1 | 20:6 |
| X.36 | Fludioxonil | 33.3:1 | 20:0.6 |
| X.36 | Cyprodinil | 10:1 | 60:6 |
| X.36 | Cyprodinil | 100:1 | 60:0.6 |
| X.36 | Metalaxyl-M | 3:1 | 60:20 |
| X.36 | Metalaxyl-M | 10:1 | 60:6 |
| X.36 | Folpet | 10:1 | 60:6 |
| X.36 | Folpet | 30:1 | 60:2 |
| X.36 | Folpet | 3.3:1 | 20:6 |
| X.36 | Folpet | 10:1 | 20:2 |
| X.36 | Aminopyrifen | 10:1 | 60:6 |
| X.36 | Aminopyrifen | 100:1 | 60:0.6 |
| X.36 | Aminopyrifen | 3.3:1 | 20:6 |
| X.36 | Aminopyrifen | 33.3:1 | 20:0.6 |
| X.36 | N-(1-benzyl-1,3-dimethyl-butyl)-8-fluoro-quinoline-3-carboxamide | 10:1 | 60:6 |

-continued

| Component A (Compound) | Component B | Ratio A:B | Conc. (ppm) (A:B) |
|---|---|---|---|
| X.36 | N-(1-benzyl-1,3-dimethyl-butyl)-8-fluoro-quinoline-3-carboxamide | 100:1 | 60:0.6 |
| X.36 | N-(1-benzyl-3,3,3-trifluoro-1-methyl-propyl)-8-fluoro-quinoline-3-carboxamide | 10:1 | 60:6 |
| X.36 | N-(1-benzyl-3,3,3-trifluoro-1-methyl-propyl)-8-fluoro-quinoline-3-carboxamide | 100:1 | 60:0.6 |
| X.36 | 1-(6,7-dimethylpyrazolo[1,5-a]pyridin-3-yl)-4,4,5-trifluoro-3,3-dimethyl-isoquinoline | 10:1 | 60:6 |
| X.36 | 1-(6,7-dimethylpyrazolo[1,5-a]pyridin-3-yl)-4,4,5-trifluoro-3,3-dimethyl-isoquinoline | 100:1 | 60:0.6 |
| X.36 | 4,4-difluoro-3,3-dimethyl-1-(7-methylpyrazolo[1,5-a]pyridin-3-yl)isoquinoline | 10:1 | 60:6 |
| X.36 | 4,4-difluoro-3,3-dimethyl-1-(7-methylpyrazolo[1,5-a]pyridin-3-yl)isoquinoline | 100:1 | 60:0.6 |
| X.36 | 1-(4,5-dimethylbenzimidazol-1-yl)-4,4,5-trifluoro-3,3-dimethyl-isoquinoline | 10:1 | 60:6 |
| X.36 | 1-(4,5-dimethylbenzimidazol-1-yl)-4,4,5-trifluoro-3,3-dimethyl-isoquinoline | 100:1 | 60:0.6 |
| X.36 | 1-(4,5-dimethylbenzimidazol-1-yl)-4,4-difluoro-3,3-dimethyl-isoquinoline | 10:1 | 60:6 |
| X.36 | 1-(4,5-dimethylbenzimidazol-1-yl)-4,4-difluoro-3,3-dimethyl-isoquinoline | 100:1 | 60:0.6 |
| X.36 | Isopyrazam | 10:1 | 60:6 |
| X.36 | Isopyrazam | 100:1 | 60:0.6 |
| X.36 | Isopyrazam | 3.3:1 | 20:6 |
| X.36 | Isopyrazam | 33.3:1 | 20:0.6 |
| X.36 | Sedaxane | 10:1 | 60:6 |
| X.36 | Sedaxane | 100:1 | 60:0.6 |
| X.36 | Sedaxane | 3.3:1 | 20:6 |
| X.36 | Sedaxane | 33.3:1 | 20:0.6 |
| X.36 | Isofetamid | 10:1 | 60:6 |
| X.36 | Isofetamid | 100:1 | 60:0.6 |
| X.36 | Isofetamid | 3.3:1 | 20:6 |
| X.36 | Isofetamid | 33.3:1 | 20:0.6 |
| X.36 | Ipflufenoquin | 10:1 | 60:6 |
| X.36 | Ipflufenoquin | 100:1 | 60:0.6 |
| X.36 | Quinofumelin | 10:1 | 60:6 |
| X.36 | Quinofumelin | 100:1 | 60:0.6 |
| X.36 | Tricyclazole | 3:1 | 60:20 |
| X.36 | Tricyclazole | 10:1 | 60:6 |
| X.36 | Pyroquilon | 3:1 | 60:20 |
| X.36 | Pyroquilon | 10:1 | 60:6 |
| X.38 | Azoxystrobin | 10:1 | 60:6 |
| X.38 | Azoxystrobin | 100:1 | 60:0.6 |
| X.38 | Azoxystrobin | 3.3:1 | 20:6 |
| X.38 | Azoxystrobin | 33.3:1 | 20:0.6 |
| X.38 | Trifloxystrobin | 10:1 | 60:6 |
| X.38 | Trifloxystrobin | 100:1 | 60:0.6 |
| X.38 | Trifloxystrobin | 3.3:1 | 20:6 |
| X.38 | Trifloxystrobin | 33.3:1 | 20:0.6 |
| X.38 | Metyltetraprole | 10:1 | 60:6 |
| X.38 | Metyltetraprole | 100:1 | 60:0.6 |
| X.38 | Metyltetraprole | 3.3:1 | 20:6 |
| X.38 | Metyltetraprole | 33.3:1 | 20:0.6 |
| X.38 | Difenoconazole | 10:1 | 60:6 |
| X.38 | Difenoconazole | 100:1 | 60:0.6 |
| X.38 | Difenoconazole | 3.3:1 | 20:6 |
| X.38 | Difenoconazole | 33.3:1 | 20:0.6 |
| X.38 | Propiconazole | 10:1 | 60:6 |
| X.38 | Propiconazole | 100:1 | 60:0.6 |
| X.38 | Propiconazole | 3.3:1 | 20:6 |
| X.38 | Propiconazole | 33.3:1 | 20:0.6 |
| X.38 | Prothioconazole | 10:1 | 60:6 |
| X.38 | Prothioconazole | 100:1 | 60:0.6 |
| X.38 | Prothioconazole | 3.3:1 | 20:6 |

-continued

| Component A (Compound) | Component B | Ratio A:B | Conc. (ppm) (A:B) |
|---|---|---|---|
| X.38 | Prothioconazole | 33.3:1 | 20:0.6 |
| X.38 | Mefentrifluconazole | 10:1 | 60:6 |
| X.38 | Mefentrifluconazole | 100:1 | 60:0.6 |
| X.38 | Mefentrifluconazole | 3.3:1 | 20:6 |
| X.38 | Mefentrifluconazole | 33.3:1 | 20:0.6 |
| X.38 | Fenpropidin | 3:1 | 60:20 |
| X.38 | Fenpropidin | 10:1 | 60:6 |
| X.38 | Fenpropidin | 1:1 | 20:20 |
| X.38 | Fenpropidin | 3.3:1 | 20:6 |
| X.38 | Fenpropimorph | 3:1 | 60:20 |
| X.38 | Fenpropimorph | 10:1 | 60:6 |
| X.38 | Fenpropimorph | 1:1 | 20:20 |
| X.38 | Fenpropimorph | 3.3:1 | 20:6 |
| X.38 | Fluxapyroxad | 10:1 | 60:6 |
| X.38 | Fluxapyroxad | 100:1 | 60:0.6 |
| X.38 | Fluxapyroxad | 3.3:1 | 20:6 |
| X.38 | Fluxapyroxad | 33.3:1 | 20:0.6 |
| X.38 | Fluopyram | 10:1 | 60:6 |
| X.38 | Fluopyram | 100:1 | 60:0.6 |
| X.38 | Fluopyram | 3.3:1 | 20:6 |
| X.38 | Fluopyram | 33.3:1 | 20:0.6 |
| X.38 | Benzovindiflupyr | 10:1 | 60:6 |
| X.38 | Benzovindiflupyr | 100:1 | 60:0.6 |
| X.38 | Benzovindiflupyr | 3.3:1 | 20:6 |
| X.38 | Benzovindiflupyr | 33.3:1 | 20:0.6 |
| X.38 | Pydiflumetofen | 10:1 | 60:6 |
| X.38 | Pydiflumetofen | 100:1 | 60:0.6 |
| X.38 | Pydiflumetofen | 3.3:1 | 20:6 |
| X.38 | Pydiflumetofen | 33.3:1 | 20:0.6 |
| X.38 | Isoflucypram | 10:1 | 60:6 |
| X.38 | Isoflucypram | 100:1 | 60:0.6 |
| X.38 | Isoflucypram | 3.3:1 | 20:6 |
| X.38 | Isoflucypram | 33.3:1 | 20:0.6 |
| X.38 | Fluindapyr | 10:1 | 60:6 |
| X.38 | Fluindapyr | 100:1 | 60:0.6 |
| X.38 | Fluindapyr | 3.3:1 | 20:6 |
| X.38 | Fluindapyr | 33.3:1 | 20:0.6 |
| X.38 | Florylpicoxamid | 10:1 | 60:6 |
| X.38 | Florylpicoxamid | 100:1 | 60:0.6 |
| X.38 | Florylpicoxamid | 3.3:1 | 20:6 |
| X.38 | Florylpicoxamid | 33.3:1 | 20:0.6 |
| X.38 | Metarylpicoxamid | 10:1 | 60:6 |
| X.38 | Metarylpicoxamid | 100:1 | 60:0.6 |
| X.38 | Metarylpicoxamid | 3.3:1 | 20:6 |
| X.38 | Metarylpicoxamid | 33.3:1 | 20:0.6 |
| X.38 | Chlorothalonil | 10:1 | 60:6 |
| X.38 | Chlorothalonil | 100:1 | 60:0.6 |
| X.38 | Chlorothalonil | 3.3:1 | 20:6 |
| X.38 | Chlorothalonil | 33.3:1 | 20:0.6 |
| X.38 | Mancozeb | 3:1 | 60:20 |
| X.38 | Fluazinam | 10:1 | 60:6 |
| X.38 | Fluazinam | 100:1 | 60:0.6 |
| X.38 | Fluazinam | 3.3:1 | 20:6 |
| X.38 | Fluazinam | 33.3:1 | 20:0.6 |
| X.38 | Fludioxonil | 10:1 | 60:6 |
| X.38 | Fludioxonil | 100:1 | 60:0.6 |
| X.38 | Fludioxonil | 3.3:1 | 20:6 |
| X.38 | Fludioxonil | 33.3:1 | 20:0.6 |
| X.38 | Folpet | 10:1 | 60:6 |
| X.38 | Folpet | 30:1 | 60:2 |
| X.38 | Folpet | 3.3:1 | 20:6 |
| X.38 | Folpet | 10:1 | 20:2 |
| X.38 | Aminopyrifen | 10:1 | 60:6 |
| X.38 | Aminopyrifen | 100:1 | 60:0.6 |
| X.38 | Aminopyrifen | 3.3:1 | 20:6 |
| X.38 | Aminopyrifen | 33.3:1 | 20:0.6 |
| X.38 | Isopyrazam | 10:1 | 60:6 |
| X.38 | Isopyrazam | 100:1 | 60:0.6 |
| X.38 | Isopyrazam | 3.3:1 | 20:6 |
| X.38 | Isopyrazam | 33.3:1 | 20:0.6 |
| X.38 | Sedaxane | 10:1 | 60:6 |
| X.38 | Sedaxane | 100:1 | 60:0.6 |
| X.38 | Sedaxane | 3.3:1 | 20:6 |
| X.38 | Sedaxane | 33.3:1 | 20:0.6 |
| X.38 | Isofetamid | 10:1 | 60:6 |

-continued

| Component A (Compound) | Component B | Ratio A:B | Conc. (ppm) (A:B) |
|---|---|---|---|
| X.38 | Isofetamid | 100:1 | 60:0.6 |
| X.38 | Isofetamid | 3.3:1 | 20:6 |
| X.38 | Isofetamid | 33.3:1 | 20:0.6 |

Example B35: Activity Against *Pyricuiaria oryzae* (Rice Blast)

Conidia of the fungus from cryogenic storage were directly mixed into nutrient broth (PDB potato dextrose broth). A DMSO solution of the test compounds was placed into a microtiter plate (96-well format) and the nutrient broth containing the fungal spores was added to it. The test plates were incubated at 24° C. and the inhibition of growth was determined photometrically after 72 hrs. The following mixture compositions (A:B) at the reported concentration (in ppm) gave at least 80% disease control in this test.

| Component A (Compound) | Component B | Ratio A:B | Conc. (ppm) (A:B) |
|---|---|---|---|
| X.29 | Azoxystrobin | 10:1 | 20:2 |
| X.29 | Azoxystrobin | 100:1 | 20:0.2 |
| X.29 | Azoxystrobin | 1:1 | 2:2 |
| X.29 | Azoxystrobin | 10:1 | 2:0.2 |
| X.29 | Trifloxystrobin | 10:1 | 20:2 |
| X.29 | Trifloxystrobin | 100:1 | 20:0.2 |
| X.29 | Trifloxystrobin | 1:1 | 2:2 |
| X.29 | Trifloxystrobin | 10:1 | 2:0.2 |
| X.29 | Metyltetraprole | 10:1 | 20:2 |
| X.29 | Metyltetraprole | 100:1 | 20:0.2 |
| X.29 | Metyltetraprole | 1:1 | 2:2 |
| X.29 | Metyltetraprole | 10:1 | 2:0.2 |
| X.29 | Difenoconazole | 3.3:1 | 20:6 |
| X.29 | Difenoconazole | 33.3:1 | 20:0.6 |
| X.29 | Difenoconazole | 1:3 | 2:6 |
| X.29 | Difenoconazole | 3.3:1 | 2:0.6 |
| X.29 | Hexaconazole | 3.3:1 | 20:6 |
| X.29 | Hexaconazole | 33.3:1 | 20:0.6 |
| X.29 | Hexaconazole | 1:3 | 2:6 |
| X.29 | Hexaconazole | 3.3:1 | 2:0.6 |
| X.29 | Propiconazole | 3.3:1 | 20:6 |
| X.29 | Propiconazole | 33.3:1 | 20:0.6 |
| X.29 | Propiconazole | 1:3 | 2:6 |
| X.29 | Propiconazole | 3.3:1 | 2:0.6 |
| X.29 | Prothioconazole | 3.3:1 | 20:6 |
| X.29 | Prothioconazole | 33.3:1 | 20:0.6 |
| X.29 | Prothioconazole | 1:3 | 2:6 |
| X.29 | Prothioconazole | 3.3:1 | 2:0.6 |
| X.29 | Mefentrifluconazole | 3.3:1 | 20:6 |
| X.29 | Mefentrifluconazole | 33.3:1 | 20:0.6 |
| X.29 | Mefentrifluconazole | 1:3 | 2:6 |
| X.29 | Mefentrifluconazole | 3.3:1 | 2:0.6 |
| X.29 | Fenpropidin | 1:1 | 20:20 |
| X.29 | Fenpropidin | 10:1 | 20:2 |
| X.29 | Fenpropidin | 1:10 | 2:20 |
| X.29 | Fenpropidin | 1:1 | 2:2 |
| X.29 | Fenpropimorph | 1:1 | 20:20 |
| X.29 | Fenpropimorph | 10:1 | 20:2 |
| X.29 | Fenpropimorph | 1:10 | 2:20 |
| X.29 | Fenpropimorph | 1:1 | 2:2 |
| X.29 | Fluxapyroxad | 10:1 | 20:2 |
| X.29 | Fluxapyroxad | 100:1 | 20:0.2 |
| X.29 | Fluxapyroxad | 1:1 | 2:2 |
| X.29 | Fluxapyroxad | 10:1 | 2:0.2 |
| X.29 | Fluopyram | 10:1 | 20:2 |
| X.29 | Fluopyram | 100:1 | 20:0.2 |
| X.29 | Fluopyram | 1:1 | 2:2 |

-continued

| Component A (Compound) | Component B | Ratio A:B | Conc. (ppm) (A:B) |
|---|---|---|---|
| X.29 | Fluopyram | 10:1 | 2:0.2 |
| X.29 | Isopyrazam | 10:1 | 20:2 |
| X.29 | Isopyrazam | 100:1 | 20:0.2 |
| X.29 | Isopyrazam | 1:1 | 2:2 |
| X.29 | Isopyrazam | 10:1 | 2:0.2 |
| X.29 | Sedaxane | 10:1 | 20:2 |
| X.29 | Sedaxane | 100:1 | 20:0.2 |
| X.29 | Sedaxane | 1:1 | 2:2 |
| X.29 | Sedaxane | 10:1 | 2:0.2 |
| X.29 | Benzovindiflupyr | 10:1 | 20:2 |
| X.29 | Benzovindiflupyr | 100:1 | 20:0.2 |
| X.29 | Benzovindiflupyr | 1:1 | 2:2 |
| X.29 | Benzovindiflupyr | 10:1 | 2:0.2 |
| X.29 | Pydiflumetofen | 10:1 | 20:2 |
| X.29 | Pydiflumetofen | 100:1 | 20:0.2 |
| X.29 | Pydiflumetofen | 1:1 | 2:2 |
| X.29 | Pydiflumetofen | 10:1 | 2:0.2 |
| X.29 | Isoflucypram | 10:1 | 20:2 |
| X.29 | Isoflucypram | 100:1 | 20:0.2 |
| X.29 | Isoflucypram | 1:1 | 2:2 |
| X.29 | Isoflucypram | 10:1 | 2:0.2 |
| X.29 | Isofetamid | 10:1 | 20:2 |
| X.29 | Isofetamid | 100:1 | 20:0.2 |
| X.29 | Isofetamid | 1:1 | 2:2 |
| X.29 | Isofetamid | 10:1 | 2:0.2 |
| X.29 | Pyrapropoyne | 10:1 | 20:2 |
| X.29 | Pyrapropoyne | 100:1 | 20:0.2 |
| X.29 | Pyrapropoyne | 1:1 | 2:2 |
| X.29 | Pyrapropoyne | 10:1 | 2:0.2 |
| X.29 | Fluindapyr | 10:1 | 20:2 |
| X.29 | Fluindapyr | 100:1 | 20:0.2 |
| X.29 | Fluindapyr | 1:1 | 2:2 |
| X.29 | Fluindapyr | 10:1 | 2:0.2 |
| X.29 | Fenpicoxamid | 3.3:1 | 20:6 |
| X.29 | Fenpicoxamid | 33.3:1 | 20:0.6 |
| X.29 | Fenpicoxamid | 1:3 | 2:6 |
| X.29 | Fenpicoxamid | 3.3:1 | 2:0.6 |
| X.29 | Florylpicoxamid | 10:1 | 20:2 |
| X.29 | Florylpicoxamid | 100:1 | 20:0.2 |
| X.29 | Florylpicoxamid | 1:1 | 2:2 |
| X.29 | Florylpicoxamid | 10:1 | 2:0.2 |
| X.29 | Chlorothalonil | 3.3:1 | 20:6 |
| X.29 | Chlorothalonil | 33.3:1 | 20:0.6 |
| X.29 | Chlorothalonil | 1:3 | 2:6 |
| X.29 | Chlorothalonil | 3.33:1 | 2:0.6 |
| X.29 | Mancozeb | 1:1 | 20:20 |
| X.29 | Mancozeb | 3.3:1 | 20:6 |
| X.29 | Mancozeb | 1:10 | 2:20 |
| X.29 | Mancozeb | 1:3 | 2:6 |
| X.29 | Mandipropamid | 1:1 | 20:20 |
| X.29 | Mandipropamid | 3.3:1 | 20:6 |
| X.29 | Mandipropamid | 1:10 | 2:20 |
| X.29 | Mandipropamid | 1:3 | 2:6 |
| X.29 | Oxathiapiprolin | 1:1 | 20:20 |
| X.29 | Oxathiapiprolin | 3.3:1 | 20:6 |
| X.29 | Oxathiapiprolin | 1:10 | 2:20 |
| X.29 | Oxathiapiprolin | 1:3 | 2:6 |
| X.29 | Fluazinam | 10:1 | 20:2 |
| X.29 | Fluazinam | 100:1 | 20:0.2 |
| X.29 | Fluazinam | 1:1 | 2:2 |
| X.29 | Fluazinam | 10:1 | 2:0.2 |
| X.29 | Fludioxonil | 3.3:1 | 20:6 |
| X.29 | Fludioxonil | 33.3:1 | 20:0.6 |
| X.29 | Fludioxonil | 1:3 | 2:6 |
| X.29 | Fludioxonil | 3.3:1 | 2:0.6 |
| X.29 | Cyprodinil | 3.3:1 | 20:6 |
| X.29 | Cyprodinil | 33.3:1 | 20:0.6 |
| X.29 | Cyprodinil | 1:3 | 2:6 |
| X.29 | Cyprodinil | 3.3:1 | 2:0.6 |
| X.29 | Metalaxyl-M | 1:1 | 20:20 |
| X.29 | Metalaxyl-M | 3.3:1 | 20:6 |
| X.29 | Metalaxyl-M | 1:10 | 2:20 |
| X.29 | Metalaxyl-M | 1:3 | 2:6 |
| X.29 | Aminopyrifen | 10:1 | 20:2 |

-continued

| Component A (Compound) | Component B | Ratio A:B | Conc. (ppm) (A:B) |
|---|---|---|---|
| X.29 | Aminopyrifen | 100:1 | 20:0.2 |
| X.29 | Aminopyrifen | 1:1 | 2:2 |
| X.29 | Aminopyrifen | 10:1 | 2:0.2 |
| X.29 | Folpet | 3.3:1 | 20:6 |
| X.29 | Folpet | 10:1 | 20:2 |
| X.29 | Folpet | 1:3 | 2:6 |
| X.29 | Folpet | 1:1 | 2:2 |
| X.29 | Ipflufenoquin | 10:1 | 20:2 |
| X.29 | Ipflufenoquin | 100:1 | 20:0.2 |
| X.29 | Ipflufenoquin | 1:1 | 2:2 |
| X.29 | Ipflufenoquin | 10:1 | 2:0.2 |
| X.29 | Quinofumelin | 10:1 | 20:2 |
| X.29 | Quinofumelin | 100:1 | 20:0.2 |
| X.29 | Quinofumelin | 1:1 | 2:2 |
| X.29 | Quinofumelin | 10:1 | 2:0.2 |
| X.29 | Tricyclazole | 1:1 | 20:20 |
| X.29 | Tricyclazole | 3:1 | 20:6 |
| X.29 | Tricyclazole | 1:10 | 2:20 |
| X.29 | Tricyclazole | 1:3 | 2:6 |
| X.29 | Pyroquilon | 1:1 | 20:20 |
| X.29 | Pyroquilon | 3:1 | 20:6 |
| X.29 | Pyroquilon | 1:10 | 2:20 |
| X.29 | Pyroquilon | 1:3 | 2:6 |
| X.29 | N-(1-benzyl-1,3-dimethyl-butyl)-8-fluoro-quinoline-3-carboxamide | 10:1 | 20:2 |
| X.29 | N-(1-benzyl-1,3-dimethyl-butyl)-8-fluoro-quinoline-3-carboxamide | 100:1 | 20:0.2 |
| X.29 | N-(1-benzyl-1,3-dimethyl-butyl)-8-fluoro-quinoline-3-carboxamide | 1:1 | 2:2 |
| X.29 | N-(1-benzyl-1,3-dimethyl-butyl)-8-fluoro-quinoline-3-carboxamide | 10:1 | 2:0.2 |
| X.29 | N-(1-benzyl-3,3,3-trifluoro-1-methyl-propyl)-8-fluoro-quinoline-3-carboxamide | 10:1 | 20:2 |
| X.29 | N-(1-benzyl-3,3,3-trifluoro-1-methyl-propyl)-8-fluoro-quinoline-3-carboxamide | 100:1 | 20:0.2 |
| X.29 | N-(1-benzyl-3,3,3-trifluoro-1-methyl-propyl)-8-fluoro-quinoline-3-carboxamide | 1:1 | 2:2 |
| X.29 | N-(1-benzyl-3,3,3-trifluoro-1-methyl-propyl)-8-fluoro-quinoline-3-carboxamide | 10:1 | 2:0.2 |
| X.29 | 1-(6,7-dimethylpyrazolo[1,5-a]pyridin-3-yl)-4,4,5-trifluoro-3,3-dimethyl-isoquinoline | 10:1 | 20:2 |
| X.29 | 1-(6,7-dimethylpyrazolo[1,5-a]pyridin-3-yl)-4,4,5-trifluoro-3,3-dimethyl-isoquinoline | 100:1 | 20:0.2 |
| X.29 | 1-(6,7-dimethylpyrazolo[1,5-a]pyridin-3-yl)-4,4,5-trifluoro-3,3-dimethyl-isoquinoline | 1:1 | 2:2 |
| X.29 | 1-(6,7-dimethylpyrazolo[1,5-a]pyridin-3-yl)-4,4,5-trifluoro-3,3-dimethyl-isoquinoline | 10:1 | 2:0.2 |
| X.29 | 4,4-difluoro-3,3-dimethyl-1-(7-methylpyrazolo[1,5-a]pyridin-3-yl)isoquinoline | 10:1 | 20:2 |
| X.29 | 4,4-difluoro-3,3-dimethyl-1-(7-methylpyrazolo[1,5-a]pyridin-3-yl)isoquinoline | 100:1 | 20:0.2 |
| X.29 | 4,4-difluoro-3,3-dimethyl-1-(7-methylpyrazolo[1,5-a]pyridin-3-yl)isoquinoline | 1:1 | 2:2 |
| X.29 | 4,4-difluoro-3,3-dimethyl-1-(7-methylpyrazolo[1,5-a]pyridin-3-yl)isoquinoline | 10:1 | 2:0.2 |
| X.29 | 1-(4,5-dimethylbenzimidazol-1-yl)-4,4,5-trifluoro-3,3-dimethyl-isoquinoline | 10:1 | 20:2 |

-continued

| Component A (Compound) | Component B | Ratio A:B | Conc. (ppm) (A:B) |
|---|---|---|---|
| X.29 | 1-(4,5-dimethylbenzimidazol-1-yl)-4,4,5-trifluoro-3,3-dimethyl-isoquinoline | 100:1 | 20:0.2 |
| X.29 | 1-(4,5-dimethylbenzimidazol-1-yl)-4,4,5-trifluoro-3,3-dimethyl-isoquinoline | 1:1 | 2:2 |
| X.29 | 1-(4,5-dimethylbenzimidazol-1-yl)-4,4,5-trifluoro-3,3-dimethyl-isoquinoline | 10:1 | 2:0.2 |
| X.29 | 1-(4,5-dimethylbenzimidazol-1-yl)-4,4-difluoro-3,3-dimethyl-isoquinoline | 10:1 | 20:2 |
| X.29 | 1-(4,5-dimethylbenzimidazol-1-yl)-4,4-difluoro-3,3-dimethyl-isoquinoline | 100:1 | 20:0.2 |
| X.29 | 1-(4,5-dimethylbenzimidazol-1-yl)-4,4-difluoro-3,3-dimethyl-isoquinoline | 1:1 | 2:2 |
| X.29 | 1-(4,5-dimethylbenzimidazol-1-yl)-4,4-difluoro-3,3-dimethyl-isoquinoline | 10:1 | 2:0.2 |
| X.36 | Azoxystrobin | 10:1 | 60:6 |
| X.36 | Azoxystrobin | 100:1 | 60:0.6 |
| X.36 | Azoxystrobin | 3.3:1 | 20:6 |
| X.36 | Azoxystrobin | 33.3:1 | 20:0.6 |
| X.36 | Trifloxystrobin | 10:1 | 60:6 |
| X.36 | Trifloxystrobin | 100:1 | 60:0.6 |
| X.36 | Trifloxystrobin | 3.3:1 | 20:6 |
| X.36 | Trifloxystrobin | 33.3:1 | 20:0.6 |
| X.36 | Metyltetraprole | 10:1 | 60:6 |
| X.36 | Metyltetraprole | 100:1 | 60:0.6 |
| X.36 | Metyltetraprole | 3.3:1 | 20:6 |
| X.36 | Metyltetraprole | 33.3:1 | 20:0.6 |
| X.36 | Difenoconazole | 10:1 | 60:6 |
| X.36 | Difenoconazole | 100:1 | 60:0.6 |
| X.36 | Difenoconazole | 3.3:1 | 20:6 |
| X.36 | Difenoconazole | 33.3:1 | 20:0.6 |
| X.36 | Propiconazole | 10:1 | 60:6 |
| X.36 | Propiconazole | 100:1 | 60:0.6 |
| X.36 | Propiconazole | 3.3:1 | 20:6 |
| X.36 | Propiconazole | 33.3:1 | 20:0.6 |
| X.36 | Prothioconazole | 10:1 | 60:6 |
| X.36 | Prothioconazole | 100:1 | 60:0.6 |
| X.36 | Prothioconazole | 3.3:1 | 20:6 |
| X.36 | Prothioconazole | 33.3:1 | 20:0.6 |
| X.36 | Mefentrifluconazole | 10:1 | 60:6 |
| X.36 | Mefentrifluconazole | 100:1 | 60:0.6 |
| X.36 | Mefentrifluconazole | 3.3:1 | 20:6 |
| X.36 | Mefentrifluconazole | 33.3:1 | 20:0.6 |
| X.36 | Fenpropidin | 3:1 | 60:20 |
| X.36 | Fenpropidin | 10:1 | 60:6 |
| X.36 | Fenpropidin | 1:1 | 20:20 |
| X.36 | Fenpropidin | 3.3:1 | 20:6 |
| X.36 | Fenpropimorph | 3:1 | 60:20 |
| X.36 | Fenpropimorph | 10:1 | 60:6 |
| X.36 | Fenpropimorph | 1:1 | 20:20 |
| X.36 | Fenpropimorph | 3.3:1 | 20:6 |
| X.36 | Fluxapyroxad | 10:1 | 60:6 |
| X.36 | Fluxapyroxad | 100:1 | 60:0.6 |
| X.36 | Fluxapyroxad | 3.3:1 | 20:6 |
| X.36 | Fluxapyroxad | 33.3:1 | 20:0.6 |
| X.36 | Fluopyram | 10:1 | 60:6 |
| X.36 | Fluopyram | 100:1 | 60:0.6 |
| X.36 | Fluopyram | 3.3:1 | 20:6 |
| X.36 | Fluopyram | 33.3:1 | 20:0.6 |
| X.36 | Benzovindiflupyr | 10:1 | 60:6 |
| X.36 | Benzovindiflupyr | 100:1 | 60:0.6 |
| X.36 | Benzovindiflupyr | 3.3:1 | 20:6 |
| X.36 | Benzovindiflupyr | 33.3:1 | 20:0.6 |
| X.36 | Pydiflumetofen | 10:1 | 60:6 |
| X.36 | Pydiflumetofen | 100:1 | 60:0.6 |
| X.36 | Pydiflumetofen | 3.3:1 | 20:6 |
| X.36 | Pydiflumetofen | 33.3:1 | 20:0.6 |
| X.36 | Isoflucypram | 10:1 | 60:6 |

-continued

| Component A (Compound) | Component B | Ratio A:B | Conc. (ppm) (A:B) |
|---|---|---|---|
| X.36 | Isoflucypram | 100:1 | 60:0.6 |
| X.36 | Isoflucypram | 3.3:1 | 20:6 |
| X.36 | Isoflucypram | 33.3:1 | 20:0.6 |
| X.36 | Fluindapyr | 10:1 | 60:6 |
| X.36 | Fluindapyr | 100:1 | 60:0.6 |
| X.36 | Fluindapyr | 3.3:1 | 20:6 |
| X.36 | Fluindapyr | 33.3:1 | 20:0.6 |
| X.36 | Florylpicoxamid | 10:1 | 60:6 |
| X.36 | Florylpicoxamid | 100:1 | 60:0.6 |
| X.36 | Florylpicoxamid | 3.3:1 | 20:6 |
| X.36 | Florylpicoxamid | 33.3:1 | 20:0.6 |
| X.36 | Metarylpicoxamid | 10:1 | 60:6 |
| X.36 | Metarylpicoxamid | 100:1 | 60:0.6 |
| X.36 | Metarylpicoxamid | 3.3:1 | 20:6 |
| X.36 | Metarylpicoxamid | 33.3:1 | 20:0.6 |
| X.36 | Chlorothalonil | 10:1 | 60:6 |
| X.36 | Chlorothalonil | 100:1 | 60:0.6 |
| X.36 | Chlorothalonil | 3.3:1 | 20:6 |
| X.36 | Chlorothalonil | 33.3:1 | 20:0.6 |
| X.36 | Mancozeb | 3:1 | 60:20 |
| X.36 | Mancozeb | 10:1 | 60:6 |
| X.36 | Mancozeb | 1:1 | 20:20 |
| X.36 | Mancozeb | 3.3:1 | 20:6 |
| X.36 | Mandipropamid | 3:1 | 60:20 |
| X.36 | Mandipropamid | 10:1 | 60:6 |
| X.36 | Mandipropamid | 1:1 | 20:20 |
| X.36 | Mandipropamid | 3.3:1 | 20:6 |
| X.36 | Oxathiapiprolin | 3:1 | 60:20 |
| X.36 | Oxathiapiprolin | 10:1 | 60:6 |
| X.36 | Oxathiapiprolin | 1:1 | 20:20 |
| X.36 | Oxathiapiprolin | 3.3:1 | 20:6 |
| X.36 | Fluazinam | 10:1 | 60:6 |
| X.36 | Fluazinam | 100:1 | 60:0.6 |
| X.36 | Fluazinam | 3.3:1 | 20:6 |
| X.36 | Fluazinam | 33.3:1 | 20:0.6 |
| X.36 | Fludioxonil | 10:1 | 60:6 |
| X.36 | Fludioxonil | 100:1 | 60:0.6 |
| X.36 | Fludioxonil | 3.3:1 | 20:6 |
| X.36 | Fludioxonil | 33.3:1 | 20:0.6 |
| X.36 | Cyprodinil | 10:1 | 60:6 |
| X.36 | Cyprodinil | 100:1 | 60:0.6 |
| X.36 | Cyprodinil | 3.3:1 | 20:6 |
| X.36 | Cyprodinil | 33.3:1 | 20:0.6 |
| X.36 | Metalaxyl-M | 3:1 | 60:20 |
| X.36 | Metalaxyl-M | 10:1 | 60:6 |
| X.36 | Metalaxyl-M | 1:1 | 20:20 |
| X.36 | Metalaxyl-M | 3.3:1 | 20:6 |
| X.36 | Folpet | 10:1 | 60:6 |
| X.36 | Folpet | 30:1 | 60:2 |
| X.36 | Folpet | 3.3:1 | 20:6 |
| X.36 | Folpet | 10:1 | 20:2 |
| X.36 | Aminopyrifen | 10:1 | 60:6 |
| X.36 | Aminopyrifen | 100:1 | 60:0.6 |
| X.36 | Aminopyrifen | 3.3:1 | 20:6 |
| X.36 | Aminopyrifen | 33.3:1 | 20:0.6 |
| X.36 | N-(1-benzyl-1,3-dimethyl-butyl)-8-fluoro-quinoline-3-carboxamide | 10:1 | 60:6 |
| X.36 | N-(1-benzyl-1,3-dimethyl-butyl)-8-fluoro-quinoline-3-carboxamide | 100:1 | 60:0.6 |
| X.36 | N-(1-benzyl-1,3-dimethyl-butyl)-8-fluoro-quinoline-3-carboxamide | 3.3:1 | 20:6 |
| X.36 | N-(1-benzyl-1,3-dimethyl-butyl)-8-fluoro-quinoline-3-carboxamide | 33.3:1 | 20:0.6 |
| X.36 | N-(1-benzyl-3,3,3-trifluoro-1-methyl-propyl)-8-fluoro-quinoline-3-carboxamide | 10:1 | 60:6 |
| X.36 | N-(1-benzyl-3,3,3-trifluoro-1-methyl-propyl)-8-fluoro-quinoline-3-carboxamide | 100:1 | 60:0.6 |
| X.36 | N-(1-benzyl-3,3,3-trifluoro-1-methyl-propyl)-8-fluoro-quinoline-3-carboxamide | 3.3:1 | 20:6 |

-continued

| Component A (Compound) | Component B | Ratio A:B | Conc. (ppm) (A:B) |
|---|---|---|---|
| X.36 | N-(1-benzyl-3,3,3-trifluoro-1-methyl-propyl)-8-fluoro-quinoline-3-carboxamide | 33.3:1 | 20:0.6 |
| X.36 | 1-(6,7-dimethylpyrazolo[1,5-a]pyridin-3-yl)-4,4,5-trifluoro-3,3-dimethyl-isoquinoline | 10:1 | 60:6 |
| X.36 | 1-(6,7-dimethylpyrazolo[1,5-a]pyridin-3-yl)-4,4,5-trifluoro-3,3-dimethyl-isoquinoline | 100:1 | 60:0.6 |
| X.36 | 1-(6,7-dimethylpyrazolo[1,5-a]pyridin-3-yl)-4,4,5-trifluoro-3,3-dimethyl-isoquinoline | 3.3:1 | 20:6 |
| X.36 | 1-(6,7-dimethylpyrazolo[1,5-a]pyridin-3-yl)-4,4,5-trifluoro-3,3-dimethyl-isoquinoline | 33.3:1 | 20:0.6 |
| X.36 | 4,4-difluoro-3,3-dimethyl-1-(7-methylpyrazolo[1,5-a]pyridin-3-yl)isoquinoline | 10:1 | 60:6 |
| X.36 | 4,4-difluoro-3,3-dimethyl-1-(7-methylpyrazolo[1,5-a]pyridin-3-yl)isoquinoline | 100:1 | 60:0.6 |
| X.36 | 4,4-difluoro-3,3-dimethyl-1-(7-methylpyrazolo[1,5-a]pyridin-3-yl)isoquinoline | 3.3:1 | 20:6 |
| X.36 | 4,4-difluoro-3,3-dimethyl-1-(7-methylpyrazolo[1,5-a]pyridin-3-yl)isoquinoline | 33.3:1 | 20:0.6 |
| X.36 | 1-(4,5-dimethylbenzimidazol-1-yl)-4,4,5-trifluoro-3,3-dimethyl-isoquinoline | 10:1 | 60:6 |
| X.36 | 1-(4,5-dimethylbenzimidazol-1-yl)-4,4,5-trifluoro-3,3-dimethyl-isoquinoline | 100:1 | 60:0.6 |
| X.36 | 1-(4,5-dimethylbenzimidazol-1-yl)-4,4,5-trifluoro-3,3-dimethyl-isoquinoline | 3.3:1 | 20:6 |
| X.36 | 1-(4,5-dimethylbenzimidazol-1-yl)-4,4,5-trifluoro-3,3-dimethyl-isoquinoline | 33.3:1 | 20:0.6 |
| X.36 | 1-(4,5-dimethylbenzimidazol-1-yl)-4,4-difluoro-3,3-dimethyl-isoquinoline | 10:1 | 60:6 |
| X.36 | 1-(4,5-dimethylbenzimidazol-1-yl)-4,4-difluoro-3,3-dimethyl-isoquinoline | 100:1 | 60:0.6 |
| X.36 | 1-(4,5-dimethylbenzimidazol-1-yl)-4,4-difluoro-3,3-dimethyl-isoquinoline | 3.3:1 | 20:6 |
| X.36 | 1-(4,5-dimethylbenzimidazol-1-yl)-4,4-difluoro-3,3-dimethyl-isoquinoline | 33.3:1 | 20:0.6 |
| X.36 | Isopyrazam | 10:1 | 60:6 |
| X.36 | Isopyrazam | 100:1 | 60:0.6 |
| X.36 | Isopyrazam | 3.3:1 | 20:6 |
| X.36 | Isopyrazam | 33.3:1 | 20:0.6 |
| X.36 | Sedaxane | 10:1 | 60:6 |
| X.36 | Sedaxane | 100:1 | 60:0.6 |
| X.36 | Sedaxane | 3.3:1 | 20:6 |
| X.36 | Sedaxane | 33.3:1 | 20:0.6 |
| X.36 | Isofetamid | 10:1 | 60:6 |
| X.36 | Isofetamid | 100:1 | 60:0.6 |
| X.36 | Isofetamid | 3.3:1 | 20:6 |
| X.36 | Isofetamid | 33.3:1 | 20:0.6 |
| X.36 | Ipflufenoquin | 10:1 | 60:6 |
| X.36 | Ipflufenoquin | 100:1 | 60:0.6 |
| X.36 | Ipflufenoquin | 3.3:1 | 20:6 |
| X.36 | Ipflufenoquin | 33.3:1 | 20:0.6 |
| X.36 | Quinofumelin | 10:1 | 60:6 |
| X.36 | Quinofumelin | 100:1 | 60:0.6 |
| X.36 | Quinofumelin | 3.3:1 | 20:6 |
| X.36 | Quinofumelin | 33.3:1 | 20:0.6 |
| X.36 | Tricyclazole | 3:1 | 60:20 |
| X.36 | Tricyclazole | 10:1 | 60:6 |
| X.36 | Tricyclazole | 1:1 | 20:20 |

-continued

| Component A (Compound) | Component B | Ratio A:B | Conc. (ppm) (A:B) |
|---|---|---|---|
| X.36 | Tricyclazole | 3.3:1 | 20:6 |
| X.36 | Pyroquilon | 3:1 | 60:20 |
| X.36 | Pyroquilon | 10:1 | 60:6 |
| X.36 | Pyroquilon | 1:1 | 20:20 |
| X.36 | Pyroquilon | 3.3:1 | 20:6 |
| X.38 | Azoxystrobin | 10:1 | 60:6 |
| X.38 | Azoxystrobin | 100:1 | 60:0.6 |
| X.38 | Azoxystrobin | 3.3:1 | 20:6 |
| X.38 | Azoxystrobin | 33.3:1 | 20:0.6 |
| X.38 | Trifloxystrobin | 10:1 | 60:6 |
| X.38 | Trifloxystrobin | 100:1 | 60:0.6 |
| X.38 | Trifloxystrobin | 3.3:1 | 20:6 |
| X.38 | Trifloxystrobin | 33.3:1 | 20:0.6 |
| X.38 | Metyltetraprole | 10:1 | 60:6 |
| X.38 | Metyltetraprole | 100:1 | 60:0.6 |
| X.38 | Metyltetraprole | 3.3:1 | 20:6 |
| X.38 | Metyltetraprole | 33.3:1 | 20:0.6 |
| X.38 | Difenoconazole | 10:1 | 60:6 |
| X.38 | Difenoconazole | 100:1 | 60:0.6 |
| X.38 | Difenoconazole | 3.3:1 | 20:6 |
| X.38 | Difenoconazole | 33.3:1 | 20:0.6 |
| X.38 | Propiconazole | 10:1 | 60:6 |
| X.38 | Propiconazole | 100:1 | 60:0.6 |
| X.38 | Propiconazole | 3.3:1 | 20:6 |
| X.38 | Propiconazole | 33.3:1 | 20:0.6 |
| X.38 | Prothioconazole | 10:1 | 60:6 |
| X.38 | Prothioconazole | 100:1 | 60:0.6 |
| X.38 | Prothioconazole | 3.3:1 | 20:6 |
| X.38 | Prothioconazole | 33.3:1 | 20:0.6 |
| X.38 | Mefentrifluconazole | 10:1 | 60:6 |
| X.38 | Mefentrifluconazole | 100:1 | 60:0.6 |
| X.38 | Mefentrifluconazole | 3.3:1 | 20:6 |
| X.38 | Mefentrifluconazole | 33.3:1 | 20:0.6 |
| X.38 | Fenpropidin | 3:1 | 60:20 |
| X.38 | Fenpropidin | 10:1 | 60:6 |
| X.38 | Fenpropidin | 1:1 | 20:20 |
| X.38 | Fenpropidin | 3.3:1 | 20:6 |
| X.38 | Fenpropimorph | 3:1 | 60:20 |
| X.38 | Fenpropimorph | 10:1 | 60:6 |
| X.38 | Fenpropimorph | 1:1 | 20:20 |
| X.38 | Fenpropimorph | 3.3:1 | 20:6 |
| X.38 | Fluxapyroxad | 10:1 | 60:6 |
| X.38 | Fluxapyroxad | 100:1 | 60:0.6 |
| X.38 | Fluxapyroxad | 3.3:1 | 20:6 |
| X.38 | Fluxapyroxad | 33.3:1 | 20:0.6 |
| X.38 | Fluopyram | 10:1 | 60:6 |
| X.38 | Fluopyram | 100:1 | 60:0.6 |
| X.38 | Fluopyram | 3.3:1 | 20:6 |
| X.38 | Fluopyram | 33.3:1 | 20:0.6 |
| X.38 | Benzovindiflupyr | 10:1 | 60:6 |
| X.38 | Benzovindiflupyr | 100:1 | 60:0.6 |
| X.38 | Benzovindiflupyr | 3.3:1 | 20:6 |
| X.38 | Benzovindiflupyr | 33.3:1 | 20:0.6 |
| X.38 | Pydiflumetofen | 10:1 | 60:6 |
| X.38 | Pydiflumetofen | 100:1 | 60:0.6 |
| X.38 | Pydiflumetofen | 3.3:1 | 20:6 |
| X.38 | Pydiflumetofen | 33.3:1 | 20:0.6 |
| X.38 | Isoflucypram | 10:1 | 60:6 |
| X.38 | Isoflucypram | 100:1 | 60:0.6 |
| X.38 | Isoflucypram | 3.3:1 | 20:6 |
| X.38 | Isoflucypram | 33.3:1 | 20:0.6 |
| X.38 | Fluindapyr | 10:1 | 60:6 |
| X.38 | Fluindapyr | 100:1 | 60:0.6 |
| X.38 | Fluindapyr | 3.3:1 | 20:6 |
| X.38 | Fluindapyr | 33.3:1 | 20:0.6 |
| X.38 | Florylpicoxamid | 10:1 | 60:6 |
| X.38 | Florylpicoxamid | 100:1 | 60:0.6 |
| X.38 | Florylpicoxamid | 3.3:1 | 20:6 |
| X.38 | Florylpicoxamid | 33.3:1 | 20:0.6 |
| X.38 | Metarylpicoxamid | 10:1 | 60:6 |
| X.38 | Metarylpicoxamid | 100:1 | 60:0.6 |
| X.38 | Metarylpicoxamid | 3.3:1 | 20:6 |
| X.38 | Metarylpicoxamid | 33.3:1 | 20:0.6 |
| X.38 | Chlorothalonil | 10:1 | 60:6 |
| X.38 | Chlorothalonil | 100:1 | 60:0.6 |
| X.38 | Chlorothalonil | 3.3:1 | 20:6 |
| X.38 | Chlorothalonil | 33.3:1 | 20:0.6 |
| X.38 | Mancozeb | 3:1 | 60:20 |
| X.38 | Mancozeb | 10:1 | 60:6 |
| X.38 | Mancozeb | 1:1 | 20:20 |
| X.38 | Mancozeb | 3.3:1 | 20:6 |
| X.38 | Mandipropamid | 3:1 | 60:20 |
| X.38 | Mandipropamid | 10:1 | 60:6 |
| X.38 | Mandipropamid | 1:1 | 20:20 |
| X.38 | Mandipropamid | 3.3:1 | 20:6 |
| X.38 | Oxathiapiprolin | 3:1 | 60:20 |
| X.38 | Oxathiapiprolin | 10:1 | 60:6 |
| X.38 | Oxathiapiprolin | 1:1 | 20:20 |
| X.38 | Oxathiapiprolin | 3.3:1 | 20:6 |
| X.38 | Fluazinam | 10:1 | 60:6 |
| X.38 | Fluazinam | 100:1 | 60:0.6 |
| X.38 | Fluazinam | 3.3:1 | 20:6 |
| X.38 | Fluazinam | 33.3:1 | 20:0.6 |
| X.38 | Fludioxonil | 10:1 | 60:6 |
| X.38 | Fludioxonil | 100:1 | 60:0.6 |
| X.38 | Fludioxonil | 3.3:1 | 20:6 |
| X.38 | Fludioxonil | 33.3:1 | 20:0.6 |
| X.38 | Cyprodinil | 10:1 | 60:6 |
| X.38 | Cyprodinil | 100:1 | 60:0.6 |
| X.38 | Cyprodinil | 3.3:1 | 20:6 |
| X.38 | Cyprodinil | 33.3:1 | 20:0.6 |
| X.38 | Metalaxyl-M | 3:1 | 60:20 |
| X.38 | Metalaxyl-M | 10:1 | 60:6 |
| X.38 | Metalaxyl-M | 1:1 | 20:20 |
| X.38 | Metalaxyl-M | 3.3:1 | 20:6 |
| X.38 | Folpet | 10:1 | 60:6 |
| X.38 | Folpet | 30:1 | 60:2 |
| X.38 | Folpet | 3.3:1 | 20:6 |
| X.38 | Folpet | 10:1 | 20:2 |
| X.38 | Aminopyrifen | 10:1 | 60:6 |
| X.38 | Aminopyrifen | 100:1 | 60:0.6 |
| X.38 | Aminopyrifen | 3.3:1 | 20:6 |
| X.38 | Aminopyrifen | 33.3:1 | 20:0.6 |
| X.38 | N-(1-benzyl-1,3-dimethyl-butyl)-8-fluoro-quinoline-3-carboxamide | 10:1 | 60:6 |
| X.38 | N-(1-benzyl-1,3-dimethyl-butyl)-8-fluoro-quinoline-3-carboxamide | 100:1 | 60:0.6 |
| X.38 | N-(1-benzyl-1,3-dimethyl-butyl)-8-fluoro-quinoline-3-carboxamide | 3.3:1 | 20:6 |
| X.38 | N-(1-benzyl-1,3-dimethyl-butyl)-8-fluoro-quinoline-3-carboxamide | 33.3:1 | 20:0.6 |
| X.38 | N-(1-benzyl-3,3,3-trifluoro-1-methyl-propyl)-8-fluoro-quinoline-3-carboxamide | 10:1 | 60:6 |
| X.38 | N-(1-benzyl-3,3,3-trifluoro-1-methyl-propyl)-8-fluoro-quinoline-3-carboxamide | 100:1 | 60:0.6 |
| X.38 | N-(1-benzyl-3,3,3-trifluoro-1-methyl-propyl)-8-fluoro-quinoline-3-carboxamide | 3.3:1 | 20:6 |
| X.38 | N-(1-benzyl-3,3,3-trifluoro-1-methyl-propyl)-8-fluoro-quinoline-3-carboxamide | 33.3:1 | 20:0.6 |
| X.38 | 1-(6,7-dimethylpyrazolo[1,5-a]pyridin-3-yl)-4,4,5-trifluoro-3,3-dimethyl-isoquinoline | 10:1 | 60:6 |
| X.38 | 1-(6,7-dimethylpyrazolo[1,5-a]pyridin-3-yl)-4,4,5-trifluoro-3,3-dimethyl-isoquinoline | 100:1 | 60:0.6 |
| X.38 | 1-(6,7-dimethylpyrazolo[1,5-a]pyridin-3-yl)-4,4,5-trifluoro-3,3-dimethyl-isoquinoline | 3.3:1 | 20:6 |
| X.38 | 1-(6,7-dimethylpyrazolo[1,5-a]pyridin-3-yl)-4,4,5-trifluoro-3,3-dimethyl-isoquinoline | 33.3:1 | 20:0.6 |
| X.38 | 4,4-difluoro-3,3-dimethyl-1-(7-methylpyrazolo[1,5-a]pyridin-3-yl)isoquinoline | 10:1 | 60:6 |

-continued

| Component A (Compound) | Component B | Ratio A:B | Conc. (ppm) (A:B) |
|---|---|---|---|
| X.38 | 4,4-difluoro-3,3-dimethyl-1-(7-methylpyrazolo[1,5-a]pyridin-3-yl)isoquinoline | 100:1 | 60:0.6 |
| X.38 | 4,4-difluoro-3,3-dimethyl-1-(7-methylpyrazolo[1,5-a]pyridin-3-yl)isoquinoline | 3.3:1 | 20:6 |
| X.38 | 4,4-difluoro-3,3-dimethyl-1-(7-methylpyrazolo[1,5-a]pyridin-3-yl)isoquinoline | 33.3:1 | 20:0.6 |
| X.38 | 1-(4,5-dimethylbenzimidazol-1-yl)-4,4,5-trifluoro-3,3-dimethyl-isoquinoline | 10:1 | 60:6 |
| X.38 | 1-(4,5-dimethylbenzimidazol-1-yl)-4,4,5-trifluoro-3,3-dimethyl-isoquinoline | 100:1 | 60:0.6 |
| X.38 | 1-(4,5-dimethylbenzimidazol-1-yl)-4,4,5-trifluoro-3,3-dimethyl-isoquinoline | 3.3:1 | 20:6 |
| X.38 | 1-(4,5-dimethylbenzimidazol-1-yl)-4,4,5-trifluoro-3,3-dimethyl-isoquinoline | 33.3:1 | 20:0.6 |
| X.38 | 1-(4,5-dimethylbenzimidazol-1-yl)-4,4-difluoro-3,3-dimethyl-isoquinoline | 10:1 | 60:6 |
| X.38 | 1-(4,5-dimethylbenzimidazol-1-yl)-4,4-difluoro-3,3-dimethyl-isoquinoline | 100:1 | 60:0.6 |
| X.38 | 1-(4,5-dimethylbenzimidazol-1-yl)-4,4-difluoro-3,3-dimethyl-isoquinoline | 3.3:1 | 20:6 |
| X.38 | 1-(4,5-dimethylbenzimidazol-1-yl)-4,4-difluoro-3,3-dimethyl-isoquinoline | 33.3:1 | 20:0.6 |
| X.38 | Isopyrazam | 10:1 | 60:6 |
| X.38 | Isopyrazam | 100:1 | 60:0.6 |
| X.38 | Isopyrazam | 3.3:1 | 20:6 |
| X.38 | Isopyrazam | 33.3:1 | 20:0.6 |
| X.38 | Sedaxane | 10:1 | 60:6 |
| X.38 | Sedaxane | 100:1 | 60:0.6 |
| X.38 | Sedaxane | 3.3:1 | 20:6 |
| X.38 | Sedaxane | 33.3:1 | 20:0.6 |
| X.38 | Isofetamid | 10:1 | 60:6 |
| X.38 | Isofetamid | 100:1 | 60:0.6 |
| X.38 | Isofetamid | 3.3:1 | 20:6 |
| X.38 | Isofetamid | 33.3:1 | 20:0.6 |
| X.38 | Ipflufenoquin | 10:1 | 60:6 |
| X.38 | Ipflufenoquin | 100:1 | 60:0.6 |
| X.38 | Ipflufenoquin | 3.3:1 | 20:6 |
| X.38 | Ipflufenoquin | 33.3:1 | 20:0.6 |
| X.38 | Quinofumelin | 10:1 | 60:6 |
| X.38 | Quinofumelin | 100:1 | 60:0.6 |
| X.38 | Quinofumelin | 3.3:1 | 20:6 |
| X.38 | Quinofumelin | 33.3:1 | 20:0.6 |
| X.38 | Tricyclazole | 3:1 | 60:20 |
| X.38 | Tricyclazole | 10:1 | 60:6 |
| X.38 | Tricyclazole | 1:1 | 20:20 |
| X.38 | Tricyclazole | 3.3:1 | 20:6 |
| X.38 | Pyroquilon | 3:1 | 60:20 |
| X.38 | Pyroquilon | 10:1 | 60:6 |
| X.38 | Pyroquilon | 1:1 | 20:20 |
| X.38 | Pyroquilon | 3.3:1 | 20:6 |

Example B36: Activity Against *Monographaella nivalis* syn. *Microdochium nivale* (Snow Mould, Foot Rot of Cereals)

Conidia of the fungus from cryogenic storage were directly mixed into nutrient broth (PDB potato dextrose broth). A DMSO solution of the test compounds was placed into a microtiter plate (96-well format) and the nutrient broth containing the fungal spores was added to it. The test plates were incubated at 24° C. and the inhibition of growth was determined photometrically after 72 hrs at 620 nm. The following mixture compositions (A:B) at the reported concentration (in ppm) gave at least 80% disease control in this test.

| Component A (Compound) | Component B | Ratio A:B | Conc. (ppm) (A:B) |
|---|---|---|---|
| X.29 | Azoxystrobin | 10:1 | 20:2 |
| X.29 | Azoxystrobin | 100:1 | 20:0.2 |
| X.29 | Azoxystrobin | 1:1 | 2:2 |
| X.29 | Azoxystrobin | 10:1 | 2:0.2 |
| X.29 | Trifloxystrobin | 10:1 | 20:2 |
| X.29 | Trifloxystrobin | 100:1 | 20:0.2 |
| X.29 | Trifloxystrobin | 1:1 | 2:2 |
| X.29 | Trifloxystrobin | 10:1 | 2:0.2 |
| X.29 | Metyltetraprole | 10:1 | 20:2 |
| X.29 | Metyltetraprole | 100:1 | 20:0.2 |
| X.29 | Metyltetraprole | 1:1 | 2:2 |
| X.29 | Metyltetraprole | 10:1 | 2:0.2 |
| X.29 | Difenoconazole | 3.3:1 | 20:6 |
| X.29 | Difenoconazole | 33.3:1 | 20:0.6 |
| X.29 | Difenoconazole | 1:3 | 2:6 |
| X.29 | Difenoconazole | 3.3:1 | 2:0.6 |
| X.29 | Hexaconazole | 3.3:1 | 20:6 |
| X.29 | Hexaconazole | 33.3:1 | 20:0.6 |
| X.29 | Hexaconazole | 1:3 | 2:6 |
| X.29 | Hexaconazole | 3.3:1 | 2:0.6 |
| X.29 | Propiconazole | 3.3:1 | 20:6 |
| X.29 | Propiconazole | 33.3:1 | 20:0.6 |
| X.29 | Propiconazole | 1:3 | 2:6 |
| X.29 | Propiconazole | 3.3:1 | 2:0.6 |
| X.29 | Prothioconazole | 3.3:1 | 20:6 |
| X.29 | Prothioconazole | 33.3:1 | 20:0.6 |
| X.29 | Prothioconazole | 1:3 | 2:6 |
| X.29 | Prothioconazole | 3.3:1 | 2:0.6 |
| X.29 | Mefentrifluconazole | 3.3:1 | 20:6 |
| X.29 | Mefentrifluconazole | 33.3:1 | 20:0.6 |
| X.29 | Mefentrifluconazole | 1:3 | 2:6 |
| X.29 | Mefentrifluconazole | 3.3:1 | 2:0.6 |
| X.29 | Fenpropidin | 1:1 | 20:20 |
| X.29 | Fenpropidin | 10:1 | 20:2 |
| X.29 | Fenpropidin | 1:10 | 2:20 |
| X.29 | Fenpropidin | 1:1 | 2:2 |
| X.29 | Fenpropimorph | 1:1 | 20:20 |
| X.29 | Fenpropimorph | 10:1 | 20:2 |
| X.29 | Fenpropimorph | 1:10 | 2:20 |
| X.29 | Fenpropimorph | 1:1 | 2:2 |
| X.29 | Fluxapyroxad | 10:1 | 20:2 |
| X.29 | Fluxapyroxad | 100:1 | 20:0.2 |
| X.29 | Fluxapyroxad | 1:1 | 2:2 |
| X.29 | Fluxapyroxad | 10:1 | 2:0.2 |
| X.29 | Fluopyram | 10:1 | 20:2 |
| X.29 | Fluopyram | 100:1 | 20:0.2 |
| X.29 | Fluopyram | 1:1 | 2:2 |
| X.29 | Fluopyram | 10:1 | 2:0.2 |
| X.29 | Isopyrazam | 10:1 | 20:2 |
| X.29 | Isopyrazam | 100:1 | 20:0.2 |
| X.29 | Isopyrazam | 1:1 | 2:2 |
| X.29 | Isopyrazam | 10:1 | 2:0.2 |
| X.29 | Sedaxane | 10:1 | 20:2 |
| X.29 | Sedaxane | 100:1 | 20:0.2 |
| X.29 | Sedaxane | 1:1 | 2:2 |
| X.29 | Sedaxane | 10:1 | 2:0.2 |
| X.29 | Benzovindiflupyr | 10:1 | 20:2 |
| X.29 | Benzovindiflupyr | 100:1 | 20:0.2 |
| X.29 | Benzovindiflupyr | 1:1 | 2:2 |
| X.29 | Benzovindiflupyr | 10:1 | 2:0.2 |
| X.29 | Pydiflumetofen | 10:1 | 20:2 |
| X.29 | Pydiflumetofen | 100:1 | 20:0.2 |
| X.29 | Pydiflumetofen | 1:1 | 2:2 |
| X.29 | Pydiflumetofen | 10:1 | 2:0.2 |
| X.29 | Isoflucypram | 10:1 | 20:2 |
| X.29 | Isoflucypram | 100:1 | 20:0.2 |
| X.29 | Isoflucypram | 1:1 | 2:2 |
| X.29 | Isoflucypram | 10:1 | 2:0.2 |
| X.29 | Isofetamid | 10:1 | 20:2 |
| X.29 | Isofetamid | 100:1 | 20:0.2 |

| Component A (Compound) | Component B | Ratio A:B | Conc. (ppm) (A:B) |
|---|---|---|---|
| X.29 | Isofetamid | 1:1 | 2:2 |
| X.29 | Isofetamid | 10:1 | 2:0.2 |
| X.29 | Pyrapropoyne | 10:1 | 20:2 |
| X.29 | Pyrapropoyne | 100:1 | 20:0.2 |
| X.29 | Pyrapropoyne | 1:1 | 2:2 |
| X.29 | Pyrapropoyne | 10:1 | 2:0.2 |
| X.29 | Fluindapyr | 10:1 | 20:2 |
| X.29 | Fluindapyr | 100:1 | 20:0.2 |
| X.29 | Fluindapyr | 1:1 | 2:2 |
| X.29 | Fluindapyr | 10:1 | 2:0.2 |
| X.29 | Fenpicoxamid | 3.3:1 | 20:6 |
| X.29 | Fenpicoxamid | 33.3:1 | 20:0.6 |
| X.29 | Fenpicoxamid | 1:3 | 2:6 |
| X.29 | Fenpicoxamid | 3.3:1 | 2:0.6 |
| X.29 | Florylpicoxamid | 10:1 | 20:2 |
| X.29 | Florylpicoxamid | 100:1 | 20:0.2 |
| X.29 | Florylpicoxamid | 1:1 | 2:2 |
| X.29 | Florylpicoxamid | 10:1 | 2:0.2 |
| X.29 | Chlorothalonil | 3.3:1 | 20:6 |
| X.29 | Chlorothalonil | 33.3:1 | 20:0.6 |
| X.29 | Chlorothalonil | 1:3 | 2:6 |
| X.29 | Chlorothalonil | 3.33:1 | 2:0.6 |
| X.29 | Mancozeb | 1:1 | 20:20 |
| X.29 | Mancozeb | 3.3:1 | 20:6 |
| X.29 | Mancozeb | 1:10 | 2:20 |
| X.29 | Mancozeb | 1:3 | 2:6 |
| X.29 | Mandipropamid | 1:1 | 20:20 |
| X.29 | Mandipropamid | 3.3:1 | 20:6 |
| X.29 | Mandipropamid | 1:10 | 2:20 |
| X.29 | Mandipropamid | 1:3 | 2:6 |
| X.29 | Oxathiapiprolin | 1:1 | 20:20 |
| X.29 | Oxathiapiprolin | 3.3:1 | 20:6 |
| X.29 | Oxathiapiprolin | 1:10 | 2:20 |
| X.29 | Oxathiapiprolin | 1:3 | 2:6 |
| X.29 | Fluazinam | 10:1 | 20:2 |
| X.29 | Fluazinam | 100:1 | 20:0.2 |
| X.29 | Fluazinam | 1:1 | 2:2 |
| X.29 | Fluazinam | 10:1 | 2:0.2 |
| X.29 | Fludioxonil | 3.3:1 | 20:6 |
| X.29 | Fludioxonil | 33.3:1 | 20:0.6 |
| X.29 | Fludioxonil | 1:3 | 2:6 |
| X.29 | Fludioxonil | 3.3:1 | 2:0.6 |
| X.29 | Cyprodinil | 3.3:1 | 20:6 |
| X.29 | Cyprodinil | 33.3:1 | 20:0.6 |
| X.29 | Cyprodinil | 1:3 | 2:6 |
| X.29 | Cyprodinil | 3.3:1 | 2:0.6 |
| X.29 | Metalaxyl-M | 1:1 | 20:20 |
| X.29 | Metalaxyl-M | 3.3:1 | 20:6 |
| X.29 | Metalaxyl-M | 1:10 | 2:20 |
| X.29 | Metalaxyl-M | 1:3 | 2:6 |
| X.29 | Aminopyrifen | 10:1 | 20:2 |
| X.29 | Aminopyrifen | 100:1 | 20:0.2 |
| X.29 | Aminopyrifen | 1:1 | 2:2 |
| X.29 | Aminopyrifen | 10:1 | 2:0.2 |
| X.29 | Folpet | 3.3:1 | 20:6 |
| X.29 | Folpet | 10:1 | 20:2 |
| X.29 | Folpet | 1:3 | 2:6 |
| X.29 | Folpet | 1:1 | 2:2 |
| X.29 | Ipflufenoquin | 10:1 | 20:2 |
| X.29 | Ipflufenoquin | 100:1 | 20:0.2 |
| X.29 | Ipflufenoquin | 1:1 | 2:2 |
| X.29 | Ipflufenoquin | 10:1 | 2:0.2 |
| X.29 | Quinofumelin | 10:1 | 20:2 |
| X.29 | Quinofumelin | 100:1 | 20:0.2 |
| X.29 | Quinofumelin | 1:1 | 2:2 |
| X.29 | Quinofumelin | 10:1 | 2:0.2 |
| X.29 | Tricyclazole | 1:1 | 20:20 |
| X.29 | Tricyclazole | 3:1 | 20:6 |
| X.29 | Tricyclazole | 1:10 | 2:20 |
| X.29 | Tricyclazole | 1:3 | 2:6 |
| X.29 | Pyroquilon | 1:1 | 20:20 |
| X.29 | Pyroquilon | 3:1 | 20:6 |
| X.29 | Pyroquilon | 1:10 | 2:20 |
| X.29 | Pyroquilon | 1:3 | 2:6 |

| Component A (Compound) | Component B | Ratio A:B | Conc. (ppm) (A:B) |
|---|---|---|---|
| X.29 | N-(1-benzyl-1,3-dimethyl-butyl)-8-fluoro-quinoline-3-carboxamide | 10:1 | 20:2 |
| X.29 | N-(1-benzyl-1,3-dimethyl-butyl)-8-fluoro-quinoline-3-carboxamide | 100:1 | 20:0.2 |
| X.29 | N-(1-benzyl-1,3-dimethyl-butyl)-8-fluoro-quinoline-3-carboxamide | 1:1 | 2:2 |
| X.29 | N-(1-benzyl-1,3-dimethyl-butyl)-8-fluoro-quinoline-3-carboxamide | 10:1 | 2:0.2 |
| X.29 | N-(1-benzyl-3,3,3-trifluoro-1-methyl-propyl)-8-fluoro-quinoline-3-carboxamide | 10:1 | 20:2 |
| X.29 | N-(1-benzyl-3,3,3-trifluoro-1-methyl-propyl)-8-fluoro-quinoline-3-carboxamide | 100:1 | 20:0.2 |
| X.29 | N-(1-benzyl-3,3,3-trifluoro-1-methyl-propyl)-8-fluoro-quinoline-3-carboxamide | 1:1 | 2:2 |
| X.29 | N-(1-benzyl-3,3,3-trifluoro-1-methyl-propyl)-8-fluoro-quinoline-3-carboxamide | 10:1 | 2:0.2 |
| X.29 | 1-(6,7-dimethylpyrazolo[1,5-a]pyridin-3-yl)-4,4,5-trifluoro-3,3-dimethyl-isoquinoline | 10:1 | 20:2 |
| X.29 | 1-(6,7-dimethylpyrazolo[1,5-a]pyridin-3-yl)-4,4,5-trifluoro-3,3-dimethyl-isoquinoline | 100:1 | 20:0.2 |
| X.29 | 1-(6,7-dimethylpyrazolo[1,5-a]pyridin-3-yl)-4,4,5-trifluoro-3,3-dimethyl-isoquinoline | 1:1 | 2:2 |
| X.29 | 1-(6,7-dimethylpyrazolo[1,5-a]pyridin-3-yl)-4,4,5-trifluoro-3,3-dimethyl-isoquinoline | 10:1 | 2:0.2 |
| X.29 | 4,4-difluoro-3,3-dimethyl-1-(7-methylpyrazolo[1,5-a]pyridin-3-yl)isoquinoline | 10:1 | 20:2 |
| X.29 | 4,4-difluoro-3,3-dimethyl-1-(7-methylpyrazolo[1,5-a]pyridin-3-yl)isoquinoline | 100:1 | 20:0.2 |
| X.29 | 4,4-difluoro-3,3-dimethyl-1-(7-methylpyrazolo[1,5-a]pyridin-3-yl)isoquinoline | 1:1 | 2:2 |
| X.29 | 4,4-difluoro-3,3-dimethyl-1-(7-methylpyrazolo[1,5-a]pyridin-3-yl)isoquinoline | 10:1 | 2:0.2 |
| X.29 | 1-(4,5-dimethylbenzimidazol-1-yl)-4,4,5-trifluoro-3,3-dimethyl-isoquinoline | 10:1 | 20:2 |
| X.29 | 1-(4,5-dimethylbenzimidazol-1-yl)-4,4,5-trifluoro-3,3-dimethyl-isoquinoline | 100:1 | 20:0.2 |
| X.29 | 1-(4,5-dimethylbenzimidazol-1-yl)-4,4,5-trifluoro-3,3-dimethyl-isoquinoline | 1:1 | 2:2 |
| X.29 | 1-(4,5-dimethylbenzimidazol-1-yl)-4,4,5-trifluoro-3,3-dimethyl-isoquinoline | 10:1 | 2:0.2 |
| X.29 | 1-(4,5-dimethylbenzimidazol-1-yl)-4,4-difluoro-3,3-dimethyl-isoquinoline | 10:1 | 20:2 |
| X.29 | 1-(4,5-dimethylbenzimidazol-1-yl)-4,4-difluoro-3,3-dimethyl-isoquinoline | 100:1 | 20:0.2 |
| X.29 | 1-(4,5-dimethylbenzimidazol-1-yl)-4,4-difluoro-3,3-dimethyl-isoquinoline | 1:1 | 2:2 |
| X.29 | 1-(4,5-dimethylbenzimidazol-1-yl)-4,4-difluoro-3,3-dimethyl-isoquinoline | 10:1 | 2:0.2 |
| X.36 | Azoxystrobin | 10:1 | 60:6 |
| X.36 | Azoxystrobin | 100:1 | 60:0.6 |
| X.36 | Azoxystrobin | 3.3:1 | 20:6 |
| X.36 | Azoxystrobin | 33.3:1 | 20:0.6 |
| X.36 | Trifloxystrobin | 10:1 | 60:6 |
| X.36 | Trifloxystrobin | 100:1 | 60:0.6 |

-continued

| Component A (Compound) | Component B | Ratio A:B | Conc. (ppm) (A:B) |
|---|---|---|---|
| X.36 | Trifloxystrobin | 3.3:1 | 20:6 |
| X.36 | Trifloxystrobin | 33.3:1 | 20:0.6 |
| X.36 | Metyltetraprole | 10:1 | 60:6 |
| X.36 | Metyltetraprole | 100:1 | 60:0.6 |
| X.36 | Metyltetraprole | 3.3:1 | 20:6 |
| X.36 | Metyltetraprole | 33.3:1 | 20:0.6 |
| X.36 | Difenoconazole | 10:1 | 60:6 |
| X.36 | Difenoconazole | 100:1 | 60:0.6 |
| X.36 | Difenoconazole | 3.3:1 | 20:6 |
| X.36 | Difenoconazole | 33.3:1 | 20:0.6 |
| X.36 | Propiconazole | 10:1 | 60:6 |
| X.36 | Propiconazole | 100:1 | 60:0.6 |
| X.36 | Propiconazole | 3.3:1 | 20:6 |
| X.36 | Propiconazole | 33.3:1 | 20:0.6 |
| X.36 | Prothioconazole | 10:1 | 60:6 |
| X.36 | Prothioconazole | 100:1 | 60:0.6 |
| X.36 | Prothioconazole | 3.3:1 | 20:6 |
| X.36 | Prothioconazole | 33.3:1 | 20:0.6 |
| X.36 | Mefentrifluconazole | 10:1 | 60:6 |
| X.36 | Mefentrifluconazole | 100:1 | 60:0.6 |
| X.36 | Mefentrifluconazole | 3.3:1 | 20:6 |
| X.36 | Mefentrifluconazole | 33.3:1 | 20:0.6 |
| X.36 | Fenpropidin | 3:1 | 60:20 |
| X.36 | Fenpropidin | 10:1 | 60:6 |
| X.36 | Fenpropidin | 1:1 | 20:20 |
| X.36 | Fenpropidin | 3.3:1 | 20:6 |
| X.36 | Fenpropimorph | 3:1 | 60:20 |
| X.36 | Fenpropimorph | 10:1 | 60:6 |
| X.36 | Fenpropimorph | 1:1 | 20:20 |
| X.36 | Fenpropimorph | 3.3:1 | 20:6 |
| X.36 | Fluxapyroxad | 10:1 | 60:6 |
| X.36 | Fluxapyroxad | 100:1 | 60:0.6 |
| X.36 | Fluxapyroxad | 3.3:1 | 20:6 |
| X.36 | Fluxapyroxad | 33.3:1 | 20:0.6 |
| X.36 | Fluopyram | 10:1 | 60:6 |
| X.36 | Fluopyram | 100:1 | 60:0.6 |
| X.36 | Fluopyram | 3.3:1 | 20:6 |
| X.36 | Fluopyram | 33.3:1 | 20:0.6 |
| X.36 | Benzovindiflupyr | 10:1 | 60:6 |
| X.36 | Benzovindiflupyr | 100:1 | 60:0.6 |
| X.36 | Benzovindiflupyr | 3.3:1 | 20:6 |
| X.36 | Benzovindiflupyr | 33.3:1 | 20:0.6 |
| X.36 | Pydiflumetofen | 10:1 | 60:6 |
| X.36 | Pydiflumetofen | 100:1 | 60:0.6 |
| X.36 | Pydiflumetofen | 3.3:1 | 20:6 |
| X.36 | Pydiflumetofen | 33.3:1 | 20:0.6 |
| X.36 | Isoflucypram | 10:1 | 60:6 |
| X.36 | Isoflucypram | 100:1 | 60:0.6 |
| X.36 | Isoflucypram | 3.3:1 | 20:6 |
| X.36 | Isoflucypram | 33.3:1 | 20:0.6 |
| X.36 | Fluindapyr | 10:1 | 60:6 |
| X.36 | Fluindapyr | 100:1 | 60:0.6 |
| X.36 | Fluindapyr | 3.3:1 | 20:6 |
| X.36 | Fluindapyr | 33.3:1 | 20:0.6 |
| X.36 | Florylpicoxamid | 10:1 | 60:6 |
| X.36 | Florylpicoxamid | 100:1 | 60:0.6 |
| X.36 | Florylpicoxamid | 3.3:1 | 20:6 |
| X.36 | Florylpicoxamid | 33.3:1 | 20:0.6 |
| X.36 | Metarylpicoxamid | 10:1 | 60:6 |
| X.36 | Metarylpicoxamid | 100:1 | 60:0.6 |
| X.36 | Metarylpicoxamid | 3.3:1 | 20:6 |
| X.36 | Metarylpicoxamid | 33.3:1 | 20:0.6 |
| X.36 | Chlorothalonil | 10:1 | 60:6 |
| X.36 | Chlorothalonil | 100:1 | 60:0.6 |
| X.36 | Chlorothalonil | 3.3:1 | 20:6 |
| X.36 | Chlorothalonil | 33.3:1 | 20:0.6 |
| X.36 | Mancozeb | 3:1 | 60:20 |
| X.36 | Mancozeb | 10:1 | 60:6 |
| X.36 | Mancozeb | 1:1 | 20:20 |
| X.36 | Mancozeb | 3.3:1 | 20:6 |
| X.36 | Mandipropamid | 3:1 | 60:20 |
| X.36 | Mandipropamid | 10:1 | 60:6 |
| X.36 | Mandipropamid | 1:1 | 20:20 |
| X.36 | Mandipropamid | 3.3:1 | 20:6 |

-continued

| Component A (Compound) | Component B | Ratio A:B | Conc. (ppm) (A:B) |
|---|---|---|---|
| X.36 | Oxathiapiprolin | 3:1 | 60:20 |
| X.36 | Oxathiapiprolin | 10:1 | 60:6 |
| X.36 | Oxathiapiprolin | 1:1 | 20:20 |
| X.36 | Oxathiapiprolin | 3.3:1 | 20:6 |
| X.36 | Fluazinam | 10:1 | 60:6 |
| X.36 | Fluazinam | 100:1 | 60:0.6 |
| X.36 | Fluazinam | 3.3:1 | 20:6 |
| X.36 | Fluazinam | 33.3:1 | 20:0.6 |
| X.36 | Fludioxonil | 10:1 | 60:6 |
| X.36 | Fludioxonil | 100:1 | 60:0.6 |
| X.36 | Fludioxonil | 3.3:1 | 20:6 |
| X.36 | Fludioxonil | 33.3:1 | 20:0.6 |
| X.36 | Cyprodinil | 10:1 | 60:6 |
| X.36 | Cyprodinil | 100:1 | 60:0.6 |
| X.36 | Cyprodinil | 3.3:1 | 20:6 |
| X.36 | Cyprodinil | 33.3:1 | 20:0.6 |
| X.36 | Metalaxyl-M | 3:1 | 60:20 |
| X.36 | Metalaxyl-M | 10:1 | 60:6 |
| X.36 | Metalaxyl-M | 1:1 | 20:20 |
| X.36 | Metalaxyl-M | 3.3:1 | 20:6 |
| X.36 | Folpet | 10:1 | 60:6 |
| X.36 | Folpet | 30:1 | 60:2 |
| X.36 | Folpet | 3.3:1 | 20:6 |
| X.36 | Folpet | 10:1 | 20:2 |
| X.36 | Aminopyrifen | 10:1 | 60:6 |
| X.36 | Aminopyrifen | 100:1 | 60:0.6 |
| X.36 | Aminopyrifen | 3.3:1 | 20:6 |
| X.36 | Aminopyrifen | 33.3:1 | 20:0.6 |
| X.36 | N-(1-benzyl-1,3-dimethyl-butyl)-8-fluoro-quinoline-3-carboxamide | 10:1 | 60:6 |
| X.36 | N-(1-benzyl-1,3-dimethyl-butyl)-8-fluoro-quinoline-3-carboxamide | 100:1 | 60:0.6 |
| X.36 | N-(1-benzyl-1,3-dimethyl-butyl)-8-fluoro-quinoline-3-carboxamide | 3.3:1 | 20:6 |
| X.36 | N-(1-benzyl-1,3-dimethyl-butyl)-8-fluoro-quinoline-3-carboxamide | 33.3:1 | 20:0.6 |
| X.36 | N-(1-benzyl-3,3,3-trifluoro-1-methyl-propyl)-8-fluoro-quinoline-3-carboxamide | 10:1 | 60:6 |
| X.36 | N-(1-benzyl-3,3,3-trifluoro-1-methyl-propyl)-8-fluoro-quinoline-3-carboxamide | 100:1 | 60:0.6 |
| X.36 | N-(1-benzyl-3,3,3-trifluoro-1-methyl-propyl)-8-fluoro-quinoline-3-carboxamide | 3.3:1 | 20:6 |
| X.36 | N-(1-benzyl-3,3,3-trifluoro-1-methyl-propyl)-8-fluoro-quinoline-3-carboxamide | 33.3:1 | 20:0.6 |
| X.36 | 1-(6,7-dimethylpyrazolo[1,5-a]pyridin-3-yl)-4,4,5-trifluoro-3,3-dimethyl-isoquinoline | 10:1 | 60:6 |
| X.36 | 1-(6,7-dimethylpyrazolo[1,5-a]pyridin-3-yl)-4,4,5-trifluoro-3,3-dimethyl-isoquinoline | 100:1 | 60:0.6 |
| X.36 | 1-(6,7-dimethylpyrazolo[1,5-a]pyridin-3-yl)-4,4,5-trifluoro-3,3-dimethyl-isoquinoline | 3.3:1 | 20:6 |
| X.36 | 1-(6,7-dimethylpyrazolo[1,5-a]pyridin-3-yl)-4,4,5-trifluoro-3,3-dimethyl-isoquinoline | 33.3:1 | 20:0.6 |
| X.36 | 4,4-difluoro-3,3-dimethyl-1-(7-methylpyrazolo[1,5-a]pyridin-3-yl)isoquinoline | 10:1 | 60:6 |
| X.36 | 4,4-difluoro-3,3-dimethyl-1-(7-methylpyrazolo[1,5-a]pyridin-3-yl)isoquinoline | 100:1 | 60:0.6 |
| X.36 | 4,4-difluoro-3,3-dimethyl-1-(7-methylpyrazolo[1,5-a]pyridin-3-yl)isoquinoline | 3.3:1 | 20:6 |

-continued

| Component A (Compound) | Component B | Ratio A:B | Conc. (ppm) (A:B) |
|---|---|---|---|
| X.36 | 4,4-difluoro-3,3-dimethyl-1-(7-methylpyrazolo[1,5-a]pyridin-3-yl)isoquinoline | 33.3:1 | 20:0.6 |
| X.36 | 1-(4,5-dimethylbenzimidazol-1-yl)-4,4,5-trifluoro-3,3-dimethyl-isoquinoline | 10:1 | 60:6 |
| X.36 | 1-(4,5-dimethylbenzimidazol-1-yl)-4,4,5-trifluoro-3,3-dimethyl-isoquinoline | 100:1 | 60:0.6 |
| X.36 | 1-(4,5-dimethylbenzimidazol-1-yl)-4,4,5-trifluoro-3,3-dimethyl-isoquinoline | 3.3:1 | 20:6 |
| X.36 | 1-(4,5-dimethylbenzimidazol-1-yl)-4,4,5-trifluoro-3,3-dimethyl-isoquinoline | 33.3:1 | 20:0.6 |
| X.36 | 1-(4,5-dimethylbenzimidazol-1-yl)-4,4-difluoro-3,3-dimethyl-isoquinoline | 10:1 | 60:6 |
| X.36 | 1-(4,5-dimethylbenzimidazol-1-yl)-4,4-difluoro-3,3-dimethyl-isoquinoline | 100:1 | 60:0.6 |
| X.36 | 1-(4,5-dimethylbenzimidazol-1-yl)-4,4-difluoro-3,3-dimethyl-isoquinoline | 3.3:1 | 20:6 |
| X.36 | 1-(4,5-dimethylbenzimidazol-1-yl)-4,4-difluoro-3,3-dimethyl-isoquinoline | 33.3:1 | 20:0.6 |
| X.36 | Isopyrazam | 10:1 | 60:6 |
| X.36 | Isopyrazam | 100:1 | 60:0.6 |
| X.36 | Isopyrazam | 3.3:1 | 20:6 |
| X.36 | Isopyrazam | 33.3:1 | 20:0.6 |
| X.36 | Sedaxane | 10:1 | 60:6 |
| X.36 | Sedaxane | 100:1 | 60:0.6 |
| X.36 | Sedaxane | 3.3:1 | 20:6 |
| X.36 | Sedaxane | 33.3:1 | 20:0.6 |
| X.36 | Isofetamid | 10:1 | 60:6 |
| X.36 | Isofetamid | 100:1 | 60:0.6 |
| X.36 | Isofetamid | 3.3:1 | 20:6 |
| X.36 | Isofetamid | 33.3:1 | 20:0.6 |
| X.36 | Ipflufenoquin | 10:1 | 60:6 |
| X.36 | Ipflufenoquin | 100:1 | 60:0.6 |
| X.36 | Ipflufenoquin | 3.3:1 | 20:6 |
| X.36 | Ipflufenoquin | 33.3:1 | 20:0.6 |
| X.36 | Quinofumelin | 10:1 | 60:6 |
| X.36 | Quinofumelin | 100:1 | 60:0.6 |
| X.36 | Quinofumelin | 3.3:1 | 20:6 |
| X.36 | Quinofumelin | 33.3:1 | 20:0.6 |
| X.36 | Tricyclazole | 3:1 | 60:20 |
| X.36 | Tricyclazole | 10:1 | 60:6 |
| X.36 | Tricyclazole | 1:1 | 20:20 |
| X.36 | Tricyclazole | 3.3:1 | 20:6 |
| X.36 | Pyroquilon | 3:1 | 60:20 |
| X.36 | Pyroquilon | 10:1 | 60:6 |
| X.36 | Pyroquilon | 1:1 | 20:20 |
| X.36 | Pyroquilon | 3.3:1 | 20:6 |
| X.38 | Azoxystrobin | 10:1 | 60:6 |
| X.38 | Azoxystrobin | 100:1 | 60:0.6 |
| X.38 | Azoxystrobin | 3.3:1 | 20:6 |
| X.38 | Azoxystrobin | 33.3:1 | 20:0.6 |
| X.38 | Trifloxystrobin | 10:1 | 60:6 |
| X.38 | Trifloxystrobin | 100:1 | 60:0.6 |
| X.38 | Trifloxystrobin | 3.3:1 | 20:6 |
| X.38 | Trifloxystrobin | 33.3:1 | 20:0.6 |
| X.38 | Metyltetraprole | 10:1 | 60:6 |
| X.38 | Metyltetraprole | 100:1 | 60:0.6 |
| X.38 | Metyltetraprole | 3.3:1 | 20:6 |
| X.38 | Metyltetraprole | 33.3:1 | 20:0.6 |
| X.38 | Difenoconazole | 10:1 | 60:6 |
| X.38 | Difenoconazole | 100:1 | 60:0.6 |
| X.38 | Difenoconazole | 3.3:1 | 20:6 |
| X.38 | Difenoconazole | 33.3:1 | 20:0.6 |
| X.38 | Propiconazole | 10:1 | 60:6 |
| X.38 | Propiconazole | 100:1 | 60:0.6 |
| X.38 | Propiconazole | 3.3:1 | 20:6 |

-continued

| Component A (Compound) | Component B | Ratio A:B | Conc. (ppm) (A:B) |
|---|---|---|---|
| X.38 | Prothioconazole | 10:1 | 60:6 |
| X.38 | Prothioconazole | 100:1 | 60:0.6 |
| X.38 | Prothioconazole | 3.3:1 | 20:6 |
| X.38 | Prothioconazole | 33.3:1 | 20:0.6 |
| X.38 | Mefentrifluconazole | 10:1 | 60:6 |
| X.38 | Mefentrifluconazole | 100:1 | 60:0.6 |
| X.38 | Mefentrifluconazole | 3.3:1 | 20:6 |
| X.38 | Fenpropidin | 3:1 | 60:20 |
| X.38 | Fenpropidin | 10:1 | 60:6 |
| X.38 | Fenpropidin | 1:1 | 20:20 |
| X.38 | Fenpropidin | 3.3:1 | 20:6 |
| X.38 | Fenpropimorph | 3:1 | 60:20 |
| X.38 | Fenpropimorph | 10:1 | 60:6 |
| X.38 | Fenpropimorph | 1:1 | 20:20 |
| X.38 | Fluxapyroxad | 10:1 | 60:6 |
| X.38 | Fluxapyroxad | 100:1 | 60:0.6 |
| X.38 | Fluxapyroxad | 3.3:1 | 20:6 |
| X.38 | Fluxapyroxad | 33.3:1 | 20:0.6 |
| X.38 | Fluopyram | 10:1 | 60:6 |
| X.38 | Fluopyram | 100:1 | 60:0.6 |
| X.38 | Benzovindiflupyr | 10:1 | 60:6 |
| X.38 | Benzovindiflupyr | 100:1 | 60:0.6 |
| X.38 | Benzovindiflupyr | 3.3:1 | 20:6 |
| X.38 | Benzovindiflupyr | 33.3:1 | 20:0.6 |
| X.38 | Pydiflumetofen | 10:1 | 60:6 |
| X.38 | Pydiflumetofen | 100:1 | 60:0.6 |
| X.38 | Pydiflumetofen | 3.3:1 | 20:6 |
| X.38 | Pydiflumetofen | 33.3:1 | 20:0.6 |
| X.38 | Isoflucypram | 10:1 | 60:6 |
| X.38 | Isoflucypram | 100:1 | 60:0.6 |
| X.38 | Isoflucypram | 3.3:1 | 20:6 |
| X.38 | Isoflucypram | 33.3:1 | 20:0.6 |
| X.38 | Fluindapyr | 10:1 | 60:6 |
| X.38 | Fluindapyr | 100:1 | 60:0.6 |
| X.38 | Fluindapyr | 3.3:1 | 20:6 |
| X.38 | Fluindapyr | 33.3:1 | 20:0.6 |
| X.38 | Florylpicoxamid | 10:1 | 60:6 |
| X.38 | Florylpicoxamid | 100:1 | 60:0.6 |
| X.38 | Florylpicoxamid | 3.3:1 | 20:6 |
| X.38 | Florylpicoxamid | 33.3:1 | 20:0.6 |
| X.38 | Metarylpicoxamid | 10:1 | 60:6 |
| X.38 | Metarylpicoxamid | 100:1 | 60:0.6 |
| X.38 | Metarylpicoxamid | 3.3:1 | 20:6 |
| X.38 | Chlorothalonil | 10:1 | 60:6 |
| X.38 | Chlorothalonil | 100:1 | 60:0.6 |
| X.38 | Chlorothalonil | 3.3:1 | 20:6 |
| X.38 | Chlorothalonil | 33.3:1 | 20:0.6 |
| X.38 | Mancozeb | 3:1 | 60:20 |
| X.38 | Mancozeb | 10:1 | 60:6 |
| X.38 | Mancozeb | 1:1 | 20:20 |
| X.38 | Mancozeb | 3.3:1 | 20:6 |
| X.38 | Mandipropamid | 3:1 | 60:20 |
| X.38 | Mandipropamid | 10:1 | 60:6 |
| X.38 | Mandipropamid | 1:1 | 20:20 |
| X.38 | Mandipropamid | 3.3:1 | 20:6 |
| X.38 | Oxathiapiprolin | 3:1 | 60:20 |
| X.38 | Oxathiapiprolin | 10:1 | 60:6 |
| X.38 | Oxathiapiprolin | 1:1 | 20:20 |
| X.38 | Fluazinam | 10:1 | 60:6 |
| X.38 | Fluazinam | 100:1 | 60:0.6 |
| X.38 | Fluazinam | 3.3:1 | 20:6 |
| X.38 | Fluazinam | 33.3:1 | 20:0.6 |
| X.38 | Fludioxonil | 10:1 | 60:6 |
| X.38 | Fludioxonil | 100:1 | 60:0.6 |
| X.38 | Fludioxonil | 3.3:1 | 20:6 |
| X.38 | Fludioxonil | 33.3:1 | 20:0.6 |
| X.38 | Cyprodinil | 10:1 | 60:6 |
| X.38 | Cyprodinil | 100:1 | 60:0.6 |
| X.38 | Cyprodinil | 3.3:1 | 20:6 |
| X.38 | Cyprodinil | 33.3:1 | 20:0.6 |
| X.38 | Metalaxyl-M | 3:1 | 60:20 |
| X.38 | Metalaxyl-M | 10:1 | 60:6 |
| X.38 | Folpet | 10:1 | 60:6 |
| X.38 | Folpet | 30:1 | 60:2 |

-continued

| Component A (Compound) | Component B | Ratio A:B | Conc. (ppm) (A:B) |
|---|---|---|---|
| X.38 | Folpet | 3.3:1 | 20:6 |
| X.38 | Folpet | 10:1 | 20:2 |
| X.38 | Aminopyrifen | 10:1 | 60:6 |
| X.38 | Aminopyrifen | 100:1 | 60:0.6 |
| X.38 | Aminopyrifen | 3.3:1 | 20:6 |
| X.38 | Aminopyrifen | 33.3:1 | 20:0.6 |
| X.38 | N-(1-benzyl-1,3-dimethyl-butyl)-8-fluoro-quinoline-3-carboxamide | 10:1 | 60:6 |
| X.38 | N-(1-benzyl-1,3-dimethyl-butyl)-8-fluoro-quinoline-3-carboxamide | 100:1 | 60:0.6 |
| X.38 | N-(1-benzyl-1,3-dimethyl-butyl)-8-fluoro-quinoline-3-carboxamide | 3.3:1 | 20:6 |
| X.38 | N-(1-benzyl-3,3,3-trifluoro-1-methyl-propyl)-8-fluoro-quinoline-3-carboxamide | 10:1 | 60:6 |
| X.38 | N-(1-benzyl-3,3,3-trifluoro-1-methyl-propyl)-8-fluoro-quinoline-3-carboxamide | 3.3:1 | 20:6 |
| X.38 | N-(1-benzyl-3,3,3-trifluoro-1-methyl-propyl)-8-fluoro-quinoline-3-carboxamide | 33.3:1 | 20:0.6 |
| X.38 | 1-(6,7-dimethylpyrazolo[1,5-a]pyridin-3-yl)-4,4,5-trifluoro-3,3-dimethyl-isoquinoline | 10:1 | 60:6 |
| X.38 | 1-(6,7-dimethylpyrazolo[1,5-a]pyridin-3-yl)-4,4,5-trifluoro-3,3-dimethyl-isoquinoline | 100:1 | 60:0.6 |
| X.38 | 1-(6,7-dimethylpyrazolo[1,5-a]pyridin-3-yl)-4,4,5-trifluoro-3,3-dimethyl-isoquinoline | 3.3:1 | 20:6 |
| X.38 | 1-(6,7-dimethylpyrazolo[1,5-a]pyridin-3-yl)-4,4,5-trifluoro-3,3-dimethyl-isoquinoline | 33.3:1 | 20:0.6 |
| X.38 | 4,4-difluoro-3,3-dimethyl-1-(7-methylpyrazolo[1,5-a]pyridin-3-yl)isoquinoline | 10:1 | 60:6 |
| X.38 | 4,4-difluoro-3,3-dimethyl-1-(7-methylpyrazolo[1,5-a]pyridin-3-yl)isoquinoline | 100:1 | 60:0.6 |
| X.38 | 4,4-difluoro-3,3-dimethyl-1-(7-methylpyrazolo[1,5-a]pyridin-3-yl)isoquinoline | 3.3:1 | 20:6 |
| X.38 | 4,4-difluoro-3,3-dimethyl-1-(7-methylpyrazolo[1,5-a]pyridin-3-yl)isoquinoline | 33.3:1 | 20:0.6 |
| X.38 | 1-(4,5-dimethylbenzimidazol-1-yl)-4,4,5-trifluoro-3,3-dimethyl-isoquinoline | 10:1 | 60:6 |
| X.38 | 1-(4,5-dimethylbenzimidazol-1-yl)-4,4,5-trifluoro-3,3-dimethyl-isoquinoline | 100:1 | 60:0.6 |
| X.38 | 1-(4,5-dimethylbenzimidazol-1-yl)-4,4,5-trifluoro-3,3-dimethyl-isoquinoline | 3.3:1 | 20:6 |
| X.38 | 1-(4,5-dimethylbenzimidazol-1-yl)-4,4,5-trifluoro-3,3-dimethyl-isoquinoline | 33.3:1 | 20:0.6 |
| X.38 | 1-(4,5-dimethylbenzimidazol-1-yl)-4,4-difluoro-3,3-dimethyl-isoquinoline | 10:1 | 60:6 |
| X.38 | 1-(4,5-dimethylbenzimidazol-1-yl)-4,4-difluoro-3,3-dimethyl-isoquinoline | 100:1 | 60:0.6 |
| X.38 | 1-(4,5-dimethylbenzimidazol-1-yl)-4,4-difluoro-3,3-dimethyl-isoquinoline | 3.3:1 | 20:6 |
| X.38 | 1-(4,5-dimethylbenzimidazol-1-yl)-4,4-difluoro-3,3-dimethyl-isoquinoline | 33.3:1 | 20:0.6 |
| X.38 | Isopyrazam | 10:1 | 60:6 |
| X.38 | Isopyrazam | 100:1 | 60:0.6 |
| X.38 | Isopyrazam | 3.3:1 | 20:6 |
| X.38 | Isopyrazam | 33.3:1 | 20:0.6 |
| X.38 | Sedaxane | 10:1 | 60:6 |

-continued

| Component A (Compound) | Component B | Ratio A:B | Conc. (ppm) (A:B) |
|---|---|---|---|
| X.38 | Sedaxane | 100:1 | 60:0.6 |
| X.38 | Sedaxane | 3.3:1 | 20:6 |
| X.38 | Sedaxane | 33.3:1 | 20:0.6 |
| X.38 | Isofetamid | 10:1 | 60:6 |
| X.38 | Isofetamid | 100:1 | 60:0.6 |
| X.38 | Isofetamid | 3.3:1 | 20:6 |
| X.38 | Isofetamid | 33.3:1 | 20:0.6 |
| X.38 | Ipflufenoquin | 10:1 | 60:6 |
| X.38 | Ipflufenoquin | 100:1 | 60:0.6 |
| X.38 | Ipflufenoquin | 3.3:1 | 20:6 |
| X.38 | Ipflufenoquin | 33.3:1 | 20:0.6 |
| X.38 | Quinofumelin | 10:1 | 60:6 |
| X.38 | Quinofumelin | 100:1 | 60:0.6 |
| X.38 | Quinofumelin | 3.3:1 | 20:6 |
| X.38 | Quinofumelin | 33.3:1 | 20:0.6 |
| X.38 | Tricyclazole | 3:1 | 60:20 |
| X.38 | Tricyclazole | 10:1 | 60:6 |
| X.38 | Tricyclazole | 1:1 | 20:20 |
| X.38 | Tricyclazole | 3.3:1 | 20:6 |
| X.38 | Pyroquilon | 3:1 | 60:20 |
| X.38 | Pyroquilon | 10:1 | 60:6 |

Example B37: Activity Against *Cercospora beticola* (Leaf Spot)

Conidia of the fungus from cryogenic storage were directly mixed into nutrient broth (PDB potato dextrose broth). A DMSO solution of the test compounds was placed into a microtiter plate (96-well format) and the nutrient broth containing the fungal spores was added to it. The test plates were incubated at 24° C. and the inhibition of growth was determined photometrically after 3-4 days at 620 nm. The following mixture compositions (A:B) at the reported concentration (in ppm) gave at least 70% disease control in this test.

| Component A (Compound) | Component B | Ratio A:B | Conc. (ppm) (A:B) |
|---|---|---|---|
| X.29 | Metyltetraprole | 10:1 | 20:2 |
| X.29 | Metyltetraprole | 1:1 | 2:2 |
| X.29 | Fenpropimorph | 1:1 | 20:20 |
| X.29 | Fenpicoxamid | 3.3:1 | 20:6 |
| X.29 | Fenpicoxamid | 1:3 | 2:6 |
| X.29 | Florylpicoxamid | 10:1 | 20:2 |
| X.29 | Florylpicoxamid | 100:1 | 20:0.2 |
| X.29 | Florylpicoxamid | 1:1 | 2:2 |
| X.29 | Florylpicoxamid | 10:1 | 2:0.2 |
| X.29 | Chlorothalonil | 3.3:1 | 20:6 |
| X.29 | Chlorothalonil | 1:3 | 2:6 |
| X.29 | Fluazinam | 10:1 | 20:2 |
| X.29 | Fluazinam | 1:1 | 2:2 |
| X.29 | Fludioxonil | 3.3:1 | 20:6 |
| X.29 | Fludioxonil | 1:3 | 2:6 |
| X.29 | Cyprodinil | 3.3:1 | 20:6 |
| X.29 | Cyprodinil | 1:3 | 2:6 |
| X.29 | Aminopyrifen | 10:1 | 20:2 |
| X.29 | Aminopyrifen | 1:1 | 2:2 |
| X.29 | Folpet | 3.3:1 | 20:6 |
| X.29 | Folpet | 1:3 | 2:6 |
| X.29 | Ipflufenoquin | 10:1 | 60:6 |
| X.36 | Azoxystrobin | 10:1 | 60:6 |
| X.36 | Trifloxystrobin | 10:1 | 60:6 |
| X.36 | Metyltetraprole | 10:1 | 60:6 |
| X.36 | Metyltetraprole | 100:1 | 60:0.6 |
| X.36 | Metyltetraprole | 3.3:1 | 20:6 |
| X.36 | Metyltetraprole | 33.3:1 | 20:0.6 |

-continued

| Component A (Compound) | Component B | Ratio A:B | Conc. (ppm) (A:B) |
|---|---|---|---|
| X.36 | Difenoconazole | 10:1 | 60:6 |
| X.36 | Difenoconazole | 100:1 | 60:0.6 |
| X.36 | Difenoconazole | 3.3:1 | 20:6 |
| X.36 | Hexaconazole | 10:1 | 60:6 |
| X.36 | Hexaconazole | 100:1 | 60:0.6 |
| X.36 | Hexaconazole | 3.3:1 | 20:6 |
| X.36 | Propiconazole | 10:1 | 60:6 |
| X.36 | Propiconazole | 100:1 | 60:0.6 |
| X.36 | Propiconazole | 3.3:1 | 20:6 |
| X.36 | Propiconazole | 33.3:1 | 20:0.6 |
| X.36 | Prothioconazole | 10:1 | 60:6 |
| X.36 | Prothioconazole | 100:1 | 60:0.6 |
| X.36 | Prothioconazole | 3.3:1 | 20:6 |
| X.36 | Prothioconazole | 33.3:1 | 20:0.6 |
| X.36 | Mefentrifluconazole | 10:1 | 60:6 |
| X.36 | Mefentrifluconazole | 100:1 | 60:0.6 |
| X.36 | Mefentrifluconazole | 3.3:1 | 20:6 |
| X.36 | Fenpropidin | 3:1 | 60:20 |
| X.36 | Fenpropidin | 10:1 | 60:6 |
| X.36 | Fenpropidin | 1:1 | 20:20 |
| X.36 | Fenpropidin | 3.3:1 | 20:6 |
| X.36 | Fenpropimorph | 3:1 | 60:20 |
| X.36 | Fenpropimorph | 10:1 | 60:6 |
| X.36 | Fenpropimorph | 1:1 | 20:20 |
| X.36 | Fenpropimorph | 3.3:1 | 20:6 |
| X.36 | Fluxapyroxad | 10:1 | 60:6 |
| X.36 | Fluxapyroxad | 100:1 | 60:0.6 |
| X.36 | Fluopyram | 10:1 | 60:6 |
| X.36 | Fluopyram | 100:1 | 60:0.6 |
| X.36 | Benzovindiflupyr | 10:1 | 60:6 |
| X.36 | Benzovindiflupyr | 100:1 | 60:0.6 |
| X.36 | Pydiflumetofen | 10:1 | 60:6 |
| X.36 | Pydiflumetofen | 100:1 | 60:0.6 |
| X.36 | Pydiflumetofen | 3.3:1 | 20:6 |
| X.36 | Pydiflumetofen | 33.3:1 | 20:0.6 |
| X.36 | Isoflucypram | 10:1 | 60:6 |
| X.36 | Isoflucypram | 100:1 | 60:0.6 |
| X.36 | Isoflucypram | 3.3:1 | 20:6 |
| X.36 | Fluindapyr | 10:1 | 60:6 |
| X.36 | Florylpicoxamid | 10:1 | 60:6 |
| X.36 | Florylpicoxamid | 100:1 | 60:0.6 |
| X.36 | Florylpicoxamid | 3.3:1 | 20:6 |
| X.36 | Florylpicoxamid | 33.3:1 | 20:0.6 |
| X.36 | Metarylpicoxamid | 10:1 | 60:6 |
| X.36 | Metarylpicoxamid | 100:1 | 60:0.6 |
| X.36 | Metarylpicoxamid | 3.3:1 | 20:6 |
| X.36 | Metarylpicoxamid | 33.3:1 | 20:0.6 |
| X.36 | Chlorothalonil | 10:1 | 60:6 |
| X.36 | Chlorothalonil | 100:1 | 60:0.6 |
| X.36 | Chlorothalonil | 3.3:1 | 20:6 |
| X.36 | Mancozeb | 3:1 | 60:20 |
| X.36 | Fluazinam | 10:1 | 60:6 |
| X.36 | Fluazinam | 100:1 | 60:0.6 |
| X.36 | Fluazinam | 3.3:1 | 20:6 |
| X.36 | Fluazinam | 33.3:1 | 20:0.6 |
| X.36 | Fludioxonil | 10:1 | 60:6 |
| X.36 | Fludioxonil | 100:1 | 60:0.6 |
| X.36 | Fludioxonil | 3.3:1 | 20:6 |
| X.36 | Fludioxonil | 33.3:1 | 20:0.6 |
| X.36 | Cyprodinil | 10:1 | 60:6 |
| X.36 | Cyprodinil | 100:1 | 60:0.6 |
| X.36 | Cyprodinil | 3.3:1 | 20:6 |
| X.36 | Folpet | 10:1 | 60:6 |
| X.36 | Folpet | 30:1 | 60:2 |
| X.36 | Folpet | 3.3:1 | 20:6 |
| X.36 | Folpet | 10:1 | 20:2 |
| X.36 | Aminopyrifen | 10:1 | 60:6 |
| X.36 | Aminopyrifen | 100:1 | 60:0.6 |
| X.36 | Aminopyrifen | 3.3:1 | 20:6 |
| X.36 | Aminopyrifen | 33.3:1 | 20:0.6 |
| X.36 | 1-(6,7-dimethylpyrazolo[1,5-a]pyridin-3-yl)-4,4,5-trifluoro-3,3-dimethyl-isoquinoline | 10:1 | 60:6 |

-continued

| Component A (Compound) | Component B | Ratio A:B | Conc. (ppm) (A:B) |
|---|---|---|---|
| X.36 | 1-(6,7-dimethylpyrazolo[1,5-a]pyridin-3-yl)-4,4,5-trifluoro-3,3-dimethyl-isoquinoline | 100:1 | 60:0.6 |
| X.36 | 1-(6,7-dimethylpyrazolo[1,5-a]pyridin-3-yl)-4,4,5-trifluoro-3,3-dimethyl-isoquinoline | 3.3:1 | 20:6 |
| X.36 | 1-(6,7-dimethylpyrazolo[1,5-a]pyridin-3-yl)-4,4,5-trifluoro-3,3-dimethyl-isoquinoline | 33.3:1 | 20:0.6 |
| X.36 | 4,4-difluoro-3,3-dimethyl-1-(7-methylpyrazolo[1,5-a]pyridin-3-yl) isoquinoline | 10:1 | 60:6 |
| X.36 | 4,4-difluoro-3,3-dimethyl-1-(7-methylpyrazolo[1,5-a]pyridin-3-yl)isoquinoline | 100:1 | 60:0.6 |
| X.36 | 4,4-difluoro-3,3-dimethyl-1-(7-methylpyrazolo[1,5-a]pyridin-3-yl) isoquinoline | 3.3:1 | 20:6 |
| X.36 | 1-(4,5-dimethylbenzimidazol-1-yl)-4,4,5-trifluoro-3,3-dimethyl-isoquinoline | 10:1 | 60:6 |
| X.36 | 1-(4,5-dimethylbenzimidazol-1-yl)-4,4,5-trifluoro-3,3-dimethyl-isoquinoline | 100:1 | 60:0.6 |
| X.36 | 1-(4,5-dimethylbenzimidazol-1-yl)-4,4,5-trifluoro-3,3-dimethyl-isoquinoline | 3.3:1 | 20:6 |
| X.36 | 1-(4,5-dimethylbenzimidazol-1-yl)-4,4-difluoro-3,3-dimethyl-isoquinoline | 10:1 | 60:6 |
| X.36 | 1-(4,5-dimethylbenzimidazol-1-yl)-4,4-difluoro-3,3-dimethyl-isoquinoline | 100:1 | 60:0.6 |
| X.36 | 1-(4,5-dimethylbenzimidazol-1-yl)-4,4-difluoro-3,3-dimethyl-isoquinoline | 3.3:1 | 20:6 |
| X.36 | 1-(4,5-dimethylbenzimidazol-1-yl)-4,4-difluoro-3,3-dimethyl-isoquinoline | 33.3:1 | 20:0.6 |
| X.36 | Ipflufenoquin | 10:1 | 60:6 |
| X.36 | Ipflufenoquin | 100:1 | 60:0.6 |
| X.36 | Ipflufenoquin | 3.3:1 | 20:6 |
| X.36 | Ipflufenoquin | 33.3:1 | 20:0.6 |
| X.36 | Quinofumelin | 10:1 | 60:6 |
| X.36 | Quinofumelin | 100:1 | 60:0.6 |
| X.36 | Quinofumelin | 3.3:1 | 20:6 |
| X.38 | Metyltetraprole | 10:1 | 60:6 |
| X.38 | Metyltetraprole | 100:1 | 60:0.6 |
| X.38 | Metyltetraprole | 3.3:1 | 20:6 |
| X.38 | Metyltetraprole | 33.3:1 | 20:0.6 |
| X.38 | Difenoconazole | 10:1 | 60:6 |
| X.38 | Difenoconazole | 3.3:1 | 20:6 |
| X.38 | Hexaconazole | 10:1 | 60:6 |
| X.38 | Hexaconazole | 3.3:1 | 20:6 |
| X.38 | Hexaconazole | 33.3:1 | 20:0.6 |
| X.38 | Propiconazole | 10:1 | 60:6 |
| X.38 | Propiconazole | 3.3:1 | 20:6 |
| X.38 | Propiconazole | 33.3:1 | 20:0.6 |
| X.38 | Prothioconazole | 10:1 | 60:6 |
| X.38 | Prothioconazole | 3.3:1 | 20:6 |
| X.38 | Prothioconazole | 33.3:1 | 20:0.6 |
| X.38 | Mefentrifluconazole | 10:1 | 60:6 |
| X.38 | Mefentrifluconazole | 3.3:1 | 20:6 |
| X.38 | Fenpropidin | 3:1 | 60:20 |
| X.38 | Fenpropidin | 1:1 | 20:20 |
| X.38 | Fenpropidin | 3.3:1 | 20:6 |
| X.38 | Fenpropimorph | 3:1 | 60:20 |
| X.38 | Fenpropimorph | 10:1 | 60:6 |
| X.38 | Fenpropimorph | 1:1 | 20:20 |
| X.38 | Fenpropimorph | 3.3:1 | 20:6 |
| X.38 | Pydiflumetofen | 10:1 | 60:6 |
| X.38 | Pydiflumetofen | 3.3:1 | 20:6 |
| X.38 | Florylpicoxamid | 10:1 | 60:6 |
| X.38 | Florylpicoxamid | 100:1 | 60:0.6 |
| X.38 | Florylpicoxamid | 3.3:1 | 20:6 |

-continued

| Component A (Compound) | Component B | Ratio A:B | Conc. (ppm) (A:B) |
|---|---|---|---|
| X.38 | Florylpicoxamid | 33.3:1 | 20:0.6 |
| X.38 | Metarylpicoxamid | 10:1 | 60:6 |
| X.38 | Metarylpicoxamid | 100:1 | 60:0.6 |
| X.38 | Metarylpicoxamid | 3.3:1 | 20:6 |
| X.38 | Metarylpicoxamid | 33.3:1 | 20:0.6 |
| X.38 | Chlorothalonil | 10:1 | 60:6 |
| X.38 | Chlorothalonil | 100:1 | 60:0.6 |
| X.38 | Chlorothalonil | 3.3:1 | 20:6 |
| X.38 | Chlorothalonil | 33.3:1 | 20:0.6 |
| X.38 | Fluazinam | 10:1 | 60:6 |
| X.38 | Fluazinam | 3.3:1 | 20:6 |
| X.38 | Fluazinam | 33.3:1 | 20:0.6 |
| X.38 | Fludioxonil | 10:1 | 60:6 |
| X.38 | Fludioxonil | 100:1 | 60:0.6 |
| X.38 | Fludioxonil | 3.3:1 | 20:6 |
| X.38 | Fludioxonil | 33.3:1 | 20:0.6 |
| X.38 | Cyprodinil | 10:1 | 60:6 |
| X.38 | Cyprodinil | 3.3:1 | 20:6 |
| X.38 | Folpet | 10:1 | 60:6 |
| X.38 | Folpet | 30:1 | 60:2 |
| X.38 | Folpet | 3.3:1 | 20:6 |
| X.38 | Folpet | 10:1 | 20:2 |
| X.38 | Aminopyrifen | 10:1 | 60:6 |
| X.38 | Aminopyrifen | 100:1 | 60:0.6 |
| X.38 | Aminopyrifen | 3.3:1 | 20:6 |
| X.38 | Aminopyrifen | 33.3:1 | 20:0.6 |
| X.38 | 1-(6,7-dimethylpyrazolo[1,5-a]pyridin-3-yl)-4,4,5-trifluoro-3,3-dimethyl-isoquinoline | 10:1 | 60:6 |
| X.38 | 1-(6,7-dimethylpyrazolo[1,5-a]pyridin-3-yl)-4,4,5-trifluoro-3,3-dimethyl-isoquinoline | 3.3:1 | 20:6 |
| X.38 | 1-(6,7-dimethylpyrazolo[1,5-a]pyridin-3-yl)-4,4,5-trifluoro-3,3-dimethyl-isoquinoline | 33.3:1 | 20:0.6 |
| X.38 | 1-(4,5-dimethylbenzimidazol-1-yl)-4,4,5-trifluoro-3,3-dimethyl-isoquinoline | 10:1 | 60:6 |
| X.38 | 1-(4,5-dimethylbenzimidazol-1-yl)-4,4,5-trifluoro-3,3-dimethyl-isoquinoline | 3.3:1 | 20:6 |
| X.38 | 1-(4,5-dimethylbenzimidazol-1-yl)-4,4-difluoro-3,3-dimethyl-isoquinoline | 10:1 | 60:6 |
| X.38 | 1-(4,5-dimethylbenzimidazol-1-yl)-4,4-difluoro-3,3-dimethyl-isoquinoline | 3.3:1 | 20:6 |
| X.38 | Ipflufenoquin | 10:1 | 60:6 |
| X.38 | Ipflufenoquin | 100:1 | 60:0.6 |
| X.38 | Ipflufenoquin | 3.3:1 | 20:6 |
| X.38 | Ipflufenoquin | 33.3:1 | 20:0.6 |

Example B8: Activity Against *Pyrenophora teres* (Net Blotch)

Conidia of the fungus from cryogenic storage were directly mixed into nutrient broth (PDB potato dextrose broth). A DMSO solution of the test compounds was placed into a microtiter plate (96-well format) and the nutrient broth containing the fungal spores was added to it. The test plates were incubated at 24° C. and the inhibition of growth was determined photometrically after 72 hrs at 620 nm. The following mixture compositions (A:B) at the reported concentration (in ppm) gave at least 70% disease control in this test.

| Component A (Compound) | Component B | Ratio A:B | Conc. (ppm) (A:B) |
|---|---|---|---|
| X.29 | Azoxystrobin | 10:1 | 20:2 |
| X.29 | Azoxystrobin | 100:1 | 20:0.2 |
| X.29 | Azoxystrobin | 1:1 | 2:2 |
| X.29 | Azoxystrobin | 10:1 | 2:0.2 |
| X.29 | Trifloxystrobin | 10:1 | 20:2 |
| X.29 | Trifloxystrobin | 100:1 | 20:0.2 |
| X.29 | Trifloxystrobin | 1:1 | 2:2 |
| X.29 | Trifloxystrobin | 10:1 | 2:0.2 |
| X.29 | Metyltetraprole | 10:1 | 20:2 |
| X.29 | Metyltetraprole | 100:1 | 20:0.2 |
| X.29 | Metyltetraprole | 1:1 | 2:2 |
| X.29 | Metyltetraprole | 10:1 | 2:0.2 |
| X.29 | Difenoconazole | 3.3:1 | 20:6 |
| X.29 | Difenoconazole | 33.3:1 | 20:0.6 |
| X.29 | Difenoconazole | 1:3 | 2:6 |
| X.29 | Difenoconazole | 3.3:1 | 2:0.6 |
| X.29 | Hexaconazole | 3.3:1 | 20:6 |
| X.29 | Hexaconazole | 1:3 | 2:6 |
| X.29 | Propiconazole | 3.3:1 | 20:6 |
| X.29 | Prothioconazole | 3.3:1 | 20:6 |
| X.29 | Prothioconazole | 33.3:1 | 20:0.6 |
| X.29 | Prothioconazole | 1:3 | 2:6 |
| X.29 | Prothioconazole | 3.3:1 | 2:0.6 |
| X.29 | Fenpropimorph | 1:1 | 20:20 |
| X.29 | Fluopyram | 10:1 | 20:2 |
| X.29 | Fluopyram | 100:1 | 20:0.2 |
| X.29 | Isopyrazam | 10:1 | 20:2 |
| X.29 | Isopyrazam | 100:1 | 20:0.2 |
| X.29 | Isopyrazam | 1:1 | 2:2 |
| X.29 | Sedaxane | 10:1 | 20:2 |
| X.29 | Benzovindiflupyr | 10:1 | 20:2 |
| X.29 | Benzovindiflupyr | 100:1 | 20:0.2 |
| X.29 | Benzovindiflupyr | 1:1 | 2:2 |
| X.29 | Pydiflumetofen | 10:1 | 20:2 |
| X.29 | Pydiflumetofen | 100:1 | 20:0.2 |
| X.29 | Pydiflumetofen | 1:1 | 2:2 |
| X.29 | Pydiflumetofen | 10:1 | 2:0.2 |
| X.29 | Isoflucypram | 10:1 | 20:2 |
| X.29 | Isoflucypram | 100:1 | 20:0.2 |
| X.29 | Isoflucypram | 1:1 | 2:2 |
| X.29 | Isofetamid | 10:1 | 20:2 |
| X.29 | Pyrapropoyne | 10:1 | 20:2 |
| X.29 | Pyrapropoyne | 100:1 | 20:0.2 |
| X.29 | Pyrapropoyne | 1:1 | 2:2 |
| X.29 | Fluindapyr | 10:1 | 20:2 |
| X.29 | Fenpicoxamid | 3.3:1 | 20:6 |
| X.29 | Fenpicoxamid | 1:3 | 2:6 |
| X.29 | Florylpicoxamid | 10:1 | 20:2 |
| X.29 | Florylpicoxamid | 1:1 | 2:2 |
| X.29 | Chlorothalonil | 3.3:1 | 20:6 |
| X.29 | Fluazinam | 10:1 | 20:2 |
| X.29 | Fluazinam | 100:1 | 20:0.2 |
| X.29 | Fluazinam | 1:1 | 2:2 |
| X.29 | Fluazinam | 10:1 | 2:0.2 |
| X.29 | Fludioxonil | 3.3:1 | 20:6 |
| X.29 | Fludioxonil | 33.3:1 | 20:0.6 |
| X.29 | Fludioxonil | 1:3 | 2:6 |
| X.29 | Cyprodinil | 3.3:1 | 20:6 |
| X.29 | Cyprodinil | 33.3:1 | 20:0.6 |
| X.29 | Cyprodinil | 1:3 | 2:6 |
| X.29 | Cyprodinil | 3.3:1 | 2:0.6 |
| X.29 | Ipflufenoquin | 10:1 | 20:2 |
| X.29 | Ipflufenoquin | 100:1 | 20:0.2 |
| X.29 | Ipflufenoquin | 1:1 | 2:2 |
| X.29 | Quinofumelin | 10:1 | 20:2 |
| X.29 | Quinofumelin | 100:1 | 20:0.2 |
| X.29 | Quinofumelin | 1:1 | 2:2 |
| X.29 | Quinofumelin | 10:1 | 2:0.2 |
| X.29 | N-(1-benzyl-1,3-dimethyl-butyl)-8-fluoro-quinoline-3-carboxamide | 10:1 | 20:2 |
| X.29 | N-(1-benzyl-1,3-dimethyl-butyl)-8-fluoro-quinoline-3-carboxamide | 1:1 | 2:2 |
| X.29 | N-(1-benzyl-3,3,3-trifluoro-1-methyl-propyl)-8-fluoro-quinoline-3-carboxamide | 10:1 | 20:2 |

-continued

| Component A (Compound) | Component B | Ratio A:B | Conc. (ppm) (A:B) |
|---|---|---|---|
| X.29 | 1-(6,7-dimethylpyrazolo[1,5-a]pyridin-3-yl)-4,4,5-trifluoro-3,3-dimethyl-isoquinoline | 10:1 | 20:2 |
| X.29 | 1-(6,7-dimethylpyrazolo[1,5-a]pyridin-3-yl)-4,4,5-trifluoro-3,3-dimethyl-isoquinoline | 100:1 | 20:0.2 |
| X.29 | 1-(6,7-dimethylpyrazolo[1,5-a]pyridin-3-yl)-4,4,5-trifluoro-3,3-dimethyl-isoquinoline | 1:1 | 2:2 |
| X.29 | 1-(6,7-dimethylpyrazolo[1,5-a]pyridin-3-yl)-4,4,5-trifluoro-3,3-dimethyl-isoquinoline | 10:1 | 2:0.2 |
| X.29 | 4,4-difluoro-3,3-dimethyl-1-(7-methylpyrazolo[1,5-a]pyridin-3-yl)isoquinoline | 10:1 | 20:2 |
| X.29 | 4,4-difluoro-3,3-dimethyl-1-(7-methylpyrazolo[1,5-a]pyridin-3-yl) isoquinoline | 100:1 | 20:0.2 |
| X.29 | 4,4-difluoro-3,3-dimethyl-1-(7-methylpyrazolo[1,5-a]pyridin-3-yl)isoquinoline | 1:1 | 2:2 |
| X.29 | 4,4-difluoro-3,3-dimethyl-1-(7-methylpyrazolo[1,5-a]pyridin-3-yl)isoquinoline | 10:1 | 2:0.2 |
| X.29 | 1-(4,5-dimethylbenzimidazol-1-yl)-4,4,5-trifluoro-3,3-dimethyl-isoquinoline | 10:1 | 20:2 |
| X.29 | 1-(4,5-dimethylbenzimidazol-1-yl)-4,4,5-trifluoro-3,3-dimethyl-isoquinoline | 100:1 | 20:0.2 |
| X.29 | 1-(4,5-dimethylbenzimidazol-1-yl)-4,4,5-trifluoro-3,3-dimethyl-isoquinoline | 1:1 | 2:2 |
| X.29 | 1-(4,5-dimethylbenzimidazol-1-yl)-4,4,5-trifluoro-3,3-dimethyl-isoquinoline | 10:1 | 2:0.2 |
| X.29 | 1-(4,5-dimethylbenzimidazol-1-yl)-4,4-difluoro-3,3-dimethyl-isoquinoline | 10:1 | 20:2 |
| X.29 | 1-(4,5-dimethylbenzimidazol-1-yl)-4,4-difluoro-3,3-dimethyl-isoquinoline | 100:1 | 20:0.2 |
| X.29 | 1-(4,5-dimethylbenzimidazol-1-yl)-4,4-difluoro-3,3-dimethyl-isoquinoline | 1:1 | 2:2 |
| X.29 | 1-(4,5-dimethylbenzimidazol-1-yl)-4,4-difluoro-3,3-dimethyl-isoquinoline | 10:1 | 2:0.2 |
| X.36 | Azoxystrobin | 10:1 | 60:6 |
| X.36 | Azoxystrobin | 100:1 | 60:0.6 |
| X.36 | Azoxystrobin | 3.3:1 | 20:6 |
| X.36 | Azoxystrobin | 33.3:1 | 20:0.6 |
| X.36 | Trifloxystrobin | 10:1 | 60:6 |
| X.36 | Trifloxystrobin | 100:1 | 60:0.6 |
| X.36 | Trifloxystrobin | 3.3:1 | 20:6 |
| X.36 | Trifloxystrobin | 33.3:1 | 20:0.6 |
| X.36 | Metyltetraprole | 10:1 | 60:6 |
| X.36 | Metyltetraprole | 100:1 | 60:0.6 |
| X.36 | Metyltetraprole | 3.3:1 | 20:6 |
| X.36 | Metyltetraprole | 33.3:1 | 20:0.6 |
| X.36 | Difenoconazole | 10:1 | 60:6 |
| X.36 | Difenoconazole | 100:1 | 60:0.6 |
| X.36 | Difenoconazole | 3.3:1 | 20:6 |
| X.36 | Difenoconazole | 33.3:1 | 20:0.6 |
| X.36 | Propiconazole | 10:1 | 60:6 |
| X.36 | Propiconazole | 100:1 | 60:0.6 |
| X.36 | Propiconazole | 3.3:1 | 20:6 |
| X.36 | Propiconazole | 33.3:1 | 20:0.6 |
| X.36 | Prothioconazole | 10:1 | 60:6 |
| X.36 | Prothioconazole | 100:1 | 60:0.6 |
| X.36 | Prothioconazole | 3.3:1 | 20:6 |
| X.36 | Prothioconazole | 33.3:1 | 20:0.6 |
| X.36 | Mefentrifluconazole | 10:1 | 60:6 |
| X.36 | Mefentrifluconazole | 100:1 | 60:0.6 |
| X.36 | Mefentrifluconazole | 3.3:1 | 20:6 |

-continued

| Component A (Compound) | Component B | Ratio A:B | Conc. (ppm) (A:B) |
|---|---|---|---|
| X.36 | Mefentrifluconazole | 33.3:1 | 20:0.6 |
| X.36 | Fenpropidin | 3:1 | 60:20 |
| X.36 | Fenpropidin | 10:1 | 60:6 |
| X.36 | Fenpropidin | 1:1 | 20:20 |
| X.36 | Fenpropidin | 3.3:1 | 20:6 |
| X.36 | Fenpropimorph | 3:1 | 60:20 |
| X.36 | Fenpropimorph | 10:1 | 60:6 |
| X.36 | Fenpropimorph | 1:1 | 20:20 |
| X.36 | Fenpropimorph | 3.3:1 | 20:6 |
| X.36 | Fluxapyroxad | 10:1 | 60:6 |
| X.36 | Fluxapyroxad | 100:1 | 60:0.6 |
| X.36 | Fluxapyroxad | 3.3:1 | 20:6 |
| X.36 | Fluxapyroxad | 33.3:1 | 20:0.6 |
| X.36 | Fluopyram | 10:1 | 60:6 |
| X.36 | Fluopyram | 100:1 | 60:0.6 |
| X.36 | Fluopyram | 3.3:1 | 20:6 |
| X.36 | Fluopyram | 33.3:1 | 20:0.6 |
| X.36 | Benzovindiflupyr | 10:1 | 60:6 |
| X.36 | Benzovindiflupyr | 100:1 | 60:0.6 |
| X.36 | Benzovindiflupyr | 3.3:1 | 20:6 |
| X.36 | Benzovindiflupyr | 33.3:1 | 20:0.6 |
| X.36 | Pydiflumetofen | 10:1 | 60:6 |
| X.36 | Pydiflumetofen | 100:1 | 60:0.6 |
| X.36 | Pydiflumetofen | 3.3:1 | 20:6 |
| X.36 | Pydiflumetofen | 33.3:1 | 20:0.6 |
| X.36 | Isoflucypram | 10:1 | 60:6 |
| X.36 | Isoflucypram | 100:1 | 60:0.6 |
| X.36 | Isoflucypram | 3.3:1 | 20:6 |
| X.36 | Isoflucypram | 33.3:1 | 20:0.6 |
| X.36 | Fluindapyr | 10:1 | 60:6 |
| X.36 | Fluindapyr | 100:1 | 60:0.6 |
| X.36 | Fluindapyr | 3.3:1 | 20:6 |
| X.36 | Fluindapyr | 33.3:1 | 20:0.6 |
| X.36 | Florylpicoxamid | 10:1 | 60:6 |
| X.36 | Florylpicoxamid | 100:1 | 60:0.6 |
| X.36 | Florylpicoxamid | 3.3:1 | 20:6 |
| X.36 | Florylpicoxamid | 33.3:1 | 20:0.6 |
| X.36 | Metarylpicoxamid | 10:1 | 60:6 |
| X.36 | Metarylpicoxamid | 100:1 | 60:0.6 |
| X.36 | Metarylpicoxamid | 3.3:1 | 20:6 |
| X.36 | Metarylpicoxamid | 33.3:1 | 20:0.6 |
| X.36 | Chlorothalonil | 10:1 | 60:6 |
| X.36 | Chlorothalonil | 100:1 | 60:0.6 |
| X.36 | Chlorothalonil | 3.3:1 | 20:6 |
| X.36 | Chlorothalonil | 33.3:1 | 20:0.6 |
| X.36 | Mancozeb | 3:1 | 60:20 |
| X.36 | Mancozeb | 10:1 | 60:6 |
| X.36 | Mancozeb | 1:1 | 20:20 |
| X.36 | Mancozeb | 3.3:1 | 20:6 |
| X.36 | Mandipropamid | 3:1 | 60:20 |
| X.36 | Mandipropamid | 10:1 | 60:6 |
| X.36 | Mandipropamid | 1:1 | 20:20 |
| X.36 | Mandipropamid | 3.3:1 | 20:6 |
| X.36 | Oxathiapiprolin | 3:1 | 60:20 |
| X.36 | Oxathiapiprolin | 10:1 | 60:6 |
| X.36 | Oxathiapiprolin | 1:1 | 20:20 |
| X.36 | Oxathiapiprolin | 3.3:1 | 20:6 |
| X.36 | Fluazinam | 10:1 | 60:6 |
| X.36 | Fluazinam | 100:1 | 60:0.6 |
| X.36 | Fluazinam | 3.3:1 | 20:6 |
| X.36 | Fluazinam | 33.3:1 | 20:0.6 |
| X.36 | Fludioxonil | 10:1 | 60:6 |
| X.36 | Fludioxonil | 100:1 | 60:0.6 |
| X.36 | Fludioxonil | 3.3:1 | 20:6 |
| X.36 | Fludioxonil | 33.3:1 | 20:0.6 |
| X.36 | Cyprodinil | 10:1 | 60:6 |
| X.36 | Cyprodinil | 100:1 | 60:0.6 |
| X.36 | Cyprodinil | 3.3:1 | 20:6 |
| X.36 | Cyprodinil | 33.3:1 | 20:0.6 |
| X.36 | Metalaxyl-M | 3:1 | 60:20 |
| X.36 | Metalaxyl-M | 10:1 | 60:6 |
| X.36 | Metalaxyl-M | 1:1 | 20:20 |
| X.36 | Metalaxyl-M | 3.3:1 | 20:6 |
| X.36 | Folpet | 10:1 | 60:6 |
| X.36 | Folpet | 30:1 | 60:2 |

-continued

| Component A (Compound) | Component B | Ratio A:B | Conc. (ppm) (A:B) |
|---|---|---|---|
| X.36 | Folpet | 3.3:1 | 20:6 |
| X.36 | Folpet | 10:1 | 20:2 |
| X.36 | Aminopyrifen | 10:1 | 60:6 |
| X.36 | Aminopyrifen | 100:1 | 60:0.6 |
| X.36 | Aminopyrifen | 3.3:1 | 20:6 |
| X.36 | Aminopyrifen | 33.3:1 | 20:0.6 |
| X.36 | N-(1-benzyl-1,3-dimethyl-butyl)-8-fluoro-quinoline-3-carboxamide | 10:1 | 60:6 |
| X.36 | N-(1-benzyl-1,3-dimethyl-butyl)-8-fluoro-quinoline-3-carboxamide | 100:1 | 60:0.6 |
| X.36 | N-(1-benzyl-1,3-dimethyl-butyl)-8-fluoro-quinoline-3-carboxamide | 3.3:1 | 20:6 |
| X.36 | N-(1-benzyl-1,3-dimethyl-butyl)-8-fluoro-quinoline-3-carboxamide | 33.3:1 | 20:0.6 |
| X.36 | N-(1-benzyl-3,3,3-trifluoro-1-methyl-propyl)-8-fluoro-quinoline-3-carboxamide | 10:1 | 60:6 |
| X.36 | N-(1-benzyl-3,3,3-trifluoro-1-methyl-propyl)-8-fluoro-quinoline-3-carboxamide | 100:1 | 60:0.6 |
| X.36 | N-(1-benzyl-3,3,3-trifluoro-1-methyl-propyl)-8-fluoro-quinoline-3-carboxamide | 3.3:1 | 20:6 |
| X.36 | N-(1-benzyl-3,3,3-trifluoro-1-methyl-propyl)-8-fluoro-quinoline-3-carboxamide | 33.3:1 | 20:0.6 |
| X.36 | 1-(6,7-dimethylpyrazolo[1,5-a]pyridin-3-yl)-4,4,5-trifluoro-3,3-dimethyl-isoquinoline | 10:1 | 60:6 |
| X.36 | 1-(6,7-dimethylpyrazolo[1,5-a]pyridin-3-yl)-4,4,5-trifluoro-3,3-dimethyl-isoquinoline | 100:1 | 60:0.6 |
| K.36 | 1-(6,7-dimethylpyrazolo[1,5-a]pyridin-3-yl)-4,4,5-trifluoro-3,3-dimethyl-isoquinoline | 3.3:1 | 20:6 |
| X.36 | 1-(6,7-dimethylpyrazolo[1,5-a]pyridin-3-yl)-4,4,5-trifluoro-3,3-dimethyl-isoquinoline | 33.3:1 | 20:0.6 |
| X.36 | 4,4-difluoro-3,3-dimethyl-1-(7-methylpyrazolo[1,5-a]pyridin-3-yl) isoquinoline | 10:1 | 60:6 |
| X.36 | 4,4-difluoro-3,3-dimethyl-1-(7-methylpyrazolo[1,5-a]pyridin-3-yl) isoquinoline | 100:1 | 60:0.6 |
| X.36 | 4,4-difluoro-3,3-dimethyl-1-(7-methylpyrazolo[1,5-a]pyridin-3-yl) isoquinoline | 3.3:1 | 20:6 |
| X.36 | 4,4-difluoro-3,3-dimethyl-1-(7-methylpyrazolo[1,5-a]pyridin-3-yl)isoquinoline | 33.3:1 | 20:0.6 |
| X.36 | 1-(4,5-dimethylbenzimidazol-1-yl)-4,4,5-trifluoro-3,3-dimethyl-isoquinoline | 10:1 | 60:6 |
| X.36 | 1-(4,5-dimethylbenzimidazol-1-yl)-4,4,5-trifluoro-3,3-dimethyl-isoquinoline | 100:1 | 60:0.6 |
| X.36 | 1-(4,5-dimethylbenzimidazol-1-yl)-4,4,5-trifluoro-3,3-dimethyl-isoquinoline | 3.3:1 | 20:6 |
| X.36 | 1-(4,5-dimethylbenzimidazol-1-yl)-4,4,5-trifluoro-3,3-dimethyl-isoquinoline | 33.3:1 | 20:0.6 |
| X.36 | 1-(4,5-dimethylbenzimidazol-1-yl)-4,4-difluoro-3,3-dimethyl-soquinoline | 10:1 | 60:6 |
| X.36 | 1-(4,5-dimethylbenzimidazol-1-yl)-4,4-difluoro-3,3-dimethyl-isoquinoline | 100:1 | 60:0.6 |
| X.36 | 1-(4,5-dimethylbenzimidazol-1-yl)-4,4-difluoro-3,3-dimethyl-isoquinoline | 3.3:1 | 20:6 |
| X.36 | 1-(4,5-dimethylbenzimidazol-1-yl)-4,4-difluoro-3,3-dimethyl-isoquinoline | 33.3:1 | 20:0.6 |
| X.36 | Isopyrazam | 10:1 | 60:6 |

-continued

| Component A (Compound) | Component B | Ratio A:B | Conc. (ppm) (A:B) |
|---|---|---|---|
| X.36 | Isopyrazam | 100:1 | 60:0.6 |
| X.36 | Isopyrazam | 3.3:1 | 20:6 |
| X.36 | Isopyrazam | 33.3:1 | 20:0.6 |
| X.36 | Sedaxane | 10:1 | 60:6 |
| X.36 | Sedaxane | 100:1 | 60:0.6 |
| X.36 | Sedaxane | 3.3:1 | 20:6 |
| X.36 | Sedaxane | 33.3:1 | 20:0.6 |
| X.36 | Isofetamid | 10:1 | 60:6 |
| X.36 | Isofetamid | 100:1 | 60:0.6 |
| X.36 | Isofetamid | 3.3:1 | 20:6 |
| X.36 | Isofetamid | 33.3:1 | 20:0.6 |
| X.36 | Ipflufenoquin | 10:1 | 60:6 |
| X.36 | Ipflufenoquin | 100:1 | 60:0.6 |
| X.36 | Ipflufenoquin | 3.3:1 | 20:6 |
| X.36 | Ipflufenoquin | 33.3:1 | 20:0.6 |
| X.36 | Quinofumelin | 10:1 | 60:6 |
| X.36 | Quinofumelin | 100:1 | 60:0.6 |
| X.36 | Quinofumelin | 3.3:1 | 20:6 |
| X.36 | Quinofumelin | 33.3:1 | 20:0.6 |
| X.36 | Tricyclazole | 3:1 | 60:20 |
| X.36 | Tricyclazole | 10:1 | 60:6 |
| X.36 | Tricyclazole | 1:1 | 20:20 |
| X.36 | Tricyclazole | 3.3:1 | 20:6 |
| X.36 | Pyroquilon | 3:1 | 60:20 |
| X.36 | Pyroquilon | 10:1 | 60:6 |
| X.36 | Pyroquilon | 1:1 | 20:20 |
| X.36 | Pyroquilon | 3.3:1 | 20:6 |
| X.38 | Azoxystrobin | 10:1 | 60:6 |
| X.38 | Azoxystrobin | 100:1 | 60:0.6 |
| X.38 | Azoxystrobin | 3.3:1 | 20:6 |
| X.38 | Azoxystrobin | 33.3:1 | 20:0.6 |
| X.38 | Trifloxystrobin | 10:1 | 60:6 |
| X.38 | Trifloxystrobin | 100:1 | 60:0.6 |
| X.38 | Trifloxystrobin | 3.3:1 | 20:6 |
| X.38 | Trifloxystrobin | 33.3:1 | 20:0.6 |
| X.38 | Metyltetraprole | 10:1 | 60:6 |
| X.38 | Metyltetraprole | 100:1 | 60:0.6 |
| X.38 | Metyltetraprole | 3.3:1 | 20:6 |
| X.38 | Metyltetraprole | 33.3:1 | 20:0.6 |
| X.38 | Difenoconazole | 10:1 | 60:6 |
| X.38 | Difenoconazole | 100:1 | 60:0.6 |
| X.38 | Difenoconazole | 3.3:1 | 20:6 |
| X.38 | Difenoconazole | 33.3:1 | 20:0.6 |
| X.38 | Propiconazole | 10:1 | 60:6 |
| X.38 | Propiconazole | 100:1 | 60:0.6 |
| X.38 | Propiconazole | 3.3:1 | 20:6 |
| X.38 | Prothioconazole | 10:1 | 60:6 |
| X.38 | Prothioconazole | 100:1 | 60:0.6 |
| X.38 | Prothioconazole | 3.3:1 | 20:6 |
| X.38 | Prothioconazole | 33.3:1 | 20:0.6 |
| X.38 | Mefentrifluconazole | 10:1 | 60:6 |
| X.38 | Mefentrifluconazole | 100:1 | 60:0.6 |
| X.38 | Mefentrifluconazole | 3.3:1 | 20:6 |
| X.38 | Fenpropidin | 3:1 | 60:20 |
| X.38 | Fenpropidin | 10:1 | 60:6 |
| X.38 | Fenpropidin | 1:1 | 20:20 |
| X.38 | Fenpropidin | 3.3:1 | 20:6 |
| X.38 | Fenpropimorph | 3:1 | 60:20 |
| X.38 | Fenpropimorph | 10:1 | 60:6 |
| X.38 | Fenpropimorph | 1:1 | 20:20 |
| X.38 | Fenpropimorph | 3.3:1 | 20:6 |
| X.38 | Fluxapyroxad | 10:1 | 60:6 |
| X.38 | Fluxapyroxad | 100:1 | 60:0.6 |
| X.38 | Fluxapyroxad | 3.3:1 | 20:6 |
| X.38 | Fluxapyroxad | 33.3:1 | 20:0.6 |
| X.38 | Fluopyram | 10:1 | 60:6 |
| X.38 | Fluopyram | 100:1 | 60:0.6 |
| X.38 | Fluopyram | 3.3:1 | 20:6 |
| X.38 | Fluopyram | 33.3:1 | 20:0.6 |
| X.38 | Benzovindiflupyr | 10:1 | 60:6 |
| X.38 | Benzovindiflupyr | 100:1 | 60:0.6 |
| X.38 | Benzovindiflupyr | 3.3:1 | 20:6 |
| X.38 | Benzovindiflupyr | 33.3:1 | 20:0.6 |
| X.38 | Pydiflumetofen | 10:1 | 60:6 |
| X.38 | Pydiflumetofen | 100:1 | 60:0.6 |

-continued

| Component A (Compound) | Component B | Ratio A:B | Conc. (ppm) (A:B) |
|---|---|---|---|
| X.38 | Pydiflumetofen | 3.3:1 | 20:6 |
| X.38 | Pydiflumetofen | 33.3:1 | 20:0.6 |
| X.38 | Isoflucypram | 10:1 | 60:6 |
| X.38 | Isoflucypram | 100:1 | 60:0.6 |
| X.38 | Isoflucypram | 3.3:1 | 20:6 |
| X.38 | Isoflucypram | 33.3:1 | 20:0.6 |
| X.38 | Fluindapyr | 10:1 | 60:6 |
| X.38 | Fluindapyr | 100:1 | 60:0.6 |
| X.38 | Fluindapyr | 3.3:1 | 20:6 |
| X.38 | Florylpicoxamid | 10:1 | 60:6 |
| X.38 | Florylpicoxamid | 100:1 | 60:0.6 |
| X.38 | Florylpicoxamid | 3.3:1 | 20:6 |
| X.38 | Florylpicoxamid | 33.3:1 | 20:0.6 |
| X.38 | Metarylpicoxamid | 10:1 | 60:6 |
| X.38 | Metarylpicoxamid | 100:1 | 60:0.6 |
| X.38 | Metarylpicoxamid | 3.3:1 | 20:6 |
| X.38 | Chlorothalonil | 10:1 | 60:6 |
| X.38 | Chlorothalonil | 100:1 | 60:0.6 |
| X.38 | Chlorothalonil | 3.3:1 | 20:6 |
| X.38 | Chlorothalonil | 33.3:1 | 20:0.6 |
| X.38 | Mancozeb | 3:1 | 60:20 |
| X.38 | Mancozeb | 10:1 | 60:6 |
| X.38 | Mandipropamid | 3:1 | 60:20 |
| X.38 | Mandipropamid | 10:1 | 60:6 |
| X.38 | Oxathiapiprolin | 3:1 | 60:20 |
| X.38 | Oxathiapiprolin | 10:1 | 60:6 |
| X.38 | Fluazinam | 10:1 | 60:6 |
| X.38 | Fluazinam | 100:1 | 60:0.6 |
| X.38 | Fluazinam | 3.3:1 | 20:6 |
| X.38 | Fluazinam | 33.3:1 | 20:0.6 |
| X.38 | Fludioxonil | 10:1 | 60:6 |
| X.38 | Fludioxonil | 100:1 | 60:0.6 |
| X.38 | Fludioxonil | 3.3:1 | 20:6 |
| X.38 | Fludioxonil | 33.3:1 | 20:0.6 |
| X.38 | Cyprodinil | 10:1 | 60:6 |
| X.38 | Cyprodinil | 100:1 | 60:0.6 |
| X.38 | Cyprodinil | 3.3:1 | 20:6 |
| X.38 | Cyprodinil | 33.3:1 | 20:0.6 |
| X.38 | Metalaxyl-M | 3:1 | 60:20 |
| X.38 | Metalaxyl-M | 10:1 | 60:6 |
| X.38 | Folpet | 10:1 | 60:6 |
| X.38 | Folpet | 30:1 | 60:2 |
| X.38 | Folpet | 3.3:1 | 20:6 |
| X.38 | Folpet | 10:1 | 20:2 |
| X.38 | Aminopyrifen | 10:1 | 60:6 |
| X.38 | N-(1-benzyl-1,3-dimethyl-butyl)-8-fluoro-quinoline-3-carboxamide | 10:1 | 60:6 |
| X.38 | N-(1-benzyl-1,3-dimethyl-butyl)-8-fluoro-quinoline-3-carboxamide | 100:1 | 60:0.6 |
| X.38 | N-(1-benzyl-1,3-dimethyl-butyl)-8-fluoro-quinoline-3-carboxamide | 3.3:1 | 20:6 |
| X.38 | N-(1-benzyl-1,3-dimethyl-butyl)-8-fluoro-quinoline-3-carboxamide | 33.3:1 | 20:0.6 |
| X.38 | N-(1-benzyl-3,3,3-trifluoro-1-methyl-propyl)-8-fluoro-quinoline-3-carboxamide | 10:1 | 60:6 |
| X.38 | N-(1-benzyl-3,3,3-trifluoro-1-methyl-propyl)-8-fluoro-quinoline-3-carboxamide | 100:1 | 60:0.6 |
| X.38 | N-(1-benzyl-3,3,3-trifluoro-1-methyl-propyl)-8-fluoro-quinoline-3-carboxamide | 3.3:1 | 20:6 |
| X.38 | N-(1-benzyl-3,3,3-trifluoro-1-methyl-propyl)-8-fluoro-quinoline-3-carboxamide | 33.3:1 | 20:0.6 |
| X.38 | 1-(6,7-dimethylpyrazolo[1,5-a]pyridin-3-yl)-4,4,5-trifluoro-3,3-dimethyl-isoquinoline | 10:1 | 60:6 |
| X.38 | 1-(6,7-dimethylpyrazolo[1,5-a]pyridin-3-yl)-4,4,5-trifluoro-3,3-dimethyl-isoquinoline | 100:1 | 60:0.6 |
| X.38 | 1-(6,7-dimethylpyrazolo[1,5-a]pyridin-3-yl)-4,4,5-trifluoro-3,3-dimethyl-isoquinoline | 3.3:1 | 20:6 |

-continued

| Component A (Compound) | Component B | Ratio A:B | Conc. (ppm) (A:B) |
|---|---|---|---|
| X.38 | 1-(6,7-dimethylpyrazolo[1,5-a]pyridin-3-yl)-4,4,5-trifluoro-3,3-dimethyl-isoquinoline | 33.3:1 | 20:0.6 |
| X.38 | 4,4-difluoro-3,3-dimethyl-1-(7-methylpyrazolo[1,5-a]pyridin-3-yl) isoquinoline | 10:1 | 60:6 |
| X.38 | 4,4-difluoro-3,3-dimethyl-1-(7-methylpyrazolo[1,5-a]pyridin-3-yl) isoquinoline | 100:1 | 60:0.6 |
| X.38 | 4,4-difluoro-3,3-dimethyl-1-(7-methylpyrazolo[1,5-a]pyridin-3-yl) isoquinoline | 3.3:1 | 20:6 |
| X.38 | 4,4-difluoro-3,3-dimethyl-1-(7-methylpyrazolo[1,5-a]pyridin-3-yl) isoquinoline | 33.3:1 | 20:0.6 |
| X.38 | 1-(4,5-dimethylbenzimidazol-1-yl)-4,4,5-trifluoro-3,3-dimethyl-isoquinoline | 10:1 | 60:6 |
| X.38 | 1-(4,5-dimethylbenzimidazol-1-yl)-4,4,5-trifluoro-3,3-dimethyl-isoquinoline | 100:1 | 60:0.6 |
| X.38 | 1-(4,5-dimethylbenzimidazol-1-yl)-4,4,5-trifluoro-3,3-dimethyl-isoquinoline | 3.3:1 | 20:6 |
| X.38 | 1-(4,5-dimethylbenzimidazol-1-yl)-4,4,5-trifluoro-3,3-dimethyl-isoquinoline | 33.3:1 | 20:0.6 |
| X.38 | 1-(4,5-dimethylbenzimidazol-1-yl)-4,4-difluoro-3,3-dimethyl-isoquinoline | 10:1 | 60:6 |
| X.38 | 1-(4,5-dimethylbenzimidazol-1-yl)-4,4-difluoro-3,3-dimethyl-isoquinoline | 100:1 | 60:0.6 |
| X.38 | 1-(4,5-dimethylbenzimidazol-1-yl)-4,4-difluoro-3,3-dimethyl-isoquinoline | 3.3:1 | 20:6 |
| X.38 | 1-(4,5-dimethylbenzimidazol-1-yl)-4,4-difluoro-3,3-dimethyl-isoquinoline | 33.3:1 | 20:0.6 |
| X.38 | Isopyrazam | 10:1 | 60:6 |
| X.38 | Isopyrazam | 100:1 | 60:0.6 |
| X.38 | Isopyrazam | 3.3:1 | 20:6 |
| <. 38 | Isopyrazam | 33.3:1 | 20:0.6 |
| X.38 | Sedaxane | 10:1 | 60:6 |
| X.38 | Sedaxane | 100:1 | 60:0.6 |
| X.38 | Sedaxane | 3.3:1 | 20:6 |
| X.38 | Isofetamid | 10:1 | 60:6 |
| X.38 | Isofetamid | 100:1 | 60:0.6 |
| X.38 | Isofetamid | 3.3:1 | 20:6 |
| X.38 | Ipflufenoquin | 10:1 | 60:6 |
| X.38 | Ipflufenoquin | 100:1 | 60:0.6 |
| X.38 | Ipflufenoquin | 3.3:1 | 20:6 |
| X.38 | Ipflufenoquin | 33.3:1 | 20:0.6 |
| X.38 | Quinofumelin | 10:1 | 60:6 |
| X.38 | Quinofumelin | 100:1 | 60:0.6 |
| X.38 | Quinofumelin | 3.3:1 | 20:6 |
| X.38 | Quinofumelin | 33.3:1 | 20:0.6 |
| X.38 | Tricyclazole | 3:1 | 60:20 |
| X.38 | Tricyclazole | 10:1 | 60:6 |
| X.38 | Pyroquilon | 3:1 | 60:20 |
| X.38 | Pyroquilon | 10:1 | 60:6 |

Example B9: Activity Against *Alternaria solani*(Early Blight of Tomato/Potato)

Conidia of the fungus from cryogenic storage were directly mixed into nutrient broth (PDB potato dextrose broth). A DMSO solution of the test compounds was placed into a microtiter plate (96-well format) and the nutrient broth containing the fungal spores was added to it. The test plates were incubated at 24° C. and the inhibition of growth was determined photometrically after 48 hrs. The following mixture compositions (A:B) at the reported concentration (in ppm) gave at least 70% disease control in this test.

| Component A (Compound) | Component B | Ratio A:B | Conc. (ppm) (A:B) |
|---|---|---|---|
| X.29 | Azoxystrobin | 10:1 | 20:2 |
| X.29 | Azoxystrobin | 100:1 | 20:0.2 |
| X.29 | Azoxystrobin | 1:1 | 2:2 |
| X.29 | Azoxystrobin | 10:1 | 2:0.2 |
| X.29 | Trifloxystrobin | 10:1 | 20:2 |
| X.29 | Trifloxystrobin | 100:1 | 20:0.2 |
| X.29 | Trifloxystrobin | 1:1 | 2:2 |
| X.29 | Trifloxystrobin | 10:1 | 2:0.2 |
| X.29 | Metyltetraprole | 10:1 | 20:2 |
| X.29 | Metyltetraprole | 100:1 | 20:0.2 |
| X.29 | Metyltetraprole | 1:1 | 2:2 |
| X.29 | Metyltetraprole | 10:1 | 2:0.2 |
| X.29 | Difenoconazole | 3.3:1 | 20:6 |
| X.29 | Difenoconazole | 33.3:1 | 20:0.6 |
| X.29 | Difenoconazole | 1:3 | 2:6 |
| X.29 | Hexaconazole | 3.3:1 | 20:6 |
| X.29 | Hexaconazole | 33.3:1 | 20:0.6 |
| X.29 | Hexaconazole | 1:3 | 2:6 |
| X.29 | Propiconazole | 3.3:1 | 20:6 |
| X.29 | Propiconazole | 33.3:1 | 20:0.6 |
| X.29 | Prothioconazole | 3.3:1 | 20:6 |
| X.29 | Prothioconazole | 33.3:1 | 20:0.6 |
| X.29 | Prothioconazole | 1:3 | 2:6 |
| X.29 | Mefentrifluconazole | 3.3:1 | 20:6 |
| X.29 | Mefentrifluconazole | 33.3:1 | 20:0.6 |
| X.29 | Mefentrifluconazole | 1:3 | 2:6 |
| X.29 | Fenpropidin | 1:1 | 20:20 |
| X.29 | Fenpropidin | 10:1 | 20:2 |
| X.29 | Fenpropimorph | 1:1 | 20:20 |
| X.29 | Fenpropimorph | 10:1 | 20:2 |
| X.29 | Fenpropimorph | 1:10 | 2:20 |
| X.29 | Fluxapyroxad | 10:1 | 20:2 |
| X.29 | Fluxapyroxad | 100:1 | 20:0.2 |
| X.29 | Fluopyram | 10:1 | 20:2 |
| X.29 | Fluopyram | 100:1 | 20:0.2 |
| X.29 | Fluopyram | 1:1 | 2:2 |
| X.29 | Fluopyram | 10:1 | 2:0.2 |
| X.29 | Isopyrazam | 10:1 | 20:2 |
| X.29 | Isopyrazam | 100:1 | 20:0.2 |
| X.29 | Isopyrazam | 1:1 | 2:2 |
| X.29 | Isopyrazam | 10:1 | 2:0.2 |
| X.29 | Sedaxane | 10:1 | 20:2 |
| X.29 | Sedaxane | 100:1 | 20:0.2 |
| X.29 | Sedaxane | 1:1 | 2:2 |
| X.29 | Benzovindiflupyr | 10:1 | 20:2 |
| X.29 | Benzovindiflupyr | 100:1 | 20:0.2 |
| X.29 | Benzovindiflupyr | 1:1 | 2:2 |
| X.29 | Benzovindiflupyr | 10:1 | 2:0.2 |
| X.29 | Pydiflumetofen | 10:1 | 20:2 |
| X.29 | Pydiflumetofen | 100:1 | 20:0.2 |
| X.29 | Pydiflumetofen | 1:1 | 2:2 |
| X.29 | Pydiflumetofen | 10:1 | 2:0.2 |
| X.29 | Isoflucypram | 10:1 | 20:2 |
| X.29 | Isoflucypram | 100:1 | 20:0.2 |
| X.29 | Isoflucypram | 1:1 | 2:2 |
| X.29 | Isoflucypram | 10:1 | 2:0.2 |
| X.29 | Isofetamid | 10:1 | 20:2 |
| X.29 | Isofetamid | 100:1 | 20:0.2 |
| X.29 | Isofetamid | 1:1 | 2:2 |
| X.29 | Pyrapropoyne | 10:1 | 20:2 |
| X.29 | Pyrapropoyne | 100:1 | 20:0.2 |
| X.29 | Pyrapropoyne | 1:1 | 2:2 |
| X.29 | Pyrapropoyne | 10:1 | 2:0.2 |
| X.29 | Fluindapyr | 10:1 | 20:2 |
| X.29 | Fluindapyr | 100:1 | 20:0.2 |
| X.29 | Fluindapyr | 1:1 | 2:2 |
| X.29 | Fenpicoxamid | 3.3:1 | 20:6 |
| X.29 | Fenpicoxamid | 33.3:1 | 20:0.6 |
| X.29 | Fenpicoxamid | 1:3 | 2:6 |
| X.29 | Florylpicoxamid | 10:1 | 20:2 |
| X.29 | Florylpicoxamid | 100:1 | 20:0.2 |
| X.29 | Florylpicoxamid | 1:1 | 2:2 |
| X.29 | Chlorothalonil | 3.3:1 | 20:6 |

-continued

| Component A (Compound) | Component B | Ratio A:B | Conc. (ppm) (A:B) |
|---|---|---|---|
| X.29 | Chlorothalonil | 33.3:1 | 20:0.6 |
| X.29 | Mancozeb | 1:1 | 20:20 |
| X.29 | Mancozeb | 3.3:1 | 20:6 |
| X.29 | Mandipropamid | 1:1 | 20:20 |
| X.29 | Mandipropamid | 3.3:1 | 20:6 |
| X.29 | Oxathiapiprolin | 1:1 | 20:20 |
| X.29 | Oxathiapiprolin | 3.3:1 | 20:6 |
| X.29 | Fluazinam | 10:1 | 20:2 |
| X.29 | Fluazinam | 100:1 | 20:0.2 |
| X.29 | Fluazinam | 1:1 | 2:2 |
| X.29 | Fludioxonil | 3.3:1 | 20:6 |
| X.29 | Fludioxonil | 33.3:1 | 20:0.6 |
| X.29 | Fludioxonil | 1:3 | 2:6 |
| X.29 | Fludioxonil | 3.3:1 | 2:0.6 |
| X.29 | Cyprodinil | 3.3:1 | 20:6 |
| X.29 | Cyprodinil | 33.3:1 | 20:0.6 |
| X.29 | Cyprodinil | 1:3 | 2:6 |
| X.29 | Cyprodinil | 3.3:1 | 2:0.6 |
| X.29 | Metalaxyl-M | 1:1 | 20:20 |
| X.29 | Metalaxyl-M | 3.3:1 | 20:6 |
| X.29 | Metalaxyl-M | 1:10 | 2:20 |
| X.29 | Metalaxyl-M | 1:3 | 2:6 |
| X.29 | Aminopyrifen | 10:1 | 20:2 |
| X.29 | Aminopyrifen | 100:1 | 20:0.2 |
| X.29 | Folpet | 3.3:1 | 20:6 |
| X.29 | Folpet | 10:1 | 20:2 |
| X.29 | Ipflufenoquin | 10:1 | 20:2 |
| X.29 | Ipflufenoquin | 100:1 | 20:0.2 |
| X.29 | Ipflufenoquin | 1:1 | 2:2 |
| X.29 | Ipflufenoquin | 10:1 | 2:0.2 |
| X.29 | Quinofumelin | 10:1 | 20:2 |
| X.29 | Quinofumelin | 100:1 | 20:0.2 |
| X.29 | Quinofumelin | 1:1 | 2:2 |
| X.29 | Quinofumelin | 10:1 | 2:0.2 |
| X.29 | Tricyclazole | 1:1 | 20:20 |
| X.29 | Tricyclazole | 3:1 | 20:6 |
| X.29 | Pyroquilon | 1:1 | 20:20 |
| X.29 | Pyroquilon | 3:1 | 20:6 |
| X.29 | N-(1-benzyl-1,3-dimethyl-butyl)-8-fluoro-quinoline-3-carboxamide | 10:1 | 20:2 |
| X.29 | N-(1-benzyl-1,3-dimethyl-butyl)-8-fluoro-quinoline-3-carboxamide | 100:1 | 20:0.2 |
| X.29 | N-(1-benzyl-1,3-dimethyl-butyl)-8-fluoro-quinoline-3-carboxamide | 1:1 | 2:2 |
| X.29 | N-(1-benzyl-1,3-dimethyl-butyl)-8-fluoro-quinoline-3-carboxamide | 10:1 | 2:0.2 |
| X.29 | N-(1-benzyl-3,3,3-trifluoro-1-methyl-propyl)-8-fluoro-quinoline-3-carboxamide | 10:1 | 20:2 |
| X.29 | N-(1-benzyl-3,3,3-trifluoro-1-methyl-propyl)-8-fluoro-quinoline-3-carboxamide | 100:1 | 20:0.2 |
| X.29 | N-(1-benzyl-3,3,3-trifluoro-1-methyl-propyl)-8-fluoro-quinoline-3-carboxamide | 1:1 | 2:2 |
| X.29 | N-(1-benzyl-3,3,3-trifluoro-1-methyl-propyl)-8-fluoro-quinoline-3-carboxamide | 10:1 | 2:0.2 |
| X.29 | 1-(6,7-dimethylpyrazolo[1,5-a]pyridin-3-yl)-4,4,5-trifluoro-3,3-dimethyl-isoquinoline | 10:1 | 20:2 |
| X.29 | 1-(6,7-dimethylpyrazolo[1,5-a]pyridin-3-yl)-4,4,5-trifluoro-3,3-dimethyl-isoquinoline | 100:1 | 20:0.2 |
| X.29 | 1-(6,7-dimethylpyrazolo[1,5-a]pyridin-3-yl)-4,4,5-trifluoro-3,3-dimethyl-isoquinoline | 1:1 | 2:2 |
| X.29 | 1-(6,7-dimethylpyrazolo[1,5-a]pyridin-3-yl)-4,4,5-trifluoro-3,3-dimethyl-isoquinoline | 10:1 | 2:0.2 |

-continued

| Component A (Compound) | Component B | Ratio A:B | Conc. (ppm) (A:B) |
|---|---|---|---|
| X.29 | 4,4-difluoro-3,3-dimethyl-1-(7-methylpyrazolo[1,5-a]pyridin-3-yl)isoquinoline | 10:1 | 20:2 |
| X.29 | 4,4-difluoro-3,3-dimethyl-1-(7-methylpyrazolo[1,5-a]pyridin-3-yl) isoquinoline | 100:1 | 20:0.2 |
| X.29 | 4,4-difluoro-3,3-dimethyl-1-(7-methylpyrazolo[1,5-a]pyridin-3-yl)isoquinoline | 1:1 | 2:2 |
| X.29 | 4,4-difluoro-3,3-dimethyl-1-(7-methylpyrazolo[1,5-a]pyridin-3-yl)isoquinoline | 10:1 | 2:0.2 |
| X.29 | 1-(4,5-dimethylbenzimidazol-1-yl)-4,4,5-trifluoro-3,3-dimethyl-isoquinoline | 10:1 | 20:2 |
| X.29 | 1-(4,5-dimethylbenzimidazol-1-yl)-4,4,5-trifluoro-3,3-dimethyl-isoquinoline | 100:1 | 20:0.2 |
| X.29 | 1-(4,5-dimethylbenzimidazol-1-yl)-4,4,5-trifluoro-3,3-dimethyl-isoquinoline | 1:1 | 2:2 |
| X.29 | 1-(4,5-dimethylbenzimidazol-1-yl)-4,4,5-trifluoro-3,3-dimethyl-isoquinoline | 10:1 | 2:0.2 |
| X.29 | 1-(4,5-dimethylbenzimidazol-1-yl)-4,4-difluoro-3,3-dimethyl-isoquinoline | 10:1 | 20:2 |
| X.29 | 1-(4,5-dimethylbenzimidazol-1-yl)-4,4-difluoro-3,3-dimethyl-isoquinoline | 100:1 | 20:0.2 |
| X.29 | 1-(4,5-dimethylbenzimidazol-1-yl)-4,4-difluoro-3,3-dimethyl-isoquinoline | 1:1 | 2:2 |
| X.29 | 1-(4,5-dimethylbenzimidazol-1-yl)-4,4-difluoro-3,3-dimethyl-isoquinoline | 10:1 | 2:0.2 |
| X.36 | Azoxystrobin | 10:1 | 60:6 |
| X.36 | Azoxystrobin | 100:1 | 60:0.6 |
| X.36 | Azoxystrobin | 3.3:1 | 20:6 |
| X.36 | Azoxystrobin | 33.3:1 | 20:0.6 |
| X.36 | Trifloxystrobin | 10:1 | 60:6 |
| X.36 | Trifloxystrobin | 100:1 | 60:0.6 |
| X.36 | Trifloxystrobin | 3.3:1 | 20:6 |
| X.36 | Trifloxystrobin | 33.3:1 | 20:0.6 |
| X.36 | Metyltetraprole | 10:1 | 60:6 |
| X.36 | Metyltetraprole | 100:1 | 60:0.6 |
| X.36 | Metyltetraprole | 3.3:1 | 20:6 |
| X.36 | Metyltetraprole | 33.3:1 | 20:0.6 |
| X.36 | Difenoconazole | 10:1 | 60:6 |
| X.36 | Difenoconazole | 100:1 | 60:0.6 |
| X.36 | Difenoconazole | 3.3:1 | 20:6 |
| X.36 | Difenoconazole | 33.3:1 | 20:0.6 |
| X.36 | Propiconazole | 10:1 | 60:6 |
| X.36 | Propiconazole | 100:1 | 60:0.6 |
| X.36 | Propiconazole | 3.3:1 | 20:6 |
| X.36 | Prothioconazole | 10:1 | 60:6 |
| X.36 | Prothioconazole | 100:1 | 60:0.6 |
| X.36 | Prothioconazole | 3.3:1 | 20:6 |
| X.36 | Prothioconazole | 33.3:1 | 20:0.6 |
| X.36 | Mefentrifluconazole | 10:1 | 60:6 |
| X.36 | Mefentrifluconazole | 100:1 | 60:0.6 |
| X.36 | Mefentrifluconazole | 3.3:1 | 20:6 |
| X.36 | Mefentrifluconazole | 33.3:1 | 20:0.6 |
| X.36 | Fenpropidin | 3:1 | 60:20 |
| X.36 | Fenpropidin | 10:1 | 60:6 |
| X.36 | Fenpropidin | 1:1 | 20:20 |
| X.36 | Fenpropidin | 3.3:1 | 20:6 |
| X.36 | Fenpropimorph | 3:1 | 60:20 |
| X.36 | Fenpropimorph | 10:1 | 60:6 |
| X.36 | Fenpropimorph | 1:1 | 20:20 |
| X.36 | Fenpropimorph | 3.3:1 | 20:6 |
| X.36 | Fluxapyroxad | 10:1 | 60:6 |
| X.36 | Fluxapyroxad | 100:1 | 60:0.6 |
| X.36 | Fluxapyroxad | 3.3:1 | 20:6 |
| X.36 | Fluxapyroxad | 33.3:1 | 20:0.6 |

-continued

| Component A (Compound) | Component B | Ratio A:B | Conc. (ppm) (A:B) |
|---|---|---|---|
| X.36 | Fluopyram | 10:1 | 60:6 |
| X.36 | Fluopyram | 100:1 | 60:0.6 |
| X.36 | Fluopyram | 3.3:1 | 20:6 |
| X.36 | Fluopyram | 33.3:1 | 20:0.6 |
| X.36 | Benzovindiflupyr | 10:1 | 60:6 |
| X.36 | Benzovindiflupyr | 100:1 | 60:0.6 |
| X.36 | Benzovindiflupyr | 3.3:1 | 20:6 |
| X.36 | Benzovindiflupyr | 33.3:1 | 20:0.6 |
| X.36 | Pydiflumetofen | 10:1 | 60:6 |
| X.36 | Pydiflumetofen | 100:1 | 60:0.6 |
| X.36 | Pydiflumetofen | 3.3:1 | 20:6 |
| X.36 | Pydiflumetofen | 33.3:1 | 20:0.6 |
| X.36 | Isoflucypram | 10:1 | 60:6 |
| X.36 | Isoflucypram | 100:1 | 60:0.6 |
| X.36 | Isoflucypram | 3.3:1 | 20:6 |
| X.36 | Isoflucypram | 33.3:1 | 20:0.6 |
| X.36 | Fluindapyr | 10:1 | 60:6 |
| X.36 | Fluindapyr | 100:1 | 60:0.6 |
| X.36 | Fluindapyr | 3.3:1 | 20:6 |
| X.36 | Fluindapyr | 33.3:1 | 20:0.6 |
| X.36 | Florylpicoxamid | 10:1 | 60:6 |
| X.36 | Florylpicoxamid | 100:1 | 60:0.6 |
| X.36 | Florylpicoxamid | 3.3:1 | 20:6 |
| X.36 | Florylpicoxamid | 33.3:1 | 20:0.6 |
| X.36 | Metarylpicoxamid | 10:1 | 60:6 |
| X.36 | Metarylpicoxamid | 100:1 | 60:0.6 |
| X.36 | Metarylpicoxamid | 3.3:1 | 20:6 |
| X.36 | Chlorothalonil | 10:1 | 60:6 |
| X.36 | Chlorothalonil | 100:1 | 60:0.6 |
| X.36 | Chlorothalonil | 3.3:1 | 20:6 |
| X.36 | Chlorothalonil | 33.3:1 | 20:0.6 |
| X.36 | Mancozeb | 3:1 | 60:20 |
| X.36 | Mancozeb | 10:1 | 60:6 |
| X.36 | Mandipropamid | 3:1 | 60:20 |
| X.36 | Mandipropamid | 10:1 | 60:6 |
| X.36 | Oxathiapiprolin | 3:1 | 60:20 |
| X.36 | Oxathiapiprolin | 10:1 | 60:6 |
| X.36 | Fluazinam | 10:1 | 60:6 |
| X.36 | Fluazinam | 100:1 | 60:0.6 |
| X.36 | Fluazinam | 3.3:1 | 20:6 |
| X.36 | Fluazinam | 33.3:1 | 20:0.6 |
| X.36 | Fludioxonil | 10:1 | 60:6 |
| X.36 | Fludioxonil | 100:1 | 60:0.6 |
| X.36 | Fludioxonil | 3.3:1 | 20:6 |
| X.36 | Fludioxonil | 33.3:1 | 20:0.6 |
| X.36 | Cyprodinil | 10:1 | 60:6 |
| X.36 | Cyprodinil | 100:1 | 60:0.6 |
| X.36 | Cyprodinil | 3.3:1 | 20:6 |
| X.36 | Cyprodinil | 33.3:1 | 20:0.6 |
| X.36 | Metalaxyl-M | 3:1 | 60:20 |
| X.36 | Metalaxyl-M | 10:1 | 60:6 |
| X.36 | Folpet | 10:1 | 60:6 |
| X.36 | Folpet | 30:1 | 60:2 |
| X.36 | Folpet | 3.3:1 | 20:6 |
| X.36 | Folpet | 10:1 | 20:2 |
| X.36 | Aminopyrifen | 10:1 | 60:6 |
| X.36 | Aminopyrifen | 100:1 | 60:0.6 |
| X.36 | N-(1-benzyl-1,3-dimethyl-butyl)-8-fluoro-quinoline-3-carboxamide | 10:1 | 60:6 |
| X.36 | N-(1-benzyl-1,3-dimethyl-butyl)-8-fluoro-quinoline-3-carboxamide | 100:1 | 60:0.6 |
| X.36 | N-(1-benzyl-1,3-dimethyl-butyl)-8-fluoro-quinoline-3-carboxamide | 3.3:1 | 20:6 |
| X.36 | N-(1-benzyl-1,3-dimethyl-butyl)-8-fluoro-quinoline-3-carboxamide | 33.3:1 | 20:0.6 |
| X.36 | N-(1-benzyl-3,3,3-trifluoro-1-methyl-propyl)-8-fluoro-quinoline-3-carboxamide | 10:1 | 60:6 |
| X.36 | N-(1-benzyl-3,3,3-trifluoro-1-methyl-propyl)-8-fluoro-quinoline-3-carboxamide | 100:1 | 60:0.6 |

-continued

| Component A (Compound) | Component B | Ratio A:B | Conc. (ppm) (A:B) |
|---|---|---|---|
| X.36 | N-(1-benzyl-3,3,3-trifluoro-1-methyl-propyl)-8-fluoro-quinoline-3-carboxamide | 3.3:1 | 20:6 |
| X.36 | N-(1-benzyl-3,3,3-trifluoro-1-methyl-propyl)-8-fluoro-quinoline-3-carboxamide | 33.3:1 | 20:0.6 |
| X.36 | 1-(6,7-dimethylpyrazolo[1,5-a]pyridin-3-yl)-4,4,5-trifluoro-3,3-dimethyl-isoquinoline | 10:1 | 60:6 |
| X.36 | 1-(6,7-dimethylpyrazolo[1,5-a]pyridin-3-yl)-4,4,5-trifluoro-3,3-dimethyl-isoquinoline | 100:1 | 60:0.6 |
| X.36 | 1-(6,7-dimethylpyrazolo[1,5-a]pyridin-3-yl)-4,4,5-trifluoro-3,3-dimethyl-isoquinoline | 3.3:1 | 20:6 |
| X.36 | 1-(6,7-dimethylpyrazolo[1,5-a]pyridin-3-yl)-4,4,5-trifluoro-3,3-dimethyl-isoquinoline | 33.3:1 | 20:0.6 |
| X.36 | 4,4-difluoro-3,3-dimethyl-1-(7-methylpyrazolo[1,5-a]pyridin-3-yl)isoquinoline | 10:1 | 60:6 |
| X.36 | 4,4-difluoro-3,3-dimethyl-1-(7-methylpyrazolo[1,5-a]pyridin-3-yl)isoquinoline | 100:1 | 60:0.6 |
| X.36 | 4,4-difluoro-3,3-dimethyl-1-(7-methylpyrazolo[1,5-a]pyridin-3-ylisoquinoline | 3.3:1 | 20:6 |
| X.36 | 4,4-difluoro-3,3-dimethyl-1-(7-methylpyrazolo[1,5-a]pyridin-3-ylisoquinoline | 33.3:1 | 20:0.6 |
| X.36 | 1-(4,5-dimethylbenzimidazol-1-yl)-4,4,5-trifluoro-3,3-dimethyl-isoquinoline | 10:1 | 60:6 |
| X.36 | 1-(4,5-dimethylbenzimidazol-1-yl)-4,4,5-trifluoro-3,3-dimethyl-isoquinoline | 100:1 | 60:0.6 |
| X.36 | 1-(4,5-dimethylbenzimidazol-1-yl)-4,4,5-trifluoro-3,3-dimethyl-isoquinoline | 3.3:1 | 20:6 |
| X.36 | 1-(4,5-dimethylbenzimidazol-1-yl)-4,4,5-trifluoro-3,3-dimethyl-isoquinoline | 33.3:1 | 20:0.6 |
| X.36 | 1-(4,5-dimethylbenzimidazol-1-yl)-4,4-difluoro-3,3-dimethyl-isoquinoline | 10:1 | 60:6 |
| X.36 | 1-(4,5-dimethylbenzimidazol-1-yl)-4,4-difluoro-3,3-dimethyl-isoquinoline | 100:1 | 60:0.6 |
| X.36 | 1-(4,5-dimethylbenzimidazol-1-yl)-4,4-difluoro-3,3-dimethyl-isoquinoline | 3.3:1 | 20:6 |
| X.36 | 1-(4,5-dimethylbenzimidazol-1-yl)-4,4-difluoro-3,3-dimethyl-isoquinoline | 33.3:1 | 20:0.6 |
| X.36 | Isopyrazam | 10:1 | 60:6 |
| X.36 | Isopyrazam | 100:1 | 60:0.6 |
| X.36 | Isopyrazam | 3.3:1 | 20:6 |
| X.36 | Isopyrazam | 33.3:1 | 20:0.6 |
| X.36 | Sedaxane | 10:1 | 60:6 |
| X.36 | Sedaxane | 100:1 | 60:0.6 |
| X.36 | Sedaxane | 3.3:1 | 20:6 |
| X.36 | Isofetamid | 10:1 | 60:6 |
| X.36 | Isofetamid | 100:1 | 60:0.6 |
| X.36 | Isofetamid | 3.3:1 | 20:6 |
| X.36 | Isofetamid | 33.3:1 | 20:0.6 |
| X.36 | Ipflufenoquin | 10:1 | 60:6 |
| X.36 | Ipflufenoquin | 100:1 | 60:0.6 |
| X.36 | Ipflufenoquin | 3.3:1 | 20:6 |
| X.36 | Ipflufenoquin | 33.3:1 | 20:0.6 |
| X.36 | Quinofumelin | 10:1 | 60:6 |
| X.36 | Quinofumelin | 100:1 | 60:0.6 |
| X.36 | Quinofumelin | 3.3:1 | 20:6 |
| X.36 | Quinofumelin | 33.3:1 | 20:0.6 |
| X.36 | Tricyclazole | 3:1 | 60:20 |
| X.36 | Tricyclazole | 10:1 | 60:6 |

-continued

| Component A (Compound) | Component B | Ratio A:B | Conc. (ppm) (A:B) |
|---|---|---|---|
| X.36 | Pyroquilon | 3:1 | 60:20 |
| X.36 | Pyroquilon | 10:1 | 60:6 |

Example B10: *Sclerotinia sclerotiorum*/Liquid Culture (Cottony Rot)

Mycelia fragments of a newly grown liquid culture of the fungus are directly mixed into nutrient broth (Vogel's minimal media) containing 200 μMol SHAM. After placing a (DMSO) solution of test compounds into a microtiter plate (96-well format) the nutrient broth containing the fungal material is added. The test plates are incubated at 24° C. and the inhibition of growth is determined photometrically 3-4 days after application. The following mixture compositions (A:B) at the reported concentration (in ppm) gave at least 80% disease control in this test when compared to the untreated control under the same conditions, which showed extensive disease development.

| Component A (Compound) | Component B | Ratio A:B | Conc. (ppm) (A:B) |
|---|---|---|---|
| X.36 | Azoxystrobin | 10:1 | 60:6 |
| X.36 | Azoxystrobin | 100:1 | 60:0.6 |
| X.36 | Azoxystrobin | 3.3:1 | 20:6 |
| X.36 | Azoxystrobin | 33.3:1 | 20:0.6 |
| X.36 | Trifloxystrobin | 10:1 | 60:6 |
| X.36 | Trifloxystrobin | 100:1 | 60:0.6 |
| X.36 | Trifloxystrobin | 3.3:1 | 20:6 |
| X.36 | Trifloxystrobin | 33.3:1 | 20:0.6 |
| X.36 | Metyltetraprole | 10:1 | 60:6 |
| X.36 | Metyltetraprole | 100:1 | 60:0.6 |
| X.36 | Metyltetraprole | 3.3:1 | 20:6 |
| X.36 | Metyltetraprole | 33.3:1 | 20:0.6 |
| X.36 | Difenoconazole | 10:1 | 60:6 |
| X.36 | Difenoconazole | 100:1 | 60:0.6 |
| X.36 | Difenoconazole | 3.3:1 | 20:6 |
| X.36 | Difenoconazole | 33.3:1 | 20:0.6 |
| X.36 | Hexaconazole | 10:1 | 60:6 |
| X.36 | Hexaconazole | 100:1 | 60:0.6 |
| X.36 | Hexaconazole | 3.3:1 | 20:6 |
| X.36 | Hexaconazole | 33.3:1 | 20:0.6 |
| X.36 | Propiconazole | 10:1 | 60:6 |
| X.36 | Propiconazole | 100:1 | 60:0.6 |
| X.36 | Propiconazole | 3.3:1 | 20:6 |
| X.36 | Propiconazole | 33.3:1 | 20:0.6 |
| X.36 | Prothioconazole | 10:1 | 60:6 |
| X.36 | Prothioconazole | 100:1 | 60:0.6 |
| X.36 | Prothioconazole | 3.3:1 | 20:6 |
| X.36 | Prothioconazole | 33.3:1 | 20:0.6 |
| X.36 | Mefentrifluconazole | 10:1 | 60:6 |
| X.36 | Mefentrifluconazole | 100:1 | 60:0.6 |
| X.36 | Mefentrifluconazole | 3.3:1 | 20:6 |
| X.36 | Mefentrifluconazole | 33.3:1 | 20:0.6 |
| X.36 | Fenpropidin | 3:1 | 60:20 |
| X.36 | Fenpropidin | 10:1 | 60:6 |
| X.36 | Fenpropidin | 1:1 | 20:20 |
| X.36 | Fenpropidin | 3.3:1 | 20:6 |
| X.36 | Fenpropimorph | 3:1 | 60:20 |
| X.36 | Fenpropimorph | 10:1 | 60:6 |
| X.36 | Fenpropimorph | 1:1 | 20:20 |
| X.36 | Fenpropimorph | 3.3:1 | 20:6 |
| X.36 | Fluxapyroxad | 10:1 | 60:6 |
| X.36 | Fluxapyroxad | 100:1 | 60:0.6 |
| X.36 | Fluxapyroxad | 3.3:1 | 20:6 |
| X.36 | Fluxapyroxad | 33.3:1 | 20:0.6 |
| X.36 | Fluopyram | 10:1 | 60:6 |

-continued

| Component A (Compound) | Component B | Ratio A:B | Conc. (ppm) (A:B) |
|---|---|---|---|
| X.36 | Fluopyram | 100:1 | 60:0.6 |
| X.36 | Fluopyram | 3.3:1 | 20:6 |
| X.36 | Fluopyram | 33.3:1 | 20:0.6 |
| X.36 | Benzovindiflupyr | 10:1 | 60:6 |
| X.36 | Benzovindiflupyr | 100:1 | 60:0.6 |
| X.36 | Benzovindiflupyr | 3.3:1 | 20:6 |
| X.36 | Benzovindiflupyr | 33.3:1 | 20:0.6 |
| X.36 | Pydiflumetofen | 10:1 | 60:6 |
| X.36 | Pydiflumetofen | 100:1 | 60:0.6 |
| X.36 | Pydiflumetofen | 3.3:1 | 20:6 |
| X.36 | Pydiflumetofen | 33.3:1 | 20:0.6 |
| X.36 | Isoflucypram | 10:1 | 60:6 |
| X.36 | Isoflucypram | 100:1 | 60:0.6 |
| X.36 | Isoflucypram | 3.3:1 | 20:6 |
| X.36 | Isoflucypram | 33.3:1 | 20:0.6 |
| X.36 | Fluindapyr | 10:1 | 60:6 |
| X.36 | Fluindapyr | 100:1 | 60:0.6 |
| X.36 | Fluindapyr | 3.3:1 | 20:6 |
| X.36 | Fluindapyr | 33.3:1 | 20:0.6 |
| X.36 | Florylpicoxamid | 10:1 | 60:6 |
| X.36 | Florylpicoxamid | 100:1 | 60:0.6 |
| X.36 | Florylpicoxamid | 3.3:1 | 20:6 |
| X.36 | Florylpicoxamid | 33.3:1 | 20:0.6 |
| X.36 | Metarylpicoxamid | 10:1 | 60:6 |
| X.36 | Metarylpicoxamid | 100:1 | 60:0.6 |
| X.36 | Metarylpicoxamid | 3.3:1 | 20:6 |
| X.36 | Metarylpicoxamid | 33.3:1 | 20:0.6 |
| X.36 | Chlorothalonil | 10:1 | 60:6 |
| X.36 | Chlorothalonil | 100:1 | 60:0.6 |
| X.36 | Chlorothalonil | 3.3:1 | 20:6 |
| X.36 | Chlorothalonil | 33.3:1 | 20:0.6 |
| X.36 | Mancozeb | 3:1 | 60:20 |
| X.36 | Mancozeb | 10:1 | 60:6 |
| X.36 | Mancozeb | 1:1 | 20:20 |
| X.36 | Mancozeb | 3.3:1 | 20:6 |
| X.36 | Mandipropamid | 3:1 | 60:20 |
| X.36 | Mandipropamid | 10:1 | 60:6 |
| X.36 | Mandipropamid | 1:1 | 20:20 |
| X.36 | Mandipropamid | 3.3:1 | 20:6 |
| X.36 | Oxathiapiprolin | 3:1 | 60:20 |
| X.36 | Oxathiapiprolin | 10:1 | 60:6 |
| X.36 | Oxathiapiprolin | 1:1 | 20:20 |
| X.36 | Oxathiapiprolin | 3.3:1 | 20:6 |
| X.36 | Fluazinam | 10:1 | 60:6 |
| X.36 | Fluazinam | 100:1 | 60:0.6 |
| X.36 | Fluazinam | 3.3:1 | 20:6 |
| X.36 | Fluazinam | 33.3:1 | 20:0.6 |
| X.36 | Fludioxonil | 10:1 | 60:6 |
| X.36 | Fludioxonil | 100:1 | 60:0.6 |
| X.36 | Fludioxonil | 3.3:1 | 20:6 |
| X.36 | Fludioxonil | 33.3:1 | 20:0.6 |
| X.36 | Cyprodinil | 10:1 | 60:6 |
| X.36 | Cyprodinil | 100:1 | 60:0.6 |
| X.36 | Cyprodinil | 3.3:1 | 20:6 |
| X.36 | Cyprodinil | 33.3:1 | 20:0.6 |
| X.36 | Metalaxyl-M | 3:1 | 60:20 |
| X.36 | Metalaxyl-M | 10:1 | 60:6 |
| X.36 | Metalaxyl-M | 1:1 | 20:20 |
| X.36 | Metalaxyl-M | 3.3:1 | 20:6 |
| X.36 | Folpet | 10:1 | 60:6 |
| X.36 | Folpet | 30:1 | 60:2 |
| X.36 | Folpet | 3.3:1 | 20:6 |
| X.36 | Folpet | 10:1 | 20:2 |
| X.36 | Aminopyrifen | 10:1 | 60:6 |
| X.36 | Aminopyrifen | 100:1 | 60:0.6 |
| X.36 | Aminopyrifen | 3.3:1 | 20:6 |
| X.36 | Aminopyrifen | 33.3:1 | 20:0.6 |
| X.36 | N-(1-benzyl-1,3-dimethyl-butyl)-8-fluoro-quinoline-3-carboxamide | 10:1 | 60:6 |
| X.36 | N-(1-benzyl-1,3-dimethyl-butyl)-8-fluoro-quinoline-3-carboxamide | 100:1 | 60:0.6 |
| X.36 | N-(1-benzyl-1,3-dimethyl-butyl)-8-fluoro-quinoline-3-carboxamide | 3.3:1 | 20:6 |
| X.36 | N-(1-benzyl-1,3-dimethyl-butyl)-8-fluoro-quinoline-3-carboxamide | 33.3:1 | 20:0.6 |

-continued

| Component A (Compound) | Component B | Ratio A:B | Conc. (ppm) (A:B) |
|---|---|---|---|
| X.36 | N-(1-benzyl-3,3,3-trifluoro-1-methyl-propyl)-8-fluoro-quinoline-3-carboxamide | 10:1 | 60:6 |
| X.36 | N-(1-benzyl-3,3,3-trifluoro-1-methyl-propyl)-8-fluoro-quinoline-3-carboxamide | 100:1 | 60:0.6 |
| X.36 | N-(1-benzyl-3,3,3-trifluoro-1-methyl-propyl)-8-fluoro-quinoline-3-carboxamide | 3.3:1 | 20:6 |
| X.36 | N-(1-benzyl-3,3,3-trifluoro-1-methyl-propyl)-8-fluoro-quinoline-3-carboxamide | 33.3:1 | 20:0.6 |
| X.36 | 1-(6,7-dimethylpyrazolo[1,5-a]pyridin-3-yl)-4,4,5-trifluoro-3,3-dimethyl-isoquinoline | 10:1 | 60:6 |
| X.36 | 1-(6,7-dimethylpyrazolo[1,5-a]pyridin-3-yl)-4,4,5-trifluoro-3,3-dimethyl-isoquinoline | 100:1 | 60:0.6 |
| X.36 | 1-(6,7-dimethylpyrazolo[1,5-a]pyridin-3-yl)-4,4,5-trifluoro-3,3-dimethyl-isoquinoline | 3.3:1 | 20:6 |
| X.36 | 1-(6,7-dimethylpyrazolo[1,5-a]pyridin-3-yl)-4,4,5-trifluoro-3,3-dimethyl-isoquinoline | 33.3:1 | 20:0.6 |
| X.36 | 4,4-difluoro-3,3-dimethyl-1-(7-methylpyrazolo[1,5-a]pyridin-3-yl) isoquinoline | 10:1 | 60:6 |
| X.36 | 4,4-difluoro-3,3-dimethyl-1-(7-methylpyrazolo[1,5-a]pyridin-3-yl) isoquinoline | 100:1 | 60:0.6 |
| X.36 | 4,4-difluoro-3,3-dimethyl-1-(7-methylpyrazolo[1,5-a]pyridin-3-yl) isoquinoline | 3.3:1 | 20:6 |
| X.36 | 4,4-difluoro-3,3-dimethyl-1-(7-methylpyrazolo[1,5-a]pyridin-3-yl) isoquinoline | 33.3:1 | 20:0.6 |
| X.36 | 1-(4,5-dimethylbenzimidazol-1-yl)-4,4,5-trifluoro-3,3-dimethyl-isoquinoline | 10:1 | 60:6 |
| X.36 | 1-(4,5-dimethylbenzimidazol-1-yl)-4,4,5-trifluoro-3,3-dimethyl-isoquinoline | 100:1 | 60:0.6 |
| X.36 | 1-(4,5-dimethylbenzimidazol-1-yl)-4,4,5-trifluoro-3,3-dimethyl-isoquinoline | 3.3:1 | 20:6 |
| X.36 | 1-(4,5-dimethylbenzimidazol-1-yl)-4,4,5-trifluoro-3,3-dimethyl-isoquinoline | 33.3:1 | 20:0.6 |
| X.36 | 1-(4,5-dimethylbenzimidazol-1-yl)-4,4-difluoro-3,3-dimethyl-isoquinoline | 10:1 | 60:6 |
| X.36 | 1-(4,5-dimethylbenzimidazol-1-yl)-4,4-difluoro-3,3-dimethyl-isoquinoline | 100:1 | 60:0.6 |
| X.36 | 1-(4,5-dimethylbenzimidazol-1-yl)-4,4-difluoro-3,3-dimethyl-isoquinoline | 3.3:1 | 20:6 |
| X.36 | 1-(4,5-dimethylbenzimidazol-1-yl)-4,4-difluoro-3,3-dimethyl-isoquinoline | 33.3:1 | 20:0.6 |
| X.36 | Isopyrazam | 10:1 | 60:6 |
| X.36 | Isopyrazam | 100:1 | 60:0.6 |
| X.36 | Isopyrazam | 3.3:1 | 20:6 |
| X.36 | Isopyrazam | 33.3:1 | 20:0.6 |
| X.36 | Sedaxane | 10:1 | 60:6 |
| X.36 | Sedaxane | 100:1 | 60:0.6 |
| X.36 | Sedaxane | 3.3:1 | 20:6 |
| X.36 | Sedaxane | 33.3:1 | 20:0.6 |
| X.36 | Isofetamid | 10:1 | 60:6 |
| X.36 | Isofetamid | 100:1 | 60:0.6 |
| X.36 | Isofetamid | 3.3:1 | 20:6 |
| X.36 | Isofetamid | 33.3:1 | 20:0.6 |
| X.36 | Ipflufenoquin | 10:1 | 60:6 |
| X.36 | Ipflufenoquin | 100:1 | 60:0.6 |
| X.36 | Ipflufenoquin | 3.3:1 | 20:6 |

-continued

| Component A (Compound) | Component B | Ratio A:B | Conc. (ppm) (A:B) |
|---|---|---|---|
| X.36 | Ipflufenoquin | 33.3:1 | 20:0.6 |
| X.36 | Quinofumelin | 10:1 | 60:6 |
| X.36 | Quinofumelin | 100:1 | 60:0.6 |
| X.36 | Quinofumelin | 3.3:1 | 20:6 |
| X.36 | Quinofumelin | 33.3:1 | 20:0.6 |
| X.38 | Azoxystrobin | 10:1 | 60:6 |
| X.38 | Azoxystrobin | 100:1 | 60:0.6 |
| X.38 | Azoxystrobin | 3.3:1 | 20:6 |
| X.38 | Azoxystrobin | 33.3:1 | 20:0.6 |
| X.38 | Trifloxystrobin | 10:1 | 60:6 |
| X.38 | Trifloxystrobin | 100:1 | 60:0.6 |
| X.38 | Trifloxystrobin | 3.3:1 | 20:6 |
| X.38 | Trifloxystrobin | 33.3:1 | 20:0.6 |
| X.38 | Metyltetraprole | 10:1 | 60:6 |
| X.38 | Metyltetraprole | 100:1 | 60:0.6 |
| X.38 | Metyltetraprole | 3.3:1 | 20:6 |
| X.38 | Metyltetraprole | 33.3:1 | 20:0.6 |
| X.38 | Difenoconazole | 10:1 | 60:6 |
| X.38 | Difenoconazole | 100:1 | 60:0.6 |
| X.38 | Difenoconazole | 3.3:1 | 20:6 |
| X.38 | Difenoconazole | 33.3:1 | 20:0.6 |
| X.38 | Hexaconazole | 10:1 | 60:6 |
| X.38 | Hexaconazole | 100:1 | 60:0.6 |
| X.38 | Hexaconazole | 3.3:1 | 20:6 |
| X.38 | Hexaconazole | 33.3:1 | 20:0.6 |
| X.38 | Propiconazole | 10:1 | 60:6 |
| X.38 | Propiconazole | 100:1 | 60:0.6 |
| X.38 | Propiconazole | 3.3:1 | 20:6 |
| X.38 | Propiconazole | 33.3:1 | 20:0.6 |
| X.38 | Prothioconazole | 10:1 | 60:6 |
| X.38 | Prothioconazole | 100:1 | 60:0.6 |
| X.38 | Prothioconazole | 3.3:1 | 20:6 |
| X.38 | Prothioconazole | 33.3:1 | 20:0.6 |
| X.38 | Mefentrifluconazole | 10:1 | 60:6 |
| X.38 | Mefentrifluconazole | 100:1 | 60:0.6 |
| X.38 | Mefentrifluconazole | 3.3:1 | 20:6 |
| X.38 | Mefentrifluconazole | 33.3:1 | 20:0.6 |
| X.38 | Fenpropidin | 3:1 | 60:20 |
| X.38 | Fenpropidin | 10:1 | 60:6 |
| X.38 | Fenpropidin | 1:1 | 20:20 |
| X.38 | Fenpropidin | 3.3:1 | 20:6 |
| X.38 | Fenpropimorph | 3:1 | 60:20 |
| X.38 | Fenpropimorph | 10:1 | 60:6 |
| X.38 | Fenpropimorph | 1:1 | 20:20 |
| X.38 | Fenpropimorph | 3.3:1 | 20:6 |
| X.38 | Fluxapyroxad | 10:1 | 60:6 |
| X.38 | Fluxapyroxad | 100:1 | 60:0.6 |
| X.38 | Fluxapyroxad | 3.3:1 | 20:6 |
| X.38 | Fluxapyroxad | 33.3:1 | 20:0.6 |
| X.38 | Fluopyram | 10:1 | 60:6 |
| X.38 | Fluopyram | 100:1 | 60:0.6 |
| X.38 | Fluopyram | 3.3:1 | 20:6 |
| X.38 | Fluopyram | 33.3:1 | 20:0.6 |
| X.38 | Benzovindiflupyr | 10:1 | 60:6 |
| X.38 | Benzovindiflupyr | 100:1 | 60:0.6 |
| X.38 | Benzovindiflupyr | 3.3:1 | 20:6 |
| X.38 | Benzovindiflupyr | 33.3:1 | 20:0.6 |
| X.38 | Pydiflumetofen | 10:1 | 60:6 |
| X.38 | Pydiflumetofen | 100:1 | 60:0.6 |
| X.38 | Pydiflumetofen | 3.3:1 | 20:6 |
| X.38 | Pydiflumetofen | 33.3:1 | 20:0.6 |
| X.38 | Isoflucypram | 10:1 | 60:6 |
| X.38 | Isoflucypram | 100:1 | 60:0.6 |
| X.38 | Isoflucypram | 3.3:1 | 20:6 |
| X.38 | Isoflucypram | 33.3:1 | 20:0.6 |
| X.38 | Fluindapyr | 10:1 | 60:6 |
| X.38 | Fluindapyr | 100:1 | 60:0.6 |
| X.38 | Fluindapyr | 3.3:1 | 20:6 |
| X.38 | Fluindapyr | 33.3:1 | 20:0.6 |
| X.38 | Florylpicoxamid | 10:1 | 60:6 |
| X.38 | Florylpicoxamid | 100:1 | 60:0.6 |
| X.38 | Florylpicoxamid | 3.3:1 | 20:6 |
| X.38 | Florylpicoxamid | 33.3:1 | 20:0.6 |
| X.38 | Metarylpicoxamid | 10:1 | 60:6 |
| X.38 | Metarylpicoxamid | 100:1 | 60:0.6 |

-continued

| Component A (Compound) | Component B | Ratio A:B | Conc. (ppm) (A:B) |
|---|---|---|---|
| X.38 | Metarylpicoxamid | 3.3:1 | 20:6 |
| X.38 | Metarylpicoxamid | 33.3:1 | 20:0.6 |
| X.38 | Chlorothalonil | 10:1 | 60:6 |
| X.38 | Chlorothalonil | 100:1 | 60:0.6 |
| X.38 | Chlorothalonil | 3.3:1 | 20:6 |
| X.38 | Chlorothalonil | 33.3:1 | 20:0.6 |
| X.38 | Mancozeb | 3:1 | 60:20 |
| X.38 | Mancozeb | 10:1 | 60:6 |
| X.38 | Mancozeb | 1:1 | 20:20 |
| X.38 | Mancozeb | 3.3:1 | 20:6 |
| X.38 | Mandipropamid | 3:1 | 60:20 |
| X.38 | Mandipropamid | 10:1 | 60:6 |
| X.38 | Mandipropamid | 1:1 | 20:20 |
| X.38 | Mandipropamid | 3.3:1 | 20:6 |
| X.38 | Oxathiapiprolin | 3:1 | 60:20 |
| X.38 | Oxathiapiprolin | 10:1 | 60:6 |
| X.38 | Oxathiapiprolin | 1:1 | 20:20 |
| X.38 | Oxathiapiprolin | 3.3:1 | 20:6 |
| X.38 | Fluazinam | 10:1 | 60:6 |
| X.38 | Fluazinam | 100:1 | 60:0.6 |
| X.38 | Fluazinam | 3.3:1 | 20:6 |
| X.38 | Fluazinam | 33.3:1 | 20:0.6 |
| X.38 | Fludioxonil | 10:1 | 60:6 |
| X.38 | Fludioxonil | 100:1 | 60:0.6 |
| X.38 | Fludioxonil | 3.3:1 | 20:6 |
| X.38 | Fludioxonil | 33.3:1 | 20:0.6 |
| X.38 | Cyprodinil | 10:1 | 60:6 |
| X.38 | Cyprodinil | 100:1 | 60:0.6 |
| X.38 | Cyprodinil | 3.3:1 | 20:6 |
| X.38 | Cyprodinil | 33.3:1 | 20:0.6 |
| X.38 | Metalaxyl-M | 3:1 | 60:20 |
| X.38 | Metalaxyl-M | 10:1 | 60:6 |
| X.38 | Metalaxyl-M | 1:1 | 20:20 |
| X.38 | Metalaxyl-M | 3.3:1 | 20:6 |
| X.38 | Folpet | 10:1 | 60:6 |
| X.38 | Folpet | 30:1 | 60:2 |
| X.38 | Folpet | 3.3:1 | 20:6 |
| X.38 | Folpet | 10:1 | 20:2 |
| X.38 | Aminopyrifen | 10:1 | 60:6 |
| X.38 | Aminopyrifen | 100:1 | 60:0.6 |
| X.38 | Aminopyrifen | 3.3:1 | 20:6 |
| X.38 | Aminopyrifen | 33.3:1 | 20:0.6 |
| X.38 | N-(1-benzyl-1,3-dimethyl-butyl)-8-fluoro-quinoline-3-carboxamide | 10:1 | 60:6 |
| X.38 | N-(1-benzyl-1,3-dimethyl-butyl)-8-fluoro-quinoline-3-carboxamide | 100:1 | 60:0.6 |
| X.38 | N-(1-benzyl-1,3-dimethyl-butyl)-8-fluoro-quinoline-3-carboxamide | 3.3:1 | 20:6 |
| X.38 | N-(1-benzyl-1,3-dimethyl-butyl)-8-fluoro-quinoline-3-carboxamide | 33.3:1 | 20:0.6 |
| X.38 | N-(1-benzyl-3,3,3-trifluoro-1-methyl-propyl)-8-fluoro-quinoline-3-carboxamide | 10:1 | 60:6 |
| X.38 | N-(1-benzyl-3,3,3-trifluoro-1-methyl-propyl)-8-fluoro-quinoline-3-carboxamide | 100:1 | 60:0.6 |
| X.38 | N-(1-benzyl-3,3,3-trifluoro-1-methyl-propyl)-8-fluoro-quinoline-3-carboxamide | 3.3:1 | 20:6 |
| X.38 | N-(1-benzyl-3,3,3-trifluoro-1-methyl-propyl)-8-fluoro-quinoline-3-carboxamide | 33.3:1 | 20:0.6 |
| X.38 | 1-(6,7-dimethylpyrazolo[1,5-a]pyridin-3-yl)-4,4,5-trifluoro-3,3-dimethyl-isoquinoline | 10:1 | 60:6 |
| X.38 | 1-(6,7-dimethylpyrazolo[1,5-a]pyridin-3-yl)-4,4,5-trifluoro-3,3-dimethyl-isoquinoline | 100:1 | 60:0.6 |
| X.38 | 1-(6,7-dimethylpyrazolo[1,5-a]pyridin-3-yl)-4,4,5-trifluoro-3,3-dimethyl-isoquinoline | 3.3:1 | 20:6 |

-continued

| Component A (Compound) | Component B | Ratio A:B | Conc. (ppm) (A:B) |
|---|---|---|---|
| X.38 | 1-(6,7-dimethylpyrazolo[1,5-a]pyridin-3-yl)-4,4, 5-trifluoro-3,3-dimethyl-isoquinoline | 33.3:1 | 20:0.6 |
| X.38 | 4,4-difluoro-3,3-dimethyl-1-(7-methylpyrazolo[1,5-a]pyridin-3-yl) isoquinoline | 10:1 | 60:6 |
| X.38 | 4,4-difluoro-3,3-dimethyl-1-(7-methylpyrazolo[1,5-a]pyridin-3-yl)isoquinoline | 100:1 | 60:0.6 |
| X.38 | 4,4-difluoro-3,3-dimethyl-1-(7-methylpyrazolo[1,5-a]pyridin-3-yl) isoquinoline | 3.3:1 | 20:6 |
| X.38 | 4,4-difluoro-3,3-dimethyl-1-(7-methylpyrazolo[1,5-a]pyridin-3-yl) isoquinoline | 33.3:1 | 20:0.6 |
| X.38 | 1-(4,5-dimethylbenzimidazol-1-yl)-4,4,5-trifluoro-3,3-dimethyl-isoquinoline | 10:1 | 60:6 |
| X.38 | 1-(4,5-dimethylbenzimidazol-1-yl)-4,4,5-trifluoro-3,3-dimethyl-isoquinoline | 100:1 | 60:0.6 |
| X.38 | 1-(4,5-dimethylbenzimidazol-1-yl)-4,4,5-trifluoro-3,3-dimethyl-isoquinoline | 3.3:1 | 20:6 |
| X.38 | 1-(4,5-dimethylbenzimidazol-1-yl)-4,4,5-trifluoro-3,3-dimethyl-isoquinoline | 33.3:1 | 20:0.6 |
| X.38 | 1-(4,5-dimethylbenzimidazol-1-yl)-4,4-difluoro-3,3-dimethyl-isoquinoline | 10:1 | 60:6 |
| X.38 | 1-(4,5-dimethylbenzimidazol-1-yl)-4,4-difluoro-3,3-dimethyl-isoquinoline | 100:1 | 60:0.6 |
| X.38 | 1-(4,5-dimethylbenzimidazol-1-yl)-4,4-difluoro-3,3-dimethyl-isoquinoline | 3.3:1 | 20:6 |
| X.38 | 1-(4,5-dimethylbenzimidazol-1-yl)-4,4-difluoro-3,3-dimethyl-isoquinoline | 33.3:1 | 20:0.6 |
| X.38 | Isopyrazam | 10:1 | 60:6 |
| X.38 | Isopyrazam | 100:1 | 60:0.6 |
| X.38 | Isopyrazam | 3.3:1 | 20:6 |
| X.38 | Isopyrazam | 33.3:1 | 20:0.6 |
| X.38 | Sedaxane | 10:1 | 60:6 |
| X.38 | Sedaxane | 100:1 | 60:0.6 |
| X.38 | Sedaxane | 3.3:1 | 20:6 |
| X.38 | Sedaxane | 33.3:1 | 20:0.6 |
| X.38 | Isofetamid | 10:1 | 60:6 |
| X.38 | Isofetamid | 100:1 | 60:0.6 |
| X.38 | Isofetamid | 3.3:1 | 20:6 |
| X.38 | Isofetamid | 33.3:1 | 20:0.6 |
| X.38 | Ipflufenoquin | 10:1 | 60:6 |
| X.38 | Ipflufenoquin | 100:1 | 60:0.6 |
| X.38 | Ipflufenoquin | 3.3:1 | 20:6 |
| X.38 | Ipflufenoquin | 33.3:1 | 20:0.6 |
| X.38 | Quinofumelin | 10:1 | 60:6 |
| X.38 | Quinofumelin | 100:1 | 60:0.6 |
| X.38 | Quinofumelin | 3.3:1 | 20:6 |
| X.38 | Quinofumelin | 33.3:1 | 20:0.6 |

Example B11: *Blumeria graminis* f. sp. *tritici* (*Erysiphe graminis* f. sp. *tritici*)/Wheat/Leaf Disc Preventative (Powdery Mildew on Wheat)

Wheat leaf segments cv. Kanzler are placed on agar in a multiwell plate (24-well format) and sprayed with the formulated test compounds diluted in water. The leaf disks are inoculated by shaking powdery mildew infected plants above the test plates 1 day after application. The inoculated leaf disks are incubated at 20° C. and 60% rh under a light regime of 24 h darkness followed by 12 h light/12 h darkness in a climate chamber and the activity of the compounds is assessed as percent disease control compared to untreated when an appropriate level of disease damage appears on untreated check leaf segments (6-8 days after application). The following mixture compositions (A:B) at the reported concentration (in ppm) gave at least 80% disease control in this test when compared to the untreated control under the same conditions, which showed extensive disease development.

| Component A (Compound) | Component B | Ratio A:B | Conc. (ppm) (A:B) |
|---|---|---|---|
| X.29 | Azoxystrobin | 1.6:1 | 100:60 |
| X.29 | Azoxystrobin | 5:1 | 100:20 |
| X.29 | Azoxystrobin | 1:2 | 30:60 |
| X.29 | Azoxystrobin | 3:2 | 30:20 |
| X.29 | Trifloxystrobin | 1.6:1 | 100:60 |
| X.29 | Trifloxystrobin | 5:1 | 100:20 |
| X.29 | Trifloxystrobin | 1:2 | 30:60 |
| X.29 | Trifloxystrobin | 3:2 | 30:20 |
| X.29 | Metyltetraprole | 1.6:1 | 100:60 |
| X.29 | Metyltetraprole | 5:1 | 100:20 |
| X.29 | Metyltetraprole | 1:2 | 30:60 |
| X.29 | Metyltetraprole | 3:2 | 30:20 |
| X.29 | Difenoconazole | 1.6:1 | 100:60 |
| X.29 | Difenoconazole | 5:1 | 100:20 |
| X.29 | Difenoconazole | 1:2 | 30:60 |
| X.29 | Difenoconazole | 3:2 | 30:20 |
| X.29 | Hexaconazole | 1.6:1 | 100:60 |
| X.29 | Hexaconazole | 5:1 | 100:20 |
| X.29 | Hexaconazole | 1:2 | 30:60 |
| X.29 | Hexaconazole | 3:2 | 30:20 |
| X.29 | Propiconazole | 1.6:1 | 100:60 |
| X.29 | Propiconazole | 5:1 | 100:20 |
| X.29 | Propiconazole | 1:2 | 30:60 |
| X.29 | Propiconazole | 3:2 | 30:20 |
| X.29 | Prothioconazole | 1.6:1 | 100:60 |
| X.29 | Prothioconazole | 5:1 | 100:20 |
| X.29 | Prothioconazole | 1:2 | 30:60 |
| X.29 | Prothioconazole | 3:2 | 30:20 |
| X.29 | Mefentrifluconazole | 1.6:1 | 100:60 |
| X.29 | Mefentrifluconazole | 5:1 | 100:20 |
| X.29 | Mefentrifluconazole | 1:2 | 30:60 |
| X.29 | Mefentrifluconazole | 3:2 | 30:20 |
| X.29 | Fenpropidin | 1:1 | 100:100 |
| X.29 | Fenpropidin | 3.3:1 | 100:30 |
| X.29 | Fenpropidin | 1:3.3 | 30:100 |
| X.29 | Fenpropidin | 1:1 | 30:30 |
| X.29 | Fenpropimorph | 1.6:1 | 100:60 |
| X.29 | Fenpropimorph | 5:1 | 100:20 |
| X.29 | Fenpropimorph | 1:2 | 30:60 |
| X.29 | Fenpropimorph | 3:2 | 30:20 |
| X.29 | Fluxapyroxad | 1.6:1 | 100:60 |
| X.29 | Fluxapyroxad | 5:1 | 100:20 |
| X.29 | Fluxapyroxad | 1:2 | 30:60 |
| X.29 | Fluxapyroxad | 3:2 | 30:20 |
| X.29 | Fluopyram | 1:1 | 100:100 |
| X.29 | Fluopyram | 3.3:1 | 100:30 |
| X.29 | Fluopyram | 1:3.3 | 30:100 |
| X.29 | Fluopyram | 1:1 | 30:30 |
| X.29 | Benzovindiflupyr | 1.6:1 | 100:60 |
| X.29 | Benzovindiflupyr | 5:1 | 100:20 |
| X.29 | Benzovindiflupyr | 1:2 | 30:60 |
| X.29 | Benzovindiflupyr | 3:2 | 30:20 |
| X.29 | Pydiflumetofen | 1.6:1 | 100:60 |
| X.29 | Pydiflumetofen | 5:1 | 100:20 |
| X.29 | Pydiflumetofen | 1:2 | 30:60 |
| X.29 | Pydiflumetofen | 3:2 | 30:20 |
| X.29 | Isoflucypram | 1.6:1 | 100:60 |
| X.29 | Isoflucypram | 5:1 | 100:20 |
| X.29 | Isoflucypram | 1:2 | 30:60 |
| X.29 | Isoflucypram | 3:2 | 30:20 |
| X.29 | Florylpicoxamid | 1.6:1 | 100:60 |
| X.29 | Florylpicoxamid | 5:1 | 100:20 |
| X.29 | Florylpicoxamid | 1:2 | 30:60 |
| X.29 | Florylpicoxamid | 3:2 | 30:20 |
| X.29 | Metarylpicoxamid | 1:1 | 100:100 |
| X.29 | Metarylpicoxamid | 3.3:1 | 100:30 |

-continued

| Component A (Compound) | Component B | Ratio A:B | Conc. (ppm) (A:B) |
|---|---|---|---|
| X.29 | Metarylpicoxamid | 1:3.3 | 30:100 |
| X.29 | Metarylpicoxamid | 1:1 | 30:30 |
| X.29 | Fosetyl-aluminium | 1:1 | 100:100 |
| X.29 | Fosetyl-aluminium | 3.3:1 | 100:30 |
| X.29 | Fosetyl-aluminium | 1:3.3 | 30:100 |
| X.29 | Fosetyl-aluminium | 1:1 | 30:30 |
| X.29 | Chlorothalonil | 1:1 | 100:100 |
| X.29 | Chlorothalonil | 3.3:1 | 100:30 |
| X.29 | Chlorothalonil | 1:3.3 | 30:100 |
| X.29 | Chlorothalonil | 1:1 | 30:30 |
| X.29 | Mancozeb | 1:1 | 100:100 |
| X.29 | Mancozeb | 3.3:1 | 100:30 |
| X.29 | Mancozeb | 1:3.3 | 30:100 |
| X.29 | Mancozeb | 1:1 | 30:30 |
| X.29 | Mandipropamid | 1:1 | 100:100 |
| X.29 | Mandipropamid | 3.3:1 | 100:30 |
| X.29 | Mandipropamid | 1:3.3 | 30:100 |
| X.29 | Mandipropamid | 1:1 | 30:30 |
| X.29 | Oxathiapiprolin | 1:1 | 100:100 |
| X.29 | Oxathiapiprolin | 3.3:1 | 100:30 |
| X.29 | Oxathiapiprolin | 1:3.3 | 30:100 |
| X.29 | Oxathiapiprolin | 1:1 | 30:30 |
| X.29 | Fluazinam | 1:1 | 100:100 |
| X.29 | Fluazinam | 3.3:1 | 100:30 |
| X.29 | Fluazinam | 1:3.3 | 30:100 |
| X.29 | Fluazinam | 1:1 | 30:30 |
| X.29 | Fludioxonil | 1:1 | 100:100 |
| X.29 | Fludioxonil | 3.3:1 | 100:30 |
| X.29 | Fludioxonil | 1:3.3 | 30:100 |
| X.29 | Fludioxonil | 1:1 | 30:30 |
| X.29 | Cyprodinil | 1:1 | 100:100 |
| X.29 | Cyprodinil | 3.3:1 | 100:30 |
| X.29 | Cyprodinil | 1:3.3 | 30:100 |
| X.29 | Cyprodinil | 1:1 | 30:30 |
| X.29 | Metalaxyl-M | 1:1 | 100:100 |
| X.29 | Metalaxyl-M | 3.3:1 | 100:30 |
| X.29 | Metalaxyl-M | 1:3.3 | 30:100 |
| X.29 | Metalaxyl-M | 1:1 | 30:30 |
| X.29 | Folpet | 1:1 | 100:100 |
| X.29 | Folpet | 3.3:1 | 100:30 |
| X.29 | Folpet | 1:3.3 | 30:100 |
| X.29 | Folpet | 1:1 | 30:30 |
| X.29 | N'-[5-bromo-2-methyl-6-(1-methyl-2-propoxy-ethoxy)-3-pyridyl]-N-ethyl-N-methyl-formamidine | 1:1 | 100:100 |
| X.29 | N'-[5-bromo-2-methyl-6-(1-methyl-2-propoxy-ethoxy)-3-pyridyl]-N-ethyl-N-methyl-formamidine | 3.3:1 | 100:30 |
| X.29 | N'-[5-bromo-2-methyl-6-(1-methyl-2-propoxy-ethoxy)-3-pyridyl]-N-ethyl-N-methyl-formamidine | 1:3.3 | 30:100 |
| X.29 | N'-[5-bromo-2-methyl-6-(1-methyl-2-propoxy-ethoxy)-3-pyridyl]-N-ethyl-N-methyl-formamidine | 1:1 | 30:30 |
| X.29 | N-isopropyl-N'-[5-methoxy-2-methyl-4-(2,2,2-trifluoro-1-hydroxy-1-phenyl-ethyl)phenyl]-N-methyl-formamidine | 1:1 | 100:100 |
| X.29 | N-isopropyl-N'-[5-methoxy-2-methyl-4-(2,2,2-trifluoro-1-hydroxy-1-phenyl-ethyl)phenyl]-N-methyl-formamidine | 3.3:1 | 100:30 |
| X.29 | N-isopropyl-N'-[5-methoxy-2-methyl-4-(2,2,2-trifluoro-1-hydroxy-1-phenyl-ethyl)phenyl]-N-methyl-formamidine | 1:3.3 | 30:100 |
| X.29 | N-isopropyl-N'-[5-methoxy-2-methyl-4-(2,2,2-trifluoro-1-hydroxy-1-phenyl-ethyl)phenyl]-N-methyl-formamidine | 1:1 | 30:30 |
| X.29 | TAEGRO ® | 1:1 | 100:100 |

-continued

| Component A (Compound) | Component B | Ratio A:B | Conc. (ppm) (A:B) |
|---|---|---|---|
| X.29 | TAEGRO ® | 3.3:1 | 100:30 |
| X.29 | TAEGRO ® | 1:3.3 | 30:100 |
| X.29 | TAEGRO ® | 1:1 | 30:30 |
| X.29 | Timorex Gold ™ | 1:1 | 100:100 |
| X.29 | Timorex Gold ™ | 3.3:1 | 100:30 |
| X.29 | Timorex Gold ™ | 1:3.3 | 30:100 |
| X.29 | Timorex Gold ™ | 1:1 | 30:30 |
| X.29 | Isofetamid | 1.6:1 | 100:60 |
| X.29 | Isofetamid | 5:1 | 100:20 |
| X.29 | Isofetamid | 1:2 | 30:60 |
| X.29 | Isofetamid | 3:2 | 30:20 |
| X.29 | Acibenzolar-S-methyl | 1:1 | 100:100 |
| X.29 | Acibenzolar-S-methyl | 3.3:1 | 100:30 |
| X.29 | Acibenzolar-S-methyl | 1:3.3 | 30:100 |
| X.29 | Acibenzolar-S-methyl | 1:1 | 30:30 |
| X.29 | Aminopyrifen | 1:1 | 100:100 |
| X.29 | Aminopyrifen | 3.3:1 | 100:30 |
| X.29 | Aminopyrifen | 1:3.3 | 30:100 |
| X.29 | Aminopyrifen | 1:1 | 30:30 |
| X.29 | Cyflufenamid | 5:1 | 100:20 |
| X.29 | Cyflufenamid | 50:1 | 100:2 |
| X.29 | Cyflufenamid | 3:2 | 30:20 |
| X.29 | Cyflufenamid | 15:1 | 30:2 |
| X.29 | Metrafenone | 5:1 | 100:20 |
| X.29 | Metrafenone | 50:1 | 100:2 |
| X.29 | Metrafenone | 3:2 | 30:20 |
| X.29 | Metrafenone | 15:1 | 30:2 |
| X.29 | N-(1-benzyl-1,3-dimethyl-butyl)-8-fluoro-quinoline-3-carboxamide | 1:1 | 100:100 |
| X.29 | N-(1-benzyl-1,3-dimethyl-butyl)-8-fluoro-quinoline-3-carboxamide | 3.3:1 | 100:30 |
| X.29 | N-(1-benzyl-1,3-dimethyl-butyl)-8-fluoro-quinoline-3-carboxamide | 1:3.3 | 30:100 |
| X.29 | N-(1-benzyl-1,3-dimethyl-butyl)-8-fluoro-quinoline-3-carboxamide | 1:1 | 30:30 |
| X.29 | N-(1-benzyl-3,3,3-trifluoro-1-methyl-propyl)-8-fluoro-quinoline-3-carboxamide | 1:1 | 100:100 |
| X.29 | N-(1-benzyl-3,3,3-trifluoro-1-methyl-propyl)-8-fluoro-quinoline-3-carboxamide | 3.3:1 | 100:30 |
| X.29 | N-(1-benzyl-3,3,3-trifluoro-1-methyl-propyl)-8-fluoro-quinoline-3-carboxamide | 1:3.3 | 30:100 |
| X.29 | N-(1-benzyl-3,3,3-trifluoro-1-methyl-propyl)-8-fluoro-quinoline-3-carboxamide | 1:1 | 30:30 |
| X.29 | 1-(6,7-dimethylpyrazolo[1,5-a]pyridin-3-yl)-4,4,5-trifluoro-3,3-dimethyl-isoquinoline | 1:1 | 100:100 |
| X.29 | 1-(6,7-dimethylpyrazolo[1,5-a]pyridin-3-yl)-4,4,5-trifluoro-3,3-dimethyl-isoquinoline | 3.3:1 | 100:30 |
| X.29 | 1-(6,7-dimethylpyrazolo[1,5-a]pyridin-3-yl)-4,4,5-trifluoro-3,3-dimethyl-isoquinoline | 1:3.3 | 30:100 |
| X.29 | 1-(6,7-dimethylpyrazolo[1,5-a]pyridin-3-yl)-4,4,5-trifluoro-3,3-dimethyl-isoquinoline | 1:1 | 30:30 |
| X.29 | 4,4-difluoro-3,3-dimethyl-1-(7-methylpyrazolo[1,5-a]pyridin-3-yl)isoquinoline | 1:1 | 100:100 |
| X.29 | 4,4-difluoro-3,3-dimethyl-1-(7-methylpyrazolo[1,5-a]pyridin-3-yl) isoquinoline | 3.3:1 | 100:30 |
| X.29 | 4,4-difluoro-3,3-dimethyl-1-(7-methylpyrazolo[1,5-a]pyridin-3-yl) isoquinoline | 1:3.3 | 30:100 |
| X.29 | 4,4-difluoro-3,3-dimethyl-1-(7-methylpyrazolo[1,5-a]pyridin-3-yl) isoquinoline | 1:1 | 30:30 |

-continued

| Component A (Compound) | Component B | Ratio A:B | Conc. (ppm) (A:B) |
|---|---|---|---|
| X.29 | 1-(4,5-dimethylbenzimidazol-1-yl)-4,4,5-trifluoro-3,3-dimethyl-isoquinoline | 1:1 | 100:100 |
| X.29 | 1-(4,5-dimethylbenzimidazol-1-yl)-4,4,5-trifluoro-3,3-dimethyl-isoquinoline | 3.3:1 | 100:30 |
| X.29 | 1-(4,5-dimethylbenzimidazol-1-yl)-4,4,5-trifluoro-3,3-dimethyl-isoquinoline | 1:3.3 | 30:100 |
| X.29 | 1-(4,5-dimethylbenzimidazol-1-yl)-4,4,5-trifluoro-3,3-dimethyl-isoquinoline | 1:1 | 30:30 |
| X.29 | 1-(4,5-dimethylbenzimidazol-1-yl)-4,4-difluoro-3,3-dimethyl-isoquinoline | 1:1 | 100:100 |
| X.29 | 1-(4,5-dimethylbenzimidazol-1-yl)-4,4-difluoro-3,3-dimethyl-isoquinoline | 3.3:1 | 100:30 |
| X.29 | 1-(4,5-dimethylbenzimidazol-1-yl)-4,4-difluoro-3,3-dimethyl-isoquinoline | 1:3.3 | 30:100 |
| X.29 | 1-(4,5-dimethylbenzimidazol-1-yl)-4,4-difluoro-3,3-dimethyl-isoquinoline | 1:1 | 30:30 |
| X.36 | Azoxystrobin | 1.6:1 | 100:60 |
| X.36 | Azoxystrobin | 5:1 | 100:20 |
| X.36 | Azoxystrobin | 1:2 | 30:60 |
| X.36 | Azoxystrobin | 3:2 | 30:20 |
| X.36 | Trifloxystrobin | 1.6:1 | 100:60 |
| X.36 | Trifloxystrobin | 5:1 | 100:20 |
| X.36 | Trifloxystrobin | 1:2 | 30:60 |
| X.36 | Trifloxystrobin | 3:2 | 30:20 |
| X.36 | Metyltetraprole | 1.6:1 | 100:60 |
| X.36 | Metyltetraprole | 5:1 | 100:20 |
| X.36 | Metyltetraprole | 1:2 | 30:60 |
| X.36 | Metyltetraprole | 3:2 | 30:20 |
| X.36 | Difenoconazole | 1.6:1 | 100:60 |
| X.36 | Difenoconazole | 5:1 | 100:20 |
| X.36 | Difenoconazole | 1:2 | 30:60 |
| X.36 | Difenoconazole | 3:2 | 30:20 |
| X.36 | Hexaconazole | 1.6:1 | 100:60 |
| X.36 | Hexaconazole | 5:1 | 100:20 |
| X.36 | Hexaconazole | 1:2 | 30:60 |
| X.36 | Hexaconazole | 3:2 | 30:20 |
| X.36 | Propiconazole | 1.6:1 | 100:60 |
| X.36 | Propiconazole | 5:1 | 100:20 |
| X.36 | Propiconazole | 1:2 | 30:60 |
| X.36 | Propiconazole | 3:2 | 30:20 |
| X.36 | Prothioconazole | 1.6:1 | 100:60 |
| X.36 | Prothioconazole | 5:1 | 100:20 |
| X.36 | Prothioconazole | 1:2 | 30:60 |
| X.36 | Prothioconazole | 3:2 | 30:20 |
| X.36 | Mefentrifluconazole | 1.6:1 | 100:60 |
| X.36 | Mefentrifluconazole | 5:1 | 100:20 |
| X.36 | Mefentrifluconazole | 1:2 | 30:60 |
| X.36 | Mefentrifluconazole | 3:2 | 30:20 |
| X.36 | Fenpropidin | 1:1 | 100:100 |
| X.36 | Fenpropidin | 3.3:1 | 100:30 |
| X.36 | Fenpropidin | 1:3.3 | 30:100 |
| X.36 | Fenpropidin | 1:1 | 30:30 |
| X.36 | Fenpropimorph | 1.6:1 | 100:60 |
| X.36 | Fenpropimorph | 5:1 | 100:20 |
| X.36 | Fenpropimorph | 1:2 | 30:60 |
| X.36 | Fenpropimorph | 3:2 | 30:20 |
| X.36 | Fluxapyroxad | 1.6:1 | 100:60 |
| X.36 | Fluxapyroxad | 5:1 | 100:20 |
| X.36 | Fluxapyroxad | 1:2 | 30:60 |
| X.36 | Fluxapyroxad | 3:2 | 30:20 |
| X.36 | Fluopyram | 1:1 | 100:100 |
| X.36 | Fluopyram | 3.3:1 | 100:30 |
| X.36 | Fluopyram | 1:3.3 | 30:100 |
| X.36 | Fluopyram | 1:1 | 30:30 |
| X.36 | Benzovindiflupyr | 1.6:1 | 100:60 |
| X.36 | Benzovindiflupyr | 5:1 | 100:20 |
| X.36 | Benzovindiflupyr | 1:2 | 30:60 |

-continued

| Component A (Compound) | Component B | Ratio A:B | Conc. (ppm) (A:B) |
|---|---|---|---|
| X.36 | Benzovindiflupyr | 3:2 | 30:20 |
| X.36 | Pydiflumetofen | 1.6:1 | 100:60 |
| X.36 | Pydiflumetofen | 5:1 | 100:20 |
| X.36 | Pydiflumetofen | 1:2 | 30:60 |
| X.36 | Pydiflumetofen | 3:2 | 30:20 |
| X.36 | Isoflucypram | 1.6:1 | 100:60 |
| X.36 | Isoflucypram | 5:1 | 100:20 |
| X.36 | Isoflucypram | 1:2 | 30:60 |
| X.36 | Isoflucypram | 3:2 | 30:20 |
| X.36 | Florylpicoxamid | 1.6:1 | 100:60 |
| X.36 | Florylpicoxamid | 5:1 | 100:20 |
| X.36 | Florylpicoxamid | 1:2 | 30:60 |
| X.36 | Florylpicoxamid | 3:2 | 30:20 |
| X.36 | Metarylpicoxamid | 1:1 | 100:100 |
| X.36 | Metarylpicoxamid | 3.3:1 | 100:30 |
| X.36 | Metarylpicoxamid | 1:3.3 | 30:100 |
| X.36 | Metarylpicoxamid | 1:1 | 30:30 |
| X.36 | Fosetyl-aluminium | 1:1 | 100:100 |
| X.36 | Fosetyl-aluminium | 3.3:1 | 100:30 |
| X.36 | Fosetyl-aluminium | 1:3.3 | 30:100 |
| X.36 | Fosetyl-aluminium | 1:1 | 30:30 |
| X.36 | Chlorothalonil | 1:1 | 100:100 |
| X.36 | Chlorothalonil | 3.3:1 | 100:30 |
| X.36 | Chlorothalonil | 1:3.3 | 30:100 |
| X.36 | Chlorothalonil | 1:1 | 30:30 |
| X.36 | Mancozeb | 1:1 | 100:100 |
| X.36 | Mancozeb | 3.3:1 | 100:30 |
| X.36 | Mancozeb | 1:3.3 | 30:100 |
| X.36 | Mancozeb | 1:1 | 30:30 |
| X.36 | Mandipropamid | 1:1 | 100:100 |
| X.36 | Mandipropamid | 3.3:1 | 100:30 |
| X.36 | Mandipropamid | 1:3.3 | 30:100 |
| X.36 | Mandipropamid | 1:1 | 30:30 |
| X.36 | Oxathiapiprolin | 1:1 | 100:100 |
| X.36 | Oxathiapiprolin | 3.3:1 | 100:30 |
| X.36 | Oxathiapiprolin | 1:3.3 | 30:100 |
| X.36 | Oxathiapiprolin | 1:1 | 30:30 |
| X.36 | Fluazinam | 1:1 | 100:100 |
| X.36 | Fluazinam | 3.3:1 | 100:30 |
| X.36 | Fluazinam | 1:3.3 | 30:100 |
| X.36 | Fluazinam | 1:1 | 30:30 |
| X.36 | Fludioxonil | 1:1 | 100:100 |
| X.36 | Fludioxonil | 3.3:1 | 100:30 |
| X.36 | Fludioxonil | 1:3.3 | 30:100 |
| X.36 | Fludioxonil | 1:1 | 30:30 |
| X.36 | Cyprodinil | 1:1 | 100:100 |
| X.36 | Cyprodinil | 3.3:1 | 100:30 |
| X.36 | Cyprodinil | 1:3.3 | 30:100 |
| X.36 | Cyprodinil | 1:1 | 30:30 |
| X.36 | Metalaxyl-M | 1:1 | 100:100 |
| X.36 | Metalaxyl-M | 3.3:1 | 100:30 |
| X.36 | Metalaxyl-M | 1:3.3 | 30:100 |
| X.36 | Metalaxyl-M | 1:1 | 30:30 |
| X.36 | Folpet | 1:1 | 100:100 |
| X.36 | Folpet | 3.3:1 | 100:30 |
| X.36 | Folpet | 1:3.3 | 30:100 |
| X.36 | Folpet | 1:1 | 30:30 |
| X.36 | N'-[5-bromo-2-methyl-6-(1-methyl-2-propoxy-ethoxy)-3-pyridyl]-N-ethyl-N-methyl-formamidine | 1:1 | 100:100 |
| X.36 | N'-[5-bromo-2-methyl-6-(1-methyl-2-propoxy-ethoxy)-3-pyridyl]-N-ethyl-N-methyl-formamidine | 3.3:1 | 100:30 |
| X.36 | N'-[5-bromo-2-methyl-6-(1-methyl-2-propoxy-ethoxy)-3-pyridyl]-N-ethyl-N-methyl-formamidine | 1:3.3 | 30:100 |
| X.36 | N'-[5-bromo-2-methyl-6-(1-methyl-2-propoxy-ethoxy)-3-pyridyl]-N-ethyl-N-methyl-formamidine | 1:1 | 30:30 |
| X.36 | N-isopropyl-N'-[5-methoxy-2-methyl-4-(2,2,2-trifluoro-1- | 1:1 | 100:100 |

| Component A (Compound) | Component B | Ratio A:B | Conc. (ppm) (A:B) |
|---|---|---|---|
| | hydroxy-1-phenyl-ethyl)phenyl]-N-methyl-formamidine | | |
| X.36 | N-isopropyl-N'-[5-methoxy-2-methyl-4-(2,2,2-trifluoro-1-hydroxy-1-phenyl-ethyl)phenyl]-N-methyl-formamidine | 3.3:1 | 100:30 |
| X.36 | N-isopropyl-N'-[5-methoxy-2-methyl-4-(2,2,2-trifluoro-1-hydroxy-1-phenyl-ethyl)phenyl]-N-methyl-formamidine | 1:3.3 | 30:100 |
| X.36 | N-isopropyl-N'-[5-methoxy-2-methyl-4-(2,2,2-trifluoro-1-hydroxy-1-phenyl-ethyl)phenyl]-N-methyl-formamidine | 1:1 | 30:30 |
| X.36 | TAEGRO ® | 1:1 | 100:100 |
| X.36 | TAEGRO ® | 3.3:1 | 100:30 |
| X.36 | TAEGRO ® | 1:3.3 | 30:100 |
| X.36 | TAEGRO ® | 1:1 | 30:30 |
| X.36 | Timorex Gold ™ | 1:1 | 100:100 |
| X.36 | Timorex Gold ™ | 3.3:1 | 100:30 |
| X.36 | Timorex Gold ™ | 1:3.3 | 30:100 |
| X.36 | Timorex Gold ™ | 1:1 | 30:30 |
| X.36 | Isofetamid | 1.6:1 | 100:60 |
| X.36 | Isofetamid | 5:1 | 100:20 |
| X.36 | Isofetamid | 1:2 | 30:60 |
| X.36 | Isofetamid | 3:2 | 30:20 |
| X.36 | Acibenzolar-S-methyl | 1:1 | 100:100 |
| X.36 | Acibenzolar-S-methyl | 3.3:1 | 100:30 |
| X.36 | Acibenzolar-S-methyl | 1:3.3 | 30:100 |
| X.36 | Acibenzolar-S-methyl | 1:1 | 30:30 |
| X.36 | Aminopyrifen | 1:1 | 100:100 |
| X.36 | Aminopyrifen | 3.3:1 | 100:30 |
| X.36 | Aminopyrifen | 1:3.3 | 30:100 |
| X.36 | Aminopyrifen | 1:1 | 30:30 |
| X.36 | Cyflufenamid | 5:1 | 100:20 |
| X.36 | Cyflufenamid | 50:1 | 100:2 |
| X.36 | Cyflufenamid | 3:2 | 30:20 |
| X.36 | Cyflufenamid | 15:1 | 30:2 |
| X.36 | Metrafenone | 5:1 | 100:20 |
| X.36 | Metrafenone | 50:1 | 100:2 |
| X.36 | Metrafenone | 3:2 | 30:20 |
| X.36 | Metrafenone | 15:1 | 30:2 |
| X.36 | N-(1-benzyl-1,3-dimethyl-butyl)-8-fluoro-quinoline-3-carboxamide | 1:1 | 100:100 |
| X.36 | N-(1-benzyl-1,3-dimethyl-butyl)-8-fluoro-quinoline-3-carboxamide | 3.3:1 | 100:30 |
| X.36 | N-(1-benzyl-1,3-dimethyl-butyl)-8-fluoro-quinoline-3-carboxamide | 1:3.3 | 30:100 |
| X.36 | N-(1-benzyl-1,3-dimethyl-butyl)-8-fluoro-quinoline-3-carboxamide | 1:1 | 30:30 |
| X.36 | N-(1-benzyl-3,3,3-trifluoro-1-methyl-propyl)-8-fluoro-quinoline-3-carboxamide | 1:1 | 100:100 |
| X.36 | N-(1-benzyl-3,3,3-trifluoro-1-methyl-propyl)-8-fluoro-quinoline-3-carboxamide | 3.3:1 | 100:30 |
| X.36 | N-(1-benzyl-3,3,3-trifluoro-1-methyl-propyl)-8-fluoro-quinoline-3-carboxamide | 1:3.3 | 30:100 |
| X.36 | N-(1-benzyl-3,3,3-trifluoro-1-methyl-propyl)-8-fluoro-quinoline-3-carboxamide | 1:1 | 30:30 |
| X.36 | 1-(6,7-dimethylpyrazolo[1,5-a]pyridin-3-yl)-4,4,5-trifluoro-3,3-dimethyl-isoquinoline | 1:1 | 100:100 |
| X.36 | 1-(6,7-dimethylpyrazolo[1,5-a]pyridin-3-yl)-4,4,5-trifluoro-3,3-dimethyl-isoquinoline | 3.3:1 | 100:30 |
| X.36 | 1-(6,7-dimethylpyrazolo[1,5-a]pyridin-3-yl)-4,4,5-trifluoro-3,3-dimethyl-isoquinoline | 1:3.3 | 30:100 |

| Component A (Compound) | Component B | Ratio A:B | Conc. (ppm) (A:B) |
|---|---|---|---|
| X.36 | 1-(6,7-dimethylpyrazolo[1,5-a]pyridin-3-yl)-4,4,5-trifluoro-3,3-dimethyl-isoquinoline | 1:1 | 30:30 |
| X.36 | 4,4-difluoro-3,3-dimethyl-1-(7-methylpyrazolo[1,5-a]pyridin-3-yl) isoquinoline | 1:1 | 100:100 |
| X.36 | 4,4-difluoro-3,3-dimethyl-1-(7-methylpyrazolo[1,5-a]pyridin-3-yl)isoquinoline | 3.3:1 | 100:30 |
| X.36 | 4,4-difluoro-3,3-dimethyl-1-(7-methylpyrazolo[1,5-a]pyridin-3-yl) isoquinoline | 1:3.3 | 30:100 |
| X.36 | 4,4-difluoro-3,3-dimethyl-1-(7-methylpyrazolo[1,5-a]pyridin-3-yl) isoquinoline | 1:1 | 30:30 |
| X.36 | 1-(4,5-dimethylbenzimidazol-1-yl)-4,4,5-trifluoro-3,3-dimethyl-isoquinoline | 1:1 | 100:100 |
| X.36 | 1-(4,5-dimethylbenzimidazol-1-yl)-4,4,5-trifluoro-3,3-dimethyl-isoquinoline | 3.3:1 | 100:30 |
| X.36 | 1-(4,5-dimethylbenzimidazol-1-yl)-4,4,5-trifluoro-3,3-dimethyl-isoquinoline | 1:3.3 | 30:100 |
| X.36 | 1-(4,5-dimethylbenzimidazol-1-yl)-4,4,5-trifluoro-3,3-dimethyl-isoquinoline | 1:1 | 30:30 |
| X.36 | 1-(4,5-dimethylbenzimidazol-1-yl)-4,4-difluoro-3,3-dimethyl-isoquinoline | 1:1 | 100:100 |
| X.36 | 1-(4,5-dimethylbenzimidazol-1-yl)-4,4-difluoro-3,3-dimethyl-isoquinoline | 3.3:1 | 100:30 |
| X.36 | 1-(4,5-dimethylbenzimidazol-1-yl)-4,4-difluoro-3,3-dimethyl-isoquinoline | 1:3.3 | 30:100 |
| X.36 | 1-(4,5-dimethylbenzimidazol-1-yl)-4,4-difluoro-3,3-dimethyl-isoquinoline | 1:1 | 30:30 |
| X.38 | Azoxystrobin | 1.6:1 | 100:60 |
| X.38 | Azoxystrobin | 5:1 | 100:20 |
| X.38 | Azoxystrobin | 1:2 | 30:60 |
| X.38 | Azoxystrobin | 3:2 | 30:20 |
| X.38 | Trifloxystrobin | 1.6:1 | 100:60 |
| X.38 | Trifloxystrobin | 5:1 | 100:20 |
| X.38 | Trifloxystrobin | 1:2 | 30:60 |
| X.38 | Trifloxystrobin | 3:2 | 30:20 |
| X.38 | Metyltetraprole | 1.6:1 | 100:60 |
| X.38 | Metyltetraprole | 5:1 | 100:20 |
| X.38 | Metyltetraprole | 1:2 | 30:60 |
| X.38 | Metyltetraprole | 3:2 | 30:20 |
| X.38 | Difenoconazole | 1.6:1 | 100:60 |
| X.38 | Difenoconazole | 5:1 | 100:20 |
| X.38 | Difenoconazole | 1:2 | 30:60 |
| X.38 | Difenoconazole | 3:2 | 30:20 |
| X.38 | Hexaconazole | 1.6:1 | 100:60 |
| X.38 | Hexaconazole | 5:1 | 100:20 |
| X.38 | Hexaconazole | 1:2 | 30:60 |
| X.38 | Hexaconazole | 3:2 | 30:20 |
| X.38 | Propiconazole | 1.6:1 | 100:60 |
| X.38 | Propiconazole | 5:1 | 100:20 |
| X.38 | Propiconazole | 1:2 | 30:60 |
| X.38 | Propiconazole | 3:2 | 30:20 |
| X.38 | Prothioconazole | 1.6:1 | 100:60 |
| X.38 | Prothioconazole | 5:1 | 100:20 |
| X.38 | Prothioconazole | 1:2 | 30:60 |
| X.38 | Prothioconazole | 3:2 | 30:20 |
| X.38 | Mefentrifluconazole | 1.6:1 | 100:60 |
| X.38 | Mefentrifluconazole | 5:1 | 100:20 |
| X.38 | Mefentrifluconazole | 1:2 | 30:60 |
| X.38 | Mefentrifluconazole | 3:2 | 30:20 |
| X.38 | Fenpropidin | 1:1 | 100:100 |
| X.38 | Fenpropidin | 3.3:1 | 100:30 |
| X.38 | Fenpropidin | 1:3.3 | 30:100 |
| X.38 | Fenpropidin | 1:1 | 30:30 |

-continued

| Component A (Compound) | Component B | Ratio A:B | Conc. (ppm) (A:B) |
|---|---|---|---|
| X.38 | Fenpropimorph | 1.6:1 | 100:60 |
| X.38 | Fenpropimorph | 5:1 | 100:20 |
| X.38 | Fenpropimorph | 1:2 | 30:60 |
| X.38 | Fenpropimorph | 3:2 | 30:20 |
| X.38 | Fluxapyroxad | 1.6:1 | 100:60 |
| X.38 | Fluxapyroxad | 5:1 | 100:20 |
| X.38 | Fluxapyroxad | 1:2 | 30:60 |
| X.38 | Fluxapyroxad | 3:2 | 30:20 |
| X.38 | Fluopyram | 1:1 | 100:100 |
| X.38 | Fluopyram | 3.3:1 | 100:30 |
| X.38 | Fluopyram | 1:3.3 | 30:100 |
| X.38 | Fluopyram | 1:1 | 30:30 |
| X.38 | Benzovindiflupyr | 1.6:1 | 100:60 |
| X.38 | Benzovindiflupyr | 5:1 | 100:20 |
| X.38 | Benzovindiflupyr | 1:2 | 30:60 |
| X.38 | Benzovindiflupyr | 3:2 | 30:20 |
| X.38 | Pydiflumetofen | 1.6:1 | 100:60 |
| X.38 | Pydiflumetofen | 5:1 | 100:20 |
| X.38 | Pydiflumetofen | 1:2 | 30:60 |
| X.38 | Pydiflumetofen | 3:2 | 30:20 |
| X.38 | Isoflucypram | 1.6:1 | 100:60 |
| X.38 | Isoflucypram | 5:1 | 100:20 |
| X.38 | Isoflucypram | 1:2 | 30:60 |
| X.38 | Isoflucypram | 3:2 | 30:20 |
| X.38 | Florylpicoxamid | 1.6:1 | 100:60 |
| X.38 | Florylpicoxamid | 5:1 | 100:20 |
| X.38 | Florylpicoxamid | 1:2 | 30:60 |
| X.38 | Florylpicoxamid | 3:2 | 30:20 |
| X.38 | Metarylpicoxamid | 1:1 | 100:100 |
| X.38 | Metarylpicoxamid | 3.3:1 | 100:30 |
| X.38 | Metarylpicoxamid | 1:3.3 | 30:100 |
| X.38 | Metarylpicoxamid | 1:1 | 30:30 |
| X.38 | Fosetyl-aluminium | 1:1 | 100:100 |
| X.38 | Fosetyl-aluminium | 3.3:1 | 100:30 |
| X.38 | Fosetyl-aluminium | 1:3.3 | 30:100 |
| X.38 | Fosetyl-aluminium | 1:1 | 30:30 |
| X.38 | Chlorothalonil | 1:1 | 100:100 |
| X.38 | Chlorothalonil | 3.3:1 | 100:30 |
| X.38 | Chlorothalonil | 1:3.3 | 30:100 |
| X.38 | Chlorothalonil | 1:1 | 30:30 |
| X.38 | Mancozeb | 1:1 | 100:100 |
| X.38 | Mancozeb | 3.3:1 | 100:30 |
| X.38 | Mancozeb | 1:3.3 | 30:100 |
| X.38 | Mancozeb | 1:1 | 30:30 |
| X.38 | Mandipropamid | 1:1 | 100:100 |
| X.38 | Mandipropamid | 3.3:1 | 100:30 |
| X.38 | Mandipropamid | 1:3.3 | 30:100 |
| X.38 | Mandipropamid | 1:1 | 30:30 |
| X.38 | Oxathiapiprolin | 1:1 | 100:100 |
| X.38 | Oxathiapiprolin | 3.3:1 | 100:30 |
| X.38 | Oxathiapiprolin | 1:3.3 | 30:100 |
| X.38 | Oxathiapiprolin | 1:1 | 30:30 |
| X.38 | Fluazinam | 1:1 | 100:100 |
| X.38 | Fluazinam | 3.3:1 | 100:30 |
| X.38 | Fluazinam | 1:3.3 | 30:100 |
| X.38 | Fluazinam | 1:1 | 30:30 |
| X.38 | Fludioxonil | 1:1 | 100:100 |
| X.38 | Fludioxonil | 3.3:1 | 100:30 |
| X.38 | Fludioxonil | 1:3.3 | 30:100 |
| X.38 | Fludioxonil | 1:1 | 30:30 |
| X.38 | Cyprodinil | 1:1 | 100:100 |
| X.38 | Cyprodinil | 3.3:1 | 100:30 |
| X.38 | Cyprodinil | 1:3.3 | 30:100 |
| X.38 | Cyprodinil | 1:1 | 30:30 |
| X.38 | Metalaxyl-M | 1:1 | 100:100 |
| X.38 | Metalaxyl-M | 3.3:1 | 100:30 |
| X.38 | Metalaxyl-M | 1:3.3 | 30:100 |
| X.38 | Metalaxyl-M | 1:1 | 30:30 |
| X.38 | Folpet | 1:1 | 100:100 |
| X.38 | Folpet | 3.3:1 | 100:30 |
| X.38 | Folpet | 1:3.3 | 30:100 |
| X.38 | Folpet | 1:1 | 30:30 |
| X.38 | N'-[5-bromo-2-methyl-6-(1-methyl-2-propoxy-ethoxy)-3-pyridyl]-N-ethyl-N-methyl-formamidine | 1:1 | 100:100 |

-continued

| Component A (Compound) | Component B | Ratio A:B | Conc. (ppm) (A:B) |
|---|---|---|---|
| X.38 | N'-[5-bromo-2-methyl-6-(1-methyl-2-propoxy-ethoxy)-3-pyridyl]-N-ethyl-N-methyl-formamidine | 3.3:1 | 100:30 |
| X.38 | N'-[5-bromo-2-methyl-6-(1-methyl-2-propoxy-ethoxy)-3-pyridyl]-N-ethyl-N-methyl-formamidine | 1:3.3 | 30:100 |
| X.38 | N'-[5-bromo-2-methyl-6-(1-methyl-2-propoxy-ethoxy)-3-pyridyl]-N-ethyl-N-methyl-formamidine | 1:1 | 30:30 |
| X.38 | N-isopropyl-N'-[5-methoxy-2-methyl-4-(2,2,2-trifluoro-1-hydroxy-1-phenyl-ethyl)phenyl]-N-methyl-formamidine | 1:1 | 100:100 |
| X.38 | N-isopropyl-N'-[5-methoxy-2-methyl-4-(2,2,2-trifluoro-1-hydroxy-1-phenyl-ethyl)phenyl]-N-methyl-formamidine | 3.3:1 | 100:30 |
| X.38 | N-isopropyl-N'-[5-methoxy-2-methyl-4-(2,2,2-trifluoro-1-hydroxy-1-phenyl-ethyl)phenyl]-N-methyl-formamidine | 1:3.3 | 30:100 |
| X.38 | N-isopropyl-N'-[5-methoxy-2-methyl-4-(2,2,2-trifluoro-1-hydroxy-1-phenyl-ethyl)phenyl]-N-methyl-formamidine | 1:1 | 30:30 |
| X.38 | TAEGRO ® | 1:1 | 100:100 |
| X.38 | TAEGRO ® | 3.3:1 | 100:30 |
| X.38 | TAEGRO ® | 1:3.3 | 30:100 |
| X.38 | TAEGRO ® | 1:1 | 30:30 |
| X.38 | Timorex Gold ™ | 1:1 | 100:100 |
| X.38 | Timorex Gold ™ | 3.3:1 | 100:30 |
| X.38 | Timorex Gold ™ | 1:3.3 | 30:100 |
| X.38 | Timorex Gold ™ | 1:1 | 30:30 |
| X.38 | Isofetamid | 1.6:1 | 100:60 |
| X.38 | Isofetamid | 5:1 | 100:20 |
| X.38 | Isofetamid | 1:2 | 30:60 |
| X.38 | Isofetamid | 3:2 | 30:20 |
| X.38 | Acibenzolar-S-methyl | 1:1 | 100:100 |
| X.38 | Acibenzolar-S-methyl | 3.3:1 | 100:30 |
| X.38 | Acibenzolar-S-methyl | 1:3.3 | 30:100 |
| X.38 | Acibenzolar-S-methyl | 1:1 | 30:30 |
| X.38 | Aminopyrifen | 1:1 | 100:100 |
| X.38 | Aminopyrifen | 3.3:1 | 100:30 |
| X.38 | Aminopyrifen | 1:3.3 | 30:100 |
| X.38 | Aminopyrifen | 1:1 | 30:30 |
| X.38 | Cyflufenamid | 5:1 | 100:20 |
| X.38 | Cyflufenamid | 50:1 | 100:2 |
| X.38 | Cyflufenamid | 3:2 | 30:20 |
| X.38 | Cyflufenamid | 15:1 | 30:2 |
| X.38 | Metrafenone | 5:1 | 100:20 |
| X.38 | Metrafenone | 50:1 | 100:2 |
| X.38 | Metrafenone | 3:2 | 30:20 |
| X.38 | Metrafenone | 15:1 | 30:2 |
| X.38 | N-(1-benzyl-1,3-dimethyl-butyl)-8-fluoro-quinoline-3-carboxamide | 1:1 | 100:100 |
| X.38 | N-(1-benzyl-1,3-dimethyl-butyl)-8-fluoro-quinoline-3-carboxamide | 3.3:1 | 100:30 |
| X.38 | N-(1-benzyl-1,3-dimethyl-butyl)-8-fluoro-quinoline-3-carboxamide | 1:3.3 | 30:100 |
| X.38 | N-(1-benzyl-1,3-dimethyl-butyl)-8-fluoro-quinoline-3-carboxamide | 1:1 | 30:30 |
| X.38 | N-(1-benzyl-3,3,3-trifluoro-1-methyl-propyl)-8-fluoro-quinoline-3-carboxamide | 1:1 | 100:100 |
| X.38 | N-(1-benzyl-3,3,3-trifluoro-1-methyl-propyl)-8-fluoro-quinoline-3-carboxamide | 3.3:1 | 100:30 |

-continued

| Component A (Compound) | Component B | Ratio A:B | Conc. (ppm) (A:B) |
|---|---|---|---|
| X.38 | N-(1-benzyl-3,3,3-trifluoro-1-methyl-propyl)-8-fluoro-quinoline-3-carboxamide | 1:3.3 | 30:100 |
| X.38 | N-(1-benzyl-3,3,3-trifluoro-1-methyl-propyl)-8-fluoro-quinoline-3-carboxamide | 1:1 | 30:30 |
| X.38 | 1-(6,7-dimethylpyrazolo[1,5-a]pyridin-3-yl)-4,4,5-trifluoro-3,3-dimethyl-isoquinoline | 1:1 | 100:100 |
| X.38 | 1-(6,7-dimethylpyrazolo[1,5-a]pyridin-3-yl)-4,4,5-trifluoro-3,3-dimethyl-isoquinoline | 3.3:1 | 100:30 |
| X.38 | 1-(6,7-dimethylpyrazolo[1,5-a]pyridin-3-yl)-4,4,5-trifluoro-3,3-dimethyl-isoquinoline | 1:3.3 | 30:100 |
| X.38 | 1-(6,7-dimethylpyrazolo[1,5-a]pyridin-3-yl)-4,4,5-trifluoro-3,3-dimethyl-isoquinoline | 1:1 | 30:30 |
| X.38 | 4,4-difluoro-3,3-dimethyl-1-(7-methylpyrazolo[1,5-a]pyridin-3-yl)isoquinoline | 1:1 | 100:100 |
| X.38 | 4,4-difluoro-3,3-dimethyl-1-(7-methylpyrazolo[1,5-a]pyridin-3-yl)isoquinoline | 3.3:1 | 100:30 |
| X.38 | 4,4-difluoro-3,3-dimethyl-1-(7-methylpyrazolo[1,5-a]pyridin-3-yl) isoquinoline | 1:3.3 | 30:100 |
| X.38 | 4,4-difluoro-3,3-dimethyl-1-(7-methylpyrazolo[1,5-a]pyridin-3-yl)isoquinoline | 1:1 | 30:30 |
| X.38 | 1-(4,5-dimethylbenzimidazol-1-yl)-4,4,5-trifluoro-3,3-dimethyl-isoquinoline | 1:1 | 100:100 |
| X.38 | 1-(4,5-dimethylbenzimidazol-1-yl)-4,4,5-trifluoro-3,3-dimethyl-isoquinoline | 3.3:1 | 100:30 |
| X.38 | 1-(4,5-dimethylbenzimidazol-1-yl)-4,4,5-trifluoro-3,3-dimethyl-isoquinoline | 1:3.3 | 30:100 |
| X.38 | 1-(4,5-dimethylbenzimidazol-1-yl)-4,4,5-trifluoro-3,3-dimethyl-isoquinoline | 1:1 | 30:30 |
| X.38 | 1-(4,5-dimethylbenzimidazol-1-yl)-4,4-difluoro-3,3-dimethyl-isoquinoline | 1:1 | 100:100 |
| X.38 | 1-(4,5-dimethylbenzimidazol-1-yl)-4,4-difluoro-3,3-dimethyl-isoquinoline | 3.3:1 | 100:30 |
| X.38 | 1-(4,5-dimethylbenzimidazol-1-yl)-4,4-difluoro-3,3-dimethyl-isoquinoline | 1:3.3 | 30:100 |
| X.38 | 1-(4,5-dimethylbenzimidazol-1-yl)-4,4-difluoro-3,3-dimethyl-isoquinoline | 1:1 | 30:30 |

Example B12: *Puccinia recondita* F. sp. *tritici*/Wheat/Leaf Disc Preventative (Brown Rust)

Wheat leaf segments cv. Kanzler are placed on agar in multiwell plates (24-well format) and sprayed with the formulated test compounds diluted in water. The leaf disks are inoculated with a spore suspension of the fungus 1 day after application. The inoculated leaf segments are incubated at 19° C. and 75% rh under a light regime of 12 h light/12 h darkness in a climate cabinet and the activity of a compound is assessed as percent disease control compared to untreated when an appropriate level of disease damage appears in untreated check leaf segments (7-9 days after application). The following mixture compositions (A:B) at the reported concentration (in ppm) gave at least 80% disease control in this test when compared to the untreated control under the same conditions, which showed extensive disease development.

| Component A (Compound) | Component B | Ratio A:B | Conc. (ppm) (A:B) |
|---|---|---|---|
| X.29 | Azoxystrobin | 1.6:1 | 100:60 |
| X.29 | Azoxystrobin | 5:1 | 100:20 |
| X.29 | Azoxystrobin | 1:2 | 30:60 |
| X.29 | Azoxystrobin | 3:2 | 30:20 |
| X.29 | Trifloxystrobin | 1.6:1 | 100:60 |
| X.29 | Trifloxystrobin | 5:1 | 100:20 |
| X.29 | Trifloxystrobin | 1:2 | 30:60 |
| X.29 | Trifloxystrobin | 3:2 | 30:20 |
| X.29 | Metyltetraprole | 1.6:1 | 100:60 |
| X.29 | Metyltetraprole | 5:1 | 100:20 |
| X.29 | Metyltetraprole | 1:2 | 30:60 |
| X.29 | Metyltetraprole | 3:2 | 30:20 |
| X.29 | Cyproconazole | 1.6:1 | 100:60 |
| X.29 | Cyproconazole | 5:1 | 100:20 |
| X.29 | Cyproconazole | 1:2 | 30:60 |
| X.29 | Cyproconazole | 3:2 | 30:20 |
| X.29 | Difenoconazole | 1:1 | 100:100 |
| X.29 | Difenoconazole | 3.3:1 | 100:30 |
| X.29 | Difenoconazole | 1:3.3 | 30:100 |
| X.29 | Difenoconazole | 1:1 | 30:30 |
| X.29 | Hexaconazole | 1:1 | 100:100 |
| X.29 | Hexaconazole | 3.3:1 | 100:30 |
| X.29 | Hexaconazole | 1:3.3 | 30:100 |
| X.29 | Hexaconazole | 1:1 | 30:30 |
| X.29 | Propiconazole | 1:1 | 100:100 |
| X.29 | Propiconazole | 3.3:1 | 100:30 |
| X.29 | Propiconazole | 1:3.3 | 30:100 |
| X.29 | Propiconazole | 1:1 | 30:30 |
| X.29 | Prothioconazole | 1:1 | 100:100 |
| X.29 | Prothioconazole | 3.3:1 | 100:30 |
| X.29 | Prothioconazole | 1:3.3 | 30:100 |
| X.29 | Prothioconazole | 1:1 | 30:30 |
| X.29 | Mefentrifluconazole | 1.6:1 | 100:60 |
| X.29 | Mefentrifluconazole | 5:1 | 100:20 |
| X.29 | Mefentrifluconazole | 1:2 | 30:60 |
| X.29 | Mefentrifluconazole | 3:2 | 30:20 |
| X.29 | Fenpropidin | 1:1 | 100:100 |
| X.29 | Fenpropidin | 3.3:1 | 100:30 |
| X.29 | Fenpropidin | 1:3.3 | 30:100 |
| X.29 | Fenpropidin | 1:1 | 30:30 |
| X.29 | Fenpropimorph | 1:1 | 100:100 |
| X.29 | Fenpropimorph | 3.3:1 | 100:30 |
| X.29 | Fenpropimorph | 1:3.3 | 30:100 |
| X.29 | Fenpropimorph | 1:1 | 30:30 |
| X.29 | Bixafen | 1:1 | 100:60 |
| X.29 | Bixafen | 3.3:1 | 100:20 |
| X.29 | Bixafen | 1:2 | 30:60 |
| X.29 | Bixafen | 3:2 | 30:20 |
| X.29 | Fluxapyroxad | 1.6:1 | 100:60 |
| X.29 | Fluxapyroxad | 5:1 | 100:20 |
| X.29 | Fluxapyroxad | 1:2 | 30:60 |
| X.29 | Fluxapyroxad | 3:2 | 30:20 |
| X.29 | Fluopyram | 1:1 | 100:100 |
| X.29 | Fluopyram | 3.3:1 | 100:30 |
| X.29 | Fluopyram | 1:3.3 | 30:100 |
| X.29 | Fluopyram | 1:1 | 30:30 |
| X.29 | Benzovindiflupyr | 1.6:1 | 100:60 |
| X.29 | Benzovindiflupyr | 5:1 | 100:20 |
| X.29 | Benzovindiflupyr | 1:2 | 30:60 |
| X.29 | Benzovindiflupyr | 3:2 | 30:20 |
| X.29 | Pydiflumetofen | 1:1 | 100:100 |
| X.29 | Pydiflumetofen | 3.3:1 | 100:30 |
| X.29 | Pydiflumetofen | 1:3.3 | 30:100 |
| X.29 | Pydiflumetofen | 1:1 | 30:30 |
| X.29 | Isoflucypram | 1.6:1 | 100:60 |
| X.29 | Isoflucypram | 5:1 | 100:20 |
| X.29 | Isoflucypram | 1:2 | 30:60 |
| X.29 | Isoflucypram | 3:2 | 30:20 |
| X.29 | Fluindapyr | 1.6:1 | 100:60 |
| X.29 | Fluindapyr | 5:1 | 100:20 |
| X.29 | Fluindapyr | 1:2 | 30:60 |
| X.29 | Fluindapyr | 3:2 | 30:20 |
| X.29 | Florylpicoxamid | 1:1 | 100:100 |

-continued

| Component A (Compound) | Component B | Ratio A:B | Conc. (ppm) (A:B) |
|---|---|---|---|
| X.29 | Florylpicoxamid | 3.3:1 | 100:30 |
| X.29 | Florylpicoxamid | 1:3.3 | 30:100 |
| X.29 | Florylpicoxamid | 1:1 | 30:30 |
| X.29 | Metarylpicoxamid | 1.6:1 | 100:60 |
| X.29 | Metarylpicoxamid | 5:1 | 100:20 |
| X.29 | Metarylpicoxamid | 1:2 | 30:60 |
| X.29 | Metarylpicoxamid | 3:2 | 30:20 |
| X.29 | Fosetyl-aluminium | 1:1 | 100:100 |
| X.29 | Fosetyl-aluminium | 3.3:1 | 100:30 |
| X.29 | Fosetyl-aluminium | 1:3.3 | 30:100 |
| X.29 | Fosetyl-aluminium | 1:1 | 30:30 |
| X.29 | Chlorothalonil | 1:1 | 100:100 |
| X.29 | Chlorothalonil | 3.3:1 | 100:30 |
| X.29 | Chlorothalonil | 1:3.3 | 30:100 |
| X.29 | Chlorothalonil | 1:1 | 30:30 |
| X.29 | Mancozeb | 1:1 | 100:100 |
| X.29 | Mancozeb | 3.3:1 | 100:30 |
| X.29 | Mancozeb | 1:3.3 | 30:100 |
| X.29 | Mancozeb | 1:1 | 30:30 |
| X.29 | Mandipropamid | 1:1 | 100:100 |
| X.29 | Mandipropamid | 3.3:1 | 100:30 |
| X.29 | Mandipropamid | 1:3.3 | 30:100 |
| X.29 | Mandipropamid | 1:1 | 30:30 |
| X.29 | Oxathiapiprolin | 1:1 | 100:100 |
| X.29 | Oxathiapiprolin | 3.3:1 | 100:30 |
| X.29 | Oxathiapiprolin | 1:3.3 | 30:100 |
| X.29 | Oxathiapiprolin | 1:1 | 30:30 |
| X.29 | Fluazinam | 1:1 | 100:100 |
| X.29 | Fluazinam | 3.3:1 | 100:30 |
| X.29 | Fluazinam | 1:3.3 | 30:100 |
| X.29 | Fluazinam | 1:1 | 30:30 |
| X.29 | Fludioxonil | 1:1 | 100:100 |
| X.29 | Fludioxonil | 3.3:1 | 100:30 |
| X.29 | Fludioxonil | 1:3.3 | 30:100 |
| X.29 | Fludioxonil | 1:1 | 30:30 |
| X.29 | Cyprodinil | 1:1 | 100:100 |
| X.29 | Cyprodinil | 3.3:1 | 100:30 |
| X.29 | Cyprodinil | 1:3.3 | 30:100 |
| X.29 | Cyprodinil | 1:1 | 30:30 |
| X.29 | Metalaxyl-M | 1:1 | 100:100 |
| X.29 | Metalaxyl-M | 3.3:1 | 100:30 |
| X.29 | Metalaxyl-M | 1:3.3 | 30:100 |
| X.29 | Metalaxyl-M | 1:1 | 30:30 |
| X.29 | Folpet | 1:1 | 100:100 |
| X.29 | Folpet | 3.3:1 | 100:30 |
| X.29 | Folpet | 1:3.3 | 30:100 |
| X.29 | Folpet | 1:1 | 30:30 |
| X.29 | N'-[5-bromo-2-methyl-6-(1-methyl-2-propoxy-ethoxy)-3-pyridyl]-N-ethyl-N-methyl-formamidine | 1.6:1 | 100:60 |
| X.29 | N'-[5-bromo-2-methyl-6-(1-methyl-2-propoxy-ethoxy)-3-pyridyl]-N-ethyl-N-methyl-formamidine | 5:1 | 100:20 |
| X.29 | N'-[5-bromo-2-methyl-6-(1-methyl-2-propoxy-ethoxy)-3-pyridyl]-N-ethyl-N-methyl-formamidine | 1:2 | 30:60 |
| X.29 | N'-[5-bromo-2-methyl-6-(1-methyl-2-propoxy-ethoxy)-3-pyridyl]-N-ethyl-N-methyl-formamidine | 3:2 | 30:20 |
| X.29 | N-isopropyl-N'-[5-methoxy-2-methyl-4-(2,2,2-trifluoro-1-hydroxy-1-phenyl-ethyl)phenyl]-N-methyl-formamidine | 1.6:1 | 100:60 |
| X.29 | N-isopropyl-N'-[5-methoxy-2-methyl-4-(2,2,2-trifluoro-1-hydroxy-1-phenyl-ethyl)phenyl]-N-methyl-formamidine | 5:1 | 100:20 |
| X.29 | N-isopropyl-N'-[5-methoxy-2-methyl-4-(2,2,2-trifluoro-1-hydroxy-1-phenyl-ethyl)phenyl]-N-methyl-formamidine | 1:2 | 30:60 |
| X.29 | N-isopropyl-N'-[5-methoxy-2-methyl-4-(2,2,2-trifluoro-1-hydroxy-1-phenyl-ethyl)phenyl]-N-methyl-formamidine | 3:2 | 30:20 |

-continued

| Component A (Compound) | Component B | Ratio A:B | Conc. (ppm) (A:B) |
|---|---|---|---|
| X.29 | methyl (Z)-3-methoxy-2-[2-methyl-5-[3-(trifluoromethyl)pyrazol-1-yl]phenoxy]prop-2-enoate | 1.6:1 | 100:60 |
| X.29 | methyl (Z)-3-methoxy-2-[2-methyl-5-[3-(trifluoromethyl)pyrazol-1-yl]phenoxy]prop-2-enoate | 5:1 | 100:20 |
| X.29 | methyl (Z)-3-methoxy-2-[2-methyl-5-[3-(trifluoromethyl)pyrazol-1-yl]phenoxy]prop-2-enoate | 1:2 | 30:60 |
| X.29 | methyl (Z)-3-methoxy-2-[2-methyl-5-[3-(trifluoromethyl)pyrazol-1-yl]phenoxy]prop-2-enoate | 3:2 | 30:20 |
| X.29 | methyl (Z)-3-methoxy-2-[2-methyl-5-(3-propylpyrazol-1-yl)phenoxy]prop-2-enoate | 1.6:1 | 100:60 |
| X.29 | methyl (Z)-3-methoxy-2-[2-methyl-5-(3-propylpyrazol-1-yl)phenoxy]prop-2-enoate | 5:1 | 100:20 |
| X.29 | methyl (Z)-3-methoxy-2-[2-methyl-5-(3-propylpyrazol-1-yl)phenoxy]prop-2-enoate | 1:2 | 30:60 |
| X.29 | methyl (Z)-3-methoxy-2-[2-methyl-5-(3-propylpyrazol-1-yl)phenoxy]prop-2-enoate | 3:2 | 30:20 |
| X.29 | methyl (Z)-2-(5-cyclohexyl-2-methyl-phenoxy)-3-methoxy-prop-2-enoate | 1.6:1 | 100:60 |
| X.29 | methyl (Z)-2-(5-cyclohexyl-2-methyl-phenoxy)-3-methoxy-prop-2-enoate | 5:1 | 100:20 |
| X.29 | methyl (Z)-2-(5-cyclohexyl-2-methyl-phenoxy)-3-methoxy-prop-2-enoate | 1:2 | 30:60 |
| X.29 | methyl (Z)-2-(5-cyclohexyl-2-methyl-phenoxy)-3-methoxy-prop-2-enoate | 3:2 | 30:20 |
| X.29 | methyl (Z)-2-(5-cyclopentyl-2-methyl-phenoxy)-3-methoxy-prop-2-enoate | 1.6:1 | 100:60 |
| X.29 | methyl (Z)-2-(5-cyclopentyl-2-methyl-phenoxy)-3-methoxy-prop-2-enoate | 5:1 | 100:20 |
| X.29 | methyl (Z)-2-(5-cyclopentyl-2-methyl-phenoxy)-3-methoxy-prop-2-enoate | 1:2 | 30:60 |
| X.29 | methyl (Z)-2-(5-cyclopentyl-2-methyl-phenoxy)-3-methoxy-prop-2-enoate | 3:2 | 30:20 |
| X.29 | methyl (Z)-2-[5-(3-isopropylpyrazol-1-yl)-2-methyl-phenoxy]-3-methoxy-prop-2-enoate | 1.6:1 | 100:60 |
| X.29 | methyl (Z)-2-[5-(3-isopropylpyrazol-1-yl)-2-methyl-phenoxy]-3-methoxy-prop-2-enoate | 5:1 | 100:20 |
| X.29 | methyl (Z)-2-[5-(3-isopropylpyrazol-1-yl)-2-methyl-phenoxy]-3-methoxy-prop-2-enoate | 1:2 | 30:60 |
| X.29 | methyl (Z)-2-[5-(3-isopropylpyrazol-1-yl)-2-methyl-phenoxy]-3-methoxy-prop-2-enoate | 3:2 | 30:20 |
| X.29 | methyl (Z)-3-methoxy-2-[2-methyl-5-(4-propyltriazol-2-yl)phenoxy]prop-2-enoate | 1.6:1 | 100:60 |
| X.29 | methyl (Z)-3-methoxy-2-[2-methyl-5-(4-propyltriazol-2-yl)phenoxy]prop-2-enoate | 5:1 | 100:20 |
| X.29 | methyl (Z)-3-methoxy-2-[2-methyl-5-(4-propyltriazol-2-yl)phenoxy]prop-2-enoate | 1:2 | 30:60 |
| X.29 | methyl (Z)-3-methoxy-2-[2-methyl-5-(4-propyltriazol-2-yl)phenoxy]prop-2-enoate | 3:2 | 30:20 |

-continued

| Component A (Compound) | Component B | Ratio A:B | Conc. (ppm) (A:B) |
|---|---|---|---|
| X.29 | methyl (Z)-3-methoxy-2-[2-methyl-5-[4-(trifluoromethyl)triazol-2-yl]phenoxy]prop-2-enoate | 1.6:1 | 100:60 |
| X.29 | methyl (Z)-3-methoxy-2-[2-methyl-5-[4-(trifluoromethyl)triazol-2-yl]phenoxy]prop-2-enoate | 5:1 | 100:20 |
| X.29 | methyl (Z)-3-methoxy-2-[2-methyl-5-[4-(trifluoromethyl)triazol-2-yl]phenoxy]prop-2-enoate | 1:2 | 30:60 |
| X.29 | methyl (Z)-3-methoxy-2-[2-methyl-5-[4-(trifluoromethyl)triazol-2-yl]phenoxy]prop-2-enoate | 3:2 | 30:20 |
| X.36 | Azoxystrobin | 1.6:1 | 100:60 |
| X.36 | Azoxystrobin | 5:1 | 100:20 |
| X.36 | Azoxystrobin | 1:2 | 30:60 |
| X.36 | Azoxystrobin | 3:2 | 30:20 |
| X.36 | Trifloxystrobin | 1.6:1 | 100:60 |
| X.36 | Trifloxystrobin | 5:1 | 100:20 |
| X.36 | Trifloxystrobin | 1:2 | 30:60 |
| X.36 | Trifloxystrobin | 3:2 | 30:20 |
| X.36 | Metyltetraprole | 1.6:1 | 100:60 |
| X.36 | Metyltetraprole | 5:1 | 100:20 |
| X.36 | Metyltetraprole | 1:2 | 30:60 |
| X.36 | Metyltetraprole | 3:2 | 30:20 |
| X.36 | Cyproconazole | 1.6:1 | 100:60 |
| X.36 | Cyproconazole | 5:1 | 100:20 |
| X.36 | Cyproconazole | 1:2 | 30:60 |
| X.36 | Cyproconazole | 3:2 | 30:20 |
| X.36 | Difenoconazole | 1:1 | 100:100 |
| X.36 | Difenoconazole | 3.3:1 | 100:30 |
| X.36 | Difenoconazole | 1:3.3 | 30:100 |
| X.36 | Difenoconazole | 1:1 | 30:30 |
| X.36 | Hexaconazole | 1:1 | 100:100 |
| X.36 | Hexaconazole | 3.3:1 | 100:30 |
| X.36 | Hexaconazole | 1:3.3 | 30:100 |
| X.36 | Hexaconazole | 1:1 | 30:30 |
| X.36 | Propiconazole | 1:1 | 100:100 |
| X.36 | Propiconazole | 3.3:1 | 100:30 |
| X.36 | Propiconazole | 1:3.3 | 30:100 |
| X.36 | Propiconazole | 1:1 | 30:30 |
| X.36 | Prothioconazole | 1:1 | 100:100 |
| X.36 | Prothioconazole | 3.3:1 | 100:30 |
| X.36 | Prothioconazole | 1:3.3 | 30:100 |
| X.36 | Prothioconazole | 1:1 | 30:30 |
| X.36 | Mefentrifluconazole | 1.6:1 | 100:60 |
| X.36 | Mefentrifluconazole | 5:1 | 100:20 |
| X.36 | Mefentrifluconazole | 1:2 | 30:60 |
| X.36 | Mefentrifluconazole | 3:2 | 30:20 |
| X.36 | Fenpropidin | 1:1 | 100:100 |
| X.36 | Fenpropidin | 3.3:1 | 100:30 |
| X.36 | Fenpropidin | 1:3.3 | 30:100 |
| X.36 | Fenpropidin | 1:1 | 30:30 |
| X.36 | Fenpropimorph | 1:1 | 100:100 |
| X.36 | Fenpropimorph | 3.3:1 | 100:30 |
| X.36 | Fenpropimorph | 1:3.3 | 30:100 |
| X.36 | Fenpropimorph | 1:1 | 30:30 |
| X.36 | Bixafen | 1:1 | 100:60 |
| X.36 | Bixafen | 3.3:1 | 100:20 |
| X.36 | Bixafen | 1:2 | 30:60 |
| X.36 | Bixafen | 3:2 | 30:20 |
| X.36 | Fluxapyroxad | 1.6:1 | 100:60 |
| X.36 | Fluxapyroxad | 5:1 | 100:20 |
| X.36 | Fluxapyroxad | 1:2 | 30:60 |
| X.36 | Fluxapyroxad | 3:2 | 30:20 |
| X.36 | Fluopyram | 1:1 | 100:100 |
| X.36 | Fluopyram | 3.3:1 | 100:30 |
| X.36 | Fluopyram | 1:3.3 | 30:100 |
| X.36 | Fluopyram | 1:1 | 30:30 |
| X.36 | Benzovindiflupyr | 1.6:1 | 100:60 |
| X.36 | Benzovindiflupyr | 5:1 | 100:20 |
| X.36 | Benzovindiflupyr | 1:2 | 30:60 |
| X.36 | Benzovindiflupyr | 3:2 | 30:20 |
| X.36 | Pydiflumetofen | 1:1 | 100:100 |
| X.36 | Pydiflumetofen | 3.3:1 | 100:30 |
| X.36 | Pydiflumetofen | 1:3.3 | 30:100 |
| X.36 | Pydiflumetofen | 1:1 | 30:30 |

-continued

| Component A (Compound) | Component B | Ratio A:B | Conc. (ppm) (A:B) |
|---|---|---|---|
| X.36 | Isoflucypram | 1.6:1 | 100:60 |
| X.36 | Isoflucypram | 5:1 | 100:20 |
| X.36 | Isoflucypram | 1:2 | 30:60 |
| X.36 | Isoflucypram | 3:2 | 30:20 |
| X.36 | Fluindapyr | 1.6:1 | 100:60 |
| X.36 | Fluindapyr | 5:1 | 100:20 |
| X.36 | Fluindapyr | 1:2 | 30:60 |
| X.36 | Fluindapyr | 3:2 | 30:20 |
| X.36 | Florylpicoxamid | 1:1 | 100:100 |
| X.36 | Florylpicoxamid | 3.3:1 | 100:30 |
| X.36 | Florylpicoxamid | 1:3.3 | 30:100 |
| X.36 | Florylpicoxamid | 1:1 | 30:30 |
| X.36 | Metarylpicoxamid | 1.6:1 | 100:60 |
| X.36 | Metarylpicoxamid | 5:1 | 100:20 |
| X.36 | Metarylpicoxamid | 1:2 | 30:60 |
| X.36 | Metarylpicoxamid | 3:2 | 30:20 |
| X.36 | Fosetyl-aluminium | 1:1 | 100:100 |
| X.36 | Fosetyl-aluminium | 3.3:1 | 100:30 |
| X.36 | Fosetyl-aluminium | 1:3.3 | 30:100 |
| X.36 | Fosetyl-aluminium | 1:1 | 30:30 |
| X.36 | Chlorothalonil | 1:1 | 100:100 |
| X.36 | Chlorothalonil | 3.3:1 | 100:30 |
| X.36 | Chlorothalonil | 1:3.3 | 30:100 |
| X.36 | Chlorothalonil | 1:1 | 30:30 |
| X.36 | Mancozeb | 1:1 | 100:100 |
| X.36 | Mancozeb | 3.3:1 | 100:30 |
| X.36 | Mancozeb | 1:3.3 | 30:100 |
| X.36 | Mancozeb | 1:1 | 30:30 |
| X.36 | Mandipropamid | 1:1 | 100:100 |
| X.36 | Mandipropamid | 3.3:1 | 100:30 |
| X.36 | Mandipropamid | 1:3.3 | 30:100 |
| X.36 | Mandipropamid | 1:1 | 30:30 |
| X.36 | Oxathiapiprolin | 1:1 | 100:100 |
| X.36 | Oxathiapiprolin | 3.3:1 | 100:30 |
| X.36 | Oxathiapiprolin | 1:3.3 | 30:100 |
| X.36 | Oxathiapiprolin | 1:1 | 30:30 |
| X.36 | Fluazinam | 1:1 | 100:100 |
| X.36 | Fluazinam | 3.3:1 | 100:30 |
| X.36 | Fluazinam | 1:3.3 | 30:100 |
| X.36 | Fluazinam | 1:1 | 30:30 |
| X.36 | Fludioxonil | 1:1 | 100:100 |
| X.36 | Fludioxonil | 3.3:1 | 100:30 |
| X.36 | Fludioxonil | 1:3.3 | 30:100 |
| X.36 | Fludioxonil | 1:1 | 30:30 |
| X.36 | Cyprodinil | 1:1 | 100:100 |
| X.36 | Cyprodinil | 3.3:1 | 100:30 |
| X.36 | Cyprodinil | 1:3.3 | 30:100 |
| X.36 | Cyprodinil | 1:1 | 30:30 |
| X.36 | Metalaxyl-M | 1:1 | 100:100 |
| X.36 | Metalaxyl-M | 3.3:1 | 100:30 |
| X.36 | Metalaxyl-M | 1:3.3 | 30:100 |
| X.36 | Metalaxyl-M | 1:1 | 30:30 |
| X.36 | Folpet | 1:1 | 100:100 |
| X.36 | Folpet | 3.3:1 | 100:30 |
| X.36 | Folpet | 1:3.3 | 30:100 |
| X.36 | Folpet | 1:1 | 30:30 |
| X.36 | N'-[5-bromo-2-methyl-6-(1-methyl-2-propoxy-ethoxy)-3-pyridyl]-N-ethyl-N-methyl-formamidine | 1.6:1 | 100:60 |
| X.36 | N'-[5-bromo-2-methyl-6-(1-methyl-2-propoxy-ethoxy)-3-pyridyl]-N-ethyl-N-methyl-formamidine | 5:1 | 100:20 |
| X.36 | N'-[5-bromo-2-methyl-6-(1-methyl-2-propoxy-ethoxy)-3-pyridyl]-N-ethyl-N-methyl-formamidine | 1:2 | 30:60 |
| X.36 | N'-[5-bromo-2-methyl-6-(1-methyl-2-propoxy-ethoxy)-3-pyridyl]-N-ethyl-N-methyl-formamidine | 3:2 | 30:20 |
| X.36 | N-isopropyl-N'-[5-methoxy-2-methyl-4-(2,2,2-trifluoro-1-hydroxy-1-phenyl-ethyl)phenyl]-N-methyl-formamidine | 1.6:1 | 100:60 |
| X.36 | N-isopropyl-N'-[5-methoxy-2-methyl-4-(2,2,2-trifluoro-1-hydroxy-1-phenyl-ethyl)phenyl]-N-methyl-formamidine | 5:1 | 100:20 |

-continued

| Component A (Compound) | Component B | Ratio A:B | Conc. (ppm) (A:B) |
|---|---|---|---|
| X.36 | N-isopropyl-N'-[5-methoxy-2-methyl-4-(2,2,2-trifluoro-1-hydroxy-1-phenyl-ethyl)phenyl]-N-methyl-formamidine | 1:2 | 30:60 |
| X.36 | N-isopropyl-N'-[5-methoxy-2-methyl-4-(2,2,2-trifluoro-1-hydroxy-1-phenyl-ethyl)phenyl]-N-methyl-formamidine | 3:2 | 30:20 |
| X.36 | methyl (Z)-3-methoxy-2-[2-methyl-5-[3-(trifluoromethyl)pyrazol-1-yl]phenoxy]prop-2-enoate | 1.6:1 | 100:60 |
| X.36 | methyl (Z)-3-methoxy-2-[2-methyl-5-[3-(trifluoromethyl)pyrazol-1-yl]phenoxy]prop-2-enoate | 5:1 | 100:20 |
| X.36 | methyl (Z)-3-methoxy-2-[2-methyl-5-[3-(trifluoromethyl)pyrazol-1-yl]phenoxy]prop-2-enoate | 1:2 | 30:60 |
| X.36 | methyl (Z)-3-methoxy-2-[2-methyl-5-[3-(trifluoromethyl)pyrazol-1-yl]phenoxy]prop-2-enoate | 3:2 | 30:20 |
| X.36 | methyl (Z)-3-methoxy-2-[2-methyl-5-(3-propylpyrazol-1-yl)phenoxy]prop-2-enoate | 1.6:1 | 100:60 |
| X.36 | methyl (Z)-3-methoxy-2-[2-methyl-5-(3-propylpyrazol-1-yl)phenoxy]prop-2-enoate | 5:1 | 100:20 |
| X.36 | methyl (Z)-3-methoxy-2-[2-methyl-5-(3-propylpyrazol-1-yl)phenoxy]prop-2-enoate | 1:2 | 30:60 |
| X.36 | methyl (Z)-3-methoxy-2-[2-methyl-5-(3-propylpyrazol-1-yl)phenoxy]prop-2-enoate | 3:2 | 30:20 |
| X.36 | methyl (Z)-2-(5-cyclohexyl-2-methyl-phenoxy)-3-methoxy-prop-2-enoate | 1.6:1 | 100:60 |
| X.36 | methyl (Z)-2-(5-cyclohexyl-2-methyl-phenoxy)-3-methoxy-prop-2-enoate | 5:1 | 100:20 |
| X.36 | methyl (Z)-2-(5-cyclohexyl-2-methyl-phenoxy)-3-methoxy-prop-2-enoate | 1:2 | 30:60 |
| X.36 | methyl (Z)-2-(5-cyclohexyl-2-methyl-phenoxy)-3-methoxy-prop-2-enoate | 3:2 | 30:20 |
| X.36 | methyl (Z)-2-(5-cyclopentyl-2-methyl-phenoxy)-3-methoxy-prop-2-enoate | 1.6:1 | 100:60 |
| X.36 | methyl (Z)-2-(5-cyclopentyl-2-methyl-phenoxy)-3-methoxy-prop-2-enoate | 5:1 | 100:20 |
| X.36 | methyl (Z)-2-(5-cyclopentyl-2-methyl-phenoxy)-3-methoxy-prop-2-enoate | 1:2 | 30:60 |
| X.36 | methyl (Z)-2-(5-cyclopentyl-2-methyl-phenoxy)-3-methoxy-prop-2-enoate | 3:2 | 30:20 |
| X.36 | methyl (Z)-2-[5-(3-isopropylpyrazol-1-yl)-2-methyl-phenoxy]-3-methoxy-prop-2-enoate | 1.6:1 | 100:60 |
| X.36 | methyl (Z)-2-[5-(3-isopropylpyrazol-1-yl)-2-methyl-phenoxy]-3-methoxy-prop-2-enoate | 5:1 | 100:20 |
| X.36 | methyl (Z)-2-[5-(3-isopropylpyrazol-1-yl)-2-methyl-phenoxy]-3-methoxy-prop-2-enoate | 1:2 | 30:60 |
| X.36 | methyl (Z)-2-[5-(3-isopropylpyrazol-1-yl)-2-methyl-phenoxy]-3-methoxy-prop-2-enoate | 3:2 | 30:20 |
| X.36 | methyl (Z)-3-methoxy-2-[2-methyl-5-(4-propyltriazol-2-yl)phenoxy]prop-2-enoate | 1.6:1 | 100:60 |

-continued

| Component A (Compound) | Component B | Ratio A:B | Conc. (ppm) (A:B) |
|---|---|---|---|
| X.36 | methyl (Z)-3-methoxy-2-[2-methyl-5-(4-propyltriazol-2-yl)phenoxy]prop-2-enoate | 5:1 | 100:20 |
| X.36 | methyl (Z)-3-methoxy-2-[2-methyl-5-(4-propyltriazol-2-yl)phenoxy]prop-2-enoate | 1:2 | 30:60 |
| X.36 | methyl (Z)-3-methoxy-2-[2-methyl-5-(4-propyltriazol-2-yl)phenoxy]prop-2-enoate | 3:2 | 30:20 |
| X.36 | methyl (Z)-3-methoxy-2-[2-methyl-5-[4-(trifluoromethyl)triazol-2-yl]phenoxy]prop-2-enoate | 1.6:1 | 100:60 |
| X.36 | methyl (Z)-3-methoxy-2-[2-methyl-5-[4-(trifluoromethyl)triazol-2-yl]phenoxy]prop-2-enoate | 5:1 | 100:20 |
| X.36 | methyl (Z)-3-methoxy-2-[2-methyl-5-[4-(trifluoromethyl)triazol-2-yl]phenoxy]prop-2-enoate | 1:2 | 30:60 |
| X.36 | methyl (Z)-3-methoxy-2-[2-methyl-5-[4-(trifluoromethyl)triazol-2-yl]phenoxy]prop-2-enoate | 3:2 | 30:20 |
| X.38 | Azoxystrobin | 1.6:1 | 100:60 |
| X.38 | Azoxystrobin | 5:1 | 100:20 |
| X.38 | Azoxystrobin | 1:2 | 30:60 |
| X.38 | Azoxystrobin | 3:2 | 30:20 |
| X.38 | Trifloxystrobin | 1.6:1 | 100:60 |
| X.38 | Trifloxystrobin | 5:1 | 100:20 |
| X.38 | Trifloxystrobin | 1:2 | 30:60 |
| X.38 | Trifloxystrobin | 3:2 | 30:20 |
| X.38 | Metyltetraprole | 1.6:1 | 100:60 |
| X.38 | Metyltetraprole | 5:1 | 100:20 |
| X.38 | Metyltetraprole | 1:2 | 30:60 |
| X.38 | Metyltetraprole | 3:2 | 30:20 |
| X.38 | Cyproconazole | 1.6:1 | 100:60 |
| X.38 | Cyproconazole | 5:1 | 100:20 |
| X.38 | Cyproconazole | 1:2 | 30:60 |
| X.38 | Cyproconazole | 3:2 | 30:20 |
| X.38 | Difenoconazole | 1:1 | 100:100 |
| X.38 | Difenoconazole | 3.3:1 | 100:30 |
| X.38 | Difenoconazole | 1:3.3 | 30:100 |
| X.38 | Difenoconazole | 1:1 | 30:30 |
| X.38 | Hexaconazole | 1:1 | 100:100 |
| X.38 | Hexaconazole | 3.3:1 | 100:30 |
| X.38 | Hexaconazole | 1:3.3 | 30:100 |
| X.38 | Hexaconazole | 1:1 | 30:30 |
| X.38 | Propiconazole | 1:1 | 100:100 |
| X.38 | Propiconazole | 3.3:1 | 100:30 |
| X.38 | Propiconazole | 1:3.3 | 30:100 |
| X.38 | Propiconazole | 1:1 | 30:30 |
| X.38 | Prothioconazole | 1:1 | 100:100 |
| X.38 | Prothioconazole | 3.3:1 | 100:30 |
| X.38 | Prothioconazole | 1:3.3 | 30:100 |
| X.38 | Prothioconazole | 1:1 | 30:30 |
| X.38 | Mefentrifluconazole | 1.6:1 | 100:60 |
| X.38 | Mefentrifluconazole | 5:1 | 100:20 |
| X.38 | Mefentrifluconazole | 1:2 | 30:60 |
| X.38 | Mefentrifluconazole | 3:2 | 30:20 |
| X.38 | Fenpropidin | 1:1 | 100:100 |
| X.38 | Fenpropidin | 3.3:1 | 100:30 |
| X.38 | Fenpropidin | 1:3.3 | 30:100 |
| X.38 | Fenpropidin | 1:1 | 30:30 |
| X.38 | Fenpropimorph | 1:1 | 100:100 |
| X.38 | Fenpropimorph | 3.3:1 | 100:30 |
| X.38 | Fenpropimorph | 1:3.3 | 30:100 |
| X.38 | Fenpropimorph | 1:1 | 30:30 |
| X.38 | Bixafen | 1:1 | 100:60 |
| X.38 | Bixafen | 3.3:1 | 100:20 |
| X.38 | Bixafen | 1:2 | 30:60 |
| X.38 | Bixafen | 3:2 | 30:20 |
| X.38 | Fluxapyroxad | 1.6:1 | 100:60 |
| X.38 | Fluxapyroxad | 5:1 | 100:20 |
| X.38 | Fluxapyroxad | 1:2 | 30:60 |
| X.38 | Fluxapyroxad | 3:2 | 30:20 |
| X.38 | Fluopyram | 1:1 | 100:100 |
| X.38 | Fluopyram | 3.3:1 | 100:30 |
| X.38 | Fluopyram | 1:3.3 | 30:100 |

-continued

| Component A (Compound) | Component B | Ratio A:B | Conc. (ppm) (A:B) |
|---|---|---|---|
| X.38 | Fluopyram | 1:1 | 30:30 |
| X.38 | Benzovindiflupyr | 1.6:1 | 100:60 |
| X.38 | Benzovindiflupyr | 5:1 | 100:20 |
| X.38 | Benzovindiflupyr | 1:2 | 30:60 |
| X.38 | Benzovindiflupyr | 3:2 | 30:20 |
| X.38 | Pydiflumetofen | 1:1 | 100:100 |
| X.38 | Pydiflumetofen | 3.3:1 | 100:30 |
| X.38 | Pydiflumetofen | 1:3.3 | 30:100 |
| X.38 | Pydiflumetofen | 1:1 | 30:30 |
| X.38 | Isoflucypram | 1.6:1 | 100:60 |
| X.38 | Isoflucypram | 5:1 | 100:20 |
| X.38 | Isoflucypram | 1:2 | 30:60 |
| X.38 | Isoflucypram | 3:2 | 30:20 |
| X.38 | Fluindapyr | 1.6:1 | 100:60 |
| X.38 | Fluindapyr | 5:1 | 100:20 |
| X.38 | Fluindapyr | 1:2 | 30:60 |
| X.38 | Fluindapyr | 3:2 | 30:20 |
| X.38 | Florylpicoxamid | 1:1 | 100:100 |
| X.38 | Florylpicoxamid | 3.3:1 | 100:30 |
| X.38 | Florylpicoxamid | 1:3.3 | 30:100 |
| X.38 | Florylpicoxamid | 1:1 | 30:30 |
| X.38 | Metarylpicoxamid | 1.6:1 | 100:60 |
| X.38 | Metarylpicoxamid | 5:1 | 100:20 |
| X.38 | Metarylpicoxamid | 1:2 | 30:60 |
| X.38 | Metarylpicoxamid | 3:2 | 30:20 |
| X.38 | Fosetyl-aluminium | 1:1 | 100:100 |
| X.38 | Fosetyl-aluminium | 3.3:1 | 100:30 |
| X.38 | Fosetyl-aluminium | 1:3.3 | 30:100 |
| X.38 | Fosetyl-aluminium | 1:1 | 30:30 |
| X.38 | Chlorothalonil | 1:1 | 100:100 |
| X.38 | Chlorothalonil | 3.3:1 | 100:30 |
| X.38 | Chlorothalonil | 1:3.3 | 30:100 |
| X.38 | Chlorothalonil | 1:1 | 30:30 |
| X.38 | Mancozeb | 1:1 | 100:100 |
| X.38 | Mancozeb | 3.3:1 | 100:30 |
| X.38 | Mancozeb | 1:3.3 | 30:100 |
| X.38 | Mancozeb | 1:1 | 30:30 |
| X.38 | Mandipropamid | 1:1 | 100:100 |
| X.38 | Mandipropamid | 3.3:1 | 100:30 |
| X.38 | Mandipropamid | 1:3.3 | 30:100 |
| X.38 | Mandipropamid | 1:1 | 30:30 |
| X.38 | Oxathiapiprolin | 1:1 | 100:100 |
| X.38 | Oxathiapiprolin | 3.3:1 | 100:30 |
| X.38 | Oxathiapiprolin | 1:3.3 | 30:100 |
| X.38 | Oxathiapiprolin | 1:1 | 30:30 |
| X.38 | Fluazinam | 1:1 | 100:100 |
| X.38 | Fluazinam | 3.3:1 | 100:30 |
| X.38 | Fluazinam | 1:3.3 | 30:100 |
| X.38 | Fluazinam | 1:1 | 30:30 |
| X.38 | Fludioxonil | 1:1 | 100:100 |
| X.38 | Fludioxonil | 3.3:1 | 100:30 |
| X.38 | Fludioxonil | 1:3.3 | 30:100 |
| X.38 | Fludioxonil | 1:1 | 30:30 |
| X.38 | Cyprodinil | 1:1 | 100:100 |
| X.38 | Cyprodinil | 3.3:1 | 100:30 |
| X.38 | Cyprodinil | 1:3.3 | 30:100 |
| X.38 | Cyprodinil | 1:1 | 30:30 |
| X.38 | Metalaxyl-M | 1:1 | 100:100 |
| X.38 | Metalaxyl-M | 3.3:1 | 100:30 |
| X.38 | Metalaxyl-M | 1:3.3 | 30:100 |
| X.38 | Metalaxyl-M | 1:1 | 30:30 |
| X.38 | Folpet | 1:1 | 100:100 |
| X.38 | Folpet | 3.3:1 | 100:30 |
| X.38 | Folpet | 1:3.3 | 30:100 |
| X.38 | Folpet | 1:1 | 30:30 |
| X.38 | N'-[5-bromo-2-methyl-6-(1-methyl-2-propoxy-ethoxy)-3-pyridyl]-N-ethyl-N-methyl-formamidine | 1.6:1 | 100:60 |
| X.38 | N'-[5-bromo-2-methyl-6-(1-methyl-2-propoxy-ethoxy)-3-pyridyl]-N-ethyl-N-methyl-formamidine | 5:1 | 100:20 |
| X.38 | N'-[5-bromo-2-methyl-6-(1-methyl-2-propoxy-ethoxy)-3-pyridyl]-N-ethyl-N-methyl-formamidine | 1:2 | 30:60 |

-continued

| Component A (Compound) | Component B | Ratio A:B | Conc. (ppm) (A:B) |
|---|---|---|---|
| X.38 | N'-[5-bromo-2-methyl-6-(1-methyl-2-propoxy-ethoxy)-3-pyridyl]-N-ethyl-N-methyl-formamidine | 3:2 | 30:20 |
| X.38 | N-isopropyl-N'-[5-methoxy-2-methyl-4-(2,2,2-trifluoro-1-hydroxy-1-phenyl-ethyl)phenyl]-N-methyl-formamidine | 1.6:1 | 100:60 |
| X.38 | N-isopropyl-N'-[5-methoxy-2-methyl-4-(2,2,2-trifluoro-1-hydroxy-1-phenyl-ethyl)phenyl]-N-methyl-formamidine | 5:1 | 100:20 |
| X.38 | N-isopropyl-N'-[5-methoxy-2-methyl-4-(2,2,2-trifluoro-1-hydroxy-1-phenyl-ethyl)phenyl]-N-methyl-formamidine | 1:2 | 30:60 |
| X.38 | N-isopropyl-N'-[5-methoxy-2-methyl-4-(2,2,2-trifluoro-1-hydroxy-1-phenyl-ethyl)phenyl]-N-methyl-formamidine | 3:2 | 30:20 |
| X.38 | methyl (Z)-3-methoxy-2-[2-methyl-5-[3-(trifluoromethyl)pyrazol-1-yl]phenoxy]prop-2-enoate | 1.6:1 | 100:60 |
| X.38 | methyl (Z)-3-methoxy-2-[2-methyl-5-[3-(trifluoromethyl)pyrazol-1-yl]phenoxy]prop-2-enoate | 5:1 | 100:20 |
| X.38 | methyl (Z)-3-methoxy-2-[2-methyl-5-[3-(trifluoromethyl)pyrazol-1-yl]phenoxy]prop-2-enoate | 1:2 | 30:60 |
| X.38 | methyl (Z)-3-methoxy-2-[2-methyl-5-[3-(trifluoromethyl)pyrazol-1-yl]phenoxy]prop-2-enoate | 3:2 | 30:20 |
| X.38 | methyl (Z)-3-methoxy-2-[2-methyl-5-(3-propylpyrazol-1-yl)phenoxy]prop-2-enoate | 1.6:1 | 100:60 |
| X.38 | methyl (Z)-3-methoxy-2-[2-methyl-5-(3-propylpyrazol-1-yl)phenoxy]prop-2-enoate | 5:1 | 100:20 |
| X.38 | methyl (Z)-3-methoxy-2-[2-methyl-5-(3-propylpyrazol-1-yl)phenoxy]prop-2-enoate | 1:2 | 30:60 |
| X.38 | methyl (Z)-3-methoxy-2-[2-methyl-5-(3-propylpyrazol-1-yl)phenoxy]prop-2-enoate | 3:2 | 30:20 |
| X.38 | methyl (Z)-2-(5-cyclohexyl-2-methyl-phenoxy)-3-methoxy-prop-2-enoate | 1.6:1 | 100:60 |
| X.38 | methyl (Z)-2-(5-cyclohexyl-2-methyl-phenoxy)-3-methoxy-prop-2-enoate | 5:1 | 100:20 |
| X.38 | methyl (Z)-2-(5-cyclohexyl-2-methyl-phenoxy)-3-methoxy-prop-2-enoate | 1:2 | 30:60 |
| X.38 | methyl (Z)-2-(5-cyclohexyl-2-methyl-phenoxy)-3-methoxy-prop-2-enoate | 3:2 | 30:20 |
| X.38 | methyl (Z)-2-(5-cyclopentyl-2-methyl-phenoxy)-3-methoxy-prop-2-enoate | 1.6:1 | 100:60 |
| X.38 | methyl (Z)-2-(5-cyclopentyl-2-methyl-phenoxy)-3-methoxy-prop-2-enoate | 5:1 | 100:20 |
| X.38 | methyl (Z)-2-(5-cyclopentyl-2-methyl-phenoxy)-3-methoxy-prop-2-enoate | 1:2 | 30:60 |
| X.38 | methyl (Z)-2-(5-cyclopentyl-2-methyl-phenoxy)-3-methoxy-prop-2-enoate | 3:2 | 30:20 |
| X.38 | methyl (Z)-2-[5-(3-isopropylpyrazol-1-yl)-2-methyl-phenoxy]-3-methoxy-prop-2-enoate | 1.6:1 | 100:60 |
| X.38 | methyl (Z)-2-[5-(3-isopropylpyrazol-1-yl)-2-methyl-phenoxy]-3-methoxy-prop-2-enoate | 5:1 | 100:20 |

-continued

| Component A (Compound) | Component B | Ratio A:B | Conc. (ppm) (A:B) |
|---|---|---|---|
| X.38 | methyl (Z)-2-[5-(3-isopropylpyrazol-1-yl)-2-methyl-phenoxy]-3-methoxy-prop-2-enoate | 1:2 | 30:60 |
| X.38 | methyl (Z)-2-[5-(3-isopropylpyrazol-1-yl)-2-methyl-phenoxy]-3-methoxy-prop-2-enoate | 3:2 | 30:20 |
| X.38 | methyl (Z)-3-methoxy-2-[2-methyl-5-(4-propyltriazol-2-yl)phenoxy]prop-2-enoate | 1.6:1 | 100:60 |
| X.38 | methyl (Z)-3-methoxy-2-[2-methyl-5-(4-propyltriazol-2-yl)phenoxy]prop-2-enoate | 5:1 | 100:20 |
| X.38 | methyl (Z)-3-methoxy-2-[2-methyl-5-(4-propyltriazol-2-yl)phenoxy]prop-2-enoate | 1:2 | 30:60 |
| X.38 | methyl (Z)-3-methoxy-2-[2-methyl-5-(4-propyltriazol-2-yl)phenoxy]prop-2-enoate | 3:2 | 30:20 |
| X.38 | methyl (Z)-3-methoxy-2-[2-methyl-5-[4-(trifluoromethyl)triazol-2-yl]phenoxy]prop-2-enoate | 1.6:1 | 100:60 |
| X.38 | methyl (Z)-3-methoxy-2-[2-methyl-5-[4-(trifluoromethyl)triazol-2-yl]phenoxy]prop-2-enoate | 5:1 | 100:20 |

-continued

| Component A (Compound) | Component B | Ratio A:B | Conc. (ppm) (A:B) |
|---|---|---|---|
| X.38 | methyl (Z)-3-methoxy-2-[2-methyl-5-[4-(trifluoromethyl)triazol-2-yl]phenoxy]prop-2-enoate | 1:2 | 30:60 |
| X.38 | methyl (Z)-3-methoxy-2-[2-methyl-5-[4-(trifluoromethyl)triazol-2-yl]phenoxy]prop-2-enoate | 3:2 | 30:20 |

Example B13: *Phakopsora pachyrhizi*/Soybean/Preventative (Soybean Rust)

Soybean leaf disks are placed on water agar in multiwell plates (24-well format) and sprayed with the formulated test compounds diluted in water. One day after application leaf discs are inoculated by spraying a spore suspension on the lower leaf surface. After an incubation period in a climate cabinet of 24-36 hours in darkness at 20° C. and 75% rh leaf disc are kept at 20° C. with 12 h light/day and 75% rh. The activity of the mixture composition is assessed as percent disease control compared to untreated when an appropriate level of disease damage appears in untreated check leaf disks (12-14 days after application). The following mixture compositions (A:B) at the reported concentration (in ppm) gave at least 70% disease control in this test when compared to the untreated control under the same conditions, which showed extensive disease development.

| Component A (Compound) | Component B | Ratio A:B | Conc. (ppm) (A:B) |
|---|---|---|---|
| X.29 | Azoxystrobin | 2:1 | 200:100 |
| X.29 | Azoxystrobin | 6.6:1 | 200:30 |
| X.29 | Azoxystrobin | 1:1.6 | 60:100 |
| X.29 | Azoxystrobin | 2:1 | 60:30 |
| X.29 | Trifloxystrobin | 2:1 | 200:100 |
| X.29 | Trifloxystrobin | 6.6:1 | 200:30 |
| X.29 | Trifloxystrobin | 1:1.6 | 60:100 |
| X.29 | Trifloxystrobin | 2:1 | 60:30 |
| X.29 | Metyltetraprole | 2:1 | 200:100 |
| X.29 | Metyltetraprole | 6.6:1 | 200:30 |
| X.29 | Metyltetraprole | 1:1.6 | 60:100 |
| X.29 | Metyltetraprole | 2:1 | 60:30 |
| X.29 | Cyproconazole | 2:1 | 200:100 |
| X.29 | Cyproconazole | 6.6:1 | 200:30 |
| X.29 | Cyproconazole | 1:1.6 | 60:100 |
| X.29 | Cyproconazole | 2:1 | 60:30 |
| X.29 | Difenoconazole | 2:1 | 200:100 |
| X.29 | Difenoconazole | 6.6:1 | 200:30 |
| X.29 | Difenoconazole | 1:1.6 | 60:100 |
| X.29 | Difenoconazole | 2:1 | 60:30 |
| X.29 | Hexaconazole | 2:1 | 200:100 |
| X.29 | Hexaconazole | 6.6:1 | 200:30 |
| X.29 | Hexaconazole | 1:1.6 | 60:100 |
| X.29 | Hexaconazole | 2:1 | 60:30 |
| X.29 | Prothioconazole | 2:1 | 200:100 |
| X.29 | Prothioconazole | 6.6:1 | 200:30 |
| X.29 | Prothioconazole | 1:1.6 | 60:100 |
| X.29 | Prothioconazole | 2:1 | 60:30 |
| X.29 | Mefentrifluconazole | 2:1 | 200:100 |
| X.29 | Mefentrifluconazole | 6.6:1 | 200:30 |
| X.29 | Mefentrifluconazole | 1:1.6 | 60:100 |
| X.29 | Mefentrifluconazole | 2:1 | 60:30 |
| X.29 | Fenpropidin | 2:1 | 200:100 |
| X.29 | Fenpropidin | 6.6:1 | 200:30 |
| X.29 | Fenpropidin | 1:1.6 | 60:100 |
| X.29 | Fenpropidin | 2:1 | 60:30 |
| X.29 | Fenpropimorph | 2:1 | 200:100 |
| X.29 | Fenpropimorph | 6.6:1 | 200:30 |
| X.29 | Fenpropimorph | 1:1.6 | 60:100 |
| X.29 | Fenpropimorph | 2:1 | 60:30 |
| X.29 | Fluxapyroxad | 2:1 | 200:100 |
| X.29 | Fluxapyroxad | 6.6:1 | 200:30 |

-continued

| Component A (Compound) | Component B | Ratio A:B | Conc. (ppm) (A:B) |
|---|---|---|---|
| X.29 | Fluxapyroxad | 1:1.6 | 60:100 |
| X.29 | Fluxapyroxad | 2:1 | 60:30 |
| X.29 | Fluopyram | 2:1 | 200:100 |
| X.29 | Fluopyram | 6.6:1 | 200:30 |
| X.29 | Fluopyram | 1:1.6 | 60:100 |
| X.29 | Fluopyram | 2:1 | 60:30 |
| X.29 | Benzovindiflupyr | 33.3:1 | 200:6 |
| X.29 | Benzovindiflupyr | 100:1 | 200:2 |
| X.29 | Benzovindiflupyr | 10:1 | 60:6 |
| X.29 | Benzovindiflupyr | 30:1 | 60:2 |
| X.29 | Pydiflumetofen | 2:1 | 200:100 |
| X.29 | Pydiflumetofen | 6.6:1 | 200:30 |
| X.29 | Pydiflumetofen | 1:1.6 | 60:100 |
| X.29 | Pydiflumetofen | 2:1 | 60:30 |
| X.29 | Fluindapyr | 3.3:1 | 200:60 |
| X.29 | Fluindapyr | 33.3:1 | 200:6 |
| X.29 | Fluindapyr | 1:1 | 60:60 |
| X.29 | Fluindapyr | 10:1 | 60:6 |
| X.29 | Florylpicoxamid | 2:1 | 200:100 |
| X.29 | Florylpicoxamid | 6.6:1 | 200:30 |
| X.29 | Florylpicoxamid | 1:1.6 | 60:100 |
| X.29 | Florylpicoxamid | 2:1 | 60:30 |
| X.29 | Metarylpicoxamid | 3.3:1 | 200:60 |
| X.29 | Metarylpicoxamid | 33.3:1 | 200:6 |
| X.29 | Metarylpicoxamid | 1:1 | 60:60 |
| X.29 | Metarylpicoxamid | 10:1 | 60:6 |
| X.29 | Chlorothalonil | 2:1 | 200:100 |
| X.29 | Chlorothalonil | 6.6:1 | 200:30 |
| X.29 | Chlorothalonil | 1:1.6 | 60:100 |
| X.29 | Chlorothalonil | 2:1 | 60:30 |
| X.29 | Mancozeb | 2:1 | 200:100 |
| X.29 | Mancozeb | 6.6:1 | 200:30 |
| X.29 | Mancozeb | 1:1.6 | 60:100 |
| X.29 | Mancozeb | 2:1 | 60:30 |
| X.29 | Mandipropamid | 2:1 | 200:100 |
| X.29 | Mandipropamid | 6.6:1 | 200:30 |
| X.29 | Mandipropamid | 1:1.6 | 60:100 |
| X.29 | Mandipropamid | 2:1 | 60:30 |
| X.29 | Oxathiapiprolin | 2:1 | 200:100 |
| X.29 | Oxathiapiprolin | 6.6:1 | 200:30 |
| X.29 | Oxathiapiprolin | 1:1.6 | 60:100 |
| X.29 | Oxathiapiprolin | 2:1 | 60:30 |
| X.29 | Fludioxonil | 2:1 | 200:100 |
| X.29 | Fludioxonil | 6.6:1 | 200:30 |
| X.29 | Fludioxonil | 1:1.6 | 60:100 |
| X.29 | Fludioxonil | 2:1 | 60:30 |
| X.29 | Cyprodinil | 2:1 | 200:100 |
| X.29 | Cyprodinil | 6.6:1 | 200:30 |
| X.29 | Cyprodinil | 1:1.6 | 60:100 |
| X.29 | Cyprodinil | 2:1 | 60:30 |
| X.29 | Metalaxyl-M | 2:1 | 200:100 |
| X.29 | Metalaxyl-M | 6.6:1 | 200:30 |
| X.29 | Metalaxyl-M | 1:1.6 | 60:100 |
| X.29 | Metalaxyl-M | 2:1 | 60:30 |
| X.29 | N'-[5-bromo-2-methyl-6-(1-methyl-2-propoxy-ethoxy)-3-pyridyl]-N-ethyl-N-methyl-formamidine | 2:1 | 200:100 |
| X.29 | N'-[5-bromo-2-methyl-6-(1-methyl-2-propoxy-ethoxy)-3-pyridyl]-N-ethyl-N-methyl-formamidine | 6.6:1 | 200:30 |
| X.29 | N'-[5-bromo-2-methyl-6-(1-methyl-2-propoxy-ethoxy)-3-pyridyl]-N-ethyl-N-methyl-formamidine | 1:1.6 | 60:100 |
| X.29 | N'-[5-bromo-2-methyl-6-(1-methyl-2-propoxy-ethoxy)-3-pyridyl]-N-ethyl-N-methyl-formamidine | 2:1 | 60:30 |
| X.29 | N-isopropyl-N'-[5-methoxy-2-methyl-4-(2,2,2-trifluoro-1-hydroxy-1-phenyl-ethyl)phenyl]-N-methyl-formamidine | 2:1 | 200:100 |
| X.29 | N-isopropyl-N'-[5-methoxy-2-methyl-4-(2,2,2-trifluoro-1-hydroxy-1-phenyl-ethyl)phenyl]-N-methyl-formamidine | 6.6:1 | 200:30 |

-continued

| Component A (Compound) | Component B | Ratio A:B | Conc. (ppm) (A:B) |
|---|---|---|---|
| X.29 | N-isopropyl-N'-[5-methoxy-2-methyl-4-(2,2,2-trifluoro-1-hydroxy-1-phenyl-ethyl)phenyl]-N-methyl-formamidine | 1:1.6 | 60:100 |
| X.29 | N-isopropyl-N'-[5-methoxy-2-methyl-4-(2,2,2-trifluoro-1-hydroxy-1-phenyl-ethyl)phenyl]-N-methyl-formamidine | 2:1 | 60:30 |
| X.29 | methyl (Z)-3-methoxy-2-[2-methyl-5-[3-(trifluoromethyl)pyrazol-1-yl]phenoxy]prop-2-enoate | 2:1 | 200:100 |
| X.29 | methyl (Z)-3-methoxy-2-[2-methyl-5-[3-(trifluoromethyl)pyrazol-1-yl]phenoxy]prop-2-enoate | 6.6:1 | 200:30 |
| X.29 | methyl (Z)-3-methoxy-2-[2-methyl-5-[3-(trifluoromethyl)pyrazol-1-yl]phenoxy]prop-2-enoate | 1:1.6 | 60:100 |
| X.29 | methyl (Z)-3-methoxy-2-[2-methyl-5-[3-(trifluoromethyl)pyrazol-1-yl]phenoxy]prop-2-enoate | 2:1 | 60:30 |
| X.29 | methyl (Z)-3-methoxy-2-[2-methyl-5-(3-propylpyrazol-1-yl)phenoxy]prop-2-enoate | 2:1 | 200:100 |
| X.29 | methyl (Z)-3-methoxy-2-[2-methyl-5-(3-propylpyrazol-1-yl)phenoxy]prop-2-enoate | 6.6:1 | 200:30 |
| X.29 | methyl (Z)-3-methoxy-2-[2-methyl-5-(3-propylpyrazol-1-yl)phenoxy]prop-2-enoate | 1:1.6 | 60:100 |
| X.29 | methyl (Z)-3-methoxy-2-[2-methyl-5-(3-propylpyrazol-1-yl)phenoxy]prop-2-enoate | 2:1 | 60:30 |
| X.29 | methyl (Z)-2-(5-cyclohexyl-2-methyl-phenoxy)-3-methoxy-prop-2-enoate | 2:1 | 200:100 |
| X.29 | methyl (Z)-2-(5-cyclohexyl-2-methyl-phenoxy)-3-methoxy-prop-2-enoate | 6.6:1 | 200:30 |
| X.29 | methyl (Z)-2-(5-cyclohexyl-2-methyl-phenoxy)-3-methoxy-prop-2-enoate | 1:1.6 | 60:100 |
| X.29 | methyl (Z)-2-(5-cyclohexyl-2-methyl-phenoxy)-3-methoxy-prop-2-enoate | 2:1 | 60:30 |
| X.29 | methyl (Z)-2-(5-cyclopentyl-2-methyl-phenoxy)-3-methoxy-prop-2-enoate | 2:1 | 200:100 |
| X.29 | methyl (Z)-2-(5-cyclopentyl-2-methyl-phenoxy)-3-methoxy-prop-2-enoate | 6.6:1 | 200:30 |
| X.29 | methyl (Z)-2-(5-cyclopentyl-2-methyl-phenoxy)-3-methoxy-prop-2-enoate | 1:1.6 | 60:100 |
| X.29 | methyl (Z)-2-(5-cyclopentyl-2-methyl-phenoxy)-3-methoxy-prop-2-enoate | 2:1 | 60:30 |
| X.29 | methyl (Z)-2-[5-(3-isopropylpyrazol-1-yl)-2-methyl-phenoxy]-3-methoxy-prop-2-enoate | 2:1 | 200:100 |
| X.29 | methyl (Z)-2-[5-(3-isopropylpyrazol-1-yl)-2-methyl-phenoxy]-3-methoxy-prop-2-enoate | 6.6:1 | 200:30 |
| X.29 | methyl (Z)-2-[5-(3-isopropylpyrazol-1-yl)-2-methyl-phenoxy]-3-methoxy-prop-2-enoate | 1:1.6 | 60:100 |
| X.29 | methyl (Z)-2-[5-(3-isopropylpyrazol-1-yl)-2-methyl-phenoxy]-3-methoxy-prop-2-enoate | 2:1 | 60:30 |
| X.29 | methyl (Z)-3-methoxy-2-[2-methyl-5-(4-propyltriazol-2-yl)phenoxy]prop-2-enoate | 2:1 | 200:100 |
| X.29 | methyl (Z)-3-methoxy-2-[2-methyl-5-(4-propyltriazol-2-yl)phenoxy]prop-2-enoate | 6.6:1 | 200:30 |
| X.29 | methyl (Z)-3-methoxy-2-[2-methyl-5-(4-propyltriazol-2-yl)phenoxy]prop-2-enoate | 1:1.6 | 60:100 |
| X.29 | methyl (Z)-3-methoxy-2-[2-methyl-5-(4-propyltriazol-2-yl)phenoxy]prop-2-enoate | 2:1 | 60:30 |
| X.29 | methyl (Z)-3-methoxy-2-[2-methyl-5-[4-(trifluoromethyl)triazol-2-yl]phenoxy]prop-2-enoate | 2:1 | 200:100 |
| X.29 | methyl (Z)-3-methoxy-2-[2-methyl-5-[4-(trifluoromethyl)triazol-2-yl]phenoxy]prop-2-enoate | 6.6:1 | 200:30 |
| X.29 | methyl (Z)-3-methoxy-2-[2-methyl-5-[4-(trifluoromethyl)triazol-2-yl]phenoxy]prop-2-enoate | 1:1.6 | 60:100 |
| X.29 | methyl (Z)-3-methoxy-2-[2-methyl-5-[4-(trifluoromethyl)triazol-2-yl]phenoxy]prop-2-enoate | 2:1 | 60:30 |
| X.29 | TAEGRO ® | 2:1 | 200:100 |
| X.29 | TAEGRO ® | 6.6:1 | 200:30 |
| X.29 | TAEGRO ® | 1:1.6 | 60:100 |
| X.29 | TAEGRO ® | 2:1 | 60:30 |
| X.29 | Timorex Gold ™ | 2:1 | 200:100 |
| X.29 | Timorex Gold ™ | 6.6:1 | 200:30 |

-continued

| Component A (Compound) | Component B | Ratio A:B | Conc. (ppm) (A:B) |
|---|---|---|---|
| X.29 | Timorex Gold ™ | 1:1.6 | 60:100 |
| X.29 | Timorex Gold ™ | 2:1 | 60:30 |
| X.29 | N-methoxy-N-[4-[5-(trifluoromethyl)-1,2,4-oxadiazol-3-yl]phenyl]methyl]cyclopropanecarboxamide | 3.3:1 | 200:60 |
| X.29 | N-methoxy-N-[4-[5-(trifluoromethyl)-1,2,4-oxadiazol-3-yllphenyl]methyl]cyclopropanecarboxamide | 33.3:1 | 200:6 |
| X.29 | N-methoxy-N-[[4-[5-(trifluoromethyl)-1,2,4-oxadiazol-3-yl]phenyl methyl]cyclopropanecarboxamide | 1:1 | 60:60 |
| X.29 | N-methoxy-N-[4-[5-(trifluoromethyl)-1,2,4-oxadiazol-3-yl]phenyl]methyl]cyclopropanecarboxamide | 10:1 | 60:6 |
| X.29 | N,2-dimethoxy-N-[4-[5-(trifluoromethyl)-1,2,4-oxadiazol-3-yl]phenyl]methyl]propanamide | 3.3:1 | 200:60 |
| X.29 | N,2-dimethoxy-N-[[4-[5-(trifluoromethyl)-1,2,4-oxadiazol-3-yl]phenyl]methyl]propanamide | 33.3:1 | 200:6 |
| X.29 | N,2-dimethoxy-N-[[4-[5-(trifluoromethyl)-1,2,4-oxadiazol-3-yl]phenyl]methyl]propanamide | 1:1 | 60:60 |
| X.29 | N,2-dimethoxy-N-[[4-[5-(trifluoromethyl)-1,2,4-oxadiazol-3-yl]phenyl]methyl]propanamide | 10:1 | 60:6 |
| X.29 | N-ethyl-2-methyl-N-[4-[5-(trifluoromethyl)-1,2,4-oxadiazol-3-yl]phenyl]methyl]propanamide | 3.3:1 | 200:60 |
| X.29 | N-ethyl-2-methyl-N-[4-[5-(trifluoromethyl)-1,2,4-oxadiazol-3-yl]phenyl]methyl]propanamide | 33.3:1 | 200:6 |
| X.29 | N-ethyl-2-methyl-N-[[4-[5-(trifluoromethyl)-1,2,4-oxadiazol-3-yl]phenyl methyl]propanamide | 1:1 | 60:60 |
| X.29 | N-ethyl-2-methyl-N-[4-[5-(trifluoromethyl)-1,2,4-oxadiazol-3-yl]phenyl]methyl]propanamide | 10:1 | 60:6 |
| X.29 | 1-methoxy-3-methyl-1-[[4-[5-(trifluoromethyl)-1,2,4-oxadiazol-3-yl]phenyl]methyl]urea | 3.3:1 | 200:60 |
| X.29 | 1-methoxy-3-methyl-1-[[4-[5-(trifluoromethyl)-1,2,4-oxadiazol-3-yl]phenyl methyl]urea | 33.3:1 | 200:6 |
| X.29 | 1-methoxy-3-methyl-1-[[4-[5-(trifluoromethyl)-1,2,4-oxadiazol-3-yl]phenyl]methyl]urea | 1:1 | 60:60 |
| X.29 | 1-methoxy-3-methyl-1-[[4-[5-(trifluoromethyl)-1,2,4-oxadiazol-3-yl]phenyl]methyl]urea | 10:1 | 60:6 |
| X.29 | 1,3-dimethoxy-1-[4-[5-(trifluoromethyl)-1,2,4-oxadiazol-3-yl]phenyl]methyl]urea | 3.3:1 | 200:60 |
| X.29 | 1,3-dimethoxy-1-[[4-[5-(trifluoromethyl)-1,2,4-oxadiazol-3-yl]phenyl]methyl]urea | 33.3:1 | 200:6 |
| X.29 | 1,3-dimethoxy-1-[[4-[5-(trifluoromethyl)-1,2,4-oxadiazol-3-yl]phenyl]methyl]urea | 1:1 | 60:60 |
| X.29 | 1,3-dimethoxy-1-[[4-[5-(trifluoromethyl)-1,2,4-oxadiazol-3-yl]phenyl]methyl]urea | 10:1 | 60:6 |
| X.29 | 3-ethyl-1-methoxy-1-[4-[5-(trifluoromethyl)-1,2,4-oxadiazol-3-yl]phenyl]methyl]urea | 3.3:1 | 200:60 |
| X.29 | 3-ethyl-1-methoxy-1-[4-[5-(trifluoromethyl)-1,2,4-oxadiazol-3-yl]phenyl]methyl]urea | 33.3:1 | 200:6 |
| X.29 | 3-ethyl-1-methoxy-1-[4-[5-(trifluoromethyl)-1,2,4-oxadiazol-3-yl]phenyl]methyl]urea | 1:1 | 60:60 |
| X.29 | 3-ethyl-1-methoxy-1-[4-[5-(trifluoromethyl)-1,2,4-oxadiazol-3-yl]phenyl]methyl]urea | 10:1 | 60:6 |
| X.29 | Ethyl 1-[4-[5-(trifluoromethyl)-1,2,4-oxadiazol-3-yl]phenyl]methyl]pyrazole-4-carboxylate | 3.3:1 | 200:60 |
| X.29 | Ethyl 1-[[4-[5-(trifluoromethyl)-1,2,4-oxadiazol-3-yl]phenyl]methyl]pyrazole-4-carboxylate | 33.3:1 | 200:6 |
| X.29 | Ethyl 1-[4-[5-(trifluoromethyl)-1,2,4-oxadiazol-3-yl]phenyl]methyl]pyrazole-4-carboxylate | 1:1 | 60:60 |
| X.29 | Ethyl 1-[4-[5-(trifluoromethyl)-1,2,4-oxadiazol-3-yl]phenyl]methyl]pyrazole-4-carboxylate | 10:1 | 60:6 |
| X.36 | Azoxystrobin | 2:1 | 200:100 |
| X.36 | Azoxystrobin | 6.6:1 | 200:30 |
| X.36 | Azoxystrobin | 1:1.6 | 60:100 |
| X.36 | Azoxystrobin | 2:1 | 60:30 |
| X.36 | Trifloxystrobin | 2:1 | 200:100 |
| X.36 | Trifloxystrobin | 6.6:1 | 200:30 |
| X.36 | Trifloxystrobin | 1:1.6 | 60:100 |
| X.36 | Trifloxystrobin | 2:1 | 60:30 |
| X.36 | Metyltetraprole | 2:1 | 200:100 |
| X.36 | Metyltetraprole | 6.6:1 | 200:30 |
| X.36 | Metyltetraprole | 1:1.6 | 60:100 |
| X.36 | Metyltetraprole | 2:1 | 60:30 |
| X.36 | Cyproconazole | 2:1 | 200:100 |
| X.36 | Cyproconazole | 6.6:1 | 200:30 |

-continued

| Component A (Compound) | Component B | Ratio A:B | Conc. (ppm) (A:B) |
|---|---|---|---|
| X.36 | Cyproconazole | 1:1.6 | 60:100 |
| X.36 | Cyproconazole | 2:1 | 60:30 |
| X.36 | Difenoconazole | 2:1 | 200:100 |
| X.36 | Difenoconazole | 6.6:1 | 200:30 |
| X.36 | Difenoconazole | 1:1.6 | 60:100 |
| X.36 | Difenoconazole | 2:1 | 60:30 |
| X.36 | Hexaconazole | 2:1 | 200:100 |
| X.36 | Hexaconazole | 6.6:1 | 200:30 |
| X.36 | Hexaconazole | 1:1.6 | 60:100 |
| X.36 | Hexaconazole | 2:1 | 60:30 |
| X.36 | Prothioconazole | 2:1 | 200:100 |
| X.36 | Prothioconazole | 6.6:1 | 200:30 |
| X.36 | Prothioconazole | 1:1.6 | 60:100 |
| X.36 | Prothioconazole | 2:1 | 60:30 |
| X.36 | Mefentrifluconazole | 2:1 | 200:100 |
| X.36 | Mefentrifluconazole | 6.6:1 | 200:30 |
| X.36 | Mefentrifluconazole | 1:1.6 | 60:100 |
| X.36 | Mefentrifluconazole | 2:1 | 60:30 |
| X.36 | Fenpropidin | 2:1 | 200:100 |
| X.36 | Fenpropidin | 6.6:1 | 200:30 |
| X.36 | Fenpropidin | 1:1.6 | 60:100 |
| X.36 | Fenpropidin | 2:1 | 60:30 |
| X.36 | Fenpropimorph | 2:1 | 200:100 |
| X.36 | Fenpropimorph | 6.6:1 | 200:30 |
| X.36 | Fenpropimorph | 1:1.6 | 60:100 |
| X.36 | Fenpropimorph | 2:1 | 60:30 |
| X.36 | Fluxapyroxad | 2:1 | 200:100 |
| X.36 | Fluxapyroxad | 6.6:1 | 200:30 |
| X.36 | Fluxapyroxad | 1:1.6 | 60:100 |
| X.36 | Fluxapyroxad | 2:1 | 60:30 |
| X.36 | Fluopyram | 2:1 | 200:100 |
| X.36 | Fluopyram | 6.6:1 | 200:30 |
| X.36 | Fluopyram | 1:1.6 | 60:100 |
| X.36 | Fluopyram | 2:1 | 60:30 |
| X.36 | Benzovindiflupyr | 33.3:1 | 200:6 |
| X.36 | Benzovindiflupyr | 100:1 | 200:2 |
| X.36 | Benzovindiflupyr | 10:1 | 60:6 |
| X.36 | Benzovindiflupyr | 30:1 | 60:2 |
| X.36 | Pydiflumetofen | 2:1 | 200:100 |
| X.36 | Pydiflumetofen | 6.6:1 | 200:30 |
| X.36 | Pydiflumetofen | 1:1.6 | 60:100 |
| X.36 | Pydiflumetofen | 2:1 | 60:30 |
| X.36 | Fluindapyr | 3.3:1 | 200:60 |
| X.36 | Fluindapyr | 33.3:1 | 200:6 |
| X.36 | Fluindapyr | 1:1 | 60:60 |
| X.36 | Fluindapyr | 10:1 | 60:6 |
| X.36 | Florylpicoxamid | 2:1 | 200:100 |
| X.36 | Florylpicoxamid | 6.6:1 | 200:30 |
| X.36 | Florylpicoxamid | 1:1.6 | 60:100 |
| X.36 | Florylpicoxamid | 2:1 | 60:30 |
| X.36 | Metarylpicoxamid | 3.3:1 | 200:60 |
| X.36 | Metarylpicoxamid | 33.3:1 | 200:6 |
| X.36 | Metarylpicoxamid | 1:1 | 60:60 |
| K.36 | Metarylpicoxamid | 10:1 | 60:6 |
| X.36 | Chlorothalonil | 2:1 | 200:100 |
| X.36 | Chlorothalonil | 6.6:1 | 200:30 |
| X.36 | Chlorothalonil | 1:1.6 | 60:100 |
| X.36 | Chlorothalonil | 2:1 | 60:30 |
| X.36 | Mancozeb | 2:1 | 200:100 |
| X.36 | Mancozeb | 6.6:1 | 200:30 |
| X.36 | Mancozeb | 1:1.6 | 60:100 |
| X.36 | Mancozeb | 2:1 | 60:30 |
| X.36 | Mandipropamid | 2:1 | 200:100 |
| X.36 | Mandipropamid | 6.6:1 | 200:30 |
| X.36 | Mandipropamid | 1:1.6 | 60:100 |
| X.36 | Mandipropamid | 2:1 | 60:30 |
| X.36 | Oxathiapiprolin | 2:1 | 200:100 |
| X.36 | Oxathiapiprolin | 6.6:1 | 200:30 |
| X.36 | Oxathiapiprolin | 1:1.6 | 60:100 |
| X.36 | Oxathiapiprolin | 2:1 | 60:30 |
| X.36 | Fludioxonil | 2:1 | 200:100 |
| X.36 | Fludioxonil | 6.6:1 | 200:30 |
| X.36 | Fludioxonil | 1:1.6 | 60:100 |
| X.36 | Fludioxonil | 2:1 | 60:30 |
| X.36 | Cyprodinil | 2:1 | 200:100 |
| X.36 | Cyprodinil | 6.6:1 | 200:30 |

-continued

| Component A (Compound) | Component B | Ratio A:B | Conc. (ppm) (A:B) |
|---|---|---|---|
| X.36 | Cyprodinil | 1:1.6 | 60:100 |
| X.36 | Cyprodinil | 2:1 | 60:30 |
| X.36 | Metalaxyl-M | 2:1 | 200:100 |
| X.36 | Metalaxyl-M | 6.6:1 | 200:30 |
| X.36 | Metalaxyl-M | 1:1.6 | 60:100 |
| X.36 | Metalaxyl-M | 2:1 | 60:30 |
| X.36 | N'-[5-bromo-2-methyl-6-(1-methyl-2-propoxy-ethoxy)-3-pyridyl]-N-ethyl-N-methyl-formamidine | 2:1 | 200:100 |
| X.36 | N'-[5-bromo-2-methyl-6-(1-methyl-2-propoxy-ethoxy)-3-pyridyl]-N-ethyl-N-methyl-formamidine | 6.6:1 | 200:30 |
| X.36 | N'-[5-bromo-2-methyl-6-(1-methyl-2-propoxy-ethoxy)-3-pyridyl]-N-ethyl-N-methyl-formamidine | 1:1.6 | 60:100 |
| X.36 | N'-[5-bromo-2-methyl-6-(1-methyl-2-propoxy-ethoxy)-3-pyridyl]-N-ethyl-N-methyl-formamidine | 2:1 | 60:30 |
| X.36 | N-isopropyl-N'-[5-methoxy-2-methyl-4-(2,2,2-trifluoro-1-hydroxy-1-phenyl-ethyl)phenyl]-N-methyl-formamidine | 2:1 | 200:100 |
| X.36 | N-isopropyl-N'-[5-methoxy-2-methyl-4-(2,2,2-trifluoro-1-hydroxy-1-phenyl-ethyl)phenyl]-N-methyl-formamidine | 6.6:1 | 200:30 |
| X.36 | N-isopropyl-N'-[5-methoxy-2-methyl-4-(2,2,2-trifluoro-1-hydroxy-1-phenyl-ethyl)phenyl]-N-methyl-formamidine | 1:1.6 | 60:100 |
| X.36 | N-isopropyl-N'-[5-methoxy-2-methyl-4-(2,2,2-trifluoro-1-hydroxy-1-phenyl-ethyl)phenyl]-N-methyl-formamidine | 2:1 | 60:30 |
| X.36 | methyl (Z)-3-methoxy-2-[2-methyl-5-[3-(trifluoromethyl)pyrazol-1-yl]phenoxy]prop-2-enoate | 2:1 | 200:100 |
| X.36 | methyl (Z)-3-methoxy-2-[2-methyl-5-[3-(trifluoromethyl)pyrazol-1-yl]phenoxy]prop-2-enoate | 6.6:1 | 200:30 |
| X.36 | methyl (Z)-3-methoxy-2-[2-methyl-5-[3-(trifluoromethyl)pyrazol-1-yl]phenoxy]prop-2-enoate | 1:1.6 | 60:100 |
| X.36 | methyl (Z)-3-methoxy-2-[2-methyl-5-[3-(trifluoromethyl)pyrazol-1-yl]phenoxy]prop-2-enoate | 2:1 | 60:30 |
| X.36 | methyl (Z)-3-methoxy-2-[2-methyl-5-(3-propylpyrazol-1-yl)phenoxy]prop-2-enoate | 2:1 | 200:100 |
| X.36 | methyl (Z)-3-methoxy-2-[2-methyl-5-(3-propylpyrazol-1-yl)phenoxy]prop-2-enoate | 6.6:1 | 200:30 |
| X.36 | methyl (Z)-3-methoxy-2-[2-methyl-5-(3-propylpyrazol-1-yl)phenoxy]prop-2-enoate | 1:1.6 | 60:100 |
| X.36 | methyl (Z)-3-methoxy-2-[2-methyl-5-(3-propylpyrazol-1-yl)phenoxy]prop-2-enoate | 2:1 | 60:30 |
| X.36 | methyl (Z)-2-(5-cyclohexyl-2-methyl-phenoxy)-3-methoxy-prop-2-enoate | 2:1 | 200:100 |
| X.36 | methyl (Z)-2-(5-cyclohexyl-2-methyl-phenoxy)-3-methoxy-prop-2-enoate | 6.6:1 | 200:30 |
| X.36 | methyl (Z)-2-(5-cyclohexyl-2-methyl-phenoxy)-3-methoxy-prop-2-enoate | 1:1.6 | 60:100 |
| X.36 | methyl (Z)-2-(5-cyclohexyl-2-methyl-phenoxy)-3-methoxy-prop-2-enoate | 2:1 | 60:30 |
| X.36 | methyl (Z)-2-(5-cyclopentyl-2-methyl-phenoxy)-3-methoxy-prop-2-enoate | 2:1 | 200:100 |
| X.36 | methyl (Z)-2-(5-cyclopentyl-2-methyl-phenoxy)-3-methoxy-prop-2-enoate | 6.6:1 | 200:30 |
| X.36 | methyl (Z)-2-(5-cyclopentyl-2-methyl-phenoxy)-3-methoxy-prop-2-enoate | 1:1.6 | 60:100 |
| X.36 | methyl (Z)-2-(5-cyclopentyl-2-methyl-phenoxy)-3-methoxy-prop-2-enoate | 2:1 | 60:30 |
| X.36 | methyl (Z)-2-[5-(3-isopropylpyrazol-1-yl)-2-methyl-phenoxy]-3-methoxy-prop-2-enoate | 2:1 | 200:100 |
| X.36 | methyl (Z)-2-[5-(3-isopropylpyrazol-1-yl)-2-methyl-phenoxy]-3-methoxy-prop-2-enoate | 6.6:1 | 200:30 |
| X.36 | methyl (Z)-2-[5-(3-isopropylpyrazol-1-yl)-2-methyl-phenoxy]-3-methoxy-prop-2-enoate | 1:1.6 | 60:100 |
| X.36 | methyl (Z)-2-[5-(3-isopropylpyrazol-1-yl)-2-methyl-phenoxy]-3-methoxy-prop-2-enoate | 2:1 | 60:30 |
| X.36 | methyl (Z)-3-methoxy-2-[2-methyl-5-(4-propyltriazol-2-yl)phenoxy]prop-2-enoate | 2:1 | 200:100 |

-continued

| Component A (Compound) | Component B | Ratio A:B | Conc. (ppm) (A:B) |
|---|---|---|---|
| X.36 | methyl (Z)-3-methoxy-2-[2-methyl-5-(4-propyltriazol-2-yl)phenoxy]prop-2-enoate | 6.6:1 | 200:30 |
| X.36 | methyl (Z)-3-methoxy-2-[2-methyl-5-(4-propyltriazol-2-yl)phenoxy]prop-2-enoate | 1:1.6 | 60:100 |
| X.36 | methyl (Z)-3-methoxy-2-[2-methyl-5-(4-propyltriazol-2-yl)phenoxy]prop-2-enoate | 2:1 | 60:30 |
| X.36 | methyl (Z)-3-methoxy-2-[2-methyl-5-[4-(trifluoromethyl)triazol-2-yl]phenoxy]prop-2-enoate | 2:1 | 200:100 |
| X.36 | methyl (Z)-3-methoxy-2-[2-methyl-5-[4-(trifluoromethyl)triazol-2-yl]phenoxy]prop-2-enoate | 6.6:1 | 200:30 |
| X.36 | methyl (Z)-3-methoxy-2-[2-methyl-5-[4-(trifluoromethyl)triazol-2-yl]phenoxy]prop-2-enoate | 1:1.6 | 60:100 |
| X.36 | methyl (Z)-3-methoxy-2-[2-methyl-5-[4-(trifluoromethyl)triazol-2-yl]phenoxy]prop-2-enoate | 2:1 | 60:30 |
| X.36 | TAEGRO ® | 2:1 | 200:100 |
| X.36 | TAEGRO ® | 6.6:1 | 200:30 |
| X.36 | TAEGRO ® | 1:1.6 | 60:100 |
| X.36 | TAEGRO ® | 2:1 | 60:30 |
| X.36 | Timorex Gold ™ | 2:1 | 200:100 |
| X.36 | Timorex Gold ™ | 6.6:1 | 200:30 |
| X.36 | Timorex Gold ™ | 1:1.6 | 60:100 |
| X.36 | Timorex Gold ™ | 2:1 | 60:30 |
| X.36 | N-methoxy-N-[4-[5-(trifluoromethyl)-1,2,4-oxadiazol-3-yl]phenyl]methyl]cyclopropanecarboxamide | 3.3:1 | 200:60 |
| X.36 | N-methoxy-N-[4-[5-(trifluoromethyl)-1,2,4-oxadiazol-3-yl]phenyl]methyl]cyclopropanecarboxamide | 33.3:1 | 200:6 |
| X.36 | N-methoxy-N-[4-[5-(trifluoromethyl)-1,2,4-oxadiazol-3-yl]phenyl]methyl]cyclopropanecarboxamide | 1:1 | 60:60 |
| X.36 | N-methoxy-N-[[4-[5-(trifluoromethyl)-1,2,4-oxadiazol-3-yl]phenyl]methyl]cyclopropanecarboxamide | 10:1 | 60:6 |
| X.36 | N,2-dimethoxy-N-[[4-[5-(trifluoromethyl)-1,2,4-oxadiazol-3-yl]phenyl methyl]propanamide | 3.3:1 | 200:60 |
| X.36 | N,2-dimethoxy-N-[[4-[5-(trifluoromethyl)-1,2,4-oxadiazol-3-yl]phenyl]methyl]propanamide | 33.3:1 | 200:6 |
| X.36 | N,2-dimethoxy-N-[[4-[5-(trifluoromethyl)-1,2,4-oxadiazol-3-yl]phenyl]methyl]propanamide | 1:1 | 60:60 |
| X.36 | N,2-dimethoxy-N-[[4-[5-(trifluoromethyl)-1,2,4-oxadiazol-3-yl]phenyl]methyl]propanamide | 10:1 | 60:6 |
| X.36 | N-ethyl-2-methyl-N-[4-[5-(trifluoromethyl)-1,2,4-oxadiazol-3-yl]phenyl]methyl]propanamide | 3.3:1 | 200:60 |
| X.36 | N-ethyl-2-methyl-N-[4-[5-(trifluoromethyl)-1,2,4-oxadiazol-3-yl]phenyl]methyl]propanamide | 33.3:1 | 200:6 |
| X.36 | N-ethyl-2-methyl-N-[4-[5-(trifluoromethyl)-1,2,4-oxadiazol-3-yl]phenyl]methyl]propanamide | 1:1 | 60:60 |
| X.36 | N-ethyl-2-methyl-N-[[4-[5-(trifluoromethyl)-1,2,4-oxadiazol-3-yl]phenyl]methyl]propanamide | 10:1 | 60:6 |
| X.36 | 1-methoxy-3-methyl-1-[4-[5-(trifluoromethyl)-1,2,4-oxadiazol-3-yl]phenyl]methyl]urea | 3.3:1 | 200:60 |
| X.36 | 1-methoxy-3-methyl-1-[[4-[5-(trifluoromethyl)-1,2,4-oxadiazol-3-yl]phenyl]methyl]urea | 33.3:1 | 200:6 |
| X.36 | 1-methoxy-3-methyl-1-[4-[5-(trifluoromethyl)-1,2,4-oxadiazol-3-yl]phenyl]methyl]urea | 1:1 | 60:60 |
| X.36 | 1-methoxy-3-methyl-1-[[4-[5-(trifluoromethyl)-1,2,4-oxadiazol-3-yl]phenyl]methyl]urea | 10:1 | 60:6 |
| X.36 | 1,3-dimethoxy-1-[[4-[5-(trifluoromethyl)-1,2,4-oxadiazol-3-yl]phenyl]methyl]urea | 3.3:1 | 200:60 |
| X.36 | 1,3-dimethoxy-1-[4-[5-(trifluoromethyl)-1,2,4-oxadiazol-3-yl]phenyl]methyl]urea | 33.3:1 | 200:6 |
| X.36 | 1,3-dimethoxy-1-[[4-[5-(trifluoromethyl)-1,2,4-oxadiazol-3-yl]phenyl]methyl]urea | 1:1 | 60:60 |
| X.36 | 1,3-dimethoxy-1-[[4-[5-(trifluoromethyl)-1,2,4-oxadiazol-3-yl]phenyl]methyl]urea | 10:1 | 60:6 |
| X.36 | 3-ethyl-1-methoxy-1-[[4-[5-(trifluoromethyl)-1,2,4-oxadiazol-3-yl]phenyl]methyl]urea | 3.3:1 | 200:60 |
| X.36 | 3-ethyl-1-methoxy-1-[[4-[5-(trifluoromethyl)-1,2,4-oxadiazol-3-yl]phenyl]methyl]urea | 33.3:1 | 200:6 |
| X.36 | 3-ethyl-1-methoxy-1-[4-[5-(trifluoromethyl)-1,2,4-oxadiazol-3-yl]phenyl]methyl]urea | 1:1 | 60:60 |

-continued

| Component A (Compound) | Component B | Ratio A:B | Conc. (ppm) (A:B) |
|---|---|---|---|
| X.36 | 3-ethyl-1-methoxy-1-[4-[5-(trifluoromethyl)-1,2,4-oxadiazol-3-yl]phenyl]methyl]urea | 10:1 | 60:6 |
| X.36 | Ethyl 1-[4-[5-(trifluoromethyl)-1,2,4-oxadiazol-3-yl]phenyl]methyl]pyrazole-4-carboxylate | 3.3:1 | 200:60 |
| X.36 | Ethyl 1-[4-[5-(trifluoromethyl)-1,2,4-oxadiazol-3-yl]phenyl]methyl]pyrazole-4-carboxylate | 33.3:1 | 200:6 |
| X.36 | Ethyl 1-[[4-[5-(trifluoromethyl)-1,2,4-oxadiazol-3-yl]phenyl]methyl]pyrazole-4-carboxylate | 1:1 | 60:60 |
| X.36 | Ethyl 1-[4-[5-(trifluoromethyl)-1,2,4-oxadiazol-3-yl]phenyl]methyl]pyrazole-4-carboxylate | 10:1 | 60:6 |
| X.38 | Azoxystrobin | 2:1 | 200:100 |
| X.38 | Azoxystrobin | 6.6:1 | 200:30 |
| X.38 | Azoxystrobin | 1:1.6 | 60:100 |
| X.38 | Azoxystrobin | 2:1 | 60:30 |
| X.38 | Trifloxystrobin | 2:1 | 200:100 |
| X.38 | Trifloxystrobin | 6.6:1 | 200:30 |
| X.38 | Trifloxystrobin | 1:1.6 | 60:100 |
| X.38 | Trifloxystrobin | 2:1 | 60:30 |
| X.38 | Metyltetraprole | 2:1 | 200:100 |
| X.38 | Metyltetraprole | 6.6:1 | 200:30 |
| X.38 | Metyltetraprole | 1:1.6 | 60:100 |
| X.38 | Metyltetraprole | 2:1 | 60:30 |
| X.38 | Cyproconazole | 2:1 | 200:100 |
| X.38 | Cyproconazole | 6.6:1 | 200:30 |
| X.38 | Cyproconazole | 1:1.6 | 60:100 |
| X.38 | Cyproconazole | 2:1 | 60:30 |
| X.38 | Difenoconazole | 2:1 | 200:100 |
| X.38 | Difenoconazole | 6.6:1 | 200:30 |
| X.38 | Difenoconazole | 1:1.6 | 60:100 |
| X.38 | Difenoconazole | 2:1 | 60:30 |
| X.38 | Hexaconazole | 2:1 | 200:100 |
| X.38 | Hexaconazole | 6.6:1 | 200:30 |
| X.38 | Hexaconazole | 1:1.6 | 60:100 |
| X.38 | Hexaconazole | 2:1 | 60:30 |
| X.38 | Prothioconazole | 2:1 | 200:100 |
| X.38 | Prothioconazole | 6.6:1 | 200:30 |
| X.38 | Prothioconazole | 1:1.6 | 60:100 |
| X.38 | Prothioconazole | 2:1 | 60:30 |
| X.38 | Mefentrifluconazole | 2:1 | 200:100 |
| X.38 | Mefentrifluconazole | 6.6:1 | 200:30 |
| X.38 | Mefentrifluconazole | 1:1.6 | 60:100 |
| X.38 | Mefentrifluconazole | 2:1 | 60:30 |
| X.38 | Fenpropidin | 2:1 | 200:100 |
| X.38 | Fenpropidin | 6.6:1 | 200:30 |
| X.38 | Fenpropidin | 1:1.6 | 60:100 |
| X.38 | Fenpropidin | 2:1 | 60:30 |
| X.38 | Fenpropimorph | 2:1 | 200:100 |
| X.38 | Fenpropimorph | 6.6:1 | 200:30 |
| X.38 | Fenpropimorph | 1:1.6 | 60:100 |
| X.38 | Fenpropimorph | 2:1 | 60:30 |
| X.38 | Fluxapyroxad | 2:1 | 200:100 |
| X.38 | Fluxapyroxad | 6.6:1 | 200:30 |
| X.38 | Fluxapyroxad | 1:1.6 | 60:100 |
| X.38 | Fluxapyroxad | 2:1 | 60:30 |
| X.38 | Fluopyram | 2:1 | 200:100 |
| X.38 | Fluopyram | 6.6:1 | 200:30 |
| X.38 | Fluopyram | 1:1.6 | 60:100 |
| X.38 | Fluopyram | 2:1 | 60:30 |
| X.38 | Benzovindiflupyr | 33.3:1 | 200:6 |
| X.38 | Benzovindiflupyr | 100:1 | 200:2 |
| X.38 | Benzovindiflupyr | 10:1 | 60:6 |
| X.38 | Benzovindiflupyr | 30:1 | 60:2 |
| X.38 | Pydiflumetofen | 2:1 | 200:100 |
| X.38 | Pydiflumetofen | 6.6:1 | 200:30 |
| X.38 | Pydiflumetofen | 1:1.6 | 60:100 |
| X.38 | Fluindapyr | 3.3:1 | 200:60 |
| X.38 | Fluindapyr | 33.3:1 | 200:6 |
| X.38 | Fluindapyr | 1:1 | 60:60 |
| X.38 | Fluindapyr | 10:1 | 60:6 |
| X.38 | Florylpicoxamid | 2:1 | 200:100 |
| X.38 | Florylpicoxamid | 6.6:1 | 200:30 |
| X.38 | Florylpicoxamid | 1:1.6 | 60:100 |
| X.38 | Florylpicoxamid | 2:1 | 60:30 |
| X.38 | Metarylpicoxamid | 3.3:1 | 200:60 |
| X.38 | Metarylpicoxamid | 33.3:1 | 200:6 |
| X.38 | Metarylpicoxamid | 1:1 | 60:60 |

-continued

| Component A (Compound) | Component B | Ratio A:B | Conc. (ppm) (A:B) |
|---|---|---|---|
| X.38 | Metarylpicoxamid | 10:1 | 60:6 |
| X.38 | Chlorothalonil | 2:1 | 200:100 |
| X.38 | Chlorothalonil | 6.6:1 | 200:30 |
| X.38 | Chlorothalonil | 1:1.6 | 60:100 |
| X.38 | Chlorothalonil | 2:1 | 60:30 |
| X.38 | Mancozeb | 2:1 | 200:100 |
| X.38 | Mancozeb | 6.6:1 | 200:30 |
| X.38 | Mancozeb | 1:1.6 | 60:100 |
| X.38 | Mancozeb | 2:1 | 60:30 |
| X.38 | Mandipropamid | 2:1 | 200:100 |
| X.38 | Mandipropamid | 6.6:1 | 200:30 |
| X.38 | Mandipropamid | 1:1.6 | 60:100 |
| X.38 | Mandipropamid | 2:1 | 60:30 |
| X.38 | Oxathiapiprolin | 2:1 | 200:100 |
| X.38 | Oxathiapiprolin | 6.6:1 | 200:30 |
| X.38 | Oxathiapiprolin | 1:1.6 | 60:100 |
| X.38 | Oxathiapiprolin | 2:1 | 60:30 |
| X.38 | Fludioxonil | 2:1 | 200:100 |
| X.38 | Fludioxonil | 6.6:1 | 200:30 |
| X.38 | Fludioxonil | 1:1.6 | 60:100 |
| X.38 | Fludioxonil | 2:1 | 60:30 |
| X.38 | Cyprodinil | 2:1 | 200:100 |
| X.38 | Cyprodinil | 6.6:1 | 200:30 |
| X.38 | Cyprodinil | 1:1.6 | 60:100 |
| X.38 | Cyprodinil | 2:1 | 60:30 |
| X.38 | Metalaxyl-M | 2:1 | 200:100 |
| X.38 | Metalaxyl-M | 6.6:1 | 200:30 |
| X.38 | Metalaxyl-M | 1:1.6 | 60:100 |
| X.38 | Metalaxyl-M | 2:1 | 60:30 |
| X.38 | N'-[5-bromo-2-methyl-6-(1-methyl-2-propoxy-ethoxy)-3-pyridyl]-N-ethyl-N-methyl-formamidine | 2:1 | 200:100 |
| X.38 | N'-[5-bromo-2-methyl-6-(1-methyl-2-propoxy-ethoxy)-3-pyridyl]-N-ethyl-N-methyl-formamidine | 6.6:1 | 200:30 |
| X.38 | N'-[5-bromo-2-methyl-6-(1-methyl-2-propoxy-ethoxy)-3-pyridyl]-N-ethyl-N-methyl-formamidine | 1:1.6 | 60:100 |
| X.38 | N'-[5-bromo-2-methyl-6-(1-methyl-2-propoxy-ethoxy)-3-pyridyl]-N-ethyl-N-methyl-formamidine | 2:1 | 60:30 |
| X.38 | N-isopropyl-N'-[5-methoxy-2-methyl-4-(2,2,2-trifluoro-1-hydroxy-1-phenyl-ethyl)phenyl]-N-methyl-formamidine | 2:1 | 200:100 |
| X.38 | N-isopropyl-N'-[5-methoxy-2-methyl-4-(2,2,2-trifluoro-1-hydroxy-1-phenyl-ethyl)phenyl]-N-methyl-formamidine | 6.6:1 | 200:30 |
| X.38 | N-isopropyl-N'-[5-methoxy-2-methyl-4-(2,2,2-trifluoro-1-hydroxy-1-phenyl-ethyl)phenyl]-N-methyl-formamidine | 1:1.6 | 60:100 |
| X.38 | N-isopropyl-N'-[5-methoxy-2-methyl-4-(2,2,2-trifluoro-1-hydroxy-1-phenyl-ethyl)phenyl]-N-methyl-formamidine | 2:1 | 60:30 |
| X.38 | methyl (Z)-3-methoxy-2-[2-methyl-5-[3-(trifluoromethyl)pyrazol-1-yl]phenoxy]prop-2-enoate | 2:1 | 200:100 |
| X.38 | methyl (Z)-3-methoxy-2-[2-methyl-5-[3-(trifluoromethyl)pyrazol-1-yl]phenoxy]prop-2-enoate | 6.6:1 | 200:30 |
| X.38 | methyl (Z)-3-methoxy-2-[2-methyl-5-[3-(trifluoromethyl)pyrazol-1-yl]phenoxy]prop-2-enoate | 1:1.6 | 60:100 |
| X.38 | methyl (Z)-3-methoxy-2-[2-methyl-5-[3-(trifluoromethyl)pyrazol-1-yl]phenoxy]prop-2-enoate | 2:1 | 60:30 |
| X.38 | methyl (Z)-3-methoxy-2-[2-methyl-5-(3-propylpyrazol-1-yl)phenoxy]prop-2-enoate | 2:1 | 200:100 |
| X.38 | methyl (Z)-3-methoxy-2-[2-methyl-5-(3-propylpyrazol-1-yl)phenoxy]prop-2-enoate | 6.6:1 | 200:30 |
| X.38 | methyl (Z)-3-methoxy-2-[2-methyl-5-(3-propylpyrazol-1-yl)phenoxy]prop-2-enoate | 1:1.6 | 60:100 |
| X.38 | methyl (Z)-3-methoxy-2-[2-methyl-5-(3-propylpyrazol-1-yl)phenoxy]prop-2-enoate | 2:1 | 60:30 |

-continued

| Component A (Compound) | Component B | Ratio A:B | Conc. (ppm) (A:B) |
|---|---|---|---|
| X.38 | methyl (Z)-2-(5-cyclohexyl-2-methyl-phenoxy)-3-methoxy-prop-2-enoate | 2:1 | 200:100 |
| X.38 | methyl (Z)-2-(5-cyclohexyl-2-methyl-phenoxy)-3-methoxy-prop-2-enoate | 6.6:1 | 200:30 |
| X.38 | methyl (Z)-2-(5-cyclohexyl-2-methyl-phenoxy)-3-methoxy-prop-2-enoate | 1:1.6 | 60:100 |
| X.38 | methyl (Z)-2-(5-cyclohexyl-2-methyl-phenoxy)-3-methoxy-prop-2-enoate | 2:1 | 60:30 |
| X.38 | methyl (Z)-2-(5-cyclopentyl-2-methyl-phenoxy)-3-methoxy-prop-2-enoate | 2:1 | 200:100 |
| X.38 | methyl (Z)-2-(5-cyclopentyl-2-methyl-phenoxy)-3-methoxy-prop-2-enoate | 6.6:1 | 200:30 |
| X.38 | methyl (Z)-2-(5-cyclopentyl-2-methyl-phenoxy)-3-methoxy-prop-2-enoate | 1:1.6 | 60:100 |
| X.38 | methyl (Z)-2-(5-cyclopentyl-2-methyl-phenoxy)-3-methoxy-prop-2-enoate | 2:1 | 60:30 |
| X.38 | methyl (Z)-2-[5-(3-isopropylpyrazol-1-yl)-2-methyl-phenoxy]-3-methoxy-prop-2-enoate | 2:1 | 200:100 |
| X.38 | methyl (Z)-2-[5-(3-isopropylpyrazol-1-yl)-2-methyl-phenoxy]-3-methoxy-prop-2-enoate | 6.6:1 | 200:30 |
| X.38 | methyl (Z)-2-[5-(3-isopropylpyrazol-1-yl)-2-methyl-phenoxy]-3-methoxy-prop-2-enoate | 1:1.6 | 60:100 |
| X.38 | methyl (Z)-2-[5-(3-isopropylpyrazol-1-yl)-2-methyl-phenoxy]-3-methoxy-prop-2-enoate | 2:1 | 60:30 |
| X.38 | methyl (Z)-3-methoxy-2-[2-methyl-5-(4-propyltriazol-2-yl)phenoxy]prop-2-enoate | 2:1 | 200:100 |
| X.38 | methyl (Z)-3-methoxy-2-[2-methyl-5-(4-propyltriazol-2-yl)phenoxy]prop-2-enoate | 6.6:1 | 200:30 |
| X.38 | methyl (Z)-3-methoxy-2-[2-methyl-5-(4-propyltriazol-2-yl)phenoxy]prop-2-enoate | 1:1.6 | 60:100 |
| X.38 | methyl (Z)-3-methoxy-2-[2-methyl-5-(4-propyltriazol-2-yl)phenoxy]prop-2-enoate | 2:1 | 60:30 |
| X.38 | methyl (Z)-3-methoxy-2-[2-methyl-5-[4-(trifluoromethyl)triazol-2-yl]phenoxy]prop-2-enoate | 2:1 | 200:100 |
| X.38 | methyl (Z)-3-methoxy-2-[2-methyl-5-[4-(trifluoromethyl)triazol-2-yl]phenoxy]prop-2-enoate | 6.6:1 | 200:30 |
| X.38 | methyl (Z)-3-methoxy-2-[2-methyl-5-[4-(trifluoromethyl)triazol-2-yl]phenoxy]prop-2-enoate | 1:1.6 | 60:100 |
| X.38 | methyl (Z)-3-methoxy-2-[2-methyl-5-[4-(trifluoromethyl)triazol-2-yl]phenoxy]prop-2-enoate | 2:1 | 60:30 |
| X.38 | TAEGRO ® | 2:1 | 200:100 |
| X.38 | TAEGRO ® | 6.6:1 | 200:30 |
| X.38 | TAEGRO ® | 1:1.6 | 60:100 |
| X.38 | TAEGRO ® | 2:1 | 60:30 |
| X.38 | Timorex Gold ™ | 2:1 | 200:100 |
| X.38 | Timorex Gold ™ | 6.6:1 | 200:30 |
| X.38 | Timorex Gold ™ | 1:1.6 | 60:100 |
| X.38 | Timorex Gold ™ | 2:1 | 60:30 |
| X.38 | N-methoxy-N-[4-[5-(trifluoromethyl)-1,2,4-oxadiazol-3-yl]phenyl methyl]cyclopropanecarboxamide | 3.3:1 | 200:60 |
| X.38 | N-methoxy-N-[[4-[5-(trifluoromethyl)-1,2,4-oxadiazol-3-yl]phenyl]methyl]cyclopropanecarboxamide | 33.3:1 | 200:6 |
| X.38 | N-methoxy-N-[4-[5-(trifluoromethyl)-1,2,4-oxadiazol-3-yl]phenyl]methyl]cyclopropanecarboxamide | 1:1 | 60:60 |
| X.38 | N-methoxy-N-[[4-[5-(trifluoromethyl)-1,2,4-oxadiazol-3-yl]phenyl]methyl]cyclopropanecarboxamide | 10:1 | 60:6 |
| X.38 | N,2-dimethoxy-N-[[4-[5-(trifluoromethyl)-1,2,4-oxadiazol-3-yl]phenyl]methyl]propanamide | 3.3:1 | 200:60 |
| X.38 | N,2-dimethoxy-N-[[4-[5-(trifluoromethyl)-1,2,4-oxadiazol-3-yl]phenyl]methyl]propanamide | 33.3:1 | 200:6 |
| X.38 | N,2-dimethoxy-N-[4-[5-(trifluoromethyl)-1,2,4-oxadiazol-3-yl]phenyl]methyl]propanamide | 1:1 | 60:60 |
| X.38 | N,2-dimethoxy-N-[[4-[5-(trifluoromethyl)-1,2,4-oxadiazol-3-yl]phenyl]methyl]propanamide | 10:1 | 60:6 |
| X.38 | N-ethyl-2-methyl-N-[4-[5-(trifluoromethyl)-1,2,4-oxadiazol-3-yl]phenyl]methyl]propanamide | 3.3:1 | 200:60 |
| X.38 | N-ethyl-2-methyl-N-[4-[5-(trifluoromethyl)-1,2,4-oxadiazol-3-yl]phenyl]methyl]propanamide | 33.3:1 | 200:6 |

-continued

| Component A (Compound) | Component B | Ratio A:B | Conc. (ppm) (A:B) |
|---|---|---|---|
| X.38 | N-ethyl-2-methyl-N-[[4-[5-(trifluoromethyl)-1,2,4-oxadiazol-3-yl]phenyl]methyl]propanamide | 1:1 | 60:60 |
| X.38 | N-ethyl-2-methyl-N-[[4-[5-(trifluoromethyl)-1,2,4-oxadiazol-3-yl]phenyl]methyl]propanamide | 10:1 | 60:6 |
| X.38 | 1-methoxy-3-methyl-1-[4-[5-(trifluoromethyl)-1,2,4-oxadiazol-3-yl]phenyl]methyl]urea | 3.3:1 | 200:60 |
| X.38 | 1-methoxy-3-methyl-1-[4-[5-(trifluoromethyl)-1,2,4-oxadiazol-3-yl]phenyl]methyl]urea | 33.3:1 | 200:6 |
| X.38 | 1-methoxy-3-methyl-1-[[4-[5-(trifluoromethyl)-1,2,4-oxadiazol-3-yl]phenyl]methyl]urea | 1:1 | 60:60 |
| X.38 | 1-methoxy-3-methyl-1-[[4-[5-(trifluoromethyl)-1,2,4-oxadiazol-3-yl]phenyl]methyl]urea | 10:1 | 60:6 |
| X.38 | 1,3-dimethoxy-1-[[4-[5-(trifluoromethyl)-1,2,4-oxadiazol-3-yl]phenyl]methyl]urea | 3.3:1 | 200:60 |
| X.38 | 1,3-dimethoxy-1-[[4-[5-(trifluoromethyl)-1,2,4-oxadiazol-3-yl]phenyl]methyl]urea | 33.3:1 | 200:6 |
| X.38 | 1,3-dimethoxy-1-[4-[5-(trifluoromethyl)-1,2,4-oxadiazol-3-yl]phenyl]methyl]urea | 1:1 | 60:60 |
| X.38 | 1,3-dimethoxy-1-[4-[5-(trifluoromethyl)-1,2,4-oxadiazol-3-yl]phenyl]methyl]urea | 10:1 | 60:6 |
| X.38 | 3-ethyl-1-methoxy-1-[4-[5-(trifluoromethyl)-1,2,4-oxadiazol-3-yl]phenyl]methyl]urea | 3.3:1 | 200:60 |
| X.38 | 3-ethyl-1-methoxy-1-[4-[5-(trifluoromethyl)-1,2,4-oxadiazol-3-yl]phenyl]methyl]urea | 33.3:1 | 200:6 |
| X.38 | 3-ethyl-1-methoxy-1-[[4-[5-(trifluoromethyl)-1,2,4-oxadiazol-3-yl]phenyl]methyl]urea | 1:1 | 60:60 |
| X.38 | 3-ethyl-1-methoxy-1-[[4-[5-(trifluoromethyl)-1,2,4-oxadiazol-3-yl]phenyl]methyl]urea | 10:1 | 60:6 |
| X.38 | Ethyl 1-[[4-[5-(trifluoromethyl)-1,2,4-oxadiazol-3-yl]phenyl]methyl]pyrazole-4-carboxylate | 3.3:1 | 200:60 |
| X.38 | Ethyl 1-[4-[5-(trifluoromethyl)-1,2,4-oxadiazol-3-yl]phenyl]methyl]pyrazole-4-carboxylate | 33.3:1 | 200:6 |
| X.38 | Ethyl 1-[4-[5-(trifluoromethyl)-1,2,4-oxadiazol-3-yl]phenyl]methyl]pyrazole-4-carboxylate | 1:1 | 60:60 |
| X.38 | Ethyl 1-[4-[5-(trifluoromethyl)-1,2,4-oxadiazol-3-yl]phenyl]methyl]pyrazole-4-carboxylate | 10:1 | 60:6 |

The invention claimed is:

1. A fungicidal composition comprising a mixture of components (A) and (B) as active ingredients, wherein component (A) is selected from 2-[(2,6-difluoro-4-pyridyl)-(2-methoxyacetyl)amino]-N-(2,2-dimethyl cyclobutyl)-5-methyl-thiazole-4-carboxamide (compound X.29); 2-[acetyl-(2,6-difluoro-4-pyridyl)amino]-N-(2,2-dimethyl cyclobutyl)-5-methyl-thiazole-4-carboxamide (compound X.36); 2-[acetyl-(2,6-difluoro-4-pyridyl)amino]-5-methyl-N-spiro[3.4]octan-3-yl-thiazole-4-carboxamide (compound X.37); and 2-[(2,6-difluoro-4-pyridyl)-(2-methylpropanoyl) amino]-N-(2,2-dimethylcyclobutyl)-5-methyl-thiazole-4-carboxamide (compound X.38);

and component (B) is a compound selected from the group consisting of:

azoxystrobin, trifloxystrobin, metyltetraprole, cyproconazole, tebuconazole, difenoconazole, hexaconazole, propiconazole, fenhexamid, prothioconazole, mefentrifluconazole, fenpropidin, fenpropimorph, fluxapyroxad, fluopyram, isopyrazam, sedaxane, benzovindiflupyr, pydiflumetofen, isoflucypram, bixafen, penthiopyrad, inpyrfluxam, isofetamid, pyrapropoyne, fluindapyr, fenpicoxamid, florylpicoxamid, acibenzolar-S-methyl, trinexepac-ethyl, fosetyl-aluminium, chlorothalonil, mancozeb, mandipropamid, oxathiapiprolin, fluazinam, fludioxonil, cyprodinil, metalaxyl-M, aminopyrifen, folpet, ipflufenoquin, quinofumelin, tebufloquin, tolprocarb, tricyclazole, pyroquilon, cyflufenamid, metrafenone, N-(1-benzyl-1,3-dimethyl-butyl)-8-fluoro-quinoline-3-carboxamide, N-methoxy-N-[[4-[5-(trifluoromethyl)-1,2,4-oxadiazol-3-yl]phenyl]methyl]cyclopropanecarboxamide, N,2-dimethoxy-N-[[4-[5-(trifluoromethyl)-1,2,4-oxadiazol-3-yl]phenyl]methyl]propanamide, methyl (Z)-2-(5-cyclohexyl-2-methyl-phenoxy)-3-methoxy-prop-2-enoate methyl (Z)-2-(5-cyclopentyl-2-methyl-phenoxy)-3-methoxy-prop-2-enoate and metarylpicoxamid;

wherein the weight ratio of component A) to component B) is from 100:1 to 1:100.

2. The fungicidal composition according to claim 1, wherein the component (A) is 2-[(2,6 difluoro-4-pyridyl)-(2-methoxyacetyl)amino]-N-(2,2-dimethyl cylobutyl)-5-methyl-thiazole-4-carboxamide (compound X.29).

3. The fungicidal composition according to claim 1, wherein component (A) is

2-[acetyl-(2,6-difluoro-4-pyridyl)amino]-N-(2,2-dimethyl cyclobutyl)-5-methyl-thiazole-4-carboxamide (compound X.36).

4. The fungicidal composition according to claim 1, wherein component (A) is selected from:

2-[acetyl-(2,6-difluoro-4-pyridyl)amino]-5-methyl-N-spiro[3.4]octan-3-yl-thiazole-4-carboxamide (compound X.37).

5. The fungicidal composition according to claim 1, wherein component (B) is a compound selected from the group consisting of azoxystrobin, trifloxystrobin, metyltetraprole, difenoconazole, hexaconazole, propiconazole, prothioconazole, mefentrifluconazole, fenpropidin, fenpropimorph, fluxapyroxad, fluopyram, isopyrazam, sedaxane, benzovindiflupyr, pydiflumetofen, isoflucypram, isofetamid, pyrapropoyne, fluindapyr, fenpicoxamid, florylpicoxamid, acibenzolar-S-methyl, chlorothalonil, mancozeb, mandipropamid, oxathiapiprolin, fluazinam, fludioxonil, cyprodinil, metalaxyl-M, aminopyrifen, folpet, ipflufenoquin, quinofumelin, tricyclazole, pyroquilon, cyflufenamid, metrafenone, N-(1-benzyl-1,3-dimethyl-butyl)-8-fluoro-quinoline-3-carboxamide, N-methoxy-N-[[4-[5-(trifluoromethyl)-1,2,4-oxadiazol-3-yl]phenyl]methyl]cyclopropanecarboxamide, N,2-dimethoxy-N-[[4-[5-(trifuoromethyl)-1,2,4-oxadiazol-3-yl]phenyl]methyl]propanamide, methyl (Z)-2-(5-cyclohexyl-2-ethyl-phenoxy)-3-methoxy-prop-2-enoate, methyl (Z)-2-(5-cyclopentyl-2-methyl-phenoxy)-3-methoxy-prop-2-enoate, and metarylpicoxamid.

6. The fungicidal composition according to claim 1, wherein component (B) is a compound selected from the group consisting of azoxystrobin, trifloxystrobin, metyltetraprole, difenoconazole, hexaconazole, propiconazole, prothioconazole, mefentrifluconazole, fenpropidin, fenpropimorph, fluxapyroxad, fluopyram, isopyrazam, sedaxane, benzovindiflupyr, pydiflumetofen, isoflucypram, pyrapropoyne, fluindapyr, fenpicoxamid, florylpicoxamid, chlorothalonil, mancozeb, mandipropamid, oxathiapiprolin, fluazinam, fludioxonil, cyprodinil, metalaxyl-M, aminopyrifen, folpet, ipflufenoquin, quinofumelin, tricyclazole, pyroquilon, and N-(1-benzyl-1,3-dimethyl-butyl)-8-fluoro-quinoline-3-carboxamide.

7. The fungicidal composition according to claim 1, wherein the weight ratio of component (A) to component (B) is from 20:1 to 1:40.

8. The fungicidal composition according to claim 1, wherein the weight ratio of component (A) to component (B) is from 12:1 to 1:25.

9. The fungicidal composition according to claim 1, wherein the weight ratio of component (A) to component (B) is from 5:1 and 1:15.

10. The fungicidal composition according to claim 1, wherein the weight ratio of component (A) to component (B) is from 2:1 to 1:5.

11. The fungicidal composition according to claim 1, wherein the composition comprises one or more further pesticides selected from the group consisting of: a fungicide, selected from etridiazole, fluazinam, benzovindiflupyr, pydiflumetofen, benalaxyl, benalaxyl-M (kiralaxyl), furalaxyl, metalaxyl, metalaxyl-M (mefenoxam), dodicin, N'-(2,5-Dimethyl-4-phenoxy-phenyl)-N-ethyl-N-methyl-formamidine, N'-[4-(4,5-Dichloro-thiazol-2-yloxy)-2,5-dimethyl-phenyl]-N-ethyl-N-methyl-formamidine, N'-[4-[[3-[(4-chlorophenyl)methyl]-1,2,4-thiadiazol-5-yl]oxy]-2,5-dimethyl-phenyl]-N-ethyl-N-methyl-formamidine, ethirimol, 3'-chloro-2-methoxy-N-[(3RS)-tetrahydro-2-oxofuran-3-yl]acet-2',6'-xylidide (clozylacon), cyprodinil, mepanipyrim, pyrimethanil, dithianon, aureofungin, blasticidin-S, biphenyl, chloroneb, dicloran, hexachlorobenzene, quintozene, tecnazene, (TCNB), tolclofos-methyl, metrafenone, 2,6-dichloro-N-(4-trifluoromethylbenzyl)-benzamide, fluopicolide (flupicolide), tioxymid, flusulfamide, benomyl, carbendazim, carbendazim chlorhydrate, chlorfenazole, fuberidazole, thiabendazole, thiophanate-methyl, benthiavalicarb, chlobenthiazone, probenazole, acibenzolar, bethoxazin, pyriofenone (IKF-309), acibenzolar-S-methyl, pyribencarb (KIF-7767), butylamine, 3-iodo-2-propinyl n-butylcarbamate (IPBC), iodocarb (isopropanyl butylcarbamate), isopropanyl butylcarbamate (iodocarb), picarbutrazox, polycarbamate, propamocarb, tolprocarb, 3-(difluoromethyl)-N-(7-fluoro-1,1,3,3-tetramethyl-indan-4-yl)-1-methyl-pyrazole-4-carboxamide diclocymet, N-[(5-chloro-2-isopropyl-phenyl)methyl]-N-cyclopropyl-3-(difluoromethyl)-5-fluoro-1-methyl-pyrazole-4-carboxamide N-cyclopropyl-3-(difluoromethyl)-5-fluoro-N-[(2-isopropylphenyl)methyl]-1-methyl-pyrazole-4-carboxamide carpropamid, chlorothalonil, flumorph, oxine-copper, cymoxanil, phenamacril, cyazofamid, flutianil, thicyofen, chlozolinate, iprodione, procymidone, vinclozolin, bupirimate, dinocton, dinopenton, dinobuton, dinocap, meptyldinocap, diphenylamine, phosdiphen, 2,6-dimethyl-[1,4]dithiino[2,3-c:5,6-c']dipyrrole-1,3,5,7(2H,6H)-tetraone, azithiram, etem, ferbam, mancozeb, maneb, metam, metiram (polyram), metiram-zinc, nabam, propineb, thiram, vapam (metam sodium), zineb, ziram, dithioether, isoprothiolane, ethaboxam, fosetyl, fosetyl-aluminium (fosetyl-al), methyl bromide, methyl iodide, methyl isothiocyanate, cyclafuramid, fenfuram, validamycin, streptomycin, (2RS)-2-bromo-2-(bromomethyl)glutaronitrile (bromothalonil), dodine, doguadine, guazatine, iminoctadine, iminoctadine triacetate, 2,4-D, 2,4-DB, kasugamycin, dimethirimol, fenhexamid, hymexazole, hydroxyisoxazole imazalil, imazalil sulphate, oxpoconazole, pefurazoate, prochloraz, triflumizole, fenamidone, Bordeaux mixture, calcium polysulfide, copper acetate, copper carbonate, copper hydroxide, copper naphthenate, copper oleate, copper oxychloride, copper oxyquinolate, copper silicate, copper sulphate, copper tallate, cuprous oxide, sulphur, carbaryl, phthalide (fthalide), dingjunezuo (Jun Si Qi), oxathiapiprolin, fluoroimide, mandipropamid, KSF-1002, benzamorf, dimethomorph, fenpropimorph, tridemorph, dodemorph, diethofencarb, fentin acetate, fentin hydroxide, carboxin, oxycarboxin, drazoxolon, famoxadone, m-phenylphenol, p-phenylphenol, tribromophenol (TBP), 2-[2-[(7,8-difluoro-2-methyl-3-quinolyl)oxy]-6-fluoro-phenyl]propan-2-ol 2-[2-fluoro-6-[(8-fluoro-2-methyl-3-quinolyl)oxy]phenyl]propan-2-ol, cyflufenamid, ofurace, oxadixyl, flutolanil, mepronil, isofetamid, fenpiclonil, fludioxonil, pencycuron, edifenphos, iprobenfos, pyrazophos, phosphorus acids, tecloftalam, captafol, captan, ditalimfos, triforine, fenpropidin, piperalin, osthol, 1-methylcyclopropene, 4-CPA, chlormequat, clofencet, dichlorprop, dimethipin, endothal, ethephon, flumetralin, forchlorfenuron, gibberellic acid, gibberellins, hymexazol, maleic hydrazide, mepiquat, naphthalene acetamide, paclobutrazol, prohexadione, prohexadione-calcium, thidiazuron, tribufos (tributyl phosphorotrithioate), trinexapac, uniconazole, α-naphthalene acetic acid, polyoxin D (polyoxrim), BLAD, chitosan, fenoxanil, folpet, 3-(difluoromethyl)-N-methoxy-1-methyl-N-[1-methyl-2-(2,4,6-trichlorophenyl)ethyl]pyrazole-4-carboxamide, bixafen, fluxapyroxad, furametpyr, isopyrazam, penflufen, penthiopyrad, sedaxane, fenpyrazamine, diclomezine, pyrifenox, boscalid, fluopyram, diflumetorim, fenarimol, 5-fluoro-2-(p-tolylmethoxy)pyrimidin-4-amine ferimzone, dimetachlone (dimethaclone), pyroquilon, proquinazid, ethoxyquin, quinoxyfen, 4,4,5-trifluoro-3,3-dimethyl-1-(3-quinolyl)isoquinoline 4,4-difluoro-3,3-dimethyl-1-(3-quinolyl)isoquinoline 5-fluoro-3,3,4,4-tetramethyl-1-(3-quinolyl)isoquinoline 9-fluoro-2,2-dimethyl-5-(3-quinolyl)-3H-1,4-benzoxazepine, tebufloquin, oxolinic acid, chinomethionate (oxythioquinox, quinoxymethionate), spiroxamine, (E)-N-methyl-2-[2-(2, 5-dimethylphenoxymethyl)phenyl]-2-methoxy-iminoacetamide, (mandestrobin), azoxystrobin, coumoxystrobin, dimoxystrobin, enestroburin, pyriotrobin, fenamistrobin, flufenoxystrobin, fluoxastrobin, kresoxim-methyl, mandestrobin, metaminostrobin, metominostrobin, orysastrobin, picoxystrobin, pyraclostrobin, pyrametostrobin, pyraoxystrobin, triclopyricarb, trifloxystrobin, amisulbrom, dichlofluanid, tolylfluanid, but-3-ynyl N-[6-[[(Z)-[(1-methyltetrazol-5-yl)-phenyl-methylene]amino]

oxymethyl]-2-pyridyl]carbamate, dazomet, isotianil, tiadinil, thifluzamide, benthiazole (TCMTB), silthiofam, zoxamide, anilazine, tricyclazole, (.+-.)-cis-1-(4-chlorophenyl)-2-(1H-1,2,4-triazol-1-yl)-cycloheptanol (huanjunzuo), 1-(5-bromo-2-pyridyl)-2-(2,4-difluorophenyl)-1,1-difluoro-3-(1,2,4-triazol-1-yl)propan-2-ol 2-(1-tert-butyl)-1-(2-chlorophenyl)-3-(1,2,4-triazol-1-yl)-propan-2-ol (TCDP), (N'-[5-bromo-2-methyl-6-(1-methyl-2-propoxy-ethoxy)-3-pyridyl]-N-ethyl-N-methyl-formamidine), azaconazole, bitertanol (biloxazol), bromuconazole, climbazole, cyproconazole, difenoconazole, dimetconazole, diniconazole, diniconazole-M, epoxiconazole, etaconazole, fenbuconazole, fluquinconazole, flusilazole, flutriafol, hexaconazole, imibenconazole, ipconazole, metconazole, myclobutanil, penconazole, propiconazole, prothioconazole, mefentrifluconazole, simeconazole, tebuconazole, tetraconazole, triadimefon, triadimenol, triazoxide, triticonazole, 2-[[(1R, 5S)-5-[(4-fluorophenyl)methyl]-1-hydroxy-2,2-dimethyl-cyclopentyl]methyl]-4H-1,2,4-triazole-3-thione 2-[[3-(2-chlorophenyl)-2-(2,4-difluorophenyl)oxiran-2-yl]methyl]-4H-1,2,4-triazole-3-thione, ametoctradin (imidium), iprovalicarb, valifenalate, 2-benzyl-4-chlorophenol (Chlorophene), allyl alcohol, azafenidin, benzalkonium chloride, chloropicrin, cresol, daracide, dichlorophen (dichlorophene), difenzoquat, dipyrithione, N-(2-p-chlorobenzoylethyl)-hexaminium chloride, NNF-0721, octhilinone, oxasulfuron, Timorex Gold™ (plant extract comprising tea tree oil), propamidine and propionic acid; or an insecticide selected from abamectin, acephate, acetamiprid, amidoflumet (S-1955), avermectin, azadirachtin, azinphos-methyl, bifenthrin, bifenazate, buprofezin, carbofuran, cartap, chlorantraniliprole (DPX-E2Y45), chlorfenapyr, chlorfluazuron, chlorpyrifos, chlorpyrifos-methyl, chromafenozide, clothianidin, cyflumetofen, cyfluthrin, beta-cyfluthrin, cyhalothrin, lambda-cyhalothrin, cypermethrin, cyromazine, deltamethrin, diafenthiuron, diazinon, dieldrin, diflubenzuron, dimefluthrin, dimethoate, dinotefuran, diofenolan, emamectin, endosulfan, esfenvalerate, ethiprole, fenothiocarb, fenoxycarb, fenpropathrin, fenvalerate, fipronil, flonicamid, flubendiamide, flucythrinate, tau-fluvalinate, flufenerim (UR-50701), flufenoxuron, fonophos, halofenozide, hexaflumuron, hydramethylnon, imidacloprid, indoxacarb, isofenphos, lufenuron, malathion, metaflumizone, metaldehyde, methamidophos, methidathion, methomyl, methoprene, methoxychlor, metofluthrin, monocrotophos, methoxyfenozide, nitenpyram, nithiazine, novaluron, noviflumuron (XDE-007), oxamyl, parathion, parathion-methyl, permethrin, phorate, phosalone, phosmet, phosphamidon, pirimicarb, profenofos, profluthrin, pymetrozine, pyrafluprole, pyrethrin, pyridalyl, pyrifluquinazon, pyriprole, pyriproxyfen, rotenone, ryanodine, spinetoram, spinosad, spirodiclofen, spiromesifen (BSN 2060), spirotetramat, sulprofos, tebufenozide, teflubenzuron, tefluthrin, terbufos, tetrachlorvinphos, thiacloprid, thiamethoxam, thiodicarb, thiosultap-sodium, tralomethrin, triazamate, trichlorfon and triflumuron; or a bactericide selected from streptomycin; or an acaricide selected from amitraz, chinomethionat, chlorobenzilate, cyenopyrafen, cyhexatin, dicofol, dienochlor, etoxazole, fenazaquin, fenbutatin oxide, fenpropathrin, fenpyroximate, hexythiazox, propargite, pyridaben and tebufenpyrad; or a biological agent selected from *Bacillus thuringiensis, Bacillus thuringiensis* delta endotoxin, baculovirus, and entomopathogenic bacteria, virus and fungi.

12. The fungicidal composition according to claim 1, wherein the composition further comprises an agriculturally acceptable carrier and, optionally, a surfactant and/or formulation adjuvants.

13. A method of controlling or preventing phytopathogenic diseases and/or fungi, on useful plants or on propagation material thereof, which comprises applying to the useful plants, the locus thereof or propagation material thereof the fungicidal composition as defined in claim 1.

14. The method according to claim 13, wherein the fungicidal composition components (A) and (B) are applied in a sequential manner.

15. The method according to claim 13, wherein the fungicidal composition components (A) and (B) are applied as a mixture.

16. The method according to claim 13, wherein the phytopathogenic diseases and/or fungi comprise *Zymoseptoria tritici, Botrytis cinerea, Glomerella lagenarium, Mycosphaerella arachidis, Pyricularia oryzae, Cercospora beticola, Monographaella nivalis, Pyrenophora teres, Alternaria solani, Sclerotinia sclerotiorum, Blumeria graminis, Puccinia recondita*, or *Phakopsora pachyrhizi.*

17. The fungicidal composition according to claim 1, wherein the component (A) is 2-[(2,6-difluoro-4-pyridyl)-(2-methylpropanoyl)amino]-N-(2,2-dimethylcyclobutyl)-5-methyl-thiazole-4-carboxamide (compound X.38).

18. A fungicidal comprising a mixture of components (A) and (B) as active ingredients, wherein component (A) is selected from 2-[(2,6-difluoro-4-pyridyl)-(2-methoxyacetyl) amino]-N-(2,2-dimethyl cyclobutyl)-5-methyl-thiazole-4-carboxamide (compound X.29); 2-[acetyl-(2,6-difluoro-4-pyridyl)amino]-N-(2,2-dimethyl cyclobutyl)-5-methyl-thiazole-4-carboxamide (compound X.36); 2-[acetyl-(2,6-difluoro-4-pyridyl)amino]-5-methyl-N-spiro[3.4]octan-3-yl-thiazole-4-carboxamide (compound X.37); and 2-[(2,6-difluoro-4-pyridyl)-(2-methylpropanoyl)amino]-N-(2,2-dimethylcyclobutyl)-5-methyl-thiazole-4-carboxamide (X.38);

and component (B) selected from the group consisting of *Bacillus amyloliquefaciens* strain FZB24, and plant extract comprising tea tree oil.

* * * * *